US011906290B2

(12) United States Patent
Binder

(10) Patent No.: US 11,906,290 B2
(45) **Date of Patent: *Feb. 20, 2024**

(54) METHOD AND APPARATUS FOR COOPERATIVE USAGE OF MULTIPLE DISTANCE METERS

(71) Applicant: May Patents Ltd., Hod Hasharon (IL)

(72) Inventor: Yehuda Binder, Ramat Gan (IL)

(73) Assignee: May Patents Ltd., Hod-Hasharon (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/572,218

(22) Filed: Jan. 10, 2022

(65) Prior Publication Data

US 2022/0128352 A1 Apr. 28, 2022

Related U.S. Application Data

(63) Continuation of application No. 16/081,901, filed as application No. PCT/IL2017/050220 on Feb. 22, 2017, now Pat. No. 11,255,663.

(Continued)

(51) Int. Cl.

*G01B 11/26* (2006.01)
*G01B 11/02* (2006.01)

(Continued)

(52) U.S. Cl.

CPC ............ *G01B 11/26* (2013.01); *G01B 11/026* (2013.01); *G01B 15/00* (2013.01); *G01S 13/878* (2013.01);

(Continued)

(58) Field of Classification Search

CPC ...... G01B 11/026; G01B 11/26; G01B 15/00; G01S 13/878; G01S 2013/468; G01S 15/42

See application file for complete search history.

(56) References Cited

U.S. PATENT DOCUMENTS 3,184,842 A 5/1965 Maropis
3,433,981 A 3/1969 Bollee (Continued)

FOREIGN PATENT DOCUMENTS

CN 103747183 4/2014
EP 2031418 A1 3/2009

(Continued)

OTHER PUBLICATIONS

Point-slope Form, Math-Only-Math.com, https://www.math-only-math.com/point-slope-form.html (2014).

(Continued)

*Primary Examiner* — Michael J Dalbo
(74) *Attorney, Agent, or Firm* — May Patents Ltd.

(57) ABSTRACT

A method and apparatus for an angle meter cooperatively using two or more non-contact distance meters for measuring distances to a surface along substantially parallel lines. The measured distances are used for estimating or calculating the angle to the surface and the distance to the surface. The distance meters may use optical means, where a visible or non-visible light or laser beam is emitted and received, acoustical means, where an audible or ultrasound sound is emitted and received, or an electro-magnetic scheme, where radar beam is transmitted and received. The distances may be estimated using a Time-of-Flight (TOF), homodyne or heterodyne phase detection schemes. The distance meters may share the same correlator, signal conditioning circuits, or the same sensor. Two or more angle meters may be used defining parallel or perpendicular measurement planes, for measuring angles between surfaces, and for estimating physical dimensions such as length, area or volume.

33 Claims, 143 Drawing Sheets

Related U.S. Application Data

(60) Provisional application No. 62/373,388, filed on Aug. 11, 2016, provisional application No. 62/303,388, filed on Mar. 4, 2016.

(51) Int. Cl.
*G01B 15/00* (2006.01)
*G01S 15/08* (2006.01)
*G01S 13/87* (2006.01)
*G01S 17/08* (2006.01)
*G01S 15/42* (2006.01)
*G01S 13/46* (2006.01)

(52) U.S. Cl.
CPC .............. *G01S 15/08* (2013.01); *G01S 15/42* (2013.01); *G01S 17/08* (2013.01); *G01S 2013/468* (2013.01)

(56) References Cited

U.S. PATENT DOCUMENTS 3,436,630 A 4/1969 Robert et al.
4,019,073 A 4/1977 Vishnevsky et al.
4,129,813 A 12/1978 Hunts et al.
4,210,837 A 7/1980 Vasiliev et al.
4,248,123 A 2/1981 Bunger et al.
4,496,149 A 1/1985 Schwartzberg
4,516,260 A 5/1985 Breedlove et al.
4,552,456 A 11/1985 Endo
4,715,706 A 12/1987 Wang
4,796,891 A 1/1989 Milner
4,818,100 A 4/1989 Breen
4,840,602 A 6/1989 Rose
4,925,303 A * 5/1990 Pusic ..................... G01C 9/005 356/152.3
4,968,255 A 11/1990 Lee et al.
5,138,459 A 8/1992 Roberts et al.
5,163,323 A 11/1992 Davidson
5,189,463 A 2/1993 Capper et al.
5,229,806 A 7/1993 Takehana
5,283,622 A 2/1994 Ueno et al.
5,341,144 A 8/1994 Stove
5,343,285 A 8/1994 Gondrum et al.
5,349,129 A 9/1994 Wisniewski et al.
5,359,404 A 10/1994 Dunne
5,402,170 A 3/1995 Parulski et al.
5,442,592 A 8/1995 Toda et al.
5,483,501 A 1/1996 Park et al.
5,529,138 A * 6/1996 Shaw ..................... G05D 1/027 188/DIG. 1
5,546,088 A 8/1996 Trummer et al.
5,546,156 A 8/1996 McIntyre
5,552,654 A 9/1996 Konno et al.
5,594,413 A 1/1997 Cho et al.
5,600,435 A 2/1997 Bartko
5,652,651 A 7/1997 Dunne
5,713,135 A 2/1998 Acopulos
5,774,091 A 6/1998 McEwan
5,793,704 A 8/1998 Freger
5,814,732 A 9/1998 Nogami
5,815,251 A 9/1998 Ehbets et al.
5,949,531 A 9/1999 Ehbets et al.
5,965,968 A 10/1999 Robert et al.
6,006,021 A 12/1999 Tognazzini
6,040,898 A 3/2000 Mrosik et al.
6,043,868 A 3/2000 Dunne
6,132,281 A 10/2000 Klitsner et al.
6,157,591 A 12/2000 Krantz
6,166,995 A 12/2000 Hoenes
6,191,724 B1 2/2001 McEwan
6,232,911 B1 5/2001 O'Conner
6,272,071 B1 8/2001 Takai et al.
6,400,451 B1 6/2002 Fukuda
6,412,183 B1 * 7/2002 Uno .................. G01B 11/2755 356/139.09
6,501,539 B2 12/2002 Chien et al.
6,527,611 B2 3/2003 Cummings
6,535,161 B1 3/2003 McEwan
6,560,560 B1 5/2003 Tachner
6,614,719 B1 9/2003 Grzesek
6,624,881 B2 9/2003 Waibel et al.
6,694,316 B1 2/2004 Langseth et al.
6,697,147 B2 2/2004 Ko et al.
6,727,849 B1 4/2004 Kirk
6,801,305 B2 10/2004 Stierle et al.
6,804,168 B2 10/2004 Schlick et al.
6,836,449 B2 12/2004 Raykhman et al.
6,847,435 B2 1/2005 Honda et al.
6,876,441 B2 4/2005 Barker
6,879,281 B2 4/2005 Gresham et al.
6,897,891 B2 5/2005 Itsukaichi
6,903,810 B2 6/2005 Gogolla et al.
6,940,545 B1 9/2005 Ray et al.
7,010,050 B2 3/2006 Maryanka
7,086,162 B2 8/2006 Tyroler
7,091,876 B2 8/2006 Steger
7,095,362 B2 8/2006 Hoetzel et al.
7,136,482 B2 11/2006 Wille
7,196,776 B2 3/2007 Ohtomo et al.
7,196,970 B2 3/2007 Moon et al.
7,199,866 B2 4/2007 Gogolla et al.
7,202,941 B2 4/2007 Munro
7,263,031 B2 8/2007 Sanoner et al.
7,304,727 B2 12/2007 Chien et al.
7,334,001 B2 2/2008 Eichstaedt et al.
7,372,771 B2 5/2008 Park
7,380,722 B2 6/2008 Harley et al.
7,412,077 B2 8/2008 Li et al.
7,414,186 B2 8/2008 Scarpa et al.
7,432,952 B2 10/2008 Fukuoka
7,528,774 B2 5/2009 Kim et al.
7,557,689 B2 7/2009 Seddigh et al.
7,600,876 B2 10/2009 Kurosu et al.
7,605,714 B2 10/2009 Thompson et al.
7,653,573 B2 1/2010 Hayes, Jr. et al.
7,679,996 B2 3/2010 Gross
7,787,105 B2 8/2010 Hipp
7,796,782 B1 9/2010 Motamedi et al.
7,920,251 B2 4/2011 Chung
8,081,298 B1 12/2011 Cross
8,193,920 B2 6/2012 Klotz et al.
8,272,616 B2 9/2012 Sato et al.
8,310,655 B2 11/2012 Mimeault
8,319,949 B2 11/2012 Cantin et al.
8,401,816 B2 3/2013 Thierman et al.
8,441,705 B2 5/2013 Lukic et al.
8,479,122 B2 7/2013 Hotelling et al.
8,508,472 B1 8/2013 Wieder
8,630,314 B2 1/2014 York
8,656,781 B2 2/2014 Lavoie
8,687,880 B2 4/2014 Wei et al.
8,700,626 B2 4/2014 Bedingfield
8,717,579 B2 5/2014 Portegys
8,736,819 B2 5/2014 Nagai
8,773,509 B2 7/2014 Pan
8,781,162 B2 7/2014 Zhu et al.
8,806,947 B2 8/2014 Kajitani
8,941,561 B1 1/2015 Starner
8,948,832 B2 2/2015 Hong et al.
8,957,988 B2 2/2015 Wexler et al.
8,970,501 B2 3/2015 Hotelling et al.
8,970,824 B2 3/2015 Chang et al.
9,008,725 B2 4/2015 Schmidt
9,019,174 B2 4/2015 Jerauld
9,103,669 B2 8/2015 Giacotto et al.
9,128,565 B2 9/2015 Kajitani et al.
9,207,078 B2 12/2015 Schorr et al.
9,262,003 B2 2/2016 Kitchens et al.
9,268,136 B1 2/2016 Starner et al.
9,298,283 B1 3/2016 Lin et al.
9,377,301 B2 6/2016 Neier
9,752,863 B2 9/2017 Hinderling
9,753,126 B2 9/2017 Smits
9,753,135 B2 9/2017 Bosch

(56) References Cited

U.S. PATENT DOCUMENTS 11,255,663 B2 * 2/2022 Binder .................. G01B 11/26
11,402,950 B2 8/2022 Khajeh et al.
2002/0101515 A1 8/2002 Yoshida et al.
2003/0034439 A1 2/2003 Reime et al.
2003/0147064 A1 * 8/2003 Timothy .................. G01S 5/16 356/4.01
2003/0182041 A1 * 9/2003 Watson ............ B60R 21/01336 701/45
2003/0218736 A1 11/2003 Gogolla et al.
2004/0001197 A1 1/2004 Ko
2005/0168721 A1 8/2005 Huang
2005/0280802 A1 12/2005 Liu
2006/0164383 A1 7/2006 Machin et al.
2006/0247526 A1 11/2006 Lee et al.
2007/0030348 A1 2/2007 Snyder
2007/0052672 A1 3/2007 Ritter et al.
2007/0121096 A1 5/2007 Giger
2007/0167689 A1 7/2007 Ramadas et al.
2007/0182950 A1 8/2007 Arlinsky
2007/0195167 A1 8/2007 Ishiyama
2007/0214095 A1 9/2007 Adams et al.
2007/0241955 A1 10/2007 Brosche
2007/0256337 A1 11/2007 Segan
2007/0272464 A1 * 11/2007 Takae ................... B60W 50/14 180/169
2008/0088817 A1 4/2008 Skultety-Betz et al.
2008/0212831 A1 9/2008 Hope
2008/0258913 A1 10/2008 Busey
2008/0276472 A1 * 11/2008 Riskus ................ G01C 15/008 33/284
2009/0024759 A1 1/2009 McKibben et al.
2009/0062987 A1 3/2009 Kim et al.
2009/0079954 A1 3/2009 Smith
2009/0102940 A1 4/2009 Uchida
2009/0105986 A1 4/2009 Staab
2009/0212997 A1 8/2009 Michalski
2009/0296072 A1 12/2009 Kang
2010/0063685 A1 * 3/2010 Bullinger ............. B60R 21/013 701/45
2010/0104291 A1 4/2010 Ammann
2010/0110368 A1 5/2010 Chaum
2011/0047338 A1 * 2/2011 Stahlin ................... H04L 67/12 711/E12.001
2011/0149269 A1 6/2011 Van Esch
2011/0288816 A1 11/2011 Thierman
2012/0050144 A1 3/2012 Morlock
2012/0050668 A1 3/2012 Howell et al.
2012/0249768 A1 10/2012 Binder
2012/0274610 A1 11/2012 Dahl
2012/0278705 A1 11/2012 Yang et al.
2012/0293635 A1 11/2012 Sharma et al.
2013/0077081 A1 3/2013 Lin
2013/0154955 A1 6/2013 Guard
2013/0169513 A1 7/2013 Heinrich et al.
2013/0222638 A1 8/2013 Wheeler et al.
2013/0271744 A1 10/2013 Miller et al.
2013/0335559 A1 12/2013 Van Toorenburg et al.
2014/0016114 A1 1/2014 Lopez et al.
2014/0045547 A1 2/2014 Singamsetty et al.
2014/0070613 A1 3/2014 Garb et al.
2014/0104196 A1 4/2014 Haungs et al.
2014/0104591 A1 4/2014 Frischman et al.
2014/0111618 A1 4/2014 Kumagai
2014/0119655 A1 5/2014 Liu et al.
2014/0139667 A1 5/2014 Kang
2014/0140579 A1 5/2014 Takemoto
2014/0159877 A1 6/2014 Huang
2014/0184854 A1 7/2014 Musatenko
2014/0204059 A1 7/2014 Geaghan
2014/0226864 A1 8/2014 Venkatraman et al.
2014/0268097 A1 9/2014 Ko
2014/0277922 A1 9/2014 Chinnadurai et al.
2014/0300906 A1 10/2014 Becker et al.
2014/0362055 A1 12/2014 Altekar et al.
2014/0362446 A1 12/2014 Bickerstaff et al.
2015/0066439 A1 3/2015 Jones
2015/0070479 A1 * 3/2015 Yu ........................ G09B 21/001 348/62
2015/0097468 A1 4/2015 Hajati et al.
2015/0186903 A1 7/2015 Takahashi
2015/0249819 A1 9/2015 Jiang
2015/0277559 A1 10/2015 Vescovi et al.
2015/0303568 A1 10/2015 Yarga et al.
2015/0316374 A1 11/2015 Winter
2015/0341232 A1 11/2015 Hofleitner
2015/0341901 A1 11/2015 Ryu et al.
2015/0349556 A1 12/2015 Mercando et al.
2015/0362903 A1 12/2015 Ono
2015/0373443 A1 12/2015 Carroll
2016/0086391 A1 3/2016 Ricci
2016/0117927 A1 * 4/2016 Stefan .................. H04W 84/18 340/932.2
2016/0121902 A1 * 5/2016 Huntzicker ......... B60W 40/068 701/1
2016/0187120 A1 6/2016 Lin
2016/0357279 A1 12/2016 Choi et al.
2017/0057499 A1 * 3/2017 Kim ....................... B60Q 9/008
2017/0184721 A1 6/2017 Sun
2018/0335508 A1 11/2018 Lewis et al.
2018/0356525 A1 12/2018 Barbier
2019/0259048 A1 8/2019 Hendrick
2020/0013177 A1 1/2020 Panosian

FOREIGN PATENT DOCUMENTS

EP 2088453 A1 8/2009
EP 2652441 B1 10/2013
EP 2725459 A2 4/2014
GB 2424071 A 9/2006
GB 2534190 A 3/2015
JP 6128812 2/1986
JP 6109469 4/1994
WO 2004036246 4/2004
WO 2005029123 3/2005
WO 2012013914 2/2012
WO 2013132244 A1 9/2013
WO 2014199155 12/2014
WO 2015022700 2/2015
WO 2018023080 A2 2/2018
WO 2019059860 A2 3/2019

OTHER PUBLICATIONS

J. M. Rueger, "Electronic Distance Measurement—An Introduction", Springer-Verlag Berlin Heidelberg, Fourth Edition [ISBN-13: 978-3-540-61159-2] published 1996 (291 pages).
SAE International Surface Vehicle Standard J1979 entitled: "E/E Diagnostic Test Modes", Apr. 2002 (97 pages).
SAE J2411_200002 entitled: "Single Wire Can Network for Vehicle Applications", issued on Feb. 2000 (33 pages).
Product data sheet entitled: "TJA1044 High-speed CAN transceiver with Standby mode—Rev. 4—Jul. 10, 2015—Product data sheet", (document Identifier TJA1055, date of release: Dec. 6, 2013) (22 pages).
Product Data Sheet entitled: "TJA1055 Enhanced fault-tolerant CAN transceiver—Rev. 5—Dec. 6, 2013—Product data sheet", (document Identifier TJA1055, date of release: Dec. 6, 2013).
Application Note AN-1123 (AN10035-0-2/12(0) Rev. 0) entitled: "Controller Area Network (CAN) Implementation Guide—by Dr. Conal Watterson", Analog Devices, Inc., published 2012 (16 pages).
IETF RFC 5013, "The Dublin Core Metadata Element Set", Aug. 2007 (9 pages).
IETF RFC 2731, "Encoding Dublin Core Metadata in HTML", Dec. 1999 (22 pages).
Datasheet # SWRS158A entitled: "CC2650 SimpleLink™ Multistandard Wireless MCU", by Texas Instrument, published Feb. 2015, Revised Oct. 2015 (59 pages).
Book by Sun, H., "A Practical Guide to handling Laser Diode Beams", Chapter 2: "Laser Diode Beam Basics" of a Springer, 2015 (ISBN: 978-94-017-9782-5) (26 pages).

(56) References Cited

OTHER PUBLICATIONS

Voxtel, Inc. entitled: "VOXTELOPTO", 2015 catalog v.5 Rev. 06 (Aug. 2015) (64 pages).
Data Sheet Reference Code SMA06006 entitled: "GP2D150A Optoelectronic Device", by Sharp Corporation (dated 2006) (9 pages).
Brochure Code. No. 3CE-BPJH-6 (1501-13) V of Model Coolshot 40i, from Nikon Vision Co., Ltd. headquartered in Tokyo, Japan, dated Jan. 2015 (8 pages).
Texas Instrument 2015 publication # SWRT022 entitled: "SimpleLink™ Ultra-Low Power—Wireless Microcontroller Platform" (6 pages).
Erik Murphy-Chutorian and Mohan Trivedi, "Head Pose Estimation in Computer Vision: A Survey", IEEE Transaction on Pattern Analysis and Machine Intelligence published 2008 (Digital Object Identifier 10.1109/TPAMI.2008.106) (20 pages).
Xiangxin Zhu and Deva Ramanan of the University of California, Irvine, "Face detection, Pose Estimation, and Landmark Localization in the Wild" (8 pages).
Jian-Gang Wang, Eric Sung, and Ronda Venkateswarlu, all of Singapore, "Eye Gaze Estimation from a Single Image of One Eye", published in Proceedings of the Ninth IEEE International Conference on Computer Vision (ICCV 2003) (8 pages).
Dinh Quang Tri, Van Tan Thang, Nguyen Dinh Huy, and Doan the Thao of the University of Technology, HoChin Minh, Viet Nam, "Gaze Estimation with a Single Camera based on an ARM-based Embedded Linux Platform", published in the International Symposium on Mechatronics and Robotics (Dec. 10, 2013, HCMUT, Viet Nam) (5 pages).
Jia-Gang Wang and Eric Sung of the Nanyang Technological University, Singapore, "Gaze Detection via Images of Irises" (10 pages).
Jian-Gang Wang and Eric Sung of the School of Electrical and Electronic Engineering ,Nanyang Technological University, Singapore 639798, "Gaze Direction Determination" (3 pages).
Roberto Valenti and Theo Gevers, "Accurate Eye Center Location through Invariant Isocentric Patterns", published in IEEE Transaction on Pattern Analysis and Machine Intelligence (2011) (14 pages).
Data Sheet entitled: "Industrial Distance Meter FMCW 94/10/x at 94 GHZ", downloaded on Dec. 2014 (2 pages).
Ari Kilpela (of the Department of Electrical and Information Engineering, University of Oulu), "Pulsed time-of-flight laser range finder techniques for fast, high precision measurement applications", University of Oulu, Finland, published 2004 (ISBN 951-42-7261-7) (98 pages).
Pengcheng Hu et al., "Phase-shift laser range finder based on high speed and high precision phase-measuring techniques", published in the 10th International Symposium of Measurement Technology and Intelligent Instruments (Jun. 29-Jul. 2, 2011) (5 pages).
Shahram Mohammad Nejad and Kiazand Fasihi (both from Department of Electrical Engineering, Iran University of Science and Technology (IUST), Tehran, Iran), "A new design of laser phase-shift range finder independent of environmental conditions and thermal drift", Jan. 2016 (4 pages).
Data sheet Rev. D (D06052-0-9/15(D)), "Phase Detector/ frequency Synthesizer—ADF4002", 2015 (20 pages).
Data Sheet SPH0641LU4H-1 entitled: "Digital Zero-Height SiSonic™ Microphone With Multi-Mode and Ultrasonic Support", Revision A dated May 16, 2014 (15 pages).
Specification SPM0404UD5 entitled: ""Mini" SiSonic Ultrasonic Acoustic Sensor Specification", Revision A dated Jul. 20, 2009 (10 pages).
Data sheet Rev. A "LF-2.7GHZ—RF/IF Gain and Phase Detector—AD8302", Analog Devices, Inc. (headquartered in Norwood, MA, U.S.A.) 2002 (24 pages).
Robert Berdan, "Digital Photography Basics for Beginners", downloaded from www.canadianphotographer.com (12 pages).
Delvadiya Harikrushna et al., "Design, Implementation, and Charactrization of XOR Phase Detector for DPLL in 45 nm CMOS Technology", Advanced Computing: An International Journal (ACIJ), vol. 2, No. 6, Nov. 2011 (13 pages).
Joseph Ciaglia et al., "Absolute Beginner's Guide to Digital Photography", Que Publishing (ISBN-0-7897-3120-7), published on Apr. 2004 (381 pages).
Al Bovik, "Handbook of Image & Video Processing", by Academic Press, ISBN: 0-12-119790-5, 2000 (500 pages).
Application Note No. AN1928/D (Revision 0—Feb. 20, 2001), "Roadrunner—Modular digital still camera reference design", Freescale Semiconductor, Inc. (30 pages).
Robert Bosch GmbH, "Bosch Automotive Electric and Automotive Electronics" (5th Edition, Jul. 2007) [ISBN-978-3-658-01783-5] (530 pages).
Technical White Paper (0115/MW/HBD/PDF 331817-001US) by Meiyuan Zhao of Security & Privacy Research, Intel Labs entitled: "Advanced Driver Assistant System—Threats, Requirements, Security Solutions", Intel Corporation 2015 (36 pages).
PhD Thesis by Alexandre Dugarry, "Advanced Driver Assistance Systems—Information Management and Presentation", submitted on Jun. 2004 to the Cranfield University, School of Engineering, Applied Mathematics and Computing Group (124 pages).
SAE J1939 Surface Vehicle Recommended Practice entitled: "Recommended Practice for a Serial Control and Communication Vehicle Network", issued on Apr. 2000 (257 pages).
SAE J1939-01 Surface Vehicle Standard entitled: "Recommended Practice for Control and Communication Network for On-Highway Equipment", Sep. 2000 (7 pages).
SAE J1939-11 Surface Vehicle Recommended Practice entitled: "Physical Layer, 250K bits/s, Twisted Shielded Pair", Issued on Dec. 1994 (31 pages).
SAE J1939-15 Surface Vehicle Recommended Practice entitled: "Reduced Physical Layer, 250K bits/s, Un-Shielded Twisted Pair (UTP)", issued on Nov. 2003 (19 pages).
SAE J1939-21 Surface Vehicle Recommended Practice entitled: "Data Link Layer", Jul. 1994 (47 pages).
SAE J1939-31 Surface Vehicle Recommended Practice entitled: "Network Layer", Dec. 1994 (27 pages).
SAE J1939-71 Surface Vehicle Recommended Practice entitled: "Vehicle Application Layer (through Dec. 2004)", Aug. 1994 (686 pages).
SAE J1939-73 Surface Vehicle Recommended Practice entitled: "Application Layer—Diagnostics", Feb. 1996 (158 pages).
SAE J1939-74 Surface Vehicle Recommended Practice entitled: "Application—Configurable Messaging", Sep. 2004 (36 pages).
SAE J1939-75 Surface Vehicle Recommended Practice entitled: "Application Layer—Generator Sets and Industrial", Dec. 2002 (37 pages).
SAE J1939-81 Surface Vehicle Recommended Practice entitled: "Network Management", Jul. 1997 (39 pages).
Fabian Timm and Erhardt Barth, "Accurate Eye Localisation by Means of Gradients", 2011 (6 pages).
Rohit, P. Gaur, Krupa, and N. Jariwala, "A Survey on Methods and Models of Eye Tracking, Head Pose and Gaze Estimation", International Journal of Scientific Development and Research (IJSDR) [IJSDR16JE03008], Mar. 2016 [ISSN: 2455-2631] (9 pages).
Chapter 20: "Wireless Technologies" of the publication No. 1-587005-001-3 by Cisco Systems, Inc. (Jul. 1999) "Internetworking Technologies Handbook" (42 pages).
Book published 2005 by Pearson Education, Inc. William Stallings [ISBN: 0-13-191835-4] "Wireless Communications and Networks—second Edition" (569 pages).
Telecom Regulatory Authority, "WiFi Technology", published on Jul. 2003 (60 pages).
Bluetooth SIG published Dec. 2, 2014 standard Covered Core Package version: 4.2, "Master Table of Contents & Compliance Requirements—Specification vol. 0" (2772 pages).
Carles Gomez et al., "Overview and Evaluation of Bluetooth Low Energy: An Emerging Low-Power Wireless Technology", published 2012 in Sensors [ISSN 1424-8220] [Sensors 2012, 12, 11734-11753; doi:10.3390/s120211734] (20 pages).

(56) References Cited

OTHER PUBLICATIONS

ECMA International white paper Ecma/TC32-TG19/2005/012 "Near Field Communication—White paper" (12 pages).
Jan Kremer Consulting Services (JKCS) white paper "NFC—Near Field Communication—White paper" 2014 (44 pages).
Rohde&Schwarz White Paper 1MA182_4e "Near Field Communication (NFC) Technology and Measurements White Paper", 2014 (26 pages).
ISO/IEC 18092 or ECMA-340 entitled: "Near Field Communication Interface and Protocol-1 (NFCIP-1)", 3rd Edition, Jun. 2013 (52 pages).
ISO/IEC 21481 or ECMA-352 standards entitled: "Near Field Communication Interface and Protocol-2 (NFCIP-2)", 3rd Edition, Jun. 2013 (12 pages).
Book by Wikipedia entitled: "Electronics" downloaded from en.wikibooks.org dated Mar. 15, 2015 (401 pages).
Book authored by Owen Bishop entitled: "Electronics—Circuits and Systems" Fourth Edition, published 2011 by Elsevier Ltd. [ISBN-978-0-08-096634-2] (381 pages).
Data sheet "±15kV ESD-Protected, 3.3V Quad RS-422 Transmitters" publication No. 19-2671 Rev.0 Oct. 2002 (12 pages).
Data Sheet "±15kV ESD-Protected, 10Mbps, 3V/5V, Quad RS-422/RS-485 Receivers" publication No. 19-0498 Rev.1 Oct. 2000 (14 pages).
National Semiconductor Application Note 1031 publication AN012598 dated Jan. 2000, titled: "TIA/EIA-422-B Overview" (7 pages).
B&B Electronics publication "RS-422 and RS-485 Application Note" dated Jun. 2006 (43 pages).
Data Sheet "±15kV ESD-Protected, +5V RS-232 Transceivers" publication No. 19-0175 Rev.6 Mar. 2005 (25 pages).
National Semiconductor Application Note 1057 publication AN012882 dated Oct. 1996 and titled: "Ten ways to Bulletproof RS-485 Interfaces" (10 pages).
Data Sheet "Fail-Safe, High-Speed (10Mbps), Slew-Rate-Limited RS-485/RS-422 Transceivers" publication No. 19-1138 Rev.3 Dec. 2005 (20 pages).
NXP Semiconductors N.V. user manual document No. UM10204 Rev. 6 released Apr. 4, 2014, entitled: "UM10204—$I^2C$-bus specification and user manual" (64 pages).
Renesas Application Note AN0303011/Rev1.00 (Sep. 2003) entitled: "Serial Peripheral Interface (SPI) & Inter-IC (IC2) (SPI_I2C)" (14 pages).
CES 466 presentation (downloaded Jul. 2015) entitled: "Serial Peripheral Interface" (29 pages).
Embedded Systems and Systems Software 55:036 presentation (downloaded Jul. 2015) entitled: "Serial Interconnect Buses—I2C (SMB) and SPI" (7 pages).
Microchip presentation (downloaded Jul. 2015) entitled: "SPI™—Overview and Use of the PICmicro Serial Peripheral Interface" (46 pages).
iPhone 6 technical specification (retrieved Oct. 2015 from www.apple.com/iphone-6/specs/), (32 pages).
User Guide, "iPhone User Guide for iOS 8.4 Software", dated 2015 (019-00155/2015-06) by Apple Inc. (196 pages).
User manual numbered English (EU), "SM-G925F SM-G925FQ SM-G925I User Manual" Mar. 2015 (Rev. 1.0) (145 pages).
Galaxy S6 Edge—Technical Specification (retrieved Oct. 2015 from www.samsung.com/us/explore/galaxy-s-6-features-and-specs) (1 page).
Publication entitled: "Android Tutorial", downloaded from tutorialspoint.com on Jul. 2014 (216 pages).
ICS 16 entitled: "Industrial Control and Systems—Motion/Position Control Motors, Controls, and Feedback Devices", published 2001 (187 pages).
Superior Electric—Danaher Motion Gmbh & Co. KG, "Step Motors", catalog published 2003 (SP-20,000-Aug. 2003, SUP-01-01-S100) (36 pages).
Schneider Electric Motion USA, "Stepper Motors—1.8° 2-phase stepper motors", 2012 catalog REV060512 (7 pages).
Nippon Pulse Motor Co., Ltd. (NPM) publication entitled: "Basic of servomotor control" (downloaded Aug. 2016) (14 pages).
Kinavo Servo Motor (Changzhou) Limited Product Manual entitled: "SMH Servo Motor—Product Manual", (downloaded Aug. 2016) (30 pages).
Moog Inc. catalog entitled: "Compact Dynamic Brushless Servo Motors—CD Series", (PIM/Rev. A May 2014, id. CDL40873-en) (63 pages).
The manual "80186/80188 High-Integration 16-Bit Microprocessors" by Intel Corporation, 1995 (34 pages).
The manual "MC68360 Quad Integrated Communications Controller—User's Manual" by Motorola, Inc. (962 pages).
Data sheet [DS-TM4C123GH6PM-15842.2741, SPMS376E, Revision 15842.2741 Jun. 2014], "Tiva™ TM4C123GH6PM Microcontroller—Data Sheet", published 2015 by Texas Instruments Incorporated (1409 pages).
Application Note entitled: "Range Finding Using Pulse Lasers", OSRAM Opto Semiconductors Gmbh (of Regensburg, Germany) dated Sep. 10, 2004 (7 pages).
Analog Devices, Inc. 2009 publication MT-088 Tutorial (Rev. 0, Oct. 2008, WK) entitled: "Analog Switches and Multiplexers Basics" (23 pages).
Ioannis Sarkas, "Circuit and System Design for MM-Wave Radio and Radar Applications", Thesis submitted to the University of Toronto, 2013 (234 pages).
Application Note "FMCW Radar Sensors—Application Notes", by Sivers IMA AB Rev. A 2011-06-2011 (44 pages).
T. Yamawaki et al., "Millimeter-Wave Obstacle detection Radar", Fujitsu paper (Fujitsu Ten Tech. M. No. 15 (2000) (13 pages).
Dipl. Ing. Michael Klotz, "An Automotive Short Range High Resolution Pulse Radar Network", dated Jan. 2002 (139 pages).
Application Note No. 1, "Laser distance measurement with TDC's", Acam-messelectronic GMBH (of Stutensee-Blankenloch, Germany) (downloaded Jan. 2016) (4 pages).
Data Sheet DocID022930 Rev. 6 entitled: "SPBT2632C1A—Bluetooth® technology class-1 module", dated Apr. 2015 (27 pages).
Agilent Technologies Application Note 90B, "DC Power Supply Handbook", dated Oct. 1, 2000 (5925-4020) (126 pages).
Application Note 1554, "Understanding Linear Power Supply Operation", dated Feb. 4, 2005 (5989-2291EN) (8 pages).
ISO 11898-2:2003 entitled: "Road vehicles—Controller area network (CAN)—Part 2: High-speed medium access unit" (26 pages).
ISO 11898-5:2007 entitled: "Road vehicles—Controller area network (CAN)—Part 5: High-speed medium access unit with low-power mode" (28 pages).
ISO 11898-4:2004 entitled: "Road vehicles—Controller area network (CAN)—Part 4: Time-triggered communication" (40 pages).
ISO 15765-3 standard entitled: "Road vehicles—Diagnostics on Controller Area Networks (CAN)", Oct. 15, 2004 (100 pages).
Texas Instrument Application Report No. SLOA101A entitled: "Introduction to the Controller Area Network (CAN)" (15 pages).
ISO 17356-1 standard entitled: "Part 1: General structure and terms, definitions and abbreviated terms", (First edition, Jan. 15, 2005) (26 pages).
ISO 17356-2 standard entitled: "Part 2: OSEK/VDX specifications for binding OS, COM and NM", (First edition, May 1, 2005) (8 pages).
ISO 17356-3 standard entitled: "Part 3: OSEK/VDX Operating System (OS)", (First edition, Nov. 1, 2005) (7 pages).
ISO 17356-4 standard entitled: "Part 4: OSEK/VDX Communication (COM)", (First edition, Nov. 1, 2005) (64 pages).
The standard ISO 11992-1:2003 entitled: "Road vehicles—Interchange of digital information on electrical connections between towing and towed vehicles—Part 1: Physical and data-link layer" (28 pages).
ISO 11783-2:2012 entitled: "Tractors and machinery for agriculture and forestry—Serial control and communications data network—Part 2: Physical layer" (56 pages).
A specification entitled: "CAN with Flexible Data-Rate", by Robert Bosch GmbH, Version 1.0, released on Apr. 17, 2012 (34 pages).
Automation article by Florian Hatwich entitled: "Bit Time Requirements for CAN FD" (6 pages).

(56) References Cited

OTHER PUBLICATIONS

Automation article by Florian Hatwich entitled: "Can with Flexible Data-Rate" (9 pages).
National Instruments article entitled: "Understanding CAN with Flexible Data-Rate (CAN FD)", published Aug. 1, 2014 (2 pages).
Application Note AN4389 (document No. DocD025493 Rev 2) entitled: "SPC57472/SPC57EM80 Getting Started", published 2014 (53 pages).
Data Sheet DS20005284A entitled: "MCP2561/2FD—High-Speed CAN Flexible Data Rate Transceiver", published 2014 [ISBN-978-1-63276-020-3] (32 pages).
Data-Sheet Document No. MC33689 Rev. 8.0 entitled: "System Basis Chip with LIN Transceiver", dated Sep. 2012 (31 pages).
Franzis Verlag Gmbh, edited by Prof. Dr. Ing. Andreas Grzemba, entitled: "MOST—The Automotive Multimedia Network—From MOST25 to MOST 150", [ISBN-978-3-645-65061-8] published 2011 (337 pages).
MOST Dynamic Specification by MOST Cooperation Rev. 3.0.2 entitled: "MOST—Multimedia and Control Networking Technology", dated Oct. 2012 (82 pages).
MOST Specification Rev. 3.0 E2 by MOST Cooperation, dated Jul. 2010 (262 pages).
Data Sheet DS00001935A OS81118 entitled: "MOST150 INIC with USB 2.0 Device Port", Microchip Technology Incorporated, published 2015 (2 pages).
Data Sheet PFL_OS8104A_V01_00_XX-4.fm entitled: "MOST Network Interface Controller", by Microchip Technology Incorporated, published Aug. 2007 (2 pages).
FlexRay consortium publication entitled: "FlexRay Communications System—Protocol Specification—Version 3.0.1", Oct. 2010 (341 pages).
Lorenz, Steffen entitled: "The FlexRay Electrical Physical Layer Evolution", Carl Hanser Verlag Gmbh 2010 publication (Automotive 2010) (6 pages).
National Instruments Corporation Technical Overview Publication entitled: "FlexRay Automotive Communication Bus Overview", Aug. 21, 2009 (8 pages).
Product data sheet entitled: "TJA1080A FlexRay Transceiver—Rev. 6—Nov. 28, 2012—Product data sheet", (ocument Identifier TJA1080A, date of release: Nov. 28, 2012 (49 pages).
ISO 14230-1:2012 entitled: "Road vehicles—Diagnostic communication over K-Line (DoK-Line)—Part 1: Physical layer" (12 pages).
ISO 14230-2:2013 entitled: "Road vehicles—Diagnostic communication over K-Line (DoK-Line)—Part 2: Data link layer" (28 pages).
Presentation entitled: "Introduction to on Board Diagnostics (II)" downloaded on Nov. 2012 from: http://groups.engin.umd.umich.edu/vi/w2_workshops/OBD_ganesan_w2.pdf (148 pages).
ISO 14230-4:2000 entitled: "Road vehicles—Diagnostic systems—Keyword Protocol 2000—Part 4: Requirements for emission-related systems" (10 pages).
ISO 9141 "LIN Specification Package—Revision 2.2A" by the LIN Consortium (dated Dec. 31, 2010) (194 pages).
National Information Standards Organization (NISO) Booklet entitled: "Understanding Metadata" (ISBN: 1-880124-62-9) (49 pages).
Texas Instruments Incorporated SLYB125D entitled: "Analog Switch Guide", 2012 publication (37 pages).
Product data sheet Rev. 8—3 entitled: "74HC4066; 74HCT4066—Quad single-Pole single-throw analog switch", Dec. 2015 (24 pages).
Guide Texas Instruments Incorporated SCDB006A entitled: "Digital Bus Switch Selection Guide", 2004 publication (24 pages).
Product data sheet Rev. 7—21entitled: "74HC157; 74HCT157—Quad 2-input multiplexer", Jan. 2015 (19 pages).
Data Sheet Document No. MPC5748G Rev. 2 entitled: "MPC5748 Microcontroller Datasheet", Freescale Semiconductor, Inc. (headquartered in Tokyo, Japan) May 2014 (67 pages).
International Search Report of PCT/IL2017/050220 dated Aug. 17, 2017.
Written Opinion of ISA/US in PCT/IL2017/050220 dated Aug. 17, 2017.
Moses Okechukwu Onyesolu and Felista Udoka Eze, "Understanding Virtual Reality Technology: Advances and Applications", the Federal University of Technology, Owerri, Imo State, Nigeria, published 2011 (19 pages).
Sensor-Technik Wiedemann Gmbh (headquartered in Kaufbeuren, Germany) entitled "Control System Electronics", dated Mar. 4, 2011 (20 pages).
James Walker of Michigan Technological University entitled: "Everyday Virtual Reality", Feb. 27, 2015 (22 pages).
Analog Devices, Inc. Data Sheet AD9901 Rev. B (C1272b-0-1/99) entitled: "Ultrahigh Speed Phase/Frequency Discriminator", dated 1999 (8 pages).
On Semiconductor® Reference Manual Rev. 4 "Switch-Mode Power Supply", dated Apr. 2014 (SMPSRM/D) (73 pages).
IXYS Integrated Circuits Division specification DS-CPC1965Y-R07, "CPC1965Y AC Solid State Relay" (6 pages).
Data sheet "BTA06 T/D/S/A BTB06 T/D/S/A—Sensitive Gate Triacs" published by SGS-Thomson Microelectronics Mar. 1995 (6 pages).
Product Specifications from Philips Semiconductors "TrenchMOS™ transistor Standard level FET BUK7524-55" Rev 1.000 dated Jan. 1997 (9 pages).
Mark Tatham and Katherine Morton, "Development in Speech Synthesis", published 2005 by John Wiley & Sons Ltd., ISBN: 0-470-85538-X (357 pages).
John Holmes and Wendy Holmes, "Speech Synthesis and Recognition", 2nd Edition, published 2001 ISBN: 0-7484-0856-8 (317 pages).
YMF721 OPL4-ML2 FM + Wavetable Synthesizer LSI available from Yamaha Corporation described in YMF721 Catalog No. LSI-4MF721A20, Jul. 10, 1997 (41 pages).
Rajan P. Thomas et al., "Range Detection based on Ultrasonic Principle", Electrical, Electronics and Instrumentation Engineering (IJAREEIE) vol. 3, Issue 2, Feb. 2014 (ISSN: 2320-3765) (5 pages).
Siciliano B. and Khatib, O. (Editors), Chapter 21: "Sonar Sensing" of the book "Springer Handbook of Robotics", published 2008 by Springer (ISBN: 978-3-540-23957-4) (31 pages).
Data Sheet entitled: "Lightbulb Type LED Lamps" (dated May 9, 2011) (2 pages).
Datasheet Form No. EBC—4407cp-Z (downloaded from the Internet Mar. 2016) entitled: "Energizer A76—ZEROMERCURY Miniature Alkaline" (1 page).
Datasheet Form No. EBC—4120M (downloaded from the Internet Mar. 2016) entitled: "Energizer CR2032—Lithium Coin" (2 pages).
Data sheet "General Purpose Timers" publication No. 19-0481 Rev.2 Nov. 1992 (8 pages).
Application Note AN170 "NE555 and NE556 Applications" from Philips semiconductors dated Dec. 1988 (19 pages).
Specifications entitled: "3W 120V AC 36mm Round LED Module—AC LED Technology by Lynk Labs", Thomas Research Product, Rev 4-9-15 (6 pages).
Data sheet Rev. 1.00 dated Nov. 2, 2006, on Epson 7910 series 'Multi-Melody IC' available from Seiko-Epson Corporation, Electronic Devices Marketing Division located in Tokyo, Japan (4 pages).
Natural Speech & Complex Sound Synthesizer, User's Manual Revision 1.0 Jul. 27, 2004 (17 pages).
Data Sheet entitled: "110V or 230V LED Strip light", PlanetSaver (downloaded May 2015) (1 page).
Data sheet "Natural Language Processor with Motor, Sensor and Display Control", P/N 80-0317-K, published 2010 by Sensory, Inc. of Santa-Clara, California, U.S.A (164 pages).
OPTi 82C931 'Plug and Play Integrated Audio Controller', described in Data Book 912-3000-035 Revision: 2.1, published on Aug. 1, 1997 (64 pages).
Application Note (May 2012, 3361276C_EN), "101 applications for laser distance meters", by Fluke Corporation (4 pages).
Handbook "Data Acquisition Handbook—A Reference for DAQ and Analog & Digital Signal Conditioning", Measurement Computing Corporation, published 2004-2012 (145 pages).

(56) References Cited

OTHER PUBLICATIONS

Book entitled: "Practical Design Techniques for Sensor Signal Conditioning", by Analog Devices, Inc., 1999 ISBN-0-916550-20-6) (366 pages).
Shahram Mohammad Nejad and Saeed Olyaee, "Comparison of TOF, FMCW and Phase-Shift Laser Range-Finding Methods by Simulation and Measurement", published in the Quarterly Journal of Technology & Education vol. 1, No. 1, Autumn 2006 (2 pages).
Application Note AN98035, "Circulators and Isolators, unique passive devices", Philips Semiconductors N.V., released Mar. 23, 1998 (35 pages).
White-paper entitled: "Design and Test of fast Laser Driver Circuits", iC-Haus GmBH Aug. 2012 (10 pages).
Markus-Christian Amann et al., "Laser ranging: a critical review of usual techniques for distance measurements", Photo-Optical Instrumentation Engineers paper (Opt. Eng. 40(1) 10-19 (Jan. 2001), 0091-3286/2001) (10 pages).
Marvin J. Weber, "Handbook of Laser Wavelengths", Lawrence Berkeley National Laboratory published 1999 by CRC Press LLC (ISBN: 0-8493-3508-6) (771 pages).
Robert Lange, "3D Time-of-flight Measurement with Custom Solid-State Image Sensors in CMOS/CCD-Technology", Department of Electrical Engineering and Computer Science at University of Siegen, Jun. 28, 2000 (223 pages).
Data Sheet numbered 243003_eng.XML, distance sensor P/N VDM28-15-L/73c/136 available from PEPPERL+FUCHS Group headquartered in Germany, issued Oct. 16, 2017 (4 pages).
Garry Berkovic and Ehud Shafir, "Optical methods for distance and displacement measurements", published in Advances in Optics and Photonics 4, 441-471 (2012) doi:AOP.4.000441 (31 pages).
Jain Siddharth, "A survey of Laser Range Finding", Dec. 2, 2003 (14 pages).
Guide entitled: "Operating/Safety Instructions—GLR225", Robert Bosch Tool Corporation (24 pages).
Guide entitled: "Operating/Safety Instructions—DLR130", Robert Bosch Tool Corporation (2609140584 Feb. 2009) 2009 (36 pages).
Egismos Technology Corporation document No. EG-QS-T-PM-ST-0001 "Laser Range Finder—LDK Model 2 Series", (dated Apr. 23, 2015) (8 pages).
Egismos Technology Corporation form No. DAT-LRM-05, "Laser Range Finder RS232 EV-kit", (dated Jun. 21, 2014) (8 pages).
Application note AN16, "SiSonic Design Guide", Knowles Acoustics, Revision 1.0 dated Apr. 20, 2006 (29 pages).
PEPPERL+FUCHS Group guide Part No. 255933 , "Technology Guide Ultrasonic", dated (Oct. 2015) (70 pages).
Cytron Technologies user manual, "Product User's Manual—HC-SR04 Ultrasonic Sensor", (10 pages).
Md. Shamsul Arefin and Tajrian Mollick, "Design of an Ultrasonic Distance Meter", an International Journal of Scientific & Engineering Research vol. 4, Issue 3, Mar. 2013 (ISSN 2229-5518) (10 pages).
Murugavel Raju, "Ultrasonic Distance Measurements With the MSP430", Texas Instruments Incorporated Application Report (SLAA136A—Oct. 2001) (18 pages).
User Guide, "Ultrasonic Distance Finder" (Model DT100-EU-EN V4.2 Jun. 2009), Extech Instruments Corporation (a FLIR Company) 2006 (8 pages).
Data-sheet (PD11721h), "HRLV-MaxSonar®-EZ™ Series—High Resolution, Precision, Low Voltage Ultrasonic Range Finder MB1003, MB1013, MB1023, MB1033, MB1043", MaxBotix® Incorporated 2014 (15 pages).
Application Note No. AN4841, "S12ZVL LIN Enabled Ultrasonic Distance Measurement—Based on the MC9S12ZVL32 MagniV Device", Rev. 1.0, Mar. 2014 by Freescale Semiconductor, Inc. (26 pages).
Stephen Azevedo and Thomas E. McEwan, "Micropower Impulse Radar", Science & Technology Review Jan./Feb. 1996 (7 pages).
Xubo Wang, Anh Dinh and Daniel Teng, Chapter 3: "Radar Sensing Using Ultra Wideband—Design and Implementation", InTech 2012 (24 pages).
Dr.-Ing. Detlef Brumbi, "Fundamentals of Radar Technology for Level Gauging, 4th Edition", Krohne Messtechnik Gmbh & Co. KG Jul. 2003 publication (7.02337.22.00) (65 pages).
Zhao Zeng-rong and Bai Ran, "A FMCW Radar Distance Measure System based on LabVIEW", published in Journal of Computers, vol. 6, No. 4, Apr. 2011 (8 pages).
Michael Klotz and Hermann Rohling, "24 GHz radar sensor for automotive applications", published Apr. 2001 in the Journal of telecommunications and Information Technology (4 pages).
T. Yamawaki et al., "60-GHz Millimeter-Wave Automotive Radar", Fujitsu paper (Fujitsu Ten Tech. J. No. 1 (1998)) (12 pages).
Steven M. LaValle of the University of Illinois entitled: "Virtual Reality", dated Jul. 6, 2016 (187 pages).
OSEK/VDX NM Concept & API 2.5.2 entitled: "Open Systems and the Corresponding Interfaces for Automotive Electronics—Network Management—Concept and Application Programming Interface", Version 2.5.3, Jul. 26, 2004 (139 pages).
Vineet P. Aras of the Department of Electrical Engineering, Indian Institute of Technology Bombay, "Design of Electronic Control Unit (ECU) for Automobiles—Electronic Engine Management system", M. Tech. Project first stage report (EE696) dated Jul. 2004 (51 pages).
K. Imou et al., "Ultrasonic Doppler Sensor for Measuring Vehicle Speed in Forward and Reverse Motions Including Low Speed Motions", Agricultural Engineering International: the CIGR Journal of Science Research and Development (Manuscript PM 01 007. vol. III), downloaded Jan. 2016 (14 pages).
Application Note AN2047 Revision A by Victor Kremin entitled: "Ultrasound Motion Sensor", Cypress MicroSystems. Inc., Oct. 3, 2002 (17 pages).
Jurgen Czarske, Lars Buttner, and Thorsten Pfister, "Optical Metrology—Laser Doppler distance sensor and its applications", Photonik international online (Mar. 2009) (4 pages).
Application Note AN341 entitled: "BGT24MTR11—Using BGT24MTR11 in Low Power Applications—24 GHz Radar", (Rev. 1.0 Dec. 2, 2013) Infineon Technologies AG (out of Munich, Germany) (25 pages).
Application Note 5991-7575EN entitled: "Agilent Radar Measurements", Agilent Technologies, Inc. (published Mar. 25, 2014) (75 pages).
Data sheet entitled: "HB 100 Microwave Sensor Module—10. 525GHz Microwave Motion Sensor Module", by ST Electronics (Satcom & Sensor System) Pte Ltd Ver. 1.02 (downloaded Jan. 2016) (2 pages).
Application Note V1.02 entitled: "MSAN-001 X-Band Microwave Motion Sensor Module", by ST Electronics (Satcom & Sensor System) Pte Ltd (downloaded Jan. 2016) (7 pages).
D.W.F. van Krevelen and R. Poelman, "A Survey of Augmented Reality—Technologies, Applications and Limitations", The International Journal of Virtual Reality, 2010, 9(2):1-20, published in a book by Dr. Matthias Schmidt (Ed.) published in Advances and Applications, Advances in Computer Science and Engineering, [ISBN: 978-953-307-173-2] by InTech,(19 paes).
AUTOSAR consortium entitled: "Release 4.2 Overview and Revision History", Release 4.2.2 released Jan. 31, 2015 (47 pages).
National Instruments paper entitled: "ECU Designing and Testing using National Instruments Products", published Nov. 7, 2009 (9 pages).
Ning-Ning Zhou and Yu-Long Deng, "Virtual Reality: A State-of-the-Art Survey", International Journal of Automation and Computing 6(4), Nov. 2009, 319-325 [DOI: 10.1007/s11633-009-0319-9] (7 pages).

* cited by examiner $$dv = v2 * \Delta t$$

$$df^2 = dv^2 + dav^2 - 2*df*dv*\sin(\varepsilon)$$

$$\sin(\varphi) = dv * \cos(\varepsilon) / df$$

$$\Delta t = df * \sin(\varphi) / (v2 * \cos(\varepsilon))$$

$$dv = 2*df^2*\sin^2(\varepsilon)+sq(df^2*(1+\sin^2(\varepsilon))-dav^2)$$

$$dv = dav*\sin(\varphi) / \cos(\varphi-\varepsilon)$$

$$\text{(I)}\ tg(\alpha) = (d2m*\cos(\rho2) - d1) / (c - d2m*\sin(\rho2))$$

$$\text{(II)}\ d2 = d2m*(\cos(\rho2) + \sin(\rho2)*tg(\alpha))$$

290b

METHOD AND APPARATUS FOR COOPERATIVE USAGE OF MULTIPLE DISTANCE METERS

RELATED APPLICATIONS

This patent application is a continuation application of U.S. patent application Ser. No. 16/081,901 filed on Sep. 1, 2018, which is a national phase of PCT Application No. PCT/IL2017/050220 filed on Feb. 22, 2017 which claims the benefit of U.S. Provisional Application Ser. No. 62/303,388 that was filed on Mar. 4, 2016, and U.S. Provisional Application Ser. No. 62/373,388 that was filed on Aug. 11, 2016, which are all incorporated herein by reference.

TECHNICAL FIELD

This disclosure relates generally to an apparatus and method for accurately measuring distances, areas, volumes, and tilt-angles, and in particular to using multiple distance meters in-cooperation, such as by using parallel distance measurements.

BACKGROUND

Unless otherwise indicated herein, the materials described in this section are not prior art to the claims in this application and are not admitted to be prior art by inclusion in this section.

In many trades and industries there is a need for fast and accurate non-contact distance measuring tool. For example, in the construction industry and trades, distance meters (also known as range-finders) are commonly used for many applications as a substitute to the old-fashioned contact-based tape measure, providing speed, accuracy, versatility, convenience, and functionality. Laser distance-measuring devices are widely used in a variety of applications, such as power engineering, hydraulic engineering, architecture, geographic investigation, and athletic ranging, for measuring distance between two stationary objects. By way of example, measurement of wall length is a common requirement for real estate agents, carpenters, carpet layers, painters, architects, interior decorators, builders and others who need to know interior wall dimensions in their respective professions.

Distance meters are described in a book authored by J. M. Rueger and Fourth Edition [ISBN-13: 978-3-540-61159-2] published 1996 by Springer-Verlag Berlin Heidelberg, entitled: "Electronic Distance Measurement—An Introduction", which is incorporated in its entirety for all purposes as if fully set forth herein. Various applications of distance meters are described in Application Note by Fluke Corporation (5/2012, 3361276C_EN) entitled: "101 *applications for laser distance meters*", which is incorporated in its entirety for all purposes as if fully set forth herein. Other applications include surveying and navigation, to permit focus in photography, choosing a golf club according to distance, and correcting aim of a projectile weapon for distance. A device that measure distance from the observer to a target is commonly referred to as a rangefinder (or 'range finder'). Distance measuring devices may use active methods to measure (such as ultrasonic ranging module, laser rangefinder, radar distance measurement), while others measure distance using trigonometry (stadiametric rangefinders and parallax, or coincidence, rangefinders). In a typical use of a rangefinder for golf, one will aim the reticle at the flagstick and press a button to get the yardage. Users of firearms use long distance rangefinders to measure the distance to a target in order to allow for projectile drop. Rangefinders are also used for surveying in forestry, where special devices with anti-leaf filters are used.

A typical block diagram 10 of a non-contact active distance meter 15 is schematically shown in FIG. 1. The general distance meter 15 transmits an over-the-air propagating signal, which may be an electromagnetic wave (such as microwave, radar, or millimeter wave), a visible or non-visible (such as infrared or ultraviolet) light beam, or acoustic wave, such as audible or non-audible sound. The wave is emitted by the emitter 11 and is propagating over the air, schematically shown as a dashed line 16*a*, and upon hitting on a surface A 18, is backscattered or reflected back (for example, by using an appropriate reflector) from a point 9 (or small area), schematically shown as a dashed line 16*b*, and detected or sensed by the sensor 13. The reflected beam 16*b* at the location or point 9 may be a result of a diffused (or omnidirectional) reflection of the incident beam 16*a*, a result of a reflection in an angle that is equal to the angle of incidence (mirror-like reflection) as shown in the arrangement 10, or may be a result of a retroreflection where the beam 16*b* is reflected (or backscattered) in the same direction from which the incident beam 16*a* came. The transmitter or driver 12 drives the emitter 11, and the sensor 13 output signal is processed or manipulated by the receiver 14. A correlator 19 stimulates the driver 12 and controls the transmitted wave by the emitter 11, and receives the receiver 14 output indicating the intercepted wave by the sensor 13. By correlating the received signal to the transmitted signal, the correlator 19 may estimate, measure, or calculate the distance from the emitter 11/sensor 13 set to the surface A 18, and the estimated distance is provided to the output block 17 for signaling the distance to a user or for sending the reading to another unit.

Any element designed for, or capable of directly or indirectly affecting, changing, producing, or creating a propagating phenomenon, such as propagating waves (over the air, liquid, or solid material) or any other physical phenomenon under an electric signal control may be used as the emitter 11. Typically, a sensor 13 may be used to sense, detect, or measure the phenomenon affected, or propagated, by the emitter 11. The emitter 11 may affect the amount of a property, or of a physical quantity or the magnitude relating to a physical phenomenon, body or substance. Alternatively or in addition, emitter 11 may be used to affect the time derivative thereof, such as the rate of change of the amount, the quantity, or the magnitude. In the case of space related quantity or magnitude, an actuator may affect the linear density, surface density, or volume density, relating to the amount of property per volume. Alternatively or in addition, emitter 11 may affect the flux (or flow) of a property through a cross-section or surface boundary, the flux density, or the current. In the case of a scalar field, emitter 11 may affect the quantity gradient. The emitter 11 may affect the amount of property per unit mass or per mole of substance. A single emitter 11 may be used to measure two or more phenomena.

The emitter 11 input signal, the sensor 13 output signal, or both may be conditioned by a signal conditioning circuit. The signal conditioner may involve time, frequency, or magnitude related manipulations, typically adapted to optimally operate, activate, or interface the emitter 11 or the sensor 13. A signal conditioner 6 may be used for conditioning the signal driving or controlling the emitter 11, and a signal conditioner 6' may be used for conditioning the signal received from the sensor 13, as part of a distance meter 15' shown in an arrangement 10*a* in FIG. 1*a*. The driver (or transmitter) 12 may be used in addition to, or as part of, signal conditioner 6, and the receiver (or amplifier) 14 may be used in addition to, or as part of, signal conditioner 6'. The signal conditioner 6 or 6' (or both) may be linear or non-linear, and may include an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a decompressor, a coder (or decoder), a modulator (or demodulator), a pattern recognizer, a smoother, a noise remover, an average or RMS circuit, or any combination thereof. In the case of analog sensor 13, an Analog-to-Digital (A/D) converter may be used to convert the conditioned sensor output signal to a digital sensor data. In the case of analog emitter 11, a Digital-to-Analog (D/A) converter may be used to convert the conditioned sensor output signal to a digital sensor data. The signal conditioner 6 or 6' may include a computer for controlling and managing the unit operation, processing the sensor 13 data or the emitter 11 driving data.

The signal conditioner 6 or 6' (or both) may use any one of the schemes, components, circuits, interfaces, or manipulations described in an handbook published 2004-2012 by Measurement Computing Corporation entitled: "*Data Acquisition Handbook—A Reference For DAQ And Analog & Digital Signal Conditioning*", which is incorporated in its entirety for all purposes as if fully set forth herein. Further, the conditioning may be based on the book entitled: "*Practical Design Techniques for Sensor Signal Conditioning*", by Analog Devices, Inc., 1999 (ISBN-0-916550-20-6), which is incorporated in its entirety for all purposes as if fully set forth herein.

The correlator 19 is typically implemented using one of four predominant methods for active distance measurement: interferometric, triangulation, pulsed time-of-flight (TOF), and phase measuring. Interferometric methods may result in accuracies of less than one micrometer over ranges of up to several millimeters, while triangulation techniques may result in devices with accuracy in the micrometer range, but may be limited to measure distances out to several inches. Various techniques that may be used by the correlator 19 are described in a paper by Shahram Mohammad Nejad and Saeed Olyaee published in the Quarterly Journal of Technology & Education Vol. 1, No. 1, Autumn 2006, entitled: "*Comparison of TOF, FMCW and Phase-Shift Laser Range-Finding Methods by Simulation and Measurement*", which is incorporated in its entirety for all purposes as if fully set forth herein.

Reflection (or backscattering) is the change in direction of a wavefront at an interface between two different media, so that the wavefront returns into the medium from which it originated. Common examples include the reflection of light, sound, and water waves, and the law of reflection is that for specular reflection the angle at which the wave is incident on the surface equals the angle at which it is reflected.

In one example, a single component, typically a transducer, is used as both the emitter 11 and the sensor 13. An example of a distance meter 15" using a transducer 31 is shown in an arrangement 30 in FIG. 3. During transmission, the transducer 31 serves as the emitter 11 and is coupled to the transmission path (such as to the signal conditioner 6) to emit the incident wave signal 16*a*. During reception, the transducer 31 serves as the sensor 13 and is coupled to the reception path (such as to the signal conditioner 6') to sense or detect the reflected (or backscattered) wave signal 16*b*. Typically a duplexer 32 is connected between the transducer 31, the transmission path (such as to the signal conditioner 6), and the reception path (such as to the signal conditioner 6'). The duplexer 32 is typically an electronic component or circuit that allows for a bi-directional (duplex) connection to the transducer 31 to be shared by the transmission and the reception paths, while providing isolation therebetween. The duplexer 32 may be based on frequency, commonly by using filters (such as a waveguide filter), on polarization (such as an orthomode transducer), or timing. The duplexer 32 is designed for operation in the frequency band or bands used by both the transmission and the reception paths, and is capable of handling the output power of the transmitter that is provided to the transducer 31. Further, the duplexer 32 provides a rejection of the transmitter noise occurring at a receive frequency during reception time, and further provides an isolation of the reception path from the transmitted power or transmission path in order to minimize desensitization or saturation of the reception path or components therein. In one example, the duplexer 32 consists of, comprises, or is based on, a switch SW 33, as exampled in a distance meter 15" shown as part of an arrangement 30*a* in FIG. 3*a*. A single pole two throws switch SW 33 may be used, where during transmission the switch SW 33 in a state '2' coupling or connecting the transducer 31 (serving as the emitter 11) to the signal conditioner 6 thus forming a complete transmission path, and where during reception the switch SW 33 in a state '1' coupling or connecting the transducer 31 (serving as the sensor 13) to the signal conditioner 6' thus forming a complete reception path. The switch SW 33 alternately connects the transmission circuitry and the receiver circuitry to the shared transducer 31.

In one example, a distance meter 15*c* uses a radar as shown in an arrangement 30*b* in FIG. 3*b*. A horn antenna 35 is serving as the transducer 31 and is used for both transmitting and receiving electro-magnetic microwave signals, and the duplexer 32 is implemented as a circulator 34. The circulator 34 may be a passive non-reciprocal three-port device, in which a microwave or radio frequency signal entering any port is transmitted to the next port in rotation (only). A port in this context is a point where an external waveguide or transmission line (such as a microstrip line or a coaxial cable), connects to the device. For a three-port circulator, a signal applied to port 1 only comes out of port 2; a signal applied to port 2 only comes out of port 3; a signal applied to port 3 only comes out of port 1. The circulator 34 is used as a type of duplexer, to route signals from the transmitter to the antenna 34 and from the antenna 34 to the receiver, without allowing signals to pass directly from transmitter to receiver. The circulator 34 may be a ferrite circulator or a non-ferrite circulator. Ferrite circulators composed of magnetized ferrite materials, and are typically 3-port "Y-junction" based on cancellation of waves propagating over two different paths near a magnetized material. Waveguide circulators may be of either type, while the 3-port types are more compact and are based on striplines. A permanent magnet may be used to produce the magnetic flux through the waveguide. Ferrimagnetic garnet crystal is used in optical circulators. Passive circulators are described in an application note AN98035 released Mar. 23, 1998 by Philips Semiconductors N.V. entitled: "*Circulators and Isolators, unique passive devices*", which is incorporated in its entirety for all purposes as if fully set forth herein. The circulator 34 may consist of, comprise, use, or be based on, a phase shift circulator, a Faraday rotation circulator, a ring circulator, a junction circulator, an edge guided mode circulator, or a lumped element circulator.

Laser. A laser (an acronym for "Light Amplification by Stimulated Emission of Radiation") is a technology or device that emits light through a process of optical amplification based on the stimulated emission of electromagnetic radiation, where the term "light" includes electromagnetic radiation of any frequency, not only just the visible light, such as infrared laser, ultraviolet laser, or X-ray laser. A laser differs from other sources of light in that it emits light coherently. Spatial coherence allows a laser to be focused to a tight spot, and further allows a laser beam to stay narrow over great distances (collimation), enabling applications such as laser pointers. Lasers can also have high temporal coherence, which allows them to emit light with a very narrow spectrum, i.e., they can emit a single color of light. Temporal coherence can be used to produce pulses of light as short as a femtosecond. Lasers are distinguished from other light sources by their coherence. Spatial coherence is typically expressed through the output being a narrow beam, which is diffraction-limited. Laser beams can be focused to very tiny spots, achieving a very high irradiance, or they can have very low divergence in order to concentrate their power at a great distance.

Temporal (or longitudinal) coherence implies a polarized wave at a single frequency whose phase is correlated over a relatively great distance (the coherence length) along the beam. A beam produced by a thermal or other incoherent light source has an instantaneous amplitude and phase that vary randomly with respect to time and position, thus having a short coherence length. Lasers are commonly characterized according to their wavelength in a vacuum, and most "single wavelength" lasers actually produce radiation in several modes having slightly differing frequencies (wavelengths), often not in a single polarization. Although temporal coherence implies monochromaticity, there are lasers that emit a broad spectrum of light or emit different wavelengths of light simultaneously. There are some lasers that are not single spatial mode and consequently have light beams that diverge more than is required by the diffraction limit. However, all such devices are classified as "lasers" based on their method of producing light, i.e., stimulated emission. Lasers are typically employed in applications where light of the required spatial or temporal coherence could not be produced using simpler technologies.

In one example, distance measuring is based on the electro-optical techniques, where the measuring uses light waves, where the transmitted beam 16*a* and the reflected (or backscattered) beams 16*b* are visible or non-visible light beams. A laser technology may be used, wherein laser technology or device involves generating an intense beam of coherent monochromatic light (or other electromagnetic radiation) by stimulated emission of photons from excited atoms or molecules. In such optical measuring technique, the emitter 11 is typically a laser diode 25, and the sensor 13 is an optical pick-up sensor, such as a photo-diode 26, both parts of an optical-based distance meter 15*a*, schematically described in an arrangement 20 in FIG. 2. Alternatively or in addition, the emitter 11 may be a gas, chemical, or excimer laser based. A laser diode driver (such as the driver 12) and associated circuitry may be based on iC-Haus GmBH white-paper 08-2013 entitled: "*Design and Test of fast Laser Driver Circuits*", which is incorporated in its entirety for all purposes as if fully set forth herein. Laser ranging is described in 2001 Society of Photo-Optical Instrumentation Engineers paper (Opt. Eng. 40(1) 10-19 (January 2001), 0091-3286/2001) by Markus-Christian Amann et al. entitled: "*Laser ranging: a critical review of usual techniques for distance measurements*", which is incorporated in its entirety for all purposes as if fully set forth herein. Various optical components for beam shaping, deflection, or filtering such as lenses, wavelength filters, or mirrors may be provided and positioned as part of the optical transmission path or the optical reception path, or both.

Reflection of light is either specular (mirror-like), backscattered, or diffused (retaining the energy, but losing the image) depending on the nature of the interface. In specular reflection the phase of the reflected (or backscattered) waves depends on the choice of the origin of coordinates, but the relative phase between s and p (TE and TM) polarizations is fixed by the properties of the media and of the interface between them. A mirror provides the most common model for specular light reflection, and typically consists of a glass sheet with a metallic coating where the reflection actually occurs. Reflection is commonly enhanced in metals by suppression of wave propagation beyond their skin depths. Reflection also occurs at the surface of transparent media, such as water or glass. In fact, reflection of light may occur whenever light travels from a medium of a given refractive index into a medium with a different refractive index. In the most general case, a certain fraction of the light is reflected from the interface, and the remainder is refracted. Solving Maxwell's equations for a light ray striking a boundary allows the derivation of the Fresnel equations, which can be used to predict how much of the light is reflected (or backscattered), and how much is refracted in a given situation. This is analogous to the way impedance mismatch in an electric circuit causes reflection of signals. Total internal reflection of light from a denser medium occurs if the angle of incidence is above the critical angle. When light reflects off a material denser (with higher refractive index) than the external medium, it undergoes a polarity inversion. In contrast, a less dense, lower refractive index material will reflect light in phase.

When light strikes the surface of a (non-metallic) material, it bounces off in all directions due to multiple reflections by the microscopic irregularities inside the material (e.g., the grain boundaries of a polycrystalline material, or the cell or fiber boundaries of an organic material) and by its surface, if it is rough. Thus, an 'image' is not formed, and this is called diffuse reflection. The exact form of the reflection depends on the structure of the material. One common model for diffuse reflection is Lambertian reflectance, in which the light is reflected with equal luminance (in photometry) or radiance (in radiometry) in all directions, as defined by Lambert's cosine law. The light sent to our eyes by most of the objects we see is due to diffuse reflection from their surface, so that this is our primary mechanism of physical observation. Various laser wavelengths and technologies are described in a book by Marvin J. Weber of Lawrence Berkeley National Laboratory published 1999 by CRC Press LLC (ISBN: 0-8493-3508-6) entitled: "*Handbook of Laser Wavelengths*", which is incorporated in its entirety for all purposes as if fully set forth herein.

Gas Laser. A gas laser is a laser in which an electric current is discharged through a gas to produce coherent light. The first gas laser, the Helium-neon laser (HeNe), produced a coherent light beam in the infrared region of the spectrum at 1.15 micrometers. The helium-neon (HeNe) laser can be made to oscillate at over 160 different wavelengths by adjusting the cavity Q to peak at the desired wavelength, by adjusting the spectral response of the mirrors or by using a dispersive element (Littrow prism) in the cavity. The efficiency of a CO2 laser is over 10%, and units operating at 633 nm are very common because of their low cost and near perfect beam qualities. Carbon dioxide lasers, or CO2 lasers can emit hundreds of kilowatts at 9.6 μm and 10.6 μm, and are often used in industry for cutting and welding. Carbon monoxide or "CO" lasers have the potential for very large outputs, but the use of this type of laser is limited by the toxicity of carbon monoxide gas. Argon-ion lasers emit light in the range 351-528.7 nm. Depending on the optics and the laser tube a different number of lines is usable but the most commonly used lines are 458 nm, 488 nm and 514.5 nm. A nitrogen transverse electrical discharge in gas at atmospheric pressure (TEA) laser is an inexpensive gas laser producing UV light at 337.1 nm. Copper laser (copper vapor, and copper bromide vapor), with two spectral lines of green (510.6 nm) and yellow (578.2 nm), is the most powerful laser with the highest efficiency in the visible spectrum.

Metal-ion lasers are gas lasers that typically generate ultraviolet wavelengths. Helium-silver (HeAg) 224 nm neon-copper (NeCu) 248 nm and helium-cadmium (HeCd) 325 nm are three examples. These lasers have particularly narrow oscillation linewidths of less than 3 GHz (0.5 picometers), making them candidates for use in fluorescence suppressed Raman spectroscopy. Examples of gas lasers are Helium-Neon (HeNe) laser operating at 632.8 nm, 543.5 nm, 593.9 nm, 611.8 nm, 1.1523 μm, 1.52 μm, or 3.3913 μm, Argon laser working at 454.6 nm, 488.0 nm, 514.5 nm, 351 nm, 363.8, 457.9 nm, 465.8 nm, 476.5 nm, 472.7 nm, or 528.7 nm, also frequency doubled to provide 244 nm and 257 nm, Krypton laser working at 416 nm, 530.9 nm, 568.2 nm, 647.1 nm, 676.4 nm, 752.5 nm, or 799.3 nm, Xenon ion laser working at visible spectrum extending into the UV and IR, Nitrogen laser working at 337.1 nm, Carbon dioxide laser working at 10.6 μm, or 9.4 μm, and Carbon monoxide laser working at 2.6 to 4 μm or 4.8 to 8.3 μm.

Solid-State Laser. A solid-state laser is a laser that uses a gain medium that is a solid, rather than a liquid such as in dye lasers, or a gas as in gas lasers. Semiconductor-based lasers are also in the solid state, but are generally considered as a separate class from solid-state lasers. Generally, the active medium of a solid-state laser consists of a glass or crystalline "host" material to which is added a "dopant" such as neodymium, chromium, erbium, or ytterbium. Many of the common dopants are rare earth elements, because the excited states of such ions are not strongly coupled with the thermal vibrations of their crystal lattices (phonons), and their operational thresholds can be reached at relatively low intensities of laser pumping. There are hundreds of solid-state media in which laser action has been achieved, but relatively few types are in widespread use. Of these, probably the most common is neodymium-doped yttrium aluminum garnet (Nd:YAG). Neodymium-doped glass (Nd:glass) and ytterbium-doped glasses or ceramics are used at very high power levels (terawatts) and high energies (megajoules) for multiple-beam inertial confinement fusion. The first material used for lasers was synthetic ruby crystals. Ruby lasers are still used for a few applications, but they are not common because of their low power efficiencies. At room temperature, ruby lasers emit only short pulses of light, but at cryogenic temperatures, they can be made to emit a continuous train of pulses.

Some solid-state lasers can also be tunable using several intracavity techniques which employ etalons, prisms, and gratings, or a combination of these. Titanium-doped sapphire is widely used for its broad tuning range, 660 to 1080 nanometers. Alexandrite lasers are tunable from 700 to 820 nm, and they yield higher-energy pulses than titanium-sapphire lasers because of the gain medium's longer energy storage time and higher damage threshold.

Ruby laser typically operates at 694.3 nm, Nd:YAG and NdCrYAG laser typically operates at 1.064 μm or 1.32 μm, Er:YAG laser typically operates at 2.94 μm, Neodymium YLF (Nd:YLF) solid-state laser typically operates at 1.047 and 1.053 μm, Neodymium doped Yttrium orthovanadate (Nd:YVO4) laser operates at 1.064 μm, Neodymium doped yttrium calcium oxoborate Nd:YCa4O(BO3)3 (Nd:YCOB) operates at ~1.060 μm or ~530 nm, Neodymium glass (Nd:Glass) laser typically operates at ~1.062 μm (Silicate glasses) or ~1.054 μm (Phosphate glasses), Titanium sapphire (Ti:sapphire) laser operates at 650-1100 nm, Thulium YAG (Tm:YAG) laser operates at 2.0 μm, Ytterbium YAG (Yb:YAG) laser operates at 1.03 μm, Ytterbium:2O3 (glass or ceramics) laser operates at 1.03 μm, Ytterbium doped glass laser (rod, plate/chip, and fiber) operates at 1. Mm, Holmium YAG (Ho:YAG) laser operates at 2.1 μm, Chromium ZnSe (Cr:ZnSe) laser operates at 2.2-2.8 μm range, Cerium doped lithium strontium (or calcium) aluminum fluoride (Ce:LiSAF, Ce:LiCAF) operates at ~280 to 316 nm range, Promethium 147 doped phosphate glass (147Pm+3:Glass) solid-state laser operates at 933 nm or 1098 nm, Chromium doped chrysoberyl (alexandrite) laser operates at the range of 700 to 820 nm, and Erbium doped and erbium-ytterbium codoped glass lasers operate at 1.53-1.56 μm.

Laser Diode. A laser diode, or LD, is an electrically pumped semiconductor laser in which the active laser medium is formed by a p-n junction of a semiconductor diode similar to that found in a light-emitting diode. The laser diode is the most common type of laser produced with a wide range of uses that include fiber optic communications, barcode readers, laser pointers, CD/DVD/Blu-ray Disc reading and recording, laser printing, laser scanning and increasingly directional lighting sources. A laser diode beam forming is described in Chapter 2*: "Laser Diode Beam Basics*" of a Book by Sun, H. published 2015 by Springer (ISBN: 978-94-017-9782-5) entitled: "*A Practical Guide to handling Laser Diode Beams*", which is incorporated in its entirety for all purposes as if fully set forth herein.

A laser diode is electrically a P-i-n diode, where the active region of the laser diode is in the intrinsic (I) region and the carriers (electrons and holes) are pumped into that region from the N and P regions respectively. While initial diode laser research was conducted on simple P-N diodes, all modern lasers use the double-heterostructure implementation, where the carriers and the photons are confined in order to maximize their chances for recombination and light generation. Unlike a regular diode, the goal for a laser diode is to recombine all carriers in the (I) region, and produce light. Thus, laser diodes are fabricated using direct bandgap semiconductors. The laser diode epitaxial structure is grown using one of the crystal growth techniques, usually starting from an N doped substrate, and growing the (I) doped active layer, followed by the P doped cladding, and a contact layer. The active layer most often consists of quantum wells, which provide lower threshold current and higher efficiency.

Laser diodes form a subset of the larger classification of semiconductor p-n junction diodes. Forward electrical bias across the laser diode causes the two species of charge carrier—holes and electrons—to be "injected" from opposite sides of the p-n junction into the depletion region. Holes are injected from the p-doped, and electrons from the n-doped, semiconductor. A depletion region, devoid of any charge carriers, is formed because of the difference in electrical potential between n- and p-type semiconductors wherever they are in physical contact. Due to the use of charge injection in powering most diode lasers, this class of lasers is sometimes termed "injection lasers" or "Injection Laser Diode" (ILD). As diode lasers are semiconductor devices, they may also be classified as semiconductor lasers. Either designation distinguishes diode lasers from solid-state lasers. Another method of powering some diode lasers is the use of optical pumping. Optically Pumped Semiconductor Lasers (OPSL) use an III-V semiconductor chip as the gain medium, and another laser (often another diode laser) as the pump source. OPSL offer several advantages over ILDs, particularly in wavelength selection and lack of interference from internal electrode structures. When an electron and a hole are present in the same region, they may recombine or "annihilate" producing a spontaneous emission—i.e., the electron may re-occupy the energy state of the hole, emitting a photon with energy equal to the difference between the electron's original state and hole's state. (In a conventional semiconductor junction diode, the energy released from the recombination of electrons and holes is carried away as phonons, i.e., lattice vibrations, rather than as photons.) Spontaneous emission below the lasing threshold produces similar properties to an LED. Spontaneous emission is necessary to initiate laser oscillation, but it is one among several sources of inefficiency once the laser is oscillating.

As in other lasers, the gain region is surrounded with an optical cavity to form a laser. In the simplest form of laser diode, an optical waveguide is made on that crystal's surface, such that the light is confined to a relatively narrow line. The two ends of the crystal are cleaved to form perfectly smooth, parallel edges, forming a Fabry-Pérot resonator. Photons emitted into a mode of the waveguide will travel along the waveguide and be reflected several times from each end face before they exit. As a light wave passes through the cavity, it is amplified by stimulated emission, but light is also lost due to absorption and by incomplete reflection from the end facets. Finally, if there is more amplification than loss, the diode begins to "lase". Some important properties of laser diodes are determined by the geometry of the optical cavity. Generally, the light is contained within a very thin layer, and the structure supports only a single optical mode in the direction perpendicular to the layers. In the transverse direction, if the waveguide is wide compared to the wavelength of light, then the waveguide can support multiple transverse optical modes, and the laser is known as "multi-mode". These transversely multi-mode lasers are adequate in cases where one needs a very large amount of power, but not a small diffraction-limited beam; for example, in printing, activating chemicals, or pumping other types of lasers.

In Double heterostructure lasers, a layer of low bandgap material is sandwiched between two high bandgap layers. One commonly used pair of materials is gallium arsenide (GaAs) with aluminum gallium arsenide (AlxGa(1−x)As). Each of the junctions between different bandgap materials is called a heterostructure, hence the name "Double Heterostructure laser" or DH laser. The kind of laser diode described in the first part of the article may be referred to as a homojunction laser, for contrast with these more popular devices. The advantage of a DH laser is that the region where free electrons and holes exist simultaneously, the active region, is confined to the thin middle layer. This means that many more of the electron-hole pairs can contribute to amplification—not so many are left out in the poorly amplifying periphery. In addition, light is reflected from the heterojunction; hence, the light is confined to the region where the amplification takes place.

Quantum Well Laser. If the middle layer is made thin enough, it acts as a quantum well. This means that the vertical variation of the electron's wave function, and thus a component of its energy, is quantized. The efficiency of a quantum well laser is greater than that of a bulk laser because the density of states function of electrons in the quantum well system has an abrupt edge that concentrates electrons in energy states that contribute to laser action. Lasers containing more than one quantum well layers are known as multiple quantum well lasers. Multiple quantum wells improve the overlap of the gain region with the optical waveguide mode.

Quantum Cascade Laser. In a quantum cascade laser, the difference between quantum well energy levels is used for the laser transition instead of the bandgap. This enables laser action at relatively long wavelengths, which can be tuned simply by altering the thickness of the layer. They are heterojunction lasers.

Separate Confinement Heterostructure Laser. The problem with the simple quantum well diode described above is that the thin layer is simply too small to effectively confine the light. To compensate, another two layers are added on the outside of the first three. These layers have a lower refractive index than the center layers, and hence confine the light effectively. Such a design is called a separate confinement heterostructure (SCH) laser diode. Almost all commercial laser diodes since the 1990s have been SCH quantum well diodes.

A Distributed Bragg Reflector laser (DBR) is a type of single frequency laser diode. It is characterized by an optical cavity consisting of an electrically or optically pumped gain region between two mirrors to provide feedback. One of the mirrors is a broadband reflector and the other mirror is wavelength selective so that gain is favored on a single longitudinal mode, resulting in lasing at a single resonant frequency. The broadband mirror is usually coated with a low reflectivity coating to allow emission. The wavelength selective mirror is a periodically structured diffraction grating with high reflectivity. The diffraction grating is within a non-pumped, or passive region of the cavity. A DBR laser is a monolithic single chip device with the grating etched into the semiconductor. DBR lasers can be edge emitting lasers or VCSELs. Alternative hybrid architectures that share the same topology include extended cavity diode lasers and volume Bragg grating lasers, but these are not properly called DBR lasers.

A Distributed FeedBack laser (DFB) is a type of single frequency laser diode. DFBs are the most common transmitter type in DWDM-systems. To stabilize the lasing wavelength, a diffraction grating is etched close to the p-n junction of the diode. This grating acts like an optical filter, causing a single wavelength to be fed back to the gain region and lase. Since the grating provides the feedback that is required for lasing, reflection from the facets is not required. Thus, at least one facet of a DFB is anti-reflection coated. The DFB laser has a stable wavelength that is set during manufacturing by the pitch of the grating, and can only be tuned slightly with temperature. DFB lasers are widely used in optical communication applications where a precise and stable wavelength is critical. The threshold current of this DFB laser, based on its static characteristic, is around 11 mA. The appropriate bias current in a linear regime could be taken in the middle of the static characteristic (50 mA).

Vertical-Cavity Surface-Emitting Lasers (VCSELs) have the optical cavity axis along the direction of current flow rather than perpendicular to the current flow as in conventional laser diodes. The active region length is very short compared with the lateral dimensions so that the radiation emerges from the surface of the cavity rather than from its edge as shown in the figure. The reflectors at the ends of the cavity are dielectric mirrors made from alternating high and low refractive index quarter-wave thick multilayer. Such dielectric mirrors provide a high degree of wavelength-selective reflectance at the required free surface wavelength λ if the thicknesses of alternating layers d1 and d2 with refractive indices n1 and n2 are such that $n1d1+n2d2=\lambda/2$ which then leads to the constructive interference of all partially reflected (or backscattered) waves at the interfaces. Because of the high mirror reflectivities, VCSELs have lower output powers when compared to edge-emitting lasers.

There are several advantages to producing VCSELs when compared with the production process of edge-emitting lasers. Edge-emitters cannot be tested until the end of the production process. If the edge-emitter does not work, whether due to bad contacts or poor material growth quality, the production time and the processing materials have been wasted. Additionally, because VCSELs emit the beam perpendicular to the active region of the laser as opposed to parallel as with an edge emitter, tens of thousands of VCSELs can be processed simultaneously on a three-inch gallium arsenide wafer. Furthermore, even though the VCSEL production process is more labor- and material-intensive, the yield can be controlled to a more predictable outcome. However, they normally show a lower power output level.

Vertical External-Cavity Surface-Emitting Lasers, or VECSELs, are similar to VCSELs. In VCSELs, the mirrors are typically grown epitaxially as part of the diode structure, or grown separately and bonded directly to the semiconductor containing the active region. VECSELs are distinguished by a construction in which one of the two mirrors is external to the diode structure. As a result, the cavity includes a free-space region. A typical distance from the diode to the external mirror would be 1 cm. One of the most interesting features of any VECSEL is the small thickness of the semiconductor gain region in the direction of propagation, less than 100 nm. In contrast, a conventional in-plane semiconductor laser entails light propagation over distances of from 250 μm upward to 2 mm or longer. The significance of the short propagation distance is that it causes the effect of "antiguiding" nonlinearities in the diode laser gain region to be minimized. The result is a large-cross-section single-mode optical beam which is not attainable from in-plane ("edge-emitting") diode lasers.

Several workers demonstrated optically pumped VECSELs, and they continue to be developed for many applications including high power sources for use in industrial machining (cutting, punching, etc.) because of their unusually high power and efficiency when pumped by multi-mode diode laser bars. However, because of their lack of p-n junction, optically-pumped VECSELs are not considered "diode lasers", and are classified as semiconductor lasers. Electrically pumped VECSELs have also been demonstrated. Applications for electrically pumped VECSELs include projection displays, served by frequency doubling of near-IR VECSEL emitters to produce blue and green light.

External-cavity diode lasers are tunable lasers which use mainly double heterostructures diodes of the $Al_xGa_{(1-x)}As$ type. The first external-cavity diode lasers used intracavity etalons and simple tuning Littrow gratings. Other designs include gratings in grazing-incidence configuration and multiple-prism grating configurations.

Chemical Laser. Chemical lasers are powered by a chemical reaction, and can achieve high powers in continuous operation. For example, in the hydrogen fluoride laser (2700-2900 nm) and the deuterium fluoride laser (3800 nm) the reaction is the combination of hydrogen or deuterium gas with combustion products of ethylene in nitrogen trifluoride. Chemical lasers are powered by a chemical reaction permitting a large amount of energy to be released quickly. Continuous wave chemical lasers at very high power levels, fed by streams of gasses, have been developed and have some industrial applications. As examples, in the hydrogen fluoride laser (2700-2900 nm) and the deuterium fluoride laser (3800 nm), the reaction is the combination of hydrogen or deuterium gas with combustion products of ethylene in nitrogen trifluoride.

Excimer laser. Excimer lasers are powered by a chemical reaction involving an excited dimer, or excimer, which is a short-lived dimeric or heterodimeric molecule formed from two species (atoms), at least one of which is in an excited electronic state. They typically produce ultraviolet light, and are used in semiconductor photolithography and in LASIK eye surgery. Commonly used excimer molecules include $F_2$ (fluorine, emitting at 157 nm), and noble gas compounds (ArF [193 nm], KrCl [222 nm], KrF [248 nm], XeCl [308 nm], and XeF [351 nm]).

Photodiode. A photodiode, such as the photodiode 13*a*, is a semiconductor device that converts light into current. The current is generated when photons are absorbed in the photodiode, and a small amount of current is also produced when no light is present. Photodiodes may contain optical filters, built-in lenses, and may have large or small surface areas. Photodiodes usually have a slower response time as their surface area increases. The common, traditional solar cell used to generate electric solar power is a large area photodiode. Photodiodes are similar to regular semiconductor diodes except that they may be either exposed (to detect vacuum UV or X-rays) or packaged with a window or optical fiber connection to allow light to reach the sensitive part of the device. Many diodes designed for use specifically as a photodiode use a PIN junction rather than a p-n junction, to increase the speed of response. A photodiode is typically designed to operate in reverse bias. A photodiode is typically a p-n junction or PIN structure, so that when a photon of sufficient energy strikes the diode, it creates an electron-hole pair. This mechanism is also known as the inner photoelectric effect. If the absorption occurs in the junction's depletion region, or one diffusion length away from it, these carriers are swept from the junction by the built-in electric field of the depletion region. Thus, holes move toward the anode, and electrons toward the cathode, and a photocurrent is produced. The total current through the photodiode is the sum of the dark current (current that is generated in the absence of light) and the photocurrent, so the dark current must be minimized to maximize the sensitivity of the device.

Avalanche photodiodes have a similar structure to regular photodiodes, but they are operated with much higher reverse bias. This allows each photo-generated carrier to be multiplied by avalanche breakdown, resulting in internal gain within the photodiode, which increases the effective responsivity of the device. A phototransistor is a light-sensitive transistor. A common type of phototransistor, called a photobipolar transistor, is in essence a bipolar transistor encased in a transparent case so that light can reach the base-collector junction. The electrons that are generated by photons in the base-collector junction are injected into the base, and this photodiode current is amplified by the transistor's current gain β (or hfe). If the emitter is left unconnected, the phototransistor becomes a photodiode. While phototransistors have a higher responsivity for light, they are not able to detect low levels of light any better than photodiodes. Phototransistors also have significantly longer response times. Field-effect phototransistors, also known as photoFETs, are light-sensitive field-effect transistors. Unlike photobipolar transistors, photoFETs control drain-source current by creating a gate voltage.

The material used to make a photodiode is critical to defining its properties, because only photons with sufficient energy to excite electrons across the material's bandgap will produce significant photocurrents. Materials commonly used to produce photodiodes include Silicon (working in 190-1100 nm electromagnetic spectrum wavelength range), Germanium (400-1700 nm), Indium Gallium Arsenide (800-2600 nm), Lead(II) sulfide (<1000-3500 nm) and Mercury cadmium telluride (400-14000 nm). Because of their greater bandgap, silicon-based photodiodes generate less noise than germanium-based photodiodes.

Various photodiodes and laser rangefinders are available from Voxtel, Inc. headquartered in Beaverton, OR, U.S.A., and described in Voxtel, Inc. 2015 catalog v.5 Rev. 06 (8/20150 entitled: "*VOXTELOPTO*", which is incorporated in its entirety for all purposes as if fully set forth herein. An example of an electro-optics distance measuring module is GP2D150D available from Sharp Microelectronics Electronics of the Americas having an head office in Camas, Washington, U.S.A., described in a data sheet by Sharp Corporation (dated 2006) Reference Code SMA06006 entitled:"*GP2D/50A Optoelectronic Device*", which is incorporated in its entirety for all purposes as if fully set forth herein. An example for laser rangefinder for golf application is Model Coolshot 40i available from Nikon Vision Co., Ltd. headquartered in Tokyo, Japan, described in a brochure dated January 2015 Code. No. 3CE-BPJH-6 (1501-13) V, which is incorporated in its entirety for all purposes as if fully set forth herein.

A device for measuring distance with a visible measuring beam generated by a semiconductor laser is described in U.S. Pat. No. 5,949,531 to Ehbets et al. entitled: "Device for Distance Measurement", which is incorporated in its entirety for all purposes as if fully set forth herein. The device has a collimator object lens to collimate the measuring beam towards the optical axis of the collimator object lens, an arrangement to modulate the measuring radiation, a reception object lens to receive and image the measuring beam reflected (or backscattered) from a distant object on a receiver, a switchable beam deflection device to generate an internal reference path between the semiconductor laser and the receiver and an electronic evaluation device to find and display the distance measured from the object. According to the invention, the receiver contains a light guide with a downstream opto-electronic transducer, in which the light guide inlet surface is arranged in the imaging plane of the reception object lens for long distances from the object and can be controllably moved from this position transversely to the optical axis. In an alternative embodiment, the light inlet surface is fixed and there are optical means outside the optical axis of the reception object lens, which for short object distances, deflect the imaging position of the measuring beam to the optical axis of the reception object lens. The measuring radiation is pulse modulated with excitation pulses with a pulse width of less than two nanoseconds.

A distance measuring instrument is described in U.S. Pat. No. 8,736,819 to Nagai entitled: "Distance Measuring Instrument", which is incorporated in its entirety for all purposes as if fully set forth herein. The instrument comprising a light emitting unit for emitting a distance measuring light, a photodetecting unit for receiving and detecting a reflected distance measuring light from an object to be measured and a part of the distance measuring light emitted from the light emitting unit as an internal reference light, a sensitivity adjusting unit for electrically adjusting photodetecting sensitivity of the photodetecting unit, and a control arithmetic unit for calculating a measured distance based on a photodetection signal of the reflected distance measuring light from the photodetecting unit and based on a photodetection signal of the internal reference light, wherein the control arithmetic unit can measure a distance by selecting a prism mode measurement and a non-prism mode measurement, and controls so that photodetecting sensitivity of the photodetecting unit is changed by the sensitivity adjusting unit in response to the selected measurement mode.

A system and a method for acquiring a detected light optical signal and generating an accumulated digital trace are described in U.S. Pat. No. 8,310,655 to Mimeault entitled: "Detection and Ranging Methods and Systems", which is incorporated in its entirety for all purposes as if fully set forth herein. The method comprises providing a light source for illumination of a field of view, an optical detector, an analog-to-digital converter (ADC), emitting one pulse from the light source in the field of view, detecting a reflection signal of the pulse by the optical detector, acquiring j points for the detected reflection signal by the ADC, storing, in a buffer, the digital signal waveform of j points, introducing a phase shift of 2pi/P, repeating, P times, the steps of emitting, detecting, acquiring, storing and introducing, to store, in the buffer, an interleaved waveform of P×j points, accumulating M traces of interleaved P×j points for a total of N=M×P acquisition sets, N being a total number of pulses emitted, creating one combined trace of the reflected signal of j×P points by adding each point of the M traces Additionally, the combined trace can be compared to a detected reference reflection signal of the pulse to determine a distance traveled by the pulse An optoelectronic distance measuring device is disclosed in U.S. Pat. No. 9,103,669 to Giacotto et al. entitled: "Distance Measuring Device", which is incorporated in its entirety for all purposes as if fully set forth herein. The device has a transmitting unit with a driver stage for emitting optical pulses, a receiving unit for receiving a portion of the optical pulses, said portion being reflected from a target object, and converting it into an electrical reception signal, via a photosensitive electrical component. It also has an analog-digital converter for digitizing the reception signal, and an electronic evaluation unit to ascertain a distance from the target object on the basis of a signal propagation time using the digitized reception signal. The driver stage can be designed so that at least two pulse durations of different length for the optical pulses can be set.

A laser speed detector is described in U.S. Pat. No. 5,359,404 to Dunne entitled: "Laser-Based Speed Measuring Device", which is incorporated in its entirety for all purposes as if fully set forth herein. The detector includes a laser rangefinder, which determines the time-of-flight of an infrared laser pulse to a target and a microprocessor-based microcontroller. The device is small enough to be easily hand-held, and includes a trigger and a sighting scope for a user to visually select a target and to trigger operation of the device upon the selected target. The laser rangefinder includes self-calibrating interpolation circuitry, a digital logic-operated gate for reflected laser pulses in which both the “opening” and the “closing” of the gate can be selectable to be set by the microcontroller, and dual collimation of the outgoing laser pulse such that a minor portion of the outgoing laser pulse is sent to means for producing a timing reference signal.

A method for detecting an object using visible light comprises providing a visible-light source having a function of illuminating an environment is described in U.S. Pat. No. 8,319,949 to Cantin et al. entitled: “Method for Detecting Objects with Visible Light”, which is incorporated in its entirety for all purposes as if fully set forth herein. The visible-light source is driven to emit visible light in a predetermined mode, with visible light in the predetermined mode being emitted such that the light source maintains said function of illuminating an environment. A reflection/backscatter of the emitted visible light is received from an object. The reflection/backscatter is filtered over a selected wavelength range as a function of a desired range of detection from the light source to obtain a light input. The presence or position of the object is identified with the desired range of detection as a function of the light input and of the predetermined mode.

A laser based rangefinder which may be inexpensively produced yet provides highly accurate precision range measurements is described in U.S. Pat. No. 5,652,651 to Dunne entitled: “Laser Range Finder Having Selectable Target Acquisition Characteristics and Range Measuring Precision”, which is incorporated in its entirety for all purposes as if fully set forth herein. The finder has a number of user selectable target acquisition and enhanced precision measurement modes which may be viewed on an in-sight display during aiming and operation of the instrument. Extremely efficient self-calibrating precision timing and automatic noise threshold circuits incorporated in the design provide a compact, low-cost, highly accurate and reliable ranging instrument for a multitude of uses, and is adaptable for both recreational and laser based “tape measure” applications.

An apparatus for optical distance measurement is described in U.S. Pat. No. 6,801,305 to Stierle et al. entitled: “Device for Optically Measuring Distances”, which is incorporated in its entirety for all purposes as if fully set forth herein. The apparatus is having a transmitter unit for emitting optical radiation, in particular laser radiation, in the direction of a target object; having a receiver unit for receiving the radiation reflected by the target object; and having a control and evaluation unit for ascertaining the distance between the apparatus and the target object, and also having at least one optical means for beam guidance. It is proposed that the relative position of the at least one optical means and the light source of the apparatus to one another be variable.

A high precision laser range finder is described in U.S. Pat. No. 6,501,539 to Chien et al. entitled: “High Precision Laser Range Finder with an Automatic Peak Control Loop”, which is incorporated in its entirety for all purposes as if fully set forth herein. The high precision laser range finder comprises an APC loop for eliminating a timing jitter problem due to different reflections on a target. The APC loop comprises a laser receiver, a peak holding circuit, an integrator and a high voltage generator. The peak holding circuit is connected with the laser receiver for detecting a signal strength outputted from the laser receiver. The high voltage generator provides the laser driver and laser receiver with voltage so as to control the strength of the emitted laser pulse signal of the laser driver and the gain of the avalanche photo-detector. The integrator is used to eliminate the steady error in the APC loop. Furthermore, a time to amplitude converting circuit comprises an AJD converter for obtaining a distance data and then filtering in a microprocessor to increase the measurement accuracy.

A distance-measuring system is described in U.S. Pat. No. 7,196,776 to Ohtomo et al. entitled: “Distance-Measuring System”, which is incorporated in its entirety for all purposes as if fully set forth herein. The system comprises a light source unit for emitting a distance-measuring light, a photodetection optical system having a photodetection optical axis, a projecting optical system having a projecting light optical axis and for projecting the distance-measuring light from the light source unit to an object to be measured and for guiding the distance-measuring light reflected from the object to be measured toward the photodetection optical system, and an internal reference optical system for guiding the distance-measuring light from the light source unit to the photodetection optical system as an internal reference light, wherein the light source unit can emit two distance-measuring lights with different spreading angles, and one of the light source units and the projection optical system has a decentering member for decentering the distance-measuring light with respect to the projecting light optical axis.

An optoelectronic laser distance-measuring instrument with preselectable or sensitive reference points arranged on the outer edge of a portable housing is described in U.S. Pat. No. 6,624,881 to Waibel et al. entitled: “Optoelectronic Laser Distance-Measuring”, which is incorporated in its entirety for all purposes as if fully set forth herein. The device comprises a microcontroller, a non-erasable memory, a mass memory, a keypad, a display, a radiation source, and a radiation receiver. The microcontroller controls the radiation source to emit a modulated laser beam. The laser beam is received by the radiation receiver after being reflected by a target object, and is modulated by the microcontroller. The time that the laser beam takes during the journey is recorded, and is multiplied by a propagation velocity of the laser beam to determine the distance that the device is distant from the target object. Data of measurement are stored in the mass memory, and the result is shown on the display. In addition, operation modes and correction algorithms, which are stored in the non-erasable memory, can be selected through the keypad for desired result of measurement. Although the conventional laser distance-measuring device can measure a straight distance of an object from the device, it has difficulty to measure a distance between two spaced points, which often happens in the fields of architecture and construction. For example, workers usually need to measure the height of a wall, a tree, or a building.

Apparatus and method are provided in U.S. Pat. No. 6,876,441 to Barker entitled: “Optical Sensor for Distance Measurement”, which is incorporated in its entirety for all purposes as if fully set forth herein, for distance measurement to a remote surface using high frequency modulated transmitted and reflected laser beams and phase-shift calculations. To improve phase-shift resolution, the reflected beam is further modulated, before detection, at a high frequency similar yet different from that of the transmitted beam so as to create a resulting detector signal having at least a lower frequency signal, which is easily detected by a response limited detector. The lower frequency signal retains the phase-shift information and thus enables determination of the phase-shift information with stable, inexpensive low-frequency optical detectors. Three-dimensional mapping can be performed wherein one or more apparatus employ a plurality of detectors or a scanner producing a plurality of sequential reflected beams, each of which results in a plurality of phase-shift information for an area on the surface.

A rangefinder for measuring a distance of an object is described in U.S. Pat. No. 8,970,824 to Chang et al. entitled: "Rangefinder", which is incorporated in its entirety for all purposes as if fully set forth herein. The rangefinder includes a case, in which a refractor, a measuring light source, a light receiver, a receiving lens, a reference light source, and a reflector are provided. The measuring light source emits measuring light to the refractor, and the refractor refracts the measuring light to the object. The measuring light reflected by the object emits to the light receiver through the receiving lens. The reference light emits reference light to the reflector, and the reflector reflects the reference light to the light receiver. The refractor and the reflector may be turned for calibration.

Alternatively or in addition to laser diode, the optical emitter 11 may use a visible or non-visible Light-Emitting Diode (LED). A circuit and apparatus for generating a light pulse from an inexpensive light-emitting diode (LED) for an accurate distance measurement and ranging instrument is described in U.S. Pat. No. 6,043,868 to Dunne entitled: "Distance Measurement and Ranging Instrument Having a Light Emitting Diode-Based Transmitter", which is incorporated in its entirety for all purposes as if fully set forth herein. The instrument comprises an LED and a firing circuit. An optional pre-biasing circuit provides a reverse-bias signal to the LED to ensure the LED does not begin to emit light before a firing circuit can provide a sufficiently high current pulse of short duration as a forward current through the LED. The LED is driven by the firing circuit with a pulse of high peak power and short duration. The resulting light pulse from the LED can be inexpensively used to derive distance and ranging information for use in a distance measurement and ranging device.

A Light-Emitting Diode (LED) is a semiconductor light source, based on the principle that when a diode is forward-biased (switched on), electrons are able to recombine with electron holes within the device, releasing energy in the form of photons. This effect is called electroluminescence and the color of the light (corresponding to the energy of the photon) is determined by the energy gap of the semiconductor. Conventional LEDs are made from a variety of inorganic semiconductor materials, such as Aluminum Gallium Arsenide (AlGaAs), Gallium Arsenide Phosphide (GaAsP), Aluminum gallium indium phosphide (AlGaInP), Gallium (III) Phosphide (GaP), Zinc Selenide (ZnSe), Iridium Gallium Nitride (InGaN), and Silicon Carbide (SiC) as substrate.

In an Organic Light-Emitting Diodes (OLEDs), the electroluminescent material comprising the emissive layer of the diode is an organic compound. The organic material is electrically conductive due to the delocalization of pi electrons caused by conjugation over all or part of the molecule, and the material therefore functions as an organic semiconductor. The organic materials can be small organic molecules in a crystalline phase, or polymers. High-power LEDs (HPLED) can be driven at currents from hundreds of mAs to more than an Amper, compared with the tens of mAs for other LEDs. Some can emit over a thousand Lumens. Since overheating is destructive, the HPLEDs are commonly mounted on a heat sink to allow for heat dissipation.

LEDs are efficient, and emit more light per watt than incandescent light bulbs. They can emit light of an intended color without using any color filters as traditional lighting methods need. LEDs can be very small (smaller than 2 $mm^2$) and are easily populated onto printed circuit boards. LEDs light up very quickly. A typical red indicator LED will achieve full brightness in under a microsecond. LEDs are ideal for uses involving frequent on-off cycling, unlike fluorescent lamps that fail faster when cycled often, or HID lamps that require a long time before restarting and can very easily be dimmed either by pulse-width modulation or lowering the forward current. Further, in contrast to most light sources, LEDs radiate very little heat in the form of IR that can cause damage to sensitive objects or fabrics, and typically have a relatively long useful life.

Optical-based distance measurement is described in a dissertation by Robert Lange submitted June 28, 200 to the Department of Electrical Engineering and Computer Science at University of Siegen entitled "*3D Time-of-flight Measurement with Custom Solid-State Image Sensors in CMOS/CCD-Technology*", which is incorporated in its entirety for all purposes as if fully set forth herein. An example of a laser-based distance meter is a distance sensor P/N VDM28-15-L/73c/136 available from PEPPERL+FUCHS Group headquartered in Germany and described in a data sheet numbered 243003_eng.xml issued 2014 Oct. 24, which is incorporated in its entirety for all purposes as if fully set forth herein. Noncontact optical sensing techniques that may be used to measure distance to objects, and related parameters such as displacements, surface profiles, velocities and vibrations are described in an article by Garry Berkovic and Ehud Shafir published in Advances in Optics and Photonics 4, 441-471 (2012) doi:AOP.4.000441 entitled: "*Optical methods for distance and displacement measurements*", which is incorporated in its entirety for all purposes as if fully set forth herein. Various techniques for laser ranging such as active laser triangulation, pulsed time-of-flight (TOF), phase shift, FMCW, and correlation are described in a paper by Jain Siddharth dated Dec. 2, 2003, entitled: "*A survey of Laser Range Finding*", which is incorporated in its entirety for all purposes as if fully set forth herein.

An example of commercially available laser-based distance meters are Model GLR225—225 Ft. Laser Measure and Model DLR130, both available from Robert Bosch Tool Corporation. Headquartered in Germany, and respectively described in a guide entitled: "*Operating/Safety Instructions—GLR*225" and in a 2009 guide (2609140584 02/09) entitled: "*Operating/Safety Instructions—DLR*130", which are both incorporated in their entirety for all purposes as if fully set forth herein. A laser-based distance meter may consist of, may comprise, or may use a module of LDK Model 2 series available from Egismos Technology Corporation headquartered in Burnaby, B.C. Canada, described in Egismos Technology Corporation document no. EG-QS-T-PM-ST-0001 (dated 2015 Apr. 23) entitled: "*Laser Range Finder—LDK Model* 2 *Series*", which is incorporated in its entirety for all purposes as if fully set forth herein. Further, a laser-based distance meter may consist of, may comprise, or may use a module of EV-kit available from Egismos Technology Corporation headquartered in Burnaby, B.C. Canada, described in Egismos Technology Corporation form no. DAT-LRM-05 (dated 2014 Jun. 21) entitled: "*Laser Range Finder RS*232 *EV-kit*", which is incorporated in its entirety for all purposes as if fully set forth herein.

Light. Light is electromagnetic radiation within a certain portion of the electromagnetic spectrum. The word usually refers to visible light, which is visible to the human eye and is responsible for the sense of sight. Visible light is usually defined as having wavelengths in the range of 400-700 nanometres (nm), or 4.00×10-7 to 7.00×10-7 m, between the infrared (with longer wavelengths) and the ultraviolet (with shorter wavelengths), and this wavelength means a frequency range of roughly 430-750 terahertz (THz). Infrared (IR) is invisible radiant energy, electromagnetic radiation with longer wavelengths than those of visible light, extending from the nominal red edge of the visible spectrum at 700 nanometers (frequency 430 THz) to 1 mm (300 GHz) (although people can see infrared up to at least 1050 nm in experiments). Most of the thermal radiation emitted by objects near room temperature is infrared. Ultraviolet (UV) light is an electromagnetic radiation with a wavelength from 400 nm (750 THz) to 10 nm (30 PHz), shorter than that of visible light but longer than X-rays. Though usually invisible, under some conditions children and young adults can see ultraviolet down to wavelengths of about 310 nm, and people with aphakia (missing lens) can also see some UV wavelengths.

LED. A light-emitting diode (LED) is a two-lead semiconductor light source, typically consisting of a p-n junction diode, which emits light when activated. When a suitable voltage is applied to the leads, electrons are able to recombine with electron holes within the device, releasing energy in the form of photons. This effect is called electroluminescence, and the color of the light (corresponding to the energy of the photon) is determined by the energy band gap of the semiconductor. An LED is often small in area (less than 1 $mm^2$) and integrated optical components may be used to shape its radiation pattern. The LED consists of a chip of semiconducting material doped with impurities to create a p-n junction. As in other diodes, current flows easily from the p-side, or anode, to the n-side, or cathode, but not in the reverse direction. Charge-carriers electrons and holes, flow into the junction from electrodes with different voltages. When an electron meets a hole, it falls into a lower energy level and releases energy in the form of a photon. The wavelength of the light emitted, and thus its color, depends on the band gap energy of the materials forming the p-n junction. In silicon or germanium diodes, the electrons and holes usually recombine by a non-radiative transition, which produces no optical emission, because these are indirect band gap materials. The materials used for the LED have a direct band gap with energies corresponding to near-infrared, visible, or near-ultraviolet light.

LEDs are typically built on an n-type substrate, with an electrode attached to the p-type layer deposited on its surface. P-type substrates, while less common, occur as well. Many commercial LEDs, especially GaN/InGaN, also use sapphire substrate. Most materials used for LED production have very high refractive indices. This means that much light will be reflected back into the material at the material/air surface interface. Thus, light extraction in LEDs is an important aspect of LED production, subject to much research and development. For example, an LED lamp, may be a 6 W Lightbulb Type LED Lamp R-B10L1 available from ROHM Co. Ltd. and described in a data sheet entitled: "*Lightbulb Type LED Lamps*" (dated May 9, 2011), which is incorporated in its entirety for all purposes as if fully set forth herein, 3 W 120 VAC 36 mm Round LED module available from Thomas Research Products of Elgin, IL, U.S.A. described in a specifications Rev Apr. 9, 2015 entitled: "3 *W* 120*V AC* 36 *mm Round LED Module—AC LED Technology by Lynk Labs*", which is incorporated in its entirety for all purposes as if fully set forth herein, or a PLANETSAVER® LED Strip light available from DFx Technology Ltd. of Oxfordshire, U.K. described in a data sheet (downloaded 5/2015) entitled: "110*V or* 230*V LED Strip light*", which is incorporated in its entirety for all purposes as if fully set forth herein.

Photosensor. A photosensor (or photodetector) is a sensor of light. A photosensor may be a semiconductor device, such as a photodiode or a phototransistor, and may use the photovoltaic effect of the photoconductive effects.

Photodiode. A photodiode is a semiconductor device that converts light into current, where the current is generated when photons are absorbed in the photodiode. A small amount of current may also be produced when no light is present. Photodiodes may contain optical filters, built-in lenses, and may have large or small surface areas, and usually have a slower response time as their surface area increases. Photodiodes are similar to regular semiconductor diodes except that they may be either exposed (to detect vacuum UV or X-rays) or packaged with a window or optical fiber connection to allow light to reach the sensitive part of the device. Many diodes designed for use specifically as a photodiode use a PIN junction rather than a p-n junction, to increase the speed of response. A photodiode is typically designed to operate in reverse bias.

A photodiode uses a p-n junction or PIN structure, and when a photon of sufficient energy strikes the diode, it creates an electron-hole pair. This mechanism is also known as the inner photoelectric effect. If the absorption occurs in the junction depletion region, or one diffusion length away from it, these carriers are swept from the junction by the built-in electric field of the depletion region, and thus holes move toward the anode, and electrons toward the cathode, and a photocurrent is produced. The total current through the photodiode is the sum of the dark current (current that is generated in the absence of light) and the photocurrent, so the dark current must be minimized to maximize the sensitivity of the device.

When used in zero bias or photovoltaic mode, the flow of photocurrent out of the device is restricted and a voltage builds up. This mode exploits the photovoltaic effect, which is the basis for solar cells—a traditional solar cell is just a large area photodiode. In a photoconductive mode, the diode is often reverse biased (with the cathode driven positive with respect to the anode). This reduces the response time because the additional reverse bias increases the width of the depletion layer, which decreases the junction's capacitance. The reverse bias also increases the dark current without much change in the photocurrent. For a given spectral distribution, the photocurrent is linearly proportional to the illuminance (and to the irradiance). Although this mode is faster, the photoconductive mode tends to exhibit more electronic noise. The leakage current of a good PIN diode is so low (<1 nA) that the Johnson-Nyquist noise of the load resistance in a typical circuit often dominates. In addition to emission, an LED can be used as a photodiode in light detection, and this capability may be used in a variety of applications including ambient light detection and bidirectional communications. As a photodiode, an LED is sensitive to wavelengths equal to or shorter than the predominant wavelength it emits. For example, a green LED is sensitive to blue light and to some green light, but not to yellow or red light.

PIN diode. A PIN diode is a diode with a wide, undoped intrinsic semiconductor region between a p-type semiconductor and an n-type semiconductor region. The p-type and n-type regions are typically heavily doped because they are used for ohmic contacts, and the wide intrinsic region is in contrast to an ordinary PN diode. The wide intrinsic region makes the PIN diode an inferior rectifier (one typical function of a diode), but it makes the PIN diode suitable for attenuators, fast switches, photodetectors, and high voltage power electronics applications. A PIN diode operates under what is known as high-level injection. In other words, the intrinsic "i" region is flooded with charge carriers from the "p" and "n" regions. The diode will conduct current once the flooded electrons and holes reach an equilibrium point, where the number of electrons is equal to the number of holes in the intrinsic region. When the diode is forward biased, the injected carrier concentration is typically several orders of magnitude higher than the intrinsic level carrier concentration. Due to this high level injection, which in turn is due to the depletion process, the electric field extends deeply (almost the entire length) into the region. This electric field helps in speeding up of the transport of charge carriers from P to N region, which results in faster operation of the diode, making it a suitable device for high frequency operations. As a photodetector, the PIN diode is reverse biased. Under reverse bias, the diode ordinarily does not conduct (save a small dark current or Is leakage). When a photon of sufficient energy enters the depletion region of the diode, it creates an electron-hole pair. The reverse bias field sweeps the carriers out of the region creating a current. Some detectors can use avalanche multiplication.

Avalanche photodiode. An Avalanche photodiodes have a similar structure to regular photodiodes, but they are operated with much higher reverse bias. This allows each photo-generated carrier to be multiplied by avalanche breakdown, resulting in internal gain within the photodiode, which increases the effective responsivity of the device. An avalanche photodiode (APD) is a highly sensitive semiconductor electronic device that exploits the photoelectric effect to convert light to electricity. APDs can be thought of as photodetectors that provide a built-in first stage of gain through avalanche multiplication. From a functional standpoint, they can be regarded as the semiconductor analog to photomultipliers. By applying a high reverse bias voltage (typically 100-200 V in silicon), APDs show an internal current gain effect (around 100) due to impact ionization (avalanche effect). However, some silicon APDs employ alternative doping and beveling techniques compared to traditional APDs that allow greater voltage to be applied (>1500 V) before breakdown is reached and hence a greater operating gain (>1000). In general, the higher the reverse voltage, the higher the gain. If very high gain is needed (105 to 106), certain APDs (single-photon avalanche diodes) can be operated with a reverse voltage above the APD's breakdown voltage. In this case, the APD needs to have its signal current limited and quickly diminished. Active and passive current quenching techniques have been used for this purpose. APDs that operate in this high-gain regime are in Geiger mode. This mode is particularly useful for single photon detection, provided that the dark count event rate is sufficiently low.

Phototransistor. A phototransistor is a light-sensitive transistor. A common type of phototransistor, called a photobipolar transistor, is in essence a bipolar transistor encased in a transparent case so that light can reach the base-collector junction. The electrons that are generated by photons in the base-collector junction are injected into the base, and this photodiode current is amplified by the transistor's current gain β (or hfe). If the emitter is left unconnected, the phototransistor becomes a photodiode. While phototransistors have a higher responsivity for light, they are not able to detect low levels of light any better than photodiodes. Phototransistors also have significantly longer response times. Field-effect phototransistors, also known as photoFETs, are light-sensitive field-effect transistors. Unlike photobipolar transistors, photoFETs control drain-source current by creating a gate voltage.

CMOS. Complementary Metal-Oxide-Semiconductor (CMOS) is a technology for constructing integrated circuits. The typical design style with CMOS uses complementary and symmetrical pairs of p-type and n-type metal oxide semiconductor field effect transistors (MOSFETs) for logic functions CCD. A Charge-Coupled Device (CCD) is a device for the movement of electrical charge, usually from within the device to an area where the charge can be manipulated, for example, converted into a digital value. This is achieved by "shifting" the signals between stages within the device one at a time. CCDs move charge between capacitive bins in the device, with the shift allowing for the transfer of charge between bins. In a CCD image sensor, pixels are represented by p-doped MOS capacitors. These capacitors are biased above the threshold for inversion when image acquisition begins, allowing the conversion of incoming photons into electron charges at the semiconductor-oxide interface; the CCD is then used to read out these charges. CCD image sensors are widely used in professional, medical, and scientific applications where high-quality image data is required.

An ultrasonic distance measurement principle is based on an ultrasonic transmitter that emits an ultrasonic wave in one direction, and started timing when it launched. Ultrasonic spread in the air, and would return immediately when it encountered obstacles on the way. At last, the ultrasonic receiver would stop timing when it received the reflected wave. As Ultrasonic spread velocity is about 340 meters/second in the air, based on the timer record 't', we can calculate the distance (s) between the obstacle and transmitter, namely: s=340t/2, which is called time difference distance measurement principle. The principle of ultrasonic distance measurement used the already-known air spreading velocity, measuring the time from launch to reflection when it encountered obstacle, and then calculating the distance between the transmitter and the obstacle according to the time and the velocity. Thus, the principle of ultrasonic distance measurement is the same with radar. Distance Measurement formula is expressed as: L=C×T, where in the formula, L is the measured distance, and C is the ultrasonic spreading velocity in air, also, T represents time (T is half the time value from transmitting to receiving).

When a longitudinal sound wave strikes a flat surface, sound is reflected (or backscattered) in a coherent manner, provided that the dimension of the reflective surface is large compared to the wavelength of the sound. Note that audible sound has a very wide frequency range (from 20 to about 20,000 Hz), and thus a very wide range of wavelengths (from about 20 mm to 20 m). As a result, the overall nature of the reflection varies according to the texture and structure of the surface. For example, porous materials will absorb some energy, and rough materials (where rough is relative to the wavelength) tend to reflect in many directions, to scatter the energy, rather than to reflect it coherently.

In the pulse echo method, an ultrasonic pulse having a frequency typically ranging from about 20 kHz to about 100 kHz is generated and transmitted to an object at time T0. Then, the ultrasonic pulse is reflected (or backscattered) from the object, thereby an echo pulse of the ultrasonic pulse being detected by a sensor at time T1. In this regard, a propagation time of the pulse can be defined to be (T1−T0) and, accordingly a distance to the object can be given by a half of a multiplication of the propagation time and a velocity of an ultrasonic wave c, i.e., (0.5×(T1−T0)×c), wherein a velocity of an ultrasonic wave c is a known value. One of the good reasons to adopt an ultrasonic wave having a frequency ranging from 20 kHz to 100 kHz is to implement a high directivity of an ultrasonic pulse in the air. Generally, when a piston-shaped ultrasonic wave generator having a radius that harmonically oscillates with a frequency set to 'f', an ultrasonic wave beam propagates through the air with a form of a nearly planar wave in a near field. However, the beam becomes spread-wide, thereby having a form of a circular cone in a far field, by a diffraction thereof in proportional to a propagating distance. Accordingly, a beam width becomes larger as the wave propagates farther from the wave generator and consequently, an angle is formed between an outermost sideline of the propagating beam and a central direction line of the propagation. The angle of convergence of the ultrasonic wave is inversely proportional to the frequency f and the radius a of the piston-shaped ultrasonic wave generator. As the angle of convergence becomes smaller, the beam width of the ultrasonic wave becomes narrower and, resultantly, a spatial resolution can be increased. Therefore, it is generally desirable to minimize the beam width to achieve a high resolution in a spatial domain.

The relationship between the angle of convergence and the beam width of the ultrasonic wave teaches that the beam width is minimized by increasing the frequency f of the ultrasonic wave. However, the method of increasing the frequency of the ultrasonic wave has a drawback that a measurable range of a distance decreases, because the ultrasonic wave is attenuated in proportional to square of the frequency. Another method for minimizing the beam width is to increase the radius a of the piston-shaped ultrasonic wave generator. However, it is practically difficult to implement the larger radius of the piston-shaped ultrasonic wave generator mechanically. Furthermore, a size of a sensor therein becomes large in proportional to the diameter thereof. For the reasons stated above, the commonly used sensors have the radius which is less than or equal to 15 mm, and measures the distance by using the ultrasonic wave at the frequency of 40 kHz. Meanwhile, a directivity characteristic of the sensors can be represented with a half power beam width 2θHP (hereinafter, referred to as HPBW for simplicity). For example, for a commonly used sensor having the radius of 12 mm and using the frequency of 40 kHz, the HPBW is known to be about 20 degrees. In this case, the beam width of the wave becomes larger than 1 m at a 5 m distant place from the sensor. In this regard, although the beam width is also slightly dependent on other factors, e.g., duration of the pulse or a source type (piston source or Gaussian source), the sensor having the aforementioned directivity characteristic is generally called to have the spatial resolution of 1 m at a 5 m distant place from the sensor.

In one example, distance measuring is based on the electro-acoustic techniques, where the measuring uses transmitting a short pulse of sound, typically at a frequency inaudible to the ear (ultrasonic sound or ultrasound). Afterwards, the device listens for an echo. The time elapsed during transmission to echo reception gives information on the distance to the object. In such a scheme, the propagating waves are audible or non-audible sound (acoustic) waves, the emitter 11 is an ultrasonic transducer 27 that may be a speaker, and the sensor 13 is an ultrasonic transducer 28 that may be a microphone, serving as part of an acoustic-based distance meter 15*b* shown in a view 20*a* in FIG. 2*a*. Range detection using acoustic echoing is described in an article published in the International Journal of Advanced Research in Electrical, Electronics and Instrumentation Engineering (IJAREEIE) Vol. 3, Issue 2, February 2014 (ISSN: 2320-3765) by Rajan P. Thomas et al. entitled: "*Range Detection based on Ultrasonic Principle*", and in chapter 21 entitled: "Sonar Sensing" of the book "*Springer Handbook of Robotics*" by Siciliano B. and Khatib, O. (Editors) published 2008 by Springer (ISBN: 978-3-540-23957-4), which are both incorporated in their entirety for all purposes as if fully set forth herein.

In one example, the acoustic sensor 27 may consist of, or may comprise, a microphone Model Number SPH0641LU4H-1 or SiSonic™ sensor Model Number SPM0404UD5 both available from Knowles Electronics or Knowles Acoustics (a division of Knowles Electronics, LLC) headquartered in Itasca, IL, U.S.A., and respectively described in a product data sheet C10115945 Revision A dated May 16, 2014 entitled: "*Digital Zero-Height SiSonic™ Microphone With Multi-Mode And Ultrasonic Support*" and in a specification DMS, C10109833 Revision A dated Jul. 20, 2009 entitled: " "*Mini" SiSonic Ultrasonic Acoustic Sensor Specification*", which are both incorporated in their entirety for all purposes as if fully set forth herein. Using acoustic sensors is described in Knowles Acoustics application note AN16 Revision 1.0 dated Apr. 20, 2006 entitled: "*SiSonic Design Guide*", which is incorporated in its entirety for all purposes as if fully set forth herein.

Acoustics-based distance meters are typically based on that in dry air, at 20° C. (68° F.), the speed of sound is 343 meters per second. Weather conditions, however, affect the behavior of the sound waves, and the speed of sound varies with pressure, temperature, and humidity. A system and method for compensating ultrasonic sensors mounted on a vehicle for speed of sound variations is described in U.S. Pat. No. 8,656,781 to Lavoie entitled: "Method and System for Compensation of Ultrasonic Sensor", which is incorporated in its entirety for all purposes as if fully set forth herein. The ultrasonic sensor is operatively coupled to a power train control module having a pressure sensor that continuously monitors atmospheric pressure and a controller configured for computing a compensated speed of sound using the monitored atmospheric pressure. The ultrasonic sensor sends an ultrasonic wave and determines the time lag in receiving the reflected ultrasonic wave from an object. Subsequently, the ultrasonic sensor generates a signal corresponding to the relative distance between the vehicle and the object using the compensated speed of sound and the time lag.

A distance measuring device that is humidity and temperature compensated is described in U.S. Pat. No. 7,263,031 to Sanoner et al. entitled: "Distance Measuring Device for Acoustically Measuring Distance", which is incorporated in its entirety for all purposes as if fully set forth herein. The device includes a transmitter for transmitting an acoustic signal at a distant object, an acoustic signal receiver for receiving a reflected acoustic signal reflected from the distant object, a temperature sensor detecting air temperature, a humidity sensor detecting air humidity, an amplifier amplifying the reflected acoustic signal, a comparator coupled to the amplifier comparing the amplified reflected acoustic signal with a reference and generating a comparator output when the level of the amplified reflected acoustic signal exceeds the reference, a gain controller increasing the gain from transmitting an acoustic signal until the comparator output is generated, a threshold generator providing the reference to the comparator and decreasing the reference at an exponential rate from transmitting the acoustic signal until the comparator output is generated, and a controller determining use of only the air temperature, velocity of the acoustic signal, and distance traveled from transmitting the acoustic signal until the comparator output is generated.

Ultrasound. Ultrasounds (a.k.a. supersonic) are sound waves with frequencies higher than the upper audible limit of human hearing. Ultrasound is not different from 'normal' (audible) sound in its physical properties, only in that humans cannot hear it. This limit varies from person to person and is approximately 20 KHz (kilohertz) (20,000 hertz) in healthy, young adults. Ultrasound devices operate with frequencies from 20 KHz up to several gigahertz. An ultrasound herein may comprise a sound wave having a carrier or center frequency of higher than 20 KHz, 30 KHz, 50 KHz, 80 KHz, 100 KHz, 150 KHz, 200 KHz, 250 KHz, 300 KHz, 350 KHz, 400 KHz, 450 KHz, 500 KHz, 550 KHz, 600 KHz, 650 KHz, 700 KHz, 750 KHz, 800 KHz, 850 KHz, 900 KHz, or 950 KHz. Alternatively or in addition, an ultrasound herein may comprise a sound wave having a carrier or center frequency of lower than 25 KHz, 30 KHz, 50 KHz, 80 KHz, 100 KHz, 150 KHz, 200 KHz, 250 KHz, 300 KHz, 350 KHz, 400 KHz, 450 KHz, 500 KHz, 550 KHz, 600 KHz, 650 KHz, 700 KHz, 750 KHz, 800 KHz, 850 KHz, 900 KHz, or 950 KHz.

Ultrasonic transducers are transducers that convert ultrasound waves to electrical signals or vice versa. Those that both transmit and receive may also be called ultrasound transceivers; many ultrasound sensors besides being sensors are indeed transceivers because they can both sense and transmit. Active ultrasonic sensors generate high-frequency sound waves and evaluate the echo, which is received back by the sensor, measuring the time interval between sending the signal and receiving the echo to determine the distance to an object. Passive ultrasonic sensors are basically microphones that detect ultrasonic noise that is present under certain conditions, convert it to an electrical signal, and report it to a computer. Ultrasonic transducers are typically based on, or use, piezoelectric transducers or capacitive transducers. Piezoelectric crystals change size and shape when a voltage is applied; AC voltage makes them oscillate at the same frequency and produce ultrasonic sound. Capacitive transducers use electrostatic fields between a conductive diaphragm and a backing plate. The beam pattern of a transducer can be determined by the active transducer area and shape, the ultrasound wavelength, and the sound velocity of the propagation medium. Since piezoelectric materials generate a voltage when force is applied to them, they can also work as ultrasonic detectors. Some systems use separate transmitters and receivers, while others combine both functions into a single piezoelectric transceiver. Ultrasound transmitters can also use non-piezoelectric principles, such as magnetostriction. Materials with this property change size slightly when exposed to a magnetic field, and make practical transducers. A capacitor ("condenser") microphone has a thin diaphragm that responds to ultrasound waves. Changes in the electric field between the diaphragm and a closely spaced backing plate convert sound signals to electric currents, which can be amplified.

Typically a microphone 13*b* may be based on converting audible or inaudible (or both) incident sound to an electrical signal by measuring the vibration of a diaphragm or a ribbon. The microphone may be a condenser microphone, an electret microphone, a dynamic microphone, a ribbon microphone, a carbon microphone, or a piezoelectric microphone. The speaker 11*b* may be a sounder that converts electrical energy to sound waves transmitted through the air, an elastic solid material, or a liquid, usually by means of a vibrating or moving ribbon or diaphragm. The sound may be audible or inaudible (or both), and may be omnidirectional, unidirectional, bidirectional, or provide other directionality or polar patterns. A sounder may be an electromagnetic loudspeaker, a piezoelectric speaker, an electrostatic loudspeaker (ESL), a ribbon or planar magnetic loudspeaker, or a bending wave loudspeaker. A sounder may be an electromechanical type, such as an electric bell, a buzzer (or beeper), a chime, a whistle or a ringer and may be either electromechanical or ceramic-based piezoelectric sounders. The sounder may emit a single or multiple tones, and can be in continuous or intermittent operation.

A short distance ultrasonic distance meter with provisions to reduce the ill-effects of ringing when measurements are of obstacles closer than about ten inches is disclosed in U.S. Pat. No. 5,483,501 to Park et al. entitled: "Short Distance Ultrasonic Distance Meter", which is incorporated in its entirety for all purposes as if fully set forth herein. In one embodiment an opposite phase ultrasonic wave is introduced by a circuit and in another embodiment a strain sensor introduces negative feedback to effect cancellation of ringing. Finally, in a third embodiment, both the negative feedback and opposite phase methods are employed for optimal results.

A non-contact type ultrasonic distance measuring device that includes a microprocessor for controlling operation of a transducer that functions as both a sonic transmitter and receiver is described in U.S. Pat. No. 5,163,323 to Davidson entitled: "Ultrasonic Distance Measuring Instrument", which is incorporated in its entirety for all purposes as if fully set forth herein. Microprocessor programming provides a control scheme whereby an operator can program different modes of operation into the instrument by depressing buttons arranged on a rear display panel of the instrument. Mode programming is accomplished in a manner similar to setting a digital watch, with the modes displayed in a display window. The mode programming and component operation provide a gate scheme where gate control is provided through application of gain control through three amplifiers, one of which is a fourth order bandpass filter that is operated by the microprocessor to provide a controlled increase in gain or "Q" as the elapsed time from a transmission becomes greater. The program self-adjusts during operation to sense the distances to close targets and to targets as far away as seventy feet and can provide an accurate identification of a target through clutter as may exist in some instrument applications. Pulsing control is also provided for in the mode programming, whereby, after a single pulse is sent, the instrument will not send a next pulse until the expiration of a set time period.

A system and method for sensing proximity of an object includes a signal generator, which generates a plurality of signals, is described in U.S. Pat. No. 7,679,996 to Gross entitled: "Methods and Device for Ultrasonic Range Sensing", which is incorporated in its entirety for all purposes as if fully set forth herein. A transducer is in communication with the signal generator to receive the plurality of signals from the signal generator. The transducer is capable of transforming a plurality of signals from the signal generator into a plurality of ultrasonic waves. The plurality of ultrasonic waves includes a first ultrasonic wave and a second ultrasonic wave, wherein the first ultrasonic wave and the second ultrasonic wave are formed out of phase. The plurality of ultrasonic waves are directed toward and reflected (or backscattered) by the object. The transducer receives the plurality of ultrasonic waves reflected by the object, which become a plurality of received ultrasonic waves. An analog to digital converter is in communication with the transducer.

The received plurality of ultrasonic waves reflected by the object is communicated to the analog to digital converter by the transducer.

An ultrasonic distance meter cancels out the effects of temperature and humidity variations by including a measuring unit and a reference unit is described in U.S. Pat. No. 5,442,592 to Toda et al. entitled: "Ultrasonic Distance Meter", which is incorporated in its entirety for all purposes as if fully set forth herein. In each of the units, a repetitive series of pulses is generated, each having a repetition rate directly related to the respective distance between an electroacoustic transmitter and an electroacoustic receiver. The pulse trains are provided to respective counters, and the ratio of the counter outputs is utilized to determine the distance being measured.

An ultrasonic ranging method for measuring a distance to an object in an air is described in U.S. Pat. No. 7,196,970 to Moon et al. entitled: "Ultrasonic Ranging System and Method Thereof in Air by Using Parametric Array", which is incorporated in its entirety for all purposes as if fully set forth herein. The method includes the steps of generating a first and a second primary ultrasonic waves having a frequency f1 and f2, respectively, transmitting the first and the second primary ultrasonic waves in a same direction, wherein a secondary ultrasonic wave having a frequency corresponding to the difference of two frequencies $fd=f1-f2$ is created by a nonlinear property of the air and radiated to the object, detecting an echo pulse of the secondary ultrasonic wave reflected from the object, and measuring the distance to the object based on a propagation time of the secondary wave.

A method and device for ultrasonic ranging is described in U.S. Pat. No. 5,793,704 to Freger entitled: "Method and Device for Ultrasonic Ranging", which is incorporated in its entirety for all purposes as if fully set forth herein. As in prior art devices, ultrasound pulses are transmitted by the device towards a target, and echo pulses from the target are received. The timing of the maximum of the amplitude envelope of the echo pulses is picked and used as a measure of the return time of these pulses. This maximum envelope time is relatively independent of the speed of sound between the device and the target. Preferably, the duration of the echo pulses is less than the response time of the receiving circuit, to enable an accurate pick of the amplitude envelope maximum.

An ultrasonic wave propagation time measurement system is disclosed in U.S. Pat. No. 8,806,947 to Kajitani entitled: "Ultrasonic Wave Propagation Time Measurement System", which is incorporated in its entirety for all purposes as if fully set forth herein. The system comprises: a transmitting section that transmits an electromagnetic wave signal indicating transmission timing and an ultrasonic wave signal, and a receiving section that detects the transmitted electromagnetic wave signal and the ultrasonic wave signal, and calculates an ultrasonic wave propagation time based on reception times of the electromagnetic wave signal and the ultrasonic wave signal; and an initial mode setting mechanism that constitutes an optimum ultrasonic wave transmission/reception system by selecting the set values of one or more setting parameters is provided in a controlling unit that controls the transmission of the signals in the transmitting section and in a data processing unit that controls the detection and calculation in receiving section.

A method for measuring distance, which improves the resolution and the selectivity in an echo method, using propagation-time measurement, is disclosed in U.S. Pat. No. 6,804,168 to Schlick et al. entitled: "Method for Measuring Distance", which is incorporated in its entirety for all purposes as if fully set forth herein. In this context, a received signal is sampled without first having to smooth the signal.

An ultrasonic wave transmitter device is described in U.S. Pat. No. 9,128,565 to Kajitani et al. entitled: "Ultrasonic Wave Transmitter Device, Ultrasonic Wave Propagation Time Measurement System and Ultrasonic Wave Propagation Time Measurement Method", which is incorporated in its entirety for all purposes as if fully set forth herein. The device includes an ultrasonic wave driving circuit that modulates an ultrasonic wave based on a pseudorandom signal to generate an ultrasonic wave driving signal, and an ultrasonic wave transmitter driven by the ultrasonic wave driving signal to send out an ultrasonic wave signal of a frequency higher than a fundamental frequency of the ultrasonic wave driving signal. The ultrasonic wave transmitter includes a cylindrically-shaped piezoelectric or magnetostrictive element, sending out the ultrasonic wave signal and an ultrasonic wave absorber that covers part of a base member holding the piezoelectric or magnetostrictive element.

A distance measurement method and device using ultrasonic is described in U.S. Patent Application Publication No. 2006/0247526 to Lee et al. entitled: "Distance Measurement Method and Device Using Ultrasonic Waves", which is incorporated in its entirety for all purposes as if fully set forth herein. The method provides for sufficiently amplifying a received ultrasonic wave signal and separating a specific frequency from an ultrasonic wave signal mixed with an unnecessary signal to extract an arrival signal of a first pulse. It is thus possible to calculate a distance of an object safely.

An ultrasonic distance measurement is described in an Application Note No. AN4841 Rev. 1.0, 3/2014 by Freescale Semiconductor, Inc. entitled: "*S12ZVL LIN Enabled Ultrasonic Distance Measurement—Based on the MC9S12ZVL32 MagniV Device*", which is incorporated in its entirety for all purposes as if fully set forth herein. The ultrasonic distance measurement is further described in PEPPERL+FUCHS Group guide Part No. 255933 dated (10/15) entitled: "*Technology Guide Ultrasonic*", which is incorporated in its entirety for all purposes as if fully set forth herein. An ultrasonic module HC-SR04 is available from Cytron Technologies Sdn. Bhd. Headquartered in Johor, Malaysia, and described in Cytron Technologies user manual entitled: "*Product User's Manual—HC-SR04 Ultrasonic Sensor*", which is incorporated in its entirety for all purposes as if fully set forth herein. An ultrasonic distance meter is further described is an International Journal of Scientific & Engineering Research Volume 4, Issue 3, March 2013 (ISSN 2229-5518) by Md. Shamsul Arefin and Tajrian Mollick entitled: "*Design of an Ultrasonic Distance Meter*", and in Texas Instruments Incorporated Application Report (SLAA136A—October 2001) by Murugavel Raju entitled: "*Ultrasonic Distance Measurements With the MSP430*", which are both incorporated in their entirety for all purposes as if fully set forth herein. Another ultrasonic-based distance meter is Extech DT100 available from Extech Instruments Corporation (a FUR Company) described in a User Guide dated 2006 entitled: "*Ultrasonic Distance Finder*" (Model DT100-EU-EN V4.2 6/09), which is incorporated in its entirety for all purposes as if fully set forth herein. Ultrasonic range finders may use or comprise HRLV-MaxSonar® modules available from MaxBotix® Incorporated headquartered in Brainerd, MN, U.S.A. and described in a MaxBotix® Incorporated 2014 data-sheet (PD11721h) entitled:

"*HRLV-MaxSonar®-EZ™ Series—High Resolution, Precision, Low Voltage Ultrasonic Range Finder MB*1003, *MB*1013, *MB*1023, *MB*1033, *MB*1043", which is incorporated in its entirety for all purposes as if fully set forth herein. An ultrasonic distance measurement is further described in an Application Note by Freescale Semiconductor, Inc. Document Number: AN4841 Rev. 1.0, 3/2014 entitled: "*S*12*ZVL LIN Enabled Ultrasonic Distance Measurement—Based on the MC9S*12*ZVL*32 *MagniV Device*", which is incorporated in its entirety for all purposes as if fully set forth herein.

Radar. In a radar system, an antenna may serve as the emitter 11 or as the sensor 13. Preferably, the same antenna may be used for both transmitting the electro-magnetic wave functioning as the emitter 11, and for receiving the reflected (or backscattered) waves functioning as the sensor 13. The transmitted wave may use a millimeter wave, defined as wavelength of 10 to 1 millimeter (corresponding to a frequency of 30 to 300 GHz), and may use an ISM frequency band. Alternatively or in addition, the W-Band may be used, ranging from 75 to 110 GHz (wavelength of ~2.73-4 mm). The W-band is used for satellite communications, millimeter-wave radar research, military radar targeting and tracking applications, and some non-military applications. Further, a frequency around 77 GHz (76-77 GHz) that is typically used for automotive cruise control radar may be used, as well as a frequency band of 79 GHz (77-81 GHz).

The radar may use, or may be based on, a Micropower Impulse Radar (MIR), which rapidly emits radio pulses (approximately one million per second) that are extremely short (less than a billionth of a second in duration) and that are in a frequency range substantially lower than convention radars. Low frequency pulses are better able to penetrate solid objects. Additionally, MIR radars are extremely selective in their range gating capabilities. It is possible to examine and record only those echoes that could have been generated by an object within a certain range from the radar unit and ignore all others. Due to the high pulse rate and low frequency, echoes from many objects that may be lined up in a row may be received, thus allowing the radar to "see behind" objects, detecting other objects that would otherwise be visually hidden. MIR is described in an article published in Science & Technology Review January/February 1996 entitled: "*Micropower Impulse Radar*", and using UWB is described in InTech 2012 Chapter 3 document by Xubo Wang, Anh Dinh and Daniel Teng entitled: "Radar Sensing Using Ultra Wideband—Design and Implementation", which are both incorporated in their entirety for all purposes as if fully set forth herein.

Antenna. An antenna (plural antennae or antennas), or aerial, is an electrical device which converts electric power into radio waves, and vice versa, and is usually used with a radio transmitter or radio receiver. In transmission, a radio transmitter supplies an electric current oscillating at radio frequency (i.e. a high frequency Alternating Current (AC)) to the antenna's terminals, and the antenna radiates the energy from the current as electromagnetic waves (radio waves). In reception, an antenna intercepts some of the power of an electromagnetic wave in order to produce a tiny voltage at its terminals that is applied to a receiver to be amplified.

Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

Directional antenna. A directional antenna or beam antenna is an antenna that radiates or receives greater power in specific directions allowing for increased performance and reduced interference from unwanted sources. Directional antennas provide increased performance over dipole antennas—or omnidirectional antennas in general—when a greater concentration of radiation in a certain direction is desired. A High-Gain Antenna (HGA) is a directional antenna with a focused, narrow radiowave beam width. This narrow beam width allows more precise targeting of the radio signals. When transmitting, a high-gain antenna allows more of the transmitted power to be sent in the direction of the receiver, increasing the received signal strength. When receiving, a high gain antenna captures more of the signal, again increasing signal strength. Due to reciprocity, these two effects are equal—an antenna that makes a transmitted signal 100 times stronger (compared to an isotropic radiator), will also capture 100 times as much energy as the isotropic antenna when used as a receiving antenna. As a consequence of their directivity, directional antennas also send less (and receive less) signal from directions other than the main beam. This property may be used to reduce interference. There are many ways to make a high-gain antenna—the most common are parabolic antennas, helical antennas, Yagi antennas, and phased arrays of smaller antennas of any kind. Horn antennas can also be constructed with high gain, but are less commonly seen.

Aperture antenna. Aperture antennas are the main type of directional antennas used at microwave frequencies and above, and consist of a small dipole or loop feed antenna inside a three-dimensional guiding structure large compared to a wavelength, with an aperture to emit the radio waves. Since the antenna structure itself is nonresonant they can be used over a wide frequency range by replacing or tuning the feed antenna. A parabolic antenna is widely used high gain antenna at microwave frequencies and above, and consists of a dish-shaped metal parabolic reflector with a feed antenna at the focus. It can have some of the highest gains of any antenna type, up to 60 dBi, but the dish must be large compared to a wavelength. A horn antenna is a simple antenna with moderate gains of 15 to 25 dBi consists of a flaring metal horn attached to a waveguide. Used for applications such as radar guns, radiometers and as feed antennas for parabolic dishes. A slot antenna consist of a waveguide with one or more slots cut in it to emit the microwaves. Linear slot antennas emit narrow fan-shaped beams, and are used as UHF broadcast antennas and marine radar antennas. A dielectric resonator antenna consists of small ball or puck-shaped piece of dielectric material excited by aperture in waveguide used at millimeter wave frequencies.

Parabolic antenna. A parabolic antenna is an antenna that uses a parabolic reflector, a curved surface with the cross-sectional shape of a parabola, to direct the radio waves. The most common form is shaped like a dish and is popularly called a dish antenna or parabolic dish. The main advantage of a parabolic antenna is that it has high directivity. It functions similarly to a searchlight or flashlight reflector to direct the radio waves in a narrow beam, or receive radio waves from one particular direction only. Parabolic antennas have some of the highest gains, that is, they can produce the narrowest beam-widths, of any antenna type. In order to achieve narrow beam-widths, the parabolic reflector must be much larger than the wavelength of the radio waves used, so parabolic antennas are used in the high frequency part of the radio spectrum, at UHF and microwave (SHF) frequencies, at which the wavelengths are small enough that conveniently-sized reflectors can be used.

The operating principle of a parabolic antenna is that a point source of radio waves at the focal point in front of a paraboloidal reflector of conductive material will be reflected into a collimated plane wave beam along the axis of the reflector. Conversely, an incoming plane wave parallel to the axis will be focused to a point at the focal point. A typical parabolic antenna consists of a metal parabolic reflector with a small feed antenna suspended in front of the reflector at its focus, pointed back toward the reflector. The reflector is a metallic surface formed into a paraboloid of revolution and usually truncated in a circular rim that forms the diameter of the antenna. In a transmitting antenna, radio frequency current from a transmitter is supplied through a transmission line cable to the feed antenna, which converts it into radio waves. The radio waves are emitted back toward the dish by the feed antenna and reflect off the dish into a parallel beam. In a receiving antenna the incoming radio waves bounce off the dish and are focused to a point at the feed antenna, which converts them to electric currents which travel through a transmission line to the radio receiver.

Horn antenna. A horn antenna or microwave horn is an antenna that consists of a flaring metal waveguide shaped like a horn to direct radio waves in a beam. Horns are widely used as antennas at UHF and microwave frequencies, above 300 MHz, and are used as feeders (called feed horns) for larger antenna structures such as parabolic antennas, as standard calibration antennas to measure the gain of other antennas, and as directive antennas for such devices as radar guns, automatic door openers, and microwave radiometers. Their advantages are moderate directivity, low standing wave ratio (SWR), broad bandwidth, and simple construction and adjustment. An advantage of horn antennas is that since they have no resonant elements, they can operate over a wide range of frequencies, a wide bandwidth. The usable bandwidth of horn antennas is typically of the order of 10:1, and can be up to 20:1 (for example allowing it to operate from 1 GHz to 20 GHz). The input impedance is slowly varying over this wide frequency range, allowing low voltage standing wave ratio (VSWR) over the bandwidth. The gain of horn antennas typically ranges up to 25 dBi, with 10-20 dBi being.

Horns can have different flare angles as well as different expansion curves (elliptic, hyperbolic, etc.) in the E-field and H-field directions, making it possible for a wide variety of different beam profiles. A pyramidal horn is a common horn antenna with the horn in the shape of a four-sided pyramid, with a rectangular cross section, used with rectangular waveguides, and radiate linearly polarized radio waves. A sectoral horn is a pyramidal horn with only one pair of sides flared and the other pair parallel, and produces a fan-shaped beam, which is narrow in the plane of the flared sides, but wide in the plane of the narrow sides. An E-plane horn is a sectoral horn flared in the direction of the electric or E-field in the waveguide, an H-plane horn is a sectoral horn flared in the direction of the magnetic or H-field in the waveguide, and a conical horn is a horn in the shape of a cone, with a circular cross section, typically used with cylindrical waveguides. An exponential horn (also called a scalar horn) is a horn with curved sides, in which the separation of the sides increases as an exponential function of length, and can have pyramidal or conical cross sections. Exponential horns have minimum internal reflections, and almost constant impedance and other characteristics over a wide frequency range, and are used in applications requiring high performance, such as feed horns for communication satellite antennas and radio telescopes. A corrugated horn is a horn antenna with parallel slots or grooves, small compared with a wavelength, covering the inside surface of the horn, transverse to the axis. Corrugated horns have wider bandwidth and smaller sidelobes and cross-polarization, and are widely used as feed horns for satellite dishes and radio telescopes. A dual-mode conical horn may be used to replace the corrugated horn for use at sub-mm wavelengths where the corrugated horn is lossy and difficult to fabricate. A diagonal horn is a simple dual-mode horn superficially looks like a pyramidal horn with a square output aperture. However, the square output aperture is seen to be rotated 45° relative to the waveguide. These horns are typically machined into split blocks and used at sub-mm wavelengths. A ridged horn is a pyramidal horn with ridges or fins attached to the inside of the horn, extending down the center of the sides, and the fins lower the cutoff frequency, increasing the antenna's bandwidth. A septum horn is a horn which is divided into several subhorns by metal partitions (septums) inside, attached to opposite walls.

Using radar technology for distance measuring is described in Krohne Messtechnik Gmbh & Co. KG 07/2003 publication (7.02337.22.00) by Dr.-Ing. Detlef Brumbi entitled: "*Fundamentals of Radar Technology for Level Gauging, 4th Edition*", which is incorporated in its entirety for all purposes as if fully set forth herein. Radar distance measuring system is described in a paper published in Journal of Computers, Vol. 6, No. 4, April 2011 by Zhao Zeng-rong and Bai Ran entitled: "*A FMCW Radar Distance Measure System based on LabVIEW*", which is incorporated in its entirety for all purposes as if fully set forth herein. Automotive radar systems using integrated 24 GHz radar sensor techniques are described in a paper by Michael Klotz and Hermann Rohling published 4/2001 in the Journal of telecommunications and Information Technology entitled: "*24 GHz radar sensor for automotive applications*", which is incorporated in its entirety for all purposes as if fully set forth herein.

A micropower impulse radar that may be used to take measurements, such as those needed to establish room size and the dimensions and location of objects within the walls of a room, is described in U.S. Pat. No. 6,006,021 to Tognazzini entitled: "Device for Mapping Dwellings and Other Structures in 3D", which is incorporated in its entirety for all purposes as if fully set forth herein. A computer controls the scanning of the radar and the collection of data-points. A global positioning satellite (GPS) unit locates the precise portion of the radar and another unit loads a fixed referenced location to which all measurements from different rooms are baselined. By collecting points and referencing them to a common point or wireframe representation of a building can be developed from which "as built" architectural plans can be produced.

A system and method for the taking of a large number of distance images having distance picture elements is described in U.S. Pat. No. 7,787,105 to Hipp entitled: "Taking Distance Images", which is incorporated in its entirety for all purposes as if fully set forth herein. Electromagnetic radiation is transmitted in the form of transmission pulses at objects, and reflected (or backscattered) echo pulses are detected. Measurements are made by determining the pulse time of flight of the distances of objects which respectively form a distance picture element and at which the transmission pulses are reflected. A time measuring device carries out a plurality of associated individual measurements for each distant image to be taken. Stored event lists of all time measuring channels are read out and evaluated in order to convert the respective time information contained in the event lists into distance values corresponding to the distance picture elements.

A device for distance measurement by radar is described in U.S. Pat. No. 6,232,911 to O'Conner entitled: "Device for Distance Measurement by Radar", which is incorporated in its entirety for all purposes as if fully set forth herein. The device comprises a frequency modulated radar-transmitter and -receiver by which a radar beam is directed onto an object to be measured and in which by mixing the transmitted and the received frequency a beat signal is obtained. By use of frequency modulation, the frequency of the transmitted radar signal of the radar-transmitter and -receiver is variable periodically according to a saw tooth function. The frequency of the beat signal, due to the travel time of the radar signal reflected by the object, represents a measured value for the distance of the object. A signal processing circuit generates from the beat signal obtained a measured value of the distance. For this purpose the beat signal is fed into a phase control circuit or phase locked loop circuit, the output frequency of which makes the measured value of distance.

A radar range finder for high-precision, contactless range measurement is described in U.S. Pat. No. 5,546,088 to Trummer et al. entitled: "High-Precision Radar Range Finder", which is incorporated in its entirety for all purposes as if fully set forth herein. The finder is based on the FMCW principle and operates with digital signal processing at a limited frequency shift.

A radar system for determining the range at a future time of a target moving relative to the radar system is described in U.S. Pat. No. 5,341,144 to Stove entitled: "Vehicular Cruise Control System and Radar System Therefor", which is incorporated in its entirety for all purposes as if fully set forth herein. The system comprises an R.F. source for providing a signal at a frequency, which increases over time from a base frequency f (Hz) at a rate r (Hz/s) for a sweep duration d(s). This signal is transmitted and a signal reflected by the target is mixed with a portion of the transmitted signal to give a signal having a frequency proportional to the range of the target. The R.F. source is arranged to have a sweep rate r equal to the base frequency f divided by a time t (s) where time is the delay until the target will be at the measured range. A predicted range may thus be derived without complex compensation for relative velocity. The system may further provide velocity feedback without requiring extra circuitry.

A radar measuring device which, with a simple design, ensures reliable distance determination even when a mixed signal is zero, and a method for operating a radar measuring device, is described in U.S. Pat. No. 7,095,362 to Hoetzel et al. entitled: "Radar measurement Device, Especially for a Motor Vehicle, and Method for Operating a Radar Measurement Device", which is incorporated in its entirety for all purposes as if fully set forth herein. The radar measuring device includes a high-frequency oscillator which emits two different carrier frequency signals, a first switching device for switching the carrier frequency signals as a function of first pulse signals and emitting radar pulse signals, a transmission antenna and a receiving antenna, a second switching device for switching the carrier frequency signals as a function of a delayed second pulse signal and emitting delayed radar pulse signals, and a mixing device for mixing received radar signals with the delayed radar pulse signals and emitting mixed signals. The phase differences between the received radar signals and delayed radar pulse signals differ by a predetermined value when the two carrier frequency signals are emitted. An amplitude signal is subsequently determined from the first and second mixed signal.

A radar range finder and hidden object locator is based on ultra-wide band radar with a high resolution swept range gate is described in U.S. Pat. No. 5,774,091 to McEwan entitled: "Short Range Micro-Power Impulse Radar with High Resolution Swept Range Gate with Damped Transmit and Receive Cavities", which is incorporated in its entirety for all purposes as if fully set forth herein. The device generates an equivalent time amplitude scan with atypical range of 4 inches to 20 feet, and an analog range resolution as limited by a jitter of on the order of 0.01 inches. A differential sampling receiver is employed to effectively eliminate ringing and other aberrations induced in the receiver by the near proximity of the transmit antenna, so a background subtraction is not needed, simplifying the circuitry while improving performance. Uses of the invention include a replacement of ultrasound devices for fluid level sensing, automotive radar, such as cruise control and parking assistance, hidden object location, such as stud and rebar finding. Also, this technology can be used when positioned over a highway lane to collect vehicle count and speed data for traffic control. Techniques are used to reduce clutter in the receive signal, such as decoupling the receive and transmit cavities by placing a space between them, using conductive or radiative damping elements on the cavities, and using terminating plates on the sides of the openings.

Harmonic techniques that are employed to leverage low-cost, ordinary surface mount technology (SMT) to high microwave frequencies where tight beamforming with a small antenna makes reliable, high-accuracy pulse-echo radar systems possible, are described in U.S. Pat. No. 6,191,724 to McEwan entitled: "Short Pulse Microwave Transceiver", which is incorporated in its entirety for all purposes as if fully set forth herein. The implementation comprises a 24 GHz short-pulse transceiver comprised of a pulsed harmonic oscillator employed as a transmitter and an integrating, pulsed harmonic sampler employed as a receiver. The transmit oscillator generates a very short (0.5 ns) phase-coherent harmonic-rich oscillation at a sub-multiple of the actual transmitter frequency. A receiver local oscillator operates at a sub-multiple of the transmit frequency and is triggered with controlled timing to provide a very short (0.5 ns), phase-coherent local oscillator burst. The local oscillator burst is coupled to an integrating harmonic sampler to produce an integrated, equivalent-time replica of the received RF. The harmonic techniques overcome four major problems with non-harmonic approaches: 1) expensive, precision assembly, 2) high local oscillator noise, 3) sluggish oscillator startup, and 4) spurious local oscillator injection locking on external RF. The transceiver can be used for automotive backup and collision warning, precision radar rangefinding for fluid level sensing and robotics, precision radiolocation, wideband communications, and time-resolved holographic imaging.

A pulse-echo radar measures non-contact range while powered from a two-wire process control loop is described in U.S. Pat. No. 6,535,161 to McEwan entitled: "Loop Powered Radar Rangefinder", which is incorporated in its entirety for all purposes as if fully set forth herein. A key improvement over prior loop-powered pulse-echo radar is the use of carrier-based emissions rather than carrier-free ultrawideband impulses, which are prohibited by FCC regulations. The radar is based on a swept range-gate homodyne transceiver having a single RF transistor and a single antenna separated from the radar transceiver by a transmission line. The transmission line offers operational flexibility while imparting a reflection, or timing fiducial, at the antenna plane. Time-of-flight measurements are based on the time difference between a reflected fiducial pulse and an echo pulse, thereby eliminating accuracy-degrading propagation delays in the transmitters and receivers of prior radars. The loop-powered rangefinder further incorporates a current regulator for improved signaling accuracy, a simplified sensitivity-time-control (STC) based on a variable transconductance element, and a jam detector. Applications include industrial tank level measurement and control, vehicular control, and robotics.

A radar-based distance measuring device is described in U.S. Pat. No. 7,095,362 to Hoetzel et al. entitled: "Radar Measurement Device, Especially for a Motor Vehicle, and Method for Operating a Radar Measurement Device", which is incorporated in its entirety for all purposes as if fully set forth herein. The device, with a simple design, ensures reliable distance determination even when a mixed signal is zero, and a method for operating a radar measuring device. The radar measuring device includes: A high-frequency oscillator which emits two different carrier frequency signals (F1,F2), a first switching device for switching the carrier frequency signals (F1,F2) as a function of first pulse signals (P1) and emitting radar pulse signals (T1,2), a transmission antenna and a receiving antenna, a second switching device for switching the carrier frequency signals as a function of a delayed second pulse signal (P2) and emitting delayed radar pulse signals (S1,2), and a mixing device for mixing received radar signals (R1,2) with the delayed radar pulse signals (S1,2) and emitting mixed signals (M1,2). The phase differences between the received radar signals (R1,2) and delayed radar pulse signals (S1,2) differ by a predetermined value when the two carrier frequency signals (F1,2) are emitted. An amplitude signal is subsequently determined from the first and second mixed signal (M1,2).

A radar based sensor detection system is described in U.S. Pat. No. 6,879,281 to Gresham et al. entitled: "Pulse Radar Detection System", which is incorporated in its entirety for all purposes as if fully set forth herein. The system comprises a microwave source operative to provide a continuous wave signal at an output. A pulse-former is coupled to the output of the source and is operative to provide at an output a variable length pulse that increases the transmitted energy of the radar system according to the range of object detection. A modulator is coupled to the output of the pulse-former for providing a modulated pulse signal when required. A transmit/receive switch coupled to the output of the modulator is selectively operative between a first transmit position and a second receive position. A transmit channel coupled to the transmit/receive switch transmits the pulse signal when the switch is operated in the transmit position. A receiving channel coupled to the transmit/receive switch receives the modulator signal when the switch is operated in the receive position. First and second voltage multipliers each have a local oscillator input for receiving the modulator signal in the receive position, and each have an input signal port and an output port. A receiver channel receives a reflected transmitted signal from an object and applies the received signal to the receive signal input ports of the voltage multipliers. An autocorrelator coupled to the output ports of the voltage multipliers correlates the received signal to produce an output signal indicating the detection and position of the object.

An automotive radar is described in a Fujitsu paper (FUJITSU TEN TECH. J. NO. 1 (1998)) by T. Yamawaki et al. entitled: "60-*GHz Millimeter-Wave Automotive Radar*", a radar-based circuit and system is described in a Thesis submitted 2013 by Ioannis Sarkas to the University of Toronto entitled: "*Circuit and System Design for MM-Wave Radio and Radar Applications*", radar sensors are described in an Application Note by Sivers IMA AB Rev. A 2011-06-2011 entitled: "*FMCW ERadar Sensors—Application Notes*", an obstacle detection radar is described in a Fujitsu paper (FUJITSU TEN TECH. M. NO. 15 (2000)) by T. Yamawaki et al. entitled: "*Millimeter-Wave Obstacle detection Radar*", which are all incorporated in their entirety for all purposes as if fully set forth herein.

An example of a radar-based distance meter is the 94 GHz Industrial Distance Meter Model No. FMCW 94/10/x available from Elva-1—Millimeter Wave Division headquartered in Furulund, Sweden and described in a data sheet entitled: "*Industrial Distance Meter FMCW* 94/10/*x at* 94 *GHz*", downloaded on December 2014, which is incorporated in its entirety for all purposes as if fully set forth herein. Using radar-based distance meter for automotive applications is described in a paper by Dipl. Ing. Michael Klotz dated January 2002 entitled: "*An Automotive Short Range High Resolution Pulse Radar Network*", which is incorporated in its entirety for all purposes as if fully set forth herein.

ISM. The Industrial, Scientific and Medical (ISM) radio bands are radio bands (portions of the radio spectrum) reserved internationally for the use of radio frequency (RF) energy for industrial, scientific and medical purposes other than telecommunications. In general, communications equipment operating in these bands must tolerate any interference generated by ISM equipment, and users have no regulatory protection from ISM device operation. The ISM bands are defined by the ITU-R in 5.138, 5.150, and 5.280 of the Radio Regulations. Individual countries use of the bands designated in these sections may differ due to variations in national radio regulations. Because communication devices using the ISM bands must tolerate any interference from ISM equipment, unlicensed operations are typically permitted to use these bands, since unlicensed operation typically needs to be tolerant of interference from other devices anyway. The ISM bands share allocations with unlicensed and licensed operations; however, due to the high likelihood of harmful interference, licensed use of the bands is typically low. In the United States, uses of the ISM bands are governed by Part 18 of the Federal Communications Commission (FCC) rules, while Part 15 contains the rules for unlicensed communication devices, even those that share ISM frequencies. In Europe, the ETSI is responsible for governing ISM bands.

Commonly used ISM bands include a 2.45 GHz band (also known as 2.4 GHz band) that includes the frequency band between 2.400 GHz and 2.500 GHz, a 5.8 GHz band that includes the frequency band 5.725-5.875 GHz, a 24

GHz band that includes the frequency band 24.000-24.250 GHz, a 61 GHz band that includes the frequency band 61.000-61.500 GHz, a 122 GHz band that includes the frequency band 122.000-123.000 GHz, and a 244 GHz band that includes the frequency band 244.000-246.000 GHz.

In order to determine the propagation time of the signal, a Time-Of-Flight (TOF) method may be used, where the time between the emission and reception of a light pulse is determined, the time measurement being effected with the aid of the edge, the peak value or some other characteristic of the pulse shape. In this case, pulse shape may be a temporal light intensity profile of the reception signal, specifically of the received light pulse detected by the photosensitive element. The point in time of transmission can be determined either with the aid of an electrical pulse for initiating the emission, with the aid of the actuating signal applied to the transmitter, or with the aid of a reference signal mentioned above.

A pulsed Time-of-Flight (TOF) method is based on the phenomenon that the distance between two points can be determined by measuring the propagation time of a wave traveling between those two points. When used in an electro-optical based distance meter (such as the meter 15*a*), a pulse of light, usually emitted from a laser source (such as the laser diode 11*a*) is transmitted to a target (such as the point 9 as part of the surface 18), and a portion of the light pulse reflected from the target is collected at the source location (such as by the photo-diode 13*a*). The round trip transit time of the light pulse (made of the lines 16*a* and 16*b*) is measured, and the distance from the distance meter to the target is d=ct/2, where d is the distance (between the signal source and the reflecting target), 'c' is the speed of light in the medium, T is the round trip transit time ('flight time'), and the factor of two accounts for the distance having to be traversed two times by the light pulse. The time measurement may be the time interval between a rising edge of the transmitted pulse and a rising edge of the reflected signal, between a trailing edge of the transmitted pulse and a trailing edge of the reflected signal, or any combination thereof.

An example of a pulsed TOF-based correlator 19*a* is shown as part of the distance meter 15*a* in FIG. 2. Upon a start command input (such as from a user or from a control circuitry), a pulse generator 21, sends a pulse to the input of the driver 12 that serves as a constant current source to the transmitting element (such as the laser diode 11*a*). A receiving element (such as the photo diode 13*a*) is positioned to receive light reflected (or backscattered) back from the point 9 of the target surface A 18. The output from the receiving element 13*a* is coupled to the receiver 14. A timer 22 measures the time of flight, triggered to start time counting upon receiving the pulse from the pulse generator 21 at a 'START' input terminal, and stopping the time counting upon receiving the signal from the receiver 14 output at a 'STOP' input terminal. The measured time of flight indicates the distance of the device 15*a* from the surface A 18 at the reflection point (or area) 9. In one example of using light, an accuracy in the time measurement of 0.1 ns may be equivalent to a distance accuracy of 15 mm.

Laser-based pulsed TOF based distance meters are described in application notes by Acam-messelectronic GMBH (of Stutensee-Blankenloch, Germany) Application Note No. 1 (downloaded January 2016) entitled: "*Laser distance measurement with TDC's*", and by OSRAM Opto Semiconductors Gmbh (of Regensburg, Germany) (dated Sep. 10, 2004) entitled: "*Range Finding Using Pulse Lasers*", which are both incorporated in their entirety for all purposes as if fully set forth herein.

There are variations on the basic pulse TOF architecture. For example, one type of architecture teaches how the capacitor voltage can be downward sloping as the capacitor is discharged with a constant current source between the start and stop pulses. Instead of generating a voltage ramp, another type of architecture describes how a high-speed digital counter can be continuously incremented with a high frequency clocking signal after the start pulse occurs, and then terminates when the stop pulse occurs. This eliminates the need for an A/D converter as the output of the counter is already in a digital format. However, this counter approach has quantization errors, which is remedied by random dithering or interpolation methods. The counter or pulse TOF methods can be used for coarse range estimates, while phase measuring TOF, discussed below, is used for more precise range estimates. Alternately, a series of N pulses could be transmitted, in which a subsequent pulse is transmitted after the previous one is received, and the total time for these N pulses to be sent and received is measured. Thereafter, the time is divided by N to obtain a more precise estimate of a round trip transit time. A pulse train of a predetermined timing sequence could be used. An electronic correlation function is used to compare the delayed transmit sequence to the received sequence, and when correlation is found the delay has the round trip transit time of the pulse sequence.

To obtain an accurate distance estimate, the pulses must either be extremely short, or as is usually the case, must have fast low-high and high-low transitions. To obtain accuracies on the order of 0.1", electronic bandwidths on the order of 1.0 gigahertz, or greater, are required in the transmission electronics, including the laser, as well as in the receive electronics, including the photodiode. Such broadband electronic components are expensive, and drive up the overall cost of the system. Furthermore, the distance signal processing is a two-stage affair. First, the distance information is encoded into a capacitor's voltage, and then secondly this voltage is converted into digital format for subsequent processing. A circuit that offers a single stage of processing is likely to be simpler, lower cost, and less error prone than a multi-stage system.

A high bandwidth (~1 GHz) TOF (time-of-flight) laser range finder techniques for industrial measurement applications in the measurement range of zero to a few dozen meters to diffusely reflecting targets, used to improve single-shot precision to mm-level in order to shorten the measurement result acquisition time, is described in a paper by Ari Kilpela (of the Department of Electrical and Information Engineering, University of Oulu) published 2004 (ISBN 951-42-7261-7) by the University of Oulu, Finland, entitled: "*Pulsed time-of-flight laser range finder techniques for fast, high precision measurement applications*", which is incorporated in its entirety for all purposes as if fully set forth herein.

A method for ascertaining the distance on the basis of the travel-time of high-frequency measuring signals, wherein at least one periodic, pulsed, transmission signal having a pulse repetition frequency is transmitted and at least one reflected measuring signal is received, is described in U.S. Patent Application Publication No. 2009/0212997 to Michalski entitled: "Method for Measuring a Distance Running Time", which is incorporated in its entirety for all purposes as if fully set forth herein. The transmission signal and the reflected measuring signal are transformed by means of a sampling signal produced with a sampling frequency into a time-expanded, intermediate-frequency signal having an intermediate-frequency. The time-expanded, intermediate-frequency signal is filtered by means of at least one filter and a filtered, intermediate-frequency signal is produced, wherein the intermediate-frequency is matched to a limit frequency and/or a center frequency of the filter. The matching of the filter to the intermediate-frequency of the time-expanded measuring signal results, reducing production costs.

In using a phase measuring principle, which the signal propagation time is determined by comparison of the phase angle of the amplitude modulation of the transmitted and received signals. In phase measuring rangefinding, a periodic modulation signal, usually a sinusoid, is transmitted to the target, and an echo is received and amplified. The phase of the received signal is delayed when compared to the phase of the transmitted signal because of the round trip transit time of the signal. A simplified schematic diagram of a phase measuring based correlator 19*b* is shown as part of the distance meter 15*b* in FIG. 2*a*. The emitter 11 is fed with a sinewave generator 23, so that the amplitude of the transmitted wave 16*a* and the reflected (or backscattered) wave 16*b* is sinewave modulated. A phase detector 24 measures the phase difference between the transmitted and received signals, which is proportional to the time delay and thus to the measured distance. The phase difference between the two signals is directly proportional to the distance to the target, according to the expression $d=\Delta\varphi\lambda/4\pi$, where d is the distance from the rangefinder to the target, and $\lambda$ is the wavelength of the modulating sinusoid (e.g., is 15 meters for a 20 MHz signal), and $\Delta\varphi$ is the phase difference in radians. A range ambiguity arises every $\lambda/2$ meters of distance, in which the phase of the modulating signal is identical every $N\lambda/2$ meters. Since the modulation occurs in a continuous-wave fashion, the average power of the carrier must be high in order to be able to obtain a significant received signal for large target distances. Further, undesirable phase delay changes of the electronic circuitry with changes in ambient environmental conditions, especially temperature, may cause an error. In addition, gain changes in AGC (Automatic-Gain-Control) circuitry will cause changes in phase as well, and these changes cannot be reliably calibrated and subtracted out with commonly used on-board reference methods. The measurement result in the case of one transmission frequency may have ambiguities in units of the transmission frequency period duration, thus necessitating further measures for resolving these ambiguities. Two technologies are typically used in phase measuring based rangefinders, namely homodyne and heterodyne.

While exampled regarding using a sinewave signal generated by the sinewave generator 23, any periodic signal generator may be used. Further, the repetitive signal may be a non-sinusoidal wave such as a square wave, a triangle wave, or a saw-tooth wave.

Heterodyne. A heterodyne demodulator is one in which a high frequency signal is mixed with a signal of a different frequency, and the resulting signal has components of the sum and the difference of the two frequencies. Typically the frequency difference between the two mixed signals is a constant known frequency, and the resulting higher frequency, corresponding to the sum of the frequencies, is usually ignored and removed through filtering. The lower frequency signal is amplified in a bandpass amplifier resulting in a signal that has a good signal to noise ratio owing to the fact that all out of band noise is filtered by the bandpass amplifier. This amplified signal is mixed yet again with another signal, this time having the same frequency, and low pass filtered, resulting in a low-noise DC component whose amplitude is proportional to the phase of the received signal. Alternately, if the target is moving, the DC signal will not be present, but instead a low frequency AC signal will be present, and the frequency of this signal is proportional to the velocity of the target because of the Doppler shift. A functional block diagram of a heterodyning phase-measuring rangefinder is shown and explained in FIG. 2 and the associated description in the U.S. Pat. No. 7,202,941.

Homodyne. A similar demodulation method utilizes homodyne electronic processing, in which the received signal is mixed with a signal having the same frequency. This is different than the heterodyne system described above where the received signal is first mixed with a signal having a different frequency. The result of homodyne mixing is that the first mixing stage results directly in the phase or low frequency AC signal for distance or velocity estimation. The second heterodyne mixing is eliminated, meaning less electronic components are utilized which translates into a cost savings, but typically the SNR is somewhat poorer than heterodyne-based distance and velocity measurement. The homodyne phase measuring rangefinder has the same drawbacks of the heterodyning rangefinder, especially as related to nonlinearities within the electronic functions, particularly the phase splitter and the mixers, as well as the imprecision at distances proportional to $n\pi$ phase difference, and gain and delay drifts with changes in environmental conditions. Their mixer's outputs are also a function of the input signal amplitudes, and suffer from the same problems as discussed previously.

Other phase measuring scheme includes a phase measuring distance measuring system that uses light as the modulation carrier. A homodyne mixer can be used for electronic signal processing, while still incorporating an optical modulation carrier. Multiple modulation frequencies can be used to resolve the ambiguity problem and to improve the accuracy of the distance estimate. Heterodyne electronic signal processing methods can also be used in conjunction with two or more modulation frequencies.

Coherent Burst. Coherent burst technology is a significant improvement over the phase measuring and pulse-TOF distance measuring methods. Specifically, the coherent burst modulation waveform allows the maximum range to be increased without compromising eye safety, and since the modulation is bandlimited, the resulting low cost circuitry and measurement accuracy is similar to that of the phase measuring methods. Coherent burst technology accomplishes this by combining the best of the phase-measuring and pulse-TOF methods, wherein a short series of bursts of amplitude modulated light is transmitted to the target. FIG. 4 in U.S. Pat. No. 7,202,941 illustrates the envelope of the coherent burst emission waveform, and FIG. 5 in U.S. Pat. No. 7,202,941 presents a magnified, and abbreviated, diagram of the coherent burst emission. The short bursts have pulse-like properties, in that they have a starting edge and a trailing edge, and a burst transmission can be used to start a counter or voltage ramp, and its reception from the target can be used to stop the counter or the voltage ramp, as described in the pulse TOF prior art discussion, above. This method can be used to provide a coarse estimate of the range, and therefore resolve the range ambiguity problem associated with phase measuring methods.

The coherent burst, being a short duration burst of amplitude modulated light, will also work with phase measuring methods, provided that the electronics comprising these phase measuring methods can respond and settle within the duration of a burst. Increasing the amplitude modulation frequency of a burst allows for increased measurement accuracy. Furthermore, by spacing the coherent bursts in time, high burst powers can be realized while maintaining an eye-safe average power, and long distances can be measured. An illustrative functional diagram for a conventional embodiment of the coherent burst distance measuring method is presented in FIG. 3 in U.S. Pat. No. 7,202,941.

An FMCW distance measurement process is described in U.S. Pat. No. 6,040,898 to Mrosik et al. entitled: "FMCW Distance Measurement Process", which is incorporated in its entirety for all purposes as if fully set forth herein. In an FMCW distance measurement process, a wave train of carrier frequency f0 is modulated with a time function f(t) and subdivided into a transmission signal and into a reference signal in deterministic phase relationship with the transmission signal; the transmission signal is sent on a transmission section to be measured and the reference signal is supplied to a phase difference-forming arrangement; the signal reflected in the transmission section with a delay that corresponds to propagation time τ is also supplied as a reception signal to the phase difference-forming arrangement that forms the time difference function θ(t) between the phases of reference and reception signals; the phase difference function θ(t) is separately evaluated in a continuous fraction θ=that corresponds to the carrier frequency f0 and in an alternating fraction θ−(t) that corresponds to the modulation time function f(t); and the propagation time τ proportional to the distance is finally determined by evaluating together both phase difference information.

High speed and high precision phase measuring techniques for improving the dynamic measurement accuracy of phase-shift laser range finder are described in an article by Pengcheng Hu et al. published in The 10$^{th}$ International Symposium of Measurement Technology and Intelligent Instruments (Jun. 29-Jul. 2, 2011) entitled: "*Phase-shift laser range finder based on high speed and high precision phase-measuring techniques*", which is incorporated in its entirety for all purposes as if fully set forth herein.

A technique for improving the performance of laser phase-shift range finders by phase measurement that use a method to extract the phase-shift data from the peak of received and transmitted intermediate frequency signal amplitudes is described in a paper downloaded January 2016 by Shahram Mohammad Nejad and Kiazand Fasihi (both from Department of Electrical Engineering, Iran University of Science and Technology (JUST), Tehran, Iran) entitled: "*A new design of laser phase-shift range finder independent of environmental conditions and thermal drift*", which is incorporated in its entirety for all purposes as if fully set forth herein.

Beat signal. A distance measurement by radar comprising a frequency modulated radar-transmitter and -receiver by which a radar beam is guided onto an object to be measured and which, by mixing of the transmitted frequency with the received frequency, delivers a beat signal; frequency modulating means, by which the transmitted frequency of the radar signal of the Doppler signal device is periodically variable in a saw-tooth shaped way and wherein the frequency of the beat signal, due to the travel time of the radar beam reflected by the object, is a measure for the distance of the object, and a signal processing circuit generating a measured value from the beat signal obtained. In the radar-transmitter and -receiver mixing takes place of the transmitted and the received signal. The signal received has passed the distance to and from the object, thereby has been transmitted at an earlier instant and thereby has, due to the saw-tooth modulation, a frequency which is a bit different from the frequency of the signal which is emitted at the moment of reception. Thereby a beat frequency occurs that is proportional to the travel time to the object and thereby, to the distance from the object to the radar-transmitter and the radar-receiver.

The non-contact active distance meter 15 uses a single emitter 11 and a single sensor 13, enabling a point-to-point distance measurement, namely, the spatial separation of two points measured by the length of the hypothetical line joining them, such as the distance between the meter 15 and the point 9 (or area) in the plane or surface A 18. However, the distance between a point and line or plane is defined as the length of the perpendicular (normal) line from the point to the line or plane. In an example of an arrangement 45 shown in FIG. 4, the distance from the distance meter 40 to the plane of surface M 41*a* is dact 42, measured as the spatial separation of the meter 40 and a point 8 that is the closest point to the meter 40. The distance meter 40 may consist of, may comprise, or may be based on, any non-contact active distance meter 15, and may use any carrier technology such as electromagnetic waves, light waves, or acoustic waves, and may use any type of active distance measurement correlation technique such as pulsed TOF, interferometric, triangulation, or phase measuring. The distance meter 40 measure the length dmeas 43 along the measurement beam that is formed by the meter 40 structure from the emitter 11, to the reflection point 9 (or area), to the sensor 13 (which may be the line composed of the dashed lines 16*a* and 16*b*). In the case where there is a deviation between the perpendicular line from the surface M 41*a* and the measurement beam 43, the measurement beam 43 is not consolidated with the actual distance line perpendicular (normal) from the point 8, and a deviation angle β 44 is formed. In such a case, the actual measured distance dmeas 43 is longer than the actual distance dact 42. The higher the angle β 44 is, longer length dmeas is measured, resulting higher error from the actual and real distance dact, according to dact=dmeas*cos (β). For example, a deviation of 5° (β=5°) results in an inaccuracy of 0.3%, and a deviation of 10° (β=10°) results in an inaccuracy of 1.5%. In order to achieve accurate distance measurement of the meter 40 to the line or plane M 41*a*, the distance meter 40 should be accurately positioned so that the measurement beam 43 be directed to the nearest point 8 in the surface M 41*a*. Such accuracy may not be easily manually obtained.

In another example, shown as an arrangement 45*a* in FIG. 4*a*, the distance dact to the closest point 8 on the surface 41*a* cannot be obtained due to the existence of an obstacle 45 located along the line-of-sight 42*a*. Since the distance meter 40 uses a single direct (point-to-point) line-of-sight beaming technique, the obstacle 45 'hides' the point 8 on the surface 41*a* by stopping the emitted waves (such as blocking a laser beam), and thus the direct distance to the plane or surface 41*a* cannot be measured.

Laser pointer. A laser pointer (or laser pen) is a portable laser that emits monochromatic light over a long and narrow distance, used especially as a pointing device, such as for use during presentations to point out areas of the slide or picture being presented, replacing a hand held wooden stick or extendable metal pointer. The main beam as it emerges from the laser diode is wedge shaped and highly divergent (unlike a helium-neon laser) with a typical spread of 10 by 30 degrees. External optics are typically used to produce a practically parallel (collimated) beam. A simple (spherical) short focal length convex lens, made of glass or acrylic plastics, is commonly used. The collimating optics in a laser pointer consist of a single lens that focuses the cone of light exiting the laser diode into a narrower beam that produces a narrower spot over a longer distance. Typically, a 650 nm to 635 nm red laser diode is used, emitting a very narrow coherent low-powered laser beam of visible light, intended to be used to highlight something of interest by illuminating it with a small bright spot of colored light. Power is restricted in most jurisdictions not to exceed 5 mW. Laser pointers may use Helium-Neon (HeNe) gas lasers that generates laser radiation at 633 nanometer (nm), usually designed to produce a laser beam with an output power under 1 milliwatt (mW). A deep red laser diode near the 650 nanometers (nm) wavelength or a red-orange 635 nm diode are also recently commonly used. Other colors, such as 532 nm green laser, yellow-orange laser pointers at 593.5 nm, blue laser pointers at 473 nm, and violet laser pointers at 405 nm, are commercially available as well.

Many commercially available distance meters embed a laser pointer functionality, as exampled by a laser pointer functionality 3 shown as part of a distance meter 15''' that is described as part of an arrangement **10*b* in FIG. 1*b*. The laser pointer functionality 3 emits a visible laser beam 16*c*, that is preferably as parallel as practical to the emitted propagated wave 16*a* emitted by the emitter 11, preferably as accurately as practical illuminating the point 9 on the surface or line A 18, to which the distance is measured. The laser pointer 3 functionality comprises a visible laser diode 25*a*, emitting a visible red, red-orange, blue, green, yellow, or violet laser light that is collimated by lens 4, to form the narrow laser beam 16*c***.

An example of a distance meter that comprises a laser pointer functionality is disclosed in U.S. Patent Application Publication No. 2007/0182950 to Arlinsky entitled: "Distance Measurement Device", which is incorporated in its entirety for all purposes as if fully set forth herein. The distance measurement device including a handheld housing with a distance measurement module for transmitting a measurement signal aimed toward a distant object and receiving a measurement signal reflected therefrom for determining the distance measurement thereto, and a head-up display (HUD) for enabling a user to simultaneously view the object and distance related information.

An ultrasonic distance measuring device for use, for instance, in the building trades, conventionally measures distance by projecting a sonic beam towards the target and detecting the reflection from the target, is disclosed in U.S. Pat. No. 6,157,591 to Krantz entitled: "Sonic Range Finder with Laser Pointer", which is incorporated in its entirety for all purposes as if fully set forth herein. Also provided is an associated co-axial laser pointer which provides a visual indication of where the sonic beam is pointed. This laser pointer provides a laser beam which illuminates the target. However, the laser beam is not a typical laser beam, but instead is diffracted so that it covers an area at the target approximately the same size and shape as the area covered by the sonic beam. This provides a clear indication to the user that the sonic beam is not a single point beam but instead is possibly reflecting from any one of a number of points on the target. This provides a better indication to the user than does the single point beam of what possible locations are being measured on the target. The laser beam pattern is, for instance, a circular area, a pattern of lines or rings, or a set of dots including a bright central dot.

A portable and convenient electronic distance measuring apparatus using a laser beam and a supersonic wave is disclosed in U.S. Pat. No. 7,372,771 to Park entitled: "Electronic Distance Measuring Apparatus", which is incorporated in its entirety for all purposes as if fully set forth herein. A predetermined height is measured using a supersonic sensor and a laser pointer is rotated at the predetermined height to radiate a laser beam at a target object so that a distance to a target object at which that laser beam is pointing can be accurately measured using a resistance value corresponding to a rotation angle of the laser pointer.

A rotary laser is disclosed in U.S. Patent Application Publication No. 2010/0104291 to Ammann entitled: "Rotary Laser with Remote Control", which is incorporated in its entirety for all purposes as if fully set forth herein. The rotary laser has a laser beam unit which is suitable for emitting at least one laser beam rotating in a beam plane (E) and which is controlled by computer so as to be switchable from a rotating operating mode (I) in which the at least one laser beam rotates in the beam plane (E), to a scanning operating mode (II) in which the at least one laser beam scans in the beam plane (E) within an angular sector (q)), and a plurality of detectors distributed circumferentially around an axis of rotation (A) and which are sensitive to an amplitude at least within the beam plane (E) and are connected to the computer.

A rotary construction laser is disclosed in U.S. Pat. No. 8,441,705 to Lukic et al. entitled: "Rotary Construction Laser with Stepper Motor", which is incorporated in its entirety for all purposes as if fully set forth herein. The rotary construction laser having a deflection device rotatably mounted around an axis of rotation for emitting laser light as well as a stepper motor for rotating the deflection device around the axis of rotation.

A rotation mechanism for mounting and rotatably supporting a laser emitter thereon is disclosed in U.S. Pat. No. 8,272,616 to Sato et al. entitled: "Rotation mechanism for laser emitter", which is incorporated in its entirety for all purposes as if fully set forth herein. The mechanism includes a casing including a bottom wall and a side wall connected to the bottom wall, said casing defining therein a receiving space. A plurality of rotation rings are arranged as being layered with each other in the receiving space of the casing. The rotation rings include an uppermost rotation ring in the form of a manual coarse rotation ring that is directly connected to the laser emitter so as to support the laser emitter, for manually rotating the laser emitter to achieve a coarse angular positioning thereof, an automatic coarse rotation ring for rotating the laser emitter at a relatively high speed together with the rotation ring thereon, a manual fine rotation ring for slightly rotating the laser emitter manually together with the rotation ring thereon, and an automatic fine rotation ring for rotating the laser emitter at a relatively low speed, together with the rotation ring thereon. The automatic rotation rings are each provided with a driving means that is arranged on the rotation ring immediately below the relevant rotation ring.

A construction surveying device is described in U.S. Pat. No. 9,207,078 to Schorr et al. entitled: "Device for Measuring and Marking Space Points Along Horizontally Running Contour Lines", which is incorporated in its entirety for all purposes as if fully set forth herein. The device is having a base, an upper part mounted on the base and can be rotated about an axis of rotation, a sighting unit having a laser source which is designed to emit a laser beam and a laser light detector, and an evaluation and control unit, a first rotary drive and a second rotary drive enable the upper part and the sighting unit to be driven and aligned, a spatial alignment of the sighting unit with respect to the base can be detected using two goniometers, and coordinates for space points can be determined using the evaluation and control unit, the construction surveying device has a horizontal line projection functionality which, at least sometimes, takes place automatically after triggering and is intended to measure and mark space points along a horizontal line, running in a horizontal plane, on an arbitrarily shaped surface.

A camera having a pointing aid emitter is described in U.S. Pat. No. 5,546,156 to McIntyre entitled: "Camera with Pointing Aid", which is incorporated in its entirety for all purposes as if fully set forth herein. The pointing aid emitter produces a visible beam generally aligned with the optical axis of the camera objective lens such that the visible beam illuminates an object in the scene includes a scene measurement system that measures an aspect of the scene and an emitter controller that adjusts the output power of the pointing aid emitter in accordance with the scene aspect measured by the scene measurement system to reduce power consumption and reduce the risk of damage to the object that is illuminated by the beam. The scene measurement system of the camera preferably comprises an ambient light measuring system of a camera automatic exposure system and a distance measuring system of a camera automatic focus system. The emitter preferably comprises a laser light source that produces a visible laser beam.

A camera that receives light from a field of view, produces signals representative of the received light, and intermittently reads the signals to create a photographic image is described in U.S. Pat. No. 5,189,463 to Axelrod et al. entitled: "Camera Aiming Mechanism and Method", which is incorporated in its entirety for all purposes as if fully set forth herein. The intermittent reading results in intermissions between readings. The invention also includes a radiant energy source that works with the camera. The radiant energy source produces a beam of radiant energy and projects the beam during intermissions between readings. The beam produces a light pattern on an object within or near the camera's field of view, thereby identifying at least a part of the field of view. The radiant energy source is often a laser and the radiant energy beam is often a laser beam. A detection mechanism that detects the intermissions and produces a signal that causes the radiant energy source to project the radiant energy beam. The detection mechanism is typically an electrical circuit including a retriggerable multivibrator or other functionally similar component.

Typically, a distance meter such as the distance meter 15''' shown in FIG. 1*b* further includes an emitting aperture 1 and a sensing aperture 2. The emitting aperture 1 is typically an opening in the distance meter 15''' enclosure in the transmit path of the propagating waves 16*a* emitted from the emitter 11 to the surroundings of the enclosure, while typically not affecting or interfering with the waves propagation. The emitting aperture 1 is typically designed so that there is no (or minimal) attenuation to the propagating waves, as well as no impact of the waves direction, type, or any other characteristics. The emitting aperture 1 is commonly sealed or closed to any material in order to avoid dust or dirt, and to generally protect the emitter 11 and any other component inside the distance meter 15''' enclosure. Similarly, the sensing aperture 2 is typically an opening in the distance meter 15''' enclosure in the receive path of the propagating waves 16*b* to the sensor 13 from the surroundings of the enclosure, while typically not affecting or interfering with the waves propagation. The sensing aperture 2 is typically designed so that there is no (or minimal) attenuation to the incoming waves, as well as no impact of the waves direction, type, or any other characteristics. The sensing aperture 2 is commonly sealed or closed to any material in order to avoid dust or dirt, and to generally protect the sensor 13 and any other component inside the distance meter 15''' enclosure. While the apertures 1 and 2 in FIG. 1*b* are shown as circular or cylindrical opening, any other shape of structure may equally be used, typically optimized to the propagated waves type and structure. In the case where a single component, such as a transducer, is used as both the emitter 11 and the sensor 13, a single aperture may be used serving as both the emitting 1 and sensing 2 apertures.

In the case where optical system is used, and the emitted 16*a* and received 16*b* waves are light beams or rays, and the emitting 1 and sensing 2 apertures are light apertures, which are typically holes or openings through which light travels. More specifically, the aperture and focal length of an optical system determine the cone angle of a bundle of rays that comes to a focus in the image plane. The aperture determines how collimated the admitted rays are, which is of great importance for the appearance at the image plane. These apertures may include a lens or a mirror, or a ring or other fixture that holds an optical element in place, or may be a special element such as a diaphragm placed in the optical path to limit the light admitted by the system.

Doppler-Effect. A Doppler effect (or Doppler shift) is the change in frequency of a wave (or other periodic event) for an observer moving relative to its source. Compared to the emitted frequency, the received frequency is higher during the approach, identical at the instant of passing by, and lower during the recession. When the source of the waves is moving toward the observer, each successive wave crest is emitted from a position closer to the observer than the previous wave. Therefore, each wave takes slightly less time to reach the observer than the previous wave. Hence, the time between the arrivals of successive wave crests at the observer is reduced, causing an increase in the frequency. While they are traveling, the distance between successive wave fronts is reduced, so the waves "bunch together". Conversely, if the source of waves is moving away from the observer, each wave is emitted from a position farther from the observer than the previous wave, so the arrival time between successive waves is increased, reducing the frequency. The distance between successive wave fronts is then increased, so the waves "spread out". For waves that propagate in a medium, such as sound waves, the velocity of the observer and of the source are relative to the medium in which the waves are transmitted. The total Doppler effect may therefore result from motion of the source, motion of the observer, or motion of the medium. Each of these effects is analyzed separately. For waves which do not require a medium, such as light or gravity in general relativity, only the relative difference in velocity between the observer and the source needs to be considered. Doppler shift of a coherent burst waveform can be used for target velocity estimation. More recently, a homodyne coherent burst system with quadrature electronic signal processing can be used for velocity estimation. Digital signal processing methods can also use coherent burst velocity estimation based upon the Doppler shift.

In a typical or conventional Doppler speed scheme, an oscillator generates a standard signal of frequency F0, which is amplified and transmitted in a direction. The Doppler-effect causes the reflected received signal frequency to be shifted by a Doppler-shift Fd, so the received signal frequency is measured as F0+Fd (or F0−Fd). The received signal is amplified and mixed with the transmission signal in a mixer to create beat-frequency signals. The lower frequency beat is filtered through a low-pass filter and serves as the output, having a frequency that is equal to the Doppler-shift Fd.

Using ultrasonic Doppler is described in a paper by K. Imou et al. published in Agricultural Engineering International: the CIGR Journal of Science Research and Development (Manuscript PM 01 007. Vol. III), downloaded January 2016, entitled: "*Ultrasonic Doppler Sensor for Measuring Vehicle Speed in Forward and Reverse Motions Including Low Speed Motions*", which is incorporated in its entirety for all purposes as if fully set forth herein. A Doppler-effect based motion sensor is described in an Application Note AN2047 Revision A by Victor Kremin published Oct. 3, 2002 by Cypress MicroSystems. Inc., entitled: "*Ultrasound Motion Sensor*", which is incorporated in its entirety for all purposes as if fully set forth herein.

An ultrasound transducer is described in U.S. Pat. No. 6,614,719 to Grzesek entitled: "Ultrasonic Doppler Effect Speed Measurement", which is incorporated in its entirety for all purposes as if fully set forth herein. The transducer is coupled to a transmitter having a source of ultrasound signal. A receiving ultrasound transducer is coupled to a preamplifier and mixer. The mixer is further coupled to a demodulator and filter, which in turn is coupled to an amplifier and a comparator. The comparator output is coupled to a controller that performs edge detection of the comparator output signal. The transmitter produces ultrasound energy, which is reflected from an object to the receiving transducer. The shift in frequency between the transmitted ultrasound energy and the reflected ultrasound energy is used to determine the speed of the object by employing Doppler effect. Frequency detection is enhanced by mixing the transmitted and reflected ultrasound signals to provide a beat frequency signal.

A speed measuring apparatus is described in U.S. Pat. No. 6,272,071 to Takai et al. entitled: "Speed Measuring Apparatus", which is incorporated in its entirety for all purposes as if fully set forth herein. The apparatus including a transmitter for transmitting an acoustic reference wave toward a moving-target, the acoustic reference wave being generated based on a reference signal with a predetermined frequency. Also included is a receiver for receiving acoustic reflection waves that are generated by the transmitted acoustic reference wave being reflected by the moving-target, for converting the acoustic reflection waves to receiver signals, and for outputting the receiver signals therefrom. Further, a signal attenuating unit for selectively attenuating a signal component with the same frequency as the frequency of the reference signal in the receiver signals which are output from the receiver and outputting signals therefrom and a band pass filter unit for selecting at least one Doppler signal component from the signals output from the signal attenuating unit are included. Also included is a speed-computing unit for computing the speed of the moving-target relative to the speed measuring apparatus, based on the Doppler signal component abstracted by the band pass filter unit.

A hybrid laser distance gauge is described in U.S. Pat. No. 4,818,100 to Breen entitled: "Laser Doppler and Time of Flight Range Measurement", which is incorporated in its entirety for all purposes as if fully set forth herein. The gauge utilizes complementary simultaneous measurements based upon both Doppler and time of flight principles. A complete record can be produced of the location and shape of a target object even when the object has severe discontinuities such as the edges of a turbine blade. Measurements by the two principles are made by using many optical elements in common. The Doppler measurements have an open loop optical/electronic arrangement in which the Doppler shift is converted to a voltage by a phase locked loop. The time of flight measurements are made at one or more harmonic frequencies of a mode locked pulse envelope wave train, for unusually accurate and unambiguous distance data.

An apparatus for the precise measurement of the displacement of a moving cooperative target from a reference position, traveling, for example, over a distance of several meters, and with the measurement accuracy being better than a fraction of a millimeter, is described in U.S. Pat. No. 4,715,706 to Wang entitled: "Laser Doppler Displacement Measuring System and Apparatus", which is incorporated in its entirety for all purposes as if fully set forth herein. The apparatus includes a low-cost laser, which generates a beam of a selected frequency. The laser beam is directed at the moving target and is reflected by the target. The apparatus also includes additional elements, which measure the Doppler phase shift of the reflected laser beam so as to obtain a precise measurement of the displacement of the target with respect to the reference position.

An electrical circuit for measuring the frequency of laser Doppler signals is described in U.S. Pat. No. 5,343,285 to Gondrum et al. entitled: "Electrical Circuit for Measuring the Frequency of Laser Doppler Signals", which is incorporated in its entirety for all purposes as if fully set forth herein. The circuit has at least one counter for counting the signal pulses and a microprocessor for evaluating the counter reading, which is produced within a measuring interval. A high degree of accuracy in the frequency measurement of laser Doppler signals is achieved, in that for controlling the pulse count a blocking element, such as an And-gate, which is controlled by means of an additional signal, for example, by an automatic band pass, is connected in series with the laser signal pulse counter, and also in that there is arranged a time pulse counter which is connected for example, to a quartz pulse generator and determines the measuring interval by means of a predetermined number of pulses, and finally in that the laser signal pulse counter and the time pulse counter are connected to a microprocessor for reading the counter readings on completion of a measuring interval.

A laser Doppler speed measuring apparatus is described in U.S. Pat. No. 5,814,732 to Nogami entitled: "Laser Doppler Speed Measuring Apparatus", which is incorporated in its entirety for all purposes as if fully set forth herein. The apparatus comprises a laser light source, a photodetector, an FM demodulator, and an integrated filter circuit. A selector switch is interposed between the FM demodulator and the integrated filter circuit so as to ensure switching between an output of the FM demodulator and a terminal for directly receiving an external signal.

An example of a laser Doppler distance sensor is described in an article published in Photonik international online (March 2009) by Jurgen Czarske, Lars Buttner, and Thorsten Pfister entitled: "*Optical Metrology—Laser Doppler distance sensor and its applications*", which is incorporated in its entirety for all purposes as if fully set forth herein.

A pulsed mode Doppler radar principles are described in Infineon Technologies AG (out of Munich, Germany) Application Note AN341 (Rev. 1.0 2013-12-02) entitled: "*BGT24MTR11—Using BGT24MTR11 in Low Power Applications—24 GHz Radar*", and in Agilent Technologies, Inc. Application Note 5991-7575EN (published Mar. 25, 2014) entitled: "*Agilent Radar Measurements*", which are both incorporated in their entirety for all purposes as if fully set forth herein. A Doppler radar functionality or circuit may comprise, be based on, or use, a HB100 Microwave Sensor Module available from ST Electronics (Satcom & Sensor System) Pte Ltd headquartered in Singapore, described in a data sheet by ST Electronics (Satcom & Sensor System) Pte Ltd Ver. 1.02 (downloaded 1/2016) entitled: "*HB 100 Microwave Sensor Module—10.525 GHz Microwave Motion Sen-*

*sor Module*", and in an Application Note V1.02 (downloaded 1/2016) by ST Electronics (Satcom & Sensor System) Pte Ltd entitled: "*MSAN-001 X-Band Microwave Motion Sensor Module*", which are both incorporated in their entirety for all purposes as if fully set forth herein.

Phase detector. A phase detector (or phase comparator) is a frequency mixer, analog multiplier or logic circuit that generates a voltage signal, which represents the difference in phase between two signal inputs. It is an essential element of the Phase-Locked Loop (PLL). Phase detection may use an analog or digital phase detector. They typically produce an output that is proportional to the phase difference between the two signals. When the phase difference between the two incoming signals is steady, they produce a constant voltage. When there is a frequency difference between the two signals, they produce a varying voltage. The difference frequency product is the one used to give the phase difference. An example of a digital/analog phase detector is Phase Detector Model ADF4002 available from Analog Devices, Inc. (headquartered in Norwood, MA, U.S.A.) and is described in an 2015 data sheet Rev. D (D06052-0-9/15(D)) entitled: "*Phase Detector/frequency Synthesizer—ADF*4002", which is incorporated in its entirety for all purposes as if fully set forth herein.

The analog phase detector needs to compute the phase difference of its two input signals. Let a be the phase of the first input and β be the phase of the second. The actual input signals to the phase detector, however, are not α and β, but rather sinusoids such as sin(α) and cos(β). In general, computing the phase difference would involve computing the arcsine and arccosine of each normalized input (to get an ever-increasing phase) and doing a subtraction. A simple form of an analog phase detector is diode ring mixer phase-detector and it can be synthesized from a diode ring mixer. The diode ring phase detector is a simple and effective form of phase detector that can be implemented using a standard diode ring module. An example of an analog phase detector is Phase Detector Model AD8302 available from Analog Devices, Inc. (headquartered in Norwood, MA, U.S.A.) and is described in an 2002 data sheet Rev. A entitled: "*LF-2.7 GHz—RF/IF Gain and Phase Detector—AD*8302", which is incorporated in its entirety for all purposes as if fully set forth herein.

A digital phase detector suitable for square wave signals can be made from an exclusive-OR (XOR) logic gate. When the two signals being compared are completely in-phase, the XOR gate's output will have a constant level of zero. When the two signals differ in phase by 1°, the XOR gate's output will be high for 1/180th of each cycle—the fraction of a cycle during which the two signals differ in value. When the signals differ by 180°—that is, one signal is high when the other is low, and vice versa—the XOR gate output remains high throughout each cycle. The XOR detector compares well to the analog mixer in that it locks near a 90° phase difference and has a square-wave output at twice the reference frequency. The square-wave changes duty-cycle in proportion to the phase difference resulting. Applying the XOR gate's output to a low-pass filter results in an analog voltage that is proportional to the phase difference between the two signals. It requires inputs that are symmetrical square waves, or nearly so. The remainder of its characteristics are very similar to the analog mixer for capture range, lock time, reference spurious, and low-pass filter requirements. Digital phase detectors can also be based on a sample and hold circuit, a charge pump, or a logic circuit consisting of flip-flops. When a phase detector that is based on logic gates is used in a PLL, it can quickly force the VCO to synchronize with an input signal, even when the frequency of the input signal differs substantially from the initial frequency of the VCO. XOR-based phase detection is described in an article published in Advanced Computing: An International Journal (ACIJ), Vol. 2, No. 6, November 2011, by Delvadiya Harikrushna et al. entitled: "*Design, Implementation, and Charactrization of XOR Phase Detector for DPLL in* 45 *nm CMOS Technology*", which is incorporated in its entirety for all purposes as if fully set forth herein.

A phase-frequency detector is an asynchronous sequential logic circuit originally made of four flip-flops (i.e., the phase-frequency detectors found in both the RCA CD4046 and the Motorola MC4344 ICs introduced in the 1970s). The logic determines which of the two signals has a zero-crossing earlier or more often. When used in a PLL application, lock can be achieved even when it is off frequency and is known as a Phase Frequency Detector. Such a detector has the advantage of producing an output even when the two signals being compared differ not only in phase but also in frequency. A phase frequency detector prevents a "false lock" condition in PLL applications, in which the PLL synchronizes with the wrong phase of the input signal or with the wrong frequency (e.g., a harmonic of the input signal). A bang-bang charge pump phase detector supplies current pulses with fixed total charge, either positive or negative, to the capacitor acting as an integrator. A phase detector for a bang-bang charge pump must always have a dead band where the phases of inputs are close enough that the detector fires either both or neither of the charge pumps, for no total effect. Bang-bang phase detectors are simple, but are associated with significant minimum peak-to-peak jitter, because of drift within the dead band.

A proportional phase detector employs a charge pump that supplies charge amounts in proportion to the phase error detected. Some have dead bands and some do not. Specifically, some designs produce both "up" and "down" control pulses even when the phase difference is zero. These pulses are small, nominally the same duration, and cause the charge pump to produce equal-charge positive and negative current pulses when the phase is perfectly matched. Phase detectors with this kind of control system do not exhibit a dead band and typically have lower minimum peak-to-peak jitter when used in PLLs. In PLL applications, it is frequently required to know when the loop is out of lock. The more complex digital phase-frequency detectors usually have an output that allows a reliable indication of an out of lock condition.

Beam width. The beam diameter or beam width of an electromagnetic beam is the diameter along any specified line that is perpendicular to the beam axis and intersects it. Since beams typically do not have sharp edges, the diameter can be defined in many different ways. Five definitions of the beam width are in common use: D4σ, 10/90 or 20/80 knife-edge, 1/e2, FWHM, and D86. The beam width can be measured in units of length at a particular plane perpendicular to the beam axis, but it can also refer to the angular width, which is the angle subtended by the beam at the source. The angular width is also called the beam divergence. Beam diameter is usually used to characterize electromagnetic beams in the optical regime, and occasionally in the microwave regime, that is, cases in which the aperture from which the beam emerges is very large with respect to the wavelength.

A simple way to define the width of a beam is to choose two diametrically opposite points at which the irradiance is a specified fraction of the beam's peak irradiance, and take the distance between them as a measure of the beam's width.

An obvious choice for this fraction is ½ (−3 dB), in which case the diameter obtained is the full width of the beam at half its maximum intensity (FWHM). This is also called the Half-Power Beam Width (HPBW). In a radio antenna pattern, the half power beam width is the angle between the half-power (−3 dB) points of the main lobe, when referenced to the peak effective radiated power of the main lobe.

The beam divergence of an electromagnetic beam is an angular measure of the increase in beam diameter or radius with distance from the optical aperture or antenna aperture from which the electromagnetic beam emerges. The term is relevant only in the "far field", away from any focus of the beam. Practically speaking, however, the far field can commence physically close to the radiating aperture, depending on aperture diameter and the operating wavelength. Beam divergence is often used to characterize electromagnetic beams in the optical regime, for cases in which the aperture from which the beam emerges is very large with respect to the wavelength. Beam divergence usually refers to a beam of circular cross section, but not necessarily so. A beam may, for example, have an elliptical cross section, in which case, the orientation of the beam divergence must be specified, for example, with respect to the major or minor axis of the elliptical cross section.

Polarization. Polarization is a property of waves that can oscillate with more than one orientation. Electromagnetic waves such as light or microwave exhibit polarization. In an electromagnetic wave, both the electric field and magnetic field are oscillating but in different directions; by convention, the "polarization" of light refers to the polarization of the electric field. Light that can be approximated as a plane wave in free space or in an isotropic medium propagates as a transverse wave where both the electric and magnetic fields are perpendicular to the wave's direction of travel. The oscillation of these fields may be in a single direction (linear polarization), or the field may rotate at the optical frequency (circular or elliptical polarization), where the direction of the fields' rotation, and thus the specified polarization, may be either clockwise or counter clockwise, referred to as the wave's chirality or handedness. The most common optical materials (such as glass) are isotropic and simply preserve the polarization of a wave but do not differentiate between polarization states. However, there are important classes of materials classified as birefringent or optically active, in which this is not the case, and a wave's polarization will generally be modified or will affect propagation through it. A polarizer is an optical filter that transmits only one polarization.

Most sources of light are classified as incoherent and unpolarized (or only "partially polarized") because they consist of a random mixture of waves having different spatial characteristics, frequencies (wavelengths), phases, and polarization states. However, for understanding electromagnetic waves and polarization in particular, it is easiest to just consider coherent plane waves; these are sinusoidal waves of one particular direction (or wavevector), frequency, phase, and polarization state. Characterizing an optical system in relation to a plane wave with those given parameters can then be used to predict its response to a more general case, since a wave with any specified spatial structure can be decomposed into a combination of plane waves (its so-called angular spectrum).

Electromagnetic waves (such as light), traveling in free space or another homogeneous isotropic non-attenuating medium, are properly described as transverse waves, meaning that a plane wave's electric field vector E and magnetic field H are in directions perpendicular to (or "transverse" to) the direction of wave propagation; E and H are also perpendicular to each other. Considering a monochromatic plane wave of optical frequency f (light of vacuum wavelength λ has a frequency of $f=c/\lambda$ where c is the speed of light), let us take the direction of propagation as the z-axis. Being a transverse wave the E and H fields must then contain components only in the x and y directions whereas $Ez=Hz=0$.

Bipod. A bipod is an attachment that creates a steady plane for whatever it may be attached or is part of, for providing significant stability along two axes of motion (side-to-side, and up-and-down). Bipods may be folded, and permit operators to easily rest a device on objects, like the ground or a wall, reducing their fatigue and increasing accuracy and stability. Bipods can be of fixed or adjustable length, and may be tilted and also have their tilting point close to a central axis, allowing the device to tilt left and right.

Tripod. A tripod is a portable three-legged frame, used as a platform for supporting the weight and maintaining the stability of some other object. A tripod provides stability against downward forces and horizontal forces and movements about horizontal axes. The positioning of the three legs away from the vertical center allows the tripod better leverage for resisting lateral forces.

Tripods are typically used for both motion and still photography to prevent camera movement and provide stability. They are especially necessary when slow-speed exposures are being made, or when telephoto lenses are used, as any camera movement while the shutter is open will produce a blurred image. In the same vein, they reduce camera shake, and thus are instrumental in achieving maximum sharpness. A tripod is also helpful in achieving precise framing of the image, or when more than one image is being made of the same scene, for example when bracketing the exposure. Use of a tripod may also allow for a more thoughtful approach to photography. For all of the aforementioned reasons, a tripod of some sort is often necessary for professional photography. For maximum strength and stability, as well as for easy leveling, most photographic tripods are braced around collapsible telescopic legs, with a center post that moves up and down. To further allow for extension, the center post can usually extend above the meeting of three legs. At the top of the tripod is the head, which includes the camera mount (usually a detachable plate with a thumbscrew to hold the camera). The head connects to the frame by several joints, allowing the camera to pan, tilt and roll. The head usually attaches to a lever so that adjustments to the orientation can be performed more delicately. Some tripods also feature integrated remote controls for a camera, though these are usually proprietary to the company that manufactured the camera.

A surveyor's tripod is a device used to support any one of a number of surveying instruments, such as theodolites, total stations, levels, or transits. The tripod is typically placed in the location where it is needed, and the surveyor may press down on the legs' platforms to securely anchor the legs in soil or to force the feet to a low position on uneven, pock-marked pavement. Leg lengths are adjusted to bring the tripod head to a convenient height and make it roughly level. Once the tripod is positioned and secure, the instrument is placed on the head. The mounting screw is pushed up under the instrument to engage the instrument's base and screwed tight when the instrument is in the correct position. The flat surface of the tripod head is called the foot plate and is used to support the adjustable feet of the instrument. Positioning the tripod and instrument precisely over an indicated mark on the ground or benchmark requires techniques that are beyond the scope of this article. Many modern tripods are constructed of aluminum, though wood is still used for legs. The feet are either aluminum tipped with a steel point or steel. The mounting screw is often brass or brass and plastic. The mounting screw is hollow to allow the optical plumb to be viewed through the screw. The top is typically threaded with a ⅝"×11 tpi screw thread. The mounting screw is held to the underside of the tripod head by a movable arm, to permit the screw to be moved anywhere within the head's opening. The legs are attached to the head with adjustable screws that are usually kept tight enough to allow the legs to be moved with a bit of resistance. The legs are two-part, with the lower part capable of telescoping to adjust the length of the leg to suit the terrain. Aluminum or steel slip joints with a tightening screw are at the bottom of the upper leg to hold the bottom part in place and fix the length. A shoulder strap is often affixed to the tripod to allow for ease of carrying the equipment over areas to be surveyed.

Optical beam splitter. An optical beam splitter is an optical device that splits a beam of light in two. In its common form, a cube, it is made from two triangular glass prisms, which are glued together at their base using polyester, epoxy, or urethane-based adhesives. The thickness of the resin layer is adjusted such that (for a certain wavelength) half of the light incident through one "port" (i.e., face of the cube) is reflected and the other half is transmitted due to frustrated total internal reflection. Polarizing beam splitters, such as the Wollaston prism, use birefringent materials, splitting light into beams of differing polarization. Another design is the use of a half-silvered mirror, a sheet of glass or plastic with a transparently thin coating of metal, now usually Aluminum deposited from Aluminum vapor. The thickness of the deposit is controlled so that part (typically half) of the light that is incident at a 45-degree angle and not absorbed by the coating is transmitted, and the remainder is reflected. Instead of a metallic coating, a dichroic optical coating may be used. Depending on its characteristics, the ratio of reflection to transmission will vary as a function of the wavelength of the incident light. Dichroic mirrors are used in some ellipsoidal reflector spotlights to split off unwanted infrared (heat) radiation, and as output couplers in laser construction. A third version of the beam splitter is a dichroic mirrored prism assembly, which uses dichroic optical coatings to divide an incoming light beam into a number of spectrally distinct output beams.

A beam splitter that consists of a glass plate with a reflective dielectric coating on one side gives a phase shift of 0 or $\pi$, depending on the side from which it is incident. Transmitted waves have no phase shift. Reflected waves entering from the reflective side (red) are phase-shifted by $\pi$, whereas reflected waves entering from the glass side (blue) have no phase shift. This is due to the Fresnel equations, according to which reflection causes a phase shift only when light passing through a material of low refractive index is reflected at a material of high refractive index. This is the case in the transition of air to reflector, but not from glass to reflector (given that the refractive index of the reflector is in between that of glass and that of air).

A diffractive beam splitter (also known as multispot beam generator or array beam generator) is a single optical element that divides an input beam into N output beams. Each output beam retains the same optical characteristics as the input beam, such as size, polarization and phase. A diffractive beam splitter can generate either a 1-dimensional beam array (1×N) or a 2-dimensional beam matrix (M×N), depending on the diffractive pattern on the element. The diffractive beam splitter is used with monochromatic light such as a laser beam, and is designed for a specific wavelength and angle of separation between output beams. The theory of operation is based on the wave nature of light and Huygens' Principle. Designing the diffractive pattern for a beam splitter follows the same principle as a diffraction grating, with a repetitive pattern etched on the surface of a substrate. The depth of the etching pattern is roughly on the order of the wavelength of light in the application, with an adjustment factor related to the substrate's index of refraction. The etching pattern is composed of "periods"-identical sub-pattern units that repeat cyclically. While the grating equation determines the direction of the output beams, it does not determine the distribution of light intensity among those beams. The power distribution is defined by the etching profile within the unit period, which can involve many (not less than two) etching transitions of varying duty cycles. In a 1-dimensional diffractive beam splitter, the diffractive pattern is linear, while a 2-dimensional element will have a complex pattern.

Power divider. Power dividers (also power splitters and, when used in reverse, power combiners) and directional couplers are passive devices used in the field of radio technology. They couple a defined amount of the electromagnetic power in a transmission line to a port enabling the signal to be used in another circuit. An essential feature of directional couplers is that they only couple power flowing in one direction. Power entering the output port is coupled to the isolated port but not to the coupled port.

Directional couplers are most frequently constructed from two coupled transmission lines set close enough together such that energy passing through one is coupled to the other. This technique is favored at the microwave frequencies where transmission line designs are commonly used to implement many circuit elements. However, lumped component devices are also possible at lower frequencies. Also at microwave frequencies, particularly the higher bands, waveguide designs can be used. Many of these waveguide couplers correspond to one of the conducting transmission line designs, but there are also types that are unique to waveguide.

The most common form of directional coupler is a pair of coupled transmission lines. They can be realized in a number of technologies including coaxial and the planar technologies (stripline and microstrip). An implementation in stripline is shown in FIG. 4 of a quarter-wavelength ($\lambda/4$) directional coupler.

The main line is the section between ports 1 and 2 and the coupled line is the section between ports 3 and 4. Since the directional coupler is a linear device, the notations on FIG. 1 are arbitrary. Any port can be the input, which will result in the directly connected port being the transmitted port, the adjacent port being the coupled port, and the diagonal port being the isolated port. On some directional couplers, the main line is designed for high power operation (large connectors), while the coupled port may use a small connector, such as an SMA connector. The internal load power rating may also limit operation on the coupled line. Accuracy of coupling factor depends on the dimensional tolerances for the spacing of the two coupled lines. For planar printed technologies this comes down to the resolution of the printing process which determines the minimum track width that can be produced and also puts a limit on how close the lines can be placed to each other. This becomes a problem when very tight coupling is required and 3 dB couplers often use a different design. However, tightly coupled lines can be produced in air stripline which also permits manufacture by printed planar technology. In this design the two lines are printed on opposite sides of the dielectric rather than side by side. The coupling of the two lines across their width is much greater than the coupling when they are edge-on to each other.

The λ/4 coupled line design is good for coaxial and stripline implementations but does not work so well in the now popular microstrip format, although designs do exist. The reason for this is that microstrip is not a homogeneous medium—there are two different mediums above and below the transmission strip. This leads to transmission modes other than the usual TEM mode found in conductive circuits. The propagation velocities of even and odd modes are different leading to signal dispersion. A better solution for microstrip is a coupled line much shorter than λ/4, but this has the disadvantage of a coupling factor which rises noticeably with frequency. A variation of this design sometimes encountered has the coupled line a higher impedance than the main line. This design is advantageous where the coupler is being fed to a detector for power monitoring. The higher impedance line results in a higher RF voltage for a given main line power making the work of the detector diode easier.

The transmission line power dividers may be simple T-junctions. However, such dividers suffer from very poor isolation between the output ports—a large part of the power reflected back from port 2 finds it way into port 3. The term hybrid coupler originally applied to 3 dB coupled line directional couplers, that is, directional couplers in which the two outputs are each half the input power. This synonymously meant a quadrature 3 dB coupler with outputs 90° out of phase.

One of the most common, and simplest, waveguide directional couplers is the Bethe-hole directional coupler. This consists of two parallel waveguides, one stacked on top of the other, with a hole between them. Some of the power from one guide is launched through the hole into the other. The Bethe-hole coupler is another example of a backward coupler. The concept of the Bethe-hole coupler can be extended by providing multiple holes. The holes are spaced λ/4 apart. The design of such couplers has parallels with the multiple section coupled transmission lines. Using multiple holes allows the bandwidth to be extended by designing the sections as a Butterworth, Chebyshev, or some other filter class. The hole size is chosen to give the desired coupling for each section of the filter. Design criteria are to achieve a substantially flat coupling together with high directivity over the desired band.

The Riblet short-slot coupler is two waveguides side-by-side with the side-wall in common instead of the long side as in the Bethe-hole coupler. A slot is cut in the sidewall to allow coupling. This design is frequently used to produce a 3 dB coupler. The Schwinger reversed-phase coupler is another design using parallel waveguides, this time the long side of one is common with the short side-wall of the other. Two off-centre slots are cut between the waveguides spaced λ/4 apart. The Schwinger is a backward coupler. This design has the advantage of a substantially flat directivity response and the disadvantage of a strongly frequency-dependent coupling compared to the Bethe-hole coupler, which has little variation in coupling factor. The Moreno crossed-guide coupler has two waveguides stacked one on top of the other like the Bethe-hole coupler but at right angles to each other instead of parallel. Two off-centre holes, usually cross-shaped are cut on the diagonal between the waveguides a distance 2λ/4 apart. The Moreno coupler is good for tight coupling applications. It is a compromise between the properties of the Bethe-hole and Schwinger couplers with both coupling and directivity varying with frequency. Coherent power division may be accomplished by means of simple Tee junctions. At microwave frequencies, waveguide tees have two possible forms—the E-plane and H-plane. These two junctions split power equally, but because of the different field configurations at the junction, the electric fields at the output arms are in phase for the H-plane tee and are 180° out of phase for the E-plane tee. The combination of these two tees to form a hybrid tee is known as the magic tee. The magic tee is a four-port component which can perform the vector sum (Σ) and difference (Δ) of two coherent microwave signals.

Waveguide. A waveguide is a structure that guides waves, such as electromagnetic, optical, or sound waves, and enables a signal to propagate with minimal loss of energy by restricting expansion to one dimension or two. Without the physical constraint of a waveguide, signals are typically radiated and decreased according to the inverse square law as they expand into a three-dimensional space. The geometry of a waveguide reflects its function. Slab waveguides confine energy to travel only in one dimension, fiber or channel waveguides for two dimensions. The frequency of the transmitted wave also dictates the shape of a waveguide: an optical fiber guiding high-frequency light will not guide microwaves of a much lower frequency. As a rule of thumb, the width of a waveguide needs to be of the same order of magnitude as the wavelength of the guided wave.

Electromagnetic (RF) waveguide. In electromagnetics and communications engineering, the term waveguide may refer to any linear structure that conveys electromagnetic waves between its endpoints, commonly a hollow metal pipe used to carry radio waves. This type of waveguide is used as a transmission line mostly at microwave frequencies, for such purposes as connecting microwave transmitters and receivers to their antennas, in equipment such as microwave ovens, radar sets, satellite communications, and microwave radio links.

A dielectric waveguide employs a solid dielectric rod rather than a hollow pipe. Transmission lines such as microstrip, coplanar waveguide, stripline or coaxial cable may also be considered to be waveguides. The electromagnetic waves in a (metal-pipe) waveguide may be imagined as travelling down the guide in a zig-zag path, being repeatedly reflected between opposite walls of the guide. For the particular case of rectangular waveguide, it is possible to base an exact analysis on this view. Propagation in a dielectric waveguide may be viewed in the same way, with the waves confined to the dielectric by total internal reflection at its surface. Some structures, such as non-radiative dielectric waveguides and the Goubau line, use both metal walls and dielectric surfaces to confine the wave.

Optical waveguide. An optical waveguide is a physical structure that guides electromagnetic waves in the optical spectrum. Common types of optical waveguides include optical fiber and rectangular waveguides. Optical waveguides are used as components in integrated optical circuits or as the transmission medium in local and long haul optical communication systems. Optical waveguides can be classified according to their geometry (planar, strip, or fiber waveguides), mode structure (single-mode, multi-mode), refractive index distribution (step or gradient index) and material (glass, polymer, semiconductor).

A strip waveguide is basically a strip of the layer confined between cladding layers. The simplest case is a rectangular waveguide, which is formed when the guiding layer of the slab waveguide is restricted in both transverse directions rather than just one. They are commonly used as the basis of such optical components as Mach-Zehnder interferometers and wavelength division multiplexers. A rib waveguide is a waveguide in which the guiding layer basically consists of the slab with a strip (or several strips) superimposed onto it. Rib waveguides also provide confinement of the wave in two dimensions.

Optical waveguides typically maintain a constant cross-section along their direction of propagation. This is for example the case for strip and of rib waveguides. However, waveguides can also have periodic changes in their cross-section while still allowing lossless transmission of light via so-called Bloch modes. Such waveguides are referred to as segmented waveguides (with a 1D patterning along the direction of propagation) or as photonic crystal waveguides (with a 2D or 3D patterning).

Optical waveguides find their most important application in photonics. Configuring the waveguides in 3D space provides integration between electronic components on a chip and optical fibers. Such waveguides may be designed for a single mode propagation of infrared light at telecommunication wavelengths, and configured to deliver optical signal between input and output locations with very low loss. Optical waveguides formed in pure silica glass as a result of an accumulated self-focusing effect with 193 nm laser irradiation. Pictured using transmission microscopy with collimated illumination.

Optical fiber is typically a circular cross-section dielectric waveguide consisting of a dielectric material surrounded by another dielectric material with a lower refractive index. Optical fibers are most commonly made from silica glass, however other glass materials are used for certain applications and plastic optical fiber can be used for short-distance applications.

Acoustic waveguide. An acoustic waveguide is a physical structure for guiding sound waves. A duct for sound propagation typically behaves like a transmission line (e.g. air conditioning duct, car muffler, etc.). The duct contains some medium, such as air, that supports sound propagation. Its length is typically around quarter of the wavelength, which is intended to be guided, but the dimensions of its cross section are smaller than this. Sound is introduced at one end of the tube by forcing the pressure to vary in the direction of propagation, which causes a pressure gradient to travel perpendicular to the cross section at the speed of sound. When the wave reaches the end of the transmission line, its behavior depends on what is present at the end of the line. There are three generalized scenarios:

A low impedance load (e.g. leaving the end open in free air) will cause a reflected wave in which the sign of the pressure variation reverses, but the direction of the pressure wave remains the same. A load that matches the characteristic impedance will completely absorb the wave and the energy associated with it. No reflection will occur. A high impedance load (e.g. by plugging the end of the line) will cause a reflected wave in which the direction of the pressure wave is reversed but the sign of the pressure remains the same. Where a transmission line of finite length is mismatched at both ends, there is the potential for a wave to bounce back and forth many times until it is absorbed. This phenomenon is a kind of resonance and will tend to attenuate any signal fed into the line. When this resonance effect is combined with some sort of active feedback mechanism and power input, it is possible to set up an oscillation which can be used to generate periodic acoustic signals such as musical notes (e.g. in an organ pipe).

Digital photography is described in an article by Robert Berdan (downloaded from www.canadianphotographer.com) entitled: "*Digital Photography Basics for Beginners*", and in a guide published on April 2004 by Que Publishing (ISBN—0-7897-3120-7) entitled: "*Absolute Beginner's Guide to Digital Photography*" authored by Joseph Ciaglia et al., which are both incorporated in their entirety for all purposes as if fully set forth herein.

A digital camera 260 shown in FIG. 26, may be a digital still camera which converts captured image into an electric signal upon a specific control, or can be a video camera, wherein the conversion between captured images to the electronic signal is continuous (e.g., 24 frames per second). The camera 260 is preferably a digital camera, wherein the video or still images are converted using an electronic image sensor 262. The digital camera 260 includes a lens 261 (or few lenses) for focusing the received light centered around an optical axis 272 onto the small semiconductor image sensor 262. The optical axis 272 is an imaginary line along which there is some degree of rotational symmetry in the optical system, and typically passes through the center of curvature of the lens 261 and commonly coincides with the axis of the rotational symmetry of the sensor 262. The image sensor 262 commonly includes a panel with a matrix of tiny light-sensitive diodes (photocells), converting the image light to electric charges and then to electric signals, thus creating a video picture or a still image by recording the light intensity. Charge-Coupled Devices (CCD) and CMOS (Complementary Metal-Oxide-Semiconductor) are commonly used as the light-sensitive diodes. Linear or area arrays of light-sensitive elements may be used, and the light sensitive sensors may support monochrome (black & white), color or both. For example, the CCD sensor KAI-2093 Image Sensor 1920 (H)×1080 (V) Interline CCD Image Sensor or KAF-50100 Image Sensor 8176 (H)×6132 (V) Full-Frame CCD Image Sensor can be used, available from Image Sensor Solutions, Eastman Kodak Company, Rochester, New York.

An image processor block 263 receives the analog signal from the image sensor 262. The Analog Front End (AFE) in the block 263 filters, amplifies, and digitizes the signal, using an analog-to-digital (A/D) converter. The AFE further provides Correlated Double Sampling (CDS), and provides a gain control to accommodate varying illumination conditions. In the case of a CCD-based sensor 262, a CCD AFE (Analog Front End) component may be used between the digital image processor 263 and the sensor 262. Such an AFE may be based on VSP2560 '*CCD Analog Front End for Digital Cameras*' available from Texas Instruments Incorporated of Dallas, Texas, U.S.A. The block 263 further contains a digital image processor, which receives the digital data from the AFE, and processes this digital representation of the image to handle various industry-standards, and to execute various computations and algorithms. Preferably, additional image enhancements may be performed by the block 263 such as generating greater pixel density or adjusting color balance, contrast, and luminance. Further, the block 263 may perform other data management functions and processing on the raw digital image data. Commonly, the timing relationship of the vertical/horizontal reference signals and the pixel clock are also handled in this block. Digital Media System-on-Chip device TMS320DM357 available from Texas Instruments Incorporated of Dallas, Texas, U.S.A. is an example of a device implementing in a single chip (and associated circuitry) part or all of the image processor 263, part or all of a video compressor 264 and part or all of a transceiver 265. In addition to a lens or lens system, color filters may be placed between the imaging optics and the photosensor array 262 to achieve desired color manipulation.

The processing block 263 converts the raw data received from the photosensor array 262 (which can be any internal camera format, including before or after Bayer translation) into a color-corrected image in a standard image file format. The camera 260 further comprises a connector 269, and a transmitter or a transceiver 265 is disposed between the connector 269 and the image processor 263. The transceiver 265 also includes isolation magnetic components (e.g. transformer-based), balancing, surge protection, and other suitable components required for providing a proper and standard interface via the connector 269. In the case of connecting to a wired medium, the connector 269 further contains protection circuitry for accommodating transients, over-voltage and lightning, and any other protection means for reducing or eliminating the damage from an unwanted signal over the wired medium. A band pass filter may also be used for passing only the required communication signals, and rejecting or stopping other signals in the described path. A transformer may be used for isolating and reducing common-mode interferences. Further, a wiring driver and wiring receivers may be used in order to transmit and receive the appropriate level of signal to and from the wired medium. An equalizer may also be used in order to compensate for any frequency dependent characteristics of the wired medium.

Other image processing functions performed by the image processor 263 may include adjusting color balance, gamma and luminance, filtering pattern noise, filtering noise using Wiener filter, changing zoom factors, recropping, applying enhancement filters, applying smoothing filters, applying subject-dependent filters, and applying coordinate transformations. Other enhancements in the image data may include applying mathematical algorithms to generate greater pixel density or adjusting color balance, contrast and/or luminance.

The image processing may further include an algorithm for motion detection by comparing the current image with a reference image and counting the number of different pixels, where the image sensor 262 or the digital camera 260 are assumed to be in a fixed location and thus assumed to capture the same image. Since images are naturally differ due to factors such as varying lighting, camera flicker, and CCD dark currents, pre-processing is useful to reduce the number of false positive alarms. Algorithms that are more complex, are necessary to detect motion when the camera itself is moving, or when the motion of a specific object must be detected in a field containing other movement that can be ignored. Further, the video or image processing may use, or be based on the algorithms and techniques disclosed in the book entitled: "*Handbook of Image & Video Processing*", edited by Al Bovik, by Academic Press, ISBN: 0-12-119790-5, which is incorporated in its entirety for all purposes as if fully set forth herein.

A controller 268, located within the camera device or module 260, may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 268 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as a firmware stored in the memory. The controller 268 controls and monitors the device operation, such as initialization, configuration, interface, and commands.

The digital camera device or module 260 requires power for its described functions such as for capturing, storing, manipulating, and transmitting the image. A dedicated power source may be used such as a battery or a dedicated connection to an external power source via connector 269. The power supply may contain a DC/DC converter. In another embodiment, the power supply is power fed from the AC power supply via AC plug and a cord, and thus may include an AC/DC converter, for converting the AC power (commonly 115 VAC/60 Hz or 220 VAC/50 Hz) into the required DC voltage or voltages. Such power supplies are known in the art and typically involves converting 120 or 240 volt AC supplied by a power utility company to a well-regulated lower voltage DC for electronic devices. In one embodiment, the power supply is integrated into a single device or circuit, in order to share common circuits. Further, the power supply may include a boost converter, such as a buck boost converter, charge pump, inverter and regulators as known in the art, as required for conversion of one form of electrical power to another desired form and voltage. While the power supply (either separated or integrated) can be an integral part and housed within the camera 260 enclosure, it may be enclosed as a separate housing connected via cable to the camera 260 assembly. For example, a small outlet plug-in step-down transformer shape can be used (also known as wall-wart, "power brick", "plug pack", "plug-in adapter", "adapter block", "domestic mains adapter", "power adapter", or AC adapter). Further, the power supply may be a linear or switching type.

Various formats that can be used to represent the captured image are TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. In many cases, video data is compressed before transmission, in order to allow its transmission over a reduced bandwidth transmission system. A video compressor 264 (or video encoder) is shown in FIG. 26 disposed between the image processor 263 and the transceiver 265, allowing for compression of the digital video signal before its transmission over a cable or over-the-air. In some cases, compression may not be required, hence obviating the need for such compressor 264. Such compression can be lossy or lossless types. Common compression algorithms are JPEG (Joint Photographic Experts Group) and MPEG (Moving Picture Experts Group). The above and other image or video compression techniques can make use of intraframe compression commonly based on registering the differences between part of single frame or a single image. Interframe compression can further be used for video streams, based on registering differences between frames. Other examples of image processing include run length encoding and delta modulation. Further, the image can be dynamically dithered to allow the displayed image to appear to have higher resolution and quality.

The single lens or a lens array 261 is positioned to collect optical energy that is representative of a subject or a scenery, and to focus the optical energy onto the photosensor array 262. Commonly, the photosensor array 262 is a matrix of photosensitive pixels, which generates an electric signal that is a representative of the optical energy directed at the pixel by the imaging optics. The captured image (still images or as video data) may be stored in a memory 267, that may be volatile or non-volatile memory, and may be a built-in or removable media. Many stand-alone cameras use SD format, while a few use CompactFlash or other types. A LCD or TFT miniature display 266 typically serves as an Electronic ViewFinder (EVF) where the image captured by the lens is electronically displayed. The image on this display is used to assist in aiming the camera at the scene to be photographed. The sensor records the view through the lens, the view is processed, and finally projected on a miniature display which is viewable through the eyepiece. Electronic viewfinders are used in digital still cameras and in video cameras. Electronic viewfinders can show additional information, such as an image histogram, focal ratio, camera settings, battery charge, and remaining storage space. The display 266 may further display images captured earlier that are stored in the memory 267.

While the digital camera 260 has been exampled above with regard to capturing a single image using the single lens 261 and the single sensor 262, it is apparent that multiple images can be equally considered, using multiple image capturing mechanisms. An example of two capturing mechanisms is shown for a digital camera 260*a* shown in FIG. 26*a*. Lenses 261 and 261*a* are respectively associated with sensors 262 and 262*a*, which in turn respectively connects to image processors 263 and 263*a*. In the case where a compression function is used, video compressors 264 and 264*a*, respectively, compress the data received from the processors 263 and 263*a*. In one embodiment, two transceivers (each of the same as transceiver 265, for example) and two ports (each of the same type as port 269, for example) are used. Further, two communication mediums (each similar or the same as described above) can be employed, each carrying the image corresponding to the respective lens. Further, the same medium can be used using Frequency Division/Domain Multiplexing (FDM). In such an environment, each signal is carried in a dedicated frequency band, distinct from the other signals concurrently carried over the same medium. The signals are combined onto the medium and separated from the medium using various filtering schemes, employed in a multiplexer 273. In another embodiment, the multiple images are carried using Time Domain/Division Multiplexing (TDM). The digital data stream from the video compressors 264 and 264*b* is multiplexed into a single stream by the multiplexer 273, serving as a time multiplexer. The combined signal is then fed to the single transceiver 265 for transmitting onto the medium. Using two or more image-capturing components can further be used to provide stereoscopic video, allowing 3-D or any other stereoscopic view of the content, or other methods of improving the displayed image quality of functionality.

Digital camera is described in U.S. Pat. No. 6,897,891 to Itsukaichi entitled: "Computer System Using a Camera That is Capable of Inputting Moving Picture or Still Picture Data", in U.S. Patent Application Publication No. 2007/0195167 to Ishiyama entitled: "Image Distribution System, Image Distribution Server, and Image Distribution Method", in U.S. Patent Application Publication No. 2009/0102940 to Uchida entitled: "Imaging Device and imaging Control Method", and in U.S. Pat. No. 5,798,791 to Katayama et al. entitled: "Multieye Imaging Apparatus", which are all incorporated in their entirety for all purposes as if fully set forth herein.

A digital camera capable of being set to implement the function of a card reader or camera is disclosed in U.S. Patent Application Publication 2002/0101515 to Yoshida et al. entitled: "Digital camera and Method of Controlling Operation of Same", which is incorporated in its entirety for all purposes as if fully set forth herein. When the digital camera capable of being set to implement the function of a card reader or camera is connected to a computer via a USB, the computer is notified of the function to which the camera has been set. When the computer and the digital camera are connected by the USB, a device request is transmitted from the computer to the digital camera. Upon receiving the device request, the digital camera determines whether its operation at the time of the USB connection is that of a card reader or PC camera. Information indicating the result of the determination is incorporated in a device descriptor, which the digital camera then transmits to the computer. On the basis of the device descriptor, the computer detects the type of operation to which the digital camera has been set. The driver that supports this operation is loaded and the relevant commands are transmitted from the computer to the digital camera.

A prior art example of a portable electronic camera connectable to a computer is disclosed in U.S. Pat. No. 5,402,170 to Parulski et al. entitled: "Hand-Manipulated Electronic Camera Tethered to a Personal Computer", a digital electronic camera which can accept various types of input/output cards or memory cards is disclosed in U.S. Pat. No. 7,432,952 to Fukuoka entitled: "Digital Image Capturing Device having an Interface for Receiving a Control Program", and the use of a disk drive assembly for transferring images out of an electronic camera is disclosed in U.S. Pat. No. 5,138,459 to Roberts et al., entitled: "Electronic Still Video Camera with Direct Personal Computer (PC) Compatible Digital Format Output", which are all incorporated in their entirety for all purposes as if fully set forth herein. A camera with human face detection means is disclosed in U.S. Pat. No. 6,940,545 to Ray et al., entitled: "Face Detecting Camera and Method", and in U.S. Patent Application Publication No. 2012/0249768 to Binder entitled: "System and Method for Control Based on Face or Hand Gesture Detection", which are both incorporated in their entirety for all purposes as if fully set forth herein. A digital still camera is described in an Application Note No. AN1928/D (Revision 0-20 Feb. 2001) by Freescale Semiconductor, Inc. entitled: "Roadrunner—Modular digital still camera reference design", which is incorporated in its entirety for all purposes as if fully set forth herein.

An imaging method is disclosed in U.S. Pat. No. 8,773,509 to Pan entitled: "Imaging Device, Imaging Method and Recording Medium for Adjusting Imaging Conditions of Optical Systems Based on Viewpoint Images", which is incorporated in its entirety for all purposes as if fully set forth herein. The method includes: calculating an amount of parallax between a reference optical system and an adjustment target optical system; setting coordinates of an imaging condition evaluation region corresponding to the first viewpoint image outputted by the reference optical system; calculating coordinates of an imaging condition evaluation region corresponding to the second viewpoint image outputted by the adjustment target optical system, based on the set coordinates of the imaging condition evaluation region corresponding to the first viewpoint image, and on the calculated amount of parallax; and adjusting imaging conditions of the reference optical system and the adjustment target optical system, based on image data in the imaging condition evaluation region corresponding to the first viewpoint image, at the set coordinates, and on image data in the imaging condition evaluation region corresponding to the second viewpoint image, at the calculated coordinates, and outputting the viewpoint images in the adjusted imaging conditions.

Devices capable of capturing still and motion imagery are integrated with an accurate distance and speed measuring apparatus are described in U.S. Pat. No. 7,920,251 to Chung entitled: "Integrated still image, motion video and speed measurement system", which is incorporated in its entirety for all purposes as if fully set forth herein. By measuring the changing distance of the target over that time, a target's speed can be determined. At substantially the same time as the target's speed is determined, imagery of the target is captured in both a still and moving format. Using a queuing mechanism for both distance and imagery data along with time stamps associated with each, a target's image, both in motion and still, can be integrated with its speed. In situations in which a still image is unavailable, a target's speed can be associated with a portion of a continuous stream of motion imagery to a point where a positive identification can be captured with a still image.

A portable hand-holdable digital camera is described in Patent Cooperation Treaty (PCT) International Publication Number WO 2012/013914 by Adam LOMAS entitled: "Portable Hand-Holdable Digital Camera with Range Finder", which is incorporated in its entirety for all purposes as if fully set forth herein. The digital camera comprises a camera housing having a display, a power button, a shoot button, a flash unit, and a battery compartment; capture means for capturing an image of an object in two dimensional form and for outputting the captured two-dimensional image to the display; first range finder means including a zoomable lens unit supported by the housing for focusing on an object and calculation means for calculating a first distance of the object from the lens unit and thus a distance between points on the captured two-dimensional image viewed and selected on the display; and second range finder means including an emitted-beam range finder on the housing for separately calculating a second distance of the object from the emitted-beam range finder and for outputting the second distance to the calculation means of the first range finder means for combination therewith to improve distance determination accuracy.

Auto focus. An automatic focus (a.k.a. autofocus or AF) optical system uses a sensor, a control system and a motor or tunable optical element to focus on an automatically or manually selected point or area. An electronic rangefinder has a display instead of the motor; the adjustment of the optical system has to be done manually until indication. Autofocus methods are distinguished by their type as being either active, passive or hybrid variants. Autofocus systems rely on one or more sensors to determine correct focus, where some AF systems rely on a single sensor, while others use an array of sensors. Most modern SLR cameras use through-the-lens optical AF sensors, with a separate sensor array providing light metering, although the latter can be programmed to prioritize its metering to the same area as one or more of the AF sensors. Through-the-lens optical autofocusing is now often speedier and more precise than can be achieved manually with an ordinary viewfinder, although more precise manual focus can be achieved with special accessories such as focusing magnifiers. Autofocus accuracy within ⅓ of the depth of field (DOF) at the widest aperture of the lens is common in professional AF SLR cameras.

Autofocus (AF) systems rely on one or more sensors to determine correct focus. Some AF systems rely on a single sensor while others use an array of sensors. Most modern SLR cameras use through-the-lens optical AF sensors, with a separate sensor array providing light metering, although the latter can be programmed to prioritize its metering to the same area as one or more of the AF sensors. Through-the-lens optical autofocusing is often speedier and more precise than can be achieved manually with an ordinary viewfinder, although more precise manual focus can be achieved with special accessories such as focusing magnifiers. Autofocus accuracy within ⅓ of the Depth-Of-Field (DOF) at the widest aperture of the lens is not uncommon in professional AF SLR cameras. Most multi-sensor AF cameras allow manual selection of the active sensor, and many offer an automatic selection of the sensor using algorithms that attempt to discern the location of the subject.

Most multi-sensor AF cameras allow manual selection of the active sensor, and many offer automatic selection of the sensor using algorithms which attempt to discern the location of the subject. Some AF cameras are able to detect whether the subject is moving towards or away from the camera, including speed and acceleration data, and keep focus on the subject—a function used mainly in sports and other action photography. The data collected from AF sensors is used to control an electromechanical system that adjusts the focus of the optical system. A variation of autofocus is an electronic rangefinder, a system in which focus data are provided to the operator, but adjustment of the optical system is still performed manually. The speed of the AF system is highly dependent on the maximum aperture offered by the lens. F-stops of around f/2 to f/2.8 are generally considered optimal in terms of focusing speed and accuracy. Faster lenses than this (e.g., f/1.4 or f/1.8) typically have very low depth of field, meaning that it takes longer to achieve correct focus despite the increased amount of light.

Active AF systems measure distance to the subject independently of the optical system, and subsequently adjust the optical system for correct focus. There are various ways to measure distance, including ultrasonic sound waves and infrared light. In the first case, sound waves are emitted from the camera, and by measuring the delay in their reflection, distance to the subject is calculated. An exception to the two-step approach is the mechanical autofocus provided in some enlargers, which adjust the lens directly.

Passive AF systems determine correct focus by performing passive analysis of the image that is entering the optical system. They generally do not direct any energy, such as ultrasonic sound or infrared light waves, toward the subject. However, an autofocus assist beam of usually infrared light is required when there is not enough light to take passive measurements. Passive autofocusing can be achieved by phase detection or contrast measurement.

Shutter button. A shutter-release button (sometimes just shutter release or shutter button) is a push-button found on many cameras, used to take a picture when pushed. When pressed, the shutter of the camera is "released", so that it opens to capture a picture, and then closes, allowing an exposure time as determined by the shutter speed setting (which may be automatic). The term "release" comes from old mechanical shutters that were "cocked" or "tensioned" by one lever, and then "released" by another. In modern or digital photography, this notion is less meaningful, so the term "shutter button" is more used.

Perspective distortion. In photography and cinematography, perspective distortion is a warping or transformation of an object and its surrounding area that differs significantly from what the object would look like with a normal focal length, due to the relative scale of nearby and distant features. Perspective distortion is determined by the relative distances at which the image is captured and viewed, and is due to the angle of view of the image (as captured) being either wider or narrower than the angle of view at which the image is viewed, hence the apparent relative distances differing from what is expected. Related to this concept is axial magnification—the perceived depth of objects at a given magnification. Perspective distortion takes two forms: extension distortion and compression distortion, also called wide-angle distortion and long-lens or telephoto distortion, when talking about images with the same field size. Extension or wide-angle distortion can be seen in images shot from close using a wide-angle lens (with an angle of view wider than a normal lens). Object close to the lens appears abnormally large relative to more distant objects, and distant objects appear abnormally small and hence more distant—distances are extended. Compression, long-lens, or telephoto distortion can be seen in images shot from a distant using a long focus lens or the more common telephoto sub-type (with an angle of view narrower than a normal lens). Distant objects look approximately the same size—closer objects are abnormally small, and more distant objects are abnormally large, and hence the viewer cannot discern relative distances between distant objects—distances are compressed.

Perspective distortion is influenced by the relationship between two factors: the angle of view at which the image is captured by the camera and the angle of view at which the photograph of the subject is presented or viewed. When photographs are viewed at the ordinary viewing distance, the angle of view at which the image is captured accounts completely for the appearance of perspective distortion. The general assumption that "undoctored" photos cannot distort a scene is incorrect. Perspective distortion is particularly noticeable in portraits taken with wide-angle lenses at short camera-to-subject distances. They generally give an unpleasant impression, making the nose appear too large with respect to the rest of the face, and distorting the facial expression. Framing the same subject identically while using a moderate telephoto or long focus lens (with a narrow angle of view) flattens the image to a more flattering perspective. It is for this reason that, for a 35 mm camera, lenses with focal lengths from about 85 through 135 mm are generally considered to be good portrait lenses. It does however make difference, whether the photograph is taken landscape or portrait. A 50 mm lens is suitable for photographing people when the orientation is landscape. Conversely, using lenses with much longer focal lengths for portraits results in more extreme flattening of facial features, which also may be objectionable to the viewer.

Perspective control is a procedure for composing or editing photographs to better conform with the commonly accepted distortions in constructed perspective. The control would make all parallel lines (such as four horizontal edges of a cubic room) cross in one point, and all lines that are vertical in reality vertical in the image. This includes columns, vertical edges of walls and lampposts. This is a commonly accepted distortion in constructed perspective; perspective is based on the notion that more distant objects are represented as smaller on the page; however, even though the top of the cathedral tower is in reality further from the viewer than base of the tower (due to the vertical distance), constructed perspective considers only the horizontal distance and considers the top and bottom to be the same distance away.

Perspective projection distortion occurs in photographs when the film plane is not parallel to lines that are required to be parallel in the photo. A common case is when a photo is taken of a tall building from ground level by tilting the camera backwards: the building appears to fall away from the camera. Digital post-processing software provides means to correct converging verticals and other distortions introduced at image capture.

It is commonly suggested to correct perspective using a general projective transformation tool, correcting vertical tilt (converging verticals) by stretching out the top; this is the "Distort Transform" in Photoshop, and the "perspective tool" in GIMP. However, this introduces vertical distortion—objects appear squat (vertically compressed, horizontally extended)—unless the vertical dimension is also stretched. This effect is minor for small angles, and can be corrected by hand, manually stretching the vertical dimension until the proportions look right, but is automatically done by specialized perspective transform tools. An alternative interface, found in Photoshop (CS and subsequent releases) is the "perspective crop", which enables the user to perform perspective control with the cropping tool, setting each side of the crop to independently determined angles, which can be more intuitive and direct. Other software with mathematical models on how lenses and different types of optical distortions affect the image can correct this by being able to calculate the different characteristics of a lens and re-projecting the image in a number of ways (including non-rectilinear projections). An example of this kind of software is the panorama creation suite Hugin.

Vehicle. A vehicle is a mobile machine that transports people or cargo. Most often, vehicles are manufactured, such as wagons, bicycles, motor vehicles (motorcycles, cars, trucks, buses), railed vehicles (trains, trams), watercraft (ships, boats), aircraft and spacecraft. The vehicle may be designed for use on land, in fluids, or be airborne, such as bicycle, car, automobile, motorcycle, train, ship, boat, submarine, airplane, scooter, bus, subway, train, or spacecraft. A vehicle may consist of, or may comprise, a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane. Further, a vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane.

A vehicle may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The system described herein may be used to control, monitor or otherwise be part of, or communicate with, the vehicle motion system. Similarly, the system described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically automobiles have four wheels, and are constructed to principally transport of people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

Aircraft. An aircraft is a machine that is able to fly by gaining support from the air. It counters the force of gravity by using either static lift or by using the dynamic lift of an airfoil, or in a few cases, the downward thrust from jet engines. The human activity that surrounds aircraft is called aviation. Crewed aircraft are flown by an onboard pilot, but unmanned aerial vehicles may be remotely controlled or self-controlled by onboard computers. Aircraft may be classified by different criteria, such as lift type, aircraft propulsion, usage and others.

Aerostats are lighter than air aircrafts that use buoyancy to float in the air in much the same way that ships float on the water. They are characterized by one or more large gasbags or canopies filled with a relatively low-density gas such as helium, hydrogen, or hot air, which is less dense than the surrounding air. When the weight of this is added to the weight of the aircraft structure, it adds up to the same weight as the air that the craft displaces. Heavier-than-air aircraft, such as airplanes, must find some way to push air or gas downwards, so that a reaction occurs (by Newton's laws of motion) to push the aircraft upwards. This dynamic movement through the air is the origin of the term aerodyne. There are two ways to produce dynamic upthrust: aerodynamic lift and powered lift in the form of engine thrust.

Aerodynamic lift involving wings is the most common, with fixed-wing aircraft being kept in the air by the forward movement of wings, and rotorcraft by spinning wing-shaped rotors sometimes called rotary wings. A wing is a flat, horizontal surface, usually shaped in cross-section as an aerofoil. To fly, air must flow over the wing and generate lift. A flexible wing is a wing made of fabric or thin sheet material, often stretched over a rigid frame. A kite is tethered to the ground and relies on the speed of the wind over its wings, which may be flexible or rigid, fixed, or rotary.

The term 'Horizontal' herein refers to include a direction, line, surface, or plane that is parallel or substantially-parallel to the plane of the horizon. The term 'substantially horizontal' includes a direction, line, surface, or plane that is forming an angle of less than 20°, 18°, 15°, 13°, 10°, 8°, 5°, 3°, 2°, 1°, 0.8°, 0.5°, 0.3°, 0.2°, or 0.1° from ideal horizontal. The term 'Vertical' herein refers to include a direction, line, surface, or plane that is an upright or parallel or at right angles to a horizontal plane. The term 'substantially vertical' includes a direction, line, surface, or plane that is forming an angle of less than 20°, 18°, 15°, 13°, 10°, 8°, 5°, 3°, 2°, 1°, 0.8°, 0.5°, 0.3°, 0.2°, or 0.1° from an ideal vertical.

Gliders are heavier-than-air aircraft that do not employ propulsion once airborne. Take-off may be by launching forward and downward from a high location, or by pulling into the air on a tow-line, either by a ground-based winch or vehicle, or by a powered "tug" aircraft. For a glider to maintain its forward air speed and lift, it must descend in relation to the air (but not necessarily in relation to the ground). Many gliders can 'soar'—gain height from updrafts such as thermal currents. Common examples of gliders are sailplanes, hang gliders and paragliders. Powered aircraft have one or more onboard sources of mechanical power, typically aircraft engines although rubber and manpower have also been used. Most aircraft engines are either lightweight piston engines or gas turbines. Engine fuel is stored in tanks, usually in the wings but larger aircraft also have additional fuel tanks in the fuselage.

A propeller aircraft use one or more propellers (airscrews) to create thrust in a forward direction. The propeller is usually mounted in front of the power source in tractor configuration but can be mounted behind in pusher configuration. Variations of propeller layout include contra-rotating propellers and ducted fans. A Jet aircraft use airbreathing jet engines, which take in air, burn fuel with it in a combustion chamber, and accelerate the exhaust rearwards to provide thrust. Turbojet and turbofan engines use a spinning turbine to drive one or more fans, which provide additional thrust. An afterburner may be used to inject extra fuel into the hot exhaust, especially on military "fast jets". Use of a turbine is not absolutely necessary: other designs include the pulse jet and ramjet. These mechanically simple designs cannot work when stationary, so the aircraft must be launched to flying speed by some other method. Some rotorcraft, such as helicopters, have a powered rotary wing or rotor, where the rotor disc can be angled slightly forward so that a proportion of its lift is directed forwards. The rotor may, similar to a propeller, be powered by a variety of methods such as a piston engine or turbine. Experiments have also used jet nozzles at the rotor blade tips.

A vehicle may include a hood (a.k.a. bonnet), which is the hinged cover over the engine of motor vehicles that allows access to the engine compartment (or trunk on rear-engine and some mid-engine vehicles) for maintenance and repair. A vehicle may include a bumper, which is a structure attached, or integrated to, the front and rear of an automobile to absorb impact in a minor collision, ideally minimizing repair costs. Bumpers also have two safety functions: minimizing height mismatches between vehicles and protecting pedestrians from injury. A vehicle may include a cowling, which is the covering of a vehicle's engine, most often found on automobiles and aircraft. A vehicle may include a dashboard (also called dash, instrument panel, or fascia), which is a control panel placed in front of the driver of an automobile, housing instrumentation and controls for operation of the vehicle. A vehicle may include a fender that frames a wheel well (the fender underside). Its primary purpose is to prevent sand, mud, rocks, liquids, and other road spray from being thrown into the air by the rotating tire. Fenders are typically rigid and can be damaged by contact with the road surface. Instead, flexible mud flaps are used close to the ground where contact may be possible. A vehicle may include a quarter panel (a.k.a. rear wing), which is the body panel (exterior surface) of an automobile between a rear door (or only door on each side for two-door models) and the trunk (boot) and typically wraps around the wheel well. Quarter panels are typically made of sheet metal, but are sometimes made of fiberglass, carbon fiber, or fiber-reinforced plastic. A vehicle may include a rocker, which is the body section below the base of the door openings. A vehicle may include a spoiler, which is an automotive aerodynamic device whose intended design function is to 'spoil' unfavorable air movement across a body of a vehicle in motion, usually described as turbulence or drag. Spoilers on the front of a vehicle are often called air dams. Spoilers are often fitted to race and high-performance sports cars, although they have become common on passenger vehicles as well. Some spoilers are added to cars primarily for styling purposes and have either little aerodynamic benefit or even make the aerodynamics worse. The trunk (a.k.a. boot) of a car is the vehicle's main storage compartment. A vehicle door is a type of door, typically hinged, but sometimes attached by other mechanisms such as tracks, in front of an opening, which is used for entering and exiting a vehicle. A vehicle door can be opened to provide access to the opening, or closed to secure it. These doors can be opened manually, or powered electronically. Powered doors are usually found on minivans, high-end cars, or modified cars. Car glass includes windscreens, side and rear windows, and glass panel roofs on a vehicle. Side windows can be either fixed or be raised and lowered by depressing a button (power window) or switch or using a hand-turned crank.

The lighting system of a motor vehicle consists of lighting and signaling devices mounted or integrated to the front, rear, sides, and in some cases, the top of a motor vehicle. This lights the roadway for the driver and increases the conspicuity of the vehicle, allowing other drivers and pedestrians to see a vehicle's presence, position, size, direction of travel, and the driver's intentions regarding direction and speed of travel. Emergency vehicles usually carry distinctive lighting equipment to warn drivers and indicate priority of movement in traffic. A headlamp is a lamp attached to the front of a vehicle to light the road ahead. A chassis consists of an internal framework that supports a manmade object in its construction and use. An example of a chassis is the underpart of a motor vehicle, consisting of the frame (on which the body is mounted).

Automotive electronics. Automotive electronics involves any electrically-generated systems used in vehicles, such as ground vehicles. Automotive electronics commonly involves multiple modular ECUs (Electronic Control Unit) connected over a network such as Engine Control Modules (ECM) or Transmission Control Modules (TCM). Automotive electronics or automotive embedded systems are distributed systems, and according to different domains in the automotive field, they can be classified into Engine electronics, Transmission electronics, Chassis electronics, Active safety, Driver assistance, Passenger comfort, and Entertainment (or infotainment) systems.

One of the most demanding electronic parts of an automobile is the Engine Control Unit. Engine controls demand one of the highest real time deadlines, as the engine itself is a very fast and complex part of the automobile. The computing power of the engine control unit is commonly the highest, typically a 32-bit processor, that typically controls in real-time in a diesel engine the Fuel injection rate, Emission control, NOx control, Regeneration of oxidation catalytic converter, Turbocharger control, Throttle control, and Cooling system control. In a gasoline engine, the engine control typically involves Lambda control, OBD (On-Board Diagnostics), Cooling system control, Ignition system control, Lubrication system control, Fuel injection rate control, and Throttle control.

An engine ECU typically connects to, or includes, sensors that actively monitor in real-time engine parameters such as pressure, temperature, flow, engine speed, oxygen level and NOx level, plus other parameters at different points within the engine. All these sensor signals are analyzed by the ECU, which has the logic circuits to do the actual controlling. The ECU output is commonly connected to different actuators for the throttle valve, EGR valve, rack (in VGTs), fuel injector (using a pulse-width modulated signal), dosing injector, and more.

Transmission electronics involves control of the transmission system, mainly the shifting of the gears for better shift comfort and to lower torque interrupt while shifting. Automatic transmissions use controls for their operation, and many semi-automatic transmissions having a fully automatic clutch or a semi-auto clutch (declutching only). The engine control unit and the transmission control typically exchange messages, sensor signals and control signals for their operation. Chassis electronics typically includes many sub-systems that monitor various parameters and are actively controlled, such as ABS—Anti-lock Braking System, TCS—Traction Control System, EBD—Electronic Brake Distribution, and ESP—Electronic Stability Program. Active safety systems involve modules that are ready-to-act when there is a collision in progress, or used to prevent it when it senses a dangerous situation, such as Air bags, Hill descent control, and Emergency brake assist system. Passenger comfort systems involve, for example, Automatic climate control, Electronic seat adjustment with memory, Automatic wipers, Automatic headlamps—adjusts beam automatically, and Automatic cooling—temperature adjustment. Infotainment systems include systems such as Navigation system, Vehicle audio, and Information access.

Automotive electric and electronic technologies and systems are described in a book published by Robert Bosch GmbH (5th Edition, July 2007) entitled: "*Bosch Automotive Electric and Automotive Electronics*" [ISBN—978-3-658-01783-5], which is incorporated in its entirety for all purposes as if fully set forth herein.

ADAS. Advanced Driver Assistance Systems, or ADAS, are automotive electronic systems to help the driver in the driving process, such as to increase car safety and more generally, road safety using a safe Human-Machine Interface (HMI). Advanced driver assistance systems (ADAS) are developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are many forms of ADAS available; some features are built into cars or are available as an add-on package. ADAS technology can be based upon, or use, vision/camera systems, sensor technology, car data networks, Vehicle-to-vehicle (V2V), or Vehicle-to-Infrastructure systems, and leverage wireless network connectivity to offer improved value by using car-to-car and car-to-infrastructure data. ADAS technologies or applications comprise: Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system (such as Precrash system), Collision Imminent Braking (CM), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning.

ADAS is further described in Intel Corporation 2015 Technical White Paper (0115/MW/HBD/PDF 331817-001US) by Meiyuan Zhao of Security & Privacy Research, Intel Labs entitled: "*Advanced Driver Assistant System—Threats, Requirements, Security Solutions*", and in a PhD Thesis by Alexandre Dugarry submitted on June 2004 to the Cranfield University, School of Engineering, Applied Mathematics and Computing Group, entitled: "*Advanced Driver Assistance Systems—Information Management and Presentation*", which are both incorporated in their entirety for all purposes as if fully set forth herein.

ACC. Autonomous cruise control (ACC; also referred to as 'adaptive cruise control' or 'radar cruise control') is an optional cruise control system for road vehicles that automatically adjusts the vehicle speed to maintain a safe distance from vehicles ahead. It makes no use of satellite or roadside infrastructures nor of any cooperative support from other vehicles. The vehicle control is imposed based on sensor information from on-board sensors only. Cooperative Adaptive Cruise Control (CACC) further extends the automation of navigation by using information gathered from fixed infrastructure such as satellites and roadside beacons, or mobile infrastructure such as reflectors or transmitters on the back of other vehicles. These systems use either a radar or laser sensor setup allowing the vehicle to slow when approaching another vehicle ahead and accelerate again to the preset speed when traffic allows. ACC technology is widely regarded as a key component of any future generations of intelligent cars. The impact is equally on driver safety as on economising capacity of roads by adjusting the distance between vehicles according to the conditions. Radar-based ACC often feature a precrash system, which warns the driver and/or provides brake support if there is a high risk of a collision. In certain cars it is incorporated with a lane maintaining system which provides power steering assist to reduce steering input burden in corners when the cruise control system is activated.

Adaptive High Beam. Adaptive High Beam Assist is Mercedes-Benz' marketing name for a headlight control strategy that continuously automatically tailors the headlamp range so the beam just reaches other vehicles ahead, thus always ensuring maximum possible seeing range without glaring other road users. It provides a continuous range of beam reach from a low-aimed low beam to a high-aimed high beam, rather than the traditional binary choice between low and high beams. The range of the beam can vary between 65 and 300 meters, depending on traffic conditions. In traffic, the low beam cutoff position is adjusted vertically to maximize seeing range while keeping glare out of leading and oncoming drivers' eyes. When no traffic is close enough for glare to be a problem, the system provides full high beam. Headlamps are adjusted every 40 milliseconds by a camera on the inside of the front windscreen which can determine distance to other vehicles. The adaptive high beam may be realized with LED headlamps.

Automatic parking. Automatic parking is an autonomous car-maneuvering system that moves a vehicle from a traffic lane into a parking spot to perform parallel, perpendicular or angle parking. The automatic parking system aims to enhance the comfort and safety of driving in constrained environments where much attention and experience is required to steer the car. The parking maneuver is achieved by means of coordinated control of the steering angle and speed, which takes into account the actual situation in the environment to ensure collision-free motion within the available space. The car is an example of a nonholonomic system where the number of control commands available is less than the number of coordinates that represent its position and orientation.

Automotive night vision. An automotive night vision system uses a thermographic camera to increase a driver's perception and seeing distance in darkness or poor weather beyond the reach of the vehicle's headlights. Active systems use an infrared light source built into the car to illuminate the road ahead with light that is invisible to humans. There are two kinds of active systems: gated and non-gated. The gated system uses a pulsed light source and a synchronized camera that enable long ranges (250m) and high performance in rain and snow. Passive infrared systems do not use an infrared light source, instead they capture thermal radiation already emitted by the objects, using a thermographic camera.

Blind spot monitor. The blind spot monitor is a vehicle-based sensor device that detects other vehicles located to the driver's side and rear. Warnings can be visual, audible, vibrating or tactile. Blind spot monitors may include more than monitoring the sides of the vehicle, such as 'Cross Traffic Alert', which alerts drivers backing out of a parking space when traffic is approaching from the sides. BLIS is an acronym for Blind Spot Information System, a system of protection developed by Volvo, and produced a visible alert when a car entered the blind spot while a driver was switching lanes, using two door mounted lenses to check the blind spot area for an impending collision.

Collision avoidance system. A collision avoidance system (a.k.a. precrash system) is an automobile safety system designed to reduce the severity of an accident. Such forward collision warning system or collision mitigating system typically uses radar (all-weather) and sometimes laser and camera (both sensor types are ineffective during bad weather) to detect an imminent crash. Once the detection is done, these systems either provide a warning to the driver when there is an imminent collision or take action autonomously without any driver input (by braking or steering or both). Collision avoidance by braking is appropriate at low vehicle speeds (e.g. below 50 km/h), while collision avoidance by steering is appropriate at higher vehicle speeds. Cars with collision avoidance may also be equipped with adaptive cruise control, and use the same forward-looking sensors.

Intersection assistant. Intersection assistant is an advanced driver assistance system for city junctions that are a major accident blackspot. The collisions here can mostly be put down to driver distraction or mis-judgement. While humans often react too slowly, assistance systems are immune to that brief moment of shock. The system monitors cross traffic in an intersection/road junction. If this anticipatory system detects a hazardous situation of this type, it prompts the driver to start emergency braking by activating visual and acoustic warnings and automatically engaging brakes.

Lane Departure Warning system. A lane departure warning system is a mechanism designed to warn the driver when the vehicle begins to move out of its lane (unless a turn signal is on in that direction) on freeways and arterial roads. These systems are designed to minimize accidents by addressing the main causes of collisions: driver error, distractions, and drowsiness. There are two main types of systems: Systems which warn the driver (lane departure warning, LDW) if the vehicle is leaving its lane (visual, audible, and/or vibration warnings), and systems which warn the driver and, if no action is taken, automatically take steps to ensure the vehicle stays in its lane (Lane Keeping System, LKS). Lane warning/keeping systems are based on video sensors in the visual domain (mounted behind the windshield, typically integrated beside the rear mirror), laser sensors (mounted on the front of the vehicle), or Infrared sensors (mounted either behind the windshield or under the vehicle).

ECU. In automotive electronics, an Electronic Control Unit (ECU) is a generic term for any embedded system that controls one or more of the electrical system or subsystems in a vehicle such as a motor vehicle. Types of ECU include Electronic/engine Control Module (ECM) (sometimes referred to as Engine Control Unit—ECU, which is distinct from the generic ECU—Electronic Control Unit), Airbag Control Unit (ACU), Powertrain Control Module (PCM), Transmission Control Module (TCM), Central Control Module (CCM), Central Timing Module (CTM), Convenience Control Unit (CCU), General Electronic Module (GEM), Body Control Module (BCM), Suspension Control Module (SCM), Door Control Unit (DCU), Powertrain Control Module (PCM), Electric Power Steering Control Unit (PSCU), Seat Control Unit, Speed Control Unit (SCU), Suspension Control Module (SCM), Telematic Control Unit (TCU), Telephone Control Unit (TCU), Transmission Control Unit (TCU), Brake Control Module (BCM or EBCM; such as ABS or ESC), Battery management system, control unit, or control module.

A microprocessor or a microcontroller serves as a core of an ECU, and uses a memory such as SRAM, EEPROM, and Flash. An ECU is power fed by a supply voltage, and includes or connects to sensors using analog and digital inputs. In addition to a communication interface, an ECU typically includes a relay, H-Bridge, injector, or logic drivers, or outputs for connecting to various actuators.

ECU technology and applications is described in the M. Tech. Project first stage report (EE696) by Vineet P. Aras of the Department of Electrical Engineering, Indian Institute of Technology Bombay, dated July 2004, entitled: "*Design of Electronic Control Unit* (*ECU*) *for Automobiles—Electronic Engine Management system*", and in National Instruments paper published Nov. 7, 2009 entitled: "*ECU Designing and Testing using National Instruments Products*", which are both incorporated in their entirety for all purposes as if fully set forth herein. ECU examples are described in a brochure by Sensor-Technik Wiedemann Gmbh (headquartered in Kaufbeuren, Germany) dated 20110304 GB entitled "*Control System Electronics*", which is incorporated in its entirety for all purposes as if fully set forth herein. An ECU or an interface to a vehicle bus may use a processor such as the MPC5748G controller available from Freescale Semiconductor, Inc. (headquartered in Tokyo, Japan, and described in a data sheet Document Number MPC5748G Rev. 2, 05/2014 entitled: "*MPC5748 Microcontroller Datasheet*", which is incorporated in its entirety for all purposes as if fully set forth herein.

OSEK/VDX. OSEK/VDX, formerly known as OSEK (Offene Systeme and deren Schnittstellen für die Elektronik in Kraftfahrzeugen; in English: "Open Systems and their Interfaces for the Electronics in Motor Vehicles") OSEK is an open standard, published by a consortium founded by the automobile industry for an embedded operating system, a communications stack, and a network management protocol for automotive embedded systems. OSEK was designed to provide a standard software architecture for the various electronic control units (ECUs) throughout a car.

The OSEK standard specifies interfaces to multitasking functions—generic I/O and peripheral access—and thus remains architecture dependent. OSEK systems are expected to run on chips without memory protection. Features of an OSEK implementation can be usually configured at compile-time. The number of application tasks, stacks, mutexes, etc., is statically configured; it is not possible to create more at run time. OSEK recognizes two types of tasks/threads/compliance levels: basic tasks and enhanced tasks. Basic tasks never block; they "run to completion" (coroutine). Enhanced tasks can sleep and block on event objects. The events can be triggered by other tasks (basic and enhanced) or interrupt routines. Only static priorities are allowed for tasks, and First-In-First-Out (FIFO) scheduling is used for tasks with equal priority. Deadlocks and priority inversion are prevented by priority ceiling (i.e. no priority inheritance). The specification uses ISO/ANSI-C-like syntax; however, the implementation language of the system services is not specified. OSEK/VDX Network Management functionality is described in a document by OSEK/VDX NM Concept & API 2.5.2 (Version 2.5.3, 26th July 2004) entitled: "*Open Systems and the Corresponding Interfaces for Automotive Electronics—Network Management—Concept and Application Programming Interface*", which is incorporated in its entirety for all purposes as if fully set forth herein. Some parts of the OSEK are standardized as part of ISO 17356 standard series entitled: "*Road vehicles—Open interface for embedded automotive applications*", such as ISO 17356-1 standard (First edition, 2005-01-15) entitled: "*Part 1: General structure and terms, definitions and abbreviated terms*", ISO 17356-2 standard (First edition, 2005 May 1) entitled: "*Part 2: OSEK/VDX specifications for binding OS, COM and NM*", ISO 17356-3 standard (First edition, 2005 Nov. 1) entitled: "*Part 3: OSEK/VDX Operating System* (*OS*)", and ISO 17356-4 standard (First edition, 2005 Nov. 1) entitled: "*Part 4: OSEK/VDX Communication* (*COM*)", which are all incorporated in their entirety for all purposes as if fully set forth herein.

AUTOSAR. AUTOSAR (Automotive Open System Architecture) is a worldwide development partnership of automotive interested parties founded in 2003. It pursues the objective of creating and establishing an open and standardized software architecture for automotive electronic control units excluding infotainment. Goals include the scalability to different vehicle and platform variants, transferability of software, the consideration of availability and safety requirements, a collaboration between various partners, sustainable utilization of natural resources, maintainability throughout the whole "Product Life Cycle".

AUTOSAR provides a set of specifications that describe basic software modules, defines application interfaces, and builds a common development methodology based on standardized exchange format. Basic software modules made available by the AUTOSAR layered software architecture can be used in vehicles of different manufacturers and electronic components of different suppliers, thereby reducing expenditures for research and development, and mastering the growing complexity of automotive electronic and software architectures. Based on this guiding principle, AUTOSAR has been devised to pave the way for innovative electronic systems that further improve performance, safety and environmental friendliness and to facilitate the exchange and update of software and hardware over the service life of the vehicle. It aims to be prepared for the upcoming technologies and to improve cost-efficiency without making any compromise with respect to quality.

AUTOSAR uses a three-layered architecture: Basic Software—standardized software modules (mostly) without any functional job itself that offers services necessary to run the functional part of the upper software layer; Runtime environment—Middleware which abstracts from the network topology for the inter- and intra-ECU information exchange between the application software components and between the Basic Software and the applications; and Application Layer—application software components that interact with the runtime environment. System Configuration Description includes all system information and the information that must be agreed between different ECUs (e.g. definition of bus signals). ECU extract is the information from the System Configuration Description needed for a specific ECU (e.g. those signals where a specific ECU has access to). ECU Configuration Description contains all basic software configuration information that is local to a specific ECU. The executable software can be built from this information, the code of the basic software modules and the code of the software components. The AUTOSAR specifications is described in Release 4.2.2 released 31 Jan. 2015 by the AUTOSAR consortium entitled: "*Release* 4.2 *Overview and Revision History*", which is incorporated in its entirety for all purposes as if fully set forth herein.

Vehicle bus. A vehicle bus is a specialized internal (in-vehicle) communications network that interconnects components inside a vehicle (e.g., automobile, bus, train, industrial or agricultural vehicle, ship, or aircraft). Special requirements for vehicle control such as assurance of message delivery, of non-conflicting messages, of minimum time of delivery, of low cost, and of EMF noise resilience, as well as redundant routing and other characteristics mandate the use of less common networking protocols. A vehicle bus typically connects the various ECUs in the vehicle. Common protocols include Controller Area Network (CAN), Local Interconnect Network (LIN) and others. Conventional computer networking technologies (such as Ethernet and TCP/IP) may as well be used.

Any in-vehicle internal network that interconnect the various devices and components inside the vehicle may use any of the technologies and protocols described herein. Common protocols used by vehicle buses include a Control Area Network (CAN), FlexRay, and a Local Interconnect Network (LIN). Other protocols used for in-vehicle are optimized for multimedia networking such as MOST (Media Oriented Systems Transport). The CAN is described in the Texas Instrument Application Report No. SLOA101A entitled: "*Introduction to the Controller Area Network* (*CAN*)", and may be based on, may be compatible with, or may be according to, ISO 11898 standards, ISO 11992-1 standard, SAE J1939 or SAE J2411 standards, which are all incorporated in their entirety for all purposes as if fully set forth herein. The LIN communication may be based on, may be compatible with, or according to, ISO 9141, and is described in "*LIN Specification Package—Revision* 2.2*A*" by the LIN Consortium, which are all incorporated in their entirety for all purposes as if fully set forth herein. In one example, the DC power lines in the vehicle may also be used as the communication medium, as described for example in U.S. Pat. No. 7,010,050 to Maryanka, entitled: "Signaling over Noisy Channels", which is incorporated in its entirety for all purposes as if fully set forth herein.

CAN. A controller area network (CAN bus) is a vehicle bus standard designed to allow microcontrollers and devices to communicate with each other in applications without a host computer. It is a message-based protocol, designed originally for multiplex electrical wiring within automobiles, but is also used in many other contexts. CAN bus is one of five protocols used in the on-board diagnostics (OBD)-II vehicle diagnostics standard. CAN is a multi-master serial bus standard for connecting Electronic Control Units [ECUs] also known as nodes. Two or more nodes are required on the CAN network to communicate. The complexity of the node can range from a simple I/O device up to an embedded computer with a CAN interface and sophisticated software. The node may also be a gateway allowing a standard computer to communicate over a USB or Ethernet port to the devices on a CAN network. All nodes are connected to each other through a two-wire bus. The wires are 120Ω nominal twisted pair. Implementing CAN is described in an Application Note (AN10035-0-2/12(0) Rev. 0) published 2012 by Analog Devices, Inc. entitled: "*Controller Area Network* (*CAN*) *Implementation Guide*—by Dr. Conal Watterson", which is incorporated in its entirety for all purposes as if fully set forth herein.

CAN transceiver is defined by ISO 11898-2/3 Medium Access Unit [MAU] standards, and in receiving, converts the levels of the data stream received from the CAN bus to levels that the CAN controller uses. It usually has protective circuitry to protect the CAN controller, and in transmitting state converts the data stream from the CAN controller to CAN bus compliant levels. An example of a CAN transceiver is model TJA1055 or model TJA1044 both available from NXP Semiconductors N.V. headquartered in Eindhoven, Netherlands, respectively described in Product data sheets (document Identifier TJA1055, date of release: 6 Dec. 2013) entitled: "*TJA*1055 *Enhanced fault-tolerant CAN transceiver—Rev.* 5-6 *Dec.* 2013*—Product data sheet*", and Product data sheets (document Identifier TJA1055, date of release: 6 Dec. 2013) entitled: "*TJA*1044 *High-speed CAN transceiver with Standby mode—Rev.* 4-10 *Jul.* 2015*—Product data sheet*", which are both incorporated in their entirety for all purposes as if fully set forth herein.

Each node is able to send and receive messages, but not simultaneously. A message or Frame consists primarily of the ID (identifier), which represents the priority of the message, and up to eight data bytes. A CRC, acknowledge slot [ACK] and other overhead are also part of the message. The improved CAN FD extends the length of the data section to up to 64 bytes per frame. The message is transmitted serially onto the bus using a non-return-to-zero (NRZ) format and may be received by all nodes. The devices that are connected by a CAN network are typically sensors, actuators, and other control devices. These devices are connected to the bus through a host processor, a CAN controller, and a CAN transceiver. A terminating bias circuit is power and ground provided together with the data signaling in order to provide electrical bias and termination at each end of each bus segment to suppress reflections.

CAN data transmission uses a lossless bit-wise arbitration method of contention resolution. This arbitration method requires all nodes on the CAN network to be synchronized to sample every bit on the CAN network at the same time. While some call CAN synchronous, the data is transmitted without a clock signal in an asynchronous format. The CAN specifications use the terms "dominant" bits and "recessive" bits where dominant is a logical '0' (actively driven to a voltage by the transmitter) and recessive is a logical '1' (passively returned to a voltage by a resistor). The idle state is represented by the recessive level (Logical 1). If one node transmits a dominant bit and another node transmits a recessive bit, then there is a collision and the dominant bit "wins". This means there is no delay to the higher-priority message, and the node transmitting the lower priority message automatically attempts to re-transmit six bit clocks after the end of the dominant message. This makes CAN very suitable as a real time prioritized communications system.

The exact voltages for a logical level '0' or '1' depend on the physical layer used, but the basic principle of CAN requires that each node listen to the data on the CAN network including the data that the transmitting node is transmitting. If a logical 1 is transmitted by all transmitting nodes at the same time, then a logical 1 is seen by all of the nodes, including both the transmitting node(s) and receiving node(s). If a logical 0 is transmitted by all transmitting node(s) at the same time, then a logical 0 is seen by all nodes. If a logical 0 is being transmitted by one or more nodes, and a logical 1 is being transmitted by one or more nodes, then a logical 0 is seen by all nodes including the node(s) transmitting the logical 1. When a node transmits a logical 1 but sees a logical 0, it realizes that there is a contention and it quits transmitting. By using this process, any node that transmits a logical 1 when another node transmits a logical 0 "drops out" or loses the arbitration. A node that loses arbitration re-queues its message for later transmission and the CAN frame bit-stream continues without error until only one node is left transmitting. This means that the node that transmits the first 1, loses arbitration. Since the 11 (or 29 for CAN 2.0B) bit identifier is transmitted by all nodes at the start of the CAN frame, the node with the lowest identifier transmits more zeros at the start of the frame, and that is the node that wins the arbitration or has the highest priority.

The CAN protocol, like many networking protocols, can be decomposed into the following abstraction layers—Application layer, Object layer (including Message filtering and Message and status handling), and Transfer layer.

Most of the CAN standard applies to the transfer layer. The transfer layer receives messages from the physical layer and transmits those messages to the object layer. The transfer layer is responsible for bit timing and synchronization, message framing, arbitration, acknowledgement, error detection and signaling, and fault confinement. It performs Fault Confinement, Error Detection, Message Validation, Acknowledgement, Arbitration, Message Framing, Transfer Rate and Timing, and Information Routing.

The mechanical aspects of the physical layer (connector type and number, colors, labels, pin-outs) are not specified. As a result, an automotive ECU will typically have a particular—often custom—connector with various sorts of cables, of which two are the CAN bus lines. Nonetheless, several de facto standards for mechanical implementation have emerged, the most common being the 9-pin D-sub type male connector with the following pin-out: pin 2: CAN-Low (CAN−); pin 3: GND (Ground); pin 7: CAN-High (CAN+); and pin 9: CAN V+(Power). This de facto mechanical standard for CAN could be implemented with the node having both male and female 9-pin D-sub connectors electrically wired to each other in parallel within the node. Bus power is fed to a node's male connector and the bus draws power from the node's female connector. This follows the electrical engineering convention that power sources are terminated at female connectors. Adoption of this standard avoids the need to fabricate custom splitters to connect two sets of bus wires to a single D connector at each node. Such nonstandard (custom) wire harnesses (splitters) that join conductors outside the node, reduce bus reliability, eliminate cable interchangeability, reduce compatibility of wiring harnesses, and increase cost.

Noise immunity on ISO 11898-2:2003 is achieved by maintaining the differential impedance of the bus at a low level with low-value resistors (120 ohms) at each end of the bus. However, when dormant, a low-impedance bus such as CAN draws more current (and power) than other voltage-based signaling buses. On CAN bus systems, balanced line operation, where current in one signal line is exactly balanced by current in the opposite direction in the other signal provides an independent, stable 0 V reference for the receivers. Best practice determines that CAN bus balanced pair signals be carried in twisted pair wires in a shielded cable to minimize RF emission and reduce interference susceptibility in the already noisy RF environment of an automobile. ISO 11898-2 provides some immunity to common mode voltage between transmitter and receiver by having a '0' V rail running along the bus to maintain a high degree of voltage association between the nodes. Also, in the de facto mechanical configuration mentioned above, a supply rail is included to distribute power to each of the transceiver nodes. The design provides a common supply for all the transceivers. The actual voltage to be applied by the bus and which nodes apply to it are application-specific and not formally specified. Common practice node design provides each node with transceivers which are optically isolated from their node host and derive a 5 V linearly regulated supply voltage for the transceivers from the universal supply rail provided by the bus. This usually allows operating margin on the supply rail sufficient to allow interoperability across many node types. Typical values of supply voltage on such networks are 7 to 30 V. However, the lack of a formal standard means that system designers are responsible for supply rail compatibility.

ISO 11898-2 describes the electrical implementation formed from a multi-dropped single-ended balanced line configuration with resistor termination at each end of the bus. In this configuration, a dominant state is asserted by one or more transmitters switching the CAN- to supply 0 V and (simultaneously) switching CAN+ to the +5 V bus voltage thereby forming a current path through the resistors that terminate the bus. As such, the terminating resistors form an essential component of the signaling system and are included not just to limit wave reflection at high frequency. During a recessive state, the signal lines and resistor(s) remain in a high impedances state with respect to both rails. Voltages on both CAN+ and CAN− tend (weakly) towards ½ rail voltage. A recessive state is only present on the bus when none of the transmitters on the bus is asserting a dominant state. During a dominant state the signal lines and resistor(s) move to a low impedance state with respect to the rails so that current flows through the resistor. CAN+ voltage tends to +5 V and CAN− tends to 0 V. Irrespective of signal state the signal lines are always in low impedance state with respect to one another by virtue of the terminating resistors at the end of the bus. Multiple access on CAN bus is achieved by the electrical logic of the system supporting just two states that are conceptually analogous to a 'wired OR' network.

The CAN is standardized in a standards set ISO 11898 entitled: "*Road vehicles—Controller area network* (*CAN*)" that specifies physical and datalink layer (levels 1 and 2 of the ISO/OSI model) of serial communication technology called Controller Area Network that supports distributed real-time control and multiplexing for use within road vehicles.

The standard ISO 11898-1:2015 entitled: "*Part* 1*: Data link layer and physical signalling*" specifies the characteristics of setting up an interchange of digital information between modules implementing the CAN data link layer. Controller area network is a serial communication protocol, which supports distributed real-time control and multiplexing for use within road vehicles and other control applications. The ISO 11898-1:2015 specifies the Classical CAN frame format and the newly introduced CAN Flexible Data Rate Frame format. The Classical CAN frame format allows bit rates up to 1 Mbit/s and payloads up to 8 byte per frame. The Flexible Data Rate frame format allows bit rates higher than 1 Mbit/s and payloads longer than 8 byte per frame. ISO 11898-1:2015 describes the general architecture of CAN in terms of hierarchical layers according to the ISO reference model for open systems interconnection (OSI) according to ISO/IEC 7498-1. The CAN data link layer is specified according to ISO/IEC 8802-2 and ISO/IEC 8802-3. ISO 11898-1:2015 contains detailed specifications of the following: logical link control sub-layer; medium access control sub-layer; and physical coding sub-layer.

The standard ISO 11898-2:2003 entitled: "*Part* 2*: High-speed medium access unit*" specifies the high-speed (transmission rates of up to 1 Mbit/s) medium access unit (MAU), and some medium dependent interface (MDI) features (according to ISO 8802-3), which comprise the physical layer of the controller area network (CAN): a serial communication protocol that supports distributed real-time control and multiplexing for use within road vehicles.

The standard ISO 11898-3:2006 entitled: "*Part* 3*: Low-speed, fault-tolerant, medium-dependent interface*" specifies characteristics of setting up an interchange of digital information between electronic control units of road vehicles equipped with the controller area network (CAN) at transmission rates above 40 kBit/s up to 125 kBit/s.

The standard ISO 11898-4:2004 entitled: "*Part* 4*: Time-triggered communication*" specifies time-triggered communication in the controller area network (CAN): a serial communication protocol that supports distributed real-time control and multiplexing for use within road vehicles. It is applicable to setting up a time-triggered interchange of digital information between electronic control units (ECU) of road vehicles equipped with CAN, and specifies the frame synchronization entity that coordinates the operation of both logical link and media access controls in accordance with ISO 11898-1, to provide the time-triggered communication schedule.

The standard ISO 11898-5:2007 entitled: "*Part* 5*: High-speed medium access unit with low-power mode*" specifies the CAN physical layer for transmission rates up to 1 Mbit/s for use within road vehicles. It describes the medium access unit functions as well as some medium dependent interface features according to ISO 8802-2. ISO 11898-5:2007 represents an extension of ISO 11898-2, dealing with new functionality for systems requiring low-power consumption features while there is no active bus communication. Physical layer implementations according to ISO 11898-5:2007 are compliant with all parameters of ISO 11898-2, but are defined differently within ISO 11898-5:2007. Implementations according to ISO 11898-5:2007 and ISO 11898-2 are interoperable and can be used at the same time within one network.

The standard ISO 11898-6:2013 entitled: "*Part* 6*: High-speed medium access unit with selective wake-up functionality*" specifies the controller area network (CAN) physical layer for transmission rates up to 1 Mbit/s. It describes the medium access unit (MAU) functions. ISO 11898-6:2013 represents an extension of ISO 11898-2 and ISO 11898-5, specifying a selective wake-up mechanism using configurable CAN frames. Physical layer implementations according to ISO 11898-6:2013 are compliant with all parameters of ISO 11898-2 and ISO 11898-5. Implementations according to ISO 11898-6:2013, ISO 11898-2 and ISO 11898-5 are interoperable and can be used at the same time within one network.

The standard ISO 11992-1:2003 entitled: "*Road vehicles—Interchange of digital information on electrical connections between towing and towed vehicles—Part* 1*: Physical and data-link layers*" specifies the interchange of digital information between road vehicles with a maximum authorized total mass greater than 3 500 kg, and towed vehicles, including communication between towed vehicles in terms of parameters and requirements of the physical and data link layer of the electrical connection used to connect the electrical and electronic systems. It also includes conformance tests of the physical layer.

The standard ISO 11783-2:2012 entitled: "*Tractors and machinery for agriculture and forestry—Serial control and communications data network—Part* 2*: Physical layer*" specifies a serial data network for control and communications on forestry or agricultural tractors and mounted, semi-mounted, towed or self-propelled implements. Its purpose is to standardize the method and format of transfer of data between sensors, actuators, control elements and information storage and display units, whether mounted on, or part of, the tractor or implement, and to provide an open interconnect system for electronic systems used by agricultural and forestry equipment. ISO 11783-2:2012 defines and describes the network's 250 kbit/s, twisted, non-shielded, quad-cable physical layer. ISO 11783-2 uses four unshielded twisted wires; two for CAN and two for terminating bias circuit (TBC) power and ground. This bus is used on agricultural tractors. It is intended to provide interconnectivity between the tractor and any agricultural implement adhering to the standard.

The standard J1939/11_201209 entitled: "*Physical Layer,* 250 *Kbps, Twisted Shielded Pair*" defines a physical layer having a robust immunity to EMI and physical properties suitable for harsh environments. These SAE Recommended Practices are intended for light- and heavy-duty vehicles on- or off-road as well as appropriate stationary applications which use vehicle derived components (e.g., generator sets). Vehicles of interest include but are not limited to: on- and off-highway trucks and their trailers; construction equipment; and agricultural equipment and implements.

The standard SAE J1939/15_201508 entitled: "*Physical Layer,* 250 *Kbps, Un-Shielded Twisted Pair* (*UTP*)" describes a physical layer utilizing Unshielded Twisted Pair (UTP) cable with extended stub lengths for flexibility in ECU placement and network topology. CAN controllers are now available which support the newly introduced CAN Flexible Data Rate Frame format (known as "CAN FD"). These controllers, when used on SAE J1939-15 networks, must be restricted to use only the Classical Frame format compliant to ISO 11898-1 (2003).

The standard SAE J2411_200002 entitled: "*Single Wire Can Network for Vehicle Applications*" defines the Physical Layer and portions of the Data Link Layer of the OSI model for data communications. In particular, this document specifies the physical layer requirements for any Carrier Sense Multiple Access/Collision Resolution (CSMA/CR) data link which operates on a single wire medium to communicate among Electronic Control Units (ECU) on road vehicles. Requirements stated in this document will provide a minimum standard level of performance to which all compatible ECUs and media shall be designed. This will assure full serial data communication among all connected devices regardless of the supplier. This document is to be referenced by the particular vehicle OEM Component Technical Specification which describes any given ECU, in which the single wire data link controller and physical layer interface is located. Primarily, the performance of the physical layer is specified in this document.

A specification for CAN FD (CAN with Flexible Data-Rate) version 1.0 was released on Apr. 17, 2012 by Robert Bosch GmbH entitled: CAN with Flexible Data-Rate Specification Version 1.0), and is incorporated in its entirety for all purposes as if fully set forth herein. This specification uses a different frame format that allows a different data length as well as optionally switching to a faster bit rate after the arbitration is decided. CAN FD is compatible with existing CAN 2.0 networks so new CAN FD devices can coexist on the same network with existing CAN devices. CAN FD is further described in iCC 2013 CAN in Automation articles by Florian Hatwich entitled: "*Bit Time Requirements for CAN FD*" and "*Can with Flexible Data-Rate*", and in National Instruments article published Aug. 1, 2014 entitled: "*Understanding CAN with Flexible Data-Rate* (*CAN FD*)", which are all incorporated in their entirety for all purposes as if fully set forth herein. In one example, the CAN FD interface is based on, compatible with, or uses, the SPC57EM80 controller device available from STMicroelectronics described in an Application Note AN4389 (document number DocD025493 Rev 2) published 2014 entitled: "SPC57472/SPC57EM80 Getting Started", which is incorporated in its entirety for all purposes as if fully set forth herein. Further, a CAN FD transceiver may be based on, compatible with, or use, transceiver model MCP2561/2FD available from Microchip Technology Inc., described in a data sheet DS20005284A published 2014 [ISBN—978-1-63276-020-3] entitled: "*MCP2561/2FD—High-Speed CAN Flexible Data Rate Transceiver*", which is incorporated in its entirety for all purposes as if fully set forth herein.

LIN. LIN (Local Interconnect Network) is a serial network protocol used for communication between components in vehicles. The LIN communication may be based on, compatible with, or is according to, ISO 9141, and is described in "*LIN Specification Package—Revision 2.2A*" by the LIN Consortium (dated Dec. 31, 2010), which is incorporated in its entirety for all purposes as if fully set forth herein. The LIN standard is further standardized as part of ISO 17987-1 to 17987-7 standards. LIN may be used also over the vehicle's battery power-line with a special DC-LIN transceiver. LIN is a broadcast serial network comprising 16 nodes (one master and typically up to 15 slaves). All messages are initiated by the master with at most one slave replying to a given message identifier. The master node can also act as a slave by replying to its own messages, and since all communications are initiated by the master it is not necessary to implement a collision detection. The master and slaves are typically microcontrollers, but may be implemented in specialized hardware or ASICs in order to save cost, space, or power. Current uses combine the low-cost efficiency of LIN and simple sensors to create small networks that can be connected by a backbone network. (i.e., CAN in cars).

The LIN bus is an inexpensive serial communications protocol, which effectively supports remote application within a car's network, and is particularly intended for mechatronic nodes in distributed automotive applications, but is equally suited to industrial applications. The protocol's main features are single master, up to 16 slaves (i.e. no bus arbitration), Slave Node Position Detection (SNPD) that allows node address assignment after power-up, Single wire communications up to 19.2 kbit/s @ 40 meter bus length (in the LIN specification 2.2 the speed up to 20 kbit/s), Guaranteed latency times, Variable length of data frame (2, 4 and 8 byte), Configuration flexibility, Multi-cast reception with time synchronization, without crystals or ceramic resonators, Data checksum and error detection, Detection of defective nodes, Low cost silicon implementation based on standard UART/SCI hardware, Enabler for hierarchical networks, and Operating voltage of 12 V. LIN is further described in U.S. Pat. No. 7,091,876 to Steger entitled: "Method for Addressing the Users of a Bus System by Means of Identification Flows", which is incorporated in its entirety for all purposes as if fully set forth herein.

Data is transferred across the bus in fixed form messages of selectable lengths. The master task transmits a header that consists of a break signal followed by synchronization and identifier fields. The slaves respond with a data frame that consists of between 2, 4 and 8 data bytes plus 3 bytes of control information. The LIN uses Unconditional Frames, Event-triggered Frames, Sporadic Frames, Diagnostic Frames, User-Defined Frames, and Reserved Frames.

Unconditional Frames always carry signals and their identifiers are in the range 0 to 59 (0x00 to 0x3b) and all subscribers of the unconditional frame shall receive the frame and make it available to the application (assuming no errors were detected), and Event-triggered Frame, to increase the responsiveness of the LIN cluster without assigning too much of the bus bandwidth to the polling of multiple slave nodes with seldom occurring events. The first data byte of the carried unconditional frame shall be equal to a protected identifier assigned to an event-triggered frame. A slave shall reply with an associated unconditional frame only if its data value has changed. If none of the slave tasks responds to the header, the rest of the frame slot is silent and the header is ignored. If more than one slave task responds to the header in the same frame slot a collision will occur, and the master has to resolve the collision by requesting all associated unconditional frames before requesting the event-triggered frame again. Sporadic Frame is transmitted by the master as required, so a collision cannot occur. The header of a sporadic frame shall only be sent in its associated frame slot when the master task knows that a signal carried in the frame has been updated. The publisher of the sporadic frame shall always provide the response to the header. Diagnostic Frame always carry diagnostic or configuration data and they always contain eight data bytes. The identifier is either 60 (0x3C), called master request frame, or 61 (0x3D), called slave response frame. Before generating the header of a diagnostic frame, the master task asks its diagnostic module if it shall be sent or if the bus shall be silent. The slave tasks publish and subscribe to the response according to their diagnostic module. User-Defined Frame carry any kind of information. Their identifier is 62 (0x3E). The header of a user-defined frame is usually transmitted when a frame slot allocated to the frame is processed. Reserved Frame are not be used in a LIN 2.0 cluster, and their identifier is 63 (0x3F).

The LIN specification was designed to allow very cheap hardware-nodes being used within a network. The LIN specification is based on ISO 9141:1989 standard entitled: "*Road vehicles—Diagnostic systems—Requirements for interchange of digital information*" that Specifies the requirements for setting up the interchange of digital information between on-board Electronic Control Units (ECUs) of road vehicles and suitable diagnostic testers. This communication is established in order to facilitate inspection, test diagnosis and adjustment of vehicles, systems and ECUs. Does not apply when system-specific diagnostic test equipment is used. The LIN specification is further based on ISO 9141-2:1994 standard entitled: "*Road vehicles—Diagnostic systems—Part* 2: *GARB requirements for interchange of digital information*" that involves vehicles with nominal 12 V supply voltage, describes a subset of ISO 9141:1989, and specifies the requirements for setting-up the interchange of digital information between on-board emission-related electronic control units of road vehicles and the SAE OBD II scan tool as specified in SAE J1978. It is a low-cost, single-wire network, where microcontrollers with either UART capability or dedicated LIN hardware are used. The microcontroller generates all needed LIN data by software and is connected to the LIN network via a LIN transceiver (simply speaking, a level shifter with some add-ons). Working as a LIN node is only part of the possible functionality. The LIN hardware may include this transceiver and works as a pure LIN node without added functionality. As LIN Slave nodes should be as cheap as possible, they may generate their internal clocks by using RC oscillators instead of crystal oscillators (quartz or a ceramic). To ensure the baud rate-stability within one LIN frame, the SYNC field within the header is used. An example of a LIN transceiver is IC Model No. 33689D available from Freescale Semiconductor, Inc. described in a data-sheet Document Number MC33689 Rev. 8.0 (dated 9/2012) entitled: "*System Basis Chip with LIN Transceiver*", which is incorporated in its entirety for all purposes as if fully set forth herein.

The LIN-Master uses one or more predefined scheduling tables to start the sending and receiving to the LIN bus. These scheduling tables contain at least the relative timing, where the message sending is initiated. One LIN Frame consists of the two parts header and response. The header is always sent by the LIN Master, while the response is sent by either one dedicated LIN-Slave or the LIN master itself. Transmitted data within the LIN is transmitted serially as eight-bit data bytes with one start & stop-bit and no parity. Bit rates vary within the range of 1 kbit/s to 20 kbit/s. Data on the bus is divided into recessive (logical HIGH) and dominant (logical LOW). The time normal is considered by the LIN Masters stable clock source, the smallest entity is one bit time (52 μs @ 19.2 kbit/s).

Two bus states—Sleep-mode and active—are used within the LIN protocol. While data is on the bus, all LIN-nodes are requested to be in active state. After a specified timeout, the nodes enter Sleep mode and will be released back to active state by a WAKEUP frame. This frame may be sent by any node requesting activity on the bus, either the LIN Master following its internal schedule, or one of the attached LIN Slaves being activated by its internal software application. After all nodes are awakened, the Master continues to schedule the next Identifier.

MOST. MOST (Media Oriented Systems Transport) is a high-speed multimedia network technology optimized for use in an automotive applications, and may be used for applications inside or outside the car. The serial MOST bus uses a ring topology and synchronous data communication to transport audio, video, voice and data signals via plastic optical fiber (POF) (MOST25, MOST150) or electrical conductor (MOST50, MOST150) physical layers. The MOST specification defines the physical and the data link layer as well as all seven layers of the ISO/OSI-Model of data communication. Standardized interfaces simplify the MOST protocol integration in multimedia devices. For the system developer, MOST is primarily a protocol definition. It provides the user with a standardized interface (API) to access device functionality, and the communication functionality is provided by driver software known as MOST Network Services. MOST Network Services include Basic Layer System Services (Layer 3, 4, 5) and Application Socket Services (Layer 6). They process the MOST protocol between a MOST Network Interface Controller (NIC), which is based on the physical layer, and the API (Layer 7).

A MOST network is able to manage up to 64 MOST devices in a ring configuration. Plug and play functionality allows MOST devices to be easily attached and removed. MOST networks can also be set up in virtual star network or other topologies. Safety critical applications use redundant double ring configurations. In a MOST network, one device is designated the timing master, used to continuously supply the ring with MOST frames. A preamble is sent at the beginning of the frame transfer. The other devices, known as timing followers, use the preamble for synchronization. Encoding based on synchronous transfer allows constant post-sync for the timing followers.

MOST25 provides a bandwidth of approximately 23 megabaud for streaming (synchronous) as well as package (asynchronous) data transfer over an optical physical layer. It is separated into 60 physical channels. The user can select and configure the channels into groups of four bytes each. MOST25 provides many services and methods for the allocation (and deallocation) of physical channels. MOST25 supports up to 15 uncompressed stereo audio channels with CD-quality sound or up to 15 MPEG-1 channels for audio/video transfer, each of which uses four Bytes (four physical channels). MOST also provides a channel for transferring control information. The system frequency of 44.1 kHz allows a bandwidth of 705.6 kbit/s, enabling 2670 control messages per second to be transferred. Control messages are used to configure MOST devices and configure synchronous and asynchronous data transfer. The system frequency closely follows the CD standard. Reference data can also be transferred via the control channel. Some limitations restrict MOST25's effective data transfer rate to about 10 kB/s. Because of the protocol overhead, the application can use only 11 of 32 bytes at segmented transfer and a MOST node can only use one third of the control channel bandwidth at any time.

MOST50 doubles the bandwidth of a MOST25 system and increases the frame length to 1024 bits. The three established channels (control message channel, streaming data channel, packet data channel) of MOST25 remain the same, but the length of the control channel and the sectioning between the synchronous and asynchronous channels are flexible. Although MOST50 is specified to support both optical and electrical physical layers, the available MOST50 Intelligent Network Interface Controllers (INICs) only support electrical data transfer via Unshielded Twisted Pair (UTP).

MOST150 was introduced in October 2007 and provides a physical layer to implement Ethernet in automobiles. It increases the frame length up to 3072 bits, which is about 6 times the bandwidth of MOST25. It also integrates an Ethernet channel with adjustable bandwidth in addition to the three established channels (control message channel, streaming data channel, packet data channel) of the other grades of MOST. MOST150 also permits isochronous transfer on the synchronous channel. Although the transfer of synchronous data requires a frequency other than the one specified by the MOST frame rate, it is also possible with MOST150. MOST150's advanced functions and enhanced bandwidth will enable a multiplex network infrastructure capable of transmitting all forms of infotainment data, including video, throughout an automobile. The optical transmission layer uses Plastic Optical Fibers (POF) with a core diameter of 1 mm as transmission medium, in combination with light emitting diodes (LEDs) in the red wavelength range as transmitters. MOST25 only uses an optical Physical Layer. MOST50 and MOST150 support both optical and electrical Physical Layers.

The MOST protocol is described in a book published 2011 by Franzis Verlag Gmbh [ISBN—978-3-645-65061-8] edited by Prof. Dr. Ing. Andreas Grzemba entitled: "*MOST—The Automotive Multimedia Network—From MOST*25 *to MOST* 150", in MOST Dynamic Specification by MOST Cooperation Rev. 3.0.2 dated 10/2012 entitled: "*MOST—Multimedia and Control Networking Technology*", and in MOST Specification Rev. 3.0 E2 dated 07/2010 by MOST Cooperation, which are all incorporated in their entirety for all purposes as if fully set forth herein.

MOST Interfacing may use a MOST transceiver, such as IC model No. 0S81118 available from Microchip Technology Incorporated (headquartered in Chandler, AZ, U.S.A.) and described in a data sheet DS00001935A published 2015 by Microchip Technology Incorporated entitled: "*MOST*150 *INIC with USB* 2.0 *Device Port*", or IC model No. 058104A also available from Microchip Technology Incorporated and described in a data sheet PFL_OS8104A_V01_00_XX-4.fm published 08/2007 by Microchip Technology Incorporated entitled: "MOST Network Interface Controller", which are both incorporated in their entirety for all purposes as if fully set forth herein.

FlexRay. FlexRay™ is an automotive network communications protocol developed by the FlexRay Consortium to govern on-board automotive computing. The FlexRay consortium disbanded in 2009, but the FlexRay standard is described in a set of ISO standards, ISO 17458 entitled: "*Road vehicles—FlexRay communications system*", including ISO 17458-1:2013 standard entitled: "*Part* 1*: General information and use case definition*", ISO 17458-2:2013 standard entitled: "*Part* 2*: Data link layer specification*", ISO 17458-3:2013 standard entitled: "*Part* 3*: Data link layer conformance test specification*", ISO 17458-4:2013 standard entitled: "*Part* 4*: Electrical physical layer specification*", and ISO 17458-5:2013 standard entitled: "*Part* 5*: Electrical physical layer conformance test specification*".

FlexRay supports high data rates, up to 10 Mbit/s, explicitly supports both star and "party line" bus topologies, and can have two independent data channels for fault-tolerance (communication can continue with reduced bandwidth if one channel is inoperative). The bus operates on a time cycle, divided into two parts: the static segment and the dynamic segment. The static segment is preallocated into slices for individual communication types, providing a stronger real-time guarantee than its predecessor CAN. The dynamic segment operates more like CAN, with nodes taking control of the bus as available, allowing event-triggered behavior. FlexRay specification Version 3.0.1 is described in FlexRay consortium October 2010 publication entitled: "*FlexRay Communications System—Protocol Specification—Version* 3.0.1", which is incorporated in its entirety for all purposes as if fully set forth herein. The FlexRay physical layer is described in Carl Hanser Verlag Gmbh 2010 publication (Automotive 2010) by Lorenz, Steffen entitled: "*The FlexRay Electrical Physical Layer Evolution*", and in National Instruments Corporation Technical Overview Publication (Aug. 21, 2009) entitled: "*FlexRay Automotive Communication Bus Overview*", which are both incorporated in their entirety for all purposes as if fully set forth herein.

FlexRay system consists of a bus and processors (Electronic control unit, or ECUs), where each ECU has an independent clock. The clock drift must be not more than 0.15% from the reference clock, so the difference between the slowest and the fastest clock in the system is no greater than 0.3%. At each time, only one ECU writes to the bus, and each bit to be sent is held on the bus for 8 sample clock cycles. The receiver keeps a buffer of the last 5 samples, and uses the majority of the last 5 samples as the input signal. Single-cycle transmission errors may affect results near the boundary of the bits, but will not affect cycles in the middle of the 8-cycle region. The value of the bit is sampled in the middle of the 8-bit region. The errors are moved to the extreme cycles, and the clock is synchronized frequently enough for the drift to be small (Drift is smaller than 1 cycle per 300 cycles, and during transmission the clock is synchronized more than once every 300 cycles). An example of a FlexRay transceiver is model TJA1080A available from NXP Semiconductors N.V. headquartered in Eindhoven, Netherlands, described in Product data sheet (document Identifier TJA1080A, date of release: 28 Nov. 2012) entitled: "*TJA*1080*A FlexRay Transceiver—Rev.* 6-28 *Nov.* 2012*—Product data sheet*", which is incorporated in its entirety for all purposes as if fully set forth herein.

Further, the vehicular communication system employed may be used so that vehicles may communicate and exchange information with other vehicles and with roadside units, may allow for cooperation and may be effective in increasing safety such as sharing safety information, safety warnings, as well as traffic information, such as to avoid traffic congestion. In safety applications, vehicles that discover an imminent danger or obstacle in the road may inform other vehicles directly, via other vehicles serving as repeaters, or via roadside units. Further, the system may help in deciding right to pass first at intersections, and may provide alerts or warning about entering intersections, departing highways, discovery of obstacles, and lane change warnings, as well as reporting accidents and other activities in the road. The system may be used for traffic management, allowing for easy and optimal traffic flow control, in particular in the case of specific situations such as hot pursuits and bad weather. The traffic management may be in the form of variable speed limits, adaptable traffic lights, traffic intersection control, and accommodating emergency vehicles such as ambulances, fire trucks and police cars.

The vehicular communication system may further be used to assist the drivers, such as helping with parking a vehicle, cruise control, lane keeping, and road sign recognition. Similarly, better policing and enforcement may be obtained by using the system for surveillance, speed limit warning, restricted entries, and pull-over commands. The system may be integrated with pricing and payment systems such as toll collection, pricing management, and parking payments. The system may further be used for navigation and route optimization, as well as providing travel-related information such as maps, business location, gas stations, and car service locations. Similarly, the system may be used for emergency warning system for vehicles, cooperative adaptive cruise control, cooperative forward collision warning, intersection collision avoidance, approaching emergency vehicle warning (Blue Waves), vehicle safety inspection, transit or emergency vehicle signal priority, electronic parking payments, commercial vehicle clearance and safety inspections, in-vehicle signing, rollover warning, probe data collection, highway-rail intersection warning, and electronic toll collection.

OBD. On-Board Diagnostics (OBD) refers to a vehicle's self-diagnostic and reporting capability. OBD systems give the vehicle owner or repair technician access to the status of the various vehicle subsystems. Modern OBD implementations use a standardized digital communications port to provide real-time data in addition to a standardized series of diagnostic trouble codes, or DTCs, which allow one to rapidly identify and remedy malfunctions within the vehicle. Keyword Protocol 2000, abbreviated KWP2000, is a communications protocol used for on-board vehicle diagnostics systems (OBD). This protocol covers the application layer in the OSI model of computer networking. KWP2000 also covers the session layer in the OSI model, in terms of starting, maintaining and terminating a communications session, and the protocol is standardized by International Organization for Standardization as ISO 14230.

One underlying physical layer used for KWP2000 is identical to ISO 9141, with bidirectional serial communication on a single line called the K-line. In addition, there is an optional L-line for wakeup. The data rate is between 1.2 and 10.4 kilobaud, and a message may contain up to 255 bytes in the data field. When implemented on a K-line physical layer, KWP2000 requires special wakeup sequences: 5-baud wakeup and fast-initialization. Both of these wakeup methods require timing critical manipulation of the K-line signal, and are therefore not easy to reproduce without custom software. KWP2000 is also compatible on ISO 11898 (Controller Area Network) supporting higher data rates of up to 1 Mbit/s. CAN is becoming an increasingly popular alternative to K-line because the CAN bus is usually present in modern-day vehicles and thus removing the need to install an additional physical cable. Using KWP2000 on CAN with ISO 15765 Transport/Network layers is most common. Also using KWP2000 on CAN does not require the special wakeup functionality.

KWP2000 can be implemented on CAN using just the service layer and session layer (no header specifying length, source and target addresses is used and no checksum is used); or using all layers (header and checksum are encapsulated within a CAN frame). However using all layers is overkill, as ISO 15765 provides its own Transport/Network layers.

ISO 14230-1:2012 entitled: "*Road vehicles—Diagnostic communication over K-Line (DoK-Line)—Part 1: Physical layer*", which is incorporated in its entirety for all purposes as if fully set forth herein, specifies the physical layer, based on ISO 9141, on which the diagnostic services will be implemented. It is based on the physical layer described in ISO 9141-2, but expanded to allow for road vehicles with either 12 V DC or 24 V DC voltage supply.

ISO 14230-2:2013 entitled: "*Road vehicles—Diagnostic communication over K-Line (DoK-Line)—Part 2: Data link layer*", which is incorporated in its entirety for all purposes as if fully set forth herein, specifies data link layer services tailored to meet the requirements of UART-based vehicle communication systems on K-Line as specified in ISO 14230-1. It has been defined in accordance with the diagnostic services established in ISO 14229-1 and ISO 15031-5, but is not limited to use with them, and is also compatible with most other communication needs for in-vehicle networks. The protocol specifies an unconfirmed communication. The diagnostic communication over K-Line (DoK-Line) protocol supports the standardized service primitive interface as specified in ISO 14229-2. ISO 14230-2:2013 provides the data link layer services to support different application layer implementations like: enhanced vehicle diagnostics (emissions-related system diagnostics beyond legislated functionality, non-emissions-related system diagnostics); emissions-related OBD as specified in ISO 15031, SAE J1979-DA, and SAE J2012-DA. In addition, ISO 14230-2:2013 clarifies the differences in initialization for K-line protocols defined in ISO 9141 and ISO 14230. This is important since a server supports only one of the protocols mentioned above and the client has to handle the coexistence of all protocols during the protocol-determination procedure.

The application layer is described in ISO 14230-3:1999 entitled: "*Road vehicles—Diagnostic systems—Keyword Protocol 2000—Part 3: Application layer*", and the requirements for emission-related systems are described in ISO 14230-4:2000 entitled: "*Road vehicles—Diagnostic systems—Keyword Protocol 2000—Part 4: Requirements for emission-related systems*", which are both incorporated in their entirety for all purposes as if fully set forth herein.

Fleetwide vehicle telematics systems and methods that includes receiving and managing fleetwide vehicle state data are described in U.S. Patent Application Publication No. 2016/0086391 to Ricci entitled: "Fleetwide vehicle telematics systems and methods", which is incorporated in its entirety for all purposes as if fully set forth herein. The fleetwide vehicle state data may be fused or compared with customer enterprise data to monitor conformance with customer requirements and thresholds. The fleetwide vehicle state data may also be analyzed to identify trends and correlations of interest to the customer enterprise.

An apparatus for measuring a distance to an object with ultrasound is described in U.S. Pat. No. 6,166,995 to Hoenes entitled: "Apparatus for Distance Measurement by Means of Ultrasound", which is incorporated in its entirety for all purposes as if fully set forth herein. The apparatus includes a number of ultrasonic transducers (1 to 10) arranged in a motor vehicle for propagation of ultrasonic pulses and a controller (13) including a device for controlling the ultrasonic transducers to sequentially propagate ultrasonic pulses from the respective ultrasonic transducers (1 to 10) and a device to simultaneously propagate ultrasonic pulses from each ultrasonic transducer so that the ultrasonic pulses from respective ultrasonic transducers are superimposed on each other when no obstacle is detected during sequentially propagating ultrasonic pulses, or according to a vehicle speed. Reflected ultrasonic pulses from an object near the vehicle are received by at least one of the ultrasonic transducers (1 to 10) after propagation of the ultrasonic pulses. An evaluation device evaluates the reflected ultrasonic pulses from the object and preferably activates warning devices for the driver as needed.

A method for measuring distance, which improves the resolution and the selectivity in an echo method, using propagation-time measurement is described in U.S. Pat. No. 6,804,168 to Schlick et al. entitled: "Method for Measuring Distance", which is incorporated in its entirety for all purposes as if fully set forth herein. In this context, a received signal is sampled without first having to smooth the signal.

An optical pulse radar for an automotive vehicle of heterodyne detection-type is described in U.S. Pat. No. 4,552,456 to Endo entitled: "Optical Pulse Radar for an Automotive Vehicle", which is incorporated in its entirety for all purposes as if fully set forth herein. The radar can detect an object ahead of the vehicle with an improved S/N radio even under the worst detection conditions in which sunlight or a strong headlight beam from a car is directly incident thereupon. The optical pulse radar according to the present invention comprises a laser system, a beam splitter for obtaining a carrier beam and a heterodyne beam, a beam deflector, a beam modulator, a beam mixer for obtaining a beat beam signal, a beam sensor, and a beat signal processing section, etc. An optical IC may incorporate the beam splitter and mixer, the beam modulator, and the beam deflector in order to miniaturize the system, while improving the sensitivity, reliability, mass productivity, and cost.

A distance measuring apparatus installed on a car for measuring the distance of the car from the one in front is described in U.S. Pat. No. 5,283,622 to Ueno et al. entitled: "Distance Measuring Apparatus", which is incorporated in its entirety for all purposes as if fully set forth herein. The distance measuring apparatus comprises a laser generator for emitting a laser beam, a photosensor for receipt of the laser beam reflected from the car in front, means for calculating the distance between the cars when the photosensor receives the reflected laser beam, and a control unit for controlling an adjustable range of the emitted laser beam according to the calculated distance.

A method and a device for operating a sensor system are described in U.S. Pat. No. 8,193,920 to Klotz et al. entitled: "Method and Device for Operating a Sensor System", which is incorporated in its entirety for all purposes as if fully set forth herein. A processing unit being connected to at least one sensor of the sensor system via communication connections and the processing unit transmitting data, which represent the at least one sensing range and/or detection area of the sensor, and/or control data to control the mode of the sensor, to at least one of the sensors.

Car collision prevention apparatus and method are described in U.S. Pat. No. 5,594,413 to Cho et al. entitled: "Car Collision Prevention Apparatus and Method using Dual Processor and Automatic Sensor Switching Function", which is incorporated in its entirety for all purposes as if fully set forth herein. The apparatus comprises a slave processor for transmitting and receiving a laser beam or an ultrasonic wave signal to extract distance information between a car and a car in front, and a master processor for comparing the extracted distance information from the slave processor with a safety distance between the car and the front car based on a car speed and performing car accelerating or decelerating and alarm functions in accordance with the compared result. The slave processor comprises a long-distance sensing laser sensor and a short-distance sensing ultrasonic wave sensor disposed in a front side of the car, the long-distance sensing laser sensor consisting of a laser trigger circuit, a laser transmitter and a laser receiver, the short-distance sensing ultrasonic wave sensor consisting of an ultrasonic wave trigger circuit, an ultrasonic wave transmitter and an ultrasonic wave receiver. The long-distance sensing laser sensor is driven in long-distance mode of the car in which the car speed is higher than a reference speed. The short-distance sensing ultrasonic wave sensor is driven in short-distance mode of the car in which the car speed is lower than the reference speed.

An automatic control system and method for keeping a car at a safe distance in traffic from an obstacle or other car is described in U.S. Patent Application Publication No. 2009/0062987 to Sun KIM et al. entitled: "Automatic Controlling System for Maintaining Safely the Running Range in the Car and Method thereof", which is incorporated in its entirety for all purposes as if fully set forth herein. The automatic control system comprises: a sensing device for sensing a car or an obstacle in front of the system-installed car in the traveling direction; an electronic control unit (ECU) connected to the sensing device and receiving electric signals transmitted from the sensing device as a result of sensing a car or an obstacle so as to render a control command according to a preset program; an accelerator unit for automatically controlling the deceleration of the system-installed car on the basis of the electric signal from the ECU; a first guide stop unit which operates independently of the accelerator unit and controls the vertical movement of an accelerator pedal; a brake unit for automatically controlling the braking of the system-installed car on the basis of the electric signal from the ECU; and a second guide stop unit which operates independently of the brake unit and controls the operation of a brake pedal.

Metadata. The term "metadata" as used herein refers to data that describes characteristics, attributes, or parameters of other data, in particular files (such as program files) and objects. Such data is typically a structured information that describes, explains, locates, and otherwise makes it easier to retrieve and use an information resource. Metadata typically includes structural metadata, relating to the design and specification of data structures or "data about the containers of data"; and descriptive metadata about individual instances of application data or the data content. Metadata may include means of creation of the data, purpose of the data, time and date of creation, creator or author of the data, location on a computer network where the data were created, and standards used.

For example, metadata associated with a computer word processing file might include the title of the document, the name of the author, the company to whom the document belongs, the dates that the document was created and last modified, keywords which describe the document, and other descriptive data. While some of this information may also be included in the document itself (e.g., title, author, and data), metadata is a separate collection of data that may be stored separately from, but associated with, the actual document. One common format for documenting metadata is eXtensible Markup Language (XML). XML provides a formal syntax, which supports the creation of arbitrary descriptions, sometimes called "tags." An example of a metadata entry might be <title>War and Peace</title>, where the bracketed words delineate the beginning and end of the group of characters that constitute the title of the document which is described by the metadata. In the example of the word processing file, the metadata (sometimes referred to as "document properties") is generally entered manually by the author, the editor, or the document manager. The metadata concept is further described in a National Information Standards Organization (NISO) Booklet entitled: "*Understanding Metadata*" (ISBN: 1-880124-62-9), in the IETF RFC 5013 entitled: "*The Dublin Core Metadata Element Set*", and in the IETF RFC 2731 entitled: "Encoding Dublin Core Metadata in HTML", which are all incorporated in their entirety for all purposes as if fully set forth herein. An extraction of metadata from files or objects is described in a U.S. Pat. No. 8,700,626 to Bedingfield, entitled: "Systems, Methods and Computer Products for Content-Derived Metadata", and in a U.S. Patent Application Publication 2012/0278705 to Yang et al., entitled: "System and Method for Automatically Extracting Metadata from Unstructured Electronic Documents", which are both incorporated in their entirety for all purposes as if fully set forth herein.

Metadata can be stored either internally in the same file, object, or structure as the data (this is also called internal or embedded metadata), or externally in a separate file or field separated from the described data. A data repository typically stores the metadata detached from the data, but can be designed to support embedded metadata approaches. Metadata can be stored in either human-readable or binary form. Storing metadata in a human-readable format such as XML can be useful because users can understand and edit it without specialized tools, however, these formats are rarely optimized for storage capacity, communication time, and processing speed. A binary metadata format enables efficiency in all these respects, but requires special libraries to convert the binary information into human-readable content.

Wearables. As used herein, the term "wearable device" (or "wearable") includes a body-borne device (or item) designed or intended to be worn by a human. Such devices are typically comfortably worn on, and are carried or transported by, the human body, and are commonly used to create constant, convenient, seamless, portable, and mostly hands-free access to electronics and computers. The wearable devices may be in direct contact with the human body (such as by touching, or attaching to, the body skin), or may be releasably attachable to clothes or other items intended or designed to be worn on the human body. In general, the goal of wearable technologies is to smoothly incorporate functional, portable electronics and computers into individuals' daily lives. Wearable devices may be releasably attached to the human body using attaching means such as straps, buckles, belts, or clasps. Alternatively or in addition, wearable devices may be shaped, structured, or having a form factor to be body releasably mountable or attachable, such as using eye-glass frames or headphones. Further, wearable devices may be worn under, with, or on top of, clothing.

Wearable devices may interact as sensors or actuators with an organ or part of the human body, such as a head mounted wearable device may include a screen suspended in front of a user's eye, without providing any aid to the user's vision. Examples of wearable devices include watches, glasses, contact lenses, pedometers, chest straps, wristbands, head bands, arm bands, belt, head wear, hats, glasses, watches, sneakers, clothing, pads, e-textiles and smart fabrics, headbands, beanies, and caps, as well as jewelry such as rings, bracelets, and hearing aid-like devices that are designed to look like earrings. A wearable device may be structured, designed, or have a form factor that is identical to, substantially similar to, or is at least in part substitute to, a traditional wearable item.

A wearable device may be a headwear that may be structured, designed, or have a form factor that is identical to, substantially similar to, or is at least in part substitute to, any headwear item. The headwear may be attached to, or be in contact with, a head part, such as a face, nose, right nostril, left nostril, right cheek, left cheek, right eye, left eye, right ear, or left ear, nose, mouth, lip, forehead, or chin. A wearable device may be structured, designed, or have a form factor that is identical to, substantially similar to, or is at least in part substitute to, a bonnet, a cap, a crown, a fillet, a hair cover, a hat, a helmet, a hood, a mask, a turban, a veil, or a wig.

A headwear device may be an eyewear that may be structured, designed, or have a form factor that is identical to, substantially similar to, or is at least in part substitute to, any eyewear item, such as glasses, sunglasses, a contact lens, a blindfold, or a goggle. A headwear device may be an earpiece that may be structured, designed, or have a form factor that is identical to, substantially similar to, or is at least in part substitute to, any earpiece item, such as a hearing aid, a headphone, a headset, or an earplug.

A wearable device may be releasably or permanently attach to, or be part of, a clothing article such as a tie, sweater, jacket, or hat. The attachment may use taping, gluing, pinning, enclosing, encapsulating, or any other method of attachment or integration known in the art. Furthermore, in some embodiments, there may be an attachment element such as a pin or a latch and hook system, of portion thereof (with the complementary element on the item to which it is to be affixed) or clip. In a non-limiting example, the attachment element has a clip-like design to allow attachment to pockets, belts, watches, bracelets, broaches, rings, shoes, hats, bike handles, necklaces, ties, spectacles, collars, socks, bags, purses, wallets, or cords.

A wearable device may be releasably or permanently attach to, or be part of, a top underwear such as a bra, camisole, or undershirt, a bottom underwear such as a diaper, panties, plastic pants, slip, thong, underpants, boxer briefs, boxer shorts, or briefs, or a full-body underwear such as bodysuit, long underwear, playsuit, or teddy. Similarly, a wearable device may be releasably or permanently attach to, or be part of, a headwear such as a Baseball cap, Beret, Cap, Fedora, hat, helmet, hood, knit cap, toque, turban, or veil. Similarly, a wearable device may be releasably or permanently attach to, or be part of, a footwear such as an athletic shoe, boot, court shoe, dress shoe, flip-flops, hosiery, sandal, shoe, spats, slipper, sock, or stocking. Further, a wearable device may be releasably or permanently attach to, or be part of, an accessory such as a bandana, belt, bow tie, coin purse, cufflink, cummerbund, gaiters, glasses, gloves, headband, handbag, handkerchief, jewellery, muff, necktie, pocket protector, pocketwatch, sash, scarf, sunglasses, suspenders, umbrella, wallet, or wristwatch.

A wearable device may be releasably or permanently attach to, or be part of, an outwear such as an apron, blazer, British warm, cagoule, cape, chesterfield, coat, covert coat, cut-off, duffle coat, flight jacket, gilet, goggle jacket, guards coat, Harrington jacket, hoodie, jacket, leather jacket, mess jacket, opera coat, overcoat, parka, paletot, pea coat, poncho, raincoat, robe, safari jacket, shawl, shrug, ski suit, sleeved blanket, smoking jacket, sport coat, trench coat, ulster coat, waistcoat, or windbreaker. Similarly, a wearable device may be releasably or permanently attach to, or be part of, a suit (or uniform) such as an academic dress, ball dress, black tie, boilersuit, cleanroom suit, clerical clothing, court dress, gymslip, jumpsuit, kasaya, lab coat, military uniform, morning dress, onesie, pantsuit, red sea rig, romper suit, school uniform, scrubs, stroller, tuxedo, or white tie. Further, a wearable device may be releasably or permanently attach to, or be part of, a dress such as a ball gown, bouffant gown, coatdress, cocktail dress, debutante dress, formal wear, frock, evening gown, gown, house dress, jumper, little black dress, princess line, sheath dress, shirtdress, slip dress, strapless dress, sundress, wedding dress, or wrap dress. Furthermore, a wearable device may be releasably or permanently attach to, or be part of, a skirt such as an A-line skirt, ballerina skirt, denim skirt, men's skirts, miniskirt, pencil skirt, prairie skirt, rah-rah skirt, sarong, Skort, tutu, or wrap. In one example, a wearable device may be releasably or permanently attach to, or be part of, a trousers (or shorts) such as bell-bottoms, bermuda shorts, bondage pants, capri pants, cargo pants, chaps, cycling shorts, dress pants, high water pants, lowrise pants, Jeans, jodhpurs, leggings, overall, Palazzo pants, parachute pants, pedal pushers, phat pants, shorts, slim-fit pants, sweatpants, windpants, or yoga pants. In one example, a wearable device may be releasably or permanently attach to, or be part of, a top such as a blouse, crop top, dress shirt, guayabera, guernsey, halterneck, henley shirt, hoodie, jersey, polo shirt, shirt, sleeveless shirt, sweater, sweater vest, t-shirt, tube top, turtleneck, or twinset.

A wearable device may be structured, designed, or have a form factor that is identical to, substantially similar to, or is at least in part substitute to, a fashion accessory. These accessories may be purely decorative, or have a utility beyond aesthetics. Examples of these accessories include, but are not limited to, rings, bracelets, necklaces, watches, watch bands, purses, wallets, earrings, body rings, headbands, glasses, belts, ties, tie bars, tie tacks, wallets, shoes, pendants, charms and bobbles. For example, wearable devices may also be incorporated into pockets, steering wheels, keyboards, pens, and bicycle handles.

In one example, the wearable device may be shaped as, or integrated with, a device that includes an annular member defining an aperture therethrough that is sized for receipt therein of a human body part. The body part may be part of a human hand such as upper arm, elbow, forearm, wrist (such as a wrist-band), or a finger (such as a ring). Alternatively or in addition, the body part may be part of a human head or neck, such as a forehead, ear, skull, or face. Alternatively or in addition, the body part may be part of a human thorax or abdomen, such as waist or hip. Alternatively or in addition, the body part may be part of a human leg or foot, such as thigh, calf, ankle, instep, knee, or toe.

In one example, the wearable device may be shaped as, or integrated with, a ring. The ring may comprise, consist essentially of or consist of a shank, which is the location that provides an opening for a finger, and a head, which comprises, consists essentially or consists of ornamental features of the ring and in some embodiments houses the signaling assembly of the present device. The head may be of any shape, e.g., a regular sphere, truncated sphere, cube, rectangular prism, cylinder, triangular prism, cone, pyramid, barrel, truncated cone, domed cylinder, truncated cylinder, ellipsoid, regular polygon prism or truncated three-dimensional polygon of e.g., 4-16 sides, such as a truncated pyramid (trapezoid), or combination thereof or it may be an irregular shape. Further, the head may comprise an upper face that contains and is configured to show one or more jewels and/or ornamental designs.

A mobile communication device configured to be worn on an index finger of a user's hand is described in U.S. Patent Application Publication No. 2015/0373443 to Carroll entitled: "Finger-wearable mobile communication device", which is incorporated in its entirety for all purposes as if fully set forth herein. The device includes a case, a microphone, a switch, and a power source. The microphone and the switch are strategically located along a shape of the case so that as worn on the user's index finger and when the switch is activated by the thumb of the user's hand, the hand naturally cups about the microphone to form a barrier to ambient noise. Further, the microphone can readily be located near a corner of the user's mouth for optimal speech-receiving conditions and to provide more private audio input.

A user controls an external electronic device with a finger-ring-mounted touchscreen is described in U.S. Patent Application Publication No. 2015/0277559 to Vescovi et al. entitled: "Devices and Methods for a Ring Computing Device", which is incorporated in its entirety for all purposes as if fully set forth herein. The device includes a computer processor, wireless transceiver, and rechargeable power source; the ring is worn on a first finger receives an input from a second finger, selects one of a plurality of touch events associated with the input, and wirelessly transmits a command associated with the touch event to the external electronic device.

A mobile communication device that comprises a fashion accessory and a signaling assembly is described in U.S. Patent Application Publication No. 2015/0349556 to Mercando et al. entitled: "Mobile Communication Devices", which is incorporated in its entirety for all purposes as if fully set forth herein. The signaling assembly may be configured to provide sensory stimuli such as a flashing LED light and a vibration. These stimuli may vary depending on the signal received from a remote communication device or from gestures made by a user or from information stored in the mobile communication device.

A wearable fitness-monitoring device is described in U.S. Pat. No. 8,948,832 to Hong et al. entitled: "Wearable Heart Rate Monitor", which is incorporated in its entirety for all purposes as if fully set forth herein. The device including a motion sensor and a photoplethysmographic (PPG) sensor. The PPG sensor includes (i) a periodic light source, (ii) a photo detector, and (iii) circuitry determining a user's heart rate from an output of the photo detector. Some embodiments provide methods for operating a heart rate monitor of a wearable fitness-monitoring device to measure one or more characteristics of a heartbeat waveform. Some embodiments provide methods for operating the wearable fitness monitoring device in a low power state when the device determines that the device is not worn by a user. Some embodiments provide methods for operating the wearable fitness-monitoring device in a normal power state when the device determines that the device is worn by a user.

A wearable device and method for processing mages to prolong battery life are described in U.S. Pat. No. 8,957,988 to Wexler et al. entitled: "Apparatus for processing images to prolong battery life", which is incorporated in its entirety for all purposes as if fully set forth herein. In one implementation, a wearable apparatus may include a wearable image sensor configured to capture a plurality of images from an environment of a user. The wearable apparatus may also include at least one processing device configured to, in a first processing-mode, process representations of the plurality of images to determine a value of at least one capturing parameter for use in capturing at least one subsequent image, and in a second processing-mode, process the representations of the plurality of images to extract information. In addition, the at least one processing device may operate in the first processing-mode when the wearable apparatus is powered by a mobile power source included in the wearable apparatus and may operate in the second processing-mode when the wearable apparatus is powered by an external power source.

A wearable device may be used for notifying a person, such as by using tactile, visual, or audible stimulus, as described for example in U.S. Patent Application No. 2015/0341901 to RYU et al. entitled: "Method and apparatus for providing notification", which is incorporated in its entirety for all purposes as if fully set forth herein, describing an electronic device that includes: a transceiver configured to communicate with at least one wearable device and receive, from the at least one wearable device, status information indicating whether the at least one wearable device is currently being worn; and a processor configured to determine whether to send a notification request to the at least one wearable device based on the status information received by the transceiver.

A communication device, system and method are described for example in U.S. Patent Application No. 2007/0052672 to Ritter et al. entitled: "Communication device, system and method", which is incorporated in its entirety for all purposes as if fully set forth herein. It is discloses comprising a Virtual Retinal Display (VRD) in form of glasses (1), at least one haptic sensor (12) mounted on the frame of said glasses or connected by a short range communication interface (13) to said glasses (1), wherein it is possible to navigate by means of a cursor through an image displayed by the Virtual Retinal Display (VRD) with the at least one haptic sensor (12). A central control unit controls (11) the Virtual Retinal Display (VRD) and the at least one haptic sensor (12). When the Virtual Retinal Display (VRD) is connected to an external device (2, 9) by a short range communication interface (13), the user can navigate through the content of the external device (2, 9) by easy use of the haptic sensor (12).

Wearable communication devices, e.g. implemented in a watch, using short range communication to a cell phone, and facilitating natural and intuitive user interface with low-power implementation are described for example in U.S. Patent Application No. 2014/0045547 to Singamsetty et al. entitled: "Wearable Communication Device and User Interface", which is incorporated in its entirety for all purposes as if fully set forth herein. The devices allow a user to easily access all features of the phone, all while a phone is nearby but not visible. Notification is performed with vibration, an LED light and OLED text display of incoming calls, texts, and calendar events. It allows communicating hands-free. This allows using the communication device as "remote control" for home devices, etc. via voice and buttons. The device comprises interfaces motion sensors such as accelerometers, magnetometer and gyroscope, infrared proximity sensors, vibrator motor, and/or voice recognition. Low power consumption is achieved by dynamical configuration of sensor parameters to support only the necessary sensor functions at any given state of the device.

A wearable electronic device that is configured to control and command a variety of wireless devices within its proximity is described in U.S. Pat. No. 7,605,714 to Thompson et al. entitled: "System and method for command and control of wireless devices using a wearable device", which is incorporated in its entirety for all purposes as if fully set forth herein. The wearable device dynamically generates a user interface corresponding to the services of a particular wireless device. Through the user interface, the wireless device surface content to a user and allows a user select interactions with the wireless devices using the wearable device.

An apparatus and method for the remote control and/or interaction-with electronic-devices such as computers; home-entertainment-systems; media-centers; televisions; DVD-players; VCR-players; music systems; appliances; security systems; toys/games; and/or displays are described in U.S. Pat. No. 8,508,472 to Wieder entitled: "Wearable remote control with a single control button", which is incorporated in its entirety for all purposes as if fully set forth herein. A user may orient a pointer (e.g., laser pointer) to place a pointer-spot on/near object(s) on an active-display(s); and/or a fixed-display(s); and/or on real-world object(s) within a display region or pointer-spot detection-region. Detectors, imager(s) and/or camera(s) may be connected/attached to the display region and/or a structure that is connected/attached to display region. When the user initiates a "select", the detectors/cameras may detect the location of the pointer-spot within the display region. Corresponding to the user's selection(s); control action(s) may be performed on the device(s) being controlled/interacted-with and additional selection-menus may be optionally presented on an active-display.

A hand-worn controller consisting of a housing having a central opening sized to permit the controller to be worn as ring on the index finger of a human hand is described in U.S. Patent Application Publication No. 2006/0164383 to Machin et al. entitled: "Remote controller ring for user interaction", which is incorporated in its entirety for all purposes as if fully set forth herein. A joystick lever projects outwardly from said housing and is positioned to be manipulated by the user's thumb. The joystick operates on or more control devices, such as switches or potentiometers, that produce control signals. A wireless communications device, such as a Bluetooth module, mounted in said housing transmits command signals to a remote utilization device, which are indicative of the motion or position of said joystick lever.

A wearable augmented reality computing apparatus with a display screen, a reflective device, a computing device and a head mounted harness to contain these components is described in U.S. Patent Application Publication No. 2012/0050144 to Morlock entitled: "Wearable augmented reality computing apparatus", which is incorporated in its entirety for all purposes as if fully set forth herein. The display device and reflective device are configured such that a user can see the reflection from the display device superimposed on the view of reality. An embodiment uses a switchable mirror as the reflective device. One usage of the apparatus is for vehicle or pedestrian navigation. The portable display and general purpose computing device can be combined in a device such as a smartphone. Additional components consist of orientation sensors and non-handheld input devices.

In one example, a wearable device may use, or may be based on, a processor or a microcontroller that is designed for wearable applications, such as the CC2650 SimpleLink™ Multistandard Wireless MCU available from Texas Instruments Incorporated (headquartered in Dallas, Texas, U.S.A.) and described in a Texas Instrument 2015 publication #SWRT022 entitled: "*SimpleLink™ Ultra-Low Power—Wireless Microcontroller Platform*", and in a Texas Instrument 2015 datasheet #SWRS158A (published February 2015, Revised October 2015) entitled: "CC2650 SimpleLink™ Multistandard Wireless MCU", which are both incorporated in their entirety for all purposes as if fully set forth herein.

An example of a personal multimedia electronic device, and more particularly to a head-worn device such as an eyeglass frame, is described in U.S. Patent Application No. 2010/0110368 to Chaum entitled: "System and apparatus for eyeglass appliance platform", which is incorporated in its entirety for all purposes as if fully set forth herein. The device is having a plurality of interactive electrical/optical components. In one embodiment, a personal multimedia electronic device includes an eyeglass frame having a side arm and an optic frame; an output device for delivering an output to the wearer; an input device for obtaining an input; and a processor comprising a set of programming instructions for controlling the input device and the output device. The output device is supported by the eyeglass frame and is selected from the group consisting of a speaker, a bone conduction transmitter, an image projector, and a tactile actuator. The input device is supported by the eyeglass frame and is selected from the group consisting of an audio sensor, a tactile sensor, a bone conduction sensor, an image sensor, a body sensor, an environmental sensor, a global positioning system receiver, and an eye tracker. In one embodiment, the processor applies a user interface logic that determines a state of the eyeglass device and determines the output in response to the input and the state.

An example of an eyewear for a user is described in U.S. Patent Application No. 2012/0050668 Howell et al. entitled: "Eyewear with touch-sensitive input surface", which is incorporated in its entirety for all purposes as if fully set forth herein. The eyewear includes an eyewear frame, electrical circuitry at least partially in the eyewear frame, and a touch sensitive input surface on the eyewear frame configured to provide an input to the electrical circuitry to perform a function via touching the touch sensitive input surface. In another embodiment, the eyewear includes a switch with at least two operational states. The operational states of the switch can be configured to be changed by sliding a finger across the touch sensitive input surface of the frame.

An example of a wearable computing device is described in U.S. Patent Application No. 2013/0169513 to Heinrich et al. entitled: "Wearable computing device", which is incorporated in its entirety for all purposes as if fully set forth herein. The device includes a bone conduction transducer, an extension arm, a light pass hole, and a flexible touch pad input circuit. When a user wears the device, the transducer contacts the user's head. A display is attached to a free end of an extension arm. The extension arm is pivotable such that a distance between the display and the user's eye is adjustable to provide the display at an optimum position. The light pass hole may include a light emitting diode and a flash. The touch pad input circuit may be adhered to at least one side arm such that parting lines are not provided between edges of the circuit and the side arm.

Virtual Reality. Virtual Reality (VR) or virtual realities, also known as immersive multimedia or computer-simulated reality, is a computer technology that replicates an environment, real or imagined, and simulates a user's physical presence and environment to allow for user interaction. Virtual realities artificially create sensory experience, which can include sight, touch, hearing, and smell. Most up-to-date virtual realities are displayed either on a computer monitor or with a virtual reality headset (also called head-mounted display), and some simulations include additional sensory information and focus on real sound through speakers or headphones targeted towards VR users. Some advanced haptic systems now include tactile information, generally known as force feedback in medical, gaming and military applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove or omnidirectional treadmills. The immersive environment can be similar to the real world in order to create a lifelike experience—for example, in simulations for pilot or combat training—or it can differ significantly from reality, such as in VR games.

VR is described in an article published November 2009 in International Journal of Automation and Computing 6(4), November 2009, 319-325 [DOI: 10.1007/s11633-009-0319-9] by Ning-Ning Zhou and Yu-Long Deng entitled: "*Virtual Reality: A State-of-the-Art Survey*", in a draft publication authored by Steven M. LaValle of the University of Illinois dated Jul. 6, 2016 entitled: "*VIRTUAL REALITY*", in an article by D. W. F. van Krevelen and R. Poelman published 2010 in The International Journal of Virtual Reality, 2010, 9(2):1-20 entitled: "A Survey of Augmented Reality—Technologies, Applications and Limitations", in a paper by Moses Okechukwu Onyesolu and Felista Udoka Eze entitled: "*Understanding Virtual Reality Technology: Advances and Applications*" published 2011 by the Federal University of Technology, Owerri, Imo State, Nigeria, in an article by Dr. Matthias Schmidt (Ed.) published in Advances and Applications, Advances in Computer Science and Engineering, [ISBN: 978-953-307-173-2] by InTech, and in an Feb. 27, 2015 article by James Walker of Michigan Technological University entitled: "*Everyday Virtual Reality*", which are all incorporated in their entirety for all purposes as if fully set forth herein.

A method (50) of altering content provided to a user is described in U.S. Patent Application Publication No. 2007/0167689 to Ramadas et al. entitled: "Method and system for enhancing a user experience using a user's physiological state", which is incorporated in its entirety for all purposes as if fully set forth herein. The method includes the steps of creating (60) a user profile based on past physiological measurements of the user, monitoring (74) at least one current physiological measurement of the user, and altering (82) the content provided to the user based on the user profile and the at least one current physiological measurement. The user profile can be created by recording a plurality of inferred or estimated emotional states (64) of the user which can include a time sequence of emotional states, stimulus contexts for such states, and a temporal relationship between the emotional state and the stimulus context. The content can be altered in response to the user profile and measured physiological state by altering at least one among an audio volume, a video sequence, a sound effect, a video effect, a difficulty level, a sequence of media presentation.

A see-through, head mounted display and sensing devices cooperating with the display detect audible and visual behaviors of a subject in a field of view of the device are described in U.S. Pat. No. 9,019,174 to Jerauld entitled: "Wearable emotion detection and feedback system", which is incorporated in its entirety for all purposes as if fully set forth herein. A processing device communicating with display and the sensors monitors audible and visual behaviors of the subject by receiving data from the sensors. Emotional states are computed based on the behaviors and feedback provided to the wearer indicating computed emotional states of the subject. During interactions, the device, recognizes emotional states in subjects by comparing detected sensor input against a database of human/primate gestures/expressions, posture, and speech. Feedback is provided to the wearer after interpretation of the sensor input.

Method and devices for creating a sedentary virtual-reality system are provided in U.S. Pat. No. 9,298,283 to Chau-Hsiung Lin, et al. entitled: "Sedentary virtual reality method and systems", which is incorporated in its entirety for all purposes as if fully set forth herein. A user interface is provided that allows for the intuitive navigation of the sedentary virtual-reality system based on the position of the users head. The sedentary virtual-reality system can render a desktop computing environment. The user can switch the virtual-reality system into an augmented reality viewing mode or a real-world viewing mode that allow the user to control and manipulate the rendered sedentary environment. The modes can also change to allow the user greater situational awareness and a longer duration of use HMD. A Head-Mounted Display (or Helmet-Mounted Display, for aviation applications), both abbreviated HMD, is a display device, worn on the head or as part of a helmet, that has a small display optic in front of one (monocular HMD) or each eye (binocular HMD). There is also an Optical head-mounted display (OHMD), which is a wearable display that has the capability of reflecting projected images as well as allowing the user to see through it. A typical HMD has either one or two small displays with lenses and semi-transparent mirrors embedded in a helmet, eyeglasses (also known as data glasses) or visor. The display units are miniaturized and may include CRT, LCDs, Liquid crystal on silicon (LCos), or OLED. Some vendors employ multiple micro-displays to increase total resolution and field of view.

HMDs differ in whether they can display just a Computer Generated Image (CGI), show live images from the real world or a combination of both. Most HMDs display only a computer-generated image, sometimes referred to as a virtual image. Some HMDs allow a CGI to be superimposed on a real-world view. This is sometimes referred to as augmented reality or mixed reality. Combining real-world view with CGI can be done by projecting the CGI through a partially reflective mirror and viewing the real world directly. This method is often called Optical See-Through. Combining real-world view with CGI can also be done electronically by accepting video from a camera and mixing it electronically with CGI. This method is often called Video See-Through.

An optical head-mounted display uses an optical mixer, which is made of partly silvered mirrors. It has the capability of reflecting artificial images as well as letting real images to cross the lens and let the user to look through it. Various techniques have existed for see-through HMD's. Most of these techniques can be summarized into two main families: "Curved Mirror" based and "Waveguide" based. Various waveguide techniques have existed for some time. These techniques include diffraction optics, holographic optics, polarized optics, and reflective optics. Major HMD applications include military, governmental (fire, police, etc.) and civilian/commercial (medicine, video gaming, sports, etc.).

The Virtual Reality (VR) technology most fundamental to the proposed research is the Head-Mounted Display (HMD). An HMD is a helmet or visor worn by the user with two screens, one for each eye, so that a stereoscopic "true 3D" image may be displayed to the user. This is achieved by displaying the same image in each screen, but offset by a distance equal to the distance between the user's eyes, mimicking how human vision perceives the world. HMDs can be opaque or see-through. In a see-through HMD, the screens are transparent so that the user can see the real world as well as what is being displayed on the screens. However, see-through HMDs often suffer from brightness problems that make them difficult to use in variable lighting conditions. Most opaque HMD designs block out the real world so that the user can only see the screens, thereby providing an immersive experience.

Some HMDs are used in conjunction with tracking systems. By tracking the user's position or orientation (or both), the system can allow the user to move naturally via locomotion and by turning their head and body, and update the graphical display accordingly. This allows for natural exploration of virtual environments without needing to rely on a keyboard, mouse, joystick, and similar interface hardware. Positional tracking is often accomplished by attaching markers (such as infrared markers) to the HMD or the user's body and using multiple special cameras to track the location of these markers in 3D space. Orientation tracking can be accomplished using an inertial tracker, which uses a sensor to detect velocities on three axes. Some systems use a combination of optical and inertial tracking, and other tracking techniques (e.g., magnetic) also exist. The output from the tracking systems is fed into the computer rendering the graphical display so that it can update the scene. Filtering is usually necessary to make the data usable since it comes in the form of noisy analog measurements. An HMD typically includes a horizontal strap and a vertical strap for head wearing by a person. A wireless-capable HMD typically includes an antenna for wireless communication.

Methods and systems for capturing an image are provided in U.S. Patent Application Publication No. 2013/0222638 to Wheeler et al. entitled: "Image Capture Based on Gaze Detection", which is incorporated in its entirety for all purposes as if fully set forth herein. In one example, a head-mounted device (HMD) having an image capturing device, a viewfinder, a gaze acquisition system, and a controller may be configured to capture an image. The image capturing device may be configured to have an imaging field of view including at least a portion of a field of view provided by the viewfinder. The gaze acquisition system may be configured to acquire a gaze direction of a wearer. The controller may be configured to determine whether the acquired gaze direction is through the viewfinder and generate an image capture instruction based on a determination that the acquired gaze direction indicates a gaze through the viewfinder. The controller may further be configured to cause the image capturing device to capture an image.

Methods and systems for capturing and storing an image are provided in U.S. Pat. No. 8,941,561 to Starner entitled: "Image Capture", which is incorporated in its entirety for all purposes as if fully set forth herein. In one example, eye-movement data associated with a head-mountable device (HMD) may be received. The HMD may include an image-capture device arranged to capture image data corresponding to a wearer-view associated with the HMD. In one case, the received eye-movement data may indicate sustained gaze. In this case, a location of the sustained gaze may be determined, and an image including a view of the location of the sustained gaze may be captured. At least one indication of a context of the captured image, such as time and/or geographic location of the HMD when the image was captured may be determined and stored in a data-item attribute database as part of a record of the captured image. In a further example, movements associated with the HMD may also be determined and based on to determine sustained gaze and the location of the sustained gaze.

A head mountable display (HMD) system is disclosed in U.S. Patent Application Publication No. 2014/0362446 to Bickerstaff et al. entitled: "Electronic Correction Based on Eye Tracking", which is incorporated in its entirety for all purposes as if fully set forth herein. The head mountable display (HMD) system comprises an eye position detector comprising one or more cameras configured to detect the position of each of the HMD user's eyes; a dominant eye detector configured to detect a dominant eye of the HMD user; and an image generator configured to generate images for display by the HMD in dependence upon the HMD user's eye positions, the image generator being configured to apply a greater weight to the detected position of the dominant eye than to the detected position of the non-dominant eye.

Methods and systems are described that involve a head-mountable display (HMD) or an associated device determining the orientation of a person's head relative to their body, are described in U.S. Pat. No. 9,268,136 to Patrick et al. entitled: "Use of Comparative Sensor Data to Determine Orientation of Head Relative to Body", which is incorporated in its entirety for all purposes as if fully set forth herein. To do so, example methods and systems may compare sensor data from the HMD to corresponding sensor data from a tracking device that is expected to move in a manner that follows the wearer's body, such a mobile phone that is located in the HMD wearer's pocket.

A Head Mountable Display (HMD) system in which images are generated for display to the user is described in Patent Cooperation Treaty (PCT) International Application (IA) Publication No. WO 2014/199155 to Ashforth et al. entitled: "Head-Mountable Apparatus and Systems", which is incorporated in its entirety for all purposes as if fully set forth herein. The head mountable display (HMD) system comprises a detector configured to detect the eye position and/or orientation and/or the head orientation of the HMD wearer, and a controller configured to control the generation of images for display, at least in part, according to the detection of the eye position and/or orientation and/or the head orientation of the HMD wearer; in which the controller is configured to change the display of one or more image features according to whether or not the user is currently looking at those image features, the image features are menu items or information items, by rendering an image feature so as to be more prominent on the display if the user is looking at it, such that the image feature is enlarged, moved from a peripheral display position, replaced by a larger image feature and/or brought forward in a 3D display space if the user is looking at it.

Head Pose. Various systems and methods are known for estimating the head pose using a digital camera. A method for head pose estimation based on including receiving block motion vectors for a frame of video from a block motion estimator, selecting a block for analysis, determining an average motion vector for the selected block, and estimating the orientation of the user head in the video frame based on the accumulated average motion vector is described in U.S. Pat. No. 7,412,077 to Li et al., entitled: "Apparatus and Methods for Head Pose Estimation and Head Gesture Detection", methods for generating a low dimension pose space and using the pose space to estimate head rotation angles of a user's head are described in U.S. Pat. No. 8,687,880 to Wei et al., entitled: "Real Time Head Pose Estimation", techniques for performing accurate and automatic head pose estimation, integrated with a scale-invariant head tracking method based on facial features detected from a located head in images are described in U.S. Pat. No. 8,781,162 to Zhu et al., entitled: "Method and System for Head Tracking and Pose Estimation", a three-dimensional pose of the head of a subject determined based on depth data captured in multiple images is described in U.S. Patent Application Publication No. 2012/0293635 to Sharma et al., entitled: "Head Pose Estimation Using RGBD Camera", and a device and method for estimating head pose and obtaining an excellent head pose recognition result free from the influence of an illumination change, the device including a head area extracting unit, a head pitch angle unit, a head yaw unit, and a head pose displaying unit, is disclosed in U.S. Patent Application Publication No. 2014/0119655 to LIU et al., entitled: "Device and Method for Estimating Head Pose", which are all incorporated in their entirety for all purposes as if fully set forth herein.

Further head pose techniques are described in IEEE Transaction on Pattern Analysis and Machine Intelligence published 2008 (Digital Object Identifier 10.1109/TPAMI.2008.106) by Erik Murphy-Chutorian and Mohan Trivedi entitled: "*Head Pose Estimation in Computer Vision: A Survey*", and in an article by Xiangxin Zhu and Deva Ramanan of the University of California, Irvine, entitled: "*Face detection, Pose Estimation, and Landmark Localization in the Wild*", which are both incorporated in their entirety for all purposes as if fully set forth herein. Further head-pose and eye-gaze information and techniques are described in a book by Jian-Gang Wang entitled: "*Head-Pose and Eye-Gaze estimation: With Use of Face Domain knowledge*" (ISBN-13: 978-3659132100).

Measuring the eye gaze using a monocular image that zooms in on only one eye of a person is described in an article published in Proceedings of the Ninth IEEE International Conference on Computer Vision (ICCV 2003) by Jian-Gang Wang, Eric Sung, and Ronda Venkateswarlu, all of Singapore, entitled: "*Eye Gaze Estimation from a Single Image of One Eye*", and an Isophote Curvature method employed to calculate the location of irises center using faces in images from camera detected by Haar-like feature is described in a paper published in the International Symposium on Mechatronics and Robotics (Dec. 10, 2013, HCMUT, Viet Nam), by Dinh Quang Tri, Van Tan Thang, Nguyen Dinh Huy, and Doan The Thao of the University of Technology, HoChin Minh, Viet Nam, entitled: "*Gaze Estimation with a Single Camera based on an ARM-based Embedded Linux Platform*", an approach for accurately measuring the eye gaze of faces from images of irises is described in an article by Jia-Gang Wang and Eric Sung of the Nanyang Technological University, Singapore, entitled: "*Gaze Detection via Images of Irises*", two novel approaches, called the "two-circle" and "one-circle" algorithm respectively, for measuring eye gaze using monocular image that zooms in on two eyes or only one eye of a person are described in a paper by Jian-Gang Wang and Eric Sung of the School of Electrical and Electronic Engineering, Nanyang Technological University, Singapore 639798, entitled: "*Gaze Direction Determination*", ASEF eye locator is described in the web-site: 'github.com/laoyang/ASEF' (preceded by https://), a locating the center of the eye within the area of the pupil on low resolution images using isophrote properties to gain invariance to linear lighting changes is described in a paper published in IEEE Transaction on Pattern Analysis and Machine Intelligence (2011) by Roberto Valenti and Theo Gevers entitled: "*Accurate Eye Center Location through Invariant Isocentric Patterns*", and an approach for accurate and robust eye center localization by using image gradients is described in an article by Fabian Timm and Erhardt Barth entitled: "*Accurate Eye Localisation by Means of Gradients*", which are all incorporated in their entirety for all purposes as if fully set forth herein.

A survey regarding eye tracking and head pose is disclosed in an article published March 2016 in International Journal of Scientific Development and Research (IJSDR) [IJSDR16JE03008] by Rohit, P. Gaur, Krupa, and N. Jariwala, [ISSN: 2455-2631] entitled: "*A Survey on Methods and Models of Eye Tracking, Head Pose and Gaze Estimation*", which is incorporated in its entirety for all purposes as if fully set forth herein.

A head-tracking system and method for determining at least one orientation parameter of an object on the basis of radio frequency identification (RFID) technology is described in European Patent Application EP 2031418 to Munch et al. entitled: "Tracking system using RFID (radio frequency identification) technology", which is incorporated in its entirety for all purposes as if fully set forth herein. At least two transponders the antennas of which have different orientations with respect to each other are attached to the object, while a transceiver connected to a processing unit is fixed elsewhere in space. An orientation of the object is evaluated based on the orientation-dependent responses of the transponders to a signal emitted by the transceiver. A tracking system according to the present invention is particularly advantageous since the additional wireless hardware with which the object has to be equipped (RFID transponders) consists of only small and low cost items. No special cabling is necessary. A preferred field of application of the present invention is orientation tracking of wireless headphones for simulating surround sound, such as in a vehicle entertainment and information system.

A method for controlling a zoom mode function of a portable imaging device equipped with multiple camera modules based on the size of an identified user's face or based on at least one of the user's facial features is described in U.S. Patent Application Publication No. 2014/0184854 to Musatenko, entitled: "Front Camera Face Detection for Rear Camera Zoom Function", methods and apparatus for image capturing based on a first camera mounted on a rear side of a mobile terminal and a second camera mounted on the front side of the mobile terminal are described in U.S. Patent Application Publication No. 2014/0139667 to KANG, entitled: "Image Capturing Control Apparatus and Method", a method and device for capturing accurate composition of an intended image/self-image/self-image with surrounding objects, with desired quality or high resolution and quality of the image achieved by using motion sensor/direction sensor/position sensor and by matching minimum number of contrast points are described in PCT International Application Publication No. WO 2015/022700 to RAMSUNDAR SHANDILYA et al., entitled: "A Method for Capturing an Accurately Composed High Quality Self-Image Using a Multi Camera Device", a method and computer program product for remotely controlling a first image capturing unit in a portable electronic device including a first and second image capturing unit, and the device detects and tracks an object via the second capturing unit and detects changes in an area of the object are described in U.S. Patent Application Publication No. 2008/0212831 to Hope, entitled: "Remote Control of an Image Capturing Unit in a Portable Electronic Device", methods and devices for camera aided motion direction and speed estimation of a mobile device based on capturing a plurality of images that represent views from the mobile device and adjusting perspectives of the plurality of images are described in U.S. Patent Application Publication No. 2014/0226864 to Subramaniam Venkatraman et al., entitled: "Camera Aided Motion Direction and Speed Estimation", and a smart mobile phone with a front camera and a back camera where the position coordinates of pupil centers in the front camera reference system, when the mobile device holder watches a visual focus on a display screen are collected through the front camera, is described in the Abstract of Chinese Patent Application Publication No. CN 103747183 Huang Hedong, entitled: "Mobile Phone Shooting Focusing Method", which are all incorporated in their entirety for all purposes as if fully set forth herein.

Internet. The Internet is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers on the Internet. These data routers are hosted by commercial, government, academic, and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Transmission Control Protocol (TCP) is one of the core protocols of the Internet Protocol suite (IP) described in RFC 675 and RFC 793, and the entire suite is often referred to as TCP/IP. TCP provides reliable, ordered and error-checked delivery of a stream of octets between programs running on computers connected to a local area network, intranet or the public Internet. It resides at the transport layer. Web browsers typically use TCP when they connect to servers on the World Wide Web, and is used to deliver email and transfer files from one location to another. HTTP, HTTPS, SMTP, POP3, IMAP, SSH, FTP, Telnet, and a variety of other protocols are encapsulated in TCP. As the transport layer of TCP/IP suite, the TCP provides a communication service at an intermediate level between an application program and the Internet Protocol (IP). Due to network congestion, traffic load balancing, or other unpredictable network behavior, IP packets may be lost, duplicated, or delivered out-of-order. TCP detects these problems, requests retransmission of lost data, rearranges out-of-order data, and even helps minimize network congestion to reduce the occurrence of the other problems. Once the TCP receiver has reassembled the sequence of octets originally transmitted, it passes them to the receiving application. Thus, TCP abstracts the application's communication from the underlying networking details. The TCP is utilized extensively by many of the Internet's most popular applications, including the World Wide Web (WWW), E-mail, File Transfer Protocol, Secure Shell, peer-to-peer file sharing, and some streaming media applications.

While IP layer handles actual delivery of the data, TCP keeps track of the individual units of data transmission, called segments, which are divided smaller pieces of a message, or data for efficient routing through the network. For example, when an HTML file is sent from a web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. When the client program on the destination computer receives them, the TCP layer (Transport Layer) reassembles the individual segments and ensures they are correctly ordered and error-free as it streams them to an application.

The TCP protocol operations may be divided into three phases. First, the connections must be properly established in a multi-step handshake process (connection establishment) before entering the data transfer phase. After data transmission is completed, the connection termination closes established virtual circuits and releases all allocated resources. A TCP connection is typically managed by an operating system through a programming interface that represents the local end-point for communications, the Internet socket. The local end-point undergoes a series of state changes throughout the duration of a TCP connection.

The Internet Protocol (IP) is the principal communications protocol used for relaying datagrams (packets) across a network using the Internet Protocol Suite. It is considered as the primary protocol that establishes the Internet, and is responsible for routing packets across the network boundaries. IP is the primary protocol in the Internet Layer of the Internet Protocol Suite and has the task of delivering datagrams from the source host to the destination host based on their addresses. For this purpose, IP defines addressing methods and structures for datagram encapsulation. Internet Protocol Version 4 (IPv4) is the dominant protocol of the Internet. IPv4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3\times10^9$ addresses), while IPv6 uses 128-bit addresses (providing 340 undecillion or $3.4\times10^{38}$ addresses), as described in RFC 2460.

The Internet architecture employs a client-server model, among other arrangements. The terms 'server' or 'server computer' relates herein to a device or computer (or a plurality of computers) connected to the Internet, and is used for providing facilities or services to other computers or other devices (referred to in this context as 'clients') connected to the Internet. A server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or a device, or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

Wireless. Any embodiment herein may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Any wireless network or wireless connection herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device that incorporates a wireless communication device, or a mobile/portable Global Positioning System (GPS) device. Further, a wireless communication may be based on wireless technologies that are described in Chapter 20: "*Wireless Technologies*" of the publication number 1-587005-001-3 by Cisco Systems, Inc. (7/99) entitled: "*Internetworking Technologies Handbook*", which is incorporated in its entirety for all purposes as if fully set forth herein. Wireless technologies and networks are further described in a book published 2005 by Pearson Education, Inc. William Stallings [ISBN: 0-13-191835-4] entitled: "*Wireless Communications and Networks—second Edition*", which is incorporated in its entirety for all purposes as if fully set forth herein.

Wireless networking typically employs an antenna (a.k.a. aerial), which is an electrical device that converts electric power into radio waves, and vice versa, connected to a wireless radio transceiver. In transmission, a radio transmitter supplies an electric current oscillating at radio frequency to the antenna terminals, and the antenna radiates the energy from the current as electromagnetic waves (radio waves). In reception, an antenna intercepts some of the power of an electromagnetic wave in order to produce a low voltage at its terminals that is applied to a receiver to be amplified. Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

ZigBee. ZigBee is a standard for a suite of high-level communication protocols using small, low-power digital radios based on an IEEE 802 standard for Personal Area Network (PAN). Applications include wireless light switches, electrical meters with in-home-displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at Radio-Frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for a number of tasks, which include keeping of device roles, management of requests to join a network, device discovery, and security.

Because ZigBee nodes can go from a sleep to active mode in 30 ms or less, the latency can be low and devices can be responsive, particularly compared to Bluetooth wake-up delays, which are typically around three seconds. ZigBee nodes can sleep most of the time, thus an average power consumption can be lower, resulting in longer battery life.

There are three defined types of ZigBee devices: ZigBee Coordinator (ZC), ZigBee Router (ZR), and ZigBee End Device (ZED). ZigBee Coordinator (ZC) is the most capable device and forms the root of the network tree and might bridge to other networks. There is exactly one defined ZigBee coordinator in each network, since it is the device that started the network originally. It is able to store information about the network, including acting as the Trust Center & repository for security keys. ZigBee Router (ZR) may be running an application function as well as may be acting as an intermediate router, passing on data from other devices. ZigBee End Device (ZED) contains functionality to talk to a parent node (either the coordinator or a router). This relationship allows the node to be asleep a significant amount of the time, thereby giving long battery life. A ZED requires the least amount of memory, and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on to reduce power consumption. In beaconing networks, nodes only need to be active while a beacon is being transmitted. In non-beacon-enabled networks, power consumption is decidedly asymmetrical: some devices are always active while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA), that is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirements, may also use Guaranteed Time Slots (GTS), which by definition do not use CSMA.

Z-Wave. Z-Wave is a wireless communications protocol by the Z-Wave Alliance (http://www.z-wave.com) designed for home automation, specifically for remote control applications in residential and light commercial environments. The technology uses a low-power RF radio embedded or retrofitted into home electronics devices and systems, such as lighting, home access control, entertainment systems and household appliances. Z-Wave communicates using a low-power wireless technology designed specifically for remote control applications. Z-Wave operates in the sub-gigahertz frequency range, around 900 MHz. This band competes with some cordless telephones and other consumer electronics devices, but avoids interference with WiFi and other systems that operate on the crowded 2.4 GHz band. Z-Wave is designed to be easily embedded in consumer electronics products, including battery-operated devices such as remote controls, smoke alarms, and security sensors.

Z-Wave is a mesh networking technology where each node or device on the network is capable of sending and receiving control commands through walls or floors, and use intermediate nodes to route around household obstacles or radio dead spots that might occur in the home. Z-Wave devices can work individually or in groups, and can be programmed into scenes or events that trigger multiple devices, either automatically or via remote control. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHz ISM band: 908.42 MHz (United States); 868.42 MHz (Europe); 919.82 MHz (Hong Kong); and 921.42 MHz (Australia/New Zealand).

Z-Wave uses a source-routed mesh network topology and has one or more master controllers that control routing and security. The devices can communicate to another by using intermediate nodes to actively route around, and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore, a Z-Wave network can span much farther than the radio range of a single unit; however, with several of these hops, a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000

1×RTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+1-11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. A Wireless Access Point (WAP, or Access Point—AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

BAN. A wireless network may be a Body Area Network (BAN) according to, compatible with, or based on, IEEE 802.15.6 standard, and communicating devices may comprise a BAN interface that may include a BAN port and a BAN transceiver. The BAN may be a Wireless BAN (WBAN), and the BAN port may be an antenna and the BAN transceiver may be a WBAN modem.

Bluetooth. Bluetooth is a wireless technology standard for exchanging data over short distances (using short-wavelength UHF radio waves in the ISM band from 2.4 to 2.485 GHz) from fixed and mobile devices, and building personal area networks (PANs). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein. Any Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHz, or 2400 and 2483.5 MHz including guard bands 2 MHz wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 800 hops per second, with Adaptive Frequency-Hopping (AFH) enabled. Bluetooth low energy uses 2 MHz spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 μs intervals. Two clock ticks make up a slot of 625 μs, and two slots make up a slot pair of 1250 μs. In the simple case of single-slot packets the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

A master Bluetooth device can communicate with a maximum of seven devices in a piconet (an ad-hoc computer network using Bluetooth technology), though not all devices reach this maximum. The devices can switch roles, by agreement, and the slave can become the master (for example, a headset initiating a connection to a phone necessarily begins as master—as initiator of the connection—but may subsequently operate as slave). The Bluetooth Core Specification provides for the connection of two or more piconets to form a scatternet, in which certain devices simultaneously play the master role in one piconet and the slave role in another. At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is supposed to listen in each receive slot, being a master is a lighter burden than being a slave. Being a master of seven slaves is possible; being a slave of more than one master is difficult.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: "*Master Table of Contents & Compliance Requirements—Specification Volume* 0", and in an article published 2012 in Sensors [ISSN 1424-8220] by Carles Gomez et al. [Sensors 2012, 12, 11734-11753; doi:10.3390/s120211734] entitled: "*Overview and Evaluation of Bluetooth Low Energy: An Emerging Low-Power Wireless Technology*", which are both incorporated in their entirety for all purposes as if fully set forth herein.

Bluetooth Smart technology operates in the same spectrum range (the 2.400 GHz-2.4835 GHz ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application programming interface offered by a Bluetooth Smart aware operating system will typically be based around GATT concepts.

NFC. Any wireless communication herein may be partly or in full in accordance with, compatible with, or based on, short-range communication such as Near Field Communication (NFC), having a theoretical working distance of 20 centimeters and a practical working distance of about 4 centimeters, and commonly used with mobile devices, such as smartphones. The NFC typically operates at 13.56 MHz as defined in ISO/IEC 18000-3 air interface, and at data rates ranging from 106 Kbit/s to 424 Kbit/s. NFC commonly involves an initiator and a target; the initiator actively generates an RF field that may power a passive target. NFC peer-to-peer communication is possible, provided both devices are powered.

The NFC typically supports passive and active modes of operation. In passive communication mode, the initiator device provides a carrier field and the target device answers by modulating the existing field, and the target device may draw its operating power from the initiator-provided electromagnetic field, thus making the target device a transponder. In active communication mode, both devices typically have power supplies, and both initiator and target devices communicate by alternately generating their own fields, where a device deactivates its RF field while it is waiting for data. NFC typically uses Amplitude-Shift Keying (ASK), and employs two different schemes to transfer data. At the data transfer rate of 106 Kbit/s, a modified Miller coding with 100% modulation is used, while in all other cases, Manchester coding is used with a modulation ratio of 10%.

The NFC communication may be partly or in full in accordance with, compatible with, or based on, NFC standards ISO/IEC 18092 or ECMA-340 entitled: "Near Field Communication Interface and Protocol-1 (NFCIP-1)", and ISO/IEC 21481 or ECMA-352 standards entitled: "*Near Field Communication Interface and Protocol*-2 (*NFCIP*-2)". The NFC technology is described in ECMA International white paper Ecma/TC32-TG19/2005/012 entitled: "*Near Field Communication—White paper*", in Rohde&Schwarz White Paper 1MA182_4e entitled: "*Near Field Communication* (*NFC*) *Technology and Measurements White Paper*", and in Jan Kremer Consulting Services (JKCS) white paper entitled: "*NFC—Near Field Communication—White*

*paper*", which are all incorporated in their entirety for all purposes as if fully set forth herein.

Cellular. Cellular telephone network may be according to, compatible with, or may be based on, a Third Generation (3G) network that uses UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network that uses HSPA+, Mobile WiMAX, LTE, LTE-Advanced, MBWA, or may be based on or compatible with IEEE 802.20-2008.

Electronic circuits and components are described in a book by Wikipedia entitled: "*Electronics*" downloaded from en.wikibooks.org dated Mar. 15, 2015, and in a book authored by Owen Bishop entitled: "*Electronics—Circuits and Systems*" Fourth Edition, published 2011 by Elsevier Ltd. [ISBN—978-0-08-096634-2], which are both incorporated in its entirety for all purposes as if fully set forth herein The transfer of digital data signals between two devices, systems, or components, commonly makes use of a line driver for transmitting the signal to the conductors serving as the transmission medium connecting the two modules, and a line receiver for receiving the transmitted signal from the transmission medium. The communication may use a proprietary interface or preferably an industry standard, which typically defines the electrical signal characteristics such as voltage level, signaling rate, timing and slew rate of signals, voltage withstanding levels, short-circuit behavior, and maximum load capacitance. Further, the industry standard may define the interface mechanical characteristics such as the pluggable connectors, and pin identification and pin-out. In one example, the module circuit can use an industry or other standard used for interfacing serial binary data signals. Preferably the line drivers and line receivers and their associated circuitry will be protected against electrostatic discharge (ESD), electromagnetic interference (EMI/EMC), and against faults (fault-protected), and employs proper termination, failsafe scheme, and supports live insertion. Preferably, a point-to-point connection scheme is used, wherein a single line driver is communicating with a single line receiver. However, multi-drop or multi-point configurations may as well be used. Further, the line driver and the line receiver may be integrated into a single IC (Integrated Circuit), commonly known as transceiver IC.

A line driver typically converts the logic levels used by the module internal digital logic circuits (e.g., CMOS, TTL, LSTTL and HCMOS) to a signal to be transmitted. In order to improve the common-mode noise rejection capability, and to allow higher data rates, a balanced and differential interface may be used. For example, a balanced interface line driver may be an RS-422 driver such as RS-422 transmitter MAX3030E, available from Maxim Integrated Products, Inc. of Sunnyvale, California, U.S.A., described in the data sheet "±15 *kV ESD-Protected,* 3.3*V Quad RS*-422 *Transmitters*" publication number 19-2671 Rev.0 10/02, which is incorporated in its entirety for all purposes as if fully set forth herein. A line receiver typically converts the received signal to the logic levels used by the module internal digital logic circuits (e.g., CMOS, TTL, LSTTL and HCMOS). For example, industry standard TIA/EIA-422 (a.k.a. RS-422) can be used for a connection, and the line receiver may be an RS-422 compliant line receiver, such as RS-422 receiver MAX3095, available from Maxim Integrated Products, Inc. of Sunnyvale, California, U.S.A., described in the data sheet "±15 *kV ESD-Protected,* 10 *Mbps,* 3*V*/5*V, Quad RS*-422/*RS*-485 *Receivers*" publication number 19-0498 Rev.1 10/00, which is incorporated in its entirety for all purposes as if fully set forth herein. American national standard ANSI/TIA/EIA-422-B (formerly RS-422) and its international equivalent ITU-T Recommendation V.11 (also known as X.27), are technical standards that specify the "electrical characteristics of the balanced voltage digital interface circuit". These technical standards provide for data transmission, using balanced or differential signaling, with unidirectional/non-reversible, terminated or non-terminated transmission lines, point to point. Overview of the RS-422 standard can be found in National Semiconductor Application Note 1031 publication AN012598 dated January 2000 and titled: "*TIA/EIA*-422-*B Overview*" and in B&B Electronics publication "*RS*-422 *and RS*-485 *Application Note*" dated June 2006, which are incorporated in their entirety for all purposes as if fully set forth herein.

A transmission scheme may be based on, or compatible with, the serial binary digital data standard Electronic Industries Association (EIA) and Telecommunications Industry Association (TIA) EIA/TIA-232, also known as Recommended Standard RS-232 and ITU-T (The Telecommunication Standardization Sector (ITU-T) of the International Telecommunication Union (ITU)) V.24 (formerly known as CCITT Standard V.24). Similarly, RS-423 based serial signaling standard may be used. For example, RS-232 transceiver MAX202E may be used, available from Maxim Integrated Products, Inc. of Sunnyvale, California, U.S.A., described in the data sheet "±12 *kV ESD-Protected,* +5*V RS*-232 *Transceivers*" publication number 19-0175 Rev.6 3/05, which is incorporated in its entirety for all purposes as if fully set forth herein.

A 2-way communication interface may use the EIA/TIA-485 (formerly RS-485), which supports balanced signaling and multipoint/multi-drop wiring configurations. Overview of the RS-422 standard can be found in National Semiconductor Application Note 1057 publication AN012882 dated October 1996 and titled: "*Ten ways to Bulletproof RS*-485 *Interfaces*", which is incorporated in their entirety for all purposes as if fully set forth herein. In this case, RS-485 supporting line receivers and line driver are used, such as for example, RS-485 transceiver MAX3080 may be used, available from Maxim Integrated Products, Inc. of Sunnyvale, California, U.S.A., described in the data sheet "*Fail-Safe, High-Speed* (10 *Mbps*), *Slew-Rate-Limited RS*-485/*RS*-422 *Transceivers*" publication number 19-1138 Rev.3 12/05, which is incorporated in its entirety for all purposes as if fully set forth herein.

SPI/$I^2C$. $I^2C$ (Inter-Integrated Circuit), is a multi-master, multi-slave, single-ended, serial computer bus, typically used for attaching lower-speed peripheral ICs to processors and microcontrollers. PC uses only two bidirectional open-drain lines, Serial Data Line (SDA) and Serial Clock Line (SCL), pulled up with resistors. Typical voltages used are +5 V or +3.3 V although systems with other voltages are permitted. The PC reference design has a 7-bit or a 10-bit (depending on the device used) address space, and common PC bus speeds are the 100 kbit/s standard mode and the 10 kbit/s low-speed mode, but arbitrarily low clock frequencies are also allowed. Recent revisions of PC can host more nodes and run at faster speeds (400 kbit/s Fast mode, 1 Mbit/s Fast mode plus or Fm+, and 3.4 Mbit/s High Speed mode).

The bus uses a clock (SCL) and data (SDA) lines with 7-bit addressing, and has two roles for nodes: master and slave, where master node is a node that generates the clock and initiates communication with slaves, and a slave node is a node that receives the clock and responds when addressed by the master. The bus is a multi-master bus which means, any number of master nodes can be present. Additionally, master and slave roles may be changed between messages (after a STOP is sent). There may be four potential modes of operation for a given bus device, although most devices only use a single role and its two modes: 'master transmit': master node is sending data to a slave, 'master receive': master node is receiving data from a slave, 'slave transmit': slave node is sending data to the master, and 'slave receive': slave node is receiving data from the master. The master is initially in master transmit mode by sending a start bit followed by the 7-bit address of the slave it wishes to communicate with, which is finally followed by a single bit representing whether it wishes to write(0) to or read(1) from the slave. The $I^2C$ is described in NXP Semiconductors N.V. user manual document Number UM10204 Rev. 6 released 4 Apr. 2014, entitled: "*UM10204—$I^2C$-bus specification and user manual*", which is incorporated in its entirety for all purposes as if fully set forth herein.

A Serial Peripheral Interface (SPI) bus is a synchronous serial communication interface specification used for short distance communication, primarily in embedded systems, such as for directly connecting components to a processor. SPI devices communicate in full duplex mode using a master-slave architecture with a single master, where the master device originates the frame for reading and writing, and multiple slave devices are supported through selection with individual slave select (SS) lines. Also known as a 'four-wire serial bus', the SPI bus specifies four logic signals: SCLK: Serial Clock (output from master), MOSI: Master Output, Slave Input (output from master), MISO: Master Input, Slave Output (output from slave), and SS: Slave Select (active low, output from master). SPI and $I^2C$ buses are described in Renesas Application Note AN0303011/Rev1.00 (September 2003) entitled: "*Serial Peripheral Interface* (*SPI*) & *Inter-IC* (*IC*2) (*SPI_I2C*)", in CES 466 presentation (downloaded 7/2015) entitled: "*Serial Peripheral Interface*", in Embedded Systems and Systems Software 55:036 presentation (downloaded 7/2015) entitled: "*Serial Interconnect Buses—$I^2C$* (*SMB*) *and SPI*", and in Microchip presentation (downloaded 7/2015) entitled: "*SPI™—Overview and Use of the PICmicro Serial Peripheral Interface*", which are all incorporated in their entirety for all purposes as if fully set forth herein.

GPIO. General-Purpose Input/Output (GPIO) is a generic pin on an integrated circuit whose behavior, including whether it is an input or output pin, can be controlled by the user at run-time. GPIO pins have no special purpose defined, and go unused by default, so that the system integrator building a full system that uses the chip may have a handful of additional digital control lines, and having these available from the chip can avoid the effort of having to arrange additional circuitry to provide them.

Bus. The connection of peripherals and memories, such as HDD, to a processor may be via a bus. A communication link (such as Ethernet, or any other LAN, PAN or WAN communication link) may also be regarded as bus herein. A bus may be an internal bus (a.k.a. local bus), primarily designed to connect a processor or CPU to peripherals inside a computer system enclosure, such as connecting components over the motherboard or backplane. Alternatively, a bus may be an external bus, primarily intended for connecting the processor or the motherboard to devices and peripherals external to the computer system enclosure. Some buses may be doubly used as internal or as external buses. A bus may be of parallel type, where each word (address or data) is carried in parallel over multiple electrical conductors or wires; or alternatively, may be bit-serial, where bits are carried sequentially, such as one bit at a time. A bus may support multiple serial links or lanes, aggregated or bonded for higher bit-rate transport. Non-limiting examples of internal parallel buses include ISA (Industry Standard architecture); EISA (Extended ISA); NuBus (IEEE 1196); PATA—Parallel ATA (Advanced Technology Attachment) variants such as IDE, EIDE, ATAPI, SBus (IEEE 1496), VESA Local Bus (VLB), PCI and PC/104 variants (PC/104, PC/104 Plus, and PC/104 Express). Non-limiting examples of internal serial buses include PCIe (PCI Express), Serial ATA (SATA), SMBus, and Serial Peripheral Bus (SPI) bus. Non-limiting examples of external parallel buses include MITI (HIgh Performance Parallel Interface), IEEE-1284 ('Centronix'), IEEE-488 (a.k.a. GPIB—General Purpose Interface Bus) and PC Card/PCMCIA. Non-limiting examples of external serial buses include USB (Universal Serial Bus), eSATA and IEEE 1394 (a.k.a. Firewire). Non-limiting examples of buses that can be internal or external are Futurebus, InfiniBand, SCSI (Small Computer System Interface), and SAS (Serial Attached SCSI).

The bus medium may be based on electrical conductors, commonly copper wires based cable (may be arranged as twisted-pairs) or a fiber-optic cable. The bus topology may use point-to-point, multi-drop (electrical parallel) and daisy-chain, and may further be based on hubs or switches. A point-to-point bus may be full-duplex, providing simultaneous, two-way transmission (and sometimes independent) in both directions, or alternatively a bus may be half-duplex, where the transmission can be in either direction, but only in one direction at a time. Buses are further commonly characterized by their throughput (data bit-rate), signaling rate, medium length, connectors, and medium types, latency, scalability, quality-of-service, devices per connection or channel, and supported bus-width. A configuration of a bus for a specific environment may be automatic (hardware or software based, or both), or may involve user or installer activities such as software settings or jumpers. Recent buses are self-repairable, where a spare connection (net) is provided which is used in the event of a malfunction in a connection. Some buses support hot-plugging (sometimes known as hot swapping), where a connection or a replacement can be made, without significant interruption to the system, or without the need to shut-off any power. A well-known example of this functionality is the Universal Serial Bus (USB) that allows users to add or remove peripheral components such as a mouse, keyboard, or printer.

A bus may be defined to carry a power signal, either in separate dedicated cable (using separate and dedicated connectors), or commonly over the same cable carrying the digital data (using the same connector). Typically, dedicated wires in the cable are used for carrying a low-level DC power level, such as 3.3 VDC, 5 VDC, 12 VDC and any combination thereof. A bus may support master/slave configuration, where one connected node is typically a bus master (e.g., the processor or the processor-side), and other nodes (or node) are bussed slaves. A slave may not connect or transmit to the bus until given permission by the bus master. A bus timing, strobing, synchronization, or clocking information may be carried as a separate signal (e.g., clock signal) over a dedicated channel, such as separate and dedicated wired in a cable, or alternatively may use embedded clocking (a.k.a. self-clocking), where the timing information is encoded with the data signal, commonly used in line codes such as Manchester code, where the clock information occurs at the transition points. Any bus or connection herein may use proprietary specifications, or preferably be similar to, based on, substantially according to, or fully compliant with, an industry standard (or any variant thereof) such as those referred to as PCI Express, SAS, SATA, SCSI, PATA, InfiniBand, USB, PCI, PCI-X, AGP, Thunderbolt, IEEE 1394, FireWire, and Fibre-Channel.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi, and mobile broadband access. In addition to telephony, the Smartphones may support a wide variety of other services such as text messaging, MMS, email, Internet access, short-range wireless communications (infrared, Bluetooth), business applications, gaming and photography.

An example of a contemporary smartphone is model iPhone 6 available from Apple Inc., headquartered in Cupertino, California, U.S.A. and described in iPhone 6 technical specification (retrieved 10/2015 from www.apple.com/iphone-6/specs/), and in a User Guide dated 2015 (019-00155/2015-06) by Apple Inc. entitled: "*iPhone User Guide For iOS* 8.4 *Software*", which are both incorporated in their entirety for all purposes as if fully set forth herein. Another example of a smartphone is Samsung Galaxy S6 available from Samsung Electronics headquartered in Suwon, South-Korea, described in the user manual numbered English (EU), 03/2015 (Rev. 1.0) entitled: "*SM-G925F SM-G925FQ SM-G*9251 *User Manual*" and having features and specification described in "*Galaxy S*6 *Edge—Technical Specification*" (retrieved 10/2015 from www.samsung.com/us/explore/galaxy-s-6-features-and-specs), which are both incorporated in their entirety for all purposes as if fully set forth herein.

A mobile operating system (also referred to as mobile OS), is an operating system that operates a smartphone, tablet, PDA, or another mobile device. Modem mobile operating systems combine the features of a personal computer operating system with other features, including a touchscreen, cellular, Bluetooth, Wi-Fi, GPS mobile navigation, camera, video camera, speech recognition, voice recorder, music player, near field communication and infrared blaster. Currently popular mobile OSs are Android, Symbian, Apple iOS, BlackBerry, MeeGo, Windows Phone, and Bada. Mobile devices with mobile communications capabilities (e.g. smartphones) typically contain two mobile operating systems—a main user-facing software platform is supplemented by a second low-level proprietary real-time operating system that operates the radio and other hardware.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions, for example, adjusting the screen from portrait to landscape depending on how the device is oriented, or allowing the user to steer a vehicle in a racing game by rotating the device by simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the homescreen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS OS is described in a publication entitled: "IOS Tutorial", downloaded from tutorialspoint.com on July 2014, which is incorporated in its entirety for all purposes as if fully set forth herein.

A portable range finder including a laser device is described in Patent Cooperation Treaty (PCT) International Publication Number WO 2004/036246 by Peter STEVRIN entitled: "Mobile Phone with Laser Range Finder", which is incorporated in its entirety for all purposes as if fully set forth herein. The portable range finder is preferably of LADER type (Laser Detection and Ranging), which can be compressed to take up only a very little space, for instance an integrated circuit, through which the range finder can be integrated with or connected to a portable handheld device, such as a mobile or handheld computer (PDA, Personal Digital Assistant) and use a display and keyboard at the mentioned portable handheld device for interaction between the user and the range finder.

A portable instrument or apparatus that includes a portable device and a rangefinder module is described in U.S. Patent Application Publication No. 2013/0335559 to Van Toorenburg et al. entitled: "Mobile Measurement Devices, Instruments and Methods", which is incorporated in its entirety for all purposes as if fully set forth herein. The rangefinder module can be attached to the portable device, which may be any suitable smartphone, tablet or other consumer electronics device having a camera. By suitable alignment of the rangefinder and camera, the device is capable of capturing accurate data over significant ranges, including for example an image of a target together with position information concerning the target.

A laser rangefinding module for cable connected and/or wireless operative association with smartphones and tablet computers is described in U.S. Patent Application Publication No. 2013/0271744 to Miller et al. entitled: "Laser rangefinder module for operative association with smartphones and tablet computers", which is incorporated in its entirety for all purposes as if fully set forth herein. In a particular embodiment of the present invention disclosed herein, the operation of the laser rangefinder module is controlled by the smartphone or tablet computer and functions through the smartphone touchscreen with the laser rangefinder results being displayed on the smartphone display.

A wireless communication device includes a range finder, and is configured to obtain distance measurements via the range finder for processing by the device, is described in U.S. Patent Application Publication No. 2007/0030348 to Snyder entitled: "Wireless Communication Device with Range Finding Functions", which is incorporated in its entirety for all purposes as if fully set forth herein. Such processing may comprise, by way of example, storing distance measurement information, outputting distance measurement information on a display screen of the wireless communication device, transmitting distance information to a wireless communication network, or outputting tones, pulses, or vibrations as a function of the distance measurement information. The wireless communication device may include a camera, and the range finder may be aligned with the camera, such that related distance information may be obtained for objects imaged by the camera.

Filter. A Low-Pass Filter (LPF) is a filter that passes signals with a frequency lower than a certain cutoff frequency and attenuates signals with frequencies higher than the cutoff frequency. The amount of attenuation for each frequency depends on the filter design. The LPF is also referred to as a high-cut filter, or treble-cut filter in audio applications. An LPF may be a simple first-order electronic high-pass filter that typically includes a series combination of a capacitor and a resistor and uses the voltage across the capacitor as an output. The capacitor exhibits reactance, and blocks low-frequency signals, forcing them through the load instead. At higher frequency, the reactance drops, and the capacitor effectively functions as a short circuit. Alternatively or in addition, the LPF may use an active electronic implementation of a first-order low-pass filter by using an operational amplifier. An LPF may equally be a second- or third-order, and may be passive or active.

A High Pass Filter (HPF) is a circuit or component that passes signals with a frequency higher than a certain cutoff frequency and attenuates signals with frequencies lower than the cutoff frequency, where the amount of attenuation for each frequency depends on the filter design. An HPF may be a simple first-order electronic high-pass filter that typically includes a series combination of a capacitor and a resistor and using the voltage across the resistor as an output. Alternatively or in addition, the HPF may use an active electronic implementation of a first-order high-pass filter by using an operational amplifier. An HPF may equally be a second- or third-order, and may be passive or active. A Band-Pass Filter (BPF) is a combination of a low-pass and a high-pass filter.

A spirit level, bubble level or simply a level is an instrument designed to indicate whether a surface is horizontal (level) or vertical (plumb). Different types of spirit levels may be used by carpenters, stonemasons, bricklayers, other building trades workers, surveyors, millwrights and other metalworkers, and in some photographic or videographic work, and typically involves a sealed glass tube containing alcohol and an air bubble. Early spirit levels had very slightly curved glass vials with constant inner diameter at each viewing point. These vials are incompletely filled with a liquid, usually a colored spirit or alcohol, leaving a bubble in the tube. They have a slight upward curve, so that the bubble naturally rests in the center, the highest point. At slight inclinations, the bubble travels away from the marked center position. Where a spirit level must also be usable upside-down or on its side, the curved constant-diameter tube is replaced by an uncurved barrel-shaped tube with a slightly larger diameter in its middle.

Alcohols such as ethanol are often used rather than water, since alcohols have low viscosity and surface tension, which allows the bubble to travel the tube quickly and settle accurately with minimal interference with the glass surface. Alcohols also have a much wider liquid temperature range, and are less susceptible to break the vial as water could due to ice expansion. A colorant such as fluorescein, typically yellow or green, may be added to increase the visibility of the bubble. An extension of the spirit level is the bull's eye level: a circular, flat-bottomed device with the liquid under a slightly convex glass face with a circle at the center. It serves to level a surface across a plane, while the tubular level only does so in the direction of the tube.

Tilting level, dumpy level, or automatic level are terms used to refer to types of leveling instruments as used in surveying to measure height differences over larger distances. It has a spirit level mounted on a telescope (perhaps 30 power) with cross-hairs, itself mounted on a tripod. The observer reads height values off two graduated vertical rods, one 'behind' and one 'in front', to obtain the height difference between the ground points on which the rods are resting. Starting from a point with a known elevation and going cross country (successive points being perhaps 100 meters (328 ft) apart) height differences can be measured cumulatively over long distances and elevations can be calculated. Precise leveling is supposed to give the difference in elevation between two points one kilometer (0.62 miles) apart correct to within a few millimeters.

A traditional carpenter's spirit level looks like a short plank of wood and often has a wide body to ensure stability, and that the surface is being measured correctly. In the middle of the spirit level is a small window where the bubble and the tube is mounted. Two notches (or rings) designate where the bubble should be if the surface is levelled. Often an indicator for a 45 degree inclination is included. A line level is a level designed to hang on a builder's string line. The body of the level incorporates small hooks to allow it to attach and hang from the string line. The body is lightweight, so as not to weigh down the string line, it is also small in size as the string line in effect becomes the body; when the level is hung in the center of the string, each leg of the string line extends the levels plane.

Digital levels are increasingly common in replacing conventional spirit levels particularly in civil engineering applications, such as building construction and steel structure erection, for on-site angle alignment and leveling tasks. The industry practitioners often refer those leveling tool as "construction level", "heavy duty level", "inclinometer", or "protractor". These modern electronic levels are (i) capable of displaying precise numeric angles within 360° with high accuracy, (ii) digital readings can be read from a distance with clarity, (iii) affordable price resulted from mass adoption, providing advantages that the traditional levels are unable to match. Typically, these features enable steel beam frames under construction to be precisely aligned and levelled to the required orientation, which is vital to effectively ensure the stability, strength, and rigidity of steel structures on sites. Digital levels, embedded with angular MEMS technology effectively improve productivity and quality of many modern civil structures used by on-site constructions workers. Some of the recent models are even designed with waterproof IP65 and impact resistance features to meet the stringent working environment of the industry.

Inclinometer. An inclinometer or clinometer is an instrument for measuring angles of slope (or tilt), elevation or depression of an object with respect to gravity. It is also known as a tilt meter, tilt indicator, slope alert, slope gauge, gradient meter, gradiometer, level gauge, level meter, declinometer, and pitch & roll indicator. Clinometers measure both inclines (positive slopes, as seen by an observer looking upwards) and declines (negative slopes, as seen by an observer looking downward) using three different units of measure: degrees, percent, and topo. Astrolabes are inclinometers that were used for navigation and locating astronomical objects from ancient times to the Renaissance.

Tilt sensors and inclinometers generate an artificial horizon and measure angular tilt with respect to this horizon. They are used in cameras, aircraft flight controls, automobile security systems, and specialty switches and are also used for platform leveling, boom angle indication, and in other applications requiring measurement of tilt. Common implementations of tilt sensors and inclinometers are accelerometer, Liquid Capacitive, electrolytic, gas bubble in liquid, and pendulum.

Traditional spirit levels and pendulum-based electronic leveling instruments are usually constrained by only single-axis and narrow tilt measurement range. However, most precision leveling, angle measurement, alignment and surface flatness profiling tasks essentially involve a 2-dimensional surface plane angle rather than two independent orthogonal single-axis objects. 2-Axis inclinometers that are built with MEMS tilt sensors provides simultaneous 2-dimensional angle readings of a surface plane tangent to earth datum.

2-Axis Digital Inclinometer. 2-axis MEMS technology enables simultaneous two-dimensional (X-Y plane) tilt angles (i.e. pitch & roll) measurement, eliminates tedious trial-and-error (i.e. going back-and-forth) experienced when using single-axis levels to adjust machine footings to attain a precise leveling position. 2-axis MEMS inclinometers can be digitally compensated and precisely calibrated for non-linearity for operating temperature variation resulting in higher angular accuracy over wider angular measurement range. 2-axis MEMS inclinometer with built-in accelerometer sensors may generate numerical data tabulated in the form of vibration profiles that enable machine installer to track and assess alignment quality in real-time and verify structure positional stability by comparing machine's leveling profiles before and after setting up.

Rotary actuator. A rotary actuator is an actuator that produces a rotary motion or torque. The most common actuators though are electrically powered. The motion produced by an actuator may be either continuous rotation, as for an electric motor, or movement to a fixed angular position as for servomotors and stepper motors. A further form, the torque motor, does not necessarily produce any rotation but merely generates a precise torque which then either causes rotation, or is balanced by some opposing torque. Stepper motors are a form of electric motor that has the ability to move in discrete steps of a fixed size. This can be used either to produce continuous rotation at a controlled speed or to move by a controlled angular amount. If the stepper is combined with either a position encoder or at least a single datum sensor at the zero position, it is possible to move the motor to any angular position and so to act as a rotary actuator. A servomotor is a packaged combination of several components: a motor (usually electric, although fluid power motors may also be used), a gear train to reduce the many rotations of the motor to a higher torque rotation, a position encoder that identifies the position of the output shaft and an inbuilt control system. The input control signal to the servo indicates the desired output position. Any difference between the position commanded and the position of the encoder gives rise to an error signal that causes the motor and geartrain to rotate until the encoder reflects a position matching that commanded.

Stepper motor. A stepper motor (a.k.a. step motor or stepping motor) is a brushless DC electric motor that divides a full rotation into a number of equal steps. A stepper motor is typically an electromagnetic device that converts digital pulses into mechanical shaft rotation. Advantages of step motors are low cost, high reliability, high torque at low speeds and a simple, rugged construction that operates in almost any environment. The main disadvantages in using a stepper motor is the resonance effect often exhibited at low speeds and decreasing torque with increasing speed. The motor's position can then be commanded to move and hold at one of these steps without any feedback sensor (an open-loop controller), as long as the motor is carefully sized to the application in respect to torque and speed. DC brushed motors rotate continuously when DC voltage is applied to their terminals. The stepper motor is known by its property to convert a train of input pulses (typically square wave pulses) into a precisely defined increment in the shaft position. Each pulse moves the shaft through a fixed angle. Stepper motors effectively have multiple "toothed" electromagnets arranged around a central gear-shaped piece of iron. The electromagnets are energized by an external driver circuit or a micro controller. To make the motor shaft turn, first, one electromagnet is given power, which magnetically attracts the gear's teeth. When the gear's teeth are aligned to the first electromagnet, they are slightly offset from the next electromagnet. This means that when the next electromagnet is turned on and the first is turned off, the gear rotates slightly to align with the next one. From there the process is repeated. Each of those rotations is called a "step", with an integer number of steps making a full rotation. In that way, the motor can be turned by a precise angle.

Stepper motor systems are described in AMS—Advanced Micro Systems, Inc.—Precision Step Motor Control and Drive Products publication (Rev. 5/2010) entitled: "Stepper Motor System Basics", which is incorporated in its entirety for all purposes as if fully set forth herein. Various aspects of stepper motors are standardized as part of US National Electrical Manufacturers Association (NEMA) Standards Publication ICS 16 published 2001 entitled: "*Industrial Control and Systems—Motion/Position Control Motors, Controls, and Feedback Devices*", which is incorporated in its entirety for all purposes as if fully set forth herein. Examples of step motors are described in Superior Electric—Danaher Motion Gmbh & Co. KG catalog published 2003 (SP-20,000-08/2003, SUP-01-01-S100) entitled: "*STEP MOTORS*", and in Schneider Electric Motion USA 2012 catalog REV060512 entitled: "*Stepper Motors*—1.8° 2-*phase stepper motors*", which are both incorporated in their entirety for all purposes as if fully set forth herein.

There are three main types of stepper motors: (α) Permanent magnet stepper that uses a permanent magnet (PM) in the rotor and operate on the attraction or repulsion between the rotor PM and the stator electromagnets, (b) Variable Reluctance (VR) stepper that has a plain iron rotor and operate based on the principle that minimum reluctance occurs with minimum gap, hence the rotor points are attracted toward the stator magnet poles, and (c) Hybrid synchronous stepper.

There are two basic winding arrangements for the electromagnetic coils in a two-phase stepper motor: bipolar and unipolar. A unipolar stepper motor has one winding with center tap per phase. Each section of windings is switched on for each direction of magnetic field. Since in this arrangement a magnetic pole can be reversed without switching the direction of current, the commutation circuit can be made very simple (e.g., a single transistor) for each winding. Bipolar motors have a single winding per phase. The current in a winding needs to be reversed in order to reverse a magnetic pole, so the driving circuit must be more complicated, typically with an H-bridge arrangement.

Stepper motor driver. Stepper motor performance is strongly dependent on the driver circuit. Torque curves may be extended to greater speeds if the stator poles can be reversed more quickly, the limiting factor being the winding inductance. To overcome the inductance and switch the windings quickly, one must increase the drive voltage. This leads further to the necessity of limiting the current that these high voltages may otherwise induce. The driver (or amplifier) converts the indexer command signals into the power necessary to energize the motor windings. There are numerous types of drivers, with different voltage and current ratings and construction technology. Not all drivers are suitable to run all motors, so when designing a motion control system the driver selection process is critical.

L/R driver circuits, also referred to as constant voltage drives, use a constant positive or negative voltage applied to each winding to set the step positions. However, the winding current (not the voltage) applies torque to the stepper motor shaft. With an L/R drive, it is possible to control a low voltage resistive motor with a higher voltage drive simply by adding an external resistor in series with each winding. This will waste power in the resistors, and generate heat. Chopper drive circuits, also referred to as constant current drives, generate a somewhat constant current in each winding rather than applying a constant voltage. On each new step, a very high voltage is applied to the winding initially. When the current exceeds a specified current limit, the voltage is turned off or "chopped", typically using power transistors. When the winding current drops below the specified limit, the voltage is turned on again. In this way, the current is held relatively constant for a particular step position. This requires additional electronics to sense winding currents, and control the switching, but it allows stepper motors to be driven with higher torque at higher speeds than L/R drives. Integrated electronics for this purpose are widely available.

Servo motor (or servomotor). A servomotor is a rotary actuator or linear actuator that allows for precise control of angular or linear position, velocity and acceleration, and typically consists of a suitable motor coupled to a sensor for position feedback. It commonly requires a relatively sophisticated controller, often a dedicated module designed specifically for use with servomotors. A servomotor is commonly a closed-loop servomechanism that uses position feedback to control its motion and final position. The input to its control is some signal, either analogue or digital, representing the position commanded for the output shaft. The motor is typically paired with some type of encoder to provide position and speed feedback. In the simplest case, only the position is measured. The measured position of the output is compared to the command position, the external input to the controller. If the output position differs from that required, an error signal is generated which then causes the motor to rotate in either direction, as needed to bring the output shaft to the appropriate position. As the positions approach, the error signal reduces to zero and the motor stops. The simple servomotors use position-only sensing via a potentiometer and bang-bang control of their motor, and the motor always rotates at full speed (or is stopped). Other servomotors use optical rotary encoders to measure the speed of the output shaft and a variable-speed drive to control the motor speed. Both of these enhancements, usually in combination with a PID control algorithm, allow the servomotor to be brought to its commanded position more quickly and more precisely, with less overshooting.

Servomotor control is described in Nippon Pulse Motor Co., Ltd. (NPM) publication (downloaded 8/2016) entitled: "*Basic of servomotor control*", which is incorporated in its entirety for all purposes as if fully set forth herein. Examples of servomotors are described in Kinavo Servo Motor (Changzhou) Limited Product Manual (downloaded 8/2016) entitled: "SMH Servo Motor—Product Manual", and in Moog Inc. catalog (PIM/Rev. A May 2014, id. CDL40873-en) entitled: "*Compact Dynamic Brushless Servo Motors—CD Series*", which are both incorporated in their entirety for all purposes as if fully set forth herein.

Simple servomotors may use resistive potentiometers as their position encoder. These are only used at the very simplest and cheapest level, and are in close competition with stepper motors. They suffer from wear and electrical noise in the potentiometer track. Although it would be possible to electrically differentiate their position signal to obtain a speed signal, PID controllers that can make use of such a speed signal generally warrant a more precise encoder. Modern servomotors use rotary encoders, either absolute or incremental. Absolute encoders can determine their position at power-on, but are more complicated and expensive. Incremental encoders are simpler, cheaper and work at faster speeds. Incremental systems, like stepper motors, often combine their inherent ability to measure intervals of rotation with a simple zero-position sensor to set their position at start-up.

The type of motor is not critical to a servomotor and different types may be used. At the simplest, brushed permanent magnet DC motors are used, owing to their simplicity and low cost. Small industrial servomotors are typically electronically commutated brushless motors. For large industrial servomotors, AC induction motors are typically used, often with variable frequency drives to allow control of their speed. For ultimate performance in a compact package, brushless AC motors with permanent magnet fields are used, effectively large versions of Brushless DC electric motors.

Drive modules for servomotors are a standard industrial component. Their design is a branch of power electronics, usually based on a three-phase MOSFET H bridge. These standard modules accept a single direction and pulse count (rotation distance) as input. They may also include over-temperature monitoring, over-torque and stall detection features. As the encoder type, gearhead ratio and overall system dynamics are application specific, it is more difficult to produce the overall controller as an off-the-shelf module and so these are often implemented as part of the main controller. Most modern servomotors are designed and supplied around a dedicated controller module from the same manufacturer. Controllers may also be developed around microcontrollers in order to reduce cost for large-volume applications A portable distance measuring device that works by spanning separately targeted endpoints is described in U.S. Pat. No. 8,717,579 to Portegys entitled: "Distance Measuring Device Using a Method of Spanning Separately Targeted Endpoints", which is incorporated in its entirety for all purposes as if fully set forth herein. The device contains a laser distance measuring component and sensing components that track changes in position and orientation of the device, such as accelerometers and gyroscopes. Distance is measured by pointing the laser at an endpoint and measuring the distance to it. Once this measurement is confirmed, the device can be moved to a different vantage location to measure a second endpoint with the laser. The orientation and position of the device for the second distance measurement relative to the first measurement are calculated by the position and orientation sensors. Together these values are sufficient to calculate the distance spanning the endpoints. This calculation is performed by a computer contained in the device and the distance displayed to the user.

A system having two or more sensors is described in U.S. Patent Application Publication No. 2007/0241955 to Brosche entitled: "System Having Two or More Sensors", which is incorporated in its entirety for all purposes as if fully set forth herein. Each sensor has a transmitter and a receiver for signals, a sensor being able to receive a cross echo signal of another sensor. The sensors are also able to receive and evaluate the signals reflected by the other sensor without mutual interference, the sensors being decoupled from one another. In the receive mode, the sensors are temporally separated by the time delay of the transmission and reception signals.

A device for measuring distances between measuring points is described in Patent Cooperation Treaty (PCT) International Publication Number WO 2005/029123 by Jens P. BRODERSEN entitled: "Device for Measuring Distances Between Measuring Points", which is incorporated in its entirety for all purposes as if fully set forth herein. The device comprising a first measuring unit for directing a test signal onto a first measuring point and a second measuring unit for directing a test signal onto a second measuring point. According to the invention, a first optical marking means is allocated to the first measuring unit while a second optical marking means is assigned to the second measuring unit for marking the measuring points. The optical marking means are advantageously formed by lasers. The device makes it possible to simply and comfortably measure distances and determine areas or volumes.

Various distance measuring technologies, and a system and method for measuring a parameter of a target are described in U.S. Pat. No. 7,202,941 to Munro entitled: "Apparatus for High Accuracy Distance and Velocity Measurement and Methods Thereof", which is incorporated in its entirety for all purposes as if fully set forth herein. The method includes transmitting at least one signal towards a target and receiving at least a portion of the transmitted signal back from the target. The measured parameter is one of distance velocity, or reflectivity. The transmitted signal is of the coherent burst waveform, and upon reception is processed with equivalent time sampling, AGC with minimal or no error, and a discrete Fourier transform.

A laser distance measuring apparatus, for measuring the distance between objects existing in two directions at least as seen from the apparatus by using laser light, is described in U.S. Pat. No. 6,847,435 to Honda et al. entitled: "Laser Distance Measuring Apparatus", which is incorporated in its entirety for all purposes as if fully set forth herein. The apparatus comprises two projectors for projecting laser beams along a specified projection axis toward each one of the objects, a photo detector for receiving reflected light of projection from each object, a distance measurement processor for measuring the distance from a reference point of the apparatus to each object on the basis of the reception signal to the projection by the photo detector, and a distance calculation processor for calculating the distance between the objects on the basis of the distance data measured by the distance measurement processor and the angle formed by two projection axes, in which the projection axis by one projector is variable in angle with respect to the other projector. Therefore, the distance between objects can be measured easily and at high precision by one distance measuring operation only.

A measuring apparatus is described in U.S. Patent Application Publication No. 2009/0296072 to Kang entitled: "Measuring Apparatus", which is incorporated in its entirety for all purposes as if fully set forth herein. The apparatus is conveniently used without a support such as a tripod, and simply measures a relative distance between two arbitrary points, i.e. two arbitrary measurement target objects, without restriction as to the positions of the measurement target objects. Further, the measuring apparatus realizes a very simple measurement process, so that a user can have faith in the measured distance. The measuring apparatus allows first and second indicators to be easily oriented towards the two points that the user wants to measure using the manipulation of the first and second indicators.

A lateral distance hand-held measuring device is described in U.S. Patent Application Publication No. 2003/0218736 to Gogolla et al. entitled: "Optical Lateral Distance Hand-Held Measuring Device", which is incorporated in its entirety for all purposes as if fully set forth herein. The device having a computer unit, an input/output unit and a first laser distance measuring module transmitting a visible measurement laser beam. A second laser distance measuring module is provided, which transmits a second visible measurement laser beam and is mechanically and data-technically coupled with the first laser distance measuring module. The two measurement laser beams have a defined pivot angle ($\alpha$) relative to each other and known to the computer unit.

A Laser leveling tool is described in Great Britain Patent Publication GB2424071A entitled: "Laser Level Measuring Tool", which is incorporated in its entirety for all purposes as if fully set forth herein. The tool is used to measure the distance between two points on a surface by projecting two adjustable laser beams, one on either side of the tool, each an equal distance apart. The distance between the images can be varied, moving the projected images nearer together or further apart by adjusting the angle of the lens, with a rotary or digital switch, microprocessor and LED. At the point the laser images are projected, the laser beam passes through a weighted lens or microprocessor controlled electronic spirit level that splits the light in two ensuring that the resulting images are a true level when they meet the surface being measured. The tool also projects a third image downward and the angle of projection can be varied to set an accurate height measurement.

A device for measuring physical characteristics includes a beam generator component generating first and second beams at two points is described in U.S. Pat. No. 7,086,162 to Tyroler entitled: "Method and Apparatus for Distance Measurement", which is incorporated in its entirety for all purposes as if fully set forth herein. The device further includes a protractor that measures the angle between the beams. The device measures the distances to the two points and with the angle between the two beams, determines a predetermined characteristic, such as the distance between the two points.

A position measurement apparatus and method using laser includes a laser generating device, an image device, and a control unit, is described in U.S. Pat. No. 6,697,147 to Ko et al. entitled: "Position Measurement Apparatus and Method Using Laser", which is incorporated in its entirety for all purposes as if fully set forth herein. The laser-generating device generates three or more laser beams progressing in parallel with each other at regular intervals. The image device obtains a picture for three or more points formed on a target by the laser beams. The control unit calculates a position relative to the target using number of pixels between pairs of neighboring ones of the three or more points in the picture. Thus, the present invention is advantageous in that the laser pointers and a CCD camera having simple constructions and low prices are used, so that the position measurement apparatus is handled conveniently and is economical.

A handheld rangefinder device operable to determine ballistic hold-over information is disclosed in U.S. Pat. No. 8,081,298 to Cross entitled: "Handheld rangefinder operable to determine hold-over ballistic information", which is incorporated in its entirety for all purposes as if fully set forth herein. The rangefinder device generally includes a range sensor operable to determine a range to a target, a memory storing a database of ranges and corresponding hold-over values for a default sight-in distance, and a computing element, coupled with the range sensor and the memory. The computing element may calculate an adjusted hold-over value based on the range and an actual sight-in distance. Additionally, a tilt sensor may be included to provide information for calculating an angle-adjusted hold-over value. Such a configuration facilitates accurate firearm use by providing ranges and hold-over values without requiring time-consuming and manual user calculations Measurement of respective distances to two remote points and measurement of the included angle, permit electronic calculation of the distance between the two remote points such as points on the opposed edges of an interior wall the length or other linear dimension of which is to be measured, is described in U.S. Pat. No. 6,560,560 to Tachner entitled: "Apparatus and Method for Determining the Distance Between Two Points", which is incorporated in its entirety for all purposes as if fully set forth herein. The preferred embodiment is implemented using two laser-based pointer devices connected on a common housing through a shaft encoder. Each pointer device has a laser transmitter and a detector for determining the distance to selected points at opposite ends of a wall. The angle between the pointers is determined by a shaft encoder as one of the two pointers is rotated from pointing at a first edge of the wall to the point at the second edge while the other side of the pointers remains directed toward the first edge.

A lateral distance hand-held measuring device is described in U.S. Pat. No. 6,903,810 to Gogolla et al. entitled: "Optical Lateral Distance Hand-Held Measuring Device", which is incorporated in its entirety for all purposes as if fully set forth herein. The device is having a computer unit, an input/output unit and a first laser distance measuring module transmitting a visible measurement laser beam (I, II). A second laser distance-measuring module is provided, which transmits a second visible measurement laser beam (I, II) and is mechanically and data-technically coupled with the first laser distance measuring module. The two measurement laser beams (I, II) have a defined pivot angle ($\alpha$) relative to each other and known to the computer unit.

A multi-purpose carpentry-measuring device is described in U.S. Pat. No. 5,713,135 to Acopulos entitled: "Multi-Purpose Carpentry Measuring Device", which is incorporated in its entirety for all purposes as if fully set forth herein. The tool combines the functions of a framing square, level and plum bob in one function and with just one measurement. Further, the tool can also be used as a bevel gauge and a level bench marker. A foot and leg member, joined by a pivot, contain bubble tubes for all necessary horizontal and vertical level measurements. Extendible rules on both members further increase the usefulness of the device. The tool has a built-in magnetic disc and bar code reader for continuously displaying angular read out on an integral calculator. Laser pin lights at either end of the tool allow for laser precision in all level bench marker observations as may be facilitated by a positioning pin disposed in said device.

A device for measuring distance with a visible measuring beam generated by a semiconductor laser, a collimator object lens to collimate the measuring beam towards the optical axis of the collimator object lens, a radiation arrangement to modulate the measuring radiation, a reception object lens to receive and image the measuring beam reflected from a distant object on a receiver, a switchable beam deflection device to generate an internal reference path between the semiconductor laser and the receiver and an electronic evaluation device to find and display the distance measured from the object, is described in U.S. Pat. No. 5,815,251 to Ehbets et al. entitled: "Device for Distance Measurement", which is incorporated in its entirety for all purposes as if fully set forth herein. According to the invention, the receiver contains a light guide with a downstream opto-electronic transducer, in which the light guide inlet surface is arranged in the imaging plane of the reception object lens for long distances from the object and can be controllably moved from this position transversely to the optical axis. In an alternative embodiment, the light inlet surface is fixed and there are optical means outside the optical axis of the reception object lens, which for short object distances, deflect the imaging position of the measuring beam to the optical axis of the reception object lens. The measuring radiation is pulse modulated with excitation pulses with a pulse width of less than two nanoseconds.

An azimuth measurement apparatus is described in U.S. Pat. No. 7,528,774 to Kim et al. entitled: "Apparatus for Measuring Azimuth by Using Phase Difference and Method of Using the Same", which is incorporated in its entirety for all purposes as if fully set forth herein. The apparatus including: a positioning signal receiver receiving a first impulse positioning signal and a second impulse positioning signal from a first fixed position and a second fixed position, respectively; a phase difference detector detecting a phase difference between the first impulse positioning signal and the second impulse positioning signal; and an azimuth calculator measuring an azimuth of an object of positioning, based on the detected phase difference of the two positioning signals.

A handheld laser distance measuring device and extreme value measurement process is described in U.S. Pat. No. 7,199,866 to Gogolla et al. entitled: "Handheld Laser Distance Measuring Device with Extreme Value Measuring Process", which is incorporated in its entirety for all purposes as if fully set forth herein. The method including, in a first step, an input means is actuated that triggers a measurement sequence, during which, in a second step, individual distance measurements are made triggered by the handheld laser distance device and, in a third step, at least one minimum value or one maximum value relative to the measurement sequence is determined by the handheld laser distance measuring device using the individual measurements. An extreme value difference relative to the measurement sequence is computed by the handheld laser distance-measuring device using at least one minimum value and at least one maximum value.

A measuring system is described in U.S. Patent Application Publication No. 2015/0316374 to Winter entitled: "Measurement System Having Active Target Objects", which is incorporated in its entirety for all purposes as if fully set forth herein. The system including a laser measuring device emitting a search beam and a measurement beam, a first active target object having a first transmitting device for emitting a first visible transmission beam and a second active target object having a second transmitting device for emitting a second visible transmission beam, wherein the color of light of the second visible transmission beam differs from the color of light of the first visible transmission beam.

A laser rangefinder is utilized for detecting and displaying the distance user interests in is described in U.S. Patent Application Publication No. 2013/0077081 to LIN entitled: "Laser Rangefinder", which is incorporated in its entirety for all purposes as if fully set forth herein. The laser rangefinder has a range detector and an angle detector. Thus, the laser rangefinder is able to detect a distance between an object and the laser rangefinder and an oblique angle thereof. The laser rangefinder further has a microprocessor, which provides a horizontal distance according to the distance and the angle detected above. As such, the laser rangefinder can show up with the horizontal distance between the object and the laser rangefinder without disturbance of oblique thereof.

A distance-measuring instrument is described in Japanese Patent Publication No. JP61028812 to KUBOTA HIKARI et al. entitled: "MEASURING METHOD OF DISTANCE", which is incorporated in its entirety for all purposes as if fully set forth herein. The instrument is for enabling the rapid measurement of distance corresponding to variations of parameters, by applying two laser beams alternately to an object point, and by measuring a distance based on an angle of rotation determined from the coincidence of patterns of bit positions on a linear sensor. A distance-measuring instrument is constructed of two laser beam projectors, a linear sensor B, a computer CT, etc. An object point C is irradiated by a first laser beam OP, and a distance Lh is determined thereby as a position signal value (r) of the linear sensor B, which is stored in a memory means. Next, switching is made over to a second laser beam rotating through a rotational angle (r) around a basic point O' with a zero position O'P0 set as a reference, and the object point C is irradiated thereby at a rotational vector O'P0O'P'. An output of the linear sensor B thus obtained and a rotational angle output of a rotary encoder En are inputted to the computer CT to find a rotational angle epsilon, and the distance Lh is calculated therefrom. By this method, a distance can be measured rapidly corresponding to sharp variations of parameters.

A distance measuring method for easily measuring an accurate distance based on a simple theory is described in Japanese Patent Publication No. JP6109469A to TAGO MAKOTO entitled: "DISTANCE MEASURING METHOD", which is incorporated in its entirety for all purposes as if fully set forth herein. A laser beam emitted from one light source is split into two laser beams opened at a constant angle θ by the optical machinery provided at the spectral point in front of the light source and the spaced apart distance (h) between two laser beams at the measuring point present at a place separated from the spectral point is measured. The distance D between the spectral point and the measuring point is calculated from the spaced apart distance (h) and the angle θ on the basis of $D=h/\{2\tan(\theta/2)\}$.

A hand-held laser distance-measuring device is described in U.S. Patent Application Publication No. 2014/0016114 to Lopez et al. entitled: "Acoustic Method and Device for Distance Measurement", which is incorporated in its entirety for all purposes as if fully set forth herein. The device comprising at least one laser unit, which is configured to determine a first distance using a laser beam emitted in a first relative direction. The laser unit is further configured to determine at least one second distance, near instantaneously, using a laser beam emitted in at least one second relative direction, which differs from the first relative direction.

An acoustic method for measuring of a distance between an emitter of acoustic energy and a target object is described in U.S. Pat. No. 6,836,449 to Raykhman et al. entitled: "Acoustic Method and Device for Distance Measurement", which is incorporated in its entirety for all purposes as if fully set forth herein. The method provides for an accurate measurement by having the measurement's outcome invariant to the speed of sound variations along the acoustical path between the emitter and the target. A plurality of emitters and a plurality of receivers are used in the invention. One acoustic emitter and one receiver are located in a spatial region such that the sent and the reflected acoustical energy passes along substantially same vertical line between the emitter and the target. Another acoustic emitter sends the acoustical energy at an angled direction to the same area on the target's reflecting surface as the first emitter does. The corresponding echo travels to another receiver. During the measurement, two specific variables are being monitored such that possible variations of the speed of sound are irrelevant to the result of the distance measurement.

A laser distance-measuring device is described in U.S. Pat. No. 7,304,727 to Chien et al. entitled: "Laser Distance-Measuring Device", which is incorporated in its entirety for all purposes as if fully set forth herein. The device includes a laser-transmitting portion, a laser-receiving portion, a coupling portion, an inclination-measuring portion, a signal-processing portion, and a display. The laser-transmitting portion emits a laser beam, and the laser-receiving portion receives the laser beam. The coupling portion interconnects the laser-receiving portion and the signal-processing portion. The inclination-measuring portion detects an inclination angle of the laser beam. The signal-processing portion processes the signals received from the laser-receiving portion and the inclination-measuring portion and sends the result to the display. The display receives and displays the result of processing by the signal-processing portion.

A method for measuring a distance between two arbitrary points of interest from the user position by determining the range and angle between the two points is described in U.S. Pat. No. 7,796,782 to Motamedi et al. entitled: "Remote Distance-Measurement Between Any Two Arbitrary Points Using Laser Assisted Optics", which is incorporated in its entirety for all purposes as if fully set forth herein. To measure the angle between the two points, a first method uses a micro-opto-electro-mechanical scanner to form a scan line between the two points of interest. A scan angle is determined based on the applied AC voltage needed to cause the endpoints of the scan line to coincide with the points of interest. The second method, an image-processing method, is applied to determine the angles between the points of interest. A Microprocessor uses captured images including the points of interest to determine the angle between the points. In both methods, the Microprocessor calculates the distance between the two points of interest by using the determined angle, together with the measured ranges and sends the calculated distance to a display.

A method for measurement of a line (S), in particular, an optical distance measurement method, is described in U.S. Patent Application Publication No. 2008/0088817 to Skultety-Betz et al. entitled: "Method for the Measurement of the Length of a Line and Device for Carrying Out Said Method", which is incorporated in its entirety for all purposes as if fully set forth herein. An input means of a distance-measuring device is operated, which triggers a measuring sequence of distance measurements, during which individual measurements of distances from the distance-measuring device triggered by the distance-measuring device are carried out perpendicular (normal) to the line (s) for measurement. According to the invention, at least one maximum value and at least one minimum value of the distances are determined from the measuring sequence and the length of the line (s) determined from the at least one maximum value and the at least one minimum value. The invention further relates to a distance-measuring device, in particular, a hand-held measuring device for carrying out said method.

A distance-measuring device is described in U.S. Patent Application Publication No. 2005/0280802 to Liu entitled: "Distance Measuring Device with Laser Indicating Device", which is incorporated in its entirety for all purposes as if fully set forth herein. The device measures the distance to an object surface. The distance-measuring device includes a housing, a measuring signal projecting and detecting means, a laser-indicating device, a display, a circuit, a series of battery cells, a switch and plurality of operation buttons. The measuring signal projecting and detecting means emits a signal to an object surface and detects the reflected signal therefrom. The laser indicating device projects at least one laser beam onto a surface to form at least one visible reference line vertical to the direction in which said measuring signal is emitting, and the circuit calculates the distance between the laser beam and the object surface.

An optical angle detection apparatus where a single optical distance measurement unit is disposed opposite an object having a plane is described in U.S. Pat. No. 7,600,876 to Kurosu et al. entitled: "Optical Angle Detection Apparatus", which is incorporated in its entirety for all purposes as if fully set forth herein. The optical distance measurement unit includes a light projecting portion that projects a beam in the direction of an optical axis, and a light receiving portion that receives a beam reflected from a measurement position at which the optical axis intersects the plane and outputs a distance measurement signal indicating a distance to the measurement position. An optical axis deflector may be provided for deflecting the optical axis to switch the measurement position between a first measurement position and a second measurement position, so that first and second distance measurement signals corresponding to the first and second measurement positions are output from the optical distance measurement unit. A controller obtains respective distances to the first and second measurement positions based on the first and second distance measurement signals and calculates a tilt angle of the plane based on the obtained distances.

The term "processor" is used herein to include, but not limited to, any integrated circuit or any other electronic device (or collection of electronic devices) capable of performing an operation on at least one instruction, including, without limitation, a microprocessor (μP), a microcontroller (μC), a Digital Signal Processor (DSP), or any combination thereof. A processor may further be a Reduced Instruction Set Core (RISC) processor, a Complex Instruction Set Computing (CISC) microprocessor, a Microcontroller Unit (MCU), or a CISC-based Central Processing Unit (CPU). The hardware of the processor may be integrated onto a single substrate (e.g., silicon "die"), or distributed among two or more substrates.

A non-limiting example of a processor may be 80186 or 80188 available from Intel Corporation located at Santa Clara, California, USA. The 80186 and its detailed memory connections are described in the manual "80186/80188 *High-Integration* 16-*Bit Microprocessors*" by Intel Corporation, which is incorporated in its entirety for all purposes as if fully set forth herein. Other non-limiting example of a processor may be MC68360 available from Motorola Inc. located at Schaumburg, Illinois, USA. The MC68360 and its detailed memory connections are described in the manual "*MC*68360 *Quad Integrated Communications Controller—User's Manual*" by Motorola, Inc., which is incorporated in its entirety for all purposes as if fully set forth herein. While exampled above regarding an address bus having an 8-bit width, other widths of address buses are commonly used, such as the 16-bit, 32-bit and 64-bit. Similarly, while exampled above regarding a data bus having an 8-bit width, other widths of data buses are commonly used, such as 16-bit, 32-bit and 64-bit width. In one example, the processor consists of, comprises, or is part of, Tiva™ TM4C123GH6PM Microcontroller available from Texas Instruments Incorporated (Headquartered in Dallas, Texas, U.S.A.), described in a data sheet published 2015 by Texas Instruments Incorporated [DS-TM4C123GH6PM-15842.2741, SPMS376E, Revision 15842.2741 June 2014], entitled: "*Tiva™ TM4C123GH6PM Microcontroller—Data Sheet*", which is incorporated in its entirety for all purposes as if fully set forth herein, and is part of Texas Instrument's Tiva™ C Series microcontrollers family that provide designers a high-performance ARM® Cortex™-M-based architecture with a broad set of integration capabilities and a strong ecosystem of software and development tools. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions by integrating application-specific peripherals and providing a comprehensive library of software tools which minimize board costs and design-cycle time. Offering quicker time-to-market and cost savings, the Tiva™ C Series microcontrollers are the leading choice in high-performance 32-bit applications. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions.

In consideration of the foregoing, it would be an advancement in the art to provide a method or a system for accurately measuring or estimating a distance, an angle, a slope, or a parallelism, of a line, a surface, or a plane, or between lines, planes, or surfaces. Preferably, such methods or systems may be providing an improved, simple, automatic, secure, cost-effective, reliable, versatile, easy to install, use or monitor, has a minimum part count, portable, handheld, enclosed in a small or portable housing, minimum hardware, and/or using existing and available components, protocols, programs and applications, and providing a better user experience, for measuring various parameters such as a distance, an angle, a speed, an area, a volume, a parallelism, or any other spatial measurement relating to an object that may be stationary or moving.

SUMMARY

A device may be used for estimating a first angle (α) between a reference line defined by first and second points and a first surface or a first object. The device may comprise a first distance meter for measuring a first distance (d1) along a first line from the first point to the first surface or the first object; a second distance meter for measuring a second distance (d2) along a second line from the second point to the first surface or the first object; software and a processor for executing the software, the processor may be coupled to control or to receive the first and second distances (or representations thereof), respectively, from the first and second distance meters; a display coupled to the processor for visually displaying data from the processor; and a single enclosure housing the first and second distance meters, the processor, and the display. The first and second lines may be at least substantially parallel, and the device may be operative to calculate, by the processor, the estimated first angle (α) based on the first distance (d1) and the second distance (d2), and to display the estimated first angle (α) or a function thereof by the display.

The device may further comprise an antenna for transmitting and receiving first Radio-Frequency (RF) signals over the air; and a wireless transceiver coupled to the antenna for wirelessly transmitting and receiving first data over the air using a wireless network, the wireless transceiver may be coupled to be controlled by the processor. The device may be operative to send to the wireless network by the wireless transceiver via the antenna the first distance (d1) or any function or representation thereof, the second distance (d2) or any function or representation thereof, or the estimated first angle (α) or any function or representation thereof. The device may further be operative to calculate, by the processor, a distance (d) and to send to the wireless network by the wireless transceiver via the antenna according to, or based on, the distance (d) or a function thereof, where $d=(d1+d2)*\cos(\alpha)/2$, $d=(d1+d2)*\sin(\alpha)/2$, $d=c/\cos(\alpha)$, $d=(d1+d2)*\cos^2(\alpha)/(2*\sin(\alpha))$, or $d=(d1+d2)/(2*tg(\alpha))$. The angle between the first and the second lines may be less than 20°, 18°, 15°, 13°, 10°, 8°, 5°, 3°, 2°, 1°, 0.8°, 0.5°, 0.3°, 0.2°, or 0.1°. The first line or the second line may be perpendicular to, or substantially perpendicular to, a reference line defined by the first and second points, and the angle formed between the first line or the second line and the reference line may deviate from 90° by less than 20°, 18°, 15°, 13°, 10°, 8°, 5°, 3°, 2°, 1°, 0.8°, 0.5°, 0.3°, 0.2°, or 0.1°.

An apparatus may comprise first and second devices, each according to the above. The apparatus may further be operative to output or display a representation of an angle that may be based on, or a function of, the first angle (α) estimated by the first device and the first angle (α) estimated by the second device. The apparatus may further be operative to output or display a representation of a distance that may be based on, or may be a function of, the first and second distances measured by the first device and the first and second distances measured by the second device. The second device may be identical to, or different from, the first device. The apparatus may further be operative to concurrently measure the first angle of the first device by the first device and the first angle of the second device by the second device. The apparatus may further be operative to be in a first state or a second state, where in the first state the first angle of the first device may be measured by the first device and in the second state, the first angle of the second device may be measured by the second device.

Any single enclosure herein may be a hand-held enclosure or a portable enclosure, or may be a surface mountable enclosure. Any device or apparatus herein may further comprise a bipod or tripod. Any device or apparatus herein may further be integrated with at least one of a wireless device, a notebook computer, a laptop computer, a media player, a Digital Still Camera (DSC), a Digital video Camera (DVC or digital camcorder), a Personal Digital Assistant (PDA), a cellular telephone, a digital camera, a video recorder, a smartphone, or any combination thereof. The smartphone may consist of, comprise, or may be based on, Apple iPhone 6 or Samsung Galaxy S6.

Any software or firmware herein may comprise an operating system that may be a mobile operating system. The mobile operating system may consist of, may comprise, may be according to, or may be based on, Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

Any device or apparatus herein may comprise, for example, in the single enclosure, a first laser pointer for emitting a first visible laser beam substantially parallel to the first line. The first laser beam angular deviation from being parallel to the first line may be less than 20°, 18°, 15°, 13°, 10°, 8°, 5°, 3°, 2°, 1°, 0.8°, 0.5°, 0.3°, 0.2°, or 0.1°. The first laser beam may illuminate the first point, or may illuminate a location having a distance to the first point of less than 0.001%, 0.002%, 0.005%, 0.008%, 0.01%, 0.02%, 0.05%, 0.08%, 0.1%, 0.2%, 0.5%, 0.8%, 1%, 2%, 5%, 8%, 10%, 15%, of the first distance. The first laser pointer may comprise a visible light laser diode for generating the first laser beam and a collimator for focusing the generated first laser beam, and the first visible laser beam may be having a red, red-orange, blue, green, yellow, or violet color. Any device or apparatus herein may comprise, in a single enclosure, a second laser pointer for emitting a second visible laser beam substantially parallel to the second line, and the second laser beam angular deviation from being parallel to the second line may be less than 20°, 18°, 15°, 13°, 10°, 8°, 5°, 3°, 2°, 1°, 0.8°, 0.5°, 0.3°, 0.2°, or 0.1°. The second laser beam may illuminate the second point, or may illuminate a location having a distance to the second point of less than 0.001%, 0.002%, 0.005%, 0.008%, 0.01%, 0.02%, 0.05%, 0.08%, 0.1%, 0.2%, 0.5%, 0.8%, 1%, 2%, 5%, 8%, 10%, 15%, of the second distance. The second laser pointer may comprise a visible light laser diode for generating the second laser beam and a collimator for focusing the generated second laser beam, and the second visible laser beam may be having a red, red-orange, blue, green, yellow, or violet color.

Any device or apparatus herein may comprise, for example, in the single enclosure, a laser pointer for emitting a visible laser beam, and the laser pointer may be movable or rotatable for illuminating a point on the first surface or object. Further, any device or apparatus herein may comprise, for example, in the single enclosure, a motion actuator that may cause linear or rotary motion mechanically coupled or attached to the laser pointer for moving or rotating the visible laser beam.

Any motion actuator herein may consist of, or may comprise, an electrical motor, that may be a brushed motor, a brushless motor, a DC stepper motor, or an uncommutated DC motor. Any DC stepper motor herein may be a Permanent Magnet (PM) motor, a Variable reluctance (VR) motor, or a hybrid synchronous stepper motor, and the device may further comprise a stepper motor driver coupled between the stepper motor and the processor for rotating or moving the visible laser beam by the processor. Alternatively or in addition, any electrical motor herein may be a servo-motor, and the device may further comprise a servo motor driver coupled between the servo motor and the processor for rotating or moving the visible laser beam by the processor.

Any visible laser beam herein may be movable or rotatable in a plane, and the first line or the second line may be part of the plane. Alternatively or in addition, the plane may be parallel (or substantially parallel) to the first line or to the second line. Further, the angular deviation of the plane from being parallel to the first or second line may be less than 20°, 18°, 15°, 13°, 10°, 8°, 5°, 3°, 2°, 1°, 0.8°, 0.5°, 0.3°, 0.2°, or 0.1°. Alternatively or in addition, the visible laser beam may be rotatable to be in a second angle (Φ) relative to the first line or to the second line, and the second angle (Φ) may be based on, or may be according to, the estimated first angle (α), the first distance (d1), the second distance (d2), or any combination or function thereof. Further, the second angle (Φ) may be equal to, may be based on, or may be according to, the estimated first angle (α), and the angular deviation between estimated first angle (α) and the second angle (Φ) may be less than 20°, 18°, 15°, 13°, 10°, 8°, 5°, 3°, 2°, 1°, 0.8°, 0.5°, 0.3°, 0.2°, or 0.1°.

Any device herein may further be operative to estimate or calculate a first estimated point (x1, y1) relative to the device and a first extrapolated line (x', y') relative to the device that includes the first estimated point. The first estimated point may be estimated based on, or using, the first distance (d1), the second distance (d2), a result of the expression (d1+d2)/2, or any combination thereof, and the slope or the direction (ml) of the first extrapolated line may be estimated based on, or using, the estimated first angle (α). Further, any device herein may be used with a two-axis coordinate system and a reference direction, and the first line or the second line may be angularly deviated from the reference direction by a first deviation angle (Φ1). A first estimated point (x1, y1) may be estimated or calculated according to, or based on, x1=R1*cos(Φ1) and y1=R1*sin(Φ1), where R1 may be calculated or estimated based on, or using, the first distance (d1), the second distance (d2), a result of the expression (d1+d2)/2, or any combination thereof. The slope or the direction of the first extrapolated line may be calculated based on, or according to, m1=−tg(α+Φ1), and the first extrapolated line may be defined as y'−y1=m1*(x'−x1). Any device herein may further be operative for estimating a second angle (α2) between an additional reference line defined by third and fourth points and a second surface or a second object, and the device may further be operative for measuring a third distance (d3) by the first distance meter along a third line that may be distinct from the first line from the third point to the second surface or the second object; and for measuring a fourth distance (d4) by the second distance meter along a fourth line that may be distinct from the second line from the fourth point to the second surface or the second object. The device may be operative to calculate, by the processor, the estimated second angle (α2) based on the third distance (d3) and the fourth distance (d4), and to display the estimated second angle (α2) or a function thereof by the display.

Any device herein may further be operative to estimate or calculate a second estimated point (x2, y2) relative to the device and a second extrapolated line (x", y") relative to the device that includes the second estimated point. The second estimated point may be estimated based on, or using, the third distance (d3), the fourth distance (d4), a result of the expression (d3+d4)/2, or any combination thereof, and the slope or the direction (m2) of the second extrapolated line may be estimated based on, or using, the estimated second angle (α2). The device may be used with the two-axis coordinate system and the reference direction, and the third line or the fourth line may be angularly deviated from the reference direction by a second deviation angle (Φ2), and the second estimated point (x2, y2) may be estimated or calculated according to, or based on, x2=R2*cos(Φ2) and y2=R2*sin(Φ2), where R2 may be calculated or estimated based on, or using, the third distance (d3), the fourth distance (d4), a result of the expression (d3+d4)/2, or any combination thereof. The slope or the direction of the second extrapolated line may be calculated based on, or according to, m2=−tg(α2+Φ2), and the second extrapolated line may be defined as y"−y2=m2*(x"−x2). Any device herein may further be operative to estimate or calculate an intersection point (x3, y3) that may be the intersection of the first and second extrapolated lines, and the intersection point (x3, y3) may be calculated or estimated according to, or using, x3=[m2*x2−ml*x1)−(y2−y1)]/(m2−m1) and y3=[m1*m2*(x1−x2)+m1*y1−m2*y1]/(m1−m2).

Any apparatus or device herein may further be operative to estimate or calculate, by the processor, the apparatus (or device) or the object speed, such as the relative speed (V) between the device and the object along the first line, along the second line, or both. Any apparatus or device may further be operative to estimate or calculate, by the processor, the relative speed (V) between the apparatus or device and the surface or object along the first line (V1) and along the second line (V2), and to calculate an average speed (V1+V2)/2, or to estimate or calculate, by the processor, the device speed or the object speed according to V/sin(α) or according to V/cos(α), and to display the calculated or estimated device or object speed by the display. Any apparatus or device herein may further be operative to calculate or estimate, by the processor, a time (t) according to, or based on, t=d*sin(α)/V or t=d*cos(α)/V, where d=(d1+d2)*cos(α)/2, d=(d1+d2)*sin(α)/2, d=c/cos(α), d=(d1+d2)*$\cos^2$(α)/(2*sin(α)), or d=(d1+d2)/(2*tg(α)), and to display the calculated or estimated time (t) by the display.

Any apparatus or device herein may further be operative to detect the first surface or the first object by the first distance meter along the first line using a measured first distance value (d1A), and the detection may be displayed by the display. Any apparatus or device herein may be used with a minimum or a maximum threshold, and the first surface or first object may be detected when the measured first distance value (d1A) may be above the minimum threshold, or may be below the maximum threshold. Any apparatus or device herein may further be operative to detect the first surface or first object by the second distance meter along the second line using a measured second distance (d2A), and the detection may be displayed by the display. Any apparatus or device herein may be used with a minimum threshold or with a maximum threshold, and the first surface or first object may be detected when the measured second distance (d2A) may be above the minimum threshold, or when the measured second distance (d2A) may be below the maximum threshold. Any apparatus or device herein may further be operative to measure the time $\Delta t$ between the detection by the first distance meter and the detection by the second distance meter, and to estimate or calculate, by the processor, the speed (V) of the device or of the object.

The speed (V) may be calculated, by the processor, based on, or using, the measured first distance value (d1A), the measured second distance (d2A), and the first angle $\alpha$, and the first and second lines may be spaced a third distance (c) apart, and the speed (V) may be calculated using, or based on, the third distance (c), such as being calculated using, or based on, $V=c/[\cos(\arctan((d2A-d1A)/c))*\Delta t]$, and to display the calculated or estimated speed (V) by the display. Any apparatus or device herein may further be operative to calculate or estimate, by the processor, a time (t) according to, or based on, t=d/V, where $d=(d1+d2)*\cos(\alpha)/2$, $d=(d1+d2)*\sin(\alpha)/2$, $d=c/\cos(\alpha)$, $d=(d1+d2)*\cos^2(\alpha)/(2*\sin(\alpha))$, or $d=(d1+d2)/(2*tg(\alpha))$, and to display the calculated or estimated time (t) by the display. A length (L) may be calculated or estimated, by the processor, using, or based on, $L=c*\Delta t/(\Delta t*\cos^2(\alpha))$, and the apparatus or device may further be operative to display the calculated or estimated length (L) by the display.

Any apparatus or device herein may further be operative to detect the first surface or first object by the first distance meter along the first line using a measured second distance value (d1B), and the measured second distance value (d1B) may be measured after the measured first distance value (d1A), and the detection may be based on, or may use, the difference between the measured first and second values (d1B-d1A) of the first distance (d1). Further, a minimum or maximum threshold may be used, and the first surface or first object may be detected when the difference between the measured values (d1B-d1A) may be above the minimum threshold or below the maximum threshold. Any apparatus or device herein may further be operative to detect the first surface or first object by the second distance meter along the second line using a measured second distance (d2B) after a measured first distance (d2A), and the detection may be based on, or may use, the difference between the measured first and second values (d2B−d2A) of the second distance (d2). A minimum or maximum threshold may be used, and the first surface or first object may be detected when the difference of the measured values (d2B-d2A) may be above the minimum threshold. The first surface or first object may be detected when the difference of the measured values (d2B−d2A) may be below the maximum threshold.

Any apparatus or device herein may further be operative to measure the time $\Delta t$ between the detection by the first distance meter and the detection by the second distance meter, and to estimate or calculate, by the processor, the speed (V) of the device or of the object. The speed (V) may be calculated, by the processor, based on, or using, the measured first distance value (d1A), the measured second distance (d2A), and the first angle $\alpha$. The first and second lines may be spaced a third distance (c) apart, and the speed (V) may be calculated, by the processor, using, or based on, the third distance (c).

The speed (V) may be calculated, by the processor, using, or based on, $V=c/[\cos(\arctan((d2A-d1A)/c))*\Delta t]$, and the calculated or estimated speed (V) may be displayed by the display. A time (t) may be calculated or estimated, by the processor, according to, or based on, t=d/V, where $d=(d1+d2)*\cos(\alpha)/2$, $d=(d1+d2)*\sin(\alpha)/2$, $d=c/\cos(\alpha)$, $d=(d1+d2)*\cos^2(\alpha)/(2*\sin(\alpha))$, or $d=(d1+d2)/(2*tg(\alpha))$, and the calculated or estimated time (t) may be displayed by the display. A length (L) may be calculated or estimated, by the processor, using, or based on, $L=c*\Delta t/(\Delta t*\cos^2(\alpha))$, and the calculated or estimated length (L) may be displayed by the display.

Alternatively or in addition, the first and second lines herein may be spaced a third distance (c) apart, and the estimated first angle ($\alpha$) may be calculated, by the processor, using, or based on, $\alpha=(\arctan(d2-d1)/c)$. Using a speed V, any apparatus or device herein may further be operative to calculate or estimate, by the processor, a distance or an angle using, or based on, the calculated first angle $\alpha$ and the speed V. Using with a time period $\Delta t$, the distance or the angle may be calculated or estimated using, or based on, the calculated first angle $\alpha$, the speed V, and the time period $\Delta t$, such as by calculating or estimating, by the processor, a distance df based on, or according to, $df=sqrt(dv^2+dav^2-2*dv*dav*\sin(\alpha))$, where $dav=\frac{1}{2}*(d1+d2)$ and $dv=V*\Delta t$, and calculating or estimating, by the processor, an angle $\varphi$ based on, or according to, $\varphi=\arcsin(dv*\cos(\varepsilon)/df)$.

Any apparatus or device herein may further be operative to, using a distance df, calculate or estimate, by the processor, a time period $\Delta t$ using, or based on, the calculated first angle $\alpha$, the speed V, and the distance df, and the calculating or estimating of the time period $\Delta t$ may be based on, or may be according to, $\Delta t=[2*df^2*\sin^2(\alpha)+sqrt(df^2*(1+\sin^2(\alpha))-dav^2)]/V$, where $dav=\frac{1}{2}*(d1+d2)$. Any apparatus or device herein may further be operative to, using an angle $\varphi$, calculate or estimate, by the processor, a time period $\Delta t$ using, or based on, the calculated first angle $\alpha$, the speed V, and the angle $\varphi$, and the calculating or estimating of the time period $\Delta t$ may be based on, or may be according to, $\Delta t=dav*\sin(\varphi)/(V*\cos(\varphi-a))$, where $dav=\frac{1}{2}*(d1+d2)$.

The speed V may be calculated or estimated, by the processor, according to, or based on, a detection of the first surface or first object by the first distance meter along the first line using a measured first distance value (d1A), followed by a detection of the first surface or first object by the second distance meter along the second line using a measured second distance value (d1B). The first and second lines may be spaced a third distance (c) apart, and the speed (V) may be calculated, by the processor, using, or based on, $V=c/[\cos(\arctan((d2A-d1A)/c))*\Delta t]$, and the $\Delta t$ may be the time between the detections by the first and second distance meters. Alternatively or in addition, the speed V may be estimated or calculated, by the processor, using, or based on, a Doppler frequency shift between a signal transmitted by, and a signal received by, the first or second distance meter.

The estimated first angle ($\alpha$) may be calculated, by the processor, using, or based on, the difference (d2−d1) between the first distance (d1) and second distance (d2), the first and second lines may be spaced a third distance (c) apart, and the estimated first angle ($\alpha$) may be calculated, by the processor, using, or based on, the third distance (c). The estimated first angle ($\alpha$) may be calculated, by the processor, using, or based on, (d2-d1)/c, and the estimated first angle ($\alpha$) may be calculated, by the processor, using, or based on, $\alpha=(\arctan(d2-d1)/c)$. The estimated first angle ($\alpha$), using an angle $\beta1$, may be calculated, by the processor, using, or based on, $\alpha=(\arctan(d2*\cos(\beta1)-d1))/(c-d2*\sin(\beta1))$ or $\alpha$=(arctan(d2−d1*cos($\beta$1)))/(c+d1*sin($\beta$1)), and the first and second lines may form the angle $\beta$1 therebetween. Alternatively or in addition, the first or the second line may form the angle $\beta$1 with respect to a reference line connecting the first and second points. Further, the estimated first angle ($\alpha$) may be calculated, by the processor, using an angle $\beta$2, using, or based on, $\alpha$=arctan((d2m*cos($\beta$2)−d1m*cos($\beta$1))/(c+d1m*sin($\beta$1)−d2m*sin($\beta$2))).

Any apparatus or device herein may further be operative to calculate by the processor a distance (d) using, or based on, the first distance (d1) and second distance (d2) and the calculated first angle ($\alpha$). Any apparatus or device herein may further be operative to calculate, by the processor, the distance (d) according to, or based on, d=d1m*cos($\beta$1−$\alpha$)/cos($\alpha$)+½*c*tg($\alpha$) or d=d1m*cos($\beta$1−a)+½*c*sin($\alpha$), and the first or the second line may form the angle $\beta$2 with respect to a reference line connecting the first and second points. Further, a reference line connecting the first and second points may be used, and the first line may form the angle $\beta$1 with respect to the reference line and the second line may form the angle $\beta$2 with respect to the reference line.

A distance (d) may be calculated, by the processor, using, or based on, first distance (d1) and the second distance (d2), and the calculated first angle ($\alpha$), such as according to, or based on, d=(d1+d2)*cos($\alpha$)/2, d=(d1+d2)*sin($\alpha$)/2, d=c/cos($\alpha$), d=(d1+d2)*$\cos^2$($\alpha$)/(2*sin($\alpha$)), or d=(d1+d2)/(2*tg($\alpha$)). The calculated or estimated distance (d) may be displayed by the display.

Using a velocity s, the time (t) may be calculated or estimated, by the processor, according to, or based on, t=d/s, and the calculated or estimated time (t) may be displayed by the display. The device or apparatus may be moving at a velocity of s, or may be having a velocity component of s, or a distinct object may be moving at a velocity of s, or may be having a velocity component of s. Alternatively or in addition, the distance (d) may be calculated, by the processor, using an angle $\beta$1, according to, or based on, d=(d'1+d'2)*cos($\alpha$)/2, d=(d'1+d'2)*sin($\alpha$)/2, d=c/cos($\alpha$), d=(d1+d'2)*$\cos^2$($\alpha$)/(2*sin($\alpha$)), or d=(d'1+d'2)/(2*tg($\alpha$)), where d'1=d1 or d'1=d1*(cos($\beta$1)+sin($\beta$1)*tg($\alpha$)) or where d'2=d2 or d'2=d2*(cos($\beta$1)+sin($\beta$1)*tg($\alpha$)), where $\alpha$=(arctan(d2*cos($\beta$1)−d1))/(c−d2*sin($\beta$1)) or $\alpha$=(arctan(d2−d1*cos($\beta$1)))/(c+d1*sin($\beta$1)).

An estimated distance dact between the first surface and a point centered between (or equidistance from) the first and second points may be calculated, by the processor, using, or based on, first distance (d1) and the second distance (d2), and the estimated distance dact may be displayed by the display. Further, the estimated distance dact may be calculated, by the processor, using, or based on, the difference (d2-d1) between first distance (d1) and the second distance (d2). Furthermore, the first and second lines may be spaced a third distance (c) apart, and the estimated distance dact may be calculated, by the processor, using, or based on, the third distance (c). Alternatively or in addition, the estimated distance dact may be calculated using, or based on, (d2-d1)/c, such as according to $\alpha$=arctan(d2-d1)/c, or the estimated distance dact may be calculated using, or based on, dact=(d1+d2)*cos($\alpha$)/2. Further, the estimated distance dact may be calculated using an angle $\beta$, using, or based on, dact=(d'1+d'2)*cos($\alpha$)/2, where d'1=d1 or d'1=d1*(cos($\beta$)+sin($\beta$)*tg($\alpha$)) or where d'2=d2 or d'2=d2*(cos($\beta$)+sin($\beta$)*tg($\alpha$)), and where $\alpha$=(arctan(d2*cos($\beta$)−d1))/(c−d2*sin($\beta$)) or $\alpha$=(arctan(d2−d1*cos($\beta$)))/(c+d1*sin($\beta$)). The first and second lines may form the angle $\beta$ therebetween.

An estimated distance ds on the first surface between a point centered between the first and second lines points on the first surface and a point closest to the a point centered between the first and second points may be calculated, by the processor, using, or based on, the first distance (d1) and the second distance (d2), and to display the estimated distance ds by the display, such as by using, or based on, the difference (d2-d1) between first distance (d1) and the second distance (d2). The first and second lines may be spaced a third distance (c) apart, and the estimated distance ds may be calculated using, or based on, the third distance (c), such as using, or based on, (d2-d1)/c. The estimated distance ds may further be calculated using, or based on, calculating the estimated first angle ($\alpha$) according to $\alpha$=arctan(d2-d1)/c and ds=(d1+d2)*sin($\alpha$)/2.

An estimated distance dist may be calculated or estimated, by the processor, by using, or based on, the first distance (d1) and the second distance (d2), and the distance dist may be displayed by the display. The first and second lines may be spaced a third distance (c) apart, and the estimated distance dist may be calculated or estimated, by the processor, using, or based on, the difference (d2-d1) between the first distance (d1) and the second distance (d2), and on the third distance (c). Further, the distance dist may be calculated or estimated using, or based on, calculating the estimated first angle ($\alpha$) according to $\alpha$=arctan(d2-d1)/c, such as using, or based on, dist=c/cos($\alpha$)=c/cos(arctan(d2−d1)/c).

An estimated distance dm may be calculated or estimated, by the processor, by using, or based on, the first distance (d1) and the second distance (d2), and the distance dm may be displayed by the display. The first and second lines may be spaced a third distance (c) apart, and the estimated distance dm may be calculated or estimated, by the processor, using, or based on, the difference (d2-d1) between the first distance (d1) and the second distance (d2), and on the third distance (c). Further, the distance dm may be calculated or estimated using, or based on, calculating the estimated first angle ($\alpha$) according to $\alpha$=arctan(d2-d1)/c, such as using, or based on, dm=(d1+d2)*$\cos^2$($\alpha$)/(2*sin($\alpha$)).

An estimated distance dn may be calculated or estimated, by the processor, by using, or based on, the first distance (d1) and the second distance (d2), and the distance dn may be displayed by the display. The first and second lines may be spaced a third distance (c) apart, and the estimated distance dn may be calculated or estimated, by the processor, using, or based on, the difference (d2−d1) between the first distance (d1) and the second distance (d2), and on the third distance (c). Further, the distance dn may be calculated or estimated using, or based on, calculating the estimated first angle ($\alpha$) according to $\alpha$=arctan(d2-d1)/c, such as using, or based on, dn=(d1+d2)/(2*tg($\alpha$)).

Any apparatus or device herein may further comprise a digital still or video camera for capturing images along of, or centered at, an optical axis, and the digital camera may comprise an optical lens for focusing received light, the lens being mechanically oriented to guide the captured images; a photosensitive image sensor array disposed approximately at an image focal point plane of the optical lens for capturing the image and producing an analog signal representing the image; and an analog-to-digital (A/D) converter coupled to the image sensor array for converting the analog signal to a digital data representation of the captured image. The image sensor array may respond to visible or non-visible light, such as infrared, ultraviolet, X-rays, or gamma rays. The image sensor array may use, or may be based on, semiconductor elements that use the photoelectric or photovoltaic effect, such as Charge-Coupled Devices (CCD) or Complementary Metal-Oxide-Semiconductor Devices (CMOS) elements.

Any apparatus or device herein may comprise an image processor coupled to the image sensor array for providing a digital video data signal according to a digital video format, the digital video signal may carry digital data video that may comprise, or may be based on, the captured images, and the digital video format may use, may be compatible with, or may be based on, TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standard. Any apparatus or device herein may comprise a video compressor coupled to the image sensor array for compressing the digital data video, the compression may use, or may be based on, intraframe or interframe compression, and the compression may be lossy or non-lossy. Further, the compression may use, may be compatible with, or may be based on, a standard compression algorithm that may be JPEG (Joint Photographic Experts Group) and MPEG (Moving Picture Experts Group), ITU-T H.261, ITU-T H.263, ITU-T H.264, or ITU-T CCIR 601.

Any apparatus or device herein may comprise a single enclosure that may be portable or hand-held, for housing the digital camera. The first line or the second line may be parallel (or substantially parallel) to the optical axis, or the first line or the second line angular deviation from being parallel to the optical axis may be less than 20°, 18°, 15°, 13°, 10°, 8°, 5°, 3°, 2°, 1°, 0.8°, 0.5°, 0.3°, 0.2°, or 0.1°. Any apparatus or device herein may further comprise a power source in the single enclosure for electrically powering the digital camera, the first and second distance meters, and the processor, and the software and the processor may be further coupled to control the digital camera. Additionally, the display may be further coupled to, integrated with, or part of, the digital camera for displaying the captured images, stored images, or for Electronic ViewFinder (EVF). Any apparatus or device herein may further comprise a memory coupled to, integrated with, or part of, the digital camera for storing the captured images, and the memory may be further coupled to the processor for storing a representation of the first distance, the second distance, the first angle, or any combination or manipulation thereof.

An operation or control of any digital camera herein may be in response to the value of first distance, the second distance, the first angle, or any combination or manipulation thereof, and a mechanical actuator may be provided for moving an element, the actuator movement may be in response to the value of first distance, the second distance, the first angle, or any combination or manipulation thereof. The actuator may be an electrical motor attached to move a lens in the digital camera. Any digital camera herein may further comprise an auto-focus mechanism that may use any device or apparatus herein as a sensor, where the auto-focus mechanism may be operative to use, or may respond to, the value of first distance, the second distance, the first angle, or any combination or manipulation thereof.

Any apparatus or device herein may comprise two or more devices or apparatuses described herein, and may further comprise in the single enclosure a third distance meter for measuring a third distance (d3) along a third line from a third point to the first surface or the first object; and a fourth distance meter for measuring a fourth distance (d4) along a fourth line from a fourth point to the first surface or the first object. The third line or the fourth line may be parallel (or substantially parallel) to the optical axis, or the third line or the fourth line angular deviation from being parallel to the optical axis may be less than 20°, 18°, 15°, 13°, 10°, 8°, 5°, 3°, 2°, 1°, 0.8°, 0.5°, 0.3°, 0.2°, or 0.1°. Any or all of the distance meters herein may be mounted in the enclosure so that a line connecting the first and second points may be perpendicular from a line connecting the third and fourth points. Alternatively or in addition, the line connecting the first and second points may deviate from being perpendicular to the line connecting the third and fourth points by an angle that may be less than 20°, 18°, 15°, 13°, 10°, 8°, 5°, 3°, 2°, 1°, 0.8°, 0.5°, 0.3°, 0.2°, or 0.1°.

Any apparatus or device herein may comprise an image-processing algorithm in a software or firmware and an image processor that may be executing the image-processing algorithm, which may comprise a perspective distortion correction scheme. The image processing algorithm may use, or may be based on, a value measured or calculated by the device, where the value may be the estimated first angle ($\alpha$), the first (d1) distance, the second (d2) distance, or any combination or function thereof. Any digital camera herein may be operative to capture an image in response to a value measured or calculated by the device, and the value may be the estimated first angle ($\alpha$), the first (d1) distance, the second (d2) distance, or any combination or function thereof, the value may be a measured or calculated distance, or the value may be a measured or calculated angle.

Any apparatus or device herein may be used with a minimum or maximum threshold, and the digital camera may be operative to capture an image in response to comparing the value measured or calculated by the device to the threshold, such that the digital camera may be operative to capture an image in response to the value measured or calculated by the device being above the minimum threshold, or the digital camera may be operative to capture an image in response to the value measured or calculated by the device being below the minimum threshold. The minimum or maximum threshold may be less than, or higher than, 20°, 18°, 15°, 13°, 10°, 8°, 5°, 3°, 2°, 1°, 0.8°, 0.5°, 0.3°, 0.2°, or 0.1°. Further, a minimum threshold may be used, and the digital camera may be further operative to capture an image in response to the value measured or calculated by the device being above the minimum threshold. Further, the threshold may be a maximum threshold, and the value may be the estimated first angle ($\alpha$) or any function thereof, and the digital camera may be operative to capture an image in response to the estimated first angle ($\alpha$) being below the maximum threshold.

Any apparatus or device herein may further be operative to estimate or calculate a second angle ($\alpha 1$) between the optical axis and the first surface or the first object based on, or using, the estimated first angle ($\alpha$), and the second angle ($\alpha 1$) may be estimated or calculated according to, or based on, $\alpha 1=\alpha$ or $\alpha 1=90°-\alpha$. Any apparatus or device herein may further be operative to estimate or calculate a third distance (R) between the digital camera focal point and the first surface or the first object, based on, or using, the first distance (d1) or the second distance (d2) (or both), such as where the third distance (R) may be estimated or calculated according to, or based on, R=d1, R=d2, or R=(d1+d2)/2.

Any apparatus or device herein may further comprise a memory for storing the captured image, and the second angle ($\alpha 1$) or the third distance (R) (or both) may be stored in the memory with, or as a metadata of, the captured image. The second angle ($\alpha 1$) or the third distance (R) (or both) may be used for perspective distortion correction of the captured image, and the apparatus or device may further comprise an image processor for receiving the captured image and for correcting the perspective distortion using, or based on, the second angle ($\alpha$1), the third distance (R) (or both).

Any captured image herein may use orthogonal coordinate system using a x-axis and a y-axis defining multiple (x, y) points, and the second angle ($\alpha$1) or the third distance (R) (or both) may be used for transforming to a different digital camera positioning, to a different optical axis, to a different perspective, or to a different coordinate system, and the transformation may be a projective linear transformation. Any digital camera herein may use a focal length (f), and the transformation may be to an optical axis having a third angle ($\alpha$2). The transformation may comprise coordinates transformation using (x',y') points that may be according to, or based on, $x'=f*(x-f*tg(\alpha 2-\alpha 1))/(f+x*tg(\alpha 2-\alpha 1))$ or $y'=f*(y-f*tg(\alpha 2-\alpha 1))/(f+y*tg(\alpha 2-\alpha 1))$, and the first angle may be zero ($\alpha 1=0$) or the second angle may be zero ($\alpha 2=0$).

Any apparatus or device herein may be non-mobile and may be mounted so that the first and second lines may be substantially vertical or horizontal, or the angle formed between the first line or the second line and a vertical line, surface, or plane, may be less than 20°, 18°, 15°, 13°, 10°, 8°, 5°, 3°, 2°, 1°, 0.8°, 0.5°, 0.3°, 0.2°, or 0.1°. Alternatively or in addition, an angle formed between the first line or the second line and a horizontal line, surface, or plane, may be less than 20°, 18°, 15°, 13°, 10°, 8°, 5°, 3°, 2°, 1°, 0.8°, 0.5°, 0.3°, 0.2°, or 0.1°. Any apparatus or device herein may be associated with an elongated aspect or side, and the apparatus or device may be mounted so that the first and second lines may be substantially vertical or horizontal to the elongated aspect or side.

Any apparatus or device herein may be mobile and may mounted so that the first and second lines may be substantially vertical or horizontal, or an angle formed between the first line or the second line and a vertical or horizontal line, surface, or plane, may be less than 20°, 18°, 15°, 13°, 10°, 8°, 5°, 3°, 2°, 1°, 0.8°, 0.5°, 0.3°, 0.2°, or 0.1°. The mobile apparatus or device may be a vehicle operative to travel in a direction, and any device or apparatus herein may be mounted so that the first and the second lines may be substantially parallel or perpendicular to the travel direction, or an angle formed between the first line or the second line and the travel direction, or perpendicular to the travel direction, may be less than 20°, 18°, 15°, 13°, 10°, 8°, 5°, 3°, 2°, 1°, 0.8°, 0.5°, 0.3°, 0.2°, or 0.1°.

Any vehicle herein may be a ground vehicle adapted to travel on land, such as a bicycle, a car, a motorcycle, a train, an electric scooter, a subway, a train, a trolleybus, and a tram. Alternatively or in addition, the vehicle may be a buoyant or submerged watercraft adapted to travel on or in water, and the watercraft may be a ship, a boat, a hovercraft, a sailboat, a yacht, or a submarine. Alternatively or in addition, the vehicle may be an aircraft adapted to fly in air, and the aircraft may be a fixed wing or a rotorcraft aircraft, such as an airplane, a spacecraft, a glider, a drone, or an Unmanned Aerial Vehicle (UAV). Any apparatus or device herein may be used for measuring or estimating an altitude, a pitch, or a roll of the aircraft, and may be operative to notify or indicate to a person that may be the vehicle operator or controller in response to the first distance (d1) or any function thereof, the second distance (d2) or any function thereof, or the estimated first angle ($\alpha$) or any function thereof. Alternatively or in addition, any apparatus or device herein may be used for measuring or estimating the apparatus or device speed, positioning, pitch, roll, or yaw of the mobile apparatus or device. Any apparatus or device herein the first distance meter, the second distance meter, or any part thereof, may be mounted onto, may be attached to, may be part of, or may be integrated with, a rear or front view camera, chassis, lighting system, headlamp, door, car glass, windscreen, side or rear window, glass panel roof, hood, bumper, cowling, dashboard, fender, quarter panel, rocker, or a spoiler of a vehicle.

Any vehicle herein may further comprise an Advanced Driver Assistance Systems (ADAS) functionality, system, or scheme, and any apparatus or device herein may be part of, may be integrated with, may be communicating with, or may be coupled to, the ADAS functionality, system, or scheme. The ADAS functionality, system, or scheme may consist of, may comprise, or may use, Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system, Pre-crash system, Collision Imminent Braking (CM), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning.

Any apparatus or device herein may be operative to connected to, coupled to, communicating with, an automotive electronics in a vehicle, or may be part of, or may be integrated with, an automotive electronics in a vehicle. An Electronic Control Unit (ECU) may comprise, or may be part of, any apparatus or device herein. Alternatively or in addition, any apparatus or device herein may consist of, may be part of, may be integrated with, may be connectable to, or may be couplable to, an Electronic Control Unit (ECU) in the vehicle, and the Electronic Control Unit (ECU) may be Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module. Alternatively or in addition, the Electronic Control Unit (ECU) may comprise, may use, may be based on, or may execute a software, an operating-system, or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard. Any software herein may comprise, may use, or may be based on, an operating-system or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard.

Any apparatus or device herein may be used with, or may comprise, a wired network that comprises a network medium, and may further comprise a connector for connecting to the network medium; and a transceiver coupled to the connector for transmitting and receiving first data over the wired network, the transceiver may be coupled to be controlled by the processor, and the apparatus or device may be operative to send to the network by the transceiver via the antenna the first distance (d1) or any function thereof, the second distance (d2) or any function thereof, or the estimated first angle ($\alpha$) or any function thereof. The wired network may be a vehicle network or a vehicle bus connectable to an Electronic Control Unit (ECU), and the apparatus or device may be operative to send the first distance (d1) or any function thereof, the second distance (d2) or any function thereof, or the estimated first angle ($\alpha$) or any function thereof, to the ECU over the wired network. Any ECU herein may be an Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module.

Any network medium herein may comprise a single wire or two wires, and may comprise a Shielded Twisted Pair (STP) or an Unshielded Twisted Pair (UTP). Alternatively or in addition, the network medium may comprise a LAN cable that may be based on, or may be substantially according to, EIT/TIA-568 or EIA/TIA-570 standard, and may comprise UTP or STP twisted-pairs, and the connector may be an RJ-45 type connector. Alternatively or in addition, the network medium may comprise an optical cable and the connector may be an optical connector, and the optical cable may comprises, may use, or may be based on, Plastic Optical Fibers (POF). Alternatively or in addition, the network medium may comprise or may use a DC power carrying wires connected to a vehicle battery.

Any network data link layer or any physical layer signaling herein may be according to, may be based on, may be using, or may be compatible with, ISO 11898-1:2015 or On-Board Diagnostics (OBD) standard. Any network medium access herein may be according to, may be based on, may be using, or may be compatible with, ISO 11898-2:2003 or On-Board Diagnostics (OBD) standard. Any network herein may be in-vehicle network such as a vehicle bus, and may employ, may use, may be based on, or may be compatible with, a multi-master, serial protocol using acknowledgement, arbitration, and error-detection schemes. Any network or vehicle bus herein may employ, may use, may be based on, or may be compatible with, a synchronous and frame-based protocol, and may further consist of, may employ, may use, may be based on, or may be compatible with, a Controller Area Network (CAN), that may be according to, may be based on, may use, or may be compatible with, ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, On-Board Diagnostics (OBD), or SAE J2411_200002 standards. Any CAN herein may be according to, may be based on, may use, or may be compatible with, Flexible Data-Rate (CAN FD) protocol. Alternatively or in addition, any network or vehicle bus herein may consist of, may employ, may use, may be based on, or may be compatible with, a Local Interconnect Network (LIN), which may be according to, may be based on, may use, or may be compatible with, ISO 9141-2:1994, ISO 9141:1989, ISO 17987-1, ISO 17987-2, ISO 17987-3, ISO 17987-4, ISO 17987-5, ISO 17987-6, or ISO 17987-7 standard.

Alternatively or in addition, any network or vehicle bus herein may consist of, may employ, may use, may be based on, or may be compatible with, FlexRay protocol, which may be according to, may be based on, may use, or may be compatible with, ISO 17458-1:2013, ISO 17458-2:2013, ISO 17458-3:2013, ISO 17458-4:2013, or ISO 17458-5:2013 standard. Alternatively or in addition, any network or vehicle bus herein may consist of, may employ, may use, may be based on, or may be compatible with, Media Oriented Systems Transport (MOST) protocol, which may be according to, may be based on, may use, or may be compatible with, MOST25, MOST50, or MOST150.

Any network herein may be a Personal Area Network (PAN), any connector herein may be a PAN connector, and any transceiver herein may be a PAN transceiver. Alternatively or in addition, any network herein may be a Local Area Network (LAN) that may be Ethernet-based, ant connector herein may be a LAN connector, and any transceiver herein may be a LAN transceiver. The LAN may be according to, may be compatible with, or may be based on, IEEE 802.3-2008 standard. Alternatively or in addition, the LAN may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T; and the LAN connector may be an RJ-45 type connector. Alternatively or in addition, the LAN may be according to, may be compatible with, or may be based on, 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10 GBase-SR, 10 GBase-LR, 10 GBase-LRM, 10GBase-ER, 10 GBase-ZR, or 10GBase-LX4, and the LAN connector may be a fiber-optic connector. Alternatively or in addition, any network herein may be a packet-based or switched-based Wide Area Network (WAN), any connector herein may be a WAN connector, and any transceiver herein may be a WAN transceiver. Alternatively or in addition, any network herein may be according to, may be compatible with, or may be based on, a Serial Peripheral Interface (SPI) bus or Inter-Integrated Circuit ($I^2C$) bus.

Any lines herein may be at an angle that may be less than, or more than, 20°, 18°, 15°, 13°, 10°, 8°, 5°, 3°, 2°, 1°, 0.8°, 0.5°, 0.3°, 0.2°, or 0.1°, or may be at an angle that may be less than, or more than, 20°, 18°, 15°, 13°, 10°, 8°, 5°, 3°, 2°, 1°, 0.8°, 0.5°, 0.3°, 0.2°, or 0.1°.

The first distance meter may be a non-contact distance meter that may comprise a first emitter for emitting a first signal substantially along the first line, a first sensor for receiving a reflected first signal from the first surface, and a first correlator coupled for measuring a correlation between the first signal emitted by the first emitter and the reflected first signal received by the first sensor. Alternatively or in addition, the second distance meter may be a non-contact distance meter that may comprise a second emitter for emitting a second signal substantially along the second line, a second sensor for receiving a reflected second signal from the first surface, and a second correlator coupled for measuring a correlation between the second signal emitted by the second emitter and the reflected second signal received by the second sensor.

The second distance meter may be identical to, or different from, the first distance meter. The second emitter may be identical to, or different from, the first emitter. Further, the same emitter may serve as both the second emitter and the first emitter. The second sensor may be identical to, or different from, the first sensor. Further, the same sensor may serve as both the second sensor and the first sensor. The second correlator may be identical to, or distinct from, the first correlator. Further, the same correlator may serve as both the second correlator and the first correlator. The second signal may be identical to, or different from, the first signal. Further, the same signal may serve as both the second signal and the first signal.

In any device herein, the first emitter and the second emitter may consist of a single emitter. Any device herein may further comprise a splitter coupled for receiving the emitted signal from the single emitter and producing a first and second partial signals; a first waveguide coupled to the splitter for emitting the first signal in response to guiding the received first partial signal from the splitter; and a second waveguide coupled to the splitter for emitting the second signal in response to guiding the received second partial signal from the splitter.

The single emitter may be a light emitter for emitting a light signal, the splitter may be an optical beam splitter, and each of the first and second waveguides may be an optical waveguide. Alternatively or in addition, the single emitter may be a sound emitter for emitting a sound signal, the splitter may be an acoustic splitter, and each of the first and second waveguides is an acoustic waveguide. Alternatively or in addition, the single emitter may be an antenna for radiating a first millimeter wave or microwave signal, the splitter may be power divider or a directional coupler, and each of the first and second waveguides may be an electromagnetic waveguide.

In any device herein, the first sensor and the second sensor may consist of a single sensor coupled to receive a signal from a combiner. Any device herein may further comprise a first waveguide coupled for receiving the reflected first signal and for guiding the reflected first signal to the combiner; and a second waveguide coupled for receiving the reflected second signal and for guiding the reflected second signal to the combiner. The combiner may be coupled to the first and second waveguides for receiving the guided reflected first and second signals and for emitting the guided reflected first and second signals to the single sensor.

The single sensor may be a light sensor for sensing a light signal, the combiner may be an optical beam combiner or splitter, and each of the first and second waveguides may be an optical waveguide. Alternatively or in addition, the single sensor may be a sound sensor for sensing a sound signal, the splitter or combiner may be an acoustic splitter or combiner, and each of the first and second waveguides may be an acoustic waveguide.

Any optical beam splitter or combiner herein may consist of, may comprise, may use, or may be based on, two triangular glass prisms that are attached together at their base, a half-silvered mirror using a sheet of glass or plastic with a transparently thin coating of metal, a diffractive beam splitter, a dichroic mirrored prism assembly which uses dichroic optical coatings. Alternatively or in addition, any optical beam splitter or combiner herein may consist of, may comprise, may use, or may be based on, a polarizing beam splitter that may consist of, may comprise, may use, or may be based on, a Wollaston prism that uses birefringent materials for splitting light into beams of differing polarization.

Any optical waveguide herein may consist of, may comprise, may use, or may be based on, planar, strip, or fiber waveguide structure and is associated with step or gradient index as refractive index distribution. Alternatively or in addition, any optical waveguide herein may consist of, may comprise, may use, or may be based on, a glass, a polymer, or a semiconductor, and may be a two-dimensional waveguide that may consist of, may comprise, may use, or may be based on, a strip waveguide, a rib waveguide, a Laser-inscribed waveguide, a photonic crystal waveguide, a segmented waveguide, or an optical fiber.

Any directional coupler herein may consist of, may comprise, may use, or may be based on, a pair of coupled transmission lines, a branch-line coupler, a Lange coupler, a hybrid ring coupler, a branch-line coupler, a Bethe-hole directional coupler, a Riblet short-slot coupler, or a Moreno crossed-guide coupler. Any power divider herein may consist of, may comprise, may use, or may be based on, a T-junction, a Wilkinson power divider, or a Magic tee. Any electromagnetic waveguide herein may consist of, may comprise, may use, or may be based on, a transmission line, a dielectric waveguide, or a hollow metallic waveguide. Any dielectric waveguide herein may consist of, may comprise, may use, or may be based on, a solid dielectric rod. Any transmission line herein may consist of, may comprise, may use, or may be based on, a microstrip, a coplanar waveguide, a stripline, or a coaxial cable. Any hollow metallic waveguide herein may consist of, may comprise, may use, or may be based on, a slotted waveguide, or a closed waveguide.

The first signal may comprise, or may be based on, a carrier having, or centered at, a first frequency, and the reflected first signal may comprise or may be having a carrier having, or centered at, a second frequency, and any apparatus or device herein may comprise a frequency discriminator coupled for measuring or estimating the frequency difference between the first and second frequencies. Alternatively or in addition, the second signal may comprise, or may be based on, a carrier having, or centered at, a third frequency, and the reflected second signal may be having a carrier having, or centered at, a fourth frequency, and any apparatus or device herein may comprise an additional frequency discriminator coupled for measuring or estimating the frequency difference between the third and fourth frequencies.

Any frequency discriminator herein may comprise a mixer for mixing signals having the two frequencies, and a low-pass filter for substantially passing only a signal having a frequency of the frequency difference between the first and second frequencies. The processor may be coupled to receive the measured or estimated frequency difference from the frequency discriminator. Using a constant K, any processor herein may further be operative to calculate a relative velocity (VD) by multiplying the value of the measured or estimated frequency difference by the constant K. Any processor herein may further be operative to calculate or estimate a time (t) according to, or based on, $t=d*\sin(\alpha)/VD$ or $t=d*\cos(\alpha)/VD$, where $d=(d1+d2)*\cos(\alpha)/2$, $d=(d1+d2)*\sin(\alpha)/2$, $d=c/\cos(\alpha)$, $d=(d1+d2)*\cos^2(\alpha)/(2*\sin(\alpha))$, or $d=(d1+d2)/(2*tg(\alpha))$, and the calculated or estimated time (t) may be displayed by the display. Any processor herein may further be operative to calculate or estimate the object speed (V) according to V=VD/sin(α) or according to V=VD/cos(α), and the calculated or estimated device or object speed (V) may be displayed by the display.

Any apparatus or device herein may further comprise a first transducer that may consist of the first emitter and the first sensor, and may further be operative to be in first transmitting and first receiving states, where in the first transmitting state the first transducer may be serving as the first emitter and in the first receiving state the first transducer may be serving as the first sensor. Alternatively or in addition, any apparatus or device herein may further comprise a second transducer that may consist of the second emitter and the second sensor, and where the device may be operative to be in second transmitting and second receiving states, where in the second transmitting state the second transducer may be serving as the second emitter and in the second receiving state the second transducer may be serving as the second sensor.

Any apparatus or device herein may further comprise a first duplexer coupled between the first correlator and the first transducer for passing a first transmitting signal from the first correlator to the first transducer in the first transmitting state and for passing a first receiving signal from the first transducer to the first correlator in the first receiving state. The first duplexer may comprise, may consist of, or may be based on, a switch coupled to be controlled by the processor, and the first transducer may be switched to receive the first transmitting signal from the first correlator in the first transmitting state and to transmit the first receiving signal to the first correlator in the first receiving state.

Any switch herein may be a Single-Pole Dual-Throw (SPDT) switch that may be an analog switch, a digital switch, a solid-state component, an electrical circuit, a transistor, a Solid State Relay (SSR), a semiconductor based relay, or an electro-mechanical relay. The first duplexer may comprise, may consist of, or may be based on a three-port circulator, which may consist of, may comprise, or may use, a wave-guide circulator, a magnet-based circulator, a ferrite circulator, a non-ferrite circulator, a phase shift circulator, a Faraday rotation circulator, a ring circulator, a junction circulator, an edge guided mode circulator, or a lumped element circulator.

The output of the first sensor in response to receiving the reflected second signal may be attenuated versus the output of the first sensor in response to receiving the reflected first signal by at least 3 dB, 5 dB, 8 dB, 10 dB, 15 dB, 18 dB, 20 dB, 25 dB, 30 dB, 35 dB, 40 dB, 45 dB, or 50 dB. The angular beam width of the reception by the first or the second sensor in a plane defined by the first and second lines may be less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°.

The power or the amplitude of the first signal may be higher than the second signal by at least 1 dB, 2 dB, 3 dB, 5 dB, 8 dB, 10 dB, 15 dB, 18 dB, 20 dB, 25 dB, 30 dB, 35 dB, 40 dB, 45 dB, or 50 dB. The first signal may be a periodic signal, and the second signal may consist of, may comprise, or may be based on, the first signal being phase shifted by less than 180°, 120°, 90°, 60°, 30°, 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°. Alternatively or in addition, the first signal may be a periodic signal, and the second signal may consist of, may comprise, or may be based on, the first signal being phase shifted by at least 30°, 60°, 90°, 120°, 180°, 210°, 240°, 270°, 300°, or 330°. Alternatively or in addition, the first signal may be a periodic signal, and the second signal may consist of, may comprise, or may be based on, the first signal being phase shifted by no more than 30°, 60°, 90°, 120°, 180°, 210°, 240°, 270°, 300°, or 330°. Alternatively or in addition, the first signal may have, may use, or may be based on a first center or carrier frequency (fa), the second signal may have, may use, or may be based on a second center or carrier frequency (fb), and the second frequency may be equal or substantially equal to the first frequency. Alternatively or in addition, the difference between the first and second frequency defined as |fb−fa|/fa may be less than 0.001%, 0.002%, 0.005%, 0.008%, 0.01%, 0.02%, 0.05%, 0.08%, 0.1%, 0.2%, 0.5%, 0.8%, 1%, 2%, 5%, 8%, 10%, 15%, 20%, 25%, 30%, 40%, or 50%. Alternatively or in addition, the first signal may have, may use, or may be based on a first center or carrier frequency (fa), the second signal may have, may use, or may be based on, a second center or carrier frequency (fb), and the second frequency may be different from the first frequency. Alternatively or in addition, the difference between the first and second frequency defined as |fb−fa|/fa may be higher than 0.001%, 0.002%, 0.005%, 0.008%, 0.01%, 0.02%, 0.05%, 0.08%, 0.1%, 0.2%, 0.5%, 0.8%, 1%, 2%, 5%, 8%, 10%, 15%, 20%, 25%, 30%, 40%, or 50%.

Alternatively or in addition, the first signal may consist of, may comprise, may use, or may be based on a light beam or an electromagnetic wave having a first polarization, and the second signal may consist of, may comprise, may use, or may be based on, a light beam or an electromagnetic wave having the first polarization. The first polarization may be a horizontal or a vertical polarization. Alternatively or in addition, the first signal may consist of, may comprise, may use, or may be based on a light beam or an electromagnetic wave having a first polarization, and the second signal may consist of, may comprise, may use, or may be based on, a light beam or an electromagnetic wave having a second polarization that may be different from the first polarization. The first polarization may be a horizontal or a vertical polarization. Any apparatus or device herein may comprise a first polarizer for substantially passing the first polarization and for substantially stopping the second polarization coupled or attached to filter the reflected first signal received by the first sensor, and a second polarizer for substantially passing the second polarization and for substantially stopping the first polarization coupled or attached to filter the reflected second signal received by the second sensor. The first sensor may be configured for substantially receiving and sensing the first polarization and for substantially attenuating the second polarization, and the second sensor may be configured for substantially receiving and sensing the second polarization and for substantially attenuating the second polarization.

Any apparatus or device herein may further comprise a first separator coupled between the first sensor and the first correlator for passing the first sensor output in response to the received reflected first signal and to substantially stop the first sensor output in response to the received reflected second signal, and a second separator coupled between the second sensor and the second correlator for passing the second sensor output in response to the received reflected second signal and to substantially stop the second sensor output in response to the received reflected first signal. Using a periodic signal, the first separator may be operative to pass signals that may be phase shifted in a first range from the periodic signal and the second separator may be operative to pass signals that may be phase shifted in a second range from the periodic signal, and the second range may be different from the first range. The first signal may consist of, may comprise, may use, or may be based on, the periodic signal, and the second signal may consist of, may comprise, or may be based on, the first signal being phase shifted, and the first range may consist of, may comprise, or may use the periodic signal shifted by less than 180°, 120°, 90°, 60°, 30°, 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°, and the second range may consist of, may comprise, or may use the second signal shifted by less than 180°, 120°, 90°, 60°, 30°, 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°.

Using first and second frequency bands, the first separator may consist of, may comprise, or may use, a first filter operative to substantially pass the first frequency band and to substantially stop the second frequency band, and the second separator may consist of, may comprise, or may use, a second filter operative to substantially pass the second frequency band and to substantially stop the first frequency band. The first filter may be a Low-Pass Filter (LPF) for passing frequencies below a first cut-off frequency, and the second filter may be a High-Pass Filter (HPF) for passing frequencies above a second cut-off frequency. The second cut-off frequency may be identical or similar to the first cut-off frequency. The first sensor and the second sensor may consist of a single sensor, and any apparatus or device herein may further comprise a first separator coupled between the single sensor and the first correlator for passing the single sensor output in response to the received reflected first signal and to substantially stop the single sensor output in response to the received reflected second signal, and a second separator coupled between the single sensor and the second correlator for passing the single sensor output in response to the received reflected second signal and to substantially stop the single sensor output in response to the received reflected first signal.

Any apparatus or device herein may further comprise a signal conditioner coupled to the first sensor output for conditioning or manipulating of the first sensor output signal, and the signal conditioner may comprise a linear or non-linear conditioning or manipulating. The signal conditioner may comprise an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, an analog to digital (A/D) converter, or any combination thereof.

Any apparatus or device herein may further be operative to estimate or calculate a third distance (dt1) in response to, or based on, a correlation measured by the first correlator, and the first distance (d1) may be calculated or estimated based on the third distance (dt1). The distance between the first emitter and the first sensor may be c1, and the first distance (d1) may be estimated or calculated according to, or based on, $d1=(dt1^2-c1^2)/(2*dt1)$. Any apparatus or device herein may further be operative to estimate or calculate a fourth distance (dt2) in response to, or based on, a correlation measured by the second correlator, and the second distance (d2) may be calculated or estimated based on the fourth distance dt2. The distance between the second emitter and the second sensor may be c2, and the second distance (d2) may be estimated or calculated according to, or based on, $d2=(dt2^2-c2^2)/(2*dt2)$.

Any apparatus or device herein may further be operative to concurrently measure the first distance by the first distance meter and the second distance by the second distance meter. Further, any apparatus or device herein may be operative to be in first and in second states. In the first state, the first distance may be measured by the first distance meter, and in the second state, the second distance may be measured by the second distance meter. Any apparatus or device herein may further comprise a two-state controlled switch coupled between the processor, the first distance meter and the second distance meter, where in the first state the switch connects the first distance meter to the processor and in the second state the switch connects the second distance meter to the processor, and the switch may be controlled via a control port coupled to be controlled by the processor. Any switch herein may be a Single-Pole Dual-Throw (SPDT) switch, the pole may be coupled to the processor, and each of the throws may be coupled to a distinct distance meter.

Any switch herein may be based on, may be part of, or may consist of, an analog switch, digital switch, or relay, and the relay may be a solenoid-based electromagnetic relay, a reed relay, a Solid-State Relay (SSR), or a semiconductor based relay. Alternatively or in addition, the switch may be based on, may comprise, or may consist of, an electrical circuit that comprises an open collector transistor, an open drain transistor, a thyristor, a TRIAC, or an opto-isolator. Any switch herein may be based on, may comprise, or may consist of, an electrical circuit or a transistor, the transistor may be a field-effect transistor, the respective switch may be formed between a 'drain' and a 'source' pins, and the control port may be a 'gate' pin. The field-effect power transistor may be an N-channel or a P-channel field-effect transistor.

The first distance meter may be a non-contact distance meter that may comprise a first emitter for emitting a first signal substantially along the first line and a first sensor for receiving a reflected first signal from the first surface, the second distance meter may be a non-contact distance meter that comprises a second emitter for emitting a second signal substantially along the second line and a second sensor for receiving a reflected second signal from the first surface, and any apparatus or device herein may further comprise a correlator connectable to the first and second distance meters. Any apparatus or device herein may be further operative to be in a first and in a second states, where in the first state, the correlator may be connected to the first distance meter for measuring a correlation between the first signal emitted by the first emitter and the reflected first signal received by the first sensor, and in the second state, the correlator may be connected to the second distance meter for measuring a correlation between the second signal emitted by the second emitter and the reflected second signal received by the second sensor. Any apparatus or device herein may further comprise a two-state controlled switch coupled between the correlator, the first emitter, the first sensor, the second emitter, and the second sensor, where in the first state, the switch may connect the correlator to the first emitter and the first sensor, and in the second state, the switch may connect the correlator to the second emitter and the second sensor, and the switch may be controlled via a control port coupled to be controlled by the processor. The switch may be a Dual-Pole Dual-Throw (DPDT) switch, the poles may be coupled to the correlator, and each of the throw-pairs may be coupled to a distinct distance meter.

Any switch herein may be based on, may be part of, or may consist of, an analog switch, a digital switch, or a relay, which may be a solenoid-based electromagnetic relay, a reed relay, a Solid State Relay (SSR), or a semiconductor-based relay. Any switch herein may be based on, may comprise, or may consist of, an electrical circuit that comprises an open collector transistor, an open drain transistor, a thyristor, a TRIAC, or an opto-isolator. Any switch herein may be based on, may comprise, or may consist of, an electrical circuit or a transistor, which may be an N-channel or a P-channel field-effect transistor, and where the respective switch may be formed between a 'drain' and a 'source' pins, and the control port may be a 'gate' pin.

Any one of, or each of, the distance meters herein may measure the respective first distance (d1) or the second distance (d2) by using, or based on, one or more measurement cycles each in a time interval (T), and each measurement cycle may comprise emitting energy along a respective first and second lines, and receiving respectively reflected first and second signals from the first surface. Any one of, or each of, the distance meters herein may be an optical-based non-contact distance meter, and the emitted energy may be a light signal. Alternatively or in addition, any one of, or each of, the distance meters herein may be an acoustics-based non-contact distance meter, and the emitted energy may be a sound signal. Alternatively or in addition, any one of, or each of, the distance meters herein may be a radar-based non-contact distance meter, and the emitted energy may be a millimeter wave or microwave electromagnetic signal.

Any one of, or each of, the distance meters herein may further be operative to receive and detect reflected energy from a surface at a distance that may be below a maximum detected measured distance, and any maximum detected measured distance may be above than 1 cm (centimeter), 2 cm, 3 cm, 5 cm, 8 cm, 10 cm, 20 cm, 30 cm, 50 cm, 80 cm, 1 m (meter), 2 m, 3 m, 5 m, 8 m, 10 m, 20 m, 30 m, 50 m, 80 m, 100 m, 200 m, 300 m, 500 m, 800 m, 1 Km (kilometer), 2 Km, 3 Km, 5 Km, 8 Km, 10 Km, 20 Km, 30 Km, 50 Km, 80 Km, or 100 Km. Alternatively or in addition, any maximum detected measured distance may be less than 1 cm (centimeter), 2 cm, 3 cm, 5 cm, 8 cm, 10 cm, 20 cm, 30 cm, 50 cm, 80 cm, 1 m (meter), 2 m, 3 m, 5 m, 8 m, 10 m, 20 m, 30 m, 50 m, 80 m, 100 m, 200 m, 300 m, 500 m, 800 m, 1 Km (kilometer), 2 Km, 3 Km, 5 Km, 8 Km, 10 Km, 20 Km, 30 Km, 50 Km, 80 Km, or 100 Km. Further, any maximum detected measured distance may be calculated, or may be based on the, measurement cycle time interval (T) and the propagation speed (S) of the emitted energy in a medium, and any maximum detected measured distance may be based on, or may be calculated, according to T*S/2.

Any one of, or each of, the distance meters herein may measure the respective first distance (d1) and the second distance (d2) using, or based on, a single measurement cycle, or a multiple consecutive measurement cycles. For example, any one of, or each of, the distance meters herein may measure the respective first distance (d1) and the second distance (d2) using, or based on, more than 2, 3, 5, 8, 10, 12, 13, 15, 18, 20, 30, 50, 80, 100, 200, 300, 500, 800, or 1000 consecutive measurement cycles, or less than 3, 5, 8, 10, 12, 13, 15, 18, 20, 30, 50, 80, 100, 200, 300, 500, 800, or 1000 consecutive measurement cycles. Further, any one of, or each of, the distance meters herein may measure the respective first distance (d1) and the second distance (d2) using, or based on, an average or measurement results in multiple consecutive measurement cycles. Any distance meter herein may measure a distance using, or based on, multiple consecutive measurement cycles performed at an average rate that may be higher than 2, 3, 5, 8, 10, 12, 13, 15, 18, 20, 30, 50, 80, 100, 200, 300, 500, 800, 1000 cycles per seconds. Alternatively or in addition, any distance meter herein may measure a distance using, or based on, multiple consecutive measurement cycles time spaced by less than, or more than, 1 μs (micro-second), 2 μs, 3 μs, 5 μs, 8 μs, 10 μs, 20 μs, 30 μs, 50 μs, 80 μs, 100 μs, 200 μs, 300 μs, 500 μs, 800 μs, 1 ms (milli-second), 2 ms, 3 ms, 5 ms, 8 ms, 10 ms, 20 ms, 30 ms, 50 ms, 80 ms, 100 ma, 200 ma, 300 ms, 500 ma, 800 ma, 1 s (second), 2 s, 3 s, 5 s, 8s, or 10 s.

Any distance meter herein may measure a distance using, or based on, one or more measurement cycles each in a time interval (T), and there may be no time overlap between a measurement cycle of the first distance meter and a measurement cycle of the second distance meter. Alternatively or in addition, any distance meter herein may measure a distance using, or based on, multiple consecutive measurement cycles, and the multiple consecutive measurement cycles of any distance meter may be following the multiple consecutive measurement cycles of another distance meter. Alternatively or in addition, any distance meter herein may measure a distance using, or based on, alternate multiple consecutive measurement cycles, where each measurement cycle of any one distance meter may be following a measurement cycle of another distance meter, and each measurement cycle of the another distance meter may be following a measurement cycle of the one distance meter.

Any distance meter herein may measure a distance using, or based on, one or more measurement cycles each in the time interval (T), where at least one of the measurement cycle of any one distance meter may be time overlapping in whole or in part with at least one of the measurement cycle of another distance meter. The time overlap may be more than 80%, 82%, 85%, 87%, 90%, 92%, 95%, 98%, 99%, 99.5%, or 99.8% of the time interval (T). Alternatively or in addition, the at least one of the measurement cycle of any one distance meter may be starting substantially concurrently with the measurement cycle of another distance meter. The start of the measurement cycle of any distance meter may be within 20%, 18%, 15%, 13%, 10%, 8%, 5%, 2%, 1%, 0.5%, or 0.2% of the cycle time interval (T) of the start of the measurement cycle of another distance meter. Further, the start of the measurement cycle of any one distance meter may be substantially after ½*T, ⅓*T, or ¼*T of the cycle time interval (T) of the start of the measurement cycle of another distance meter.

The first distance meter, or any distance meter herein, maybe an optical-based non-contact distance meter and may comprise a first light emitter for emitting a first light signal substantially along the first line, a first photosensor for receiving a reflected first light signal from the first surface, and a first correlator for measuring a correlation between the first light signal emitted by the first light emitter and the reflected first light signal received by the first photosensor.

The second distance meter may be an optical-based non-contact distance meter that may comprise a second light emitter for emitting a second light signal substantially along the second line, a second photosensor for receiving a reflected second light signal from the first surface, and a second correlator for measuring a correlation between the second light signal emitted by the second light emitter and the reflected second light signal received by the second photosensor, and the second light emitter may be identical to, distinct from, or the same as, the first light emitter, the second photosensor may be identical to, different from, or the same as, the first photosensor, and the second correlator may be identical to, different from, or the same as, the first correlator, and the second light signal may be identical to, distinct from, or the same as, the first light signal. The second light signal may be identical to, or distinct from, the first light signal. The second light signal may use a carrier frequency or a frequency band that may be identical to, or distinct from, the first light signal carrier frequency or frequency band. The second distance meter may be a non-optical-based non-contact distance meter, such as an acoustics- or radar-based non-contact distance meter.

Any light signal herein may consist of, or may comprise, a visible light signal or a non-visible light signal. Further, any light signal herein may consist of, or comprise, a laser beam. The non-visible light signal may consist of, or may comprise, infrared or ultra-violet light spectrum.

Any light emitter herein may consist of, may comprise, may use, or may be based on, an electric light source that may convert electrical energy into light, and the electric light source may be configured to emit visible or non-visible light, and may be solid-state based. Alternatively or in addition, any light emitter herein may consist of, may comprise, or may use a Light-Emitting Diode (LED), which may be an Organic LED (OLED) or a polymer LED (PLED). Alternatively or in addition, any light emitter herein may consist of, may comprise, or may use a coherent or a laser beam emitter, which may comprise, or may use, a semiconductor or solid-state laser emitter, such as a laser diode. Alternatively or in addition, any light emitter herein may consist of, may comprise, or may be based on, silicon laser, Vertical Cavity Surface-Emitting Laser (VCSEL), a Raman laser, or a Quantum cascade laser, or a Vertical External-Cavity Surface-Emitting Laser (VECSEL), and may further consist of, comprise, or may use, a gas, chemical, or excimer laser.

Any photosensor herein may convert light into an electrical phenomenon and may be semiconductor-based. Further, any photosensor herein may consist of, may comprise, may use, or may be based on, a photodiode, a phototransistor, a Complementary Metal-Oxide-Semiconductor (CMOS), or a Charge-Coupled Device (CCD). The photodiode may consist of, may comprise, may use, or may be based on, a PIN diode or an Avalanche PhotoDiode (APD).

The first distance meter, or any distance meter herein, may be an acoustics-based non-contact distance meter that may comprise a first sound emitter for emitting a first sound signal substantially along the first line, a first sound sensor for receiving a reflected first sound signal from the first surface, and a first correlator for measuring a correlation between the first sound signal emitted by the first sound emitter and the reflected first sound signal received by the first sound sensor. The second distance meter may be an acoustics-based non-contact distance meter that may comprise a second sound emitter for emitting a second sound signal substantially along the second line, a second sound sensor for receiving a reflected second sound signal from the first surface, and a second correlator for measuring a correlation between the second sound signal emitted by the second sound emitter and the reflected second sound signal received by the second sound sensor. The second sound emitter may be identical to, distinct from, or the same as, the first sound emitter, the second sound sensor may be identical to, distinct from, or the same as, the first sound sensor, and the second correlator may be identical to, distinct from, or the same as, the first correlator, and the second sound signal may be identical to, distinct from, or the same as, the first sound signal. The second sound signal may be identical to, or distinct from, the first sound signal. The second sound signal may use a carrier frequency or a frequency spectrum that may be identical to, or distinct from, the first sound signal carrier frequency or frequency spectrum. The second distance meter may be a non-acoustics-based non-contact distance meter, such as an optics- or radar-based non-contact distance meter.

Any sound signal herein may consist of, or may comprise, an audible light signal using a carrier frequency or a frequency spectrum below 20 KHz and above 20 Hz, or an inaudible sound signal using a carrier frequency or a frequency spectrum below 100 KHz and above 20 KHz. The inaudible sound signal may comprise, or may use, a carrier frequency or a frequency spectrum above than 20 KHz, 30 KHz, 50 KHz, 80 KHz, 100 KHz, 150 KHz, 200 KHz, 250 KHz, 300 KHz, 350 KHz, 400 KHz, 450 KHz, 500 KHz, 550 KHz, 600 KHz, 650 KHz, 700 KHz, 750 KHz, 800 KHz, 850 KHz, 900 KHz, or 950 KHz. Further, any sound signal herein may consist of, or may comprise, an inaudible sound signal using a carrier frequency or a frequency spectrum below than 25 KHz, 30 KHz, 50 KHz, 80 KHz, 100 KHz, 150 KHz, 200 KHz, 250 KHz, 300 KHz, 350 KHz, 400 KHz, 450 KHz, 500 KHz, 550 KHz, 600 KHz, 650 KHz, 700 KHz, 750 KHz, 800 KHz, 850 KHz, 900 KHz, or 950 KHz.

Any sound emitter herein may consist of, may comprise, may use, or may be based on, an electric sound source that may convert electrical energy into sound waves, and the electric sound source may be configured to emit an audible or inaudible sound using omnidirectional, unidirectional, or bidirectional pattern. Further, the electric sound source may consist of, may comprise, may use, or may be based on, an electromagnetic loudspeaker, a piezoelectric speaker, an electrostatic loudspeaker (ESL), a ribbon magnetic loudspeaker, a planar magnetic loudspeaker, or a bending wave loudspeaker. Alternatively or in addition, the electric sound source may consist of, may comprise, may use, or may be based on, an electromechanical scheme or a ceramic-based piezoelectric effect. Alternatively or in addition, the electric sound source may consist of, may comprise, may use, or may be based on, an ultrasonic transducer that may be a piezoelectric transducer, crystal-based transducer, a capacitive transducer, or a magnetostrictive transducer.

Any photosensor herein may convert sound into an electrical phenomenon, and may consist of, may comprise, may use, or may be based on, measuring the vibration of a diaphragm or a ribbon. Further, any photosensor may consist of, may comprise, may use, or may be based on, a condenser microphone, an electret microphone, a dynamic microphone, a ribbon microphone, a carbon microphone, or a piezoelectric microphone.

The first distance meter, or any distance meter herein, may be a radar-based non-contact distance meter that may comprise a first antenna for radiating a first millimeter wave or microwave signal substantially along the first line and for receiving a reflected first millimeter wave or microwave signal from the first surface, and a first correlator for measuring a correlation between the first millimeter wave or microwave signal radiated by the first antenna and the reflected first millimeter wave or microwave signal received by the first antenna. The second distance meter may be a radar-based non-contact distance meter that may comprise a second antenna for radiating a second millimeter wave or microwave signal substantially along the second line and for receiving a reflected second millimeter wave or microwave signal from the first surface, and a second correlator for measuring a correlation between the second millimeter wave or microwave signal radiated by the second antenna and the reflected second millimeter wave or microwave signal received by the second antenna. The second antenna may be identical to, distinct from, or the same as, the first antenna, and the second correlator may be identical to, distinct from, or the same as, the first correlator, and the second millimeter wave or microwave signal may be identical to, distinct from, or the same as, the first millimeter wave or microwave signal.

The second distance meter may be a non-radar-based non-contact distance meter, such as an acoustics- or optical-based non-contact distance meter. The second millimeter wave signal may be identical to, or distinct from, the first millimeter wave or microwave signal. The second millimeter wave signal may consist of, may comprise, or may use, a carrier frequency or a frequency spectrum that may be identical to, or distinct from, the first millimeter wave or microwave signal carrier frequency or a frequency spectrum. Any distance meter herein may be based on, or may use, an Ultra WideBand (UWB) signal or a Micropower Impulse Radar (MIR).

Any millimeter wave or microwave signal herein may consist of, may comprise, or may use, a carrier frequency or a frequency spectrum that may be a licensed or unlicensed radio frequency band. The unlicensed radio frequency band may consist of, or may comprise, an Industrial, Scientific and Medical (ISM) radio band, such as 2.400-2.500 GHz, 5.725-5.875 GHz, 24.000-24.250 GHz, 61.000-61.500 GHz, 122.000-123.000 GHz, or 244.000-246.000 GHz.

Any transmitting antenna or any receiving antenna herein may consist of, may comprise, may use, or may be based on, a directional antenna that may consist of, may comprise, may use, or may be based on, an aperture antenna. The aperture antenna may consist of, may comprise, may use, or may be based on, a parabolic antenna, a horn antenna, a slot antenna, or a dielectric resonator antenna. The horn antenna may consist of, may comprise, may use, or may be based on, a pyramidal horn, a sectoral horn, an E-plane horn, an H-plane horn, an exponential horn, a corrugated horn, a conical horn, a diagonal horn, a ridged horn, a pyramidal horn, or a septum horn.

Any distance meter herein may be a non-contact distance meter that may comprise a first emitter for emitting a first signal substantially along the first line, a first sensor for receiving a reflected first signal from the first surface, and a first correlator coupled for measuring a correlation between the first signal emitted by the first emitter and the reflected first signal received by the first sensor. The first correlator may be operative for measuring the time interval or the phase difference between the first signal emitted by the first emitter and the reflected first signal received by the first sensor.

The first distance meter or any distance meter herein may be Time-Of-Flight (TOF)-based, whereby the first signal may be a pulse, and the first distance may be calculated or estimated in response to a time period between emitting the pulse and receiving the reflected emitted pulse. Any distance meter herein may further comprise a pulse generator coupled the first emitter for generating the pulse, and the first correlator may comprise a timer coupled to the pulse generator and to the first sensor for measuring the time period starting in response to the generated pulse and ending in response to the received reflected pulse by the first sensor. Any distance herein may be calculated or estimated based on the measured time-period $\Delta t$. Any signal herein may be propagated in a medium at a velocity c1, and the distance may be calculated or estimated based on, or according to, $c1*\Delta t/2$. The second distance meter may be Time-Of-Flight (TOF)-based, and the second signal may be a pulse.

The first distance meter or any distance meter herein may be phase-detection based, whereby the first signal may be a periodic signal, and the first distance may be calculated or estimated in response to a phase difference between the emitted signal and the received reflected signal. Any distance meter herein may further comprise a periodic signal generator coupled the first emitter for generating the periodic signal, and the first correlator may further comprise a phase detector coupled to the signal generator and to the first sensor for measuring the phase difference between the generated signal and received reflected signal by the first sensor. Any distance herein may be calculated or estimated based on the measured phase difference $\Delta\varphi$. The first signal may be propagated in a medium at a velocity c1 and may use a frequency f, and the first distance may be calculated or estimated based on, or according to, $c1*\Delta\varphi*f/(4*\Pi)$. The periodic signal generator may be a sinewave generator and the periodic signal may be sinewave signal. Alternatively or in addition, the periodic signal generator may be a repetitive signal generator and the periodic signal may be a square wave, a triangle wave, or a saw-tooth wave. Any distance meter herein may further comprise a heterodyne or homodyne scheme coupled for shifting a frequency. The second distance meter may be phase detection-based and the second signal may be a periodic signal.

Any apparatus or device herein may further comprise in its enclosure an antenna for transmitting and receiving first Radio-Frequency (RF) signals over the air; and a wireless transceiver coupled to the antenna for wirelessly transmitting and receiving first data over the air using a wireless network, the wireless transceiver coupled to be controlled by the processor.

Any apparatus or device herein may further be addressable in a wireless network using a digital address. The wireless network may connect to, may use, or may comprise, the Internet. The digital address may be a MAC layer address that may be MAC-48, EUI-48, or EUI-64 address type. Alternatively or in addition, the digital address may be a layer 3 address and may be a static or dynamic IP address that may be of IPv4 or IPv6 type address.

Any apparatus or device herein may further be operative to send a notification message over a wireless network using the wireless transceiver via the antenna, and may further be operative to periodically send multiple notification messages. The notification messages may be sent substantially every 1, 2, 5, or 10 seconds, every 1, 2, 5, or 10 minutes, every 1, 2, 5, or 10 hours, or every 1, 2, 5, or 10 days, or may be sent in response to a value of a measurement or a function thereof. Using a minimum or maximum threshold, the message may be sent in response to the value respectively below the minimum threshold or above the maximum threshold, and the sent message may comprise an indication of the time when the threshold was exceeded, and an indication of the value of the measurement or the function thereof.

The message may be sent over the Internet via the wireless network to a client device using a peer-to-peer scheme. Alternatively or in addition, the message may be sent over the Internet via the wireless network to an Instant Messaging (IM) server for being sent to a client device as part of an IM service. The message or the communication with the IM server may use, may be compatible with, or may be based on, SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), or Hypertext Transfer Protocol (HTTP).

Alternatively or in addition, the message may be a text-based message and the IM service may be a text messaging service, and the message may be according to, may use, or may be based on, a Short Message Service (SMS) message, the IM service may be a SMS service, the message may be according to, or may be based on, an electronic-mail (e-mail) message and the IM service may be an e-mail service, the message may be according to, or may be based on, WhatsApp message and the IM service may be a WhatsApp service, the message may be according to, or may be based on, a Twitter message and the IM service may be a Twitter service, or the message may be according to, or may be based on, a Viber message and the IM service may be a Viber service. Alternatively or in addition, the message may be a Multimedia Messaging Service (MMS) or an Enhanced Messaging Service (EMS) message that may include audio or video, and the IM service may respectively be an NMS or EMS service.

Any wireless transceiver herein may be operative to communicate in an ad-hoc scheme, and may be used with an intermediary device configured to communicate the first data with the intermediary device using an infrastructure scheme. The intermediary device may be a Wireless Access Point (WAP), a wireless switch, or a wireless router.

Any wireless network herein may be a Wireless Wide Area Network (WWAN), any wireless transceiver herein may be a WWAN transceiver, and any antenna herein may be a WWAN antenna. The WWAN may be a wireless broadband network, or may be a WiMAX network. Any antenna herein may be a WiMAX antenna, and any wireless transceiver herein may be a WiMAX modem, and the WiMAX network may be according to, may be compatible with, or may be based on, IEEE 802.16-2009. Alternatively or in addition, any wireless network herein may be a cellular telephone network, any antenna may be a cellular antenna, and any wireless transceiver may be a cellular modem. The cellular telephone network may be a Third Generation (3G) network that may use UMTS W-CDMA, UMTS HSPA, UMTS TDD, CDMA2000 1×RTT, CDMA2000 EV-DO, or GSM EDGE-Evolution, or the cellular telephone network may be a Fourth Generation (4G) network that uses HSPA+, Mobile WiMAX, LTE, LTE-Advanced, MBWA, or may be based on IEEE 802.20-2008.

Any wireless network herein may be a Wireless Personal Area Network (WPAN), any wireless transceiver may be a WPAN transceiver, and any antenna herein may be a WPAN antenna. The WPAN may be according to, may be compatible with, or may be based on, Bluetooth™ or IEEE 802.15.1-2005 standards, or the WPAN may be a wireless control network that may be according to, or may be based on, ZigBee™, IEEE 802.15.4-2003, or Z-Wave™ standard.

Any wireless network herein may be a Wireless Local Area Network (WLAN), any wireless transceiver may be a WLAN transceiver, and any antenna herein may be a WLAN antenna. The WLAN may be according to, may be compatible with, or may be based on, IEEE 802.11-2012, IEEE 802.11a, IEEE 802.11b, IEEE 802.11g, IEEE 802.11n, or IEEE 802.11ac. Any wireless network herein may use a licensed or unlicensed radio frequency band, and the unlicensed radio frequency band may be an Industrial, Scientific and Medical (ISM) radio band.

Any processor herein may be coupled to control and to receive the first distance from the first distance meter over a network. Alternatively or in addition, any processor may be coupled to control and to receive the second distance from the second distance meter over the network. Any apparatus or device herein may further comprise a first port for interfacing the network; a first transceiver coupled between the first port and the first distance meter for receiving the first distance from the first distance meter and for transmitting the first distance to the network; a second port for interfacing the network; and a second transceiver coupled between the second port and the processor meter for receiving the first distance from the first transceiver over the network. Any apparatus or device herein may further comprise a third port for interfacing the network; and a third transceiver coupled between the third port and the second distance meter for receiving the second distance from the second distance meter and for transmitting the second distance over the network to be received by the second transceiver via the second port.

Any network herein may be a wireless network, the first port may be an antenna for transmitting and receiving first Radio-Frequency (RF) signals over the air, and the first transceiver may be a wireless transceiver coupled to the antenna for wirelessly transmitting and receiving first data over the air using the wireless network. Alternatively or in addition, the network may be a wired network, the first port may be a connector for connecting to the network medium, and the first transceiver may be a wired transceiver coupled to the connector for transmitting and receiving first data over the wireless medium.

Any apparatus or device herein may be further operative for estimating a second angle (β) between a reference line defined by third and fourth points and a second surface or a second object, and may further comprise a third distance meter for measuring a third distance (d3) along a third line from the third point to the surface or the object; and a fourth distance meter for measuring a fourth distance (d2) along a fourth line from the fourth point to the surface or the object, and the processor may be coupled to control and to receive the third and fourth distances respectively from the third and fourth distance meters, and the single may enclosure may house the third and fourth distance meters. The third and fourth lines may be substantially parallel to each other, and the apparatus or device may be operative to calculate, by the processor, the estimated second angle (β) based on the third (d3) and fourth (d4) distances and to display the estimated second angle (β) or any function thereof by the display.

The angle between the third and the fourth lines may be less than 20°, 18°, 15°, 13°, 10°, 8°, 5°, 3°, 2°, 1°, 0.8°, 0.5°, 0.3°, 0.2°, or 0.1°. Alternatively or in addition, the third line or the fourth line may be perpendicular to, or substantially perpendicular to, a reference line defined by the third and fourth points, or the angle formed between the first line or the second line and the reference line may deviate from 90° by less than 20°, 18°, 15°, 13°, 10°, 8°, 5°, 3°, 2°, 1°, 0.8°, 0.5°, 0.3°, 0.2°, or 0.1°. Any apparatus or device herein may further be operative to calculate or estimate, by the processor, an angle according to, or based on, or (α−β), (α+β), (|α|−|β|), (|α|+|β|), and may further be operative to display the calculated or estimated angle by the display.

A third angle (ψ) may be formed between first and second reference lines, where the first reference line may be defined by the first and second points and the second reference line may be defined by the third and fourth points. The first and second reference lines may be parallel (or substantially parallel), or the third angle ($\psi$) formed between the first and second reference lines may be less than 20°, 18°, 15°, 13°, 10°, 8°, 5°, 3°, 2°, 1°, 0.8°, 0.5°, 0.3°, 0.2°, or 0.1°. Alternatively or in addition, the first and second reference lines may be perpendicular or substantially perpendicular to each other, or the angle ($\psi$) formed between the first and second reference lines may deviate from 90° or 270° by less than 20°, 18°, 15°, 13°, 10°, 8°, 5°, 3°, 2°, 1°, 0.8°, 0.5°, 0.3°, 0.2°, or 0.1°.

Alternatively or in addition, the first or second line may be parallel (or substantially parallel) to the third or fourth lines, or the angle formed between one of the first or second line and one of the third or fourth lines may be less than 20°, 18°, 15°, 13°, 10°, 8°, 5°, 3°, 2°, 1°, 0.8°, 0.5°, 0.3°, 0.2°, or 0.1°. Alternatively or in addition, each of the first or second line may be parallel (or substantially parallel) to each of the third or fourth line, or each of the angles formed between each of the first or second line and each of the third or fourth line may be less than 20°, 18°, 15°, 13°, 10°, 8°, 5°, 3°, 2°, 1°, 0.8°, 0.5°, 0.3°, 0.2°, or 0.1°. Any apparatus or device herein may further be operative to calculate or estimate, by the processor, an angle according to, or based on, $(\alpha-\beta)\pm\psi$, $(\alpha+\beta)\pm\psi$, $(|\alpha|-|\beta|)\pm\psi$, or $(|\alpha|+|\beta|)\pm\psi$, and may further be operative to display the calculated or estimated angle by the display.

An estimated second angle ($\beta$) may be calculated, by the processor, using, or based on, the difference (d4−d3) between the third (d3) and fourth (d4) distances. The third and fourth lines may be spaced a third distance (c) apart, and the estimated second angle ($\beta$) may be calculated, by the processor, using, or based on, the third distance (c), such as by using, or based on, (d4−d3)/c. Alternatively or in addition, the estimated second angle ($\beta$) may be calculated, by the processor, using, or based on, $\beta$=(arctan(d4−d3)/c), $\beta\beta$(arctan(d4*cos($\beta$1)−d3))/(c−d4*sin($\beta$1)) or (3=(arctan (d4−d3*cos($\beta$1)))/(c+d3*sin($\beta$1)). The third and fourth lines may form the angle $\beta$ therebetween.

Any apparatus or device herein may further be operative to calculate, by the processor, a fifth distance (da) using, or based on, the third (d3) and fourth (d4) distances and the calculated second angle ($\beta$). The fifth distance (da) may be calculated or estimated according to, or based on, da=(d3+d4)*cos($\alpha\beta$)/2, da=(d3+d4)*sin($\beta$)/2, da=c/cos($\beta$), da=(d3+d4)*$\cos^2(\beta)$/(2*sin($\beta$)), or da=(d3+d4)/(2*tg($\beta$)), and the calculated or estimated fifth distance (da) may be displayed by the display. Any apparatus or device herein may be further operative to calculate, by the processor, a sixth distance (db) using, or based on, the first distance (d1), the second distance (d2), and the calculated first angle ($\alpha$). Further, a seventh distance (dc) that may be based on, or a function of, the first (da) and the second (db) distances may be calculated, by the processor, and displayed by the display. The seventh distance (dc) may be based on, or a function of, the sum (da+db) or the difference (da−db) of the first (da) and the second (db) distances. Any apparatus or device herein may be further operative to calculate, by the processor, and to display by the display using a eighth distance (dd), a seventh distance (dc) that may be based on, or a function of, the sum (da+db)+dd. A first reference line may be defined by the first and second points and a second reference line may be defined by the third and fourth points, and the first and second reference lines may be parallel, or substantially parallel, at the eighth distance (dd) therebetween, and the distance between the first and second objects or surfaces may be estimated or calculated according to the sum (da+db)+dd.

Using a velocity s, a time (t) according to, or based on, t=da/s may be calculated or estimated, by the processor, and displayed by the display. Any apparatus or device herein may be moving at a velocity of s, or having a velocity component of s. Alternatively or in addition, a distinct object may be moving at a velocity of s, or may be having a velocity component of s. the fifth distance (da) may be calculated, by the processor, and displayed by the display using an angle $\beta$1, according to, or based on, da=(d'3+d'4)*cos($\beta$)/2, da=(d'3+d'4)*sin($\beta$)/2, da=c/cos($\beta$), da=(d'3+d'4)*$\cos^2(\beta)$/(2*sin($\beta$)), or da=(d'3+d'4)/(2*tg($\beta$)), where d'3=d3 or d'3=d3*(cos($\beta$1)+sin($\beta$1)*tg($\beta$)) or where d'4=d4 or d'4=d4*(cos($\beta$)+sin($\beta$1)*tg($\beta$)), where $\alpha$=(arctan (d4*cos($\beta$)−d3))/(c−d4*sin($\beta$1)) or $\alpha$=(arctan(d4−d3*cos ($\beta$1)))/(c+d3*sin($\beta$1)). The first and second lines may form the angle $\beta$1 therebetween.

Any apparatus or device herein may further comprise an actuator that converts electrical energy to affect or produce a physical phenomenon, the actuator may be coupled to be operated, controlled, or activated, by the processor, in response to a value of the first distance, the second distance, the first angle, or any combination, manipulation, or function thereof. The actuator may be housed in the single enclosure.

Any apparatus or device herein may further comprise a signal conditioning circuit coupled between the processor and the actuator. The signal conditioning circuit may be operative for attenuating, delaying, filtering, amplifying, digitizing, comparing, or manipulating a signal from the processor, and may comprise an amplifier, a voltage or current limiter, an attenuator, a delay line or circuit, a level translator, a galvanic isolator, an impedance transformer, a linearization circuit, a calibrator, a passive filter, an active filter, an adaptive filter, an integrator, a deviator, an equalizer, a spectrum analyzer, a compressor or a de-compressor, a coder, a decoder, a modulator, a demodulator, a pattern recognizer, a smoother, a noise remover, an average circuit, a Digital-to-Analog (A/D) converter, or an RMS circuit.

The actuator may be electrically powered from a power source, and may convert electrical power from the power source to affect or produce the physical phenomenon. Each of the actuator, the signal conditioning circuit, and power source may be housed in, or may be external to, the single enclosure. The power source may be an Alternating Current (AC) or a Direct Current (DC) power source, and may be a primary or a rechargeable battery, housed in a battery compartment.

Alternatively or in addition, the power source may be a domestic AC power, such as nominally 120 VAC/60 Hz or 230 VAC/50 Hz, and the apparatus or device may further comprise an AC power plug for connecting to the domestic AC power. Any apparatus or device herein may further comprise an AC/DC adapter connected to the AC power plug for being powered from the domestic AC power, and the AC/DC adapter may comprise a step-down transformer and an AC/DC converter for DC powering the actuator. Any apparatus or device herein may further comprise a switch coupled between the power source and the actuator, and the switch may be coupled to be controlled by the processor.

Any switch herein may be an electrically controlled AC power Single-Pole-Double-Throw (SPDT) switch, and may be used for switching AC power from the power source to the actuator. Any switch herein may comprise, may be based on, may be part of, or may consist of, a relay. Alternatively or in addition, any switch herein may be based on, may comprise, or may consist of, an electrical circuit that comprises an open collector transistor, an open drain transistor, a thyristor, a TRIAC, or an opto-isolator. Any relay herein may be a solenoid-based, an electromagnetic relay, a reed relay, an AC Solid State Relay (SSR), or a semiconductor-based relay.

Any actuator herein may comprise, or may be part of, a water heater, HVAC device, air conditioner, heater, washing machine, clothes dryer, vacuum cleaner, microwave oven, electric mixer, stove, oven, refrigerator, freezer, food processor, dishwasher, food blender, beverage maker, coffee-maker, answering machine, telephone set, home cinema device, HiFi device, CD or DVD player, induction cooker, electric furnace, trash compactor, electric shutter, or dehumidifier. Further, any actuator herein may comprise, may be part of, or may be integrated in part, or entirely, in an appliance.

Any apparatus or device herein may be used with a threshold, and any actuator herein may be coupled to be operated, controlled, or activated, by the processor, when the value is more than, or less than, the threshold. Any value herein may be the value of a distance (d) that may be according to, or may be based on, $d=(d1+d2)*\cos(\alpha)/2$, $d=(d1+d2)*\sin(\alpha)/2$, $d=c/\cos(\alpha)$, $d=(d1+d2)*\cos^2(\alpha)/(2*\sin(\alpha))$, or $d=(d1+d2)/(2*tg(\alpha))$. Alternatively or in addition, any value herein may be the value of the first angle or any function thereof, and the threshold may be less than, or higher than, 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°.

Any actuator herein may affect, create, or change the phenomenon that is associated with an object that is gas, air, liquid, or solid. Alternatively or in addition, any actuator herein may be operative to affect time-dependent characteristic that is a time-integrated, an average, an RMS (Root Mean Square) value, a frequency, a period, a duty-cycle, a time-integrated, or a time-derivative, of the phenomenon. Alternatively or in addition, any actuator herein may be operative to affect space-dependent characteristic that is a pattern, a linear density, a surface density, a volume density, a flux density, a current, a direction, a rate of change in a direction, or a flow, of the phenomenon.

Any actuator herein may consist of, or may comprise, an electric light source that converts electrical energy into light, and may emit visible or non-visible light for illumination or indication, and the non-visible light may be infrared, ultraviolet, X-rays, or gamma rays. Any electric light source herein may consist of, or may comprise, a lamp, an incandescent lamp, a gas discharge lamp, a fluorescent lamp, a Solid-State Lighting (SSL), a Light Emitting Diode (LED), an Organic LED (OLED), a polymer LED (PLED), or a laser diode.

Any actuator herein may consist of, or may comprise, a motion actuator that causes linear or rotary motion, and any apparatus or device herein may further comprise a conversion mechanism that may be coupled to, attached to, or part of, the actuator for converting to rotary or linear motion based on a screw, a wheel and axle, or a cam. Any conversion mechanism herein may consist of, may comprise, or may be based on, a screw, and any apparatus or device herein may further comprise a leadscrew, a screw jack, a ball screw or a roller screw that may be coupled to, attached to, or part of, the actuator. Alternatively or in addition, any conversion mechanism herein may consist of, may comprise, or may be based on, a wheel and axle, and any apparatus or device herein may further comprise a hoist, a winch, a rack and pinion, a chain drive, a belt drive, a rigid chain, or a rigid belt that may be coupled to, attached to, or part of, the actuator. Any motion actuator herein may further comprise a lever, a ramp, a screw, a cam, a crankshaft, a gear, a pulley, a constant-velocity joint, or a ratchet, for effecting the motion. Alternatively or in addition, any motion actuator herein may consist of, or may comprise, a pneumatic, hydraulic, or electrical actuator, which may be an electrical motor.

Any electrical motor herein may be a brushed, a brushless, or an uncommutated DC motor, and any DC motor herein may be a stepper motor that may be a Permanent Magnet (PM) motor, a Variable reluctance (VR) motor, or a hybrid synchronous stepper. Alternatively or in addition, any electrical motor herein may be an AC motor that may be an induction motor, a synchronous motor, or an eddy current motor. Further, any AC motor herein may be a single-phase AC induction motor, a two-phase AC servo motor, or a three-phase AC synchronous motor, and may further be a split-phase motor, a capacitor-start motor, or a Permanent-Split Capacitor (PSC) motor. Alternatively or in addition, any electrical motor herein may be an electrostatic motor, a piezoelectric actuator, or is a MEMS-based motor. Alternatively or in addition, any motion actuator herein may consist of, or may comprise, a linear hydraulic actuator, a linear pneumatic actuator, a linear induction electric motor (LIM), or a Linear Synchronous electric Motor (LSM). Alternatively or in addition, any motion actuator herein may consist of, or may comprise, a piezoelectric motor, a Surface Acoustic Wave (SAW) motor, a Squiggle motor, an ultrasonic motor, or a micro- or nanometer comb-drive capacitive actuator, a Dielectric or Ionic based Electroactive Polymers (EAPs) actuator, a solenoid, a thermal bimorph, or a piezoelectric unimorph actuator.

Any actuator herein may consist of, or may comprise, a compressor or a pump and may be operative to move, force, or compress a liquid, a gas or a slurry. Any pump herein may be a direct lift, an impulse, a displacement, a valveless, a velocity, a centrifugal, a vacuum, or a gravity pump. Further, any pump herein may be a positive displacement pump that may be a rotary lobe, a progressive cavity, a rotary gear, a piston, a diaphragm, a screw, a gear, a hydraulic, or a vane pump. Alternatively or in addition, any positive displacement pump herein may be a rotary-type positive displacement pump that is an internal gear, a screw, a shuttle block, a flexible vane, a sliding vane, a rotary vane, a circumferential piston, a helical twisted roots, or a liquid ring vacuum pump, may be a reciprocating-type positive displacement type that may be a piston, a diaphragm, a plunger, a diaphragm valve, or a radial piston pump, or may be a linear-type positive displacement type that may be a rope-and-chain pump. Alternatively or in addition, any pump herein may be an impulse pump that is a hydraulic ram, a pulser, or an airlift pump, may be a rotodynamic pump that may be a velocity pump, or may be a centrifugal pump that may be a radial flow, an axial flow, or a mixed flow pump. Any actuator herein may consist of, or may comprise, a display screen for visually presenting information.

Any display or any display screen herein may consist of, or may comprise, a monochrome, grayscale or color display and consists of an array of light emitters or light reflectors, or a projector that is based on an Eidophor, Liquid Crystal on Silicon (LCoS or LCOS), LCD, MEMS or Digital Light Processing (DLP™) technology. Any projector herein may consist of, or may comprise, a virtual retinal display. Further, any display or any display screen herein may consist of, or may comprise, a 2D or 3D video display that may support Standard-Definition (SD) or High-Definition (HD) standards, and may be capable of scrolling, static, bold or flashing the presented information.

Alternatively or in addition, any display or any display screen herein may consist of, or may comprise, an analog display having an analog input interface supporting NTSC, PAL or SECAM formats, and the analog input interface may include RGB, VGA (Video Graphics Array), SVGA (Super Video Graphics Array), SCART or S-video interface. Alternatively or in addition, any display or any display screen herein may consist of, or may comprise, a digital display having a digital input interface that may include IEEE1394, FireWire™, USB, SDI (Serial Digital Interface), HDMI (High-Definition Multimedia Interface), DVI (Digital Visual Interface), UDI (Unified Display Interface), DisplayPort, Digital Component Video or DVB (Digital Video Broadcast) interface. Alternatively or in addition, any display or any display screen herein may consist of, or may comprise, a Cathode-Ray Tube (CRT), a Field Emission Display (FED), an Electroluminescent Display (ELD), a Vacuum Fluorescent Display (VFD), or an Organic Light-Emitting Diode (OLED) display, a passive-matrix (PMOLED) display, an active-matrix OLEDs (AMOLED) display, a Liquid Crystal Display (LCD) display, a Thin Film Transistor (TFT) display, an LED-backlit LCD display, or an Electronic Paper Display (EPD) display that may be based on Gyricon technology, Electro-Wetting Display (EWD), or Electrofluidic display technology. Alternatively or in addition, any display or any display screen herein may consist of, or may comprise, a laser video display that is based on a Vertical-External-Cavity Surface-Emitting-Laser (VECSEL) or a Vertical-Cavity Surface-Emitting Laser (VCSEL). Further, any display or any display screen herein may consist of, or may comprise, a segment display based on a seven-segment display, a fourteen-segment display, a sixteen-segment display, or a dot matrix display, and may be operative to display digits, alphanumeric characters, words, characters, arrows, symbols, ASCII, non-ASCII characters, or any combination thereof.

Any actuator herein may consist of, or may comprise, a thermoelectric actuator that may be a heater or a cooler, may be operative for affecting the temperature of a solid, a liquid, or a gas object, and may be coupled to the object by conduction, convection, force convention, thermal radiation, or by the transfer of energy by phase changes. Any thermoelectric actuator herein may consist of, or may comprise, a cooler based on a heat pump driving a refrigeration cycle using a compressor-based electric motor, or an electric heater that may be a resistance heater or a dielectric heater. Further, any electric heater herein may consist of, or may comprise, an induction heater, and may be solid-state based or may be an active heat pump that may use, or may be based on, the Peltier effect.

Any actuator herein may consist of, or may comprise, a chemical or an electrochemical actuator, and may be operative for producing, changing, or affecting a matter structure, properties, composition, process, or reactions. Any electrochemical actuator herein may be operative for producing, changing, or affecting, an oxidation/reduction or an electrolysis reaction.

Any actuator herein may consist of, or may comprise, an electromagnetic coil or an electromagnet operative for generating a magnetic or electric field.

Any actuator herein may consist of, or may comprise, an electrical signal generator that may be operative to output repeating or non-repeating electronic signals, and the signal generator may be an analog signal generator having an analog voltage or analog current output, and the output of the analog signal generator may be a sine wave, a saw-tooth, a step (pulse), a square, or a triangular waveform, an Amplitude Modulation (AM), a Frequency Modulation (FM), or a Phase Modulation (PM) signal. Further, the signal generator may be an Arbitrary Waveform Generator (AWG) or a logic signal generator.

Any actuator herein may consist of, or may comprise, a sounder for converting an electrical energy to omnidirectional, unidirectional, or bidirectional pattern of emitted, audible or inaudible, sound waves. Any sounder herein may be audible, and may be an electromagnetic loudspeaker, a piezoelectric speaker, an electrostatic loudspeaker (ESL), a ribbon or planar magnetic loudspeaker, or a bending wave loudspeaker. Any sounder herein may be operative to emit a single or multiple tones, or may be operative to continuous or intermittent operation. Any sounder herein may be an electromechanical or a ceramic-based, and may be an electric bell, a buzzer (or beeper), a chime, a whistle or a ringer. Any sound herein may be audible, any sounder herein may be a loudspeaker, and any apparatus or device herein may be operative to store and play one or more digital audio content files.

Any device, component, or apparatus herein, may be structured as, may be shaped or configured to serve as, or may be integrated with, a wearable device. Any system, device, component, or apparatus herein may further be operative to estimate or calculate the person body orientation, such as the person head pose.

Any apparatus or device herein may be wearable on an organ such as on the person head, and the organ may be eye, ear, face, cheek, nose, mouth, lip, forehead, or chin. Alternatively or in addition, any apparatus or device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a headband, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any enclosure herein may be permanently or releaseably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top.

Any wearable apparatus or device herein may comprise an annular member defining an aperture therethrough that is sized for receipt therein of a part of a human body. The human body part may be part of a human hand that may consist of, or may comprise, an upper arm, elbow, forearm, wrist, or a finger. Alternatively or in addition, the human body part may be part of a human head or neck that may consist of, or may comprise, a forehead, ear, skull, or face. Alternatively or in addition, the human body part may be part of a human thorax or abdomen that may consist of, or may comprise, a waist or hip. Alternatively or in addition, the human body part may be part of a human leg or foot that may consist of, or may comprise, a thigh, calf, ankle, instep, knee, or toe.

Any device, component, or apparatus herein, may be used with, integrated with, or used in combination with, a Virtual Reality (VR) system simulating a virtual environment to a person, and the estimated first angle ($\alpha$), the first distance (d1), the second distance (d2), or any function thereof, may be used by the VR system. The communication with the VR system may be wired or wireless, and the VR system may comprise a Head-Mounted Display (HMD). The simulated virtual environment may be responsive to the estimated first angle ($\alpha$), the first distance (d1), the second distance (d2), or any function thereof.

A device may be used for estimating an angle ($\alpha$) between a reference line defined by first and second points and a surface. The device may comprise a first distance meter for measuring a first distance (d1) along a first line from the first point to the surface; a second distance meter for measuring a second distance (d2) along a second line from the second point to the surface; a software and a processor for executing the software, the processor coupled to control and to receive the first and second distances respectively from the first and second distance meters; a display coupled to the processor for visually displaying data from the processor; and a single enclosure housing the first and second distance meters, the processor, and the display; so that the first and second lines may be substantially parallel, and the device may be operative to calculate the estimated angle ($\alpha$) based on the first distance (d1) and the second distance (d2), and to display the estimated angle ($\alpha$) by the display. The angle between the first and the second lines may be less than 20°, 18°, 15°, 13°, 10°, 8°, 5°, 3°, 2°, 1°, 0.8°, 0.5°, 0.3°, 0.2°, or 0.1°. The first and second lines may be at an angle that may be less than, or more than, 20°, 18°, 15°, 13°, 10°, 8°, 5°, 3°, 2°, 1°, 0.8°, 0.5°, 0.3°, 0.2°, or 0.1°.

The estimated angle ($\alpha$) may be calculated using, or based on, the difference (d2-d1) between the first distance (d1) and the second distance (d2), and the first and second lines may be spaced a third distance (c) apart, and the estimated angle ($\alpha$) may be calculated using, or based on, the third distance (c). The estimated angle ($\alpha$) may be calculated using, or based on, (d2-d1)/c, such as using, or based on, $\alpha$=(arctan (d2−d1)/c). The device may further be operative to calculate another distance (d) using, or based on, the first distance (d1) and the second distance (d2) and the calculated angle ($\alpha$), according to, or based on, $d=(d1+d2)*\cos(\alpha)/2$, $d=(d1+d2)*\sin(\alpha)/2$, $d=c/\cos(\alpha)$, $d=(d1+d2)*\cos^2(\alpha)/(2*\sin(\alpha))$, or $d=(d1+d2)/(2*tg(\alpha))$. The device may be used with a velocity s, may be moving at a velocity of s, or a distinct object may be moving at a velocity of s, or having a velocity component of s, and the device may further be operative to calculate or estimate a time (t) according to, or based on, t=d/s.

The device may further be operative to calculate an estimated distance dact between a point centered between the first and second points and the surface using, or based on, the first distance (d1) and the second distance (d2), and to display the estimated distance dact by the display. The estimated distance dact may be calculated using, or based on, the difference (d2−d1) between the first (d1) and second (d2) distances. The first and second lines may be spaced a third distance (c) apart, so that the estimated distance dact may be calculated using, or based on, the third distance (c), such as using, or based on, (d2−d1)/c. The estimated distance dact may be calculated using, or based on, calculating or estimating of an angle ($\alpha$) according to $\alpha$=arctan(d2−d1)/c, and the estimated distance dact may be calculated using, or based on, $dact=(d1+d2)*\cos(\alpha)/2$.

The device may further be operative to calculate an estimated distance ds on the surface between a point centered between the first and second lines points on the surface and a point closest to the point centered between the first and second points using, or based on, the first distance (d1) and the second distance (d2), and to display the estimated distance ds by the display. The estimated distance ds may be calculated using, or based on, the difference (d2−d1) between the first distance (d1) and the second distance (d2). The first and second lines may be spaced a third distance (c) apart, so that the estimated distance ds may be calculated using, or based on, the third distance (c), such as using, or based on, (d2−d1)/c. The estimated distance ds may be calculated using, or based on, calculating estimated angle ($\alpha$) according to $\alpha$=arctan(d2-d1)/c, and the estimated distance may be calculated using, or based on, $ds=(d1+d2)*\sin(\alpha)/2$.

The device may further be operative to calculate or estimate an estimated distance dist by using, or based on, the first distance (d1) and the second distance (d2), and to display the distance dist by the display. The first and second lines may be spaced a third distance (c) apart, so that the estimated distance dist may be calculated or estimated using, or based on, the difference (d2−d1) between the first distance (d1) and the second distance (d2), and on the third distance (c), and the distance dist may be calculated or estimated using, or based on, calculating estimated angle ($\alpha$) according to $\alpha$=arctan(d2−d1)/c, and the distance dist may be calculated or estimated using, or based on, $dist=c/\cos(\alpha)=c/\cos(\arctan(d2-d1)/c)$.

The device may further be operative to calculate or estimate an estimated distance dm by using, or based on, the first distance (d1) and the second distance (d2), and to display the distance dm by the display. The first and second lines may be spaced a third distance (c) apart, so that the estimated distance dm may be calculated or estimated using, or based on, the difference (d2−d1) between the first distance (d1) and the second distance (d2), and on the third distance (c). The distance dm may be calculated or estimated using, or based on, calculating estimated angle ($\alpha$) according to $\alpha$=arctan(d2-d1)/c, and the distance dm may be calculated or estimated using, or based on, $dm=(d1+d2)*\cos^2(\alpha)/(2*\sin(\alpha))$ The device may further be operative to calculate or estimate an estimated distance dn by using, or based on, the first distance (d1) and the second distance (d2), and to display the distance dn by the display. The first and second lines may be spaced a third distance (c) apart, and the estimated distance dn may be calculated or estimated using, or based on, the difference (d2-d1) between the first distance (d1) and the second distance (d2), and on the third distance (c). The distance dn may be calculated or estimated using, or based on, calculating estimated angle ($\alpha$) according to $\alpha$=arctan(d2−d1)/c, and the distance dn may be calculated or estimated using, or based on, $dn=(d1+d2)/(2*tg(\alpha))$.

A non-mobile apparatus may comprise the device, and the device may be mounted so that the first and second lines may be substantially vertical or horizontal to each other. An angle formed between the first line or the second line and a vertical line, surface, or plane, may be less than 20°, 18°, 15°, 13°, 10°, 8°, 5°, 3°, 2°, 1°, 0.8°, 0.5°, 0.3°, 0.2°, or 0.1°. An angle formed between the first line or the second line and a horizontal line, surface, or plane, may be less than 20°, 18°, 15°, 13°, 10°, 8°, 5°, 3°, 2°, 1°, 0.8°, 0.5°, 0.3°, 0.2°, or 0.1°. The non-mobile apparatus may further be having an elongated aspect or side, and the device may be mounted so that the first and second lines may be substantially vertical or horizontal to the elongated aspect or side.

A mobile apparatus may comprise the device, and the device may be mounted so that the first and second lines may be substantially vertical or horizontal. An angle formed between the first line or the second line and a vertical line, surface, or plane, may be less than 20°, 18°, 15°, 13°, 10°, 8°, 5°, 3°, 2°, 1°, 0.8°, 0.5°, 0.3°, 0.2°, or 0.1°. An angle formed between the first line or the second line and a horizontal line, surface, or plane, may be less than 20°, 18°, 15°, 13°, 10°, 8°, 5°, 3°, 2°, 1°, 0.8°, 0.5°, 0.3°, 0.2°, or 0.1°. The mobile apparatus may be a vehicle operative to travel in a direction, and the device may be mounted so that the first and the second lines may be substantially parallel or perpendicular to the travel direction, an angle formed between the first line or the second line and the travel direction may be less than 20°, 18°, 15°, 13°, 10°, 8°, 5°, 3°, 2°, 1°, 0.8°, 0.5°, 0.3°, 0.2°, or 0.1°, and an angle formed between the first line or the second line and a direction that may be perpendicular to the travel direction may be less than 20°, 18°, 15°, 13°, 10°, 8°, 5°, 3°, 2°, 1°, 0.8°, 0.5°, 0.3°, 0.2°, or 0.1°. The vehicle may be a ground vehicle adapted to travel on land, such as a bicycle, a car, a motorcycle, a train, an electric scooter, a subway, a train, a trolleybus, and a tram. Alternatively or in addition, the vehicle may be a buoyant or submerged watercraft adapted to travel on or in water, such as a ship, a boat, a hovercraft, a sailboat, a yacht, and a submarine. Alternatively or in addition, the vehicle may be an aircraft adapted to fly in air, such as a fixed wing or a rotorcraft aircraft, for example, an airplane, a spacecraft, a glider, a drone, or an Unmanned Aerial Vehicle (UAV), and the device may be used for measuring or estimating an altitude, a pitch, or a roll of the aircraft. Alternatively or in addition, the device may be used for measuring or estimating the apparatus speed, positioning, pitch, roll, or yaw of the mobile apparatus.

The first distance meter may be a non-contact distance meter that comprises a first emitter for emitting a first signal substantially along the first line, a first sensor for receiving a reflected first signal from the surface, and a first correlator coupled for measuring a correlation between the first signal emitted by the first emitter and the reflected first signal received by the first sensor. Alternatively or in addition, the second distance meter may be a non-contact distance meter that comprises a second emitter for emitting a second signal substantially along the second line, a second sensor for receiving a reflected second signal from the surface, and a second correlator coupled for measuring a correlation between the second signal emitted by the second emitter and the reflected second signal received by the second sensor. The second distance meter may be identical to, or distinct from, the first distance meter. Alternatively or in addition, the second distance meter may be the first distance meter. The second emitter may be identical to, or distinct from, the first emitter, or the same emitter may serve as both the second emitter and the first emitter. The second sensor may be identical to, or distinct from, the first sensor, or the same sensor may serve as both the second sensor and the first sensor. The second correlator may be identical to, or distinct from, the first correlator, or the same correlator may serve as both the second correlator and the first correlator. The second signal may be identical to, or distinct from, the first signal, or the same signal may serve as both the second signal and the first signal.

The device may further be operative to concurrently measure the first distance by the first distance meter and the second distance by the second distance meter. The device may be operative to be in first and in second states, and in the first state the first distance may be measured by the first distance meter, and in the second state the second distance may be measured by the second distance meter. The device may further comprise a two-state controlled switch coupled between the processor, the first distance meter and the second distance meter, so that in the first state the switch connects the first distance meter to the processor and in the second state the switch connects the second distance meter to the processor, and the switch may be controlled via a control port coupled to be controlled by the processor. The switch may be a Single-Pole Dual-Throw (SPDT) switch, the pole may be coupled to the processor, and each of the throws may be coupled to a distinct distance meter. The switch may be based on, may be part of, or may consist of, an analog switch, a digital switch, or a relay, and the relay may be a solenoid-based electromagnetic relay, a reed relay, a solid-state (such as a Solid State Relay (SSR)), or semiconductor based relay. Alternatively or in addition, the switch may be based on, may comprise, or may consist of, an electrical circuit that comprises an open collector transistor, an open drain transistor, a thyristor, a TRIAC, or an opto-isolator, and the switch may be based on, may comprise, or may consist of, an electrical circuit or a transistor. The transistor may be a field-effect transistor, and the respective switch may be formed between 'drain' and 'source' pins, and the control port may be a 'gate' pin, and the field-effect power transistor may be an N-channel or a P-channel field-effect transistor.

The first distance meter may be a non-contact distance meter that may comprise a first emitter for emitting a first signal substantially along the first line and a first sensor for receiving a reflected first signal from the surface, and the second distance meter may be a non-contact distance meter that may comprise a second emitter for emitting a second signal substantially along the second line and a second sensor for receiving a reflected second signal from the surface, and the device may further comprise a correlator connectable to the first and second distance meters. The device may further be operative to be in a first and in a second states, so that in the first state, the correlator may be connected to the first distance meter for measuring a correlation between the first signal emitted by the first emitter and the reflected first signal received by the first sensor, and in the second state, the correlator may be connected to the second distance meter for measuring a correlation between the second signal emitted by the second emitter and the reflected second signal received by the second sensor. The device may further comprise a two-state controlled switch coupled between the correlator, the first emitter, the first sensor, the second emitter, and the second sensor, so that in the first state, the switch connects the correlator to the first emitter and the first sensor, and in the second state, the switch connects the correlator to the second emitter and the second sensor, and the switch may be controlled via a control port coupled to be controlled by the processor. The switch may be a Dual-Pole Dual-Throw (DPDT) switch, so that the poles may be coupled to the correlator, and each of the throw-pairs may be coupled to a distinct distance meter. The switch may be based on, may be part of, or may consist of, an analog switch, a digital switch, or a relay that may be a solenoid-based electromagnetic relay, a reed relay, a solid-state or semiconductor based relay, or a Solid State Relay (SSR). Alternatively or in addition, the switch may be based on, may comprise, or may consist of, an electrical circuit that comprises an open collector transistor, an open drain transistor, a thyristor, a TRIAC, or an opto-isolator. Alternatively or in addition, the switch may be based on, may comprise, or may consist of, an electrical circuit or a transistor. The transistor may be a Field-Effect Transistor, and the respective switch may be formed between the 'drain' and 'source' pins, and the control port may be a 'gate' pin, and the field-effect power transistor may be an N-channel or a P-channel field-effect transistor.

One of, or each of, the first and second distance meters may measure the respective first distance (d1) and the second distance (d2), using, or based on, one or more measurement cycles each in a time interval (T), each measurement cycle may comprise emitting energy along a respective first and second lines, and receiving respectively reflected first and second signals from the surface. One of, or each of, the first and second distance meters may be an optical-based non-contact distance meter, and the emitted energy may be a light signal. Alternatively or in addition, one of, or each of, the first and second distance meters may be an acoustics-based non-contact distance meter, and the emitted energy may be a sound signal. Alternatively or in addition, one of, or each of, the first and second distance meters may be a radar-based non-contact distance meter, and the emitted energy may be a millimeter wave or microwave electromagnetic signal. The device may be operative to receive and detect reflected energy from a surface at a distance that may be below a maximum detected measured distance, and the maximum detected measured distance may be above than, or below than, 1 cm (centimeter), 2 cm, 3 cm, 5 cm, 8 cm, 10 cm, 20 cm, 30 cm, 50 cm, 80 cm, 1 m (meter), 2 m, 3 m, 5 m, 8 m, 10 m, 20 m, 30 m, 50 m, 80 m, 100 m, 200 m, 300 m, 500 m, 800 m, 1 Km (kilometer), 2 Km, 3 Km, 5 Km, 8 Km, 10 Km, 20 Km, 30 Km, 50 Km, 80 Km, or 100 Km. The maximum detected measured distance may be calculated or may be based on the measurement cycle time interval (T) and the propagation speed (S) of the emitted energy in a medium, such as based on or calculated according to T*S/2.

One of, or each of, the first and second distance meters measures a respective first distance (d1) and a second distance (d2) may be using or may be based on a single measurement cycle, or may be using or may be based on multiple consecutive measurement cycles. One of, or each of, the first and second distance meters measures the respective first distance (d1) and the second distance (d2) may be using or may be based on more than, or lower than, 2, 3, 5, 8, 10, 12, 13, 15, 18, 20, 30, 50, 80, 100, 200, 300, 500, 800, or 1000 consecutive measurement cycles, and the respective first distance (d1) and the second distance (d2) may be calculated using or may be based on an average or measurement results in multiple consecutive measurement cycles. Alternatively or in addition, one of, or each of, the first and second distance meters measures a respective first distance (d1) and a second distance (d2) may be using or may be based on multiple consecutive measurement cycles performed at an average rate that may be higher than 2, 3, 5, 8, 10, 12, 13, 15, 18, 20, 30, 50, 80, 100, 200, 300, 500, 800, 1000 cycles per seconds. Alternatively or in addition, one of, or each of, the first and second distance meters measures a respective first distance (d1) and a second distance (d2) may be using or may be based on multiple consecutive measurement cycles time spaced by less than, or more than, 1 μs (micro-second), 2 μs, 3 μs, 5 μs, 8 μs, 10 μs, 20 μs, 30 μs, 50 μs, 80 μs, 100 μs, 200 μs, 300 μs, 500 μs, 800 μs, 1 ms (milli-second), 2 ms, 3 ms, 5 ms, 8 ms, 10 ms, 20 ms, 30 ms, 50 ms, 80 ms, 100 ma, 200 ma, 300 ms, 500 ma, 800 ma, 1 s (second), 2 s, 3 s, 5 s, 8s, or 10 s.

Each of the first and second distance meters may measure the respective first distance (d1) and the second distance (d2) may be using or may be based on one or more measurement cycles each in a time interval (T), and there may be no time overlap between a measurement cycle of the first distance meter and a measurement cycle of the second distance meter. Alternatively or in addition, each of the first and second distance meters may measure the respective first distance (d1) and the second distance (d2) may be using or may be based on multiple consecutive measurement cycles, and the multiple consecutive measurement cycles of the second distance meter may be following the multiple consecutive measurement cycles of the first distance meter. Alternatively or in addition, each of the first and second distance meters may measure the respective first distance (d1) and the second distance (d2) may be using or may be based on alternate multiple consecutive measurement cycles, and each measurement cycle of the second distance meter may be following a measurement cycle of the first distance meter, and each measurement cycle of the first distance meter may be following a measurement cycle of the second distance meter, One of, or each of, the first and second distance meters may measure the respective first distance (d1) and the second distance (d2) by using, or based on, one or more measurement cycles each in the time interval (T), and at least one of the measurement cycle of the first distance meter may be time overlapping in whole or in part with at least one of the measurement cycle of the second distance meter, and the time overlap may be more than 80%, 82%, 85%, 87%, 90%, 92%, 95%, 98%, 99%, 99.5%, or 99.8% of the time interval (T). Alternatively or in addition, at least one of the measurement cycle of the first distance meter may be starting substantially concurrently with the measurement cycle of the second distance meter, and the start of the measurement cycle of the first distance meter may be within 20%, 18%, 15%, 13%, 10%, 8%, 5%, 2%, 1%, 0.5%, or 0.2% of the cycle time interval (T) of the start of the measurement cycle of the second distance meter. Alternatively or in addition, the start of the measurement cycle of the first distance meter may be substantially after ½*T, ¼*T, or ¼*T of the cycle time interval (T) of the start of the measurement cycle of the second distance meter.

The first distance meter may be an optical-based non-contact distance meter that may comprise a first light emitter for emitting a first light signal substantially along the first line, a first photosensor for receiving a reflected first light signal from the surface, and a first correlator for measuring a correlation between the first light signal emitted by the first light emitter and the reflected first light signal received by the first photosensor. The second distance meter may be an optical-based non-contact distance meter that may comprise a second light emitter for emitting a second light signal substantially along the second line, a second photosensor for receiving a reflected second light signal from the surface, and a second correlator for measuring a correlation between the second light signal emitted by the second light emitter and the reflected second light signal received by the second photosensor, and the second light emitter may be identical to, distinct from, or the same as, the first light emitter, the second photosensor may be identical to, distinct from, or the same as, the first photosensor, and the second correlator may be identical to, distinct from, or the same as, the first correlator, and the second light signal may be identical to, distinct from, or the same as, the first light signal.

The second light signal may be identical to, or distinct from, the first light signal. The second light signal may use a carrier frequency or a frequency band that may be identical to, or distinct from, the first light signal carrier frequency or frequency band. The second distance meter may be a non-optical-based non-contact distance meter, such as an acoustics- or radar-based non-contact distance meter. The first light signal may consist of, or may comprise, a visible or non-visible light signal. The non-visible light signal may consist of, or may comprise, infrared or ultra-violet light spectrum, and the first light signal may consist of, or may comprise, a laser beam.

The first light emitter may consist of, may comprise, may use, or may be based on, an electric light source that converts electrical energy into light, may be configured to emit visible or non-visible light, and may be solid-state based. The first light emitter may consist of, may comprise, or may use a Light-Emitting Diode (LED), such as an Organic LED (OLED) or a polymer LED (PLED). Alternatively or in addition, the first light emitter may consist of, may comprise, or may use a laser beam emitter that may consist of, may comprise, or may use a semiconductor or solid-state laser emitter such as a laser diode. Alternatively or in addition, the first light emitter may consist of, may comprise, or may be based on, silicon laser, Vertical Cavity Surface-Emitting Laser (VCSEL), a Raman laser, or a Quantum cascade laser, or a Vertical External-Cavity Surface-Emitting Laser (VECSEL).

The first photosensor may be semiconductor-based and may convert light into an electrical phenomenon, and may consist of, may comprise, may use, or may be based on, a phototransistor, a Complementary Metal-Oxide-Semiconductor (CMOS), or a Charge-Coupled Device (CCD), or a photodiode that may consist of, may comprise, may use, or may be based on, a PIN diode or an Avalanche PhotoDiode (APD).

The first distance meter may be an acoustics-based non-contact distance meter that may comprise a first sound emitter for emitting a first sound signal substantially along the first line, a first sound sensor for receiving a reflected first sound signal from the surface, and a first correlator for measuring a correlation between the first sound signal emitted by the first sound emitter and the reflected first sound signal received by the first sound sensor. The second distance meter may be an acoustics-based non-contact distance meter that may comprise a second sound emitter for emitting a second sound signal substantially along the second line, a second sound sensor for receiving a reflected second sound signal from the surface, and a second correlator for measuring a correlation between the second sound signal emitted by the second sound emitter and the reflected second sound signal received by the second sound sensor, and the second sound emitter may be identical to, distinct from, or the same as, the first sound emitter, the second sound sensor may be identical to, distinct from, or the same as, the first sound sensor, and the second correlator may be identical to, distinct from, or the same as, the first correlator, and the second sound signal may be identical to, distinct from, or the same as, the first sound signal. The second sound signal may be identical to, or distinct from, the first sound signal. The second sound signal may be using a carrier frequency or a frequency spectrum that may be identical to, or distinct from, the first sound signal carrier frequency or frequency spectrum. The second distance meter may be a non-acoustics-based non-contact distance meter, such as an optics- or radar-based non-contact distance meter.

The first sound signal may consist of, or may comprise, an audible light signal using a carrier frequency or a frequency spectrum below 20 KHz and above 20 Hz, or an inaudible sound signal using a carrier frequency or a frequency spectrum below 100 KHz and above 20 KHz. The first sound emitter may consist of, may comprise, may use, or may be based on, an electric sound source that converts electrical energy into sound waves, and may be configured to emit an audible or inaudible sound using omnidirectional, unidirectional, or bidirectional pattern. The electric sound source may consist of, may comprise, may use, or may be based on, an electromagnetic loudspeaker, a piezoelectric speaker, an electrostatic loudspeaker (ESL), a ribbon magnetic loudspeaker, a planar magnetic loudspeaker, a bending wave loudspeaker, an electromechanical scheme, or a ceramic-based piezoelectric effect. The electric sound source may consist of, may comprise, may use, or may be based on, an ultrasonic transducer such as a piezoelectric transducer, crystal-based transducer, a capacitive transducer, or a magnetostrictive transducer.

The first photosensor may convert sound into an electrical phenomenon, and may consist of, may comprise, may use, or may be based on, measuring the vibration of a diaphragm or a ribbon. Alternatively or in addition, the first photosensor may consist of, may comprise, may use, or may be based on, a condenser microphone, an electret microphone, a dynamic microphone, a ribbon microphone, a carbon microphone, or a piezoelectric microphone.

The first distance meter may be a radar-based non-contact distance meter that may comprise a first antenna for radiating a first millimeter wave or microwave signal substantially along the first line and for receiving a reflected first millimeter wave or microwave signal from the surface, and a first correlator for measuring a correlation between the first millimeter wave or microwave signal radiated by the first antenna and the reflected first millimeter wave or microwave signal received by the first antenna. The second distance meter may be a radar-based non-contact distance meter that comprises a second antenna for radiating a second millimeter wave or microwave signal substantially along the second line and for receiving a reflected second millimeter wave or microwave signal from the surface, and a second correlator for measuring a correlation between the second millimeter wave or microwave signal radiated by the second antenna and the reflected second millimeter wave or microwave signal received by the second antenna, and the second antenna may be identical to, distinct from, or the same as, the first antenna, and the second correlator may be identical to, distinct from, or the same as, the first correlator, and the second millimeter wave or microwave signal may be identical to, distinct from, or the same as, the first millimeter wave or microwave signal.

The second distance meter may be a non-radar-based non-contact distance meter, such as an acoustics- or optical-based non-contact distance meter. The second millimeter wave signal may be identical to, or distinct from, the first millimeter wave or microwave signal, and may consist of, or may comprise, or may use a carrier frequency or a frequency spectrum that may be identical to, or distinct from, the first millimeter wave or microwave signal carrier frequency or a frequency spectrum. The first distance meter may be based on, or may be using, a Micropower Impulse Radar (MIR), or may be based on, or may be using, an Ultra WideBand (UWB) signal. The first millimeter wave or microwave signal may consist of, may comprise, or may use a carrier frequency or a frequency spectrum that may be a licensed or unlicensed radio frequency band such as an Industrial, Scientific and Medical (ISM) radio band that may be 2.400-2.500 GHz, 5.725-5.875 GHz, 24.000-24.250 GHz, 61.000-61.500 GHz, 122.000-123.000 GHz, or 244.000-246.000 GHz.

The first transmitting antenna or the first receiving antenna may consist of, may comprise, may use, or may be based on, a directional antenna that may consist of, may comprise, may use, or may be based on, an aperture antenna. The aperture antenna may consist of, may comprise, may use, or may be based on, a parabolic antenna, a horn antenna, a slot antenna, or a dielectric resonator antenna. The horn antenna may consist of, may comprise, may use, or may be based on, a pyramidal horn, a sectoral horn, an E-plane horn, an H-plane horn, an exponential horn, a corrugated horn, a conical horn, a diagonal horn, a ridged horn, a pyramidal horn, or a septum horn.

The first distance meter may be a non-contact distance meter that may comprise a first emitter for emitting a first signal substantially along the first line, a first sensor for receiving a reflected first signal from the surface, and a first correlator coupled for measuring a correlation between the first signal emitted by the first emitter and the reflected first signal received by the first sensor. The first correlator may be operative for measuring the time interval or the phase difference between the first signal emitted by the first emitter and the reflected first signal received by the first sensor.

The first distance meter may be Time-Of-Flight (TOF)-based, whereby the first signal may be a pulse, and the first distance may be calculated or estimated in response to a time period between emitting the pulse and receiving the reflected emitted pulse. The first distance meter may further comprise a pulse generator coupled the first emitter for generating the pulse, and the first correlator may comprise a timer coupled to the pulse generator and to the first sensor for measuring the time period starting in response to the generated pulse and ending in response to the received reflected pulse by the first sensor. The first distance may be calculated or estimated based on the measured time-period $\Delta t$, and when the first signal may be propagated in a medium at a velocity c1, the first distance may be calculated or estimated based on, or according to, $c1*\Delta t/2$. The second distance meter may be Time-Of-Flight (TOF)-based, and the second signal may be a pulse.

The first distance meter may be phase-detection based whereby the first signal may be a periodic signal, and the first distance may be calculated or estimated in response to a phase difference between the emitted signal and the received reflected signal. The first distance meter may further comprise a periodic signal generator coupled the first emitter for generating the periodic signal, and the first correlator may comprise a phase detector coupled to the signal generator and to the first sensor for measuring the phase difference between the generated signal and received reflected signal by the first sensor, and first distance may be calculated or estimated based on the measured phase difference $\Delta\varphi$. The first signal may be propagated in a medium at a velocity c1 and using a frequency f, and the first distance may be calculated or estimated based on, or according to, $c1*\Delta\varphi*f/(4*\Pi)$. The periodic signal generator may be a sinewave generator and the periodic signal may be a sinewave signal. Alternatively or in addition, the periodic signal generator may be a repetitive signal generator and the periodic signal may be a square wave, a triangle wave, or a saw-tooth wave. The first distance meter may further comprise a heterodyne or homodyne scheme coupled for shifting a frequency. The second distance meter may be phase detection-based and the second signal may be a periodic signal.

Any system, device, module, or circuit herein may comprise an actuator that may convert electrical energy to affect a phenomenon, the actuator may be coupled to the respective processor for affecting the phenomenon in response to a respective processor control, and may be connected to be powered by the respective DC power signal. The respective processor may be further coupled to operate, control, or activate the actuator in response to the state of the switch. The actuator may be a sounder for converting an electrical energy to omnidirectional, unidirectional, or bidirectional pattern of emitted, audible or inaudible, sound waves, the sound may be audible, and the sounder may be an electromagnetic loudspeaker, a piezoelectric speaker, an electrostatic loudspeaker (ESL), a ribbon or planar magnetic loudspeaker, or a bending wave loudspeaker. Alternatively or in addition, the actuator may be an electric thermoelectric actuator that may be a heater or a cooler, operative for affecting a temperature of a solid, a liquid, or a gas object, and may be coupled to the object by conduction, convection, force convention, thermal radiation, or by a transfer of energy by phase changes. The thermoelectric actuator may be a cooler based on a heat pump driving a refrigeration cycle using a compressor-based electric motor, or may be an electric heater that may be a resistance heater or a dielectric heater. Alternatively or in addition, the actuator may be a display for visually presenting information, may be a monochrome, grayscale or color display, and may consist of an array of light emitters or light reflectors. The display may be a video display supporting Standard-Definition (SD) or High-Definition (HD) standard, and may be capable of scrolling, static, bold or flashing a presented information. Alternatively or in addition, the actuator may be a motion actuator that may cause linear or rotary motion, and the system may further comprise a conversion mechanism for respectfully converting to rotary or linear motion based on a screw, a wheel and axle, or a cam. The motion actuator may be a pneumatic, hydraulic, or electrical actuator, and may be an AC or a DC electrical motor.

Any system, device, module, or circuit herein may be addressable in a wireless network (such as the Internet) using a digital address that may be a MAC layer address that may be MAC-48, EUI-48, or EUI-64 address type, or may be a layer 3 address and may be a static or dynamic IP address that may be of IPv4 or IPv6 type address. Any system, device, or module herein may be further configured as a wireless repeater, such as a WPAN, WLAN, or a WWAN repeater.

Any system, device, module, or circuit herein may further be operative to send a notification message over a wireless network using the first or second transceiver via the respective first or second antenna. The system may be operative to periodically sending multiple notification messages, such as substantially every 1, 2, 5, or 10 seconds, every 1, 2, 5, or 10 minutes, every 1, 2, 5, or 10 hours, or every 1, 2, 5, or 10 days. Alternatively or in addition, any system, device, module, or circuit herein may further comprise a sensor having an output and responsive to a physical phenomenon, and the message may be sent in response to the sensor output. Any system herein may be uses with a minimum or maximum threshold, and the message may be sent in response to the sensor output value respectively below the minimum threshold or above the maximum threshold. The sent message may comprise an indication of the time when the threshold was exceeded, and an indication of the value of the sensor output.

Any message herein may comprise the time of the message and the controlled switch status, and may be sent over the Internet via the wireless network to a client device using a peer-to-peer scheme. Alternatively or in addition, any message herein may be sent over the Internet via the wireless network to an Instant Messaging (IM) server for being sent to a client device as part of an IM service. The message or the communication with the IM server may use, may be compatible with, or may be based on, SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), or Hypertext Transfer Protocol (HTTP). The message may be a text-based message and the IM service may be a text messaging service, and may be according to, may be compatible with, or may be based on, a Short Message Service (SMS) message and the IM service may be a SMS service, the message may be according to, may be compatible with, or based on, an electronic-mail (e-mail) message and the IM service may be an e-mail service, the message may be according to, may be compatible with, or based on, WhatsApp message and the IM service may be a WhatsApp service, the message may be according to, may be compatible with, or based on, a Twitter message and the IM service may be a Twitter service, or the message may be according to, may be compatible with, or based on, a Viber message and the IM service may be a Viber service. Alternatively or in addition, the message may be a Multimedia Messaging Service (MMS) or an Enhanced Messaging Service (EMS) message that includes audio or video data, and the IM service may respectively be a MMS or EMS service.

Any wireless network herein may be a Wireless Personal Area Network (WPAN), the wireless transceiver may be a WPAN transceiver, and the antenna may be a WPAN antenna, and further the WPAN may be according to, may be compatible with, or may be based on, Bluetooth™ or IEEE 802.15.1-2005 standards, or the WPAN may be a wireless control network that may be according to, may be compatible with, or may be based on, ZigBee™, IEEE 802.15.4-2003 or Z-Wave™ standards. Alternatively or in addition, the wireless network may be a Wireless Local Area Network (WLAN), the wireless transceiver may be a WLAN transceiver, and the antenna may be a WLAN antenna, and further the WLAN may be according to, or base on, IEEE 802.11-2012, IEEE 802.11a, IEEE 802.11b, IEEE 802.11g, IEEE 802.11n, or IEEE 802.11ac. The wireless network may use a licensed or unlicensed radio frequency band, and the unlicensed radio frequency band may be an Industrial, Scientific and Medical (ISM) radio band. Alternatively or in addition, the wireless network may be a Wireless Wide Area Network (WWAN), the wireless transceiver may be a WWAN transceiver, and the antenna may be a WWAN antenna, and the WWAN may be a wireless broadband network or a WiMAX network, where the antenna may be a WiMAX antenna and the wireless transceiver may be a WiMAX modem, and the WiMAX network may be according to, may be compatible with, or may be based on, IEEE 802.16-2009. Alternatively or in addition, the wireless network may be a cellular telephone network, the antenna may be a cellular antenna, and the wireless transceiver may be a cellular modem, and the cellular telephone network may be a Third Generation (3G) network that uses UMTS W-CDMA, UMTS HSPA, UMTS TDD, CDMA2000 1×RTT, CDMA2000 EV-DO, or GSM EDGE-Evolution. Alternatively or in addition, the cellular telephone network may be a Fourth Generation (4G) network that uses HSPA+, Mobile WiMAX, LTE, LTE-Advanced, MBWA, or may be based on IEEE 802.20-2008.

Any network herein may be a vehicle network, such as a vehicle bus or any other in-vehicle network. A connected element comprises a transceiver for transmitting to, and receiving from, the network. The physical connection typically involves a connector coupled to the transceiver. The vehicle bus may consist of, may comprise, may be compatible with, may be based on, or may use a Controller Area Network (CAN) protocol, specification, network, or system. The bus medium may consist of, or comprise, a single wire, or a two-wire such as an UTP or a STP. The vehicle bus may employ, may use, may be compatible with, or may be based on, a multi-master, serial protocol using acknowledgement, arbitration, and error-detection schemes, and may further use synchronous, frame-based protocol.

The network data link and physical layer signaling may be according to, compatible with, based on, or use, ISO 11898-1:2015. The medium access may be according to, compatible with, based on, or use, ISO 11898-2:2003. The vehicle bus communication may further be according to, compatible with, based on, or use, any one of, or all of, ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, or SAE J2411_200002 standards. The CAN bus may consist of, may be according to, may be compatible with, may be based on, or may use a CAN with Flexible Data-Rate (CAN FD) protocol, specification, network, or system.

Alternatively or in addition, the vehicle bus may consist of, may comprise, may be based on, may be compatible with, or may use a Local Interconnect Network (LIN) protocol, network, or system, and may be according to, may be compatible with, may be based on, or may use any one of, or all of, ISO 9141-2:1994, ISO 9141:1989, ISO 17987-1, ISO 17987-2, ISO 17987-3, ISO 17987-4, ISO 17987-5, ISO 17987-6, or ISO 17987-7 standards. The battery power-lines or a single wire may serve as the network medium, and may use a serial protocol where a single master controls the network, while all other connected elements serve as slaves.

Alternatively or in addition, the vehicle bus may consist of, may comprise, be compatible with, may be based on, or may use a FlexRay protocol, specification, network or system, and may be according to, may be compatible with, may be based on, or may use any one of, or all of, ISO 17458-1:2013, ISO 17458-2:2013, ISO 17458-3:2013, ISO 17458-4:2013, or ISO 17458-5:2013 standards. The vehicle bus may support a nominal data rate of 10 Mb/s, and may support two independent redundant data channels, as well as independent clock for each connected element.

Alternatively or in addition, the vehicle bus may consists of, comprise, be compatible with, may be based on, or may use a Media Oriented Systems Transport (MOST) protocol, network or system, and may be according to, may be compatible with, may be based on, or may use any one of, or all of, MOST25, MOST50, or MOST150. The vehicle bus may employ a ring topology, where one connected element may be the timing master that continuously transmits frames where each comprises a preamble used for synchronization of the other connected elements. The vehicle bus may support both synchronous streaming data as well as asynchronous data transfer. The network medium may be wires (such as UTP or STP), or may be an optical medium such as Plastic Optical Fibers (POF) connected via an optical connector.

Any switch herein may be an AC power switch that may be part of an electrically controlled switching component that may be coupled to the second processor to be controlled by a first control signal therefrom via a first control terminal. The electrically controlled switching component may be based on, may be part of, or may consist of, a relay that may be a solenoid-based electromagnetic relay, a reed relay, a solid-state (such as an AC Solid State Relay (SSR)), or a semiconductor-based relay. The electrically controlled switching component may be based on, may comprise, or may consist of, an electrical circuit that may comprise an open collector transistor, an open drain transistor, a thyristor, a TRIAC, an opto-isolator, an electrical circuit, or a transistor that may be an N-channel or a P-channel field-effect power transistor, and the switch may be formed between 'drain' and 'source' pins of the transistor, and the control terminal may be a 'gate' pin of the transistor. The first control terminal may be galvanically isolated from the switch, and the electrically controlled switching component may comprise an isolation barrier that may be based on capacitance, induction, electromagnetic waves, or optical means, and may comprise, may consist of, or may use an optocoupler or an isolation transformer.

Any AC power source herein may be domestic mains, such as nominally 120 VAC/60 Hz or 230 VAC/50 Hz, any terminals may be AC power terminals, and any switch may be an AC power switch. Any AC load herein, any system herein, and any module, device, or circuit herein, may comprise, or may be part of, a water heater, HVAC system, air conditioner, heater, washing machine, clothes dryer, vacuum cleaner, microwave oven, electric mixer, stove, oven, refrigerator, freezer, food processor, dishwasher, food blender, beverage maker, coffeemaker, answering machine, telephone set, home cinema system, HiFi system, CD or DVD player, induction cooker, electric furnace, trash compactor, electric shutter, or dehumidifier.

Any system, device, module, or circuit herein may be integrated with, or used for, Satellite Laser Ranging (SLR), such as apparatus for satellite orbit determination or tracking, solid-earth physics studies, polar motion and length of dav determinations, precise geodetic positioning over long ranges and monitoring of crustal motion. Alternatively or in addition, any system, device, module, or circuit herein may be integrated with, or used for, Lunar Laser Ranging (LLR). Alternatively or in addition, any system, device, module, or circuit herein may be integrated with, or used for, military devices or purposes, and may be binocular-shaped for hand-held use, tripod-based or attached to sighting periscopes of vehicles. Alternatively or in addition, any system, device, module, or circuit herein may be integrated with an Airborne Laser Terrain Profiler system, or used for Airborne Laser Terrain Profiling. Alternatively or in addition, any system, device, module, or circuit herein may be integrated with, or used for, Laser Airborne Depth Sounder (LADS), Distance Measuring Equipment (DME), Satellite Radar Altimetry, Airborne Radar Altimetry, Light Detection And Ranging (LIDAR), such as airborne, terrestrial, automotive, or mobile LIDAR, or Long Range Navigation for aircraft (LORAN).

A method may be used for estimating a first angle ($\alpha$) between a reference line defined by first and second points and a first surface or a first object. The method may comprise measuring, by a first distance meter, a first distance (d1) along a first line from the first point to the first surface or the first object; measuring, by a second distance meter, a second distance (d2) along a second line from the second point to the first surface or the first object; receiving, by software and a processor for executing the software, representations of the first and second distances, respectively from the first and second distance meters; visually displaying, by a display coupled to the processor, data from the processor; calculating, by the processor, the estimated first angle ($\alpha$) based on the first distance (d1) and the second distance (d2); and displaying, by the display, the estimated first angle ($\alpha$) or a function thereof. The first and second lines may be substantially parallel to one another. A non-transitory computer readable medium may include computer executable instructions stored thereon, and the instructions may include any of the steps.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below, and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements.

Understanding that these drawings only provide information concerning typical embodiments of the invention and are not therefore to be considered limiting in scope.

Figure 34:
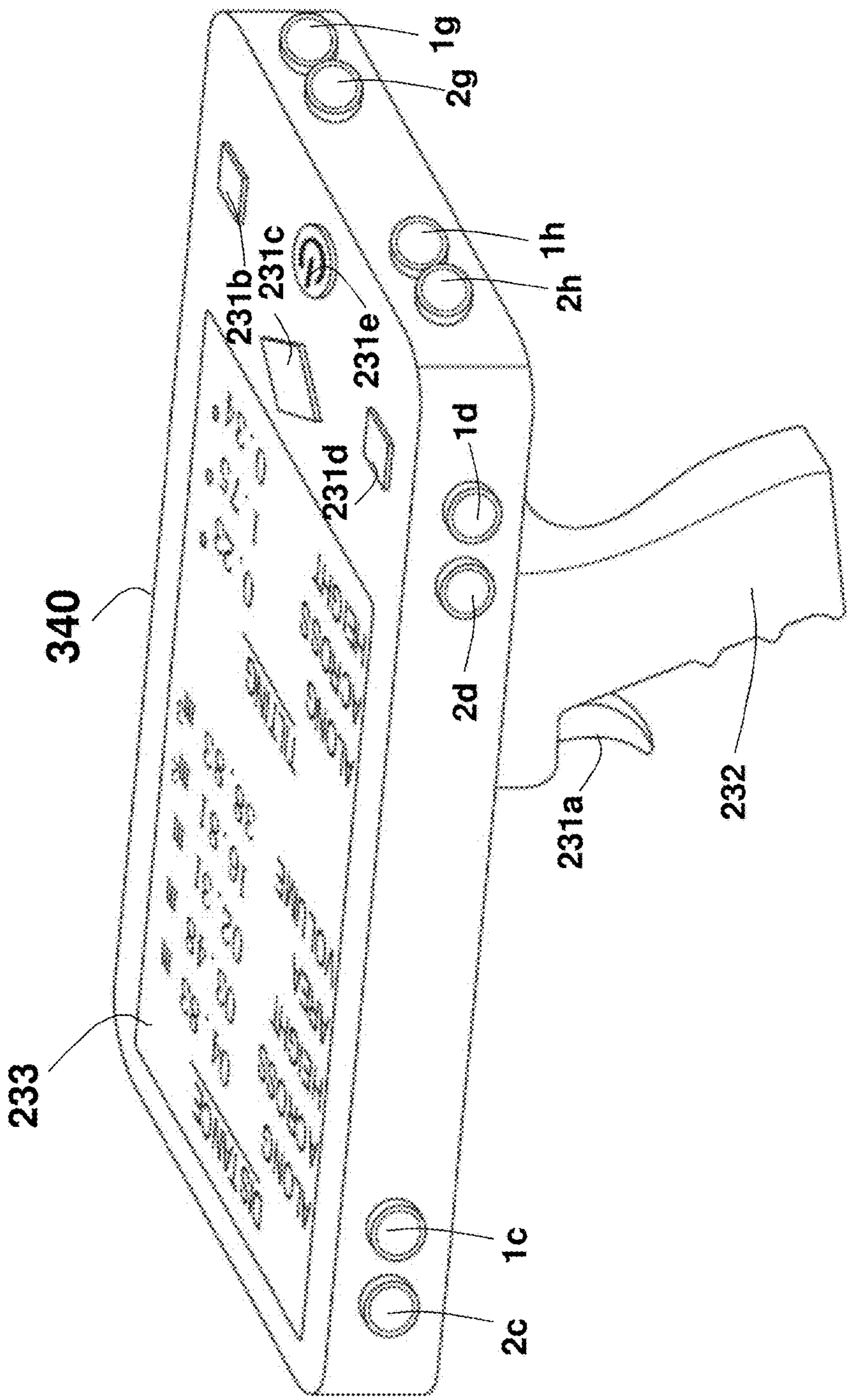
FIG. 34 depicts pictorially a perspective view of an area meter.
Figure 34A:
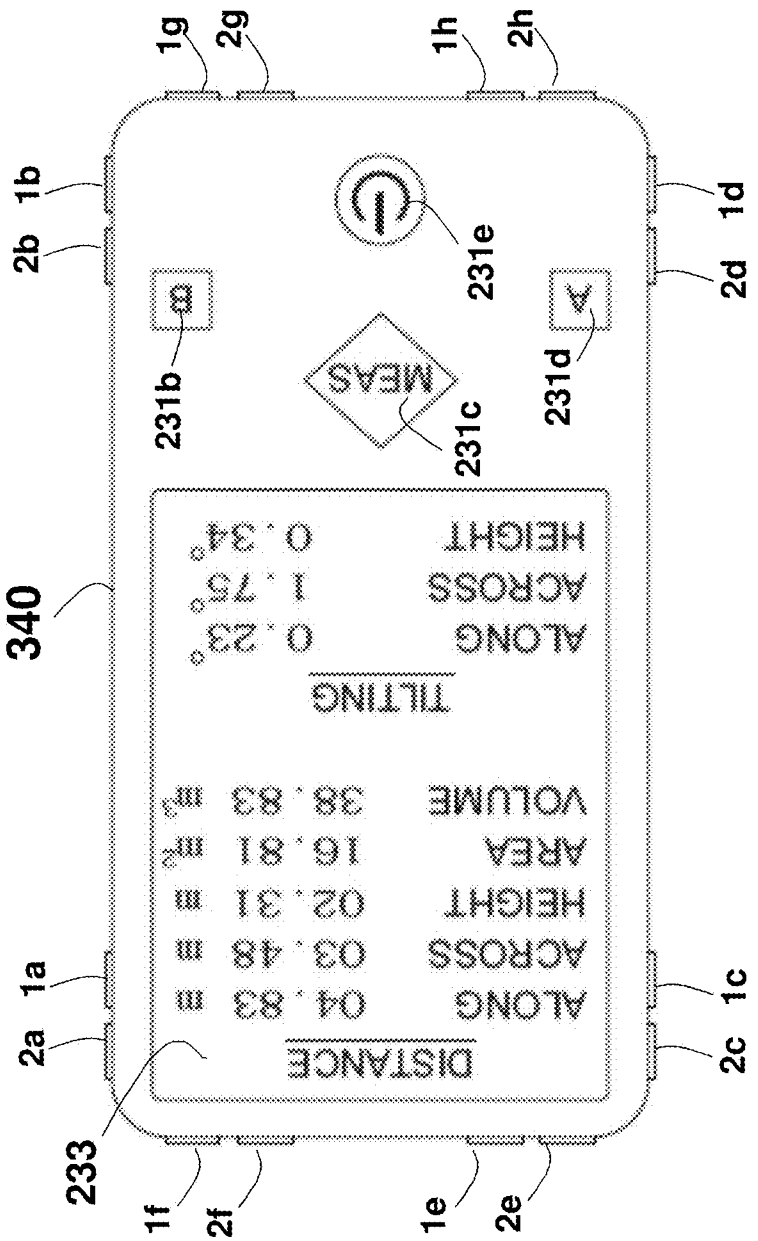
FIG. 34*a* depicts pictorially a top view of an area meter.
Figure 34B:
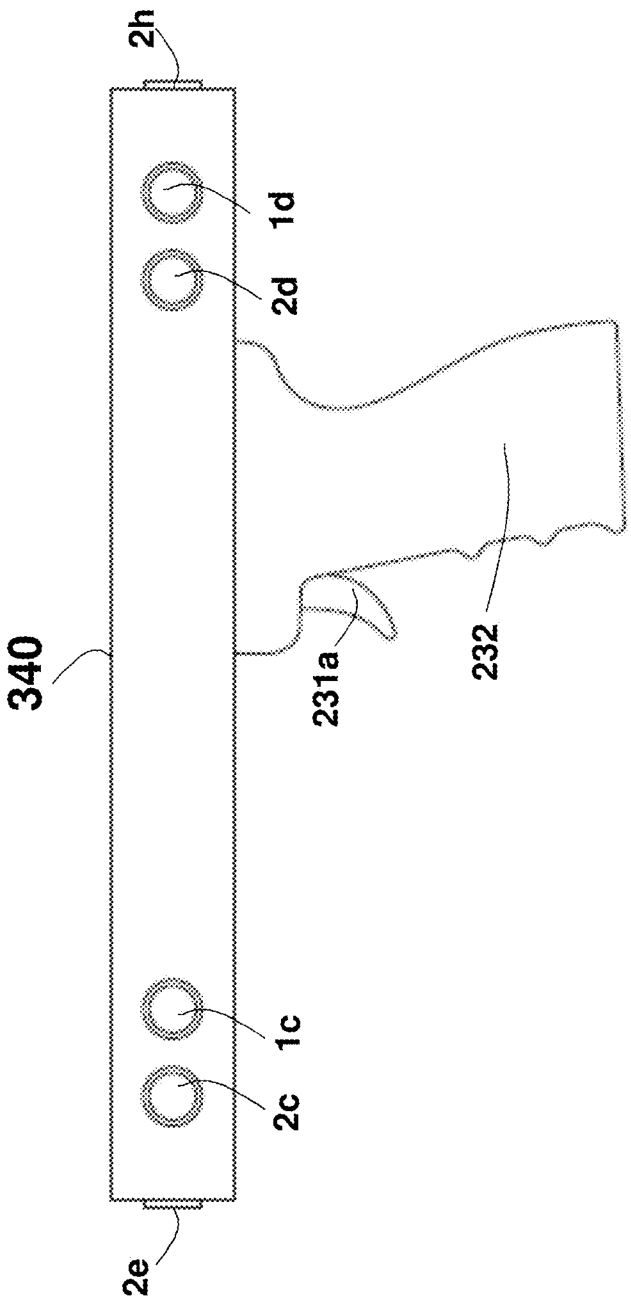
Figure 34C:
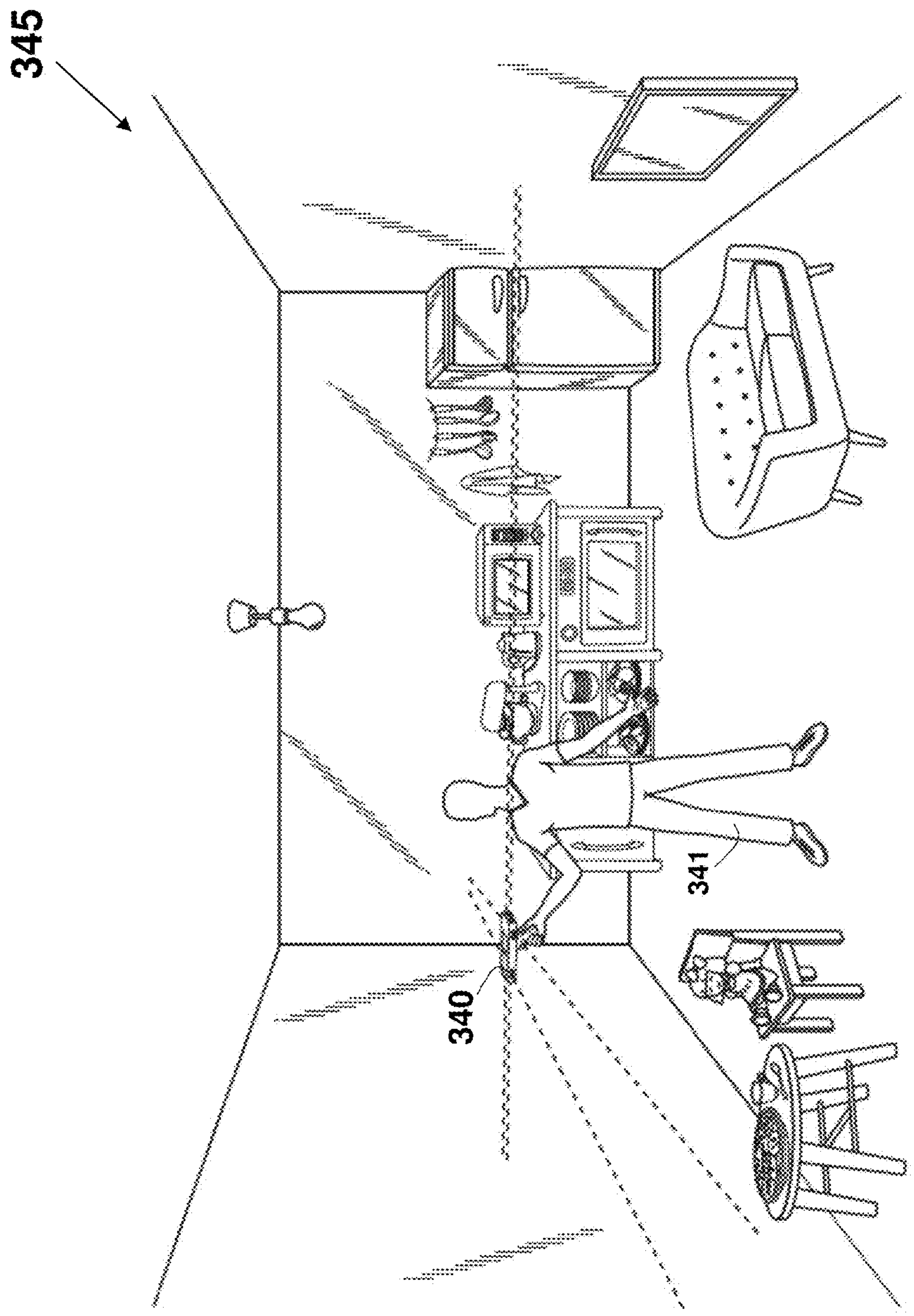
Figure 35:
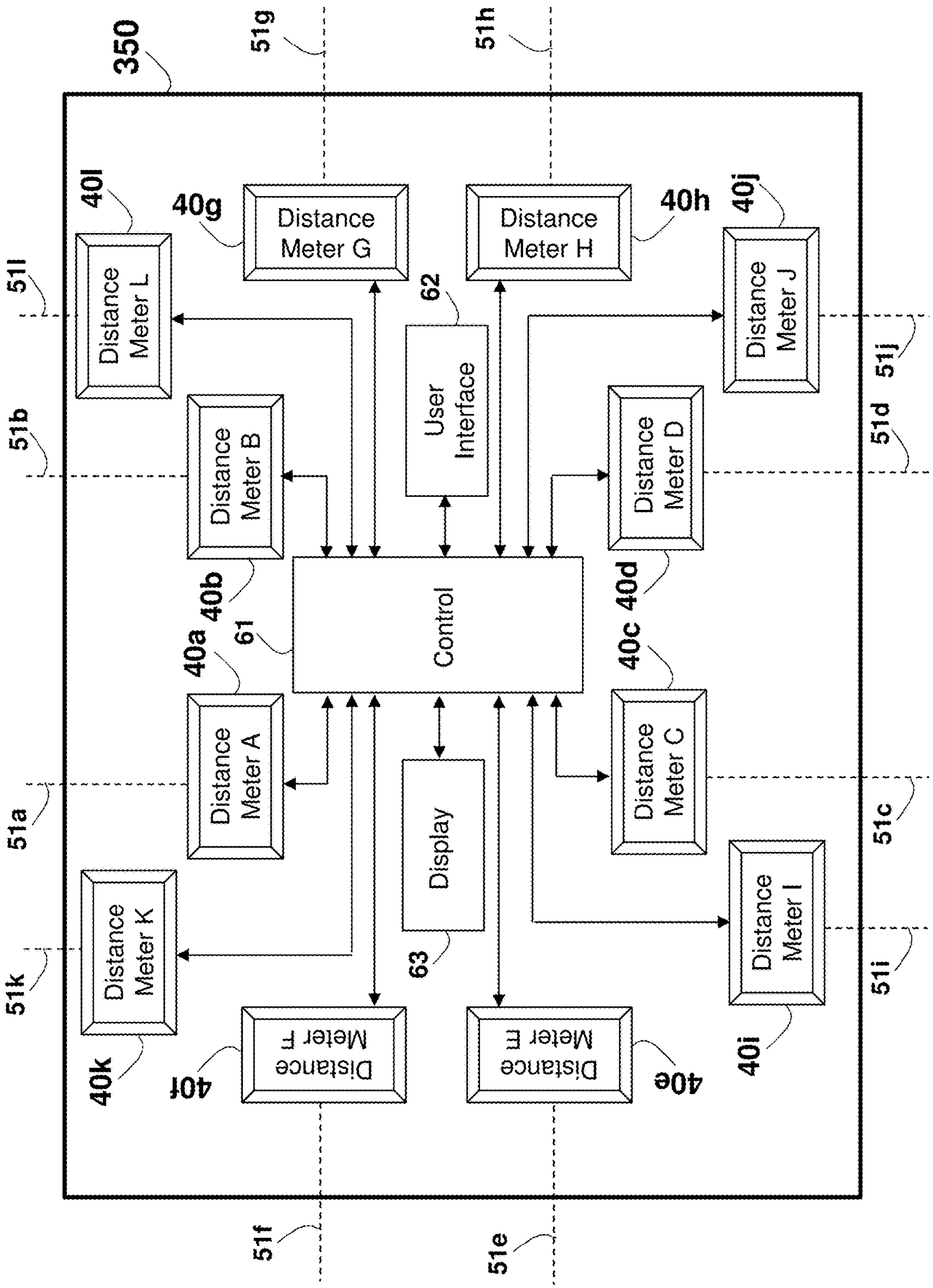
Figure 35A:
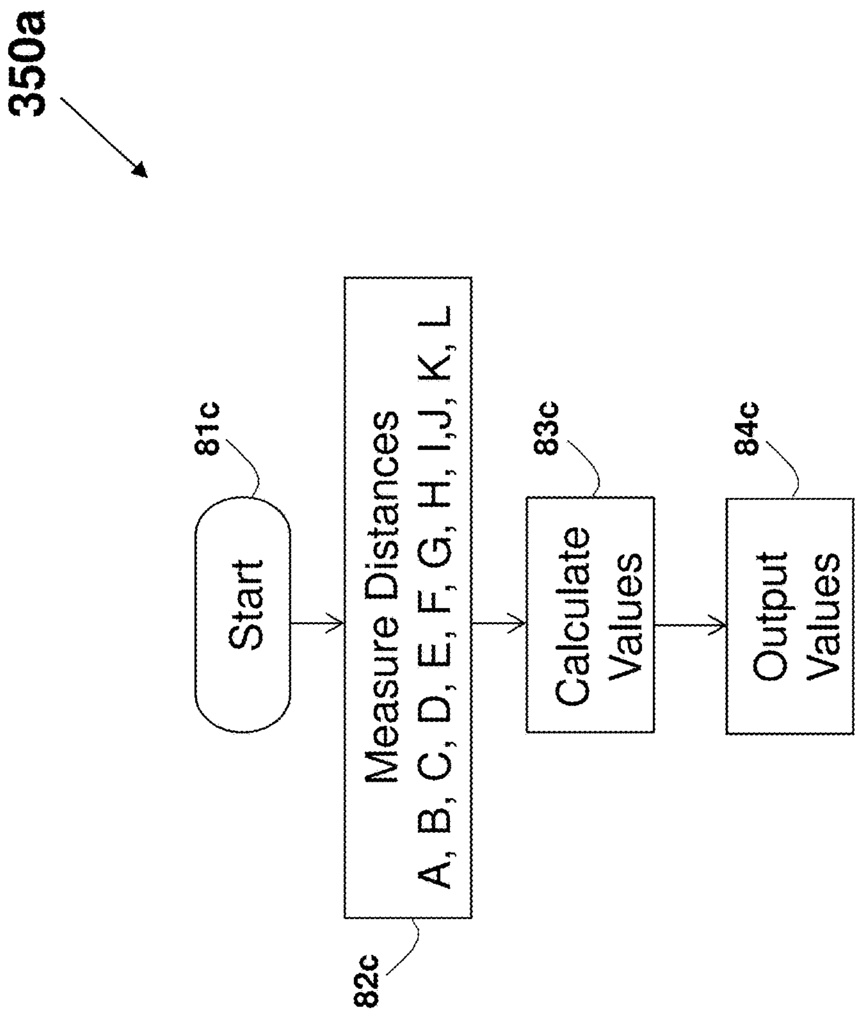
Figure 36:
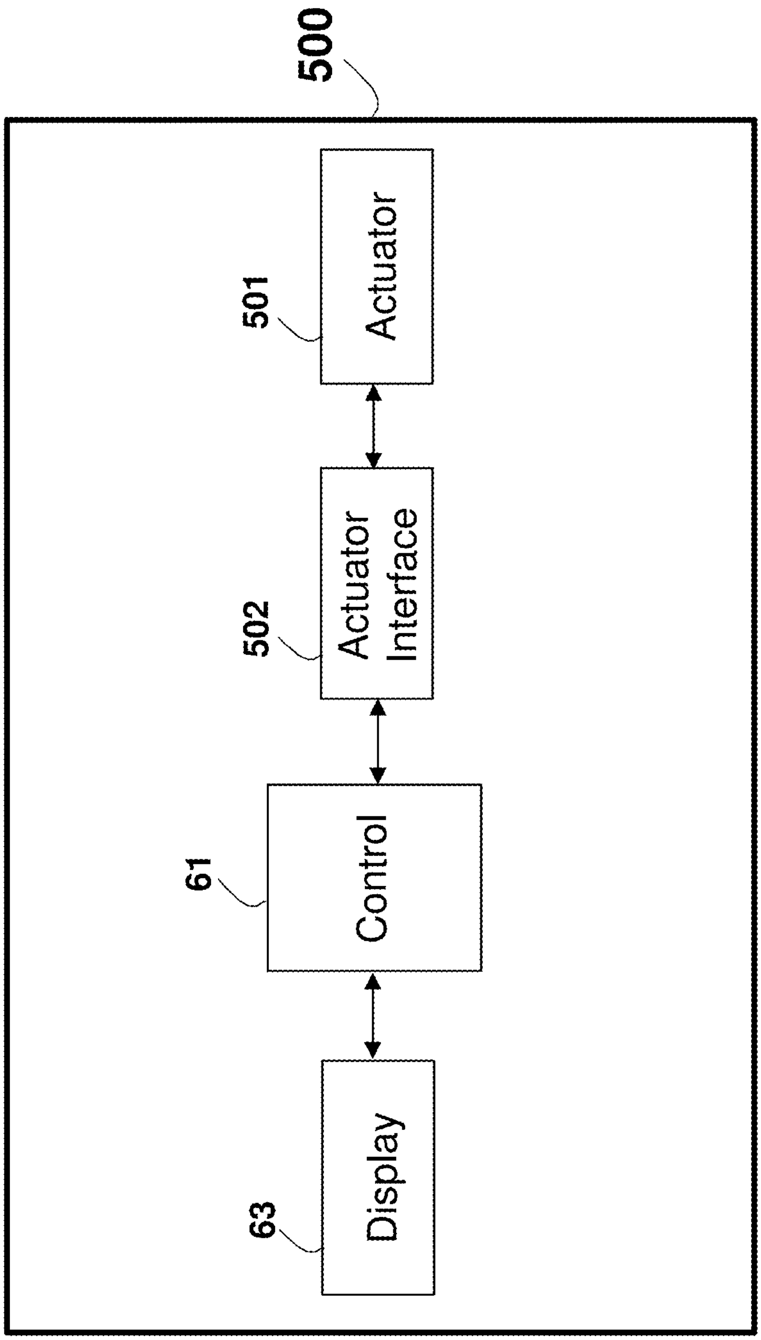
Figure 36A:
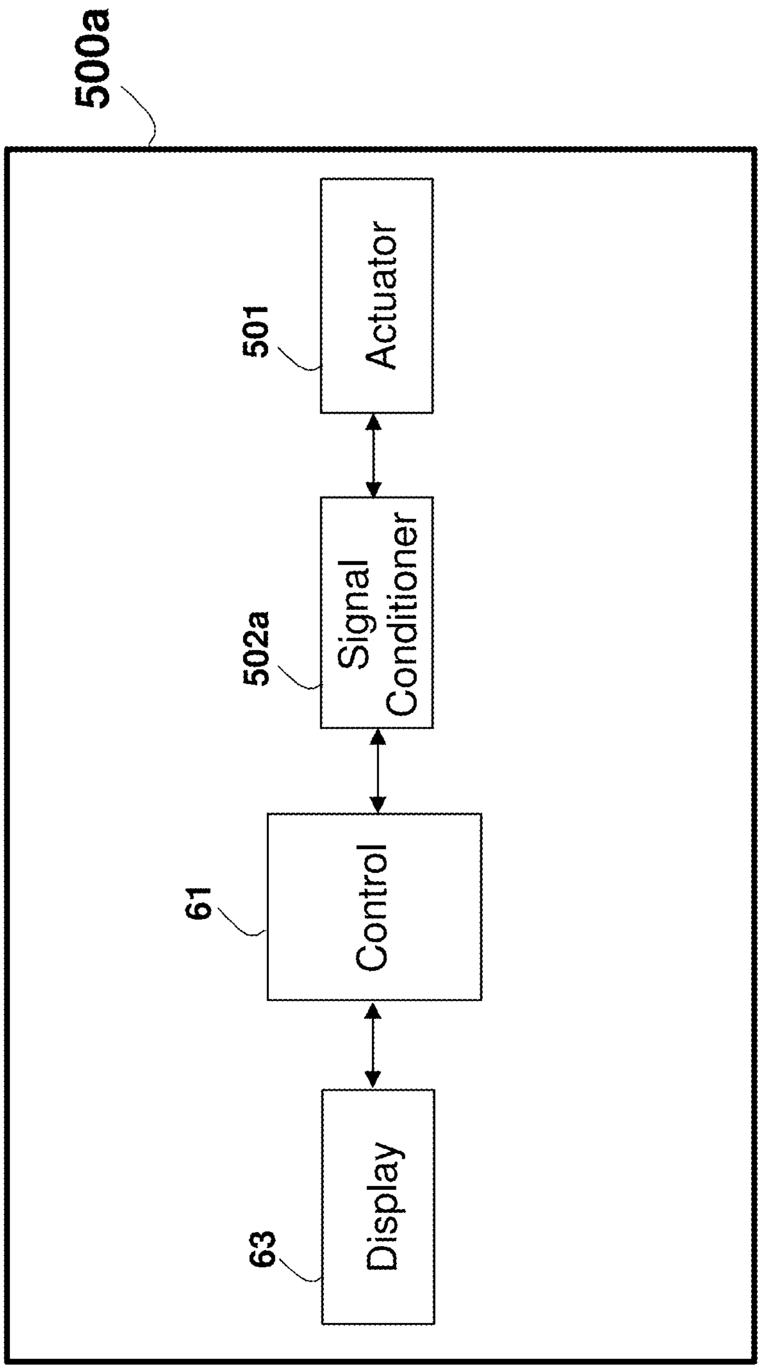
Figure 37:
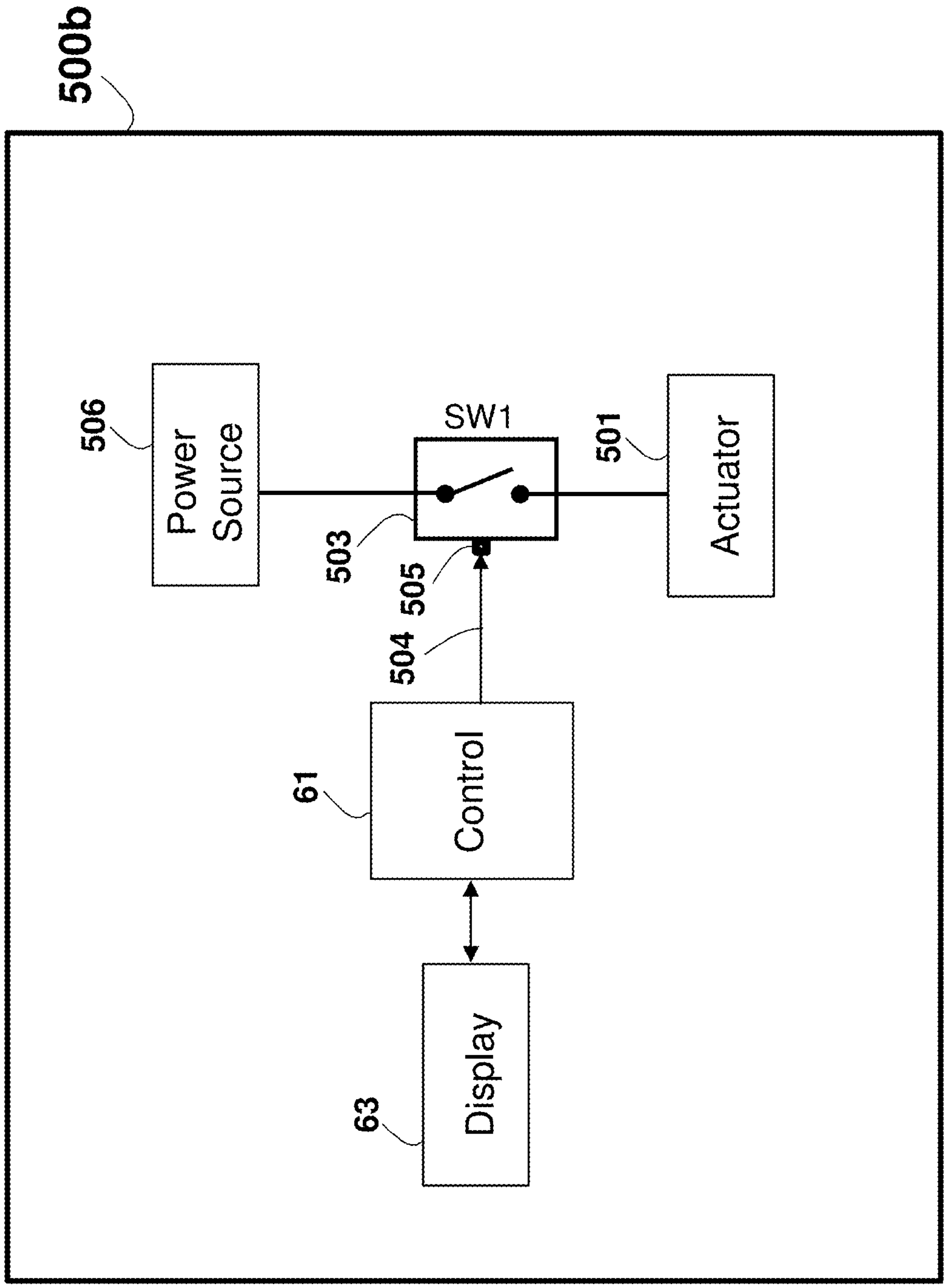
Figure 38:
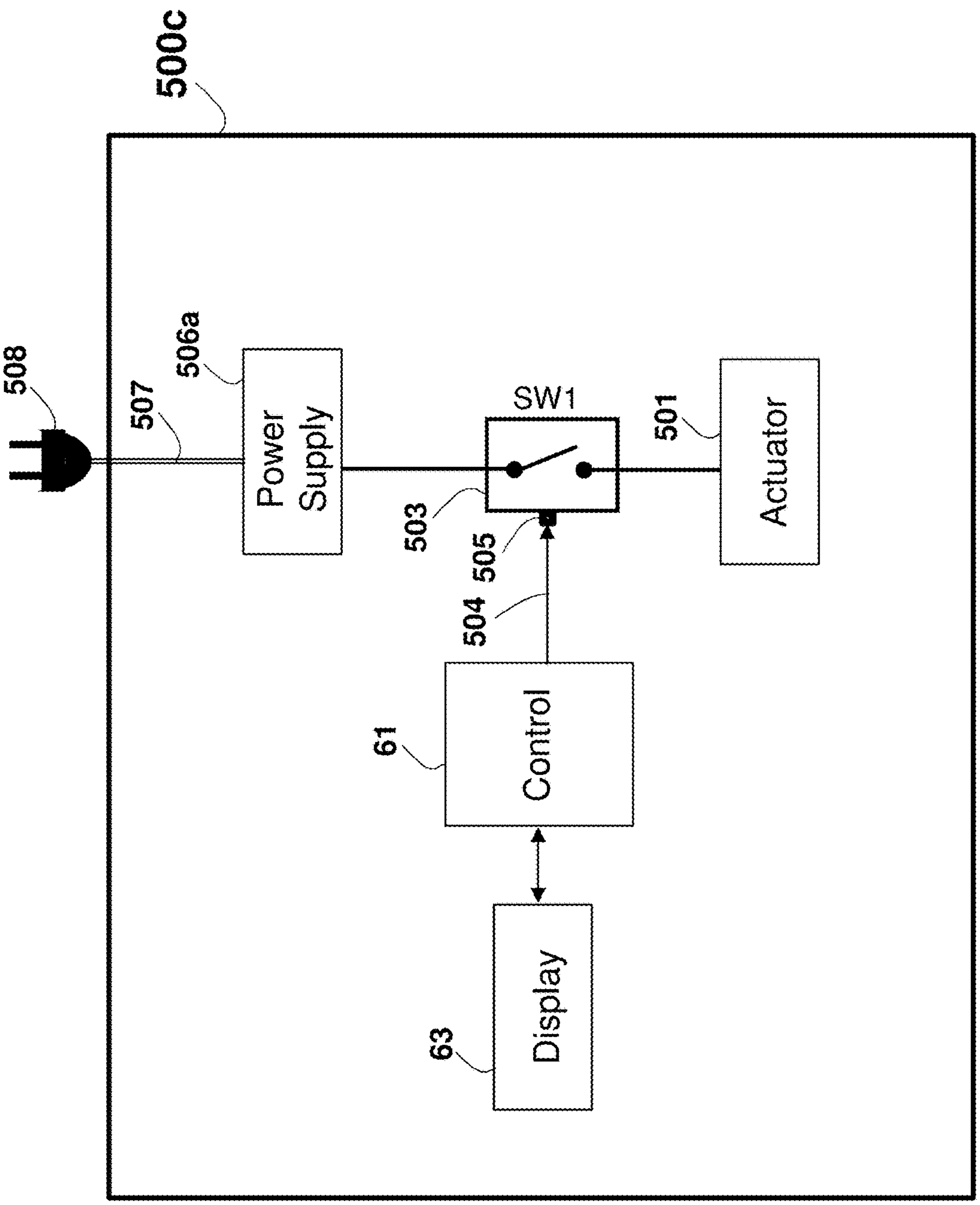
Figure 38A:
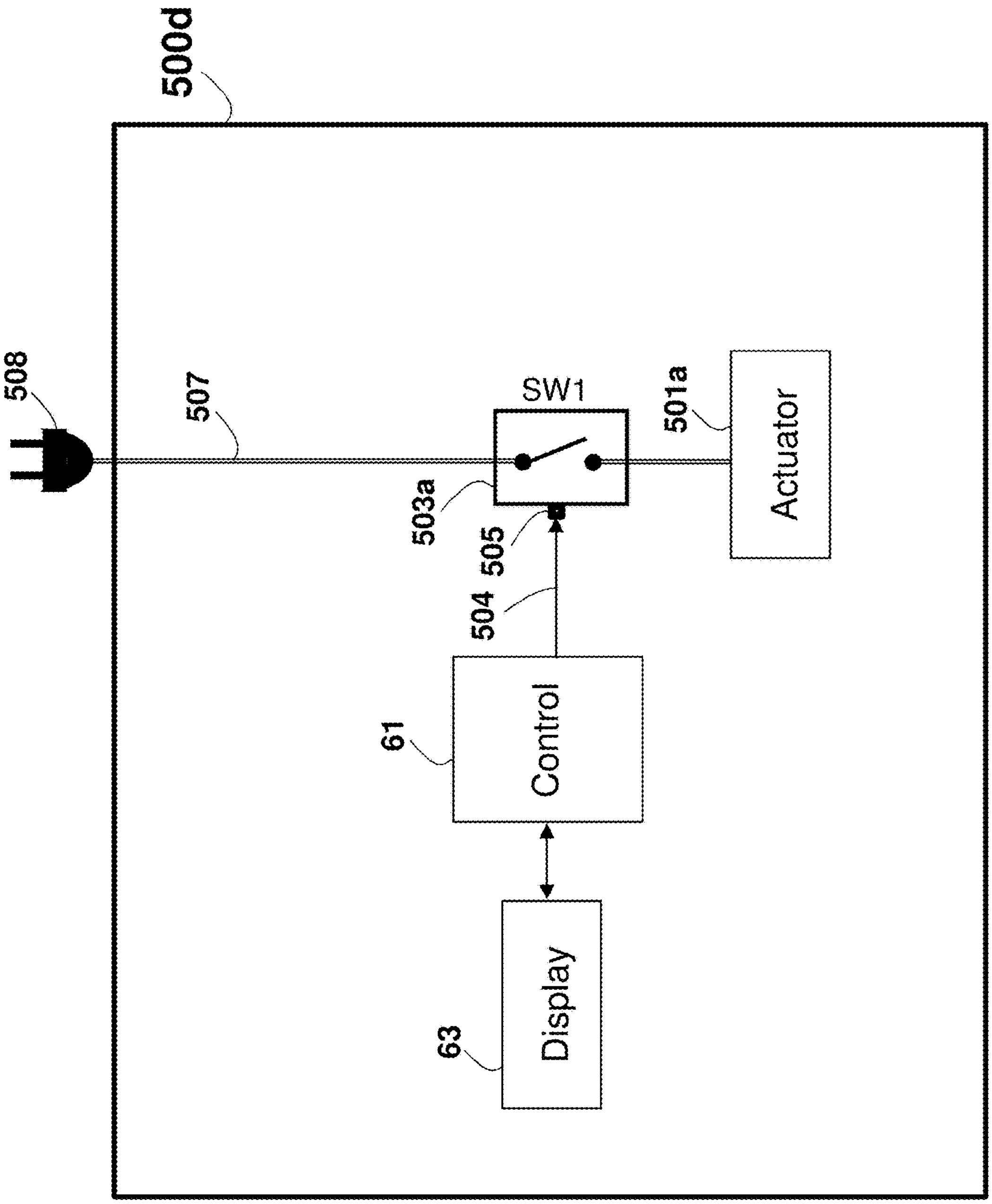
Figure 39:
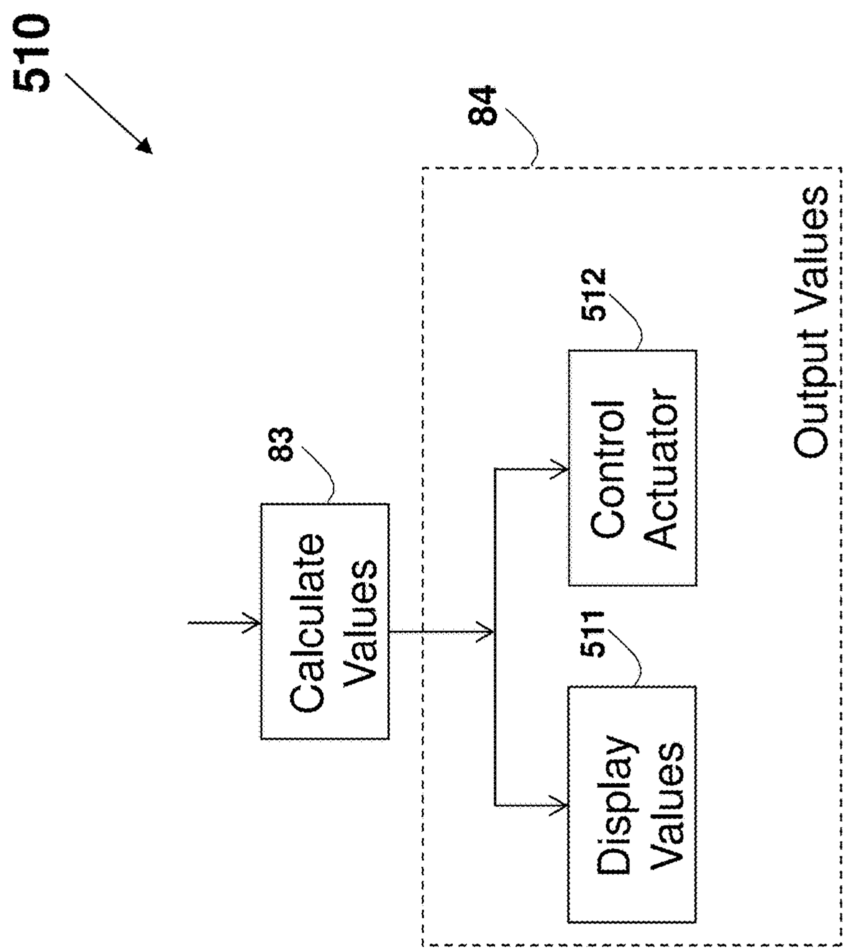

FIG. 34*b* depicts pictorially a side view of an area meter;

FIG. 34*c* depicts pictorially measuring a room using an area meter;

FIG. 35 illustrates a simplified schematic block diagram of an arrangement using six angle meters each using two distance meters;

FIG. 35*a* illustrates schematically a simplified flowchart of a method for measuring three angles using six angle meters each using two distance meters;

FIG. 36 illustrates a simplified schematic block diagram of an arrangement of adding an actuator to any apparatus or device herein;

FIG. 36*a* illustrates a simplified schematic block diagram of an arrangement of interfacing an actuator using a signal conditioner;

FIG. 37 illustrates a simplified schematic block diagram of an arrangement of interfacing an actuator using a switch;

FIG. 38 illustrates a simplified schematic block diagram of an arrangement of interfacing an actuator using a switch and an AC-powered power supply;

FIG. 38*a* illustrates a simplified schematic block diagram of an arrangement of interfacing an AC-powered actuator using a switch; and FIG. 39 illustrates schematically a simplified flowchart part of using an actuator.

Figure 40:
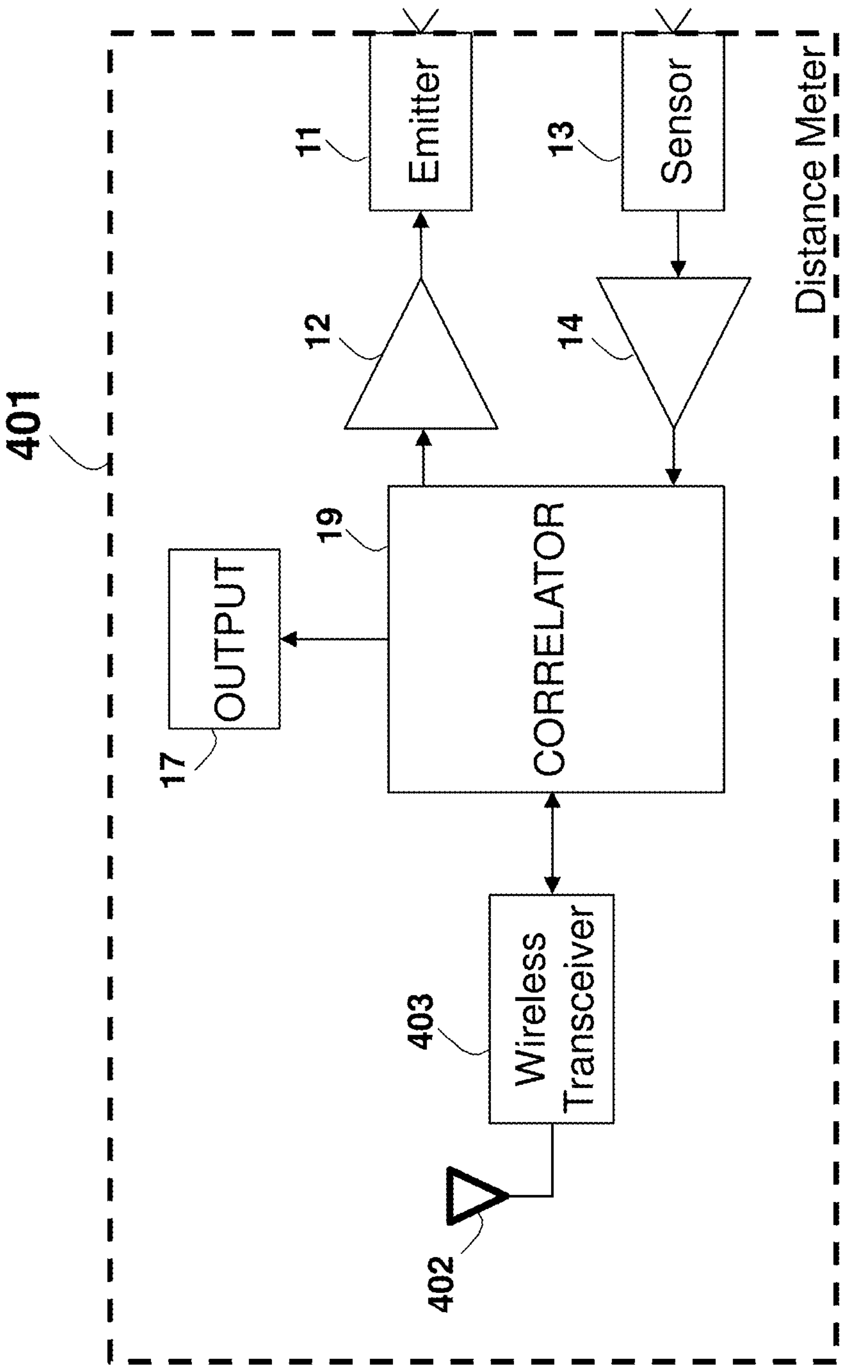
Figure 41:
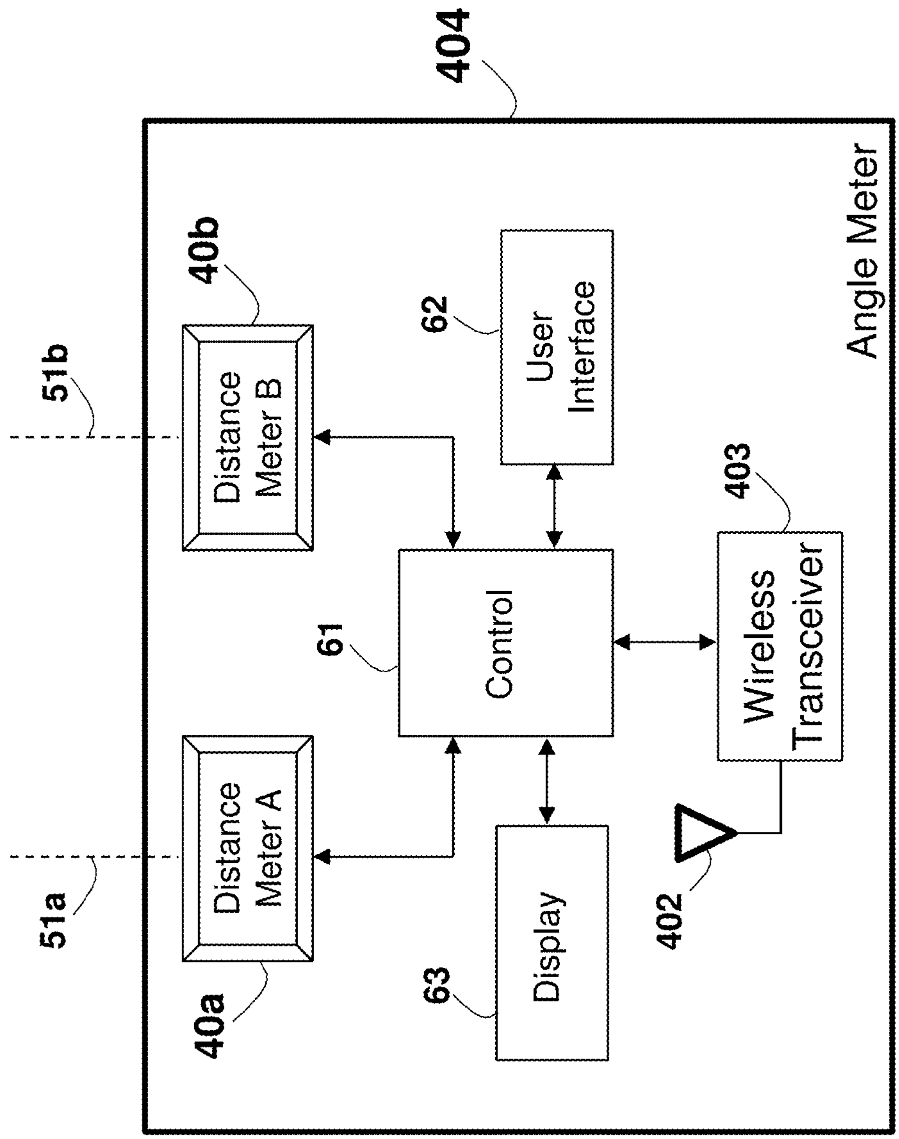
Figure 41A:
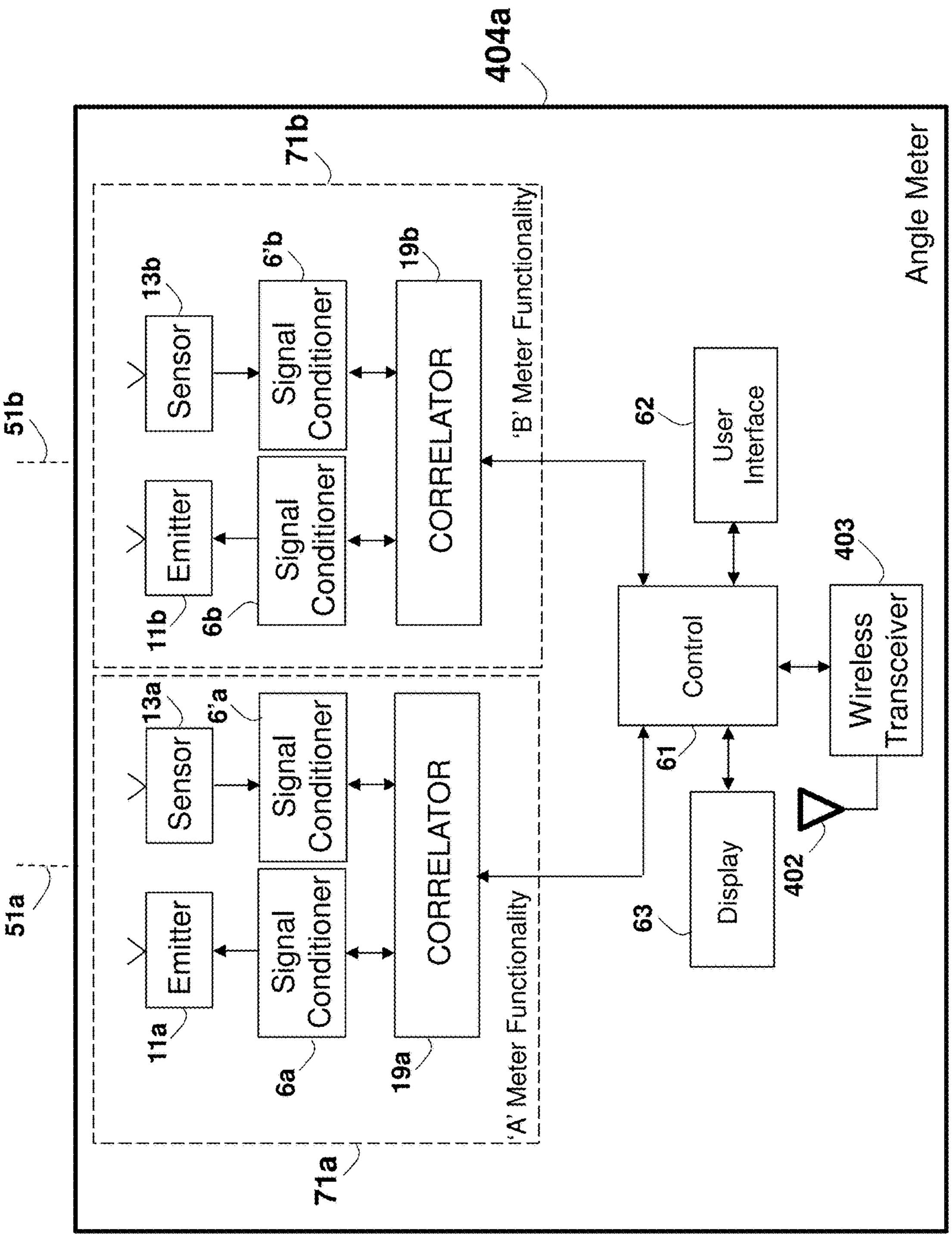
Figure 42:
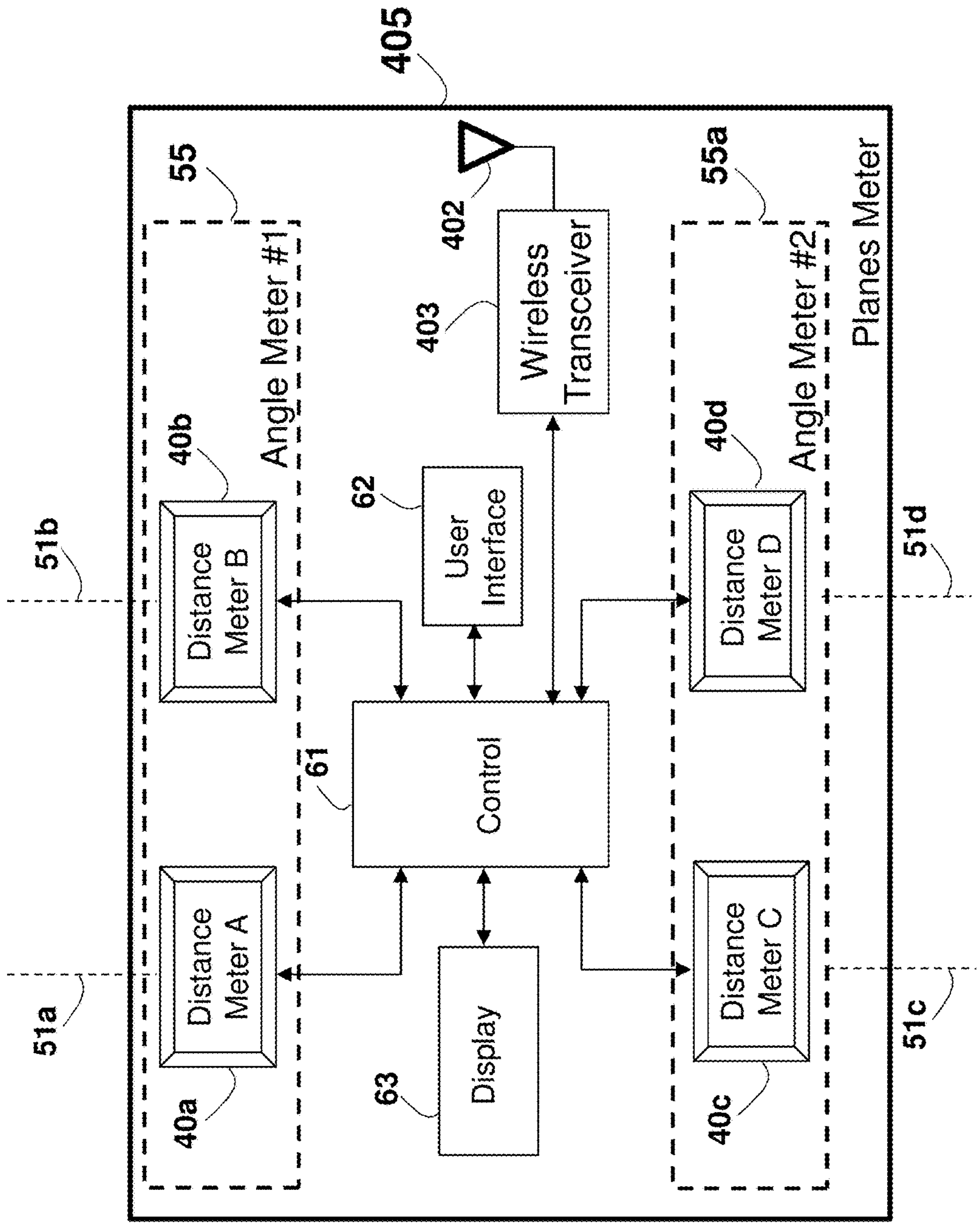
Figure 42A:
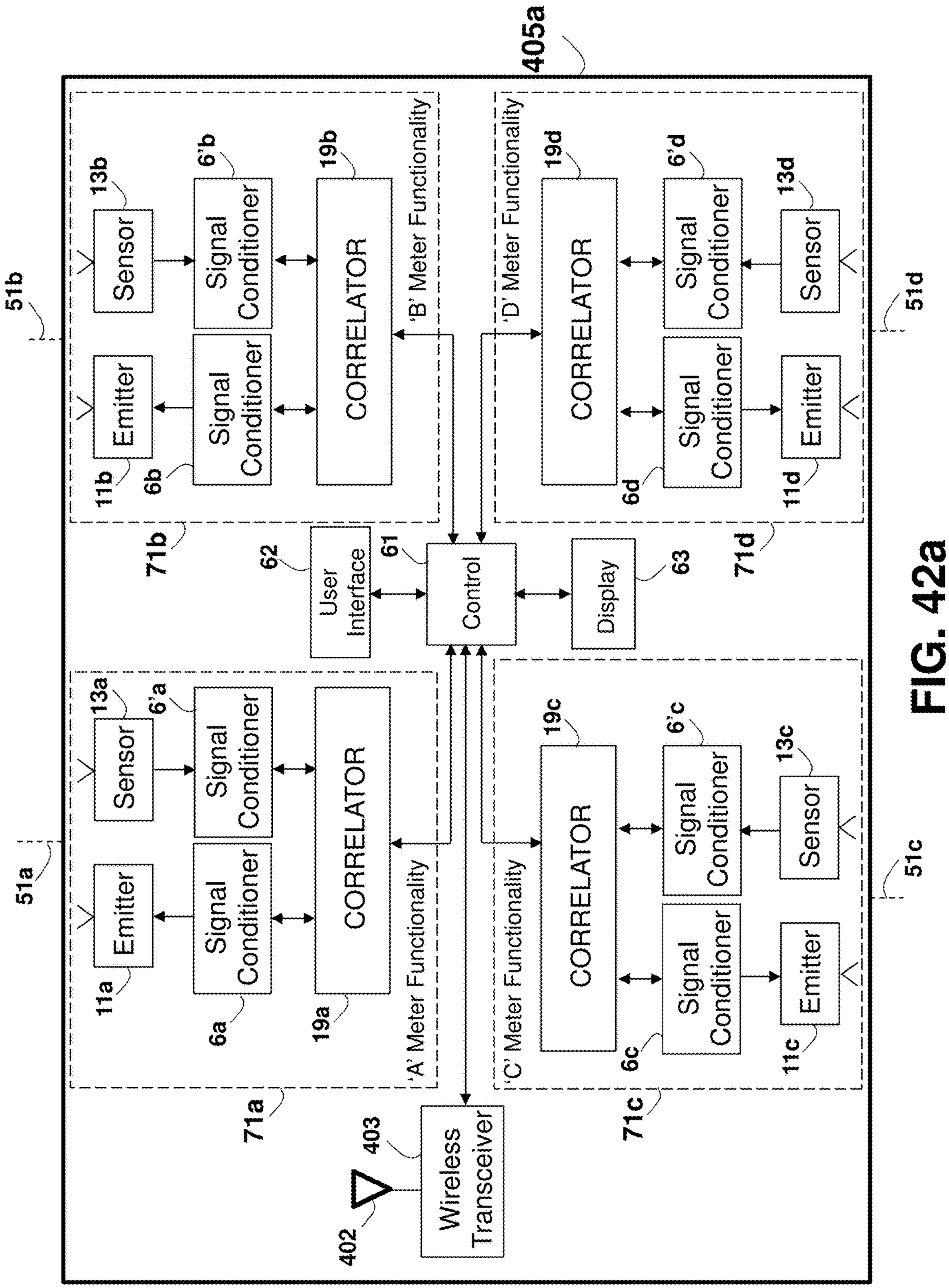
Figure 43:
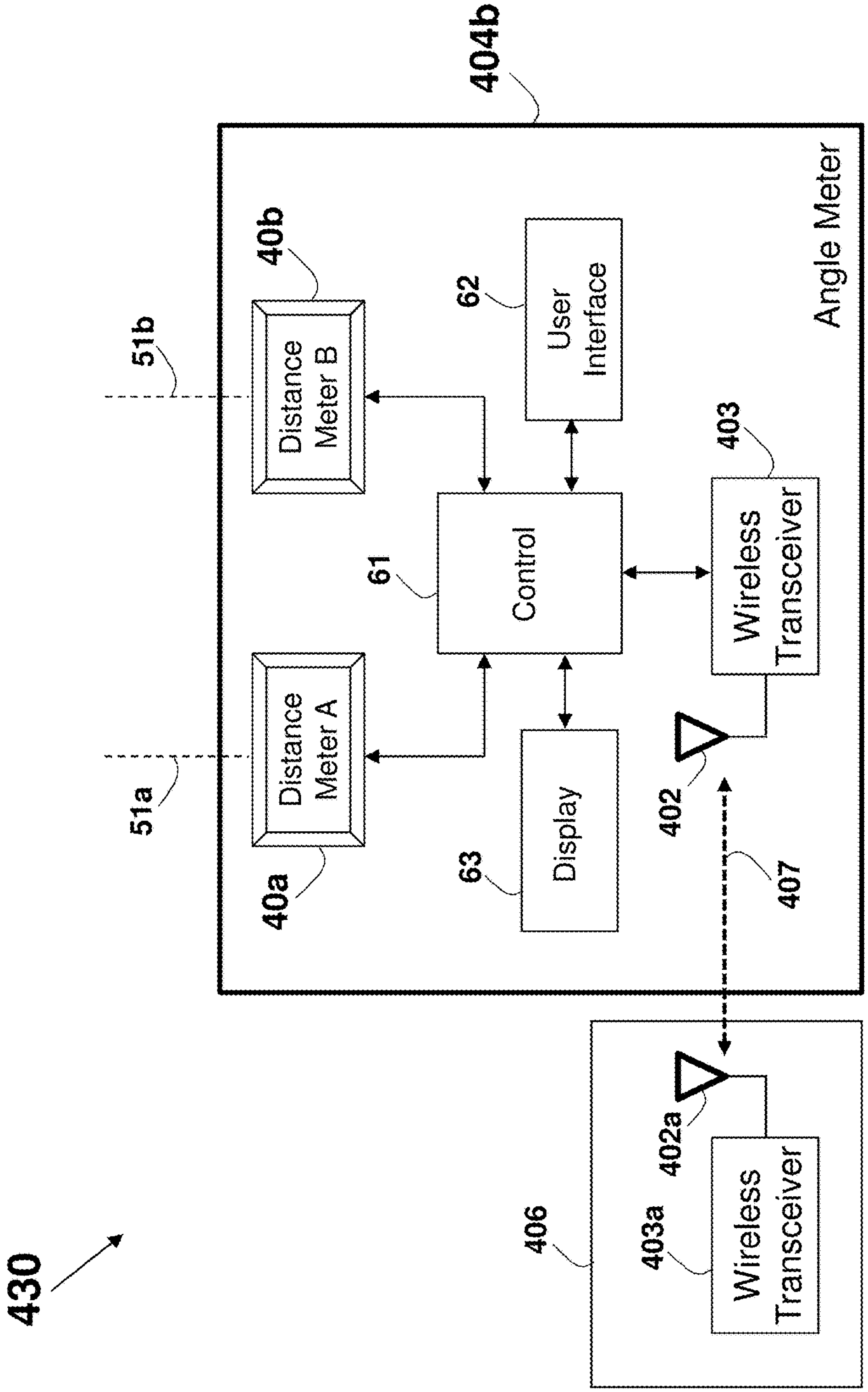
Figure 43A:
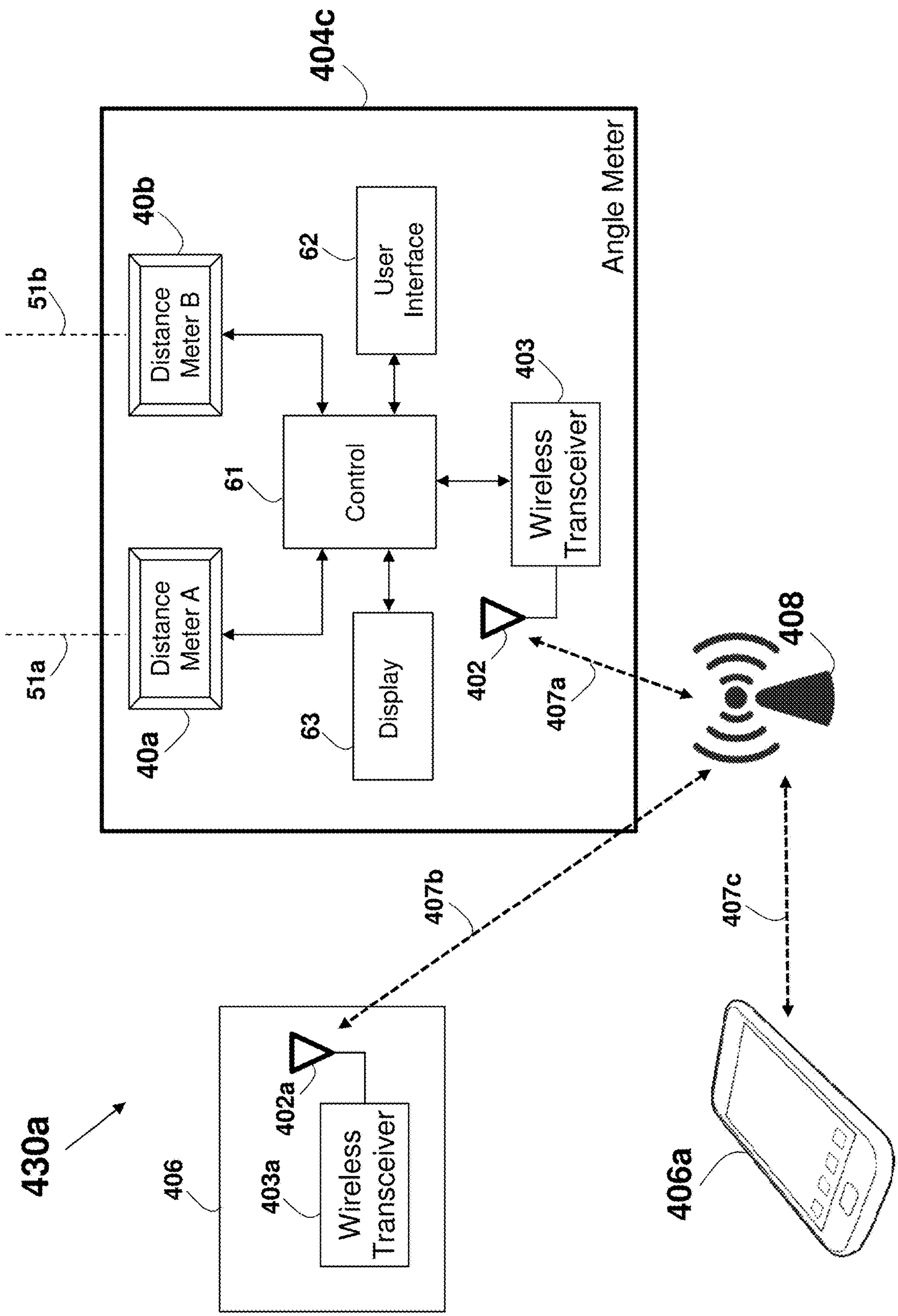
Figure 44:
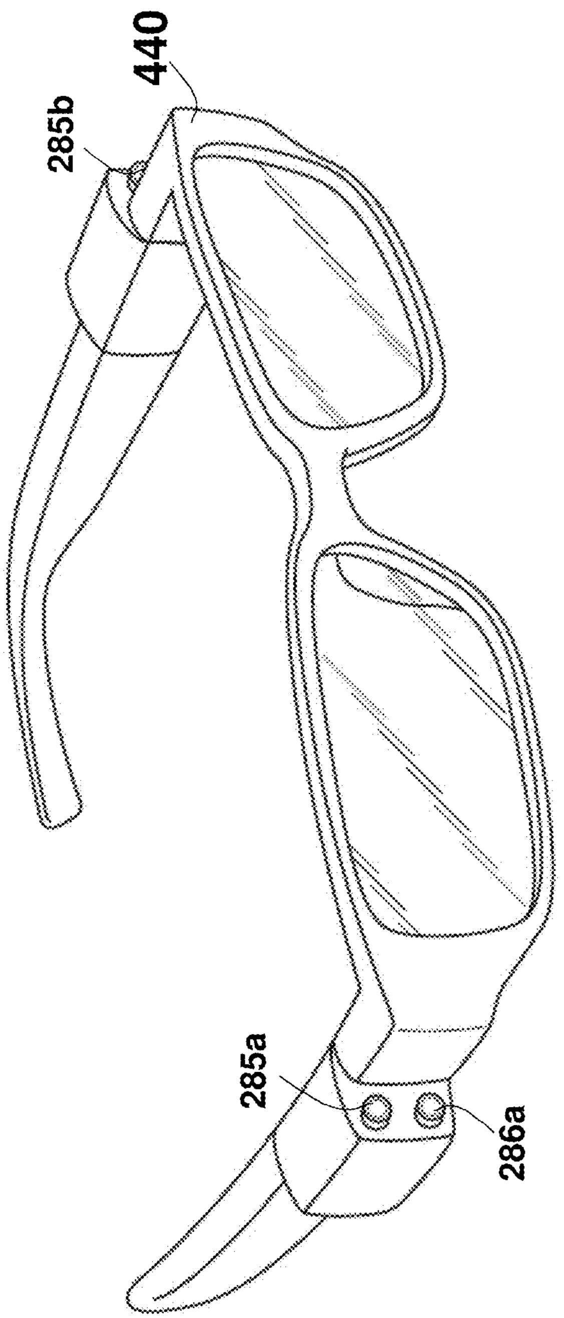
Figure 44A:
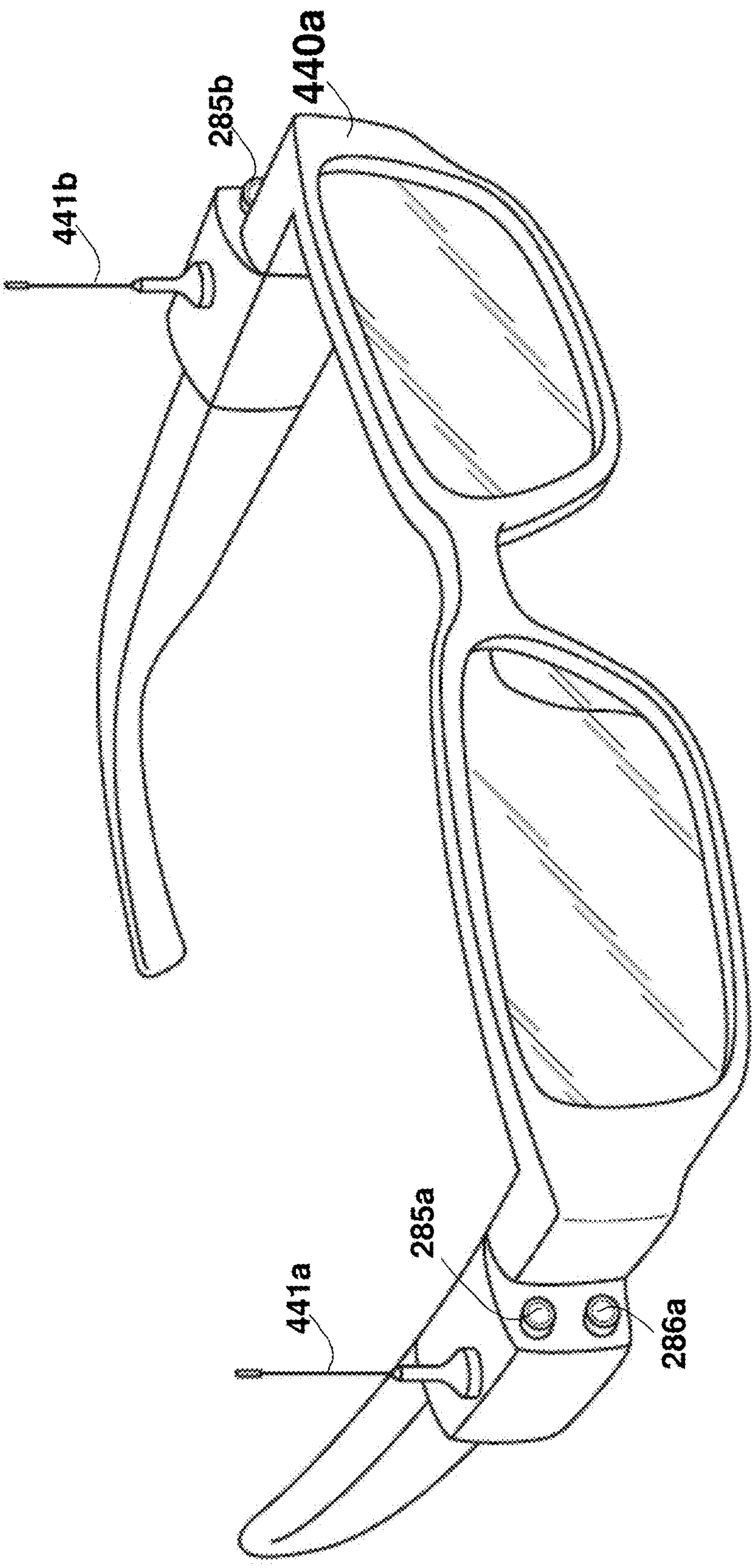
Figure 44B:
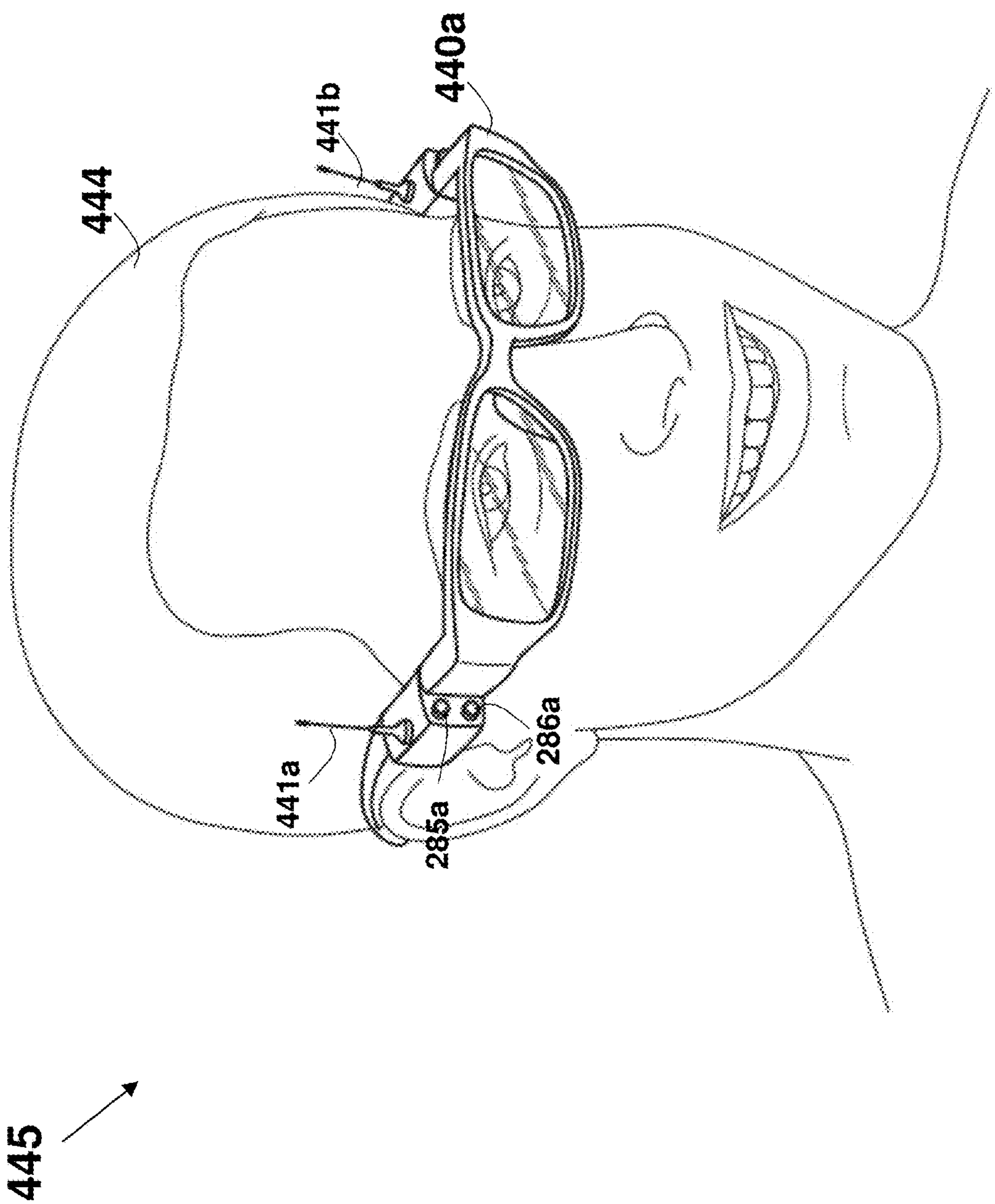
Figure 45:
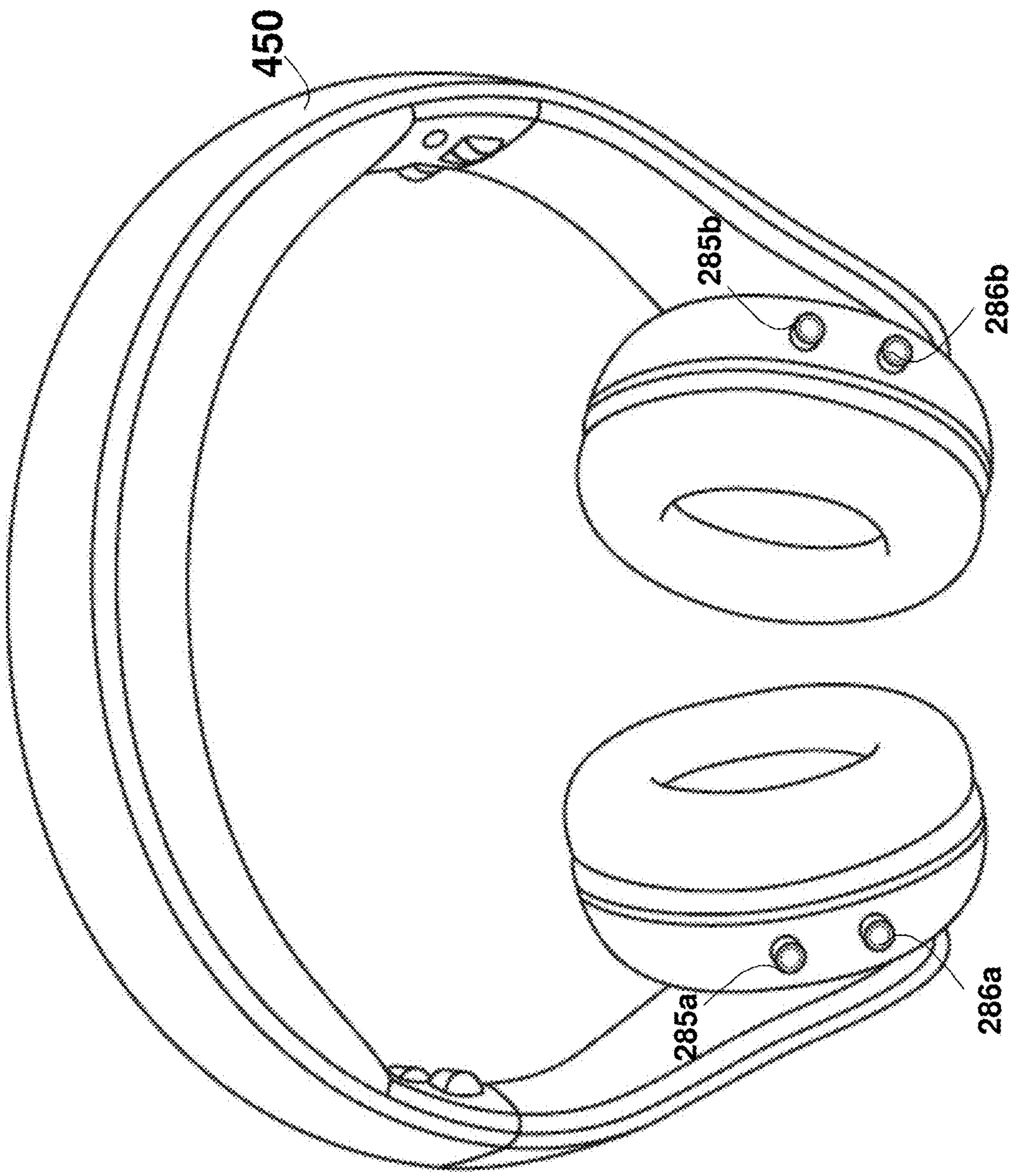
Figure 45A:
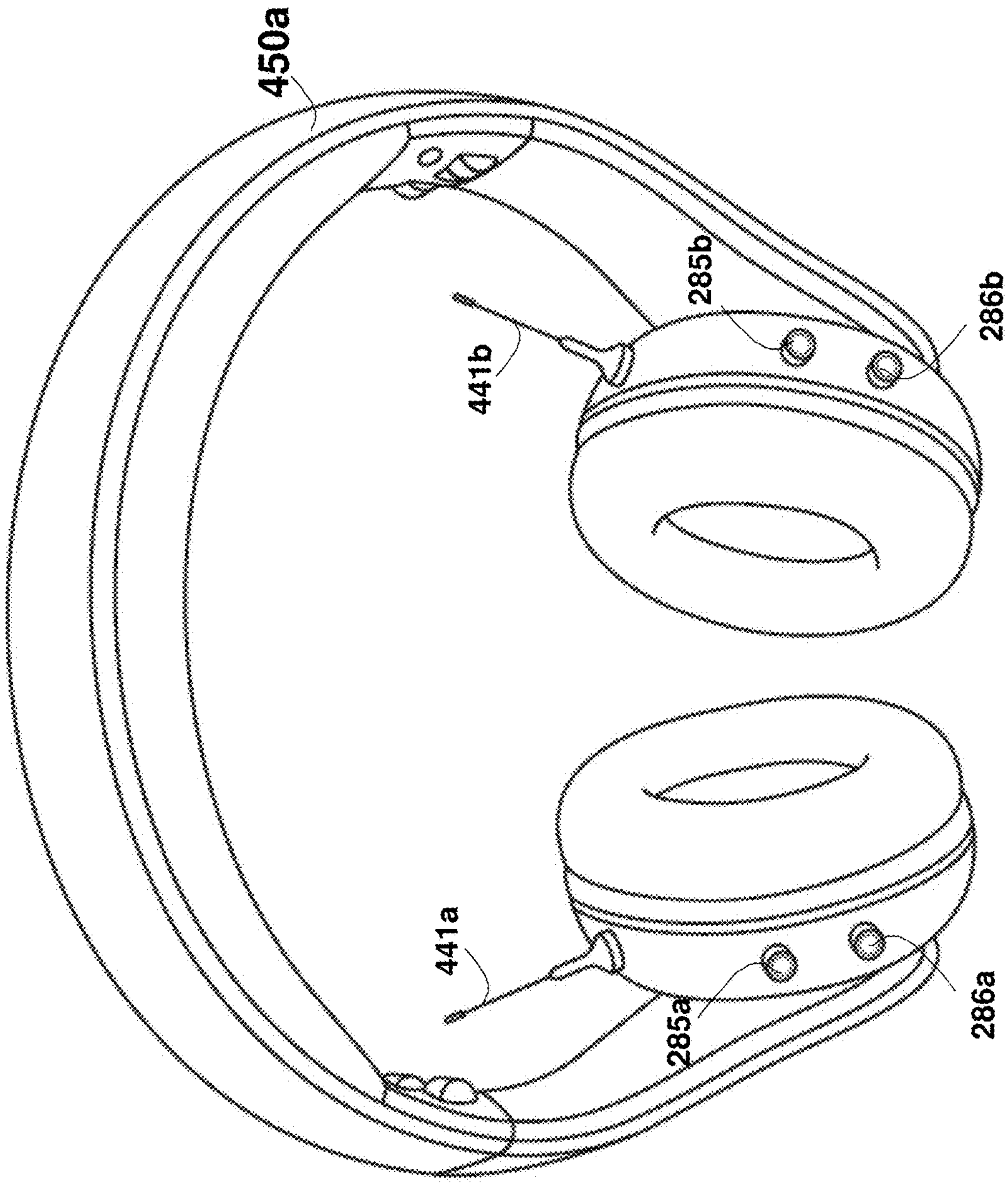
Figure 46:
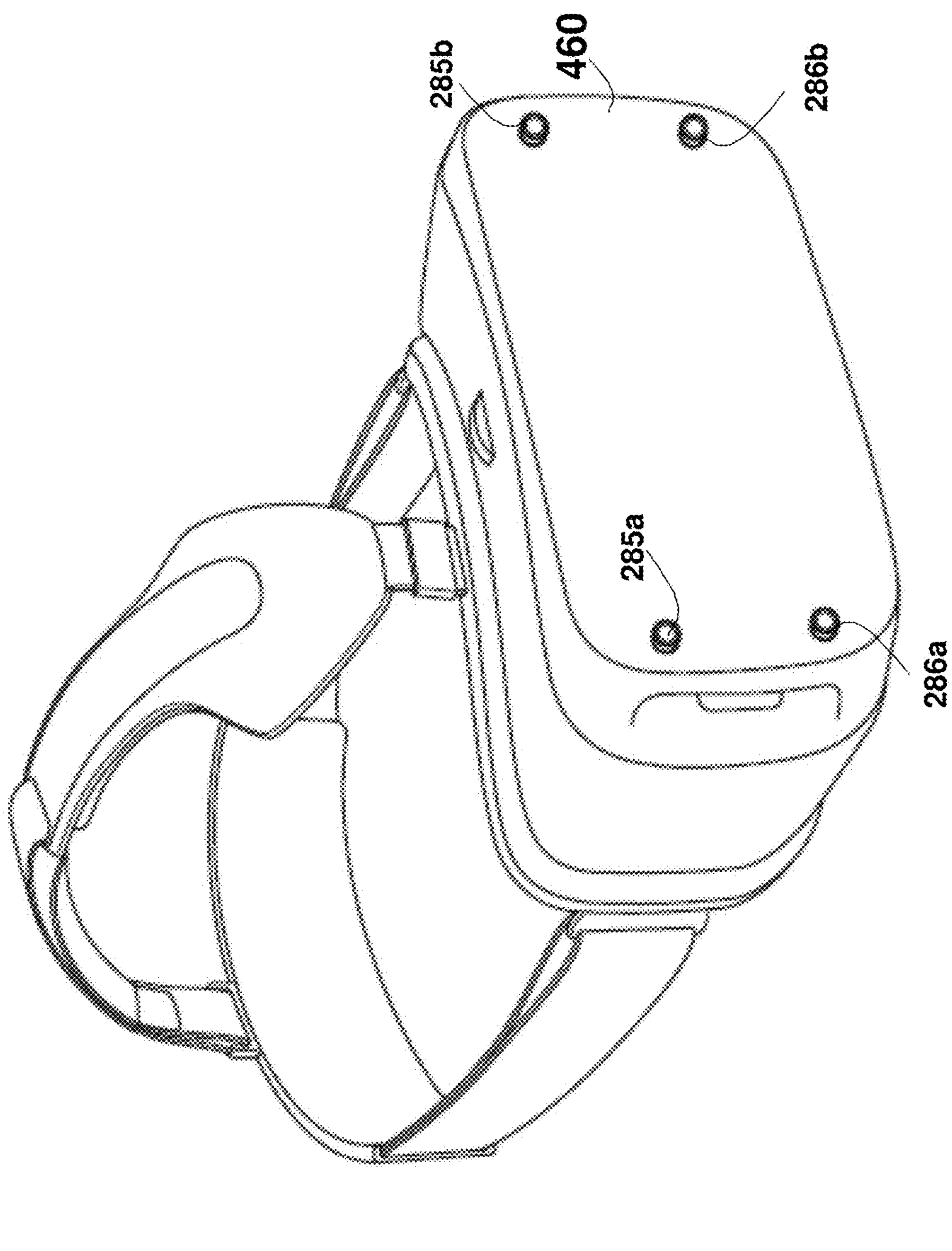
Figure 46A:
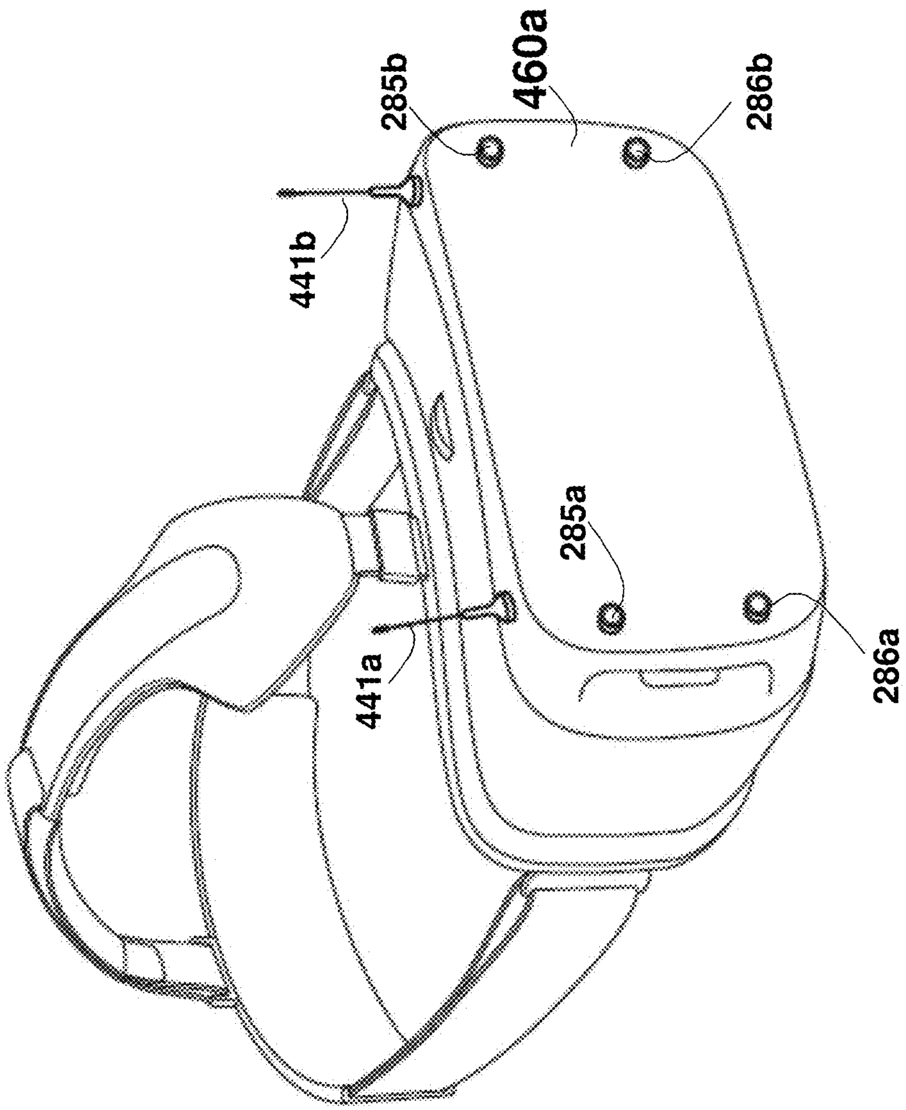
Figure 46B:
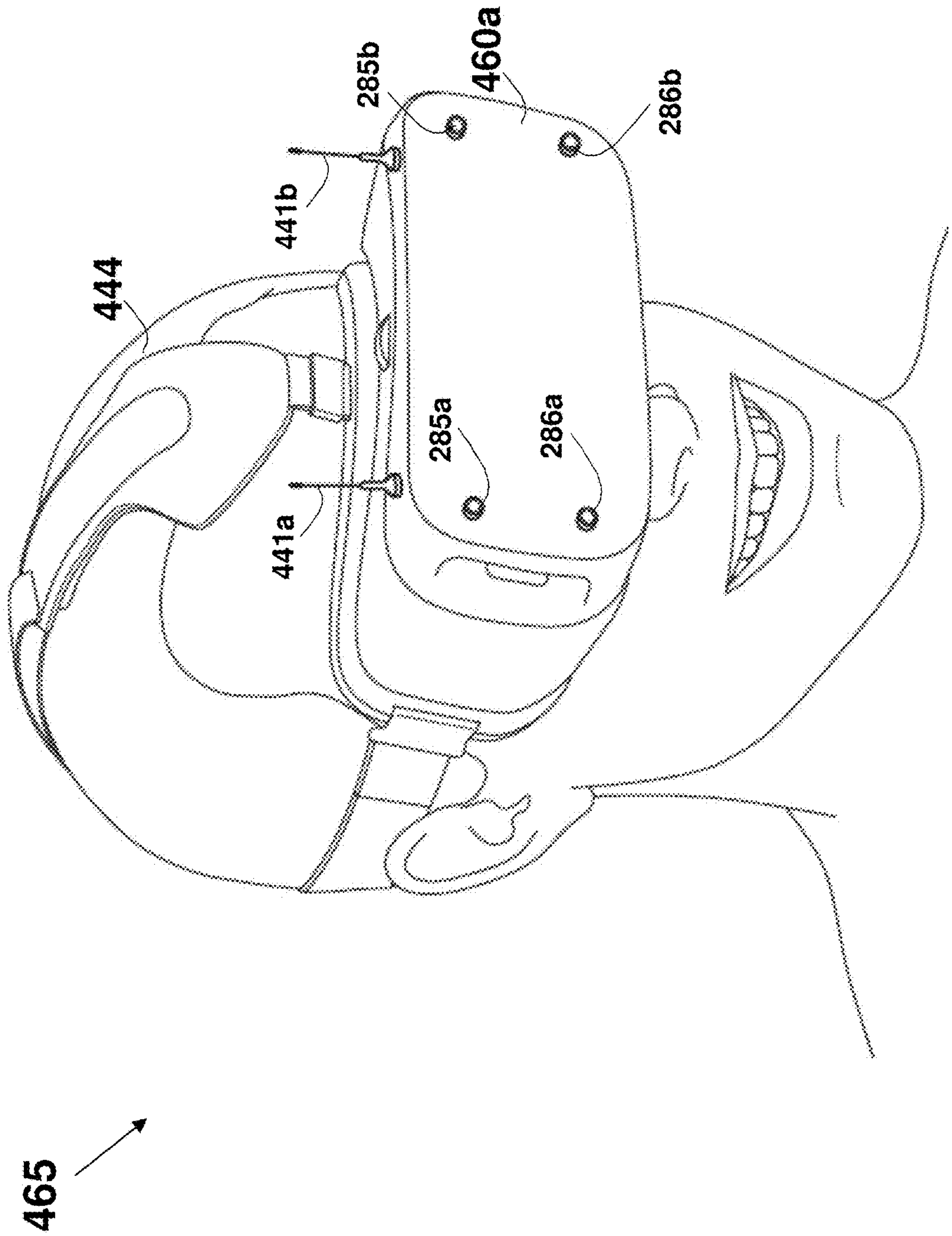
Figure 46C:
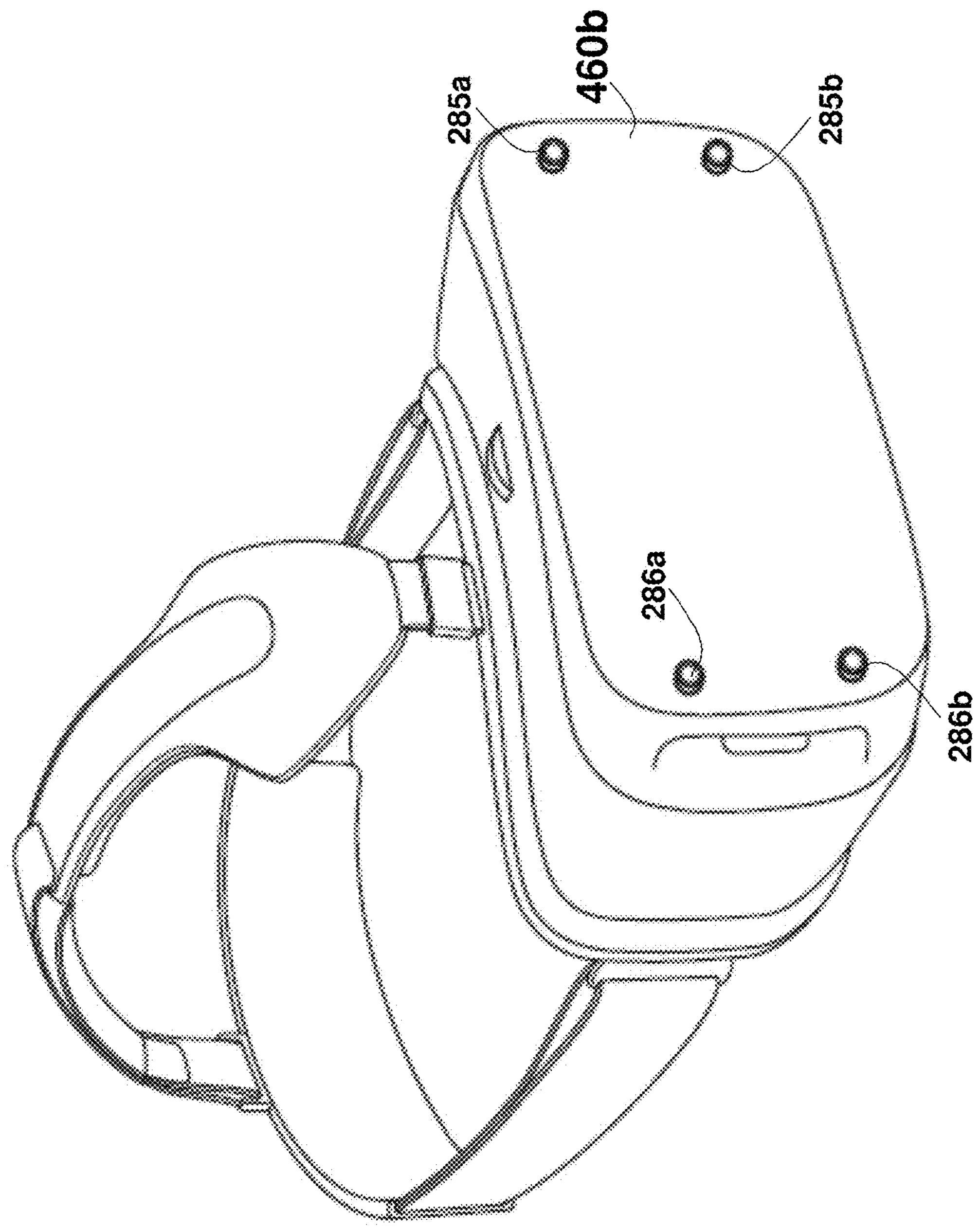

FIG. 40 illustrates a simplified schematic block diagram of a wirelessly connected distance meter;

FIG. 41 illustrates a simplified schematic block diagram of a wirelessly connected angle meter using two distinct distance meters;

FIG. 41*a* illustrates a simplified schematic block diagram of a wirelessly connected angle meter using two distinct distance meter functionalities;

FIG. 42 illustrates a simplified schematic block diagram of a wirelessly connected angle meter using two distinct angle meters;

FIG. 42*a* illustrates a simplified schematic block diagram of a wirelessly connected angle meter using two distinct angle meter functionalities;

FIG. 43 illustrates a simplified schematic block diagram of an arrangement of peer-to-peer wireless communication of an angle meter;

FIG. 43*a* illustrates a simplified schematic block diagram of a wirelessly connected angle meter using two distinct angle meter functionalities;

FIG. 44 depicts pictorially a perspective view of an integrated angle meter/eyewear device including a horizontal measuring angle meter;

FIG. 44*a* depicts pictorially a perspective view of an integrated angle meter/eyewear device including a horizontal measuring angle meter and antennas;

FIG. 44*b* depicts pictorially a perspective view of a person head wearing an integrated angle meter/eyewear device including a horizontal measuring angle meter;

FIG. 45 depicts pictorially a perspective view of an integrated angle meter/headphones device including a horizontal measuring angle meter;

FIG. 45*a* depicts pictorially a perspective view of an integrated angle meter/headphones device including a horizontal measuring angle meter and antennas;

FIG. 46 depicts pictorially a perspective view of an integrated angle meter/VR HMD device including a horizontal measuring angle meter;

FIG. 46*a* depicts pictorially a perspective view of an integrated angle meter/VR HMD device including a horizontal measuring angle meter and antennas;

FIG. 46*b* depicts pictorially a perspective view of a perspective view of a person head wearing an integrated angle meter/VR HMD device including a horizontal measuring angle meter and antennas; and FIG. 46*c* depicts pictorially a perspective view of an integrated angle meter/VR head-worn device including a vertical measuring angle meter.

DETAILED DESCRIPTION

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (even in the case of using different suffix, such as 5, 5*a*, 5*b* and 5*c*) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely the representative embodiments of the invention. It is to be understood that the singular forms "a," "an," and "the" herein include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "right," left," "upper," "lower," "above,", "front", "rear" "left", "right" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 5:
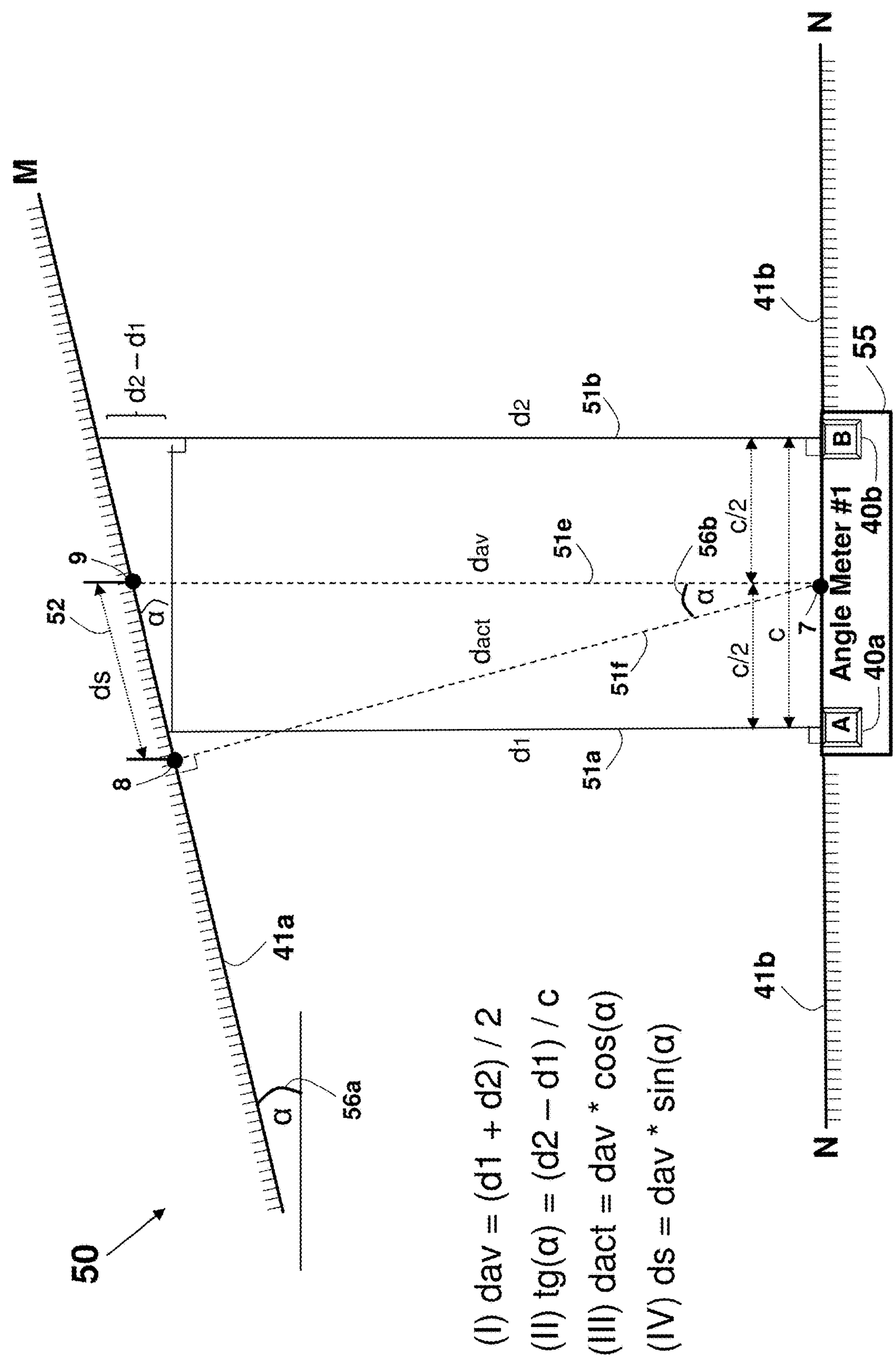
FIG. 5 depicts schematically measuring of an angle by an angle meter using two distance meters.

An example of an angle meter #1 55 is shown in an arrangement 50 in FIG. 5. The meter 55 comprises two active non-contact distance meters 'A' 40*a* and 'B' 40*b*. The distance meters 'A' 40*a* and 'B' 40*b*, being part of the angle meter #1 55 are mechanically configured so that they respectively measure the distances d1 51*a* and d2 51*b* using parallel line-of-sight measurement beams. These measurement beams 51*a* and 51*b* define a measurement plane and have spatial separation of a distance 'c'. Both measurement beams 51*a* and 51*b* are perpendicular (normal to a reference line 41*b*, which may be part of a surface. A reference line (or surface) M 41*a* is located at distance dact 51*f* from the angle meter #1 55, to the closest point 8 on the line of surface, and is tilted r pivoted at an angle of $\alpha$ 56*a* from the reference line N 41*b* in the measurement plane. Due to the tilting angle $\alpha$ 56*a*, the measured distance d2 (by the distance meter B 40*b*) along a line-of-sight 51*b* is larger than the measured distance d1 (by the distance meter A 40*a*) along a line-of-sight 51*a*. The average measured distance day, which is effectively the distance dav from a center point 7 (centered between the two measurement points of the distance meters 40*a* and 40*b*) to a point 9 on the surface, plane or line 41*a* may be calculated as dav=(d1+d2)/2, simulating the result of a single distance measured by an imaginary distance meter located in the middle point 7 between the distance meters 'A' 40*a* and 'B' 40*b* and measuring along a line-of-sight 51*e*, that is parallel and accurately between the measurement beams 51*a* and 51*b*. The angle $\alpha$ 56*b* formed in the measurement plane between the imaginary average measurement line 51*e* having a length of day) and the actual height line from the line M 41*a* to the meter 55 center point 7 is the same as angle $\alpha$ 56*a*, and can be calculated as $\tan(\alpha)=(d2-d1)/c$, hence $\alpha=\arctan((d2-d1)/c)$. Hence, the angle meter #1 55 may be used for estimating or calculating the tilting angle $\alpha$ between two lines at the measurement plane or between two vertical surfaces or planes at the measurement plane. The calculated or estimated angle $\alpha$ may be used for calculating or estimating of the actual distance dact of the line M 41*a* from the angle meter #1 55 center point 7 by the calculation $dact=day*\cos(\alpha)=(d1+d2)*\cos(\alpha)/2$. A distance ds 52 between the closest point 8 and the 'hit' point 9 (that is perpendicular to the angle meter reference line N 41*b*) may be calculated or estimated by $ds=dav*\sin(\alpha)=0.5*(d1+d2)*\sin(\arctan((d2-d1)/c))$.

Figure 5A:
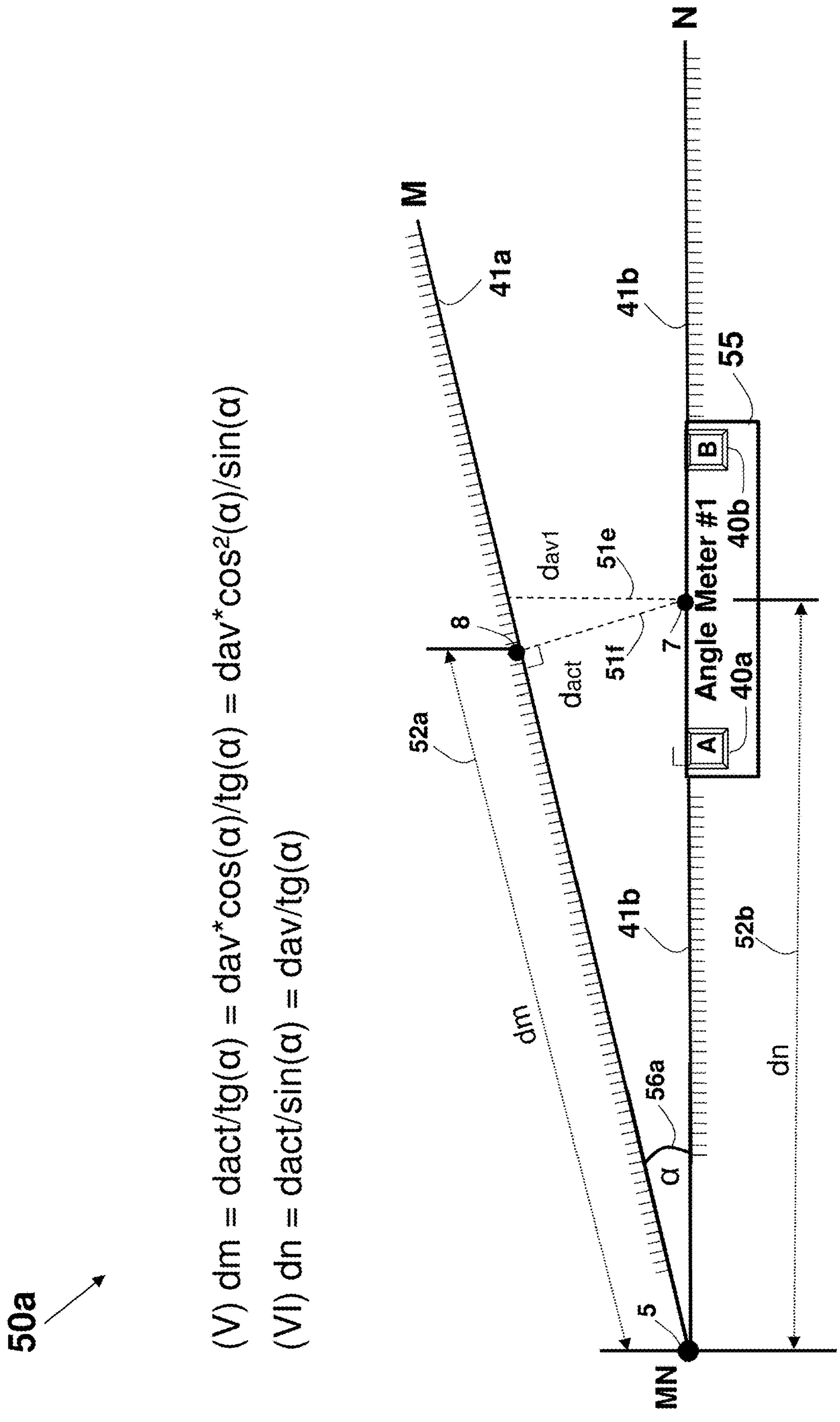
FIG. 5*a* depicts schematically measuring distances to an intersection point by an angle meter using two distance meters.

As shown in an arrangement 50*a* in FIG. 5*a*, additional distance measurements may be performed based on the calculated (or estimated) angle $\alpha$ 56*a*. An actual or imaginary point MN 5 represent the intersection point of the line M 41*a* and the reference line N 41*b*. A distance designated as dm 52*a* between the point 8 (the closest point to the angle meter #1 55 center point 7) and the intersection point MN 5 maybe calculated or estimated according to $dm=dav*\cos(\alpha)/tg(\alpha)=dav*\cos^2(\alpha)/\sin(\alpha)=dact/tg(\alpha)=c*dact/(d2-d1)$. Similarly, a distance designated as dn 52*b* between the angle meter #1 55 center point 7 and the intersection point MN 5 maybe calculated or estimated according to $dn=day/tg(\alpha)=dact/\sin(\alpha)=dact/\sin(\arctan((d2-d1)/c))$. In a numerical example where c=10 cm (centimeters), d2=100 cm, and d1=90 cm, then dav=95 cm, $\alpha=45°$, dact=dm=ds=67.175 cm, and dn=95. Similarly, in a numerical example where c=5 m (meters), d2=150 m and d1=130 m, then dav=140 m, $\alpha=75.96°$, dact=33.96 m, ds=135.82 m, dm=46.74 m, and dn=32.95 m.

In one example, the distance 'c' between the measurement lines 51*a* and 51*b* may be less than 1 millimeter, 2 millimeters, 3 millimeters, 5 millimeters, 1 centimeter, 2 centimeters, 3 centimeters, 5 centimeters, 10 centimeters, 20 centimeters, 30 centimeters, 50 centimeters, 1 meter, 2 meters, 3 meters, 5 meters, or 10 meters. Alternatively or in addition, the distance 'c' between the measurement lines 51*a* and 51*b* may be more than 1 millimeter, 2 millimeters, 3 millimeters, 5 millimeters, 1 centimeter, 2 centimeters, 3 centimeters, 5 centimeters, 10 centimeters, 20 centimeters, 30 centimeters, 50 centimeters, 1 meter, 2 meters, 3 meters, 5 meters, or 10 meters.

Each of the measured distances d1 (along the line 51*a*) and d2 (along the line 51*b*) may be less than 1 millimeter, 2 millimeters, 3 millimeters, 5 millimeters, 1 centimeter, 2 centimeters, 3 centimeters, 5 centimeters, 10 centimeters, 20 centimeters, 30 centimeters, 50 centimeters, 1 meter, 2 meters, 3 meters, 5 meters, 10 meters, 20 meters, 30 meters, 50 meters, 100 meters, 200 meters, 300 meters, 500 meters, 1 kilometer, 2 kilometers, 3 kilometers, 5 kilometers, or 10 kilometers. Alternatively or in addition, each of the measured distances d1 (along the line 51*a*) and d2 (along the line 51*b*) may be more than 1 millimeter, 2 millimeters, 3 millimeters, 5 millimeters, 1 centimeter, 2 centimeters, 3 centimeters, 5 centimeters, 10 centimeters, 20 centimeters, 30 centimeters, 50 centimeters, 1 meter, 2 meters, 3 meters, 5 meters, 10 meters, 20 meters, 30 meters, 50 meters, 100 meters, 200 meters, 300 meters, 500 meters, 1 kilometer, 2 kilometers, 3 kilometers, 5 kilometers, or 10 kilometers.

Preferably, the measuring lines 51*a* and 51*b* are parallel, providing best accuracy for measuring the angle α 56*b*, the distance dact and the distance ds 52. Practically, the measuring lines 51*a* and 51*b* may be substantially parallel, such as forming an angle of less than 20°, 18°, 15°, 13°, 10°, 8°, 5°, 3°, 2°, 1°, 0.8°, 0.5°, 0.3°, 0.2°, or 0.1°. The term 'perpendicular' or 'substantially perpendicular' herein includes a deviation from a right angle (90°) by a deviation of less than 20°, 18°, 15°, 13°, 10°, 8°, 5°, 3°, 2°, 1°, 0.8°, 0.5°, 0.3°, 0.2°, or 0.1°. For example, a deviation of 5° reflects an angle in the rage of 85°-95°.

Figure 4:
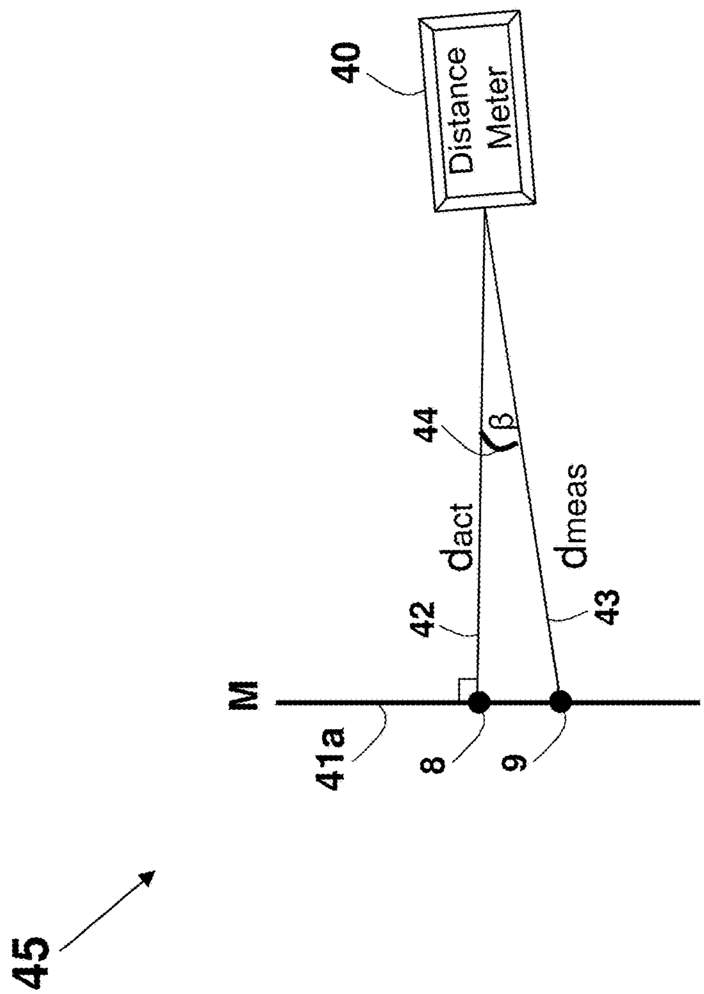
FIG. 4 depicts schematically an error induced in distance measuring along a single line.
Figure 4A:
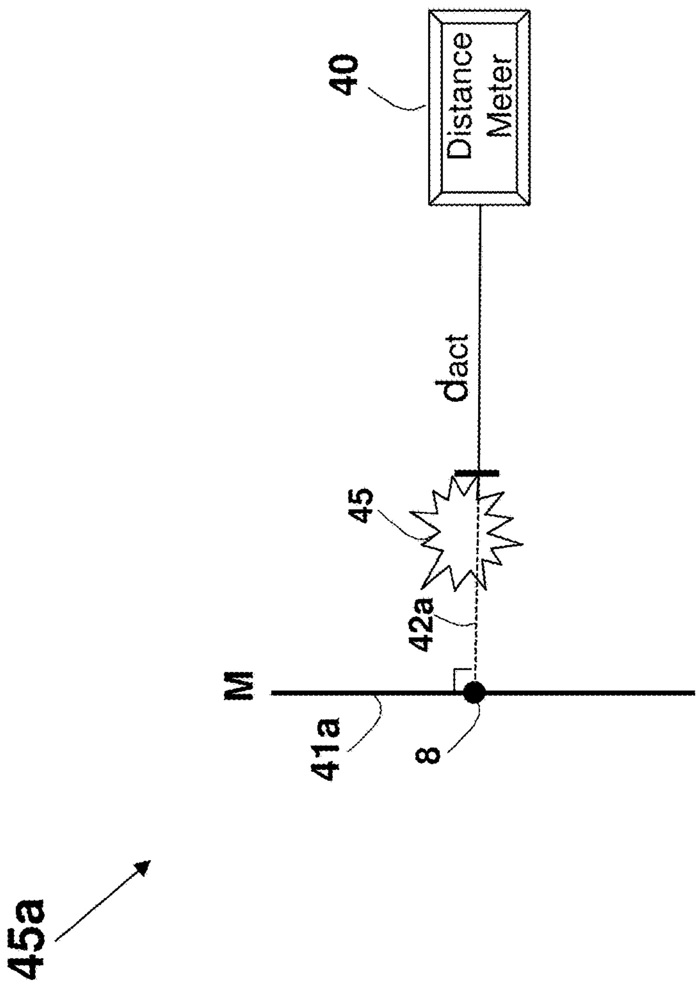
FIG. 4*a* depicts schematically an error induced in distance measuring along a single line having an obstacle.

One advantage of using the angle meter #1 55 is the capability to measure a distance to a surface even when an obstacle is blocking or avoiding direct measurement as explained regarding the arrangement 45*a* in FIG. 4*a* above. As described in an arrangement 50*b* shown in FIG. 5*b*, the angle meter #1 55 may use the two beams 51*a* and 51*b* to calculate the distance dact to the surface 41*a*, even in a scenario where the obstacle 45 is located along a direct measurement line, such as when the object 45 is located between the angle meter #1 55 and the closest point 8 on the surface 41*a*. The angle meter #1 55 measures the distance to the point 9 on the surface 41*a* and the angle β 44 to the surface 41*a*, and these values are used to calculate the distance to the surface 41*a*, defined by the distance to the closest point 8.

In one example, the angle meter #1 55 is used for measuring height of an object, such as a pole or a tree. An example for measuring the height of a tree 57 is illustrated in an arrangement 50*c* shown in FIG. 5*c*. The angle meter #1 55 is oriented to point to the highest point of the tree 57, so that the measured distance dav 51*e* [dav=(d1+d2)/2] is measured to the tree top point, and the tilting angle α 56*b* is calculated. The height of the tree 57 from the measuring center point 7 may be estimated by h1=day*sin(α). The height h2 of the measuring center point 7 may be known or measured using conventional means, so that the total tree 57 height may be estimated by h1+h2.

Figure 5B:
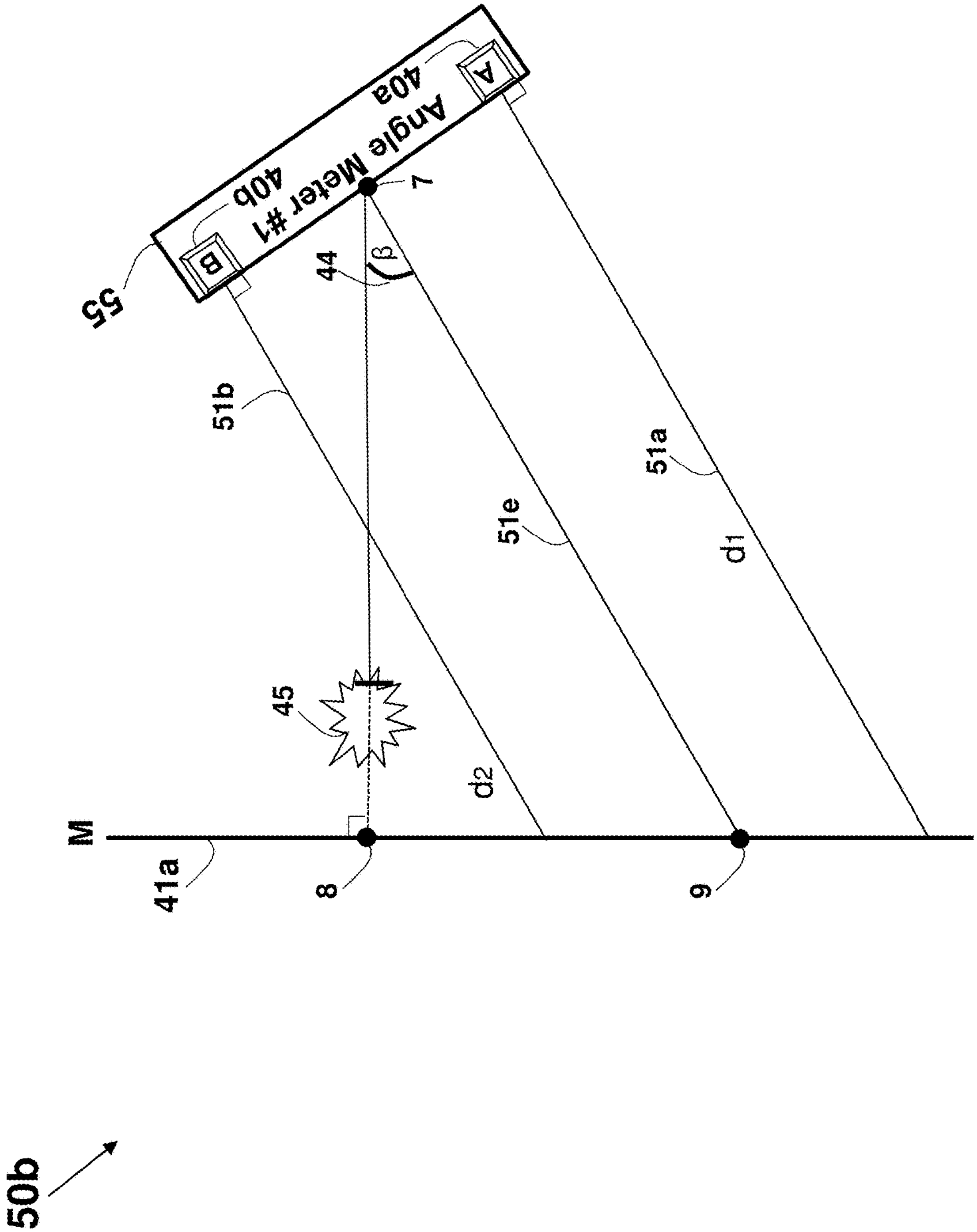
FIG. 5*b* depicts schematically a non-direct measuring of a distance to a surface or a plane by an angle meter using two distance meters.
Figure 5C:
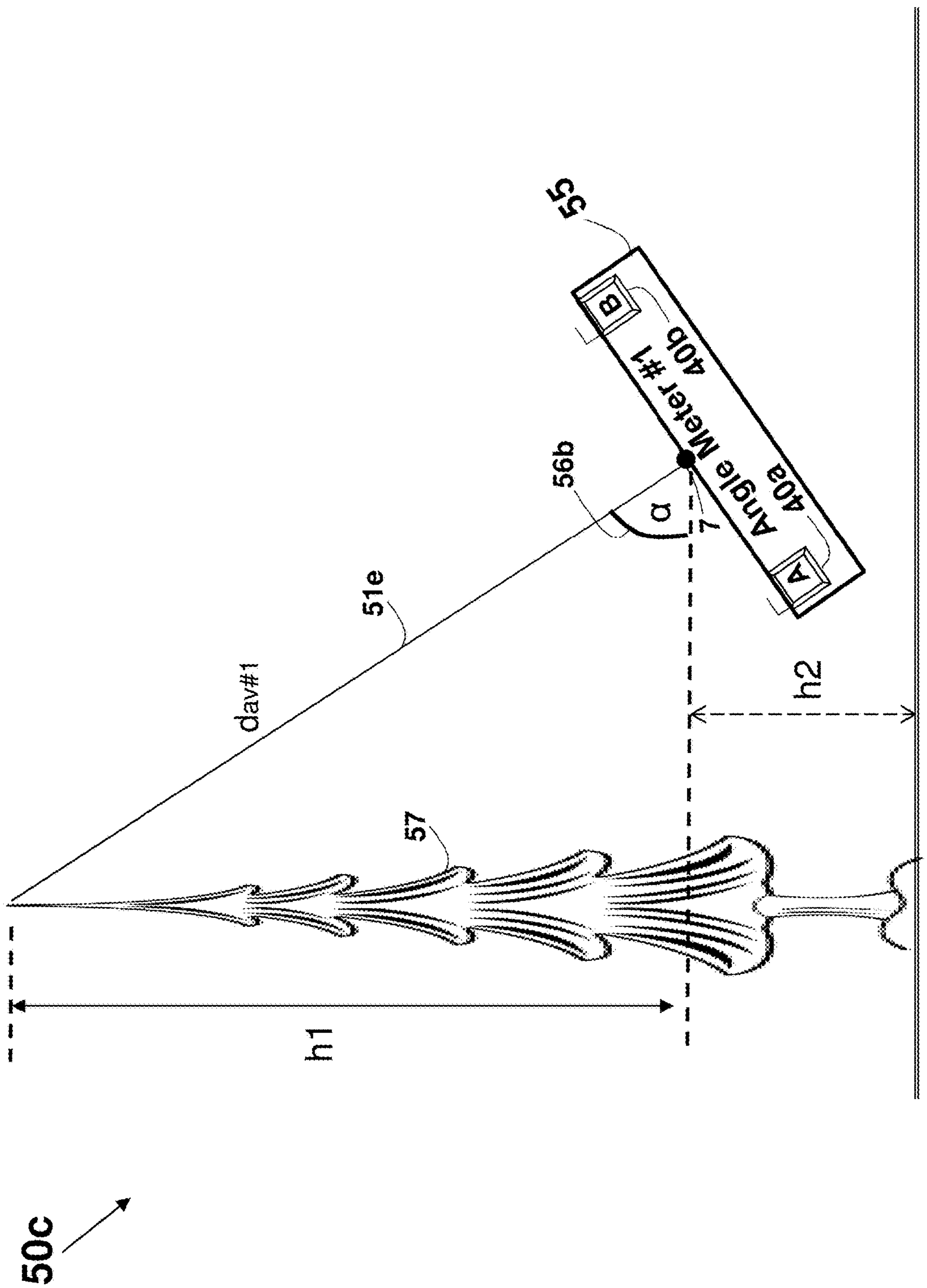
FIG. 5*c* depicts schematically a non-direct measuring of a height of a tree by an angle meter using two distance meters.
Figure 5D:
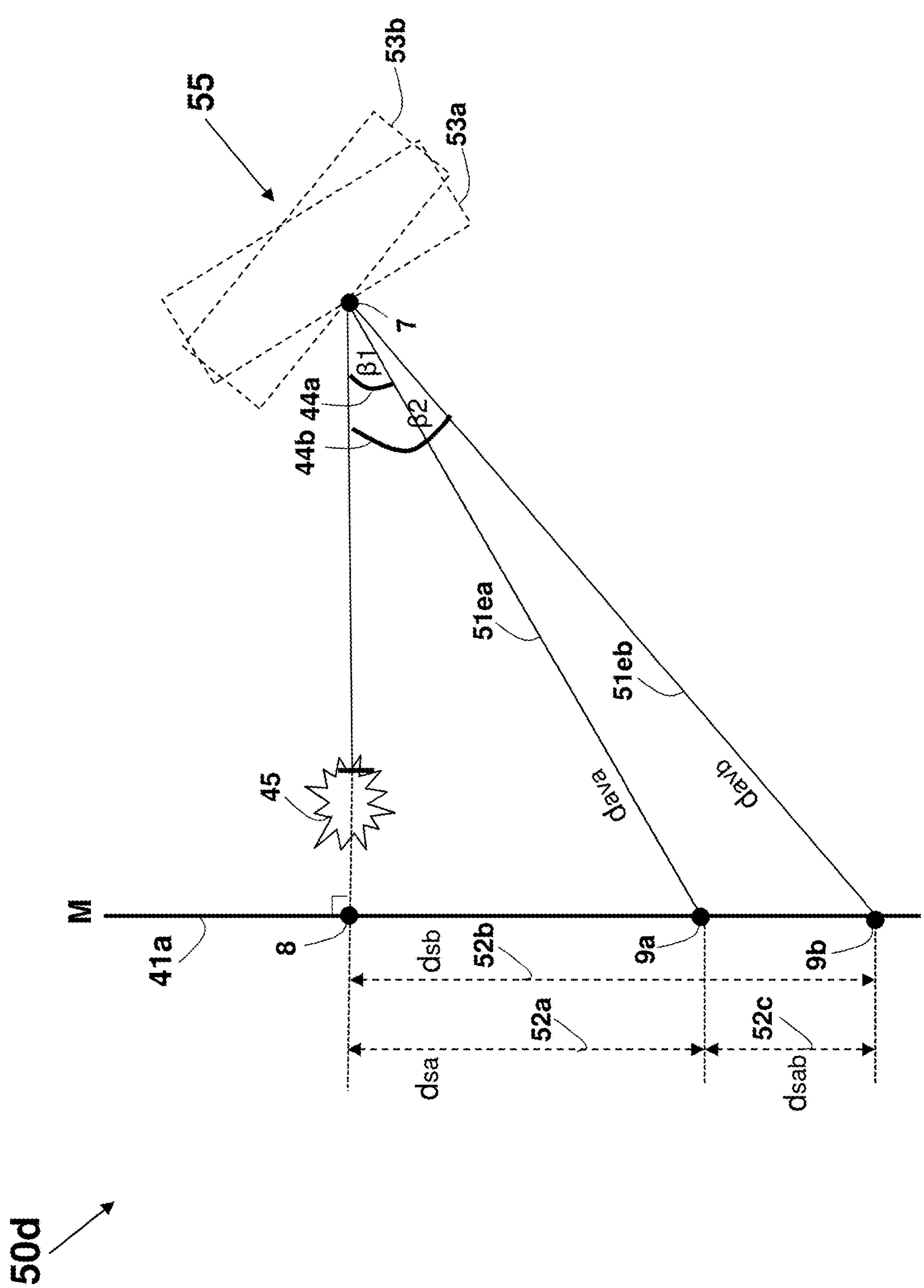
FIG. 5*d* depicts schematically a non-direct measuring of distance between two points on a line or surface by an angle meter using two distance meters.

In one example, the distance between two point on a line, surface or plane M 41*a* may be estimated or calculated without directly measuring the distance to the surface, such as when the obstacle 45 is present and blocking the direct measurement as described in the view 50*b* shown in FIG. 5*b*. A view 50*d* shown in FIG. 5*d* uses the angle meter #1 55 for two distance and angle measurements using two positions. In a first position shown as dashed lines 53*a*, the angle meter 55 is tilted or pivoted in an angle β1 44*a* to the line or surface 41*a*, and the angle β1 44*a* and the distance dava along line 51*ea* reaching the line or plane 41*a* at a point 9*a*, is estimated or calculated as described above. In addition, a distance dsa 52*a* between the closest point 8 and the point 9*a* is estimated or calculated according to dsa=dava*sin(β1). Similarly, in a second position shown as dashed lines 53, the angle meter 55 is tilted or pivoted around the center point 7 in an angle β2 44*b* to the line or surface 41*a*, and the angle β2 44*b* and the distance davb along line 51*eb* reaching the line or plane 41*a* at a point 9*b*, is estimated or calculated as described above. In addition, a distance dsb 52*b* between the closest point 8 and the point 9*b* is estimated or calculated according to dsa=davb*sin(β2). The distance dsab 52*c* between points 9*a* and 9*b* on the line or surface 41*a* may be calculated or estimated as dsab=dsb−dsa=davb*sin(β2)−dava*sin(β1).

Figure 6:
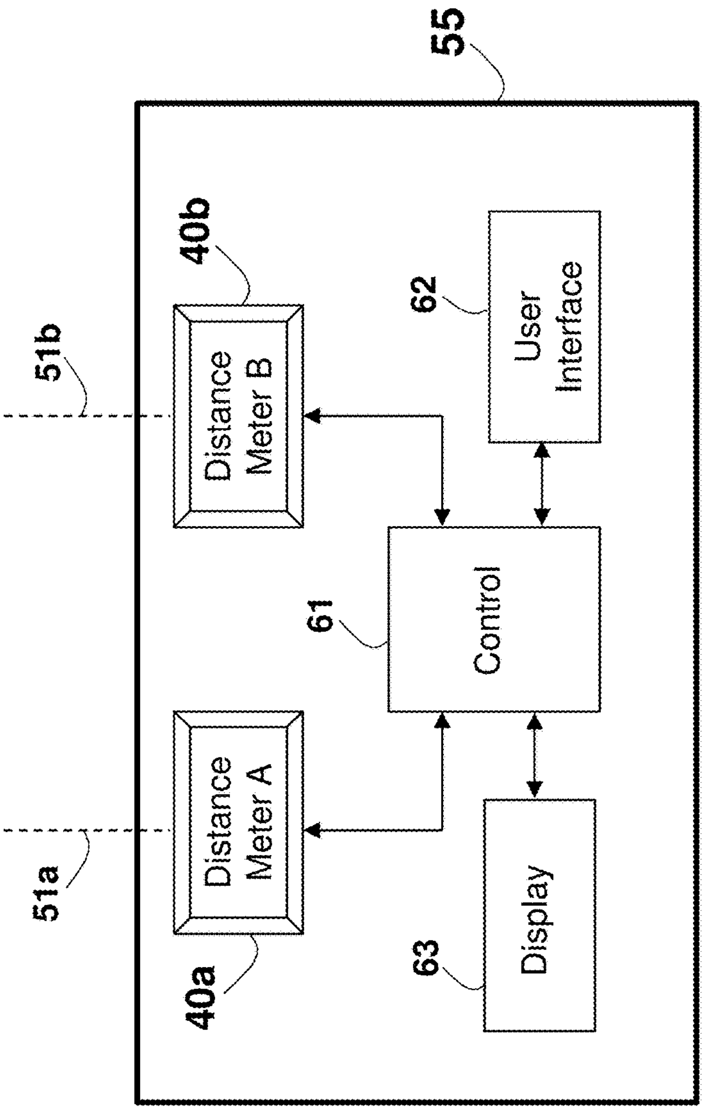
FIG. 6 illustrates a simplified schematic block diagram of an angle meter using two distance meters.

A schematic block diagram of the angle meter #1 55 is shown in FIG. 6. Two distance meters 40*a* and 40*b* that respectively measuring distances d1 and d2 configured for respectively measuring distances along the lines of sight 51*a* and 51*b*, are controlled by a control block 61. The control block 61 may include a processor, and control the activation of the two meters 40*a* and 40*b*. The measured distances are provided to the control block 61, which calculates the tilting angle α and the actual distance dact, and provides the estimated results for displaying to a user by a display 63, serving as the output functionality (or circuit) 17. The angle meter 55 may be control by a user via a user interface block 62 that may comprise various user interface components.

Figure 6A:
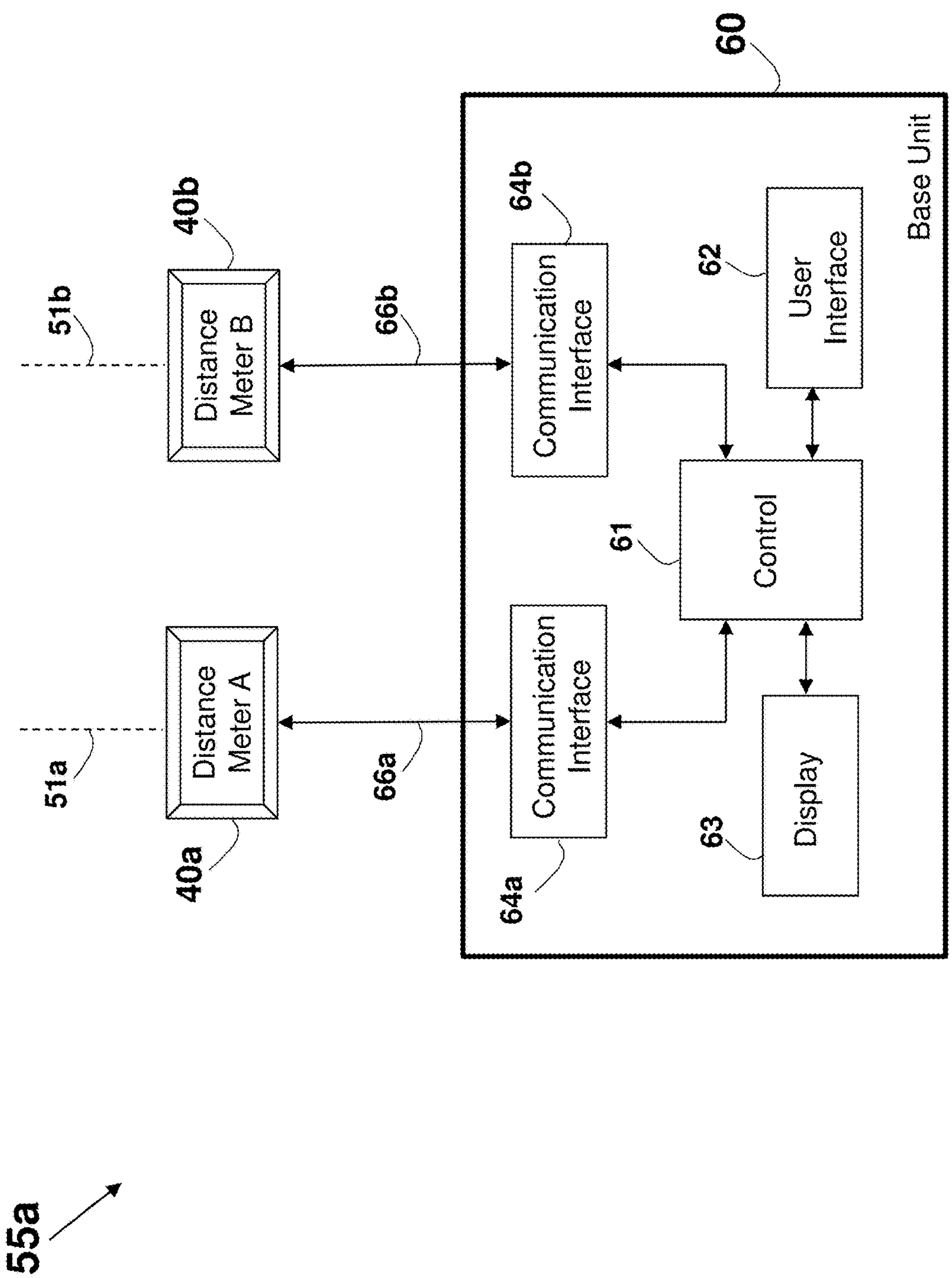
FIG. 6*a* illustrates a simplified schematic block diagram of an angle meter using a base unit and two distance meters housed in separate enclosures.

In one example, the angle meter #1 55*a*, as shown in FIG. 6*a*, comprises three distinct modules: A distance measurement module A 40*a*, a distance measurement module B 40*b*, and a Base Unit module 60. Each of the modules may be self-contained, housed in a separate enclosure, and power fed from a distinct power source. For example, each of the distance meters A 40*a* and B 40*b* may be self-contained, may be housed in a separate enclosure, and may be power fed from a distinct power source. Electrical connections (or communication links) connect the modules allowing for cooperative operation. A connection 66*a* connects the distance meter A 40*a* to the base unit 60, and a connection 66*b* connects the distance meter B 40*b* to the base unit 60. In the base unit 60, a communication interface 64*a* handles the connection with the distance meter A 40*a* over the connection 66*a*, and a communication interface 64*b* handles the connection with the distance meter B 40*b* over the connection 66*b*. The distance meter A 40*a* comprises a mating communication interface to the communication interface 64*a* is, and the distance meter B 40*b* comprises a mating communication interface to the communication interface 64*b*. Preferably the connections 66*a* and 66*b* are digital and bi-directional, employing either half-duplex or full-duplex communication scheme. A communication to the distance meter A 40*a* may comprise an activation command, instructing the distance meter A 40*a* to start a distance measurement operation cycle, and upon determining a distance value, the value is transmitted to the base unit 60 over the connection 66*a*. Similarly, a communication to the distance meter B 40*b* may comprise an activation command, instructing the distance meter B 40*b* to start a distance measurement operation cycle, and upon determining a distance value, the value is transmitted to the base unit 60 over the connection 66*b*.

The distance meters A 40*a* and B 40*b* may be identical, similar, or different from each other. For example, the mechanical enclosure, the structure, the power source, and the functionalities (or circuits) of the distance meters A 40*a* and B 40*b* may be identical, similar, or different from each other. The type of propagated waves used for measuring the distance by the distance meters A 40*a* and B 40*b* may be identical, similar, or different from each other. For example, the same technology may be used, such that both distance meters A 40*a* and B 40*b* use light waves, acoustic waves, or radar waves for distance measuring. Alternatively or in addition, the distance meter A 40*a* may use light waves while the distance meter B 40*b* may use acoustic or radar waves. Similarly, the distance meter A 40*a* may use acoustic waves while the distance meter B 40*b* may use light or radar waves. Further, the type of correlation schemes used for measuring the distance by the distance meters A 40*a* and B 40*b* may be identical, similar, or different from each other. For example, the same technology may be used, such that both distance meters A 40*a* and B 40*b* use TOF, Heterodyne-based phase detection, or Homodyne-based phase detection.

Alternatively or in addition, the distance meter A 40*a* may use TOF while the distance meter B 40*b* may use Heterodyne or Homodyne-based phase detection. Similarly, the distance meter A 40*a* may use Heterodyne-based phase detection while the distance meter B 40*b* may use TOF or Homodyne-based phase detection. Similarly, the emitters 11 in the distance meters A 40*a* and B 40*b* may be identical, similar, or different from each other, the sensors 13 in the distance meters A 40*a* and B 40*b* may be identical, similar, or different from each other, the signal conditioners 6 in the distance meters A 40*a* and B 40*b* may be identical, similar, or different from each other, the signal conditioners 6' in the distance meters A 40*a* and B 40*b* may be identical, similar, or different from each other, and the correlators 19 in the distance meters A 40*a* and B 40*b* may be identical, similar, or different from each other. Similarly, the connections 66*a* and 66*b*, respectively connecting the distance meters A 40*a* and B 40*b* to the base unit 60, may be identical, similar, or different from each other.

In one example, the same measuring technology is used by both distance meters A 40*a* and B 40*b*, such as optics using visible or non-visible light beams, acoustics using audible or non-audible sound waves, or electromagnetic using radar waves. The parameters of characteristics of the emitted waves, such as the frequency or the spectrum, or the modulation scheme may be identical, similar, or different from each other. In one example, different frequency (or non-overlapping spectrum), or different modulation schemes are used, in order to avoid or minimize interference between the two distance meters A 40*a* and B 40*b* operation. For example, the emitter 11 of the distance meter A 40*a* may emit a wave propagating in one carrier (or center) frequency and the emitter 11 of the distance meter B 40*b* may emit a wave propagating in a second carrier (or center) frequency distinct from the first one, where the mating sensor 13 of the distance meter A 40*a* is adapted to optimally sense the first carrier frequency and to ignore the second frequency, while the mating sensor 13 of the distance meter B 40*b* is adapted to optimally sense the second carrier frequency and to ignore the first frequency. Hence, even if the two emitters 11 transmit simultaneously and the two sensors 13 are positioned to receive both propagating waves from the two emitters 11, there will be no interference between the two meters A 40*a* and B 40*b* operation.

Any connection or bus, either parallel or serial, and either synchronous or asynchronous, that may be used for connecting between ICs or components, such as connections between ICs or components mounted on the same PCB, may be used as the connection 66*a* or the connection 66*b* (or both). Preferably, the connection 66*a* or the connection 66*b* (or both) uses, is compatible with, or is based on, a serial point-to-point bus such as SPI or $I^2C$. Preferably, the connection 66*a* or the connection 66*b* (or both) uses, is compatible with, or is based on, a serial point-to-point bus such as SPI or $I^2C$. Alternatively or in addition, the connection 66*a* or the connection 66*b* (or both) may be using, may be compatible with, or may be based on, and industry standard bus such as Universal Standard Bus (USB) version 2.0 or 3.0, Peripheral Component Interconnect (PCI) Express, Small Computer System Interface (SCSI), Serial Attached SCSI (SAS), Serial ATA (SATA), InfiniB and, PCI, PCI-X, AGP, Thunderbolt, IEEE 1394, FireWire, or Fibre-Channel.

Figure 6B:
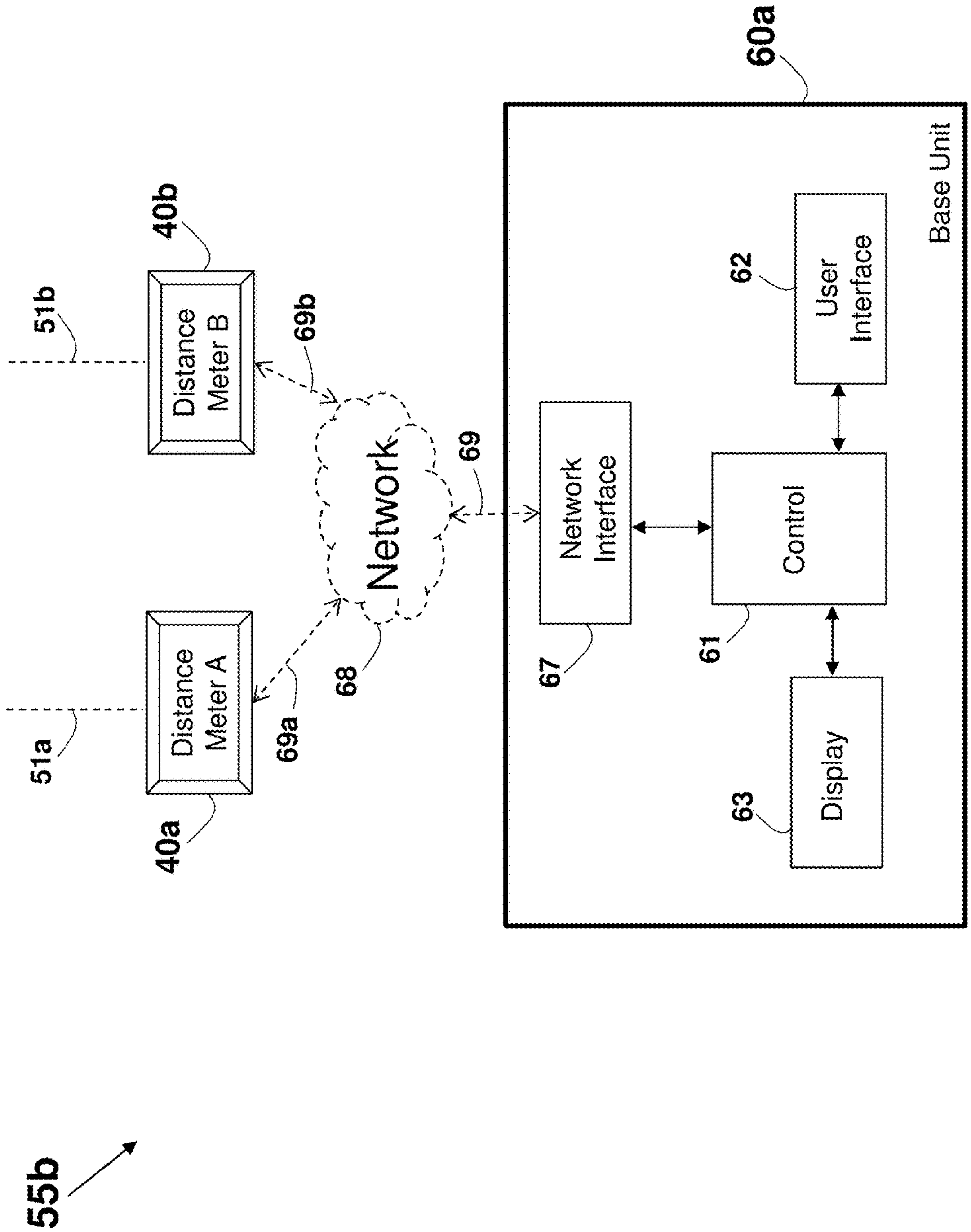
FIG. 6*b* illustrates a simplified schematic block diagram of an angle meter using a base unit and two distance meters housed in separate enclosures communicating over a network.

Alternatively or in addition, the units that are part of an angle meter 55*b* may communicate over a network 68, as shown in FIG. 6*b*. A base unit 60*a* comprises a network interface 67 for communicating over a communication path 69 with the network 69. Similarly, each of the distance meters A 40*a* and B 40*b* comprises a similar or identical network interface (not shown) for communicating over respective communication paths 69*a* and 69*b* with the network 68. In one example, the network 68 is a wired network 68*a*, using conductive medium (such as wires or cables), as part of an angle meter 55*c* shown in FIG. 6*c*. In such scheme, the network interface 67 comprises a wired transmitter and receiver (transceiver) 67*a* and a connector 66, connecting a base unit 60*b* over a conductive medium (such as wires or a cable) 69' to the network 68*a*. Similarly, each of the distance meters A 40*a* and B 40*b* comprises a similar or identical wired transceiver and a connector (not shown) for communicating over respective cables or wires 69*a'* and 69*b'* with the network 68*a*. Any wired network may be used as the wired network 68*a*, and the network 68*a* may be used to cover another geographical scale or coverage, such as wired PAN, LAN, MAN, or WAN type. Further, the wired network 68*a* may use any type of modulation, such as Amplitude Modulation (AM), a Frequency Modulation (FM), or a Phase Modulation (PM).

The network 68 (or the network 68*a*) may be a vehicle network, such as a vehicle bus or any other in-vehicle network. A connected element comprises a transceiver for transmitting to, and receiving from, the network. The physical connection typically involves a connector coupled to the transceiver. The vehicle bus may consist of, may comprise, may be compatible with, may be based on, or may use a Controller Area Network (CAN) protocol, specification, network, or system. The bus medium may consist of, or comprise, a single wire, or a two-wire such as an UTP or a STP. The vehicle bus may employ, may use, may be compatible with, or may be based on, a multi-master, serial protocol using acknowledgement, arbitration, and error-detection schemes, and may further use synchronous, frame-based protocol.

The network data link and physical layer signaling may be according to, compatible with, based on, or use, ISO 11898-1:2015. The medium access may be according to, compatible with, based on, or use, ISO 11898-2:2003. The vehicle bus communication may further be according to, compatible with, based on, or use, any one of, or all of, ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, or SAE J2411_200002 standards. The CAN bus may consist of, may be according to, compatible with, may be based on, compatible with, or may use a CAN with Flexible Data-Rate (CAN FD) protocol, specification, network, or system.

Alternatively or in addition, the vehicle bus may consist of, may comprise, may be based on, may be compatible with, or may use a Local Interconnect Network (LIN) protocol, network, or system, and may be according to, may be compatible with, may be based on, or may use any one of, or all of, ISO 9141-2:1994, ISO 9141:1989, ISO 17987-1, ISO 17987-2, ISO 17987-3, ISO 17987-4, ISO 17987-5, ISO 17987-6, or ISO 17987-7 standards. The battery power-lines or a single wire may serve as the network medium, and may use a serial protocol where a single master controls the network, while all other connected elements serve as slaves.

Alternatively or in addition, the vehicle bus may consist of, may comprise, may be compatible with, may be based on, or may use a FlexRay protocol, specification, network or system, and may be according to, may be compatible with, may be based on, or may use any one of, or all of, ISO 17458-1:2013, ISO 17458-2:2013, ISO 17458-3:2013, ISO 17458-4:2013, or ISO 17458-5:2013 standards. The vehicle bus may support a nominal data rate of 10 Mb/s, and may support two independent redundant data channels, as well as independent clock for each connected element.

Alternatively or in addition, the vehicle bus may consist of, may comprise, may be based on, may be compatible with, or may use a Media Oriented Systems Transport (MOST) protocol, network or system, and may be according to, may be compatible with, may be based on, or may use any one of, or all of, MOST25, MOST50, or MOST150. The vehicle bus may employ a ring topology, where one connected element is the timing master that continuously transmit frames where each comprises a preamble used for synchronization of the other connected elements. The vehicle bus may support both synchronous streaming data as well as asynchronous data transfer. The network medium may be wires (such as UTP or STP), or may be an optical medium such as Plastic Optical Fibers (POF) connected via an optical connector.

Figure 6C:
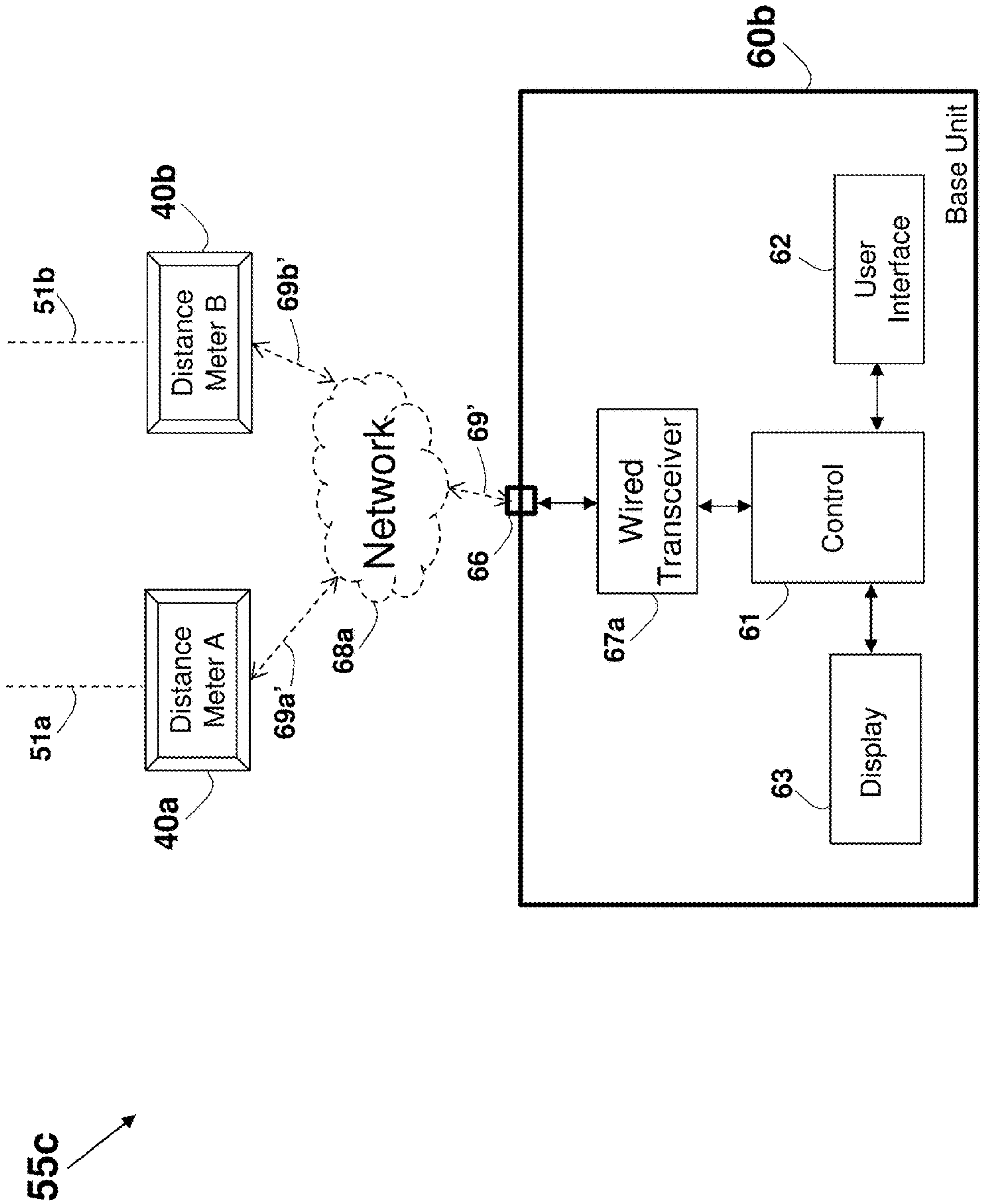
FIG. 6*c* illustrates a simplified schematic block diagram of an angle meter using a base unit and two distance meters housed in separate enclosures communicating over a wired network.
Figure 6D:
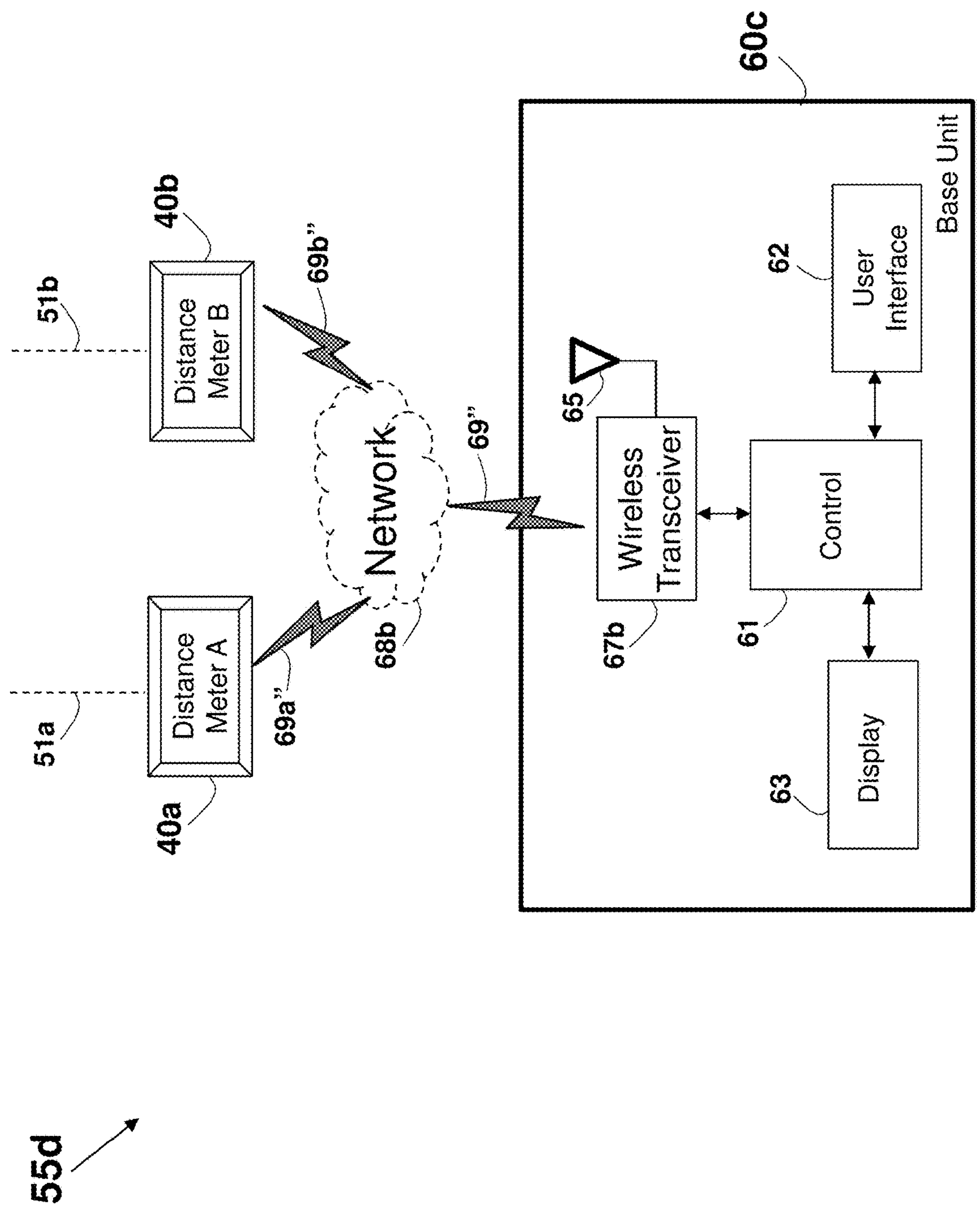
FIG. 6*d* illustrates a simplified schematic block diagram of an angle meter using a base unit and two distance meters housed in separate enclosures communicating over a wireless network.

Alternatively or in addition, the network 68 may be a wireless network 68*b*, as illustrated for an angle meter 55*d* shown in FIG. 6*d*. In such scheme, the network interface 67 comprises a wireless transceiver 67*b* and an antenna 65, wirelessly connecting a base unit 60*c* over the air or over a non-conductive medium 69" to the network 68*b* shown as a communication path 69". Similarly, each of the distance meters A 40*a* and B 40*b* comprises a similar or identical wireless transceiver and an antenna for wirelessly communicating over communication paths 69*a*" and 69*b*" with the network 68*b*. The wireless transceiver 67*b* and the antenna 65 may employ or use any wireless technology described herein, such as any control or sensor networks including ZigBee and Z-wave, WPAN, WLAN, or WWAN. Further, the wireless network 68*b* may use any type of modulation, such as Amplitude Modulation (AM), a Frequency Modulation (FM), or a Phase Modulation (PM).

The wireless network 68*b* may be a control network (such as ZigBee or Z-Wave), a home network, a WPAN (Wireless Personal Area Network), a WLAN (wireless Local Area Network), a WWAN (Wireless Wide Area Network), or a cellular network. An example of a Bluetooth-based wireless controller that may be included in the wireless transceiver 67*b* is SPBT2632C1A Bluetooth module available from STMicroelectronics NV and described in the data sheet DoclD022930 Rev. 6 dated April 2015 entitled: "*SPBT2632C1A—Bluetooth® technology class-1 module*", which is incorporated in its entirety for all purposes as if fully set forth herein.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on, or may be compatible with, wireless technologies that are described in Chapter 20: *"Wireless Technologies"* of the publication number 1-587005-001-3 by Cisco Systems, Inc. (7/99) entitled: "*Internetworking Technologies Handbook*", which is incorporated in its entirety for all purposes as if fully set forth herein.

Figure 6E:
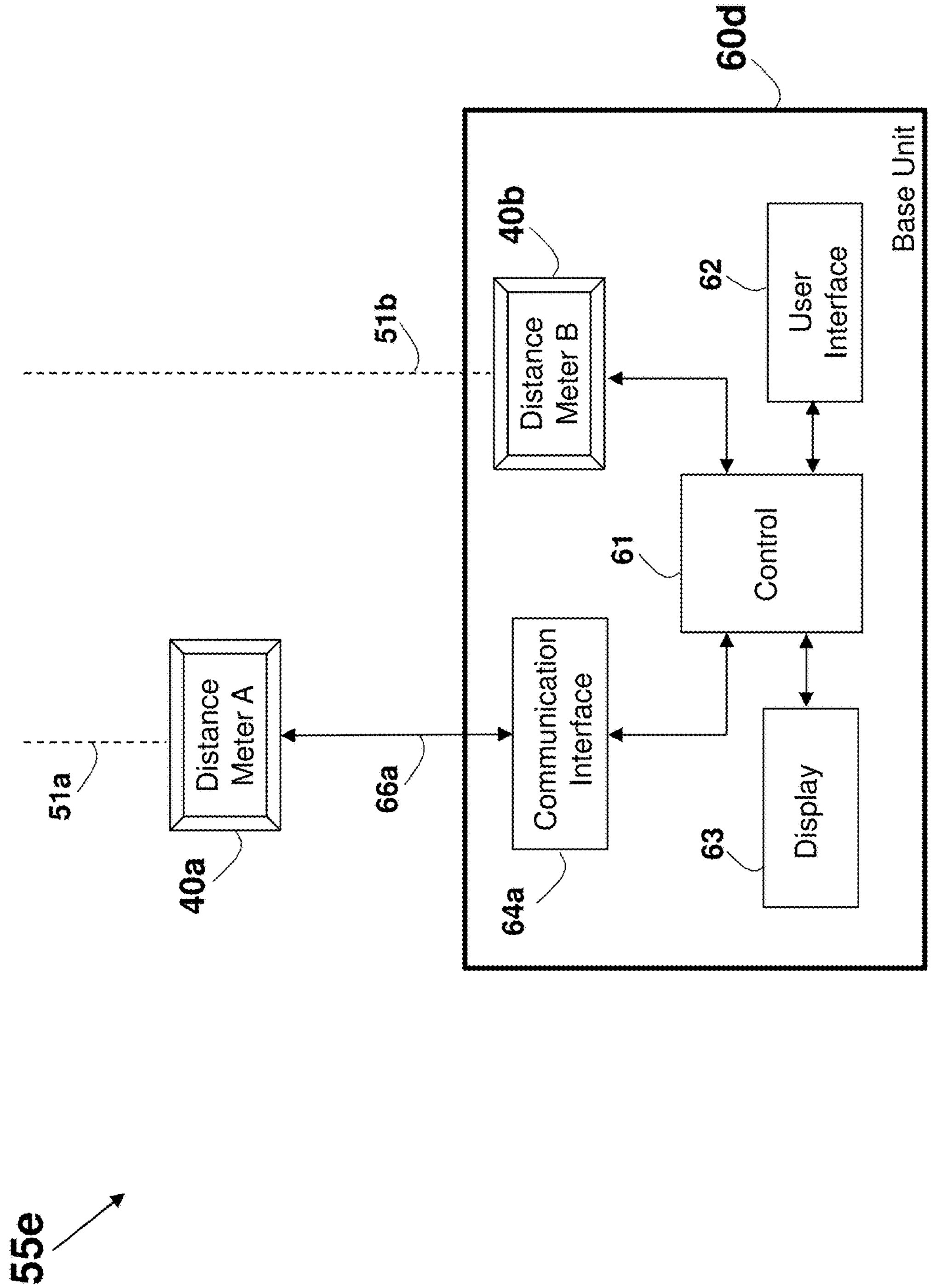
FIG. 6*e* illustrates a simplified schematic block diagram of an angle meter using a base unit and a distance meter housed in one enclosure and an additional distance meter in a separate enclosure.

While the angle meters 55*a* and 55*b* were exampled regarding the two distance meters A 40*a* and B 40*b* separated from the respective base units 60 and 60*a*, one of the distance meters (or both) may equally be integrated with the base unit. Such an exemplary angle meter 55*e* that comprises a base unit 60*d* is shown in FIG. 6*e*, where the distance meter B 40*b* is integrated with the base unit 60*d*, that only communicate over the connection 66*a* with the distance meter A 40*a*.

Figure 7:
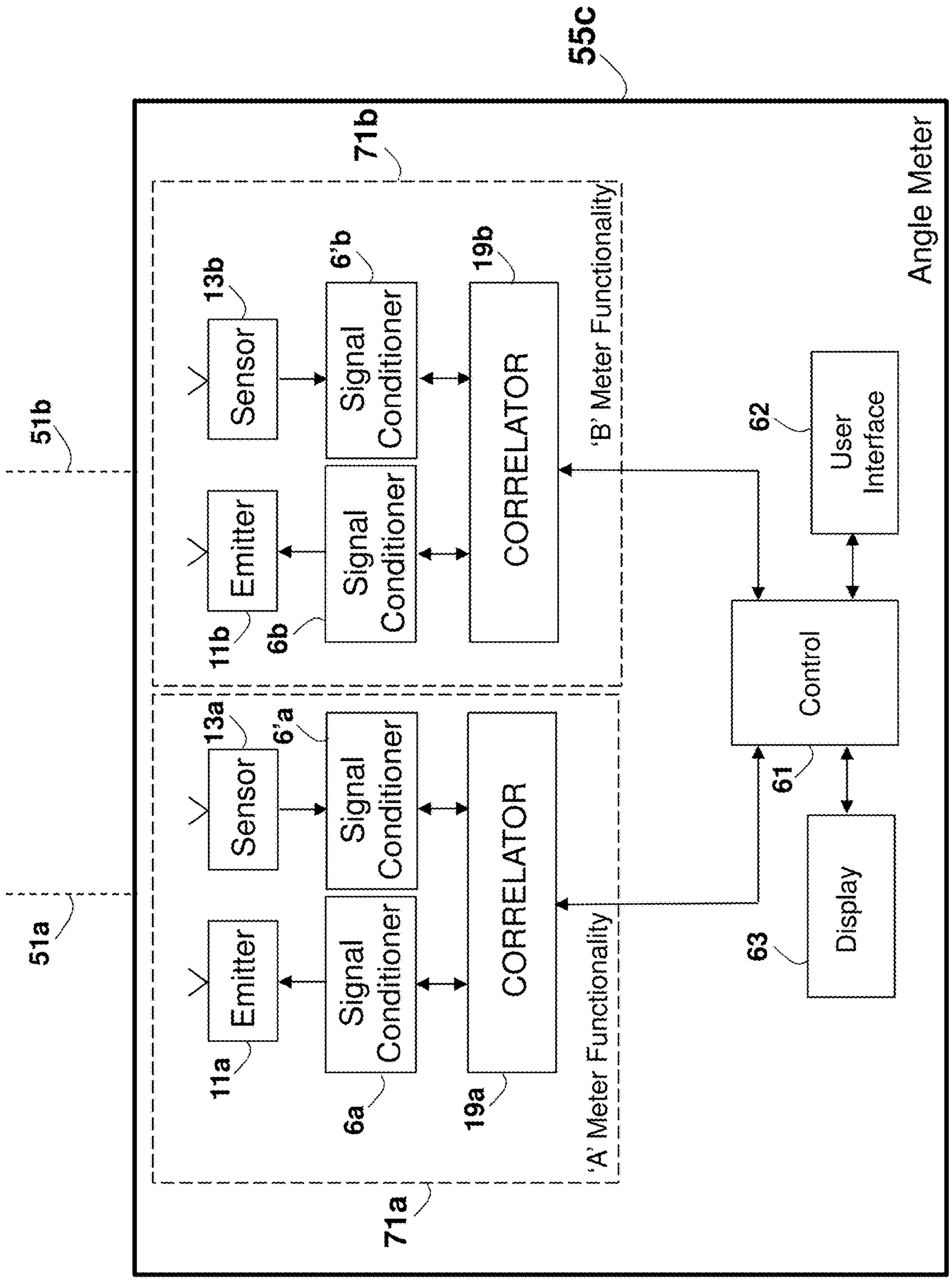
FIG. 7 illustrates a simplified schematic block diagram of an angle meter using two distinct distance meters functionalities.

Preferably, a single enclosure may house all the functionalities (such as circuits) of the angle meter #1 55, as exampled regarding an angle meter 55*c* in FIG. 7. The angle meter 55*c* comprises the base unit 65 functionalities, and provides shared structures and functionalities for the two distance meters A 40*a* and 40*b*, such as a shared mechanical enclosure, a shared power source or a shared power supply, or a shared control. The module or circuit 'A' meter functionality 71*a* comprises the structure and functionalities that are not shared and are part of the distance measuring along line 51*a*, namely the emitter 11*a* driven by the signal conditioner 6*a*, the sensor 13*a* which output is manipulated by the signal conditioner 6'*a*, and the correlator 19*a* for correlating between the signal fed to the emitter 11*a* and the signal received from the sensor 13*a*. Similarly, the module or circuit 'B' meter functionality 71*b* comprises the structure and functionalities that are not shared and are part of the distance measuring along line 51*b*, namely the emitter 11*b* driven by the signal conditioner 6*b*, the sensor 13*b* which output is manipulated by the signal conditioner 6'*b*, and the correlator 19*b* for correlating between the signal fed to the emitter 11*b* and the signal received from the sensor 13*b*. The shared components may comprise the control block 61, connected to activate and control the 'A' module 71*a* and the 'B' module 71*b* and to receive the measured distance therefrom, the display 63, the user interface block 62, a power source, and an enclosure.

The distance meter modules A 71*a* and B 71*b* may be identical, similar, or different from each other. For example, the mechanical arrangement, the structure, the power source, and the functionalities of the distance meter modules A 71*a* and B 71*b* may be identical, similar, or different from each other. The type of propagated waves used for measuring the distance by the distance meter modules A 71*a* and B 71*b* may be identical, similar, or different from each other. For example, the same technology may be used, such that both distance meter modules A 71*a* and B 71*b* use light waves, acoustic waves, or radar waves for distance measuring. Alternatively or in addition, the distance meter module A 71*a* may use light waves while the distance meter module B 71*b* may use acoustic or radar waves. Similarly, the distance meter module A 71*a* may use acoustic waves while the distance meter module B 71*b* may use light or radar waves. Further, the type of correlation schemes used for measuring the distance by the distance meter modules A 71*a* and B 71*b* may be identical, similar, or different from each other. For example, the same technology may be used, such that both distance meter modules A 71*a* and B 71*b* use TOF, Heterodyne-based phase detection, or Homodyne-based phase detection. Alternatively or in addition, the distance meter module A 71*a* may use TOF while the distance meter module B 71*b* may use Heterodyne or Homodyne-based phase detection. Similarly, the distance meter module A 71*a* may use Heterodyne-based phase detection while the distance meter module B 71*b* may use TOF or Homodyne-based phase detection. Similarly, the emitters 11*a* and 11*b* in the respective distance meter modules A 71*a* and B 71*b* may be identical, similar, or different from each other, the sensors 13*a* and 13*b* in the respective distance meter modules A 71*a* and B 71*b* may be identical, similar, or different from each other, the signal conditioners 6*a* and 6*b* in the respective distance meter modules A 71*a* and B 71*b* may be identical, similar, or different from each other, the signal conditioners 6'*a* and 6'*b* in the respective distance meter modules A 71*a* and B 71*b* may be identical, similar, or different from each other, and the correlators 19*a* and 19*b* in the respective distance meter modules A 71*a* and B 71*b* may be identical, similar, or different from each other.

Figure 3:
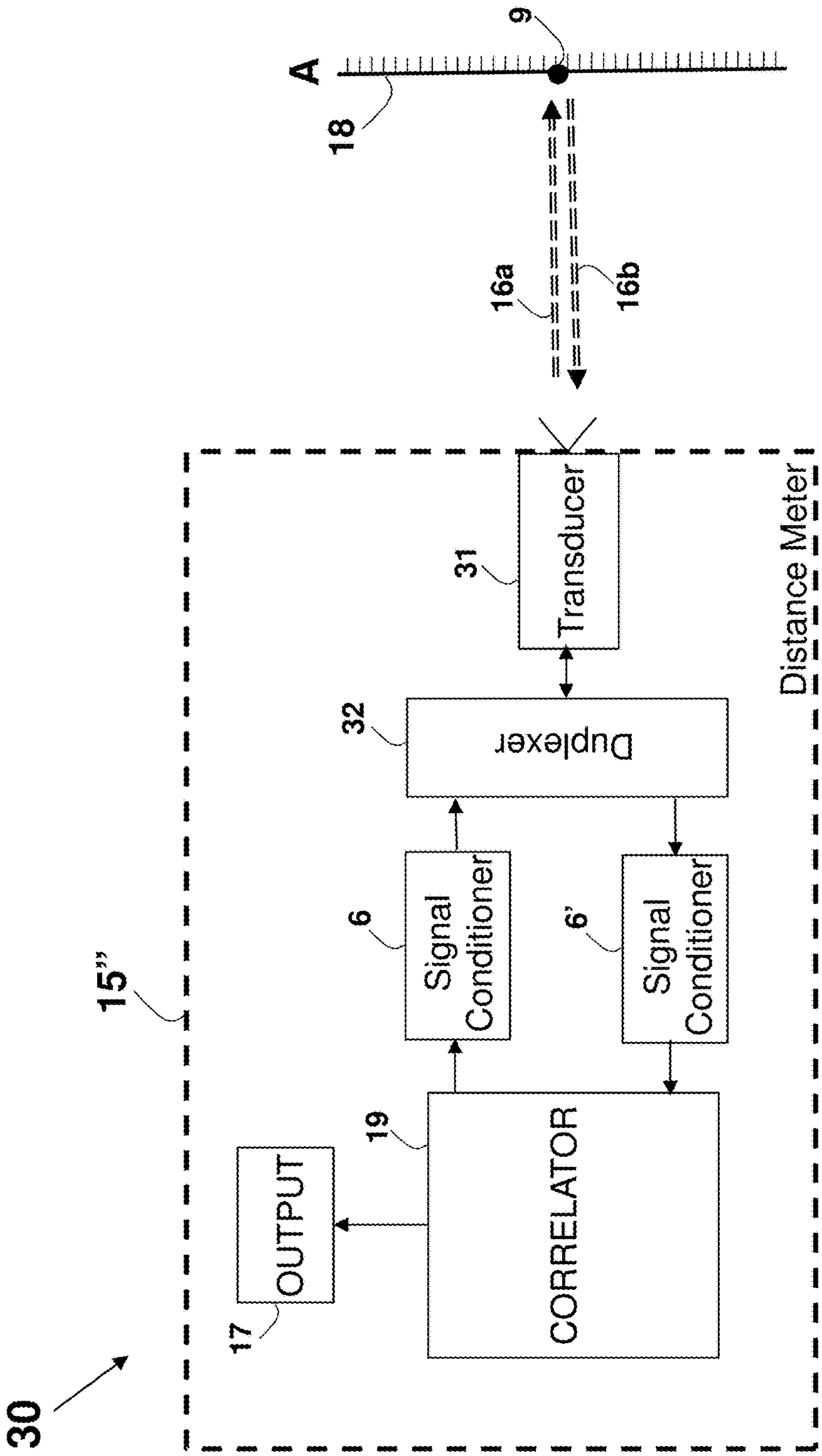
FIG. 3 illustrates a simplified schematic block diagram of a prior-art distance meter using a transducer and a duplexer.
Figure 7A:
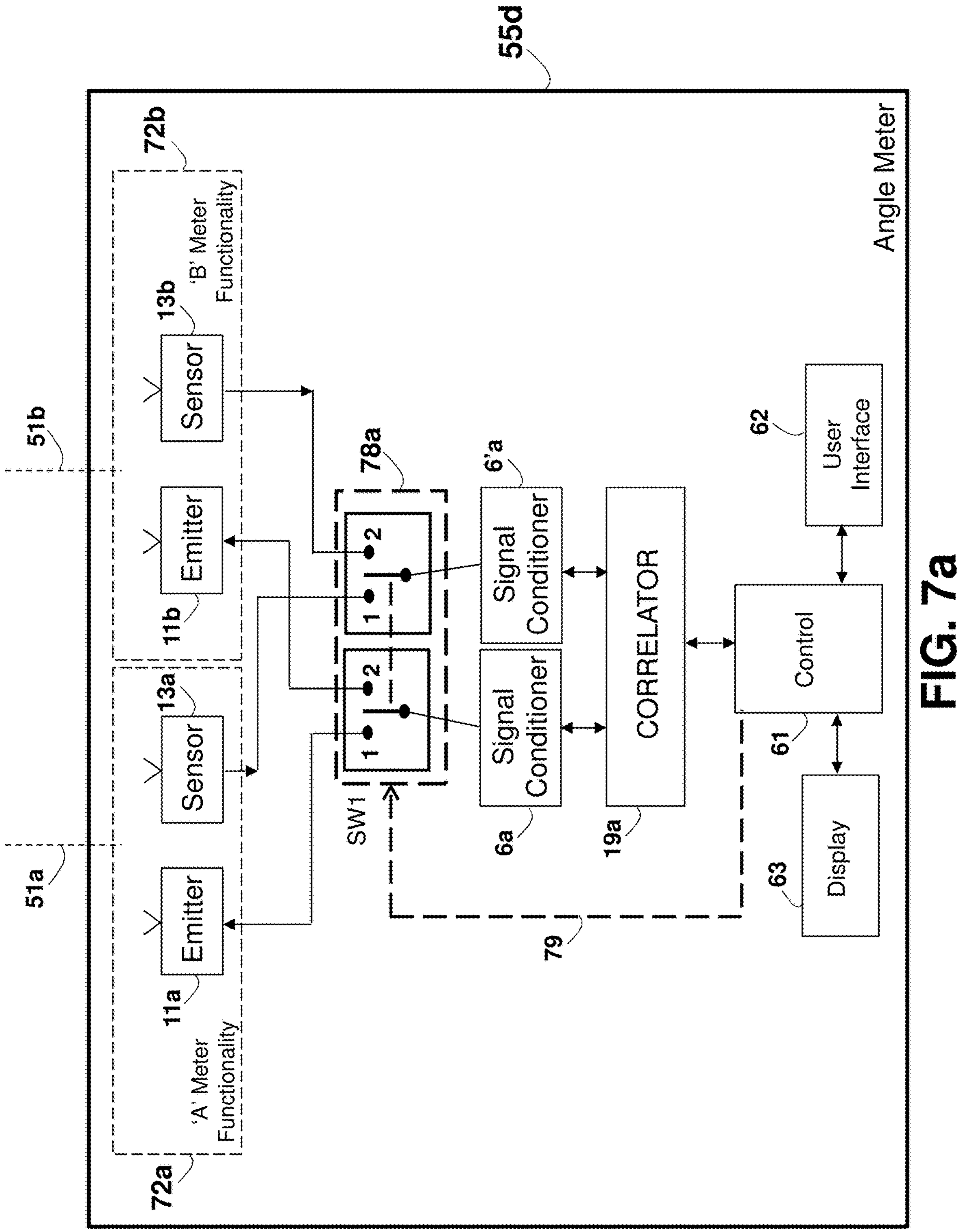
FIG. 7*a* illustrates a simplified schematic block diagram of an angle meter using two distance meters sharing a correlator and signal conditioners.
Figure 7B:
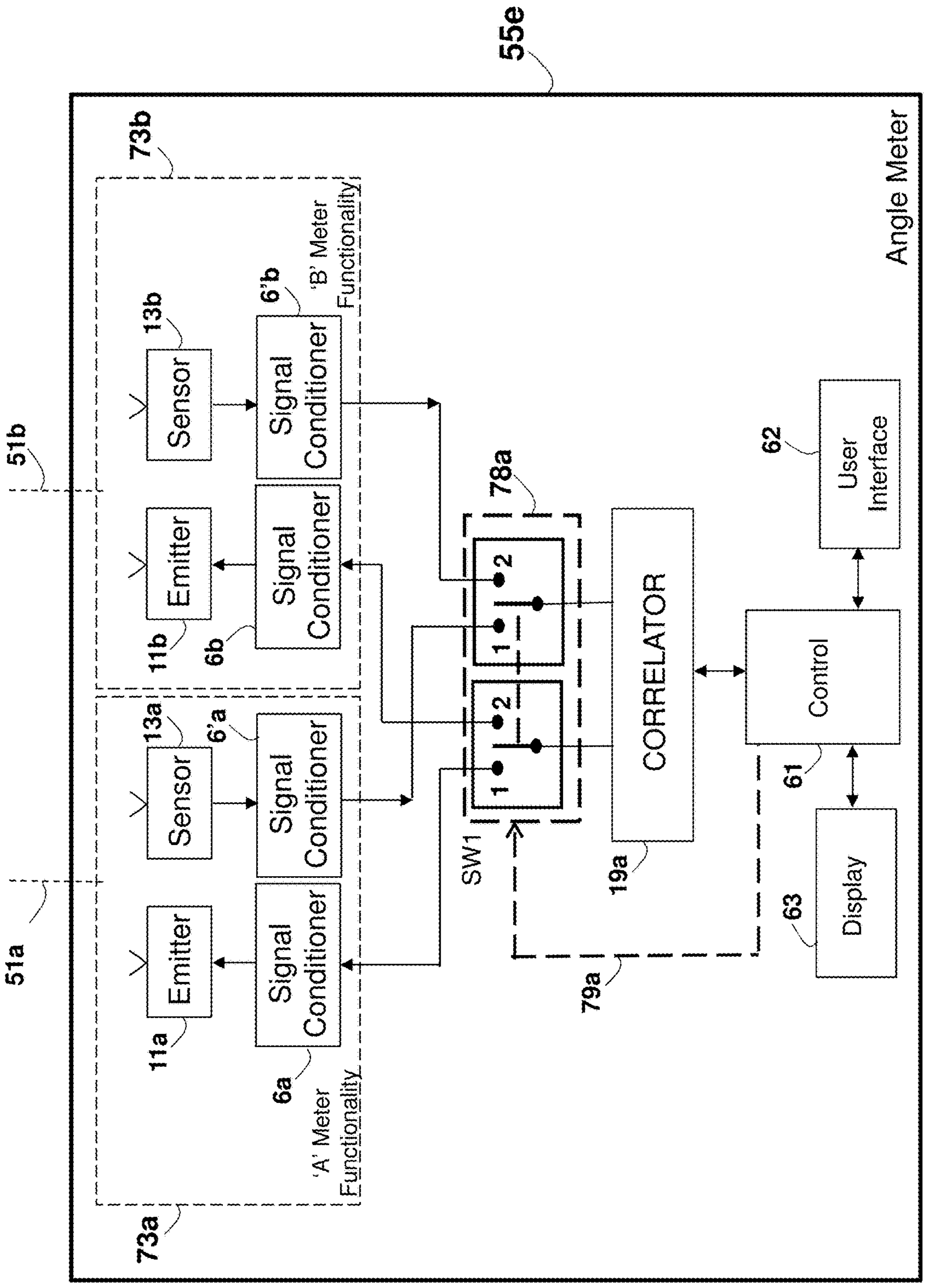
FIG. 7*b* illustrates a simplified schematic block diagram of an angle meter using two distance meters sharing a correlator.
Figure 7C:
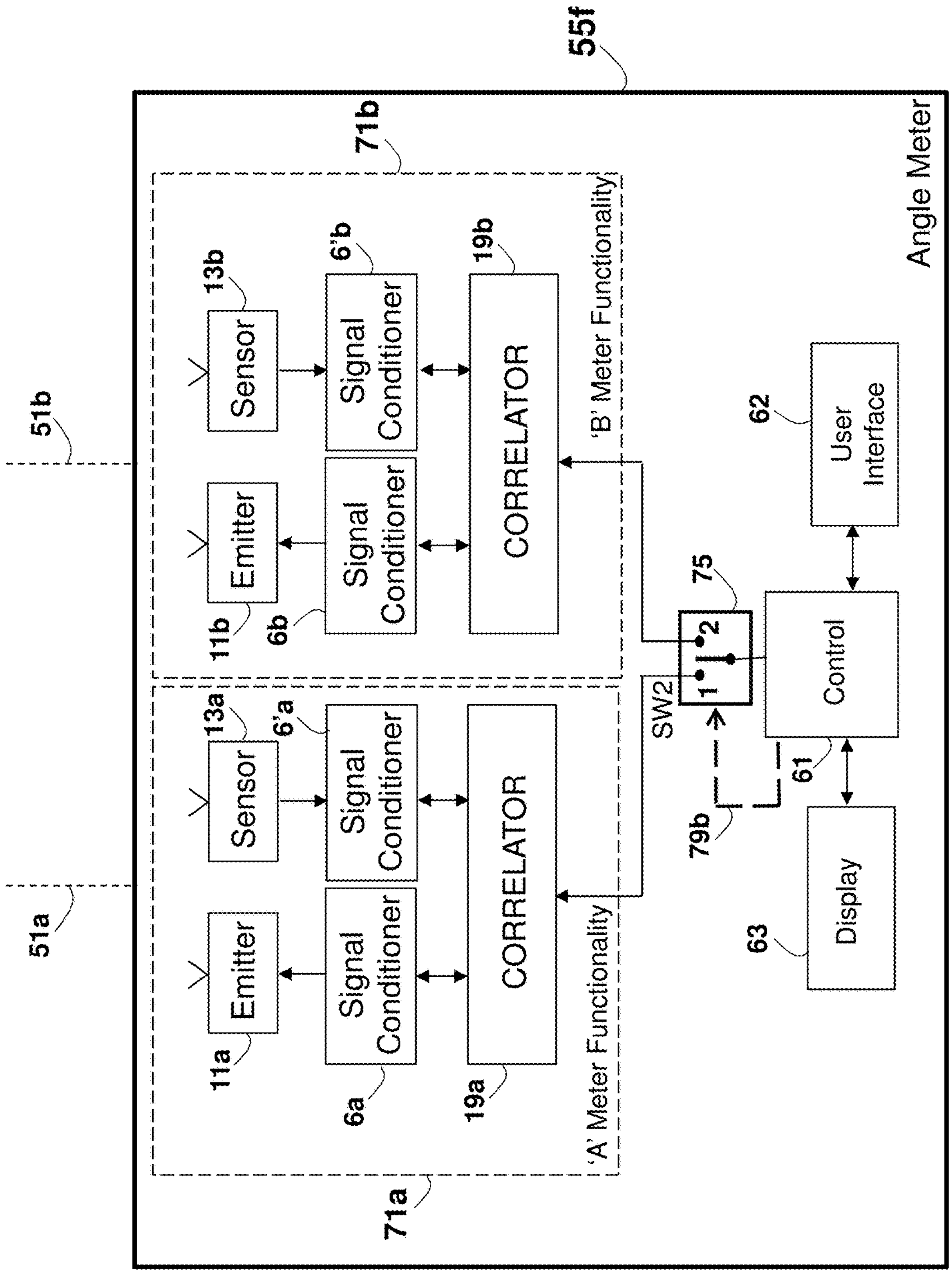
FIG. 7*c* illustrates a simplified schematic block diagram of an angle meter using two alternatively connected distinct distance meters functionalities.
Figure 7D:
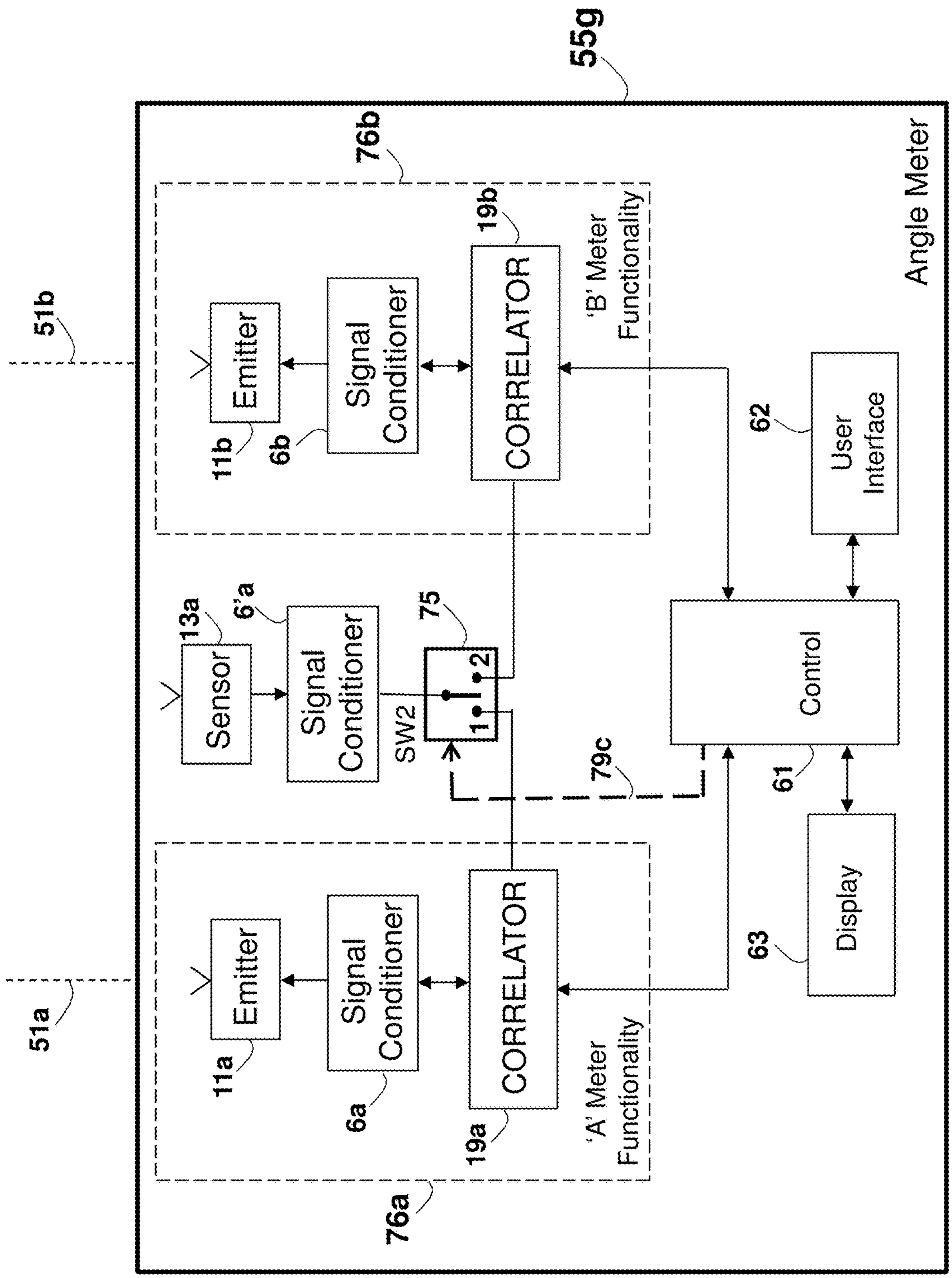
FIG. 7*d* illustrates a simplified schematic block diagram of an angle meter using two distance meters sharing a sensor.
Figure 7E:
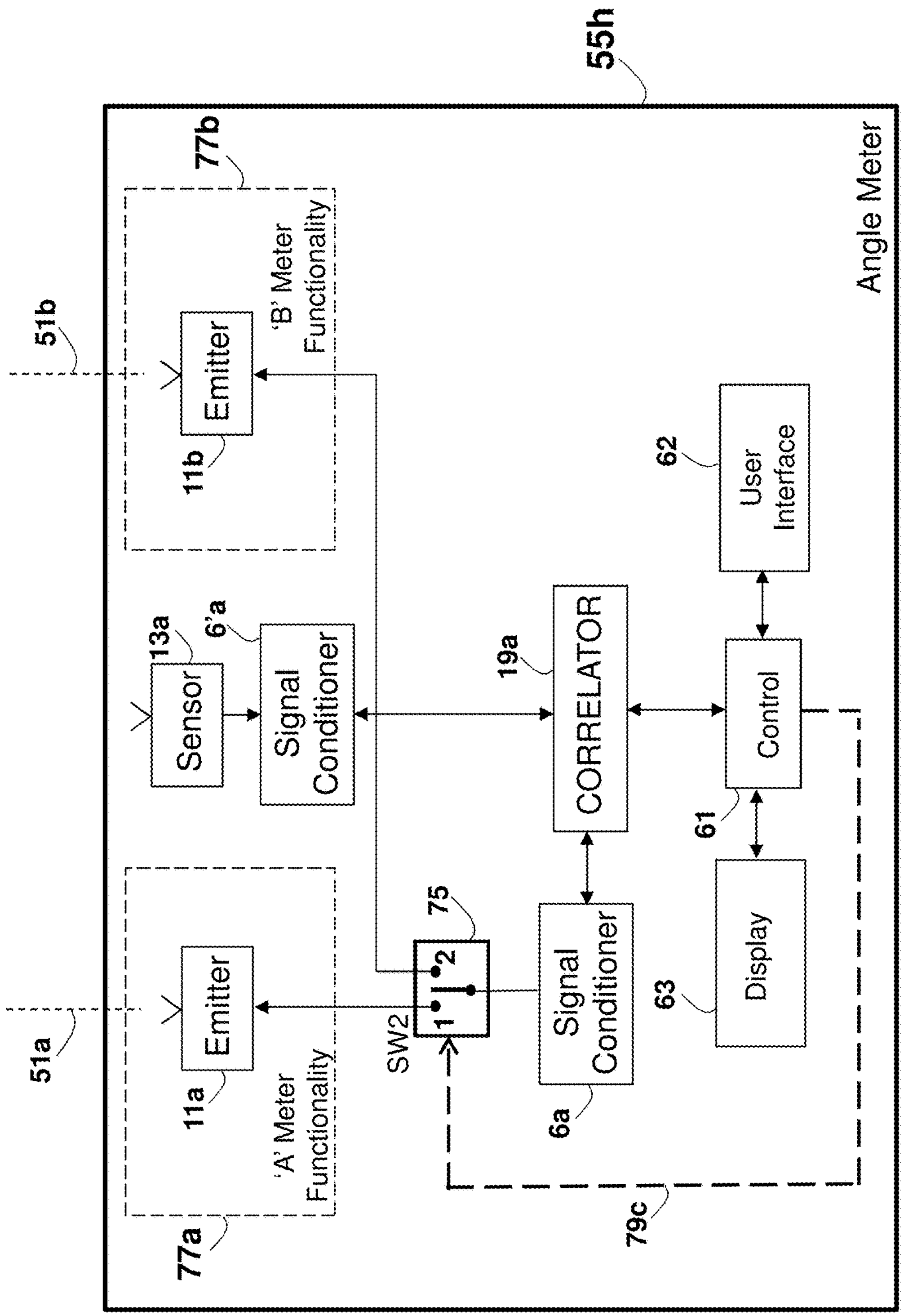
FIG. 7*e* illustrates a simplified schematic block diagram of an angle meter using two distance meters sharing a sensor and a correlator.
Figure 7F:
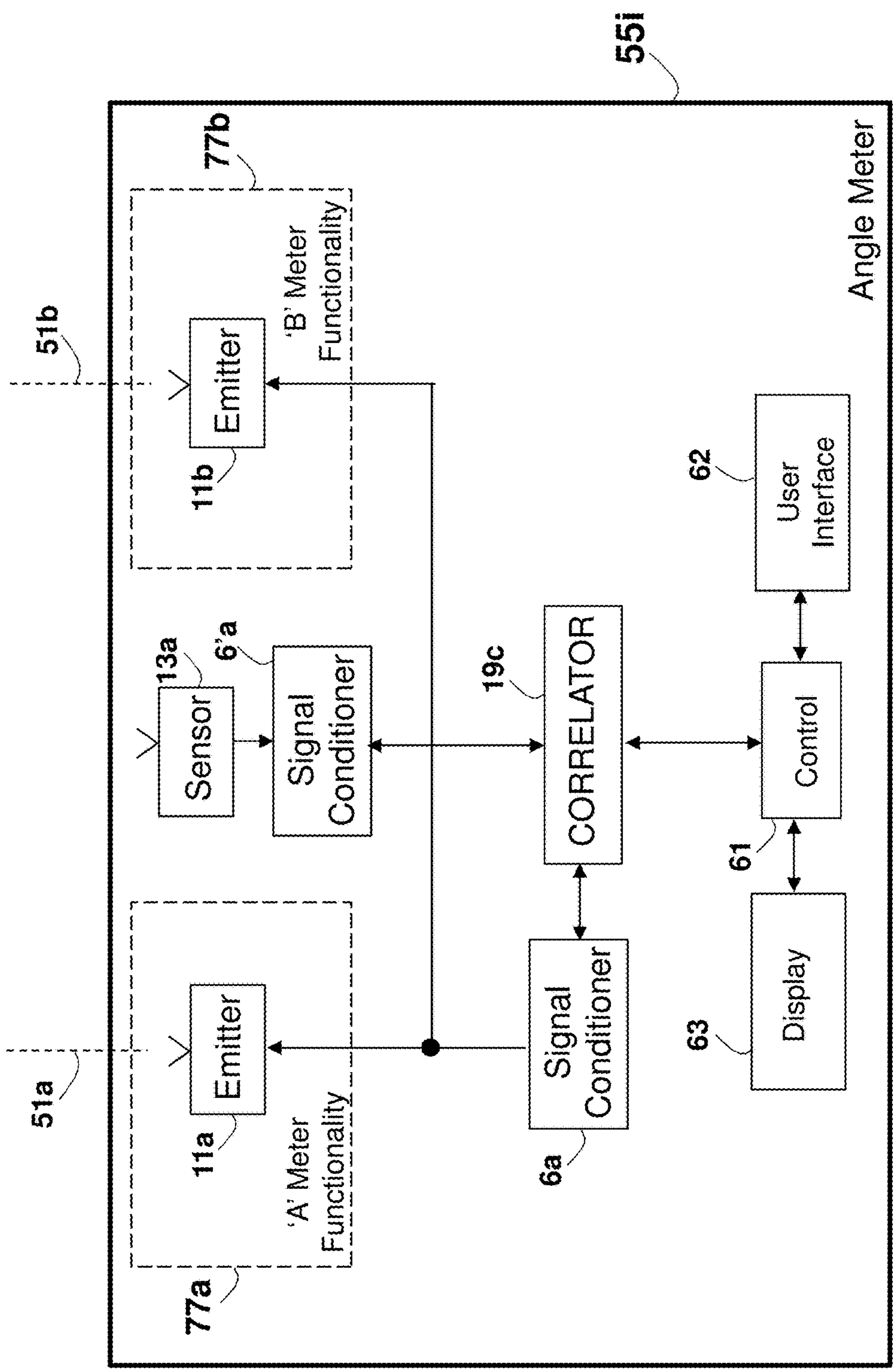
FIG. 7*f* illustrates a simplified schematic block diagram of an angle meter using two concurrently operated distance meters.
Figure 7G:
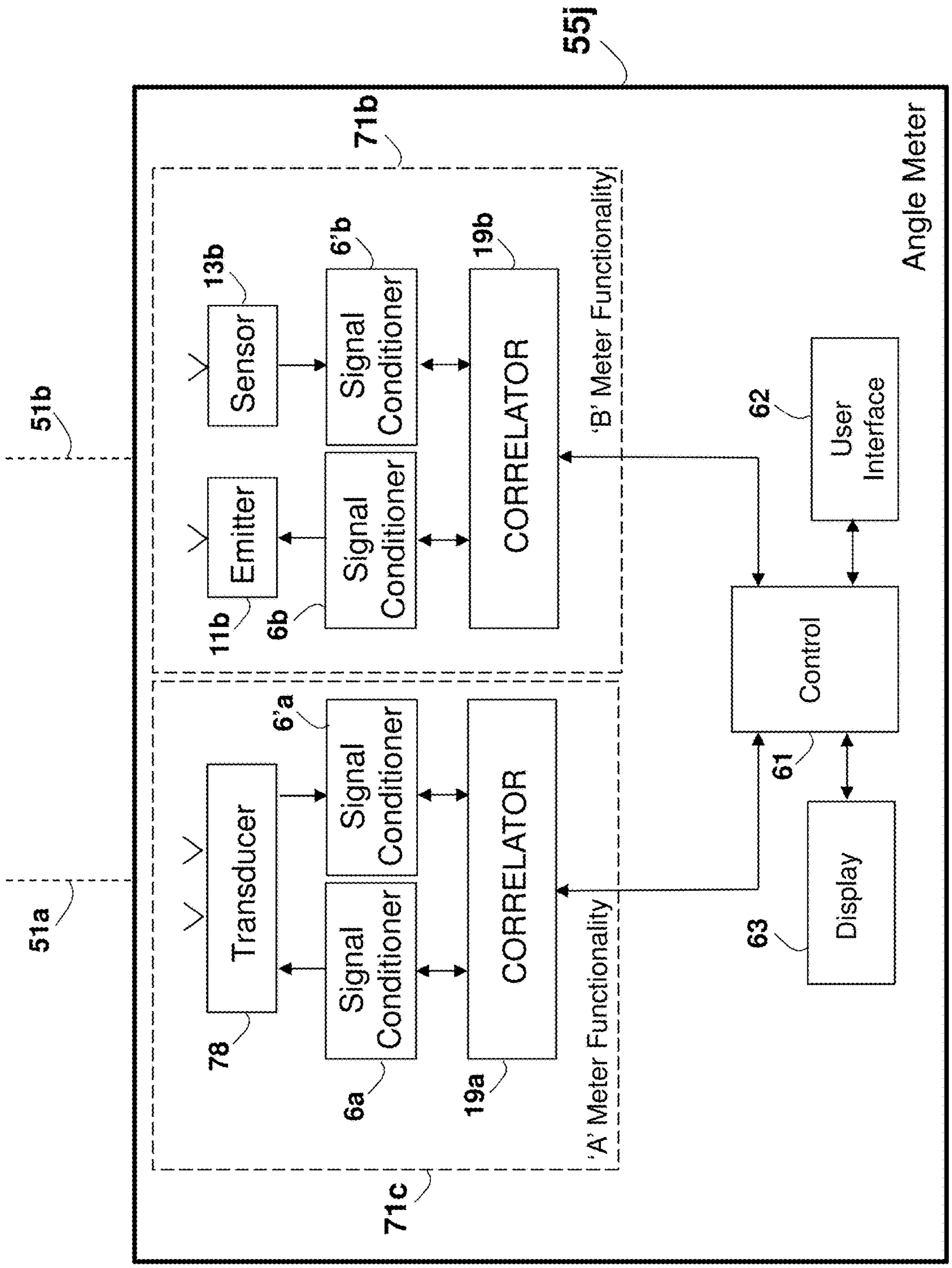
FIG. 7*g* illustrates a simplified schematic block diagram of an angle meter using a transducer in one of the two distinct distance meters functionalities.

In one example, a single component—a transducer 78 that may be the same as, similar to, or distinct from, the transducer 31 shown in FIG. 3, may be used as a replacement to both the sensor 11*a* and the sensor 13*a* of the meter 'A' module 71*c*, as illustrated in a block diagram of an angle meter 55*j* shown in FIG. 7*g*. Similarly, a single transducer may be used, combining the functionalities of both the emitter 11*b* and the sensor 13*b*. Such a transducer 78 may be activated as an emitter (replacing the emitter 11*a*) while emitting the wave, and as a sensor (replacing the sensor 13*a*) upon the receiving wave period. The transducer 78 may be an electro-acoustic transducer when using sound waves, a transmitting/receiving antenna when using radio-magnetic waves, or an electro-optics transducer when using light beams.

In one example shown as an angle meter 55*d* in FIG. 7*a*, the signal conditioning and correlator functionalities (including their associated hardware or software) are shared by both the distance meters functionalities. The dedicated 'A' meter functionality 72*a* comprises only the emitter 11*a* and the mating sensor 13*a*, and similarly the dedicated 'B' meter functionality 72*b* comprises mainly (or substantially) the emitter 11*b* and the mating sensor 13*b*. A single set includes the transmitting path signal conditioner 6*a*, the receiving path signal conditioner 6'*a*, and the correlator 19*a*. In such a scheme, the angle meter 55*d* may be in two states, wherein in an 'A' state the distance is measured along line 51*a* using the 'A' functionality 72*a* while the 'B' functionality 72*b* is idling, and in an 'B' state the distance is measured along line 51*b* using the 'B' functionality 72*b* while the 'B' functionality 72*a* is idling.

A Double-Pole-Double-Throw (DPDT) switch SW1 78*a* may be used for switching the shared set to either the 'A' meter functionality 72*a* or to the 'B' meter functionality 72*b*. The two poles of the switch SW1 78*a* are connected to the output of the transmitting path signal conditioner 6*a* and to the input of the receiving path signal conditioner 6'*a*. The switch SW1 78*a* has two states, designated as '1' and '2'. In the state '1', the switch SW1 78*a* connects to the 'A' meter functionality 72*a*, so that the output of transmitting path signal conditioner 6*a* is connected to the emitter 11*a* and the input of the receiving path signal conditioner 6'*a* is connected to the sensor 13*a*, hence providing full distance measuring functionality by emulating or forming the 'A' meter functionality 71*a*. In the state '2', the switch SW1 78*a* connects to the 'B' meter functionality 72*b*, so that the output of transmitting path signal conditioner 6*a* is connected to the emitter 11*b* and the input of the receiving path signal conditioner 6'*a* is connected to the sensor 13*b*, hence providing full distance measuring functionality by emulating or forming the 'B' meter functionality 71*b*. The switch SW1 78*a* state is controlled by the control block 61, using a control line 79 commanding the switch SW1 78*a* to be is a specific state, thus commanding the distance measuring using the 'A' meter functionality 72*a* along the measuring line 51*a* or using the 'B' meter functionality 72*b* along the measuring line 51*b*.

Any component that is designed to open (breaking, interrupting), close (making), or change one or more electrical circuits, may serve as the switch SW1 78*a*, preferably under some type of external control. Preferably, the switch SW1 78*a* is an electromechanical device with one or more sets of electrical contacts having two or more states. The switch SW1 78*a* may be a 'normally open' type, requiring actuation for closing the contacts, may be 'normally closed' type where actuation affects breaking the circuit, or may be a changeover switch having both types of contacts arrangements. A changeover switch may be either a 'make-before-break' or 'break-before-make' types. The switch contacts may have one or more poles and one or more throws. The Double-Pole-Double-Throw (DPDT) SW1 78*a* may be formed or comprise two or more switches having common switches contacts arrangements such as Single-Pole-Single-Throw (SPST), Single-Pole-Double-Throw (SPDT), Double-Pole-Single-Throw (DPST), and Single-Pole-Changeover (SPCO). The switch SW1 78*a* may be electrically or mechanically actuated.

The switch SW1 78*a* may use, comprise, or consist of, a relay. A relay is a non-limiting example of an electrically operated switch. A relay may be a latching relay, that has two relaxed states (bistable), and when the current is switched off, the relay remains in its last state. This is achieved with a solenoid operating a ratchet and cam mechanism, or by having two opposing coils with an over-center spring or permanent magnet to hold the armature and contacts in position while the coil is relaxed, or with a permanent core. A relay may be an electromagnetic relay, that typically consists of a coil of wire wrapped around a soft iron core, an iron yoke which provides a low reluctance path for magnetic flux, a movable iron armature, and one or more sets of contacts. The armature is hinged to the yoke and mechanically linked to one or more sets of moving contacts. It is held in place by a spring so that when the relay is de-energized there is an air gap in the magnetic circuit. In this condition, one of the two sets of contacts in the relay pictured is closed, and the other set is open. A reed relay is a reed switch enclosed in a solenoid, and the switch has a set of contacts inside an evacuated or inert gas-filled glass tube, which protects the contacts against atmospheric corrosion.

Alternatively or in addition, a relay may be a Solid State Relay (SSR), where a solid-state based component functioning as a relay, without having any moving parts. Alternatively or in addition, a switch may be implemented using an electrical circuit. For example, an open collector (or open drain) based circuit may be used. Further, an opto-isolator (a.k.a. optocoupler, photocoupler, or optical isolator) may be used to provide isolated switched signal transfer. Further, a thyristor such as a Triode for Alternating Current (TRIAC) may be used for analog switching.

Alternatively or in addition, the switch SW1 78*a* may use, comprise, be based on, or consist of an analog switching. An analogue (or analog) switch, also referred to as a bilateral switch, is an electronic component that behaves in a similar way to a relay, but has no moving parts. The switching element is normally a pair MOSFET transistors, one an N-channel device, the other a P-channel device. The device can conduct analog or digital signals in either direction when on and isolates the switched terminals when off. Analog switches are described in a tutorial by Analog Devices, Inc. 2009 publication MT-088 Tutorial (Rev. 0, 10/08, WK) entitled: "*Analog Switches and Multiplexers Basics*", and in Texas Instruments Incorporated 2012 publication SLYB125D entitled: "Analog Switch Guide", which are both incorporated in their entirety for all purposes as if fully set forth herein. An example of an analog switch provided as an integrated circuit in a package containing multiple switches is model 74HC4066 available from NXP Semiconductors N.V. headquartered in Eindhoven, Netherlands, and described in a product data sheet Rev. 8—3 Dec. 2015 entitled: "74*HC*4066; 74*HCT*4066—*Quad single-Pole single-throw analog switch*", which is incorporated in its entirety for all purposes as if fully set forth herein. The control input to an analog switch may be a signal that switches between the positive and negative supply voltages, with the more positive voltage switching the device on and the more negative switching the device off. Other circuits are designed to communicate through a serial port with a host controller in order to set switches on or off. The signal being switched must remain within the bounds of the positive and negative supply rails, which are connected to the P-MOS and N-MOS body terminals. An analog switch generally provides good isolation between the control signal and the input/output signals.

Alternatively or in addition, only the correlator 19*a* is shared between the two meters functionalities, while dedicated and separated (in whole or in part) signal conditioners are used. Such an angle meter 55*e* is shown in FIG. 7*b*. In such a scheme, the dedicated 'A' meter functionality 73*a* comprises the emitter 11*a* and the corresponding signal conditioner 6*a*, as well as the mating sensor 13*a* and the corresponding signal conditioner 6'*a*. Similarly the dedicated 'B' meter functionality 73*b* comprises mainly (or substantially) the emitter 11*b* and the corresponding signal conditioner 6*b*, as well as the mating sensor 13*b* and the corresponding signal conditioner 6'*b*. In such a scheme, the angle meter 55*e* may be in two states, wherein in an 'A' state the distance is measured along line 51*a* using the 'A' functionality 73*a* while the 'B' functionality 73*b* is idling, and in an 'B' state the distance is measured along line 51*b* using the 'B' functionality 73*b* while the 'B' functionality 73*a* is idling.

A Double-Pole-Double-Throw (DPDT) switch SW1 78*a* may be used for switching the shared correlator 19*a* either to the 'A' meter functionality 73*a* or to the 'B' meter functionality 73*b*. The two poles of the switch SW1 78*a* are connected to the correlator 19*a*. The switch SW1 78*a* has two states, designated as '1' and '2'. In the state '1', the switch SW1 78*a* connects to the 'A' meter functionality 73*a*, so that the correlator 19*a* is connected only to the 'A' meter functionality 73*a*, hence providing full distance measuring functionality by emulating or forming the 'A' meter functionality 71*a*. In the state '2', the switch SW1 78*a* connects to the 'B' meter functionality 72*b*, so that the correlator 19*a* is connected only to the 'B' meter functionality 73*b*, hence providing full distance measuring functionality by emulating or forming the 'B' meter functionality 71*b*. The switch SW1 78*a* state is controlled by the control block 61, using a control line 79*a* commanding the switch SW1 78*a* to be is a specific state, thus commanding the distance measuring using the 'A' meter functionality 73*a* along the measuring line 51*a* or using the 'B' meter functionality 73*b* along the measuring line 51*b*.

Alternatively or in addition, each distance meter functionality includes a separated and dedicated correlator, and an angle meter 55*f* shown in FIG. 7*c*, comprises two independent distance meters functionalities, the 'A' meter functionality 71*a* and the B' meter functionality 71*b*, similar to the angle meter 55*c* shown in FIG. 7. However, in such a scheme, the angle meter 55*f* may be in two states, wherein in an 'A' state the distance is measured along line 51*a* using the 'A' functionality 71*a* while the 'B' functionality 71*b* is idling, and in an 'B' state the distance is measured along line 51*b* using the 'B' functionality 71*b* while the 'B' functionality 71*a* is idling.

A Single-Pole-Double-Throw (SPDT) switch SW2 75 may be used for switching either to the 'A' meter functionality 71*a* or to the 'B' meter functionality 71*b*. The pole of the switch SW2 75 is connected to the control block 61. The switch SW2 75 has two states, designated as '1' and '2'. In the state '1', the switch SW2 75 connects to control, and to receive the measured distance by the 'A' meter functionality 71*a*, while in the state '2', the switch SW2 75 connects to control, and to receive the measured distance by the 'B' meter functionality 71*b*. The switch SW2 75 state is controlled by the control block 61, using a control line 79*b* commanding the switch SW2 75 to be is a specific state, thus commanding the distance measuring using the 'A' meter functionality 71*a* along the measuring line 51*a* or using the 'B' meter functionality 71*b* along the measuring line 51*b*. The switch SW2 75 may be identical, similar, or may be based on, the SW1 78*a* described above, and may be an analog switch or a relay. Alternatively or in addition, the switch SW2 75 may be a digital switch or digital multiplexer. Digital switches/multiplexers are described in a guide Texas Instruments Incorporated 2004 publication SCDB006A entitled: "*Digital Bus Switch Selection Guide*", which is incorporated in its entirety for all purposes as if fully set forth herein. An example of a digital switch provided as an integrated circuit in a package containing multiple switches is model 74HC4157 available from NXP Semiconductors N.V. headquartered in Eindhoven, Netherlands, and described in a product data sheet Rev. 7—21 Jan. 2015 entitled: "74*HC*157; 74*HCT*157—*Quad* 2-*input multiplexer*", which is incorporated in its entirety for all purposes as if fully set forth herein.

Alternatively or in addition, the two distance meters may share a single sensor, as described for an angle meter 55*g* shown in FIG. 7*d*. The 'A' meter functionality 76*a* mainly comprises the transmission path elements such as the emitter 11*a*, the signal conditioner 6*a*, and the correlator 19*a*, while the 'B' meter functionality 76*b* mainly comprises the transmission path elements such as the emitter 11*b*, the signal conditioner 6*b*, and the correlator 19*b*. The same sensor 13*a*, connected to a receiving path signal conditioner 6'*a*, is used for both meters functionalities. Such an arrangement may require that both beams emitted by emitter 11*a* and emitter 11*b* are emitting using wide beams, so that both reflections are received by the same sensor 13*a*. Alternatively or in addition, the receiving beam by the sensor 13*a* may be wide enough to properly detect or sense the reflection caused by both transmitted beams. The switch SW2 75 pole is connected to the signal conditioner 6'*a* output and having two states, '1' and '2', controlled by the control block 61, using a control line 79*c* commanding the switch SW2 75 to be is a specific state, thus commanding the distance measuring using the 'A' meter functionality 71*a* along the measuring line 51*a* or using the 'B' meter functionality 71*b* along the measuring line 51*b*. In the state '1' the signal conditioner 6'*a* output is connected to the correlator 19*a* of the 'A' meter functionality 76*a*, allowing distance measurement along the measurement line 51*a*, where the reflection of an object in response to the energy emitted by the emitter 11*a* is received by the sensor 13*a* and used for estimating or calculating the distance to the object. In the state '2' the signal conditioner 6'*a* output is connected to the correlator 19*b* of the 'B' meter functionality 76*b*, allowing distance measurement along the measurement line 51*b*, where the reflection of an object in response to the energy emitted by the emitter 11*b* is received by the sensor 13*a* and used for estimating or calculating the distance to the object.

An angle meter 55*h* shown in FIG. 7*e* examples sharing the correlator 19*a* and the transmission-path signal-conditioner 6*a*, in addition to sharing the sensor 13*a* as shown in FIG. 7*d*. The shared correlator 19*a* is continuously connected receive the conditioned sensor 13*a* signal from the signal conditioner 6'*a*, and is further continuously connected to control, receive, and transmit data to be conditioned by the signal conditioner 6*a*. An 'A' meter functionality 77*a* comprises only or mainly the emitter 11*a*, and the 'B' meter functionality 77*b* comprises only or mainly the emitter 11*b*. The switch SW2 75 in the state '1' connects the signal conditioner 6*a* output to the emitter 11*a* in the 'A' meter functionality 77*a* thus allowing distance measurement along the measurement line 51*a*, while in the state '2' the switch SW2 75 connects the signal conditioner 6*a* output to the emitter 11*b* in the 'B' meter functionality 77*b* thus allowing distance measurement along the measurement line 51*b*. The switch SW2 75 state is controlled by the control block 61, using a control line 79*c* commanding the switch SW2 75 to be is a specific state, thus commanding the distance measuring using the 'A' meter functionality 77*a* along the measuring line 51*a* or using the 'B' meter functionality 77*b* along the measuring line 51*b*. An angle meter 55*i* shown in FIG. 7*f* examples sharing the correlator 19*a* and the transmission-path signal-conditioner 6*a*, in addition to sharing the sensor 13*a* as shown in FIG. 7*d*, without using any switching, where the signal conditioner 6*a* is continuously connected to both emitters 11*a* and 11*b*, and the signal conditioner 6'*a* is continuously connected to the shared correlator 19*c*.

Figure 8:
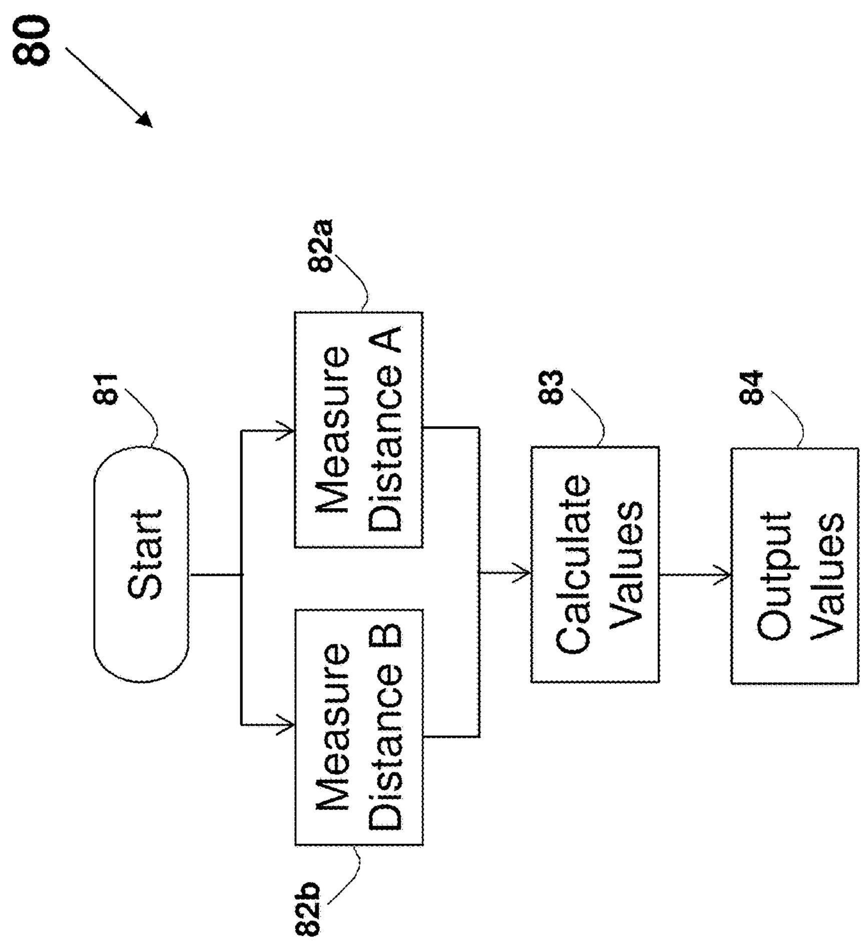
FIG. 8 illustrates schematically a simplified flowchart of a method for using an angle meter using two distance meters.

The operation of the angle meter #1 55 may follow a flow chart 80 shown in FIG. 8. The operation starts in a "Start" step 81, which may indicate a user activation, a remote activation from another device, or periodical activation. As part of a "Measure Distance A" step 82*a*, the Distance Meter A 40*a* is controlled or activated to perform a distance measurement, and as part of a "Measure Distance B" step 82*b* the Distance Meter B 40*b* is controlled or activated to perform a distance measurement. The two meters activations or commands may be sequential, such as activating Distance Meter A 40*a* and after a while activating Distance Meter B 40*b*, or preferably the two meters are concurrently activated. Sequential activation may be used for example, to avoid excessive power consumption by the simultaneous operation of both meters. The measured distances (d1, d2) from the two distance meters are then used as part of a "Calculate Values" step 83 for calculating the angle α, for example, according to the equation $\alpha=\arctan((d2-d1)/c)$, and for calculation of the actual distance dact, for example, according to the equation $dact=d1*\cos(\alpha)$. The calculated values may be output to a user or to another device as part of an "Output Values" step 84.

The accuracy of calculating the angle α may be estimated by estimating the accuracy of the measurements d1 and d2, and in particular, in the error of $|d2-d1|$, designated as Δd. The error in calculating the error in the estimated angle α, noted as Δα, may be expressed as $\Delta\alpha=\arctan(tg(\alpha)+\Delta d/c)-\alpha$. For example, assuming a length 'c' value of 5 cm (centimeter), and Δd=5 mm, then Δα=5.71 for α=0° (0 degrees), Δα=5.44° for α=10°, Δα=4.52 for α=25°, and Δα=2.73° for α=45°. Similarly for a length 'c' value of 10 cm (centimeter) and Δd=5 mm, then Δα=2.86 for α=0° (0 degrees), Δα=2.75° for α=10°, Δα=2.31° for α=25°, and Δα=1.40° for α=45°, and for a length 'c' value of 30 cm (centimeter), and Δd=5 mm, then Δα=0.95° for α=0° (0 degrees), Δα=0.92° for α=10°, Δα=0.78° for α=25°, and Δα=0.47° for α=45°, Hence, higher spatial distance 'c' between the two measuring lines 51*a* and 51*b* improves the insensitivity to distance errors in d1 and d2.

A distance measurement by a distance meter (such as the distance meter A 40*a*) or by a distance meter functionality (such as the 'A' meter functionality 71*a*, 72*a*, or 73*a*) involves activation of a distance measurement cycle (or measurement interval or period) initiating in the starting of emitting an energy by an emitter 11, and ending after a set time interval. Preferably, the time interval is set so that the received reflection (echo) from an object or surface by a sensor 13 is not detectable, such as when the returned energy in the signal versus the noise (S/N) is too low to be reliably detected or distinguished. Based on the velocity of the propagation of the waves over the medium, the set time interval inherently defines a maximum detectable range. In one example, the maximum detectable range may be above than 1 cm (centimeter), 2 cm, 3 cm, 5 cm, 8 cm, 10 cm, 20 cm, 30 cm, 50 cm, 80 cm, 1 m (meter), 2 m, 3 m, 5 m, 8 m, 10 m, 20 m, 30 m, 50 m, 80 m, 100 m, 200 m, 300 m, 500 m, 800 m, 1 Km (kilometer), 2 Km, 3 Km, 5 Km, 8 Km, 10 Km, 20 Km, 30 Km, 50 Km, 80 Km, or 100 Km. Alternatively or in addition, the maximum detectable range may be less than 1 cm (centimeter), 2 cm, 3 cm, 5 cm, 8 cm, 10 cm, 20 cm, 30 cm, 50 cm, 80 cm, 1 m (meter), 2 m, 3 m, 5 m, 8 m, 10 m, 20 m, 30 m, 50 m, 80 m, 100 m, 200 m, 300 m, 500 m, 800 m, 1 Km (kilometer), 2 Km, 3 Km, 5 Km, 8 Km, 10 Km, 20 Km, 30 Km, 50 Km, 80 Km, or 100 Km.

In one example, a single distance measurement cycle is performed each time a distance measurement is activated, such as part of the "Measure Distance B" step 82*b* or as part of the "Measure Distance A" step 82*a*, in response to a user request via the user interface 62, or otherwise under the control of the control block 61. Alternatively or in addition, multiple distance measurement cycles are consecutively performed in response to a single distance measurement activation or request. The various range results of the multiple distance measurement cycles may be manipulated to provide a single measurement output, such as averaging the results to provide a more accurate output. In one example, the number of consecutive measurement cycles performed in response to the measurement request may be above than 2, 3, 5, 8, 10, 12, 13, 15, 18, 20, 30, 50, 80, 100, 200, 300, 500, 800, 1000 measurement cycles. The average rate of the multiple measurement cycles may be higher than 2, 3, 5, 8, 10, 12, 13, 15, 18, 20, 30, 50, 80, 100, 200, 300, 500, 800, 1000 cycles per seconds. The distance measurement cycles may be sequential so that the next cycle starts immediately (or soon after) the completion of a previous one. Alternatively or in addition, the time period between the start of a cycle and the start of the next one may be lower than 1 μs (micro-second), 2 μs, 3 μs, 5 μs, 8 μs, 10 μs, 20 μs, 30 μs, 50 μs, 80 μs, 100 μs, 200 μs, 300 μs, 500 μs, 800 μs, 1 ms (milli-second), 2 ms, 3 ms, 5 ms, 8 ms, 10 ms, 20 ms, 30 ms, 50 ms, 80 ms, 100 ma, 200 ma, 300 ms, 500 ma, 800 ma, 1 s (second), 2 s, 3 s, 5 s, 8s, or 10 s. Alternatively or in addition, the time period between the start of a cycle and the start of the next one may be higher than 1 μs (micro-second), 2 μs, 3 μs, 5 μs, 8 μs, 10 μs, 20 μs, 30 μs, 50 μs, 80 μs, 100 μs, 200 μs, 300 μs, 500 μs, 800 μs, 1 ms (milli-second), 2 ms, 3 ms, 5 ms, 8 ms, 10 ms, 20 ms, 30 ms, 50 ms, 80 ms, 100 ms, 200 ms, 300 ms, 500 ms, 800 ms, 1 s (second), 2 s, 3 s, 5 s, 8s, or 10 s.

An angle meter 55 uses two distance meters (such as the distance meters A 40*a* and B 40*b*) or two distance meter functionalities such as the 'A' meter functionality (71*a*, 72*a*, or 73*a*) and respective 'B' meter functionality (71*b*, 72*b*, or 73*b*). In one example, only one distance measurement cycle of one of the distance meters or one of meter functionalities is operational at a time. By avoiding activating simultaneously both measurement cycles of the two distance meters (or meter functionalities), lower instantaneous power consumption is obtained, potential interference between the two meters or functionalities is minimized, and lower crosstalk between the distinct respective electrical circuits is guaranteed. In one example, a single measurement cycle by one of the meters (or functionalities) is followed immediately, or after a set delay, by a single distance measurement cycle of the other meter (or functionality). In the case where multiple measurement cycles are used, such as N cycles per single measurement request, the measurements may be performed sequentially, where one of the meters (or functionalities) such as the distance meter 'A' 40*a* (or the 'A' meter functionality 71*a*) is executing N distance measurement cycles to obtain a first manipulated single range result (such as the distance d1 51*a*), followed immediately (or after a set delay) by the other one of the meters (or functionalities) such as the distance meter 'B' 40*b* (or the 'B' meter functionality 71*b*) is executing N measurement cycles to obtain a second manipulated single range result (such as the distance d2 51*b*). Alternatively or in addition, the two distance meters 'A' 40*a* and 'B' 40*b* (or the respective meter functionalities 'A' 71*a* and 'B' 71*b*) are used alternately, using a 'super-cycle' including for example, a distance measurement cycle by the distance meter 'A' 40*a* (or the 'A' meter functionality 71*a*) followed by a distance measurement cycle by the distance meter 'B' 40*b* (or the 'B' meter functionality 71*b*). The 'super-cycle' is repeated N times, hence resulting total of 2*N cycles.

Alternatively or in addition, the two distance meters 'A' 40*a* and 'B' 40*b* (or the respective meter functionalities 'A' 71*a* and 'B' 71*b*) are concurrently activated, for example as part of parallel executing the "Measure Distance B" step 82*b* and the "Measure Distance A" step 82*a*, so that there is a time overlap between the distance measurement cycles of the two meters or meter functionalities. Such approach allows for faster measuring, which offers a more accurate results in a changing environment, such as when the angle meter 55 or the reflecting object or surface are moving. In one example, the distance measurement cycles may be independent from each other, and the overlapping is random and there is not any mechanism to synchronize them. Alternatively or in addition, a synchronization is applied in order to synchronize or otherwise correspond the two distance measurement cycles. In one example, the same activating control signal is sent to both meters and functionalities, so that the two measurement cycles start at the same time, or substantially together. For example, the energy emitting start may be designed to concurrently occur. For example, the modulated signals emitted by the emitter 11, such as a pulse in a TOF scheme, may be emitted together at the same time or at negligible delay. Two distance measurement cycles may be considered as overlapping if the non-overlapping time period is less than 20%, 18%, 15%, 13%, 10%, 8%, 5%, 2%, 1%, 0.5%, or 0.2% of the total measurement cycle time interval.

Alternatively or in addition, there may be a fixed delay between the distance measurement cycles. Assuming the distance measurement cycles both having the time interval of T (such as 100 milliseconds), there may be a delay of ½*T (50 milliseconds in the example) between the distance measurement cycles starting times (phase difference of 180°). Alternatively or in addition, a delay of ¼*T, ¼*T, or any other time period may be equally used. Such a phase difference between the various distance measurement cycles may be useful to reduce interference or crosstalk between the two measurements and the two circuits. Further, since there is a large power-consumption during the energy emitting part of the measurement cycle, such delay may cause the transmitting periods to be non-overlapping, thus reducing the peak power consumption of the angle meter 55.

Figure 9:
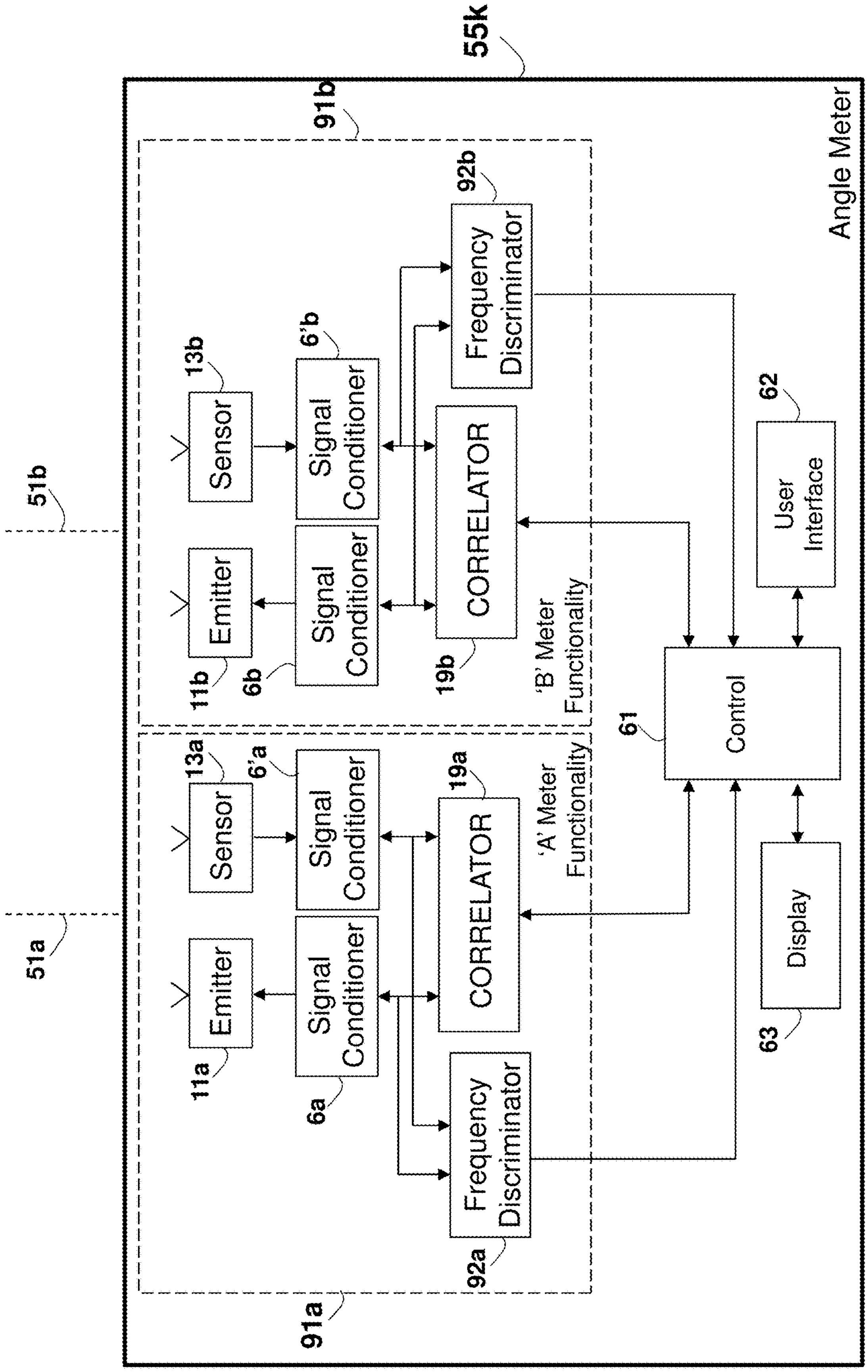
FIG. 9 illustrates a simplified schematic block diagram of an angle meter using frequency discriminators.

In addition (or as an alternative) to measuring a distance to an object (such as a surface or a plane), an angle meter 55 may include a frequency discrimination circuit or functionality for measuring a frequency shift between the propagated wave 16*a* emitted by the emitter 11 and the reflected wave 16*b* received by the sensor 13. Such frequency difference may be a Doppler (frequency) shift, resulting from the relative speed between the angle meter 55 and the reflecting object 18 at the location (or point) 9, that may be a speed component of a moving angle meter 55 or a moving object 18. A simplified block diagram of an angle meter 55*k* is shown in FIG. 9. The angle meter 55*k* comprises an 'A' meter functionality 91*a* (corresponding to the 'A' meter functionality 71*a* shown in FIG. 7) that comprises a frequency discriminator 92*a*. The frequency discriminator 92*a* is coupled to the correlator 19*a*, to the signal conditioner 6*a*, to the emitter 11*a*, or to any point along the signal emitting path, for receiving the signal to be emitted, a replica thereof, or any other indication of the emitted wave carrier or center frequency. For example, the frequency discriminator 92*a* may be connected to the sinewave generator 23 shown as part of the distance meter 15*b* shown in the arrangement 20*a*. Further, the frequency discriminator 92*a* is coupled to the correlator 19*a*, to the signal conditioner 6'*a*, to the sensor 13*a*, or to any point along the 'A' signal receiving path, for receiving the signal sensed by the sensor 13*a*, a replica thereof, or any other indication of the reflected wave carrier or center frequency. A signal (or data) reflecting the difference between the emitted and the received frequencies is provided by the frequency discriminator to the control block 61, and can be used for estimating or calculating the relative velocity between along the measurement line 51*a*. Similarly, the angle meter 55*k* may comprise a 'B' meter functionality 91*b* (corresponding to the 'B' meter functionality 71*b* shown in FIG. 7) that comprises a frequency discriminator 92*b*. The frequency discriminator 92*b* is coupled to the correlator 19*b*, to the signal conditioner 6*b*, to the emitter 11*b*, or to any point along the 'B' signal-emitting path, for receiving the signal to be emitted, a replica thereof, or any other indication of the emitted wave carrier or center frequency. For example, the frequency discriminator 92*b* may be connected to the sinewave generator 23 shown as part of the distance meter 15*b* shown in the arrangement 20*a*. Further, the frequency discriminator 92*b* is coupled to the correlator 19*b*, to the signal conditioner 6'*b*, to the sensor 13*b*, or to any point along the signal receiving path, for receiving the signal sensed by the sensor 13*b*, a replica thereof, or any other indication of the reflected wave carrier or center frequency. A signal (or data) reflecting the difference between the emitted and the received frequencies is provided by the frequency discriminator to the control block 61, and can be used for estimating or calculating the relative velocity between along the measurement line 51*b*.

While two frequency discriminators 92*a* and 92*b* are shown, an angle meter 55 may include only one, such as only comprising the frequency discriminator 92*a*, allowing for measuring the Doppler shift and for calculating the resulting relative velocity component along the 'A' measurement line 51*a*. In the case where the two frequency discriminators 92*a* and 92*b* are both used, the two Doppler shifts or the two estimated velocities (assuming the same object is sensed by both meter functionalities) may be averaged resulting more accurate result of a Doppler shift or estimated velocity component. The frequency discriminator 92*a* may be identical, similar, or distinct from the frequency discriminator 92*b*. Any circuit or functionality for measuring the frequency difference between two signals may be used for frequency discriminator as part of each of the frequency discriminators 92*a* or 92*b*.

Any Doppler-shift detection or measurement circuit or functionality may be used in each of the frequency discriminators 92*a* and 92*b*. For example, a frequency discriminator may use a mixer for mixing the emitted and the received signals (or replicas thereof) for obtaining a signal that after filtering, have a frequency that is the difference of the input signal frequencies. In one example, a frequency discriminator may be used that is based on an IC model AD9901 available from Analog Devices, Inc., headquartered in Norwood, MA, U.S.A. and described in Analog Devices, Inc. Data Sheet Rev. B (C1272b-0-1/99) dated 1999 entitled: "*Ultrahigh Speed Phase/Frequency Discriminator*", which is incorporated in its entirety for all purposes as if fully set forth herein.

Figure 9A:
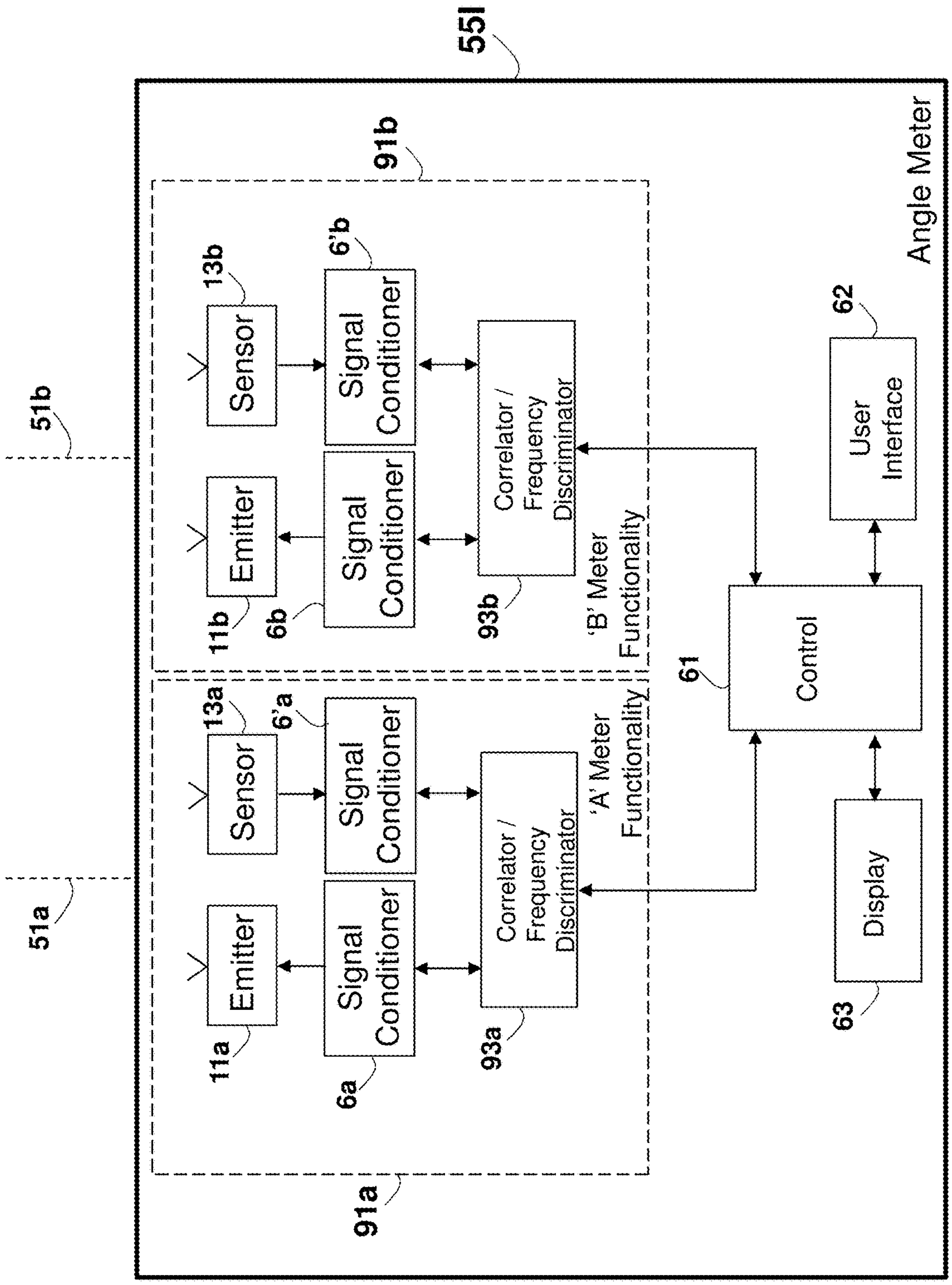
FIG. 9*a* illustrates a simplified schematic block diagram of an angle meter using frequency discriminators integrated with correlators.

Since both the correlator 19*a* and the frequency discriminator 92*a* functionalities and circuits are involved in both the transmit and receive paths, and both connect mainly to the same circuits and functionalities, and since in some cases, the same components or circuits may be shared by both, both circuits may be integrated into a single \circuit or block, designated as Correlator/Frequency discriminator 93*a* and serving as part of the functionality 91*a* in the angle meter 55*l* shown in FIG. 9*a*. Similarly, a single integrated circuit or block, designated as Correlator/Frequency discriminator 93*b* may include both the correlator 19*b* and the frequency discriminator 92*b* functionalities or circuits, and may serve as part of the functionality 91*b* in the angle meter 55*l* shown in FIG. 9*a*. As shown above regarding the angle meter 55*e* shown in FIG. 7*b*, a single correlator 19*a* may be used for serving both the 'A' meter functionality 73*a* and the 'B' meter functionality 73*b*, using a switch 78*a*. Similarly, a single frequency discriminator 92*a* may be used to serve, at different times (such as in an alternate manner), both the 'A' meter functionality 73*a* and the 'B' meter functionality 73*b*. Further, an integrated correlator/frequency discriminator 93*a* may be used for both meters at different times (such as in an alternate manner), as shown for an angle meter 55*m* shown in FIG. 9*b*. Similarly, the single integrated correlator/frequency discriminator 93*a* may be used when the single sensor 13*a* is used as described in an angle meter 55*n* shown in FIG. 9*c*, corresponding to the angle meter 55*i* shown in FIG. 7*f*.

Figure 10:
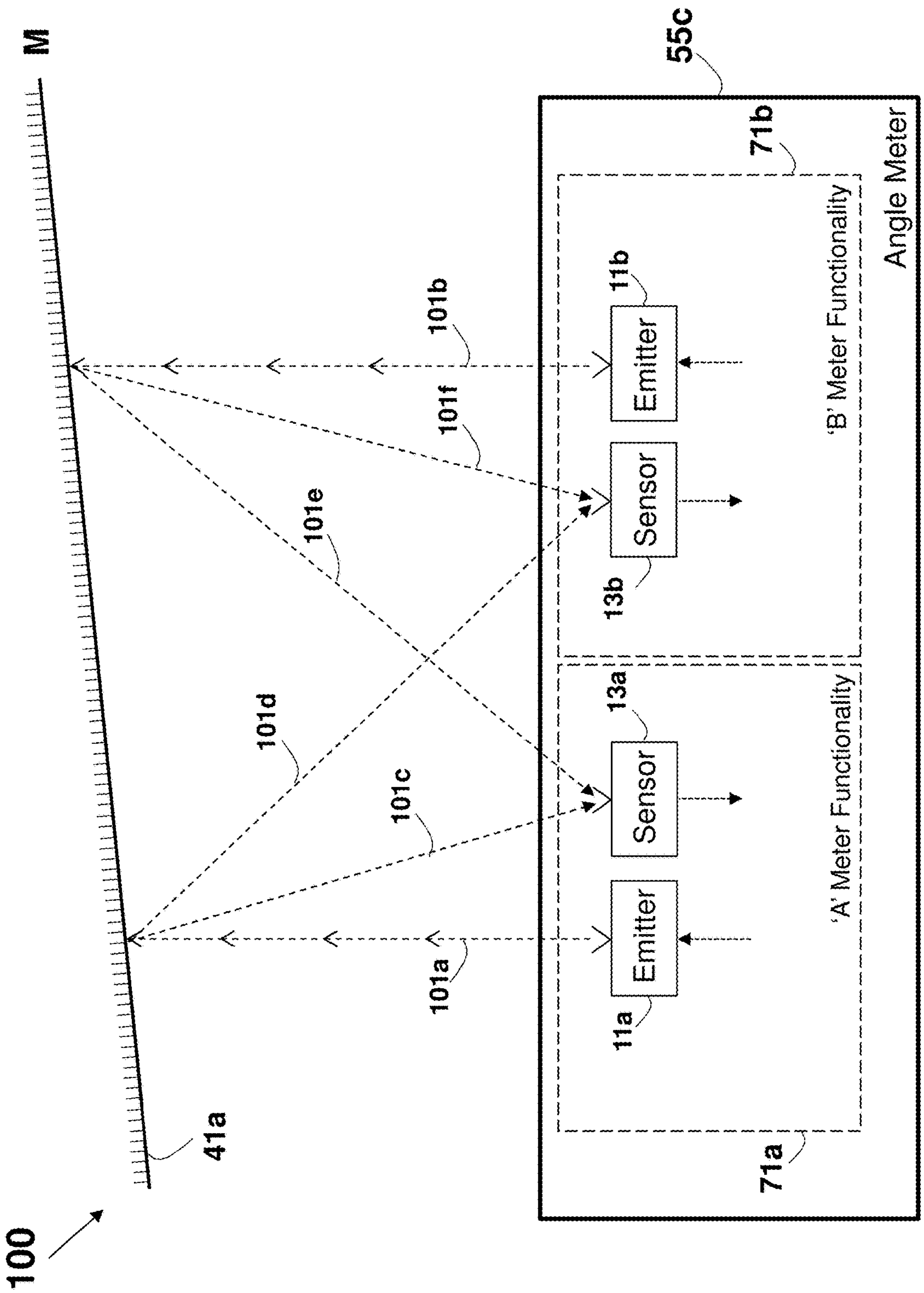
FIG. 10 depicts schematically the propagation of emitted and reflected waves respectively emitted and received by an angle meter.

The wave's propagation in an arrangement 100 using the angle meter 55*c* for measuring an angle to the line M 41*a* is shown in FIG. 10. The distance d1 along the measurement line 51*a* is measured by a distance meter 'A' 40*a*, that may comprise, use, or be based on the 'A' meter functionality 71*a* that includes the mating pair of the emitter 11*a* and the sensor 13*a*. Practically, the emitter 11*a* may transmit a beam along a line 101*a*, that is reflected (such as by diffusion) from the surface or line M 41*a* using the path 101*c* for being received by the sensor 13*a*. Similarly, The distance d2 along the measurement line 51*b* is measured by a distance meter 'B' 40*b*, that may comprise, use, or be based on the 'B' meter functionality 71*b* that includes the mating pair of emitter 11*b* and the sensor 13*b*. Practically, the emitter 11*b* may transmit a beam along a line 101*b*, that is reflected (such as by diffusion) from the surface or line M 41*a* using the path 101*f* for being received by the sensor 13*b*.

However, in the case where both emitters 11*a* and 11*b* emits the same signal type, such as in an arrangement where both emitters 11*a* and 11*b* emits light, electromagnetic radiation, or light, and accordingly both sensors 13*a* and 13*b* are suitable to sense the appropriate reflections, a sensor may sense a signal that is a reflection of a non-mating emitter signal. For example, the sensor 13*a* may detect or sense a wave or beam propagating along a reflection path 101*e* that is a reflection of the signal emitted along the path 101*b* by the emitter 11*b*. Similarly, the sensor 13*b* may detect or sense a wave or beam propagating along a reflection path 101*d* that is a reflection of the signal emitted along the path 101*a* by the emitter 11*a*. In such a case, there may be an ambiguity caused by the reception of multiple echoes, which may lead to confusion and inaccuracy in the distance (or Doppler) measurements.

In one example, a time separation may be used (also known as Time-Division Multiplexing—TDM). In this method, the two distance meters 40*a* and 40*b* (or the two functionalities 71*a* and 71*b*) are synchronized so that the signals emitted by the emitters 11*a* and 11*b* are separated in time in an alternate manner, so that a received echo may be unambiguously identified as being originated by the last activated emitter. For example, a pulse may be emitted only by the emitter 11*a*, and only echoes received afterwards by the mating sensor 13*a* are considered and analyzed, while echoes received by the non-mating sensor 13*b* are ignored. After a specified time period from the pulse was emitted by the emitter 11*a* (typically corresponding to the maximum detectable distance), a pulse may be emitted only by the emitter 11*b*, and only echoes received afterwards by the mating sensor 13*b* are considered and analyzed, while echoes received by the non-mating sensor 13*a* are ignored. In such a case, each distance meter functionality is operative only a fraction of the time in an alternating pattern.

In some scenarios, it may be preferable that the distance meters 'A' 40*a* and 'B' 40*b*, to (or the two functionalities 71*a* and 71*b*) to be independently activated, so that the energy emitting may not be synchronized. Alternatively or in addition, it may be preferable that the distance meters 'A' 40*a* and 'B' 40*b*, to (or the two functionalities 71*a* and 71*b*) are synchronized so that the energy emitting by the emitters 11*a* and 11*b* is simultaneous or overlapping, or the synchronization is such that there is a time overlapping in echo receiving time intervals, and echoes generated by a non-mating emitter may be received by a sensor. In such a scenario, a spatial separation may be used. An example of beam width based separation using angular separation is shown in an arrangement 100*a* in FIG. 10*a*. The sensor 13*a* is associated with an angular beam width Φa 102*a*, that is small enough so that a reflection that is not originated from the mating emitter 11*a*, such as the reflection path 101*e*, are outside the defined beam width and thus are not received or are highly attenuated. Similarly, the sensor 13*b* is associated with an angular beam width Φb 102*b*, that is small enough so that a reflection that is not originated from the mating emitter 11*b*, such as the reflection path 101*d*, are outside the defined beam width and thus are not received or are highly attenuated. For example, the angular beam width may be such that a reflection caused by a non-mating emitter from a line or surface M 41*a* located at a distance less than a defined maximum and tilted less than a defined angle may be attenuated by at least 3 dB, 5 dB, 8 dB, 10 dB, 15 dB, 18 dB, 20 dB, 25 dB, 30 dB, 35 dB, 40 dB, 45 dB, or 50 dB. For example, the angular bean width Φa 102*a* or Φb 102*b* may be an angle that is less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°.

Alternatively or in addition, the waves emitted by the emitters 11*a* and 11*b* may involve distinct or different parameters, characteristics or features, so that these distinctions or differences may be used to identify the relevant echo as part of the reception path. In one example, different amplitude or power levels may be used when transmitting. For example, the pulse emitted by the emitter 11*a* may be 10 or 100 times stronger than the pulse emitted by the emitter 11*b*. Hence, upon receiving two or more echoes, the stronger echo may be associated to be transmitted by the stronger emitter 11*a*, and weaker echoes may be associated to be transmitted by the weaker emitter 11*b*. For example, the power or the amplitude of the signal emitted by the emitter 11*a* may be higher than the signal emitted by the emitter 11*b* by at least 1 dB, 2 dB, 3 dB, 5 dB, 8 dB, 10 dB, 15 dB, 18 dB, 20 dB, 25 dB, 30 dB, 35 dB, 40 dB, 45 dB, or 50 dB. Similarly, the emitted signals may be differently shaped or modulated.

Alternatively or in addition, a phase separation may be used. In such a scheme, both emitters 11*a* and 11*b* emit periodical signal that may have distinct, similar, or same signal power level, and may use distinct, similar, or same center or carrier frequency. In one example, the same (or similar) frequency is used, however the signal emitted by the emitter 11*b* is phase shifted by 180° from the signal emitted by the emitter 11*a*. The received echoes that are phase shifted by 0° to 179° from the signal emitted by the emitter 11*a* may be associated with the emitter 11*a*, and thus may be used when received by the mating sensor 13*a* as part of the 'A' meter functionality 71*a*, and ignored by the 'B' meter functionality 71*b*, while echoes received that are phase shifted by 180° to 359° from the signal emitted by the emitter 11*a* may be associated with the emitter 11*b*, and thus may be used when received by the mating sensor 13*b* as part of the 'B' meter functionality 71*b* and ignored by the 'A' meter functionality 71*a*. Such phase filtering may be implemented as a separate circuit, or may be integrated with the respective correlator functionality. Similarly, the signal emitted by the emitter 11*b* may consist of, may comprises, or may be based on, the signal emitted by the emitter 11*a* being phase shifted by at least than, or no more than, 30°, 60°, 90°, 120°, 180°, 210°, 240°, 270°, 300°, or 330°.

Alternatively or in addition, a frequency separation may be used, where the echoes are identified according to their center or carrier frequency. An example of an angle meter 55*c*1 employing frequency separation is shown as part of an arrangement 100*b* in FIG. 10*b*. The 'A' meter functionality 71*a*1 uses a sinewave generator 23*a* (that may be part of the correlator 19*a*) that generates a sinewave having a frequency fa, so that the wave emitted by the emitter 11*a* uses the frequency fa as a carrier or center frequency. Similarly, the 'B' meter functionality 71*b*1 uses a sinewave generator 23*b* (that may be part of the correlator 19*b*) that generates a sinewave having a frequency fb that is distinct or different from the frequency fa, so that the wave emitted by the emitter 11*b* uses the frequency fb as a carrier or center frequency. In one example, each of the sensors 13*a* and 13*b* is designed or characterized to optimally sense or detect incident waves in the frequency emitted by the mating emitter. In one example, the difference between the frequency fa and the frequency fb may be defined as |fb−fa|/fa and may be higher than 0.001%, 0.002%, 0.005%, 0.008%, 0.01%, 0.02%, 0.05%, 0.08%, 0.1%, 0.2%, 0.5%, 0.8%, 1%, 2%, 5%, 8%, 10%, 15%, 20%, 25%, 30%, 40%, or 50%.

For example, the sensor 13*a* may be optimized to receive the waves having the frequency fa, and to reject or attenuate waves having the frequency fb. Similarly, the sensor 13*b* may be optimized to receive the waves having the frequency fb, and to reject or attenuate waves having the frequency fa. Preferably, the sensors are further capable to receive a frequency band around the specified mating emitter frequency in order to properly receive Doppler-shifted frequencies in a set range. In one example, a sensor may attenuate waves having the frequency of the non-mating emitter versus the output associated with waves having the frequency of the mating emitter. For example, the sensor 13*a* may attenuate received waves having a frequency fb (resulting from a reflection of the emitted signal by the non-mating emitter 11*b*) versus received waves having a frequency fa (resulting from a reflection of the emitted signal by the mating emitter 11*a*) by at least 3 dB, 5 dB, 8 dB, 10 dB, 15 dB, 18 dB, 20 dB, 25 dB, 30 dB, 35 dB, 40 dB, 45 dB, or 50 dB.

In one example, the sensors are wide-band and designed to be equally sensitive to both frequencies fa and fb. For example, the sensors 13*a* and 13*b* may be identical or similar to each other. In such a case, filtering may be used for isolating the relevant echoes, as shown in the arrangement 100*b* in FIG. 10*b*. A filter 103*a*, which may be part of or integrated with the signal conditioner 6'*a* as part of an 'A' meter functionality 71*a*1, may be coupled to the sensor 13*a* output and connected in the receiving path, such as between the sensor 13*a* and the signal conditioner 6'*a* or the correlator 19*a*. The filter 103*a* is designed to substantially pass the frequency fa (as well as a frequency band around the frequency fa accounting for Doppler shift), and to substantially reject or stop a signal having the frequency fb. Similarly, a filter 103*b*, which may be part of or integrated with the signal conditioner 6'*b* as part of a 'B' meter functionality 71*b*1, may be coupled to the sensor 13*b* output and connected in the receiving path, such as between the sensor 13*b* and the signal conditioner 6'*b* or the correlator 19*b*. The filter 103*b* is designed to substantially pass the frequency fa (as well as a frequency band around the frequency fa accounting for Doppler shift), and to substantially reject or stop a signal having the frequency fb. In one example, a filter such as the filter 103*a* is attenuating a signal of a frequency fb (compared to a signal at frequency fa) by at least 3 dB, 5 dB, 8 dB, 10 dB, 15 dB, 18 dB, 20 dB, 25 dB, 30 dB, 35 dB, 40 dB, 45 dB, or 50 dB.

Figure 10A:
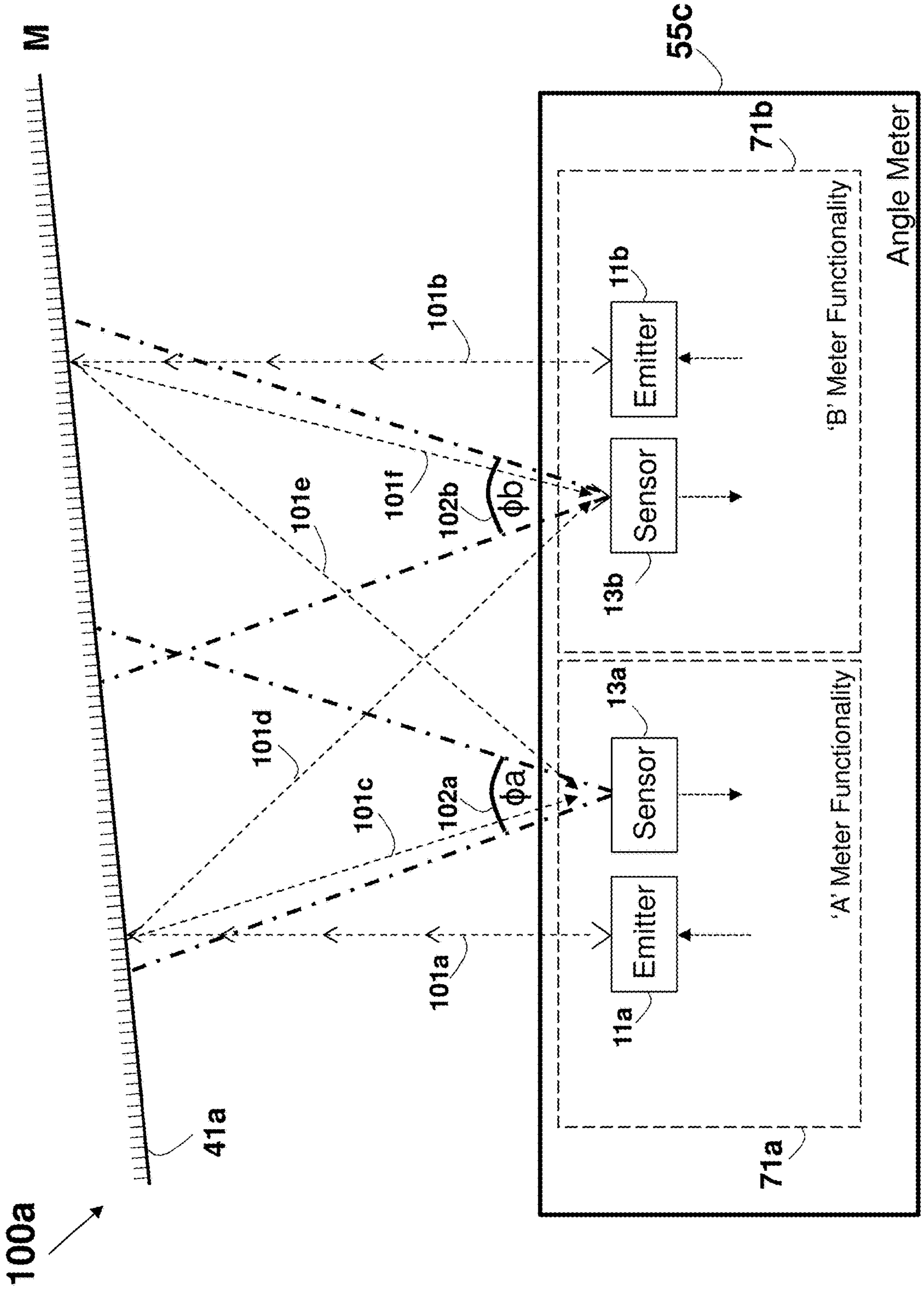
FIG. 10*a* depicts schematically the propagation of emitted and reflected waves respectively emitted and received by an angle meter that uses a beam width separation.
Figure 10B:
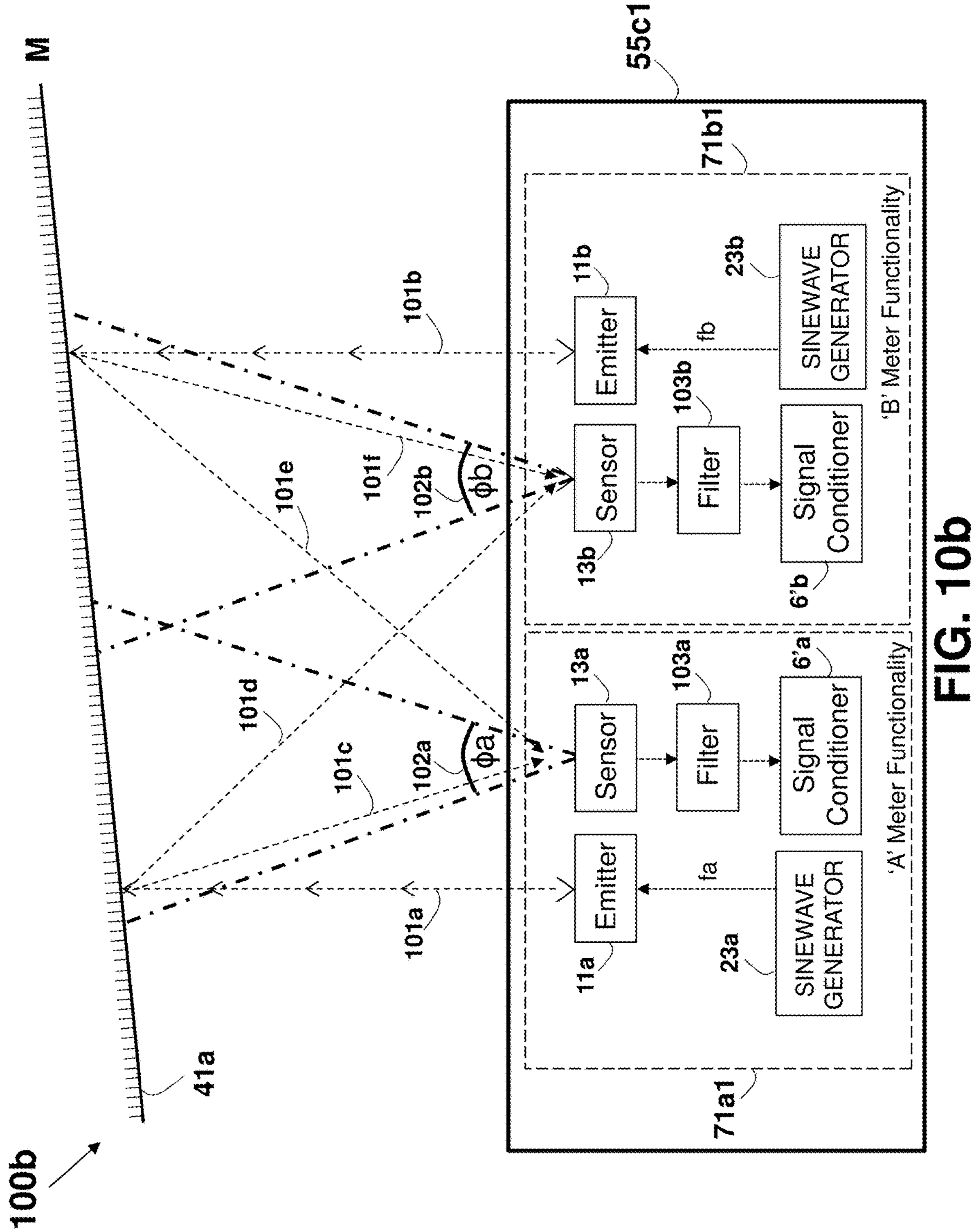
FIG. 10*b* illustrates a simplified schematic block diagram of an angle meter using frequency separation.
Figure 10C:
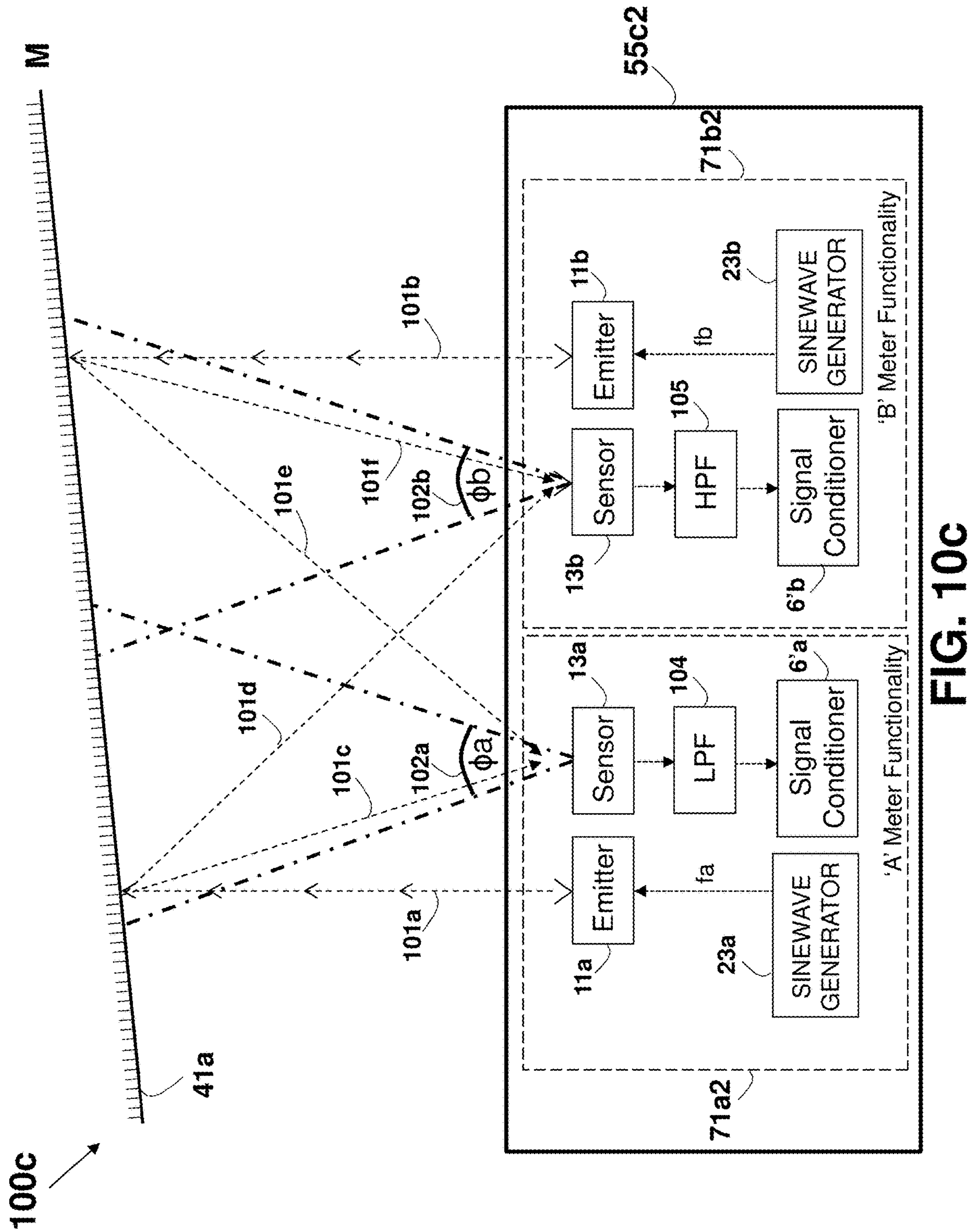
FIG. 10*c* illustrates a simplified schematic block diagram of an angle meter using different frequencies separated using a LPF and a HPF.

In one example, the frequency fb is higher than the frequency fa, as shown in an example of an angle meter 55*c*2 described as part of an arrangement 100*c* in FIG. 10*c*. In such a scheme, an 'A' meter functionality 71*a*2 includes an LPF 104 for passing frequency fa and rejecting frequency fb, while a 'B' meter functionality 71*b*2 includes an HPF 105 for passing frequency fb and rejecting frequency fa. For example, the angle meter 55*c*2 may be acoustic-based where the sound emitted by the emitter 11*a* (fa) uses a frequency of 100 KHz, while the sound emitted by the emitter 11*b* (fb) uses a frequency of 200 KHz. In such a scheme, the LPF 104 may have a cut-off frequency of 150 KHz for passing the 100 KHz signal and stopping the 200 KHz signal, while the HPF 105 may have a cut-off frequency of 150 KHz for passing the 200 KHz signal and stopping the 100 KHz signal. Similarly, different colors (frequencies) may be used when optic-based distance metering is used.

The angle meter 55*g* described in FIG. 7*d* comprises a single sensor 13*a* that is shared by the two meter functionalities 'A' 76*a* and 'B' 76*b*. Using the switch SW2 75, a time separation scheme may be employed. In the case where the two echoes may be electrically isolated, the time separation may be obviated, and the two meters may be concurrently operative. An angle meter 55*o*, which is based on the angle meter 55*g*, is described in FIG. 11. The echoes received by the shared sensor 13*a* are separated using the separators 111*a* and 111*b*. The separator 111*a* is coupled between the shared sensor 13*a* and the correlator 19*a*, and directs the received echoes originated by the waves emitted from the emitter 11*a* to be analyzed by the correlator 19*a* as part of the 'A' meter functionality 76*a*, while blocking the other echoes. Similarly, the separator 111*b* is coupled between the shared sensor 13*a* and the correlator 19*b*, and directs the received echoes originated by the waves emitted from the emitter 11*b* to be analyzed by the correlator 19*b* as part of the 'B' meter functionality 76*b*, while blocking the other echoes. The separation may be based on amplitude, phase, frequency, or polarization, and the separators 111*a* and 111*b* are adapted to apply the separation scheme. An example of using frequency separation is described in FIG. 11*a* that describes an angle meter 55*o*1. The filter 103*a* serves as the separator 111*a* and passes only echoes that are associated with the frequency transmitted by the emitter 11*a*, while the filter 103*b* serves as the separator 111*b* and passes only echoes that are associated with the frequency transmitted by the emitter 11*b*.

Alternatively or in addition, the separation may be based on polarization. When the distance meters are based on light or electromagnetic waves (such as microwave radar), one emitter may use one type of polarization, while the other one may use another type of polarization. Typically, a sensor adapted for the polarization of the mating emitter is used, thus the other type of polarization is ignored. For example, the emitter 11*a* may be an antenna radiating electromagnetic waves having horizontal polarization, while the emitter 11*b* may be an antenna radiating electromagnetic waves having vertical polarization. Respectively, the sensor 13*a* may be an antenna receiving electromagnetic waves having horizontal polarization (or may be the same antenna used for the emitter 11*a*) while the sensor 13*b* may be an antenna receiving electromagnetic waves having vertical polarization (or may be the same antenna used for the emitter 11*b*). In the case of using light, polarizers may be added in front of the sensors, where a polarizer filtering and passing only one type of light (that is emitted by the light emitter 11*a*) may be used to filter light entering the sensor 13*a*, while a polarizer filtering and passing only another distinct type of light (that is emitted by the light emitter 11*b*) may be used to filter light entering the sensor 13*b*.

Figure 3A:
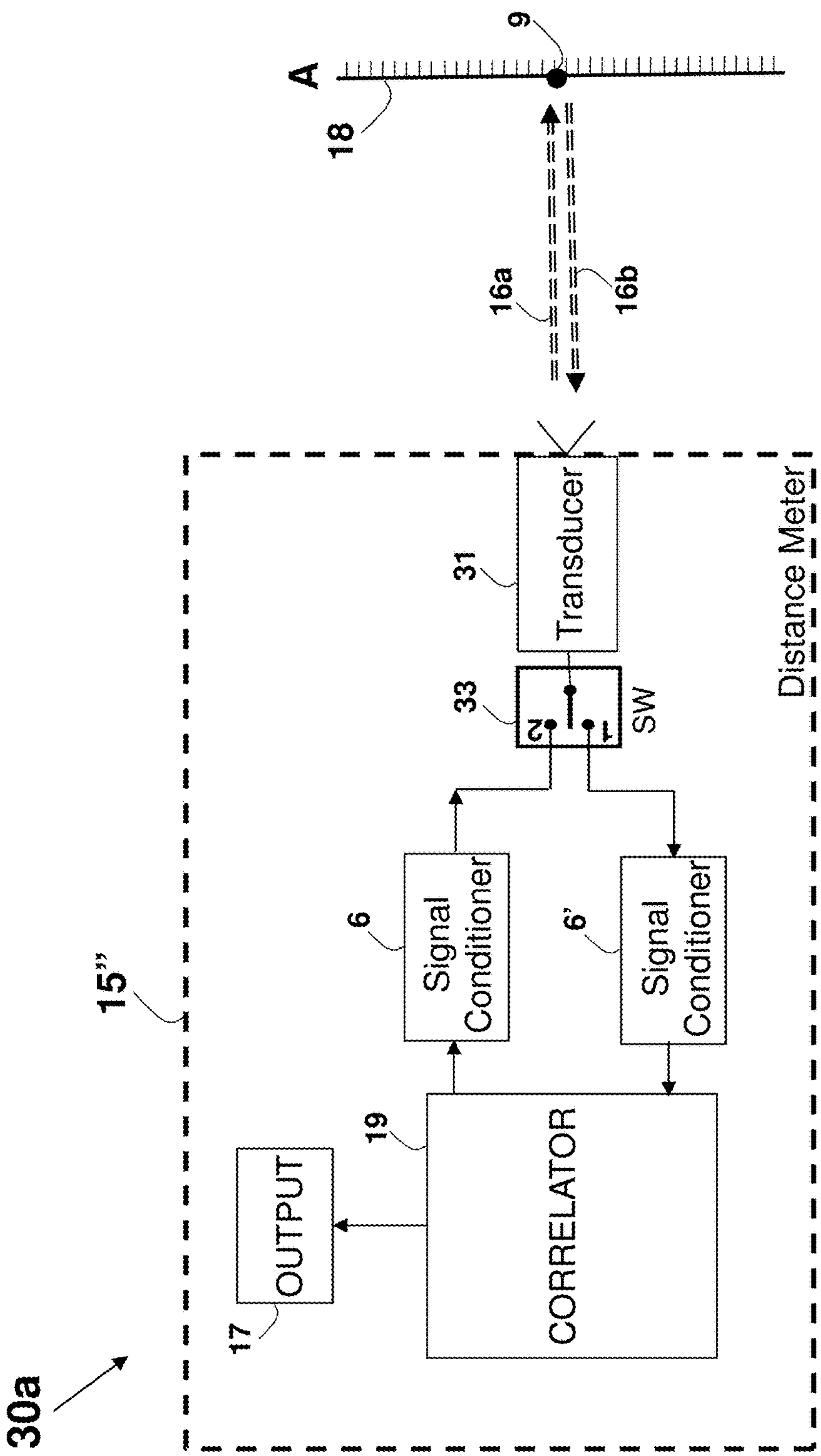
FIG. 3*a* illustrates a simplified schematic block diagram of a prior-art distance meter using a transmit/receive switch as a duplexer.
Figure 3B:
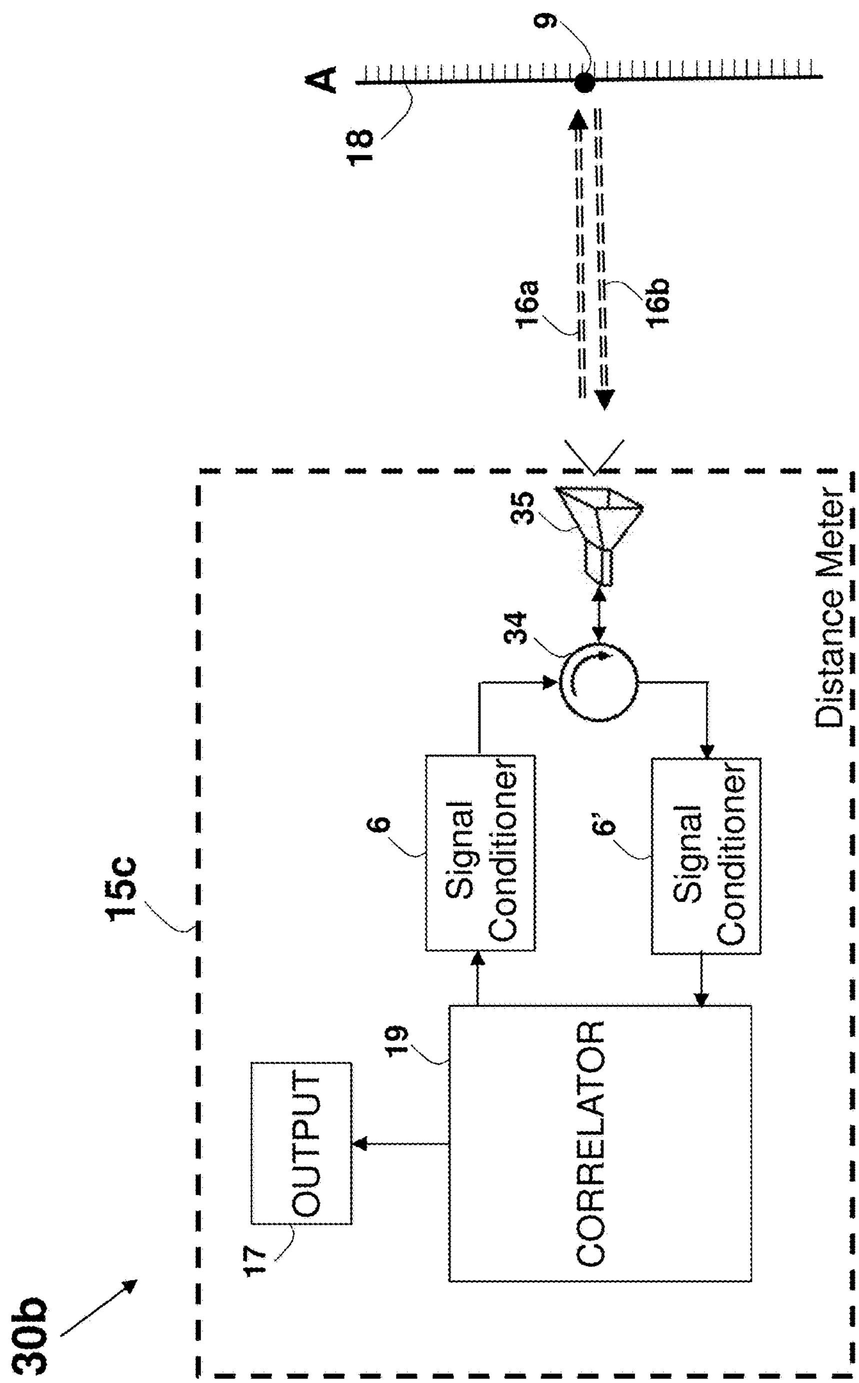
FIG. 3*b* illustrates a simplified schematic block diagram of a prior-art distance meter using a horn antenna as a transducer and a circulator as a duplexer.

In the case where a transducer is used for distance metering, such as the transducer 31 as part of the distance meter 15" shown in FIG. 3*a* or the transducer 78 as part of the angle meter 55*j* shown in FIG. 7*g*, the same path is used for the transmission path 16*a* from the emitter 11 to the reflecting point 9 and for the reflection path 16*b*. Hence, by simply diving the total traveled wave measured length by 2, the distance to the reflecting point 9 may be accurately estimated or calculated. However, when different components are used for the emitter 11 and the sensor 13, there is an inherent distance between these components, which may be considered in order to improve the accuracy.

Figure 12:
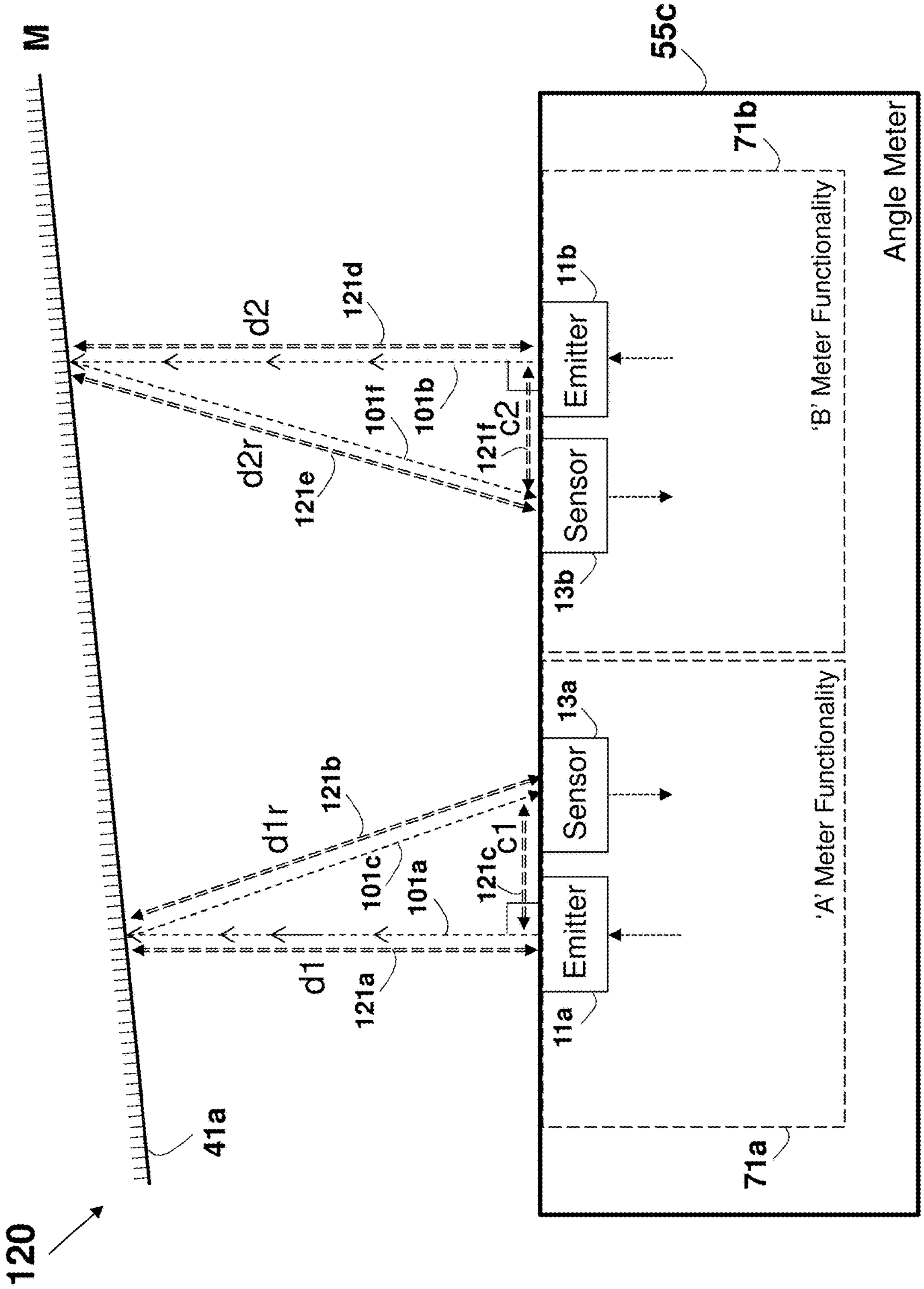
FIG. 12 depicts schematically the transmission and reflection paths using an angle meter.
Figure 12A:
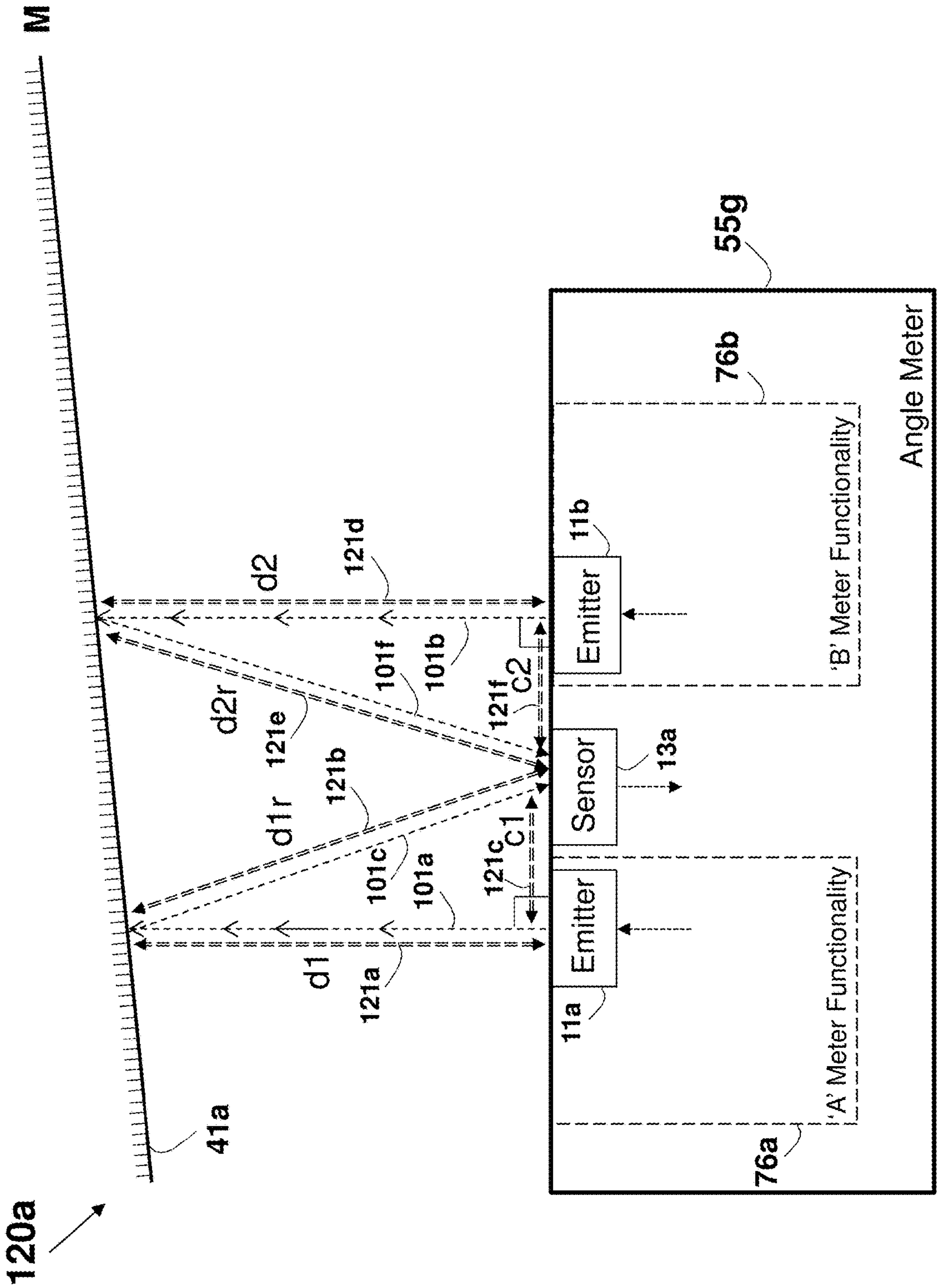
FIG. 12*a* depicts schematically the transmission and reflection paths using an angle meter having a shared sensor.

An arrangement 120 describing the usage of the angle meter 55*c* to measure the angle to the plane or line M 41*a* is shown in FIG. 12. The emitter 11*a* that is part of the 'A' meter functionality 71*a* in the angle meter 55*c* transmit the wave (or beam) along the transmitting path 101*a* having a distance d1 121*a* (corresponding to the path 16*a* described above), so that the wave front travels the distance d1 to 'hit' the plane or line M 41*a*. The reflection path is along the line 101*c* having a distance 121*b* from the incident point to the sensor 13*a* that is part of the 'A' meter functionality 71*a* in the angle meter 55*a*. The length of the reflection path 121*b* (corresponding to the path 16*b* described above) is designated as dlr. It is assumed that the transmission point in the emitter 11*a* and the receiving point of the sensor 13*a* are at a distance c 1 along a line 121*c*. The actual distance dt1 measured by the 'A' meter functionality 71*a* is based on the total wave travel distance, so that dt1=d1+d1r. Since the distance d1 121*a* along measurement line 51*a* (corresponding to the transmission path 101*a*) is typically used, the Pythagorean theorem may be used to calculate d1 according to $d1=(dt1^2-c1^2)/(2*dt1)$. Similarly, the emitter 11*b* that is part of the 'B' meter functionality 71*b* in the angle meter 55*a* transmits the wave (or beam) along the transmitting path 101*b* having a distance d2 121*d* (corresponding to the path 16*a* described above), so that the wave front travels the distance d2 to 'hit' the plane or line M 41*a*. The reflection path is along the line 101*f* having a distance 121*e* from the incident point to the sensor 13*b* that is part of the 'B' meter functionality 71*b* in the angle meter 55*a*. The length of the reflection path 121*e* (corresponding to the path 16*b* described above) is designated as d2r. It is assumed that the transmission point in the emitter 11*b* and the receiving point of the sensor 13*b* are at a distance c2 along a line 121*f*. The actual distance dt2 measured by the 'B' meter functionality 71*b* is based on the total wave travel distance, so that dt2=d2+d2r. Since the distance d2 121*d* along measurement line 51*b* (corresponding to the transmission path 101*b*) is typically used, the Pythagorean theorem may be used to calculate d2 according to $d2=(dt2^2-c2^2)/(2*dt2)$. A shared sensor 13*a* may be used for serving the two meter functionalities 'A' 76*a* and 'B' 76*b* as part of the angle meter 55*g* as described in FIG. 7*d* above. As shown in an arrangement 120*a* in FIG. 12*a*, the same analysis applies for calculating d1 and d2. In the case where the sensor 13*a* is located at the center between the two emitters 11*a* and 11*b*, then c1=c2=c, and thus $d1=(dt1^2-c^2)/(2*dt1)$ and $d2=(dt2^2-c^2)/(2*dt2)$.

Figure 1:
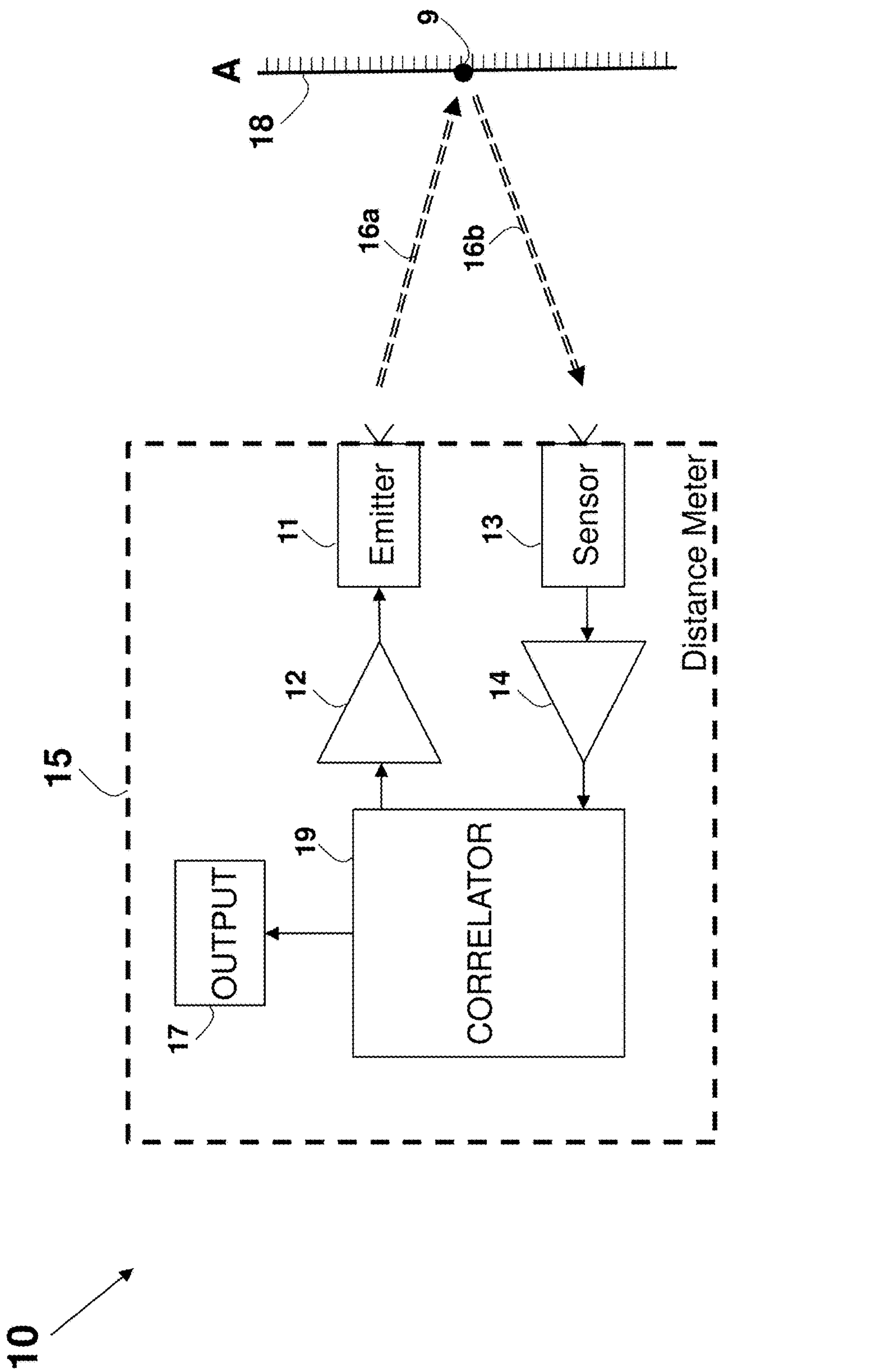
FIG. 1 illustrates a simplified schematic block diagram of a prior-art non-contact distance meter.
Figure 1A:
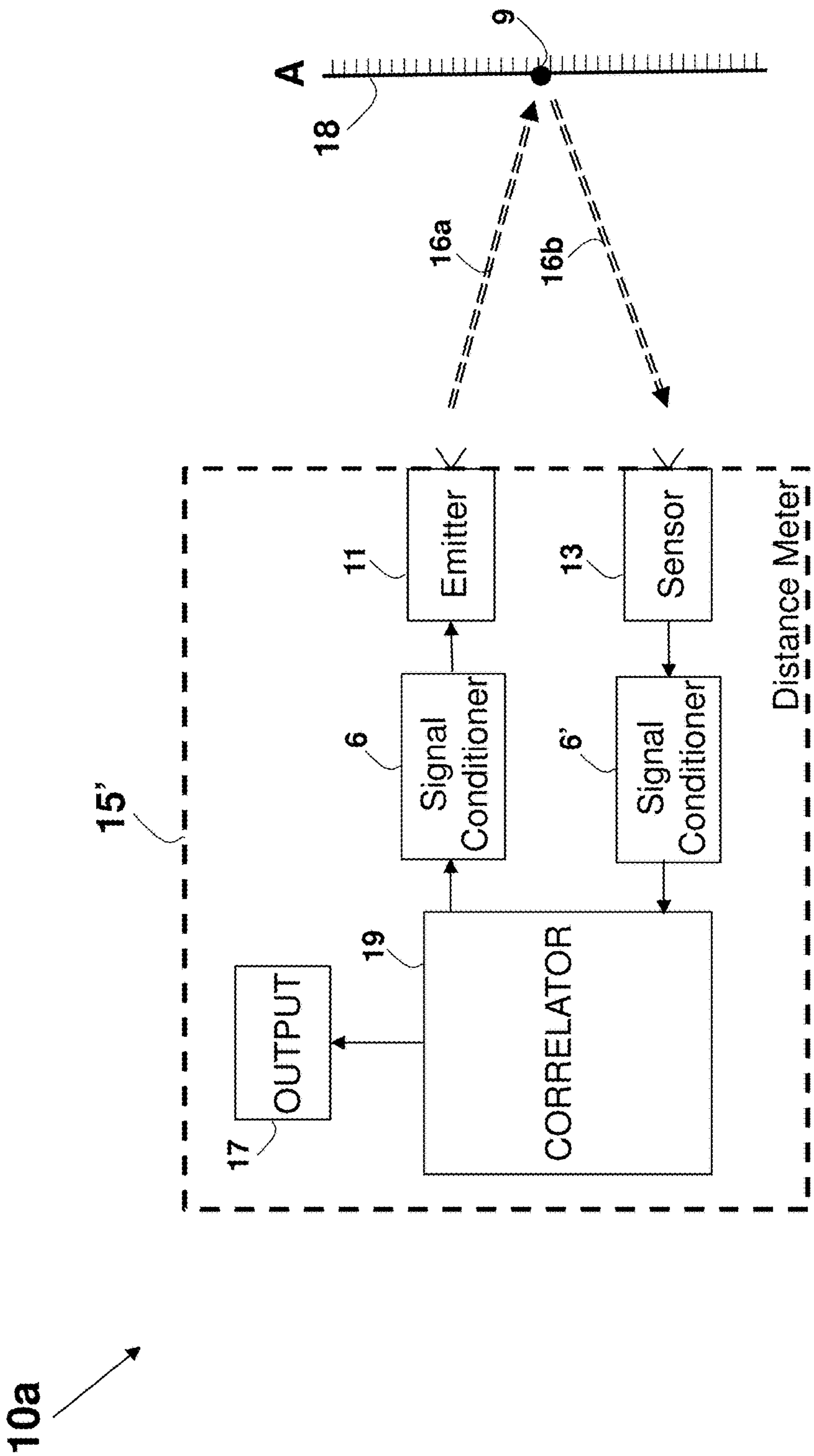
FIG. 1*a* illustrates a simplified schematic block diagram of a prior-art distance meter having a signal conditioning circuits.
Figure 1B:
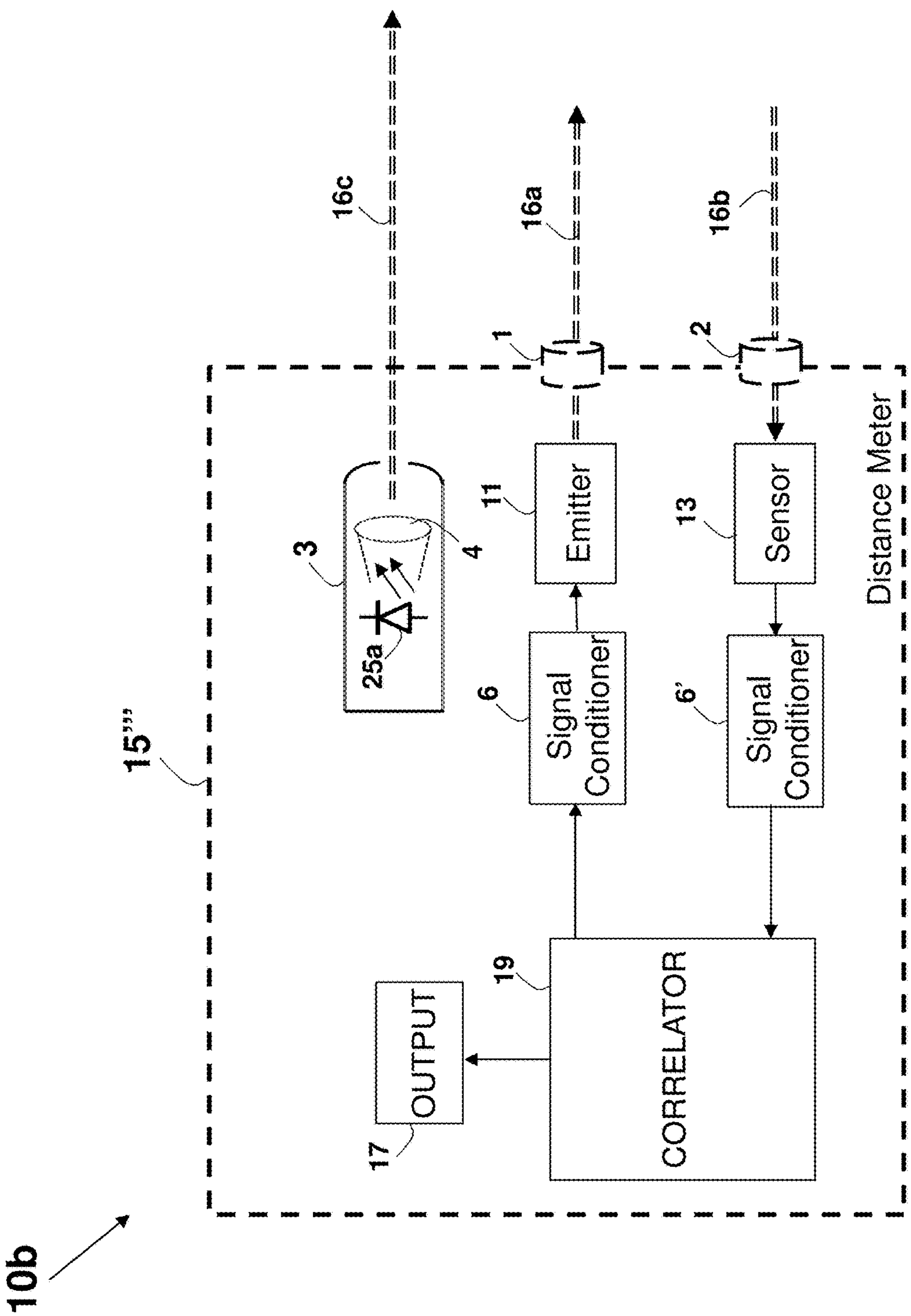
FIG. 1*b* illustrates a simplified schematic block diagram of a prior-art distance meter having a signal conditioning circuits and a laser pointer functionality.
Figure 2:
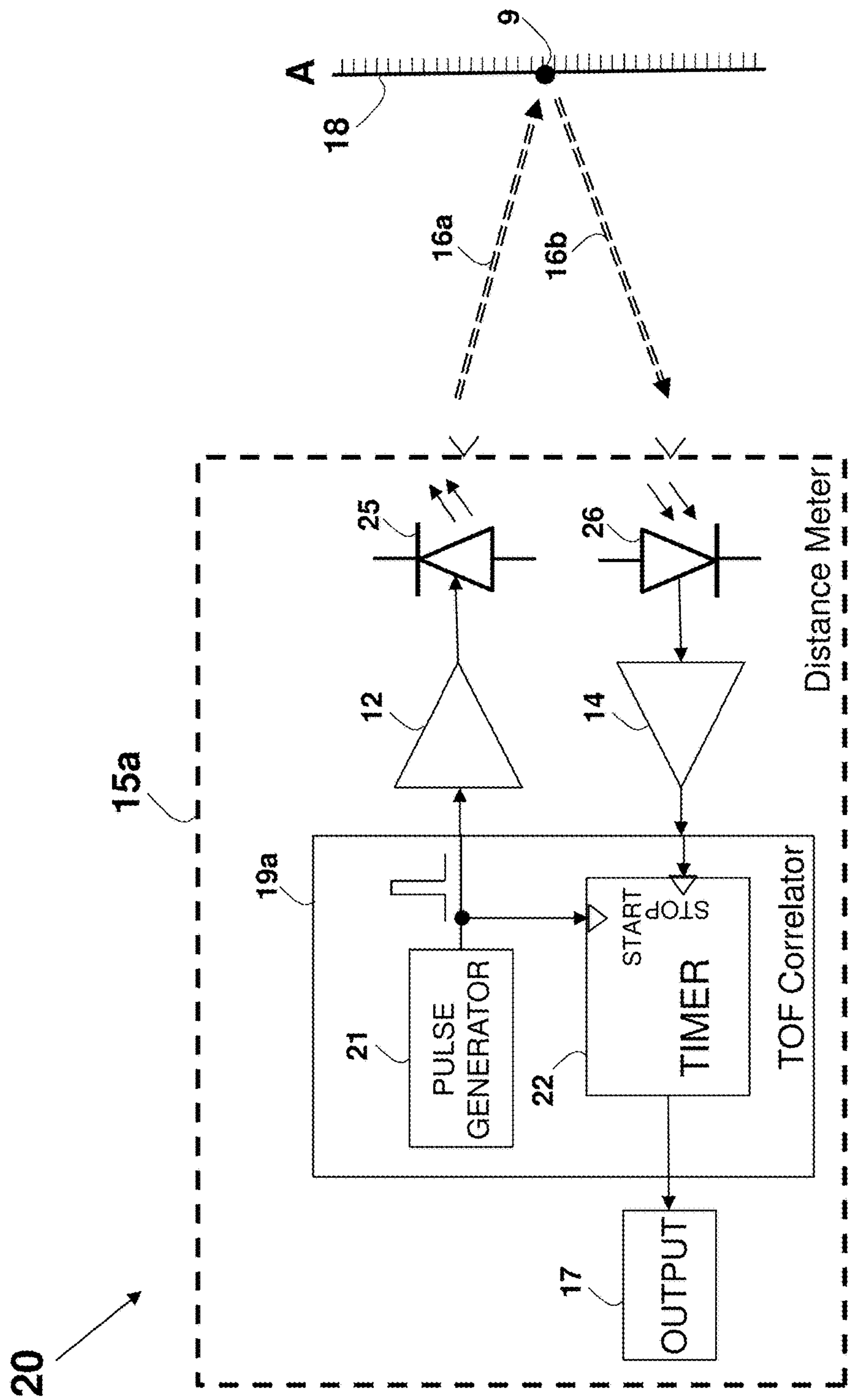
FIG. 2 illustrates a simplified schematic block diagram of an optical-based prior-art distance meter using TOF.
Figure 2A:
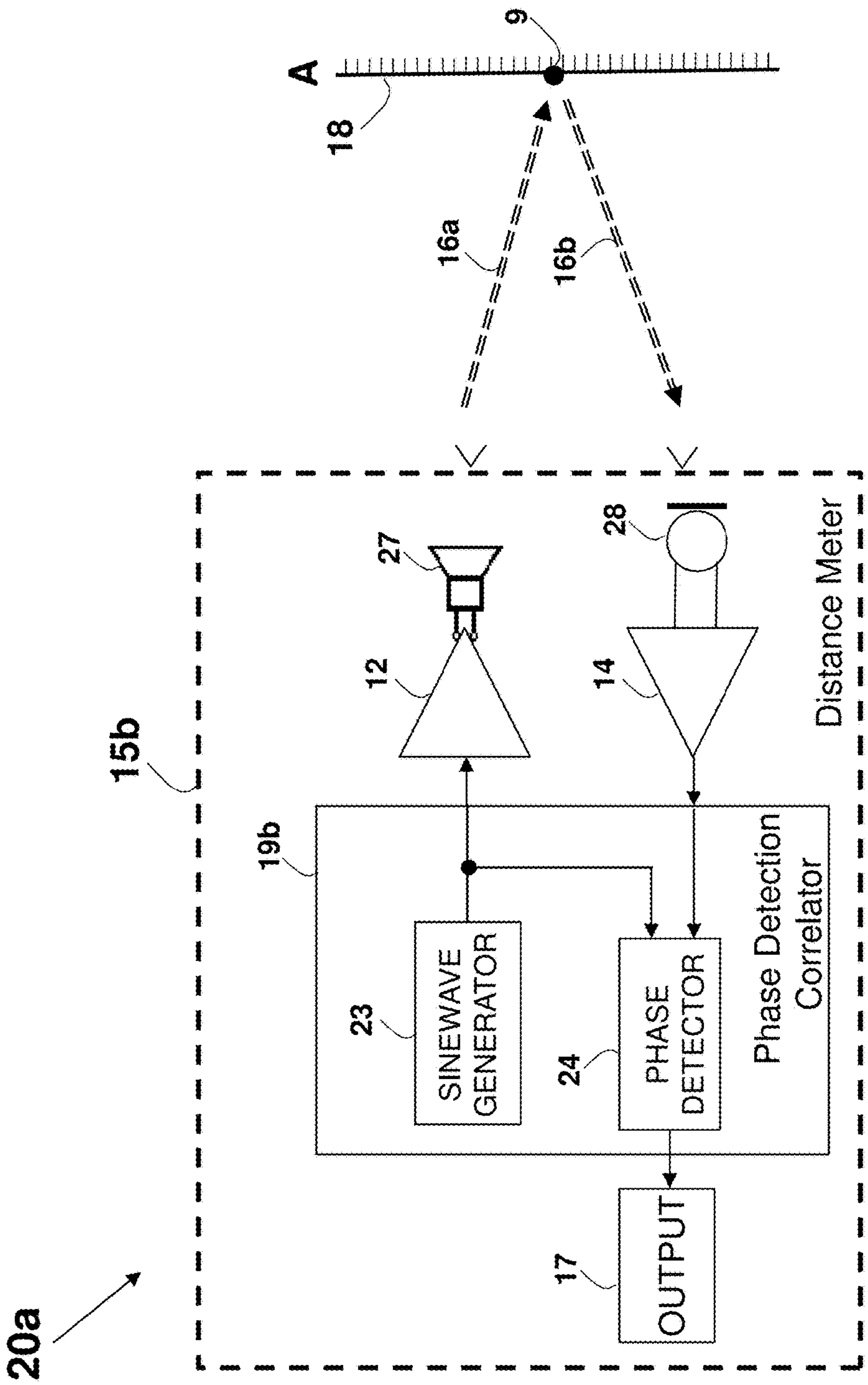
FIG. 2*a* illustrates a simplified schematic block diagram of an acoustical-based prior-art distance meter using phase detection.

In order to assist a user to visualize the points on the surface or line (such as point 9 on the line or surface M 41*a* shown in the arrangement 50 in FIG. 5), each of the 'A' and 'B' meter functionalities (or each of the distance meters 'A' 40*a* and 'B' 40*b*) each further comprise a laser pointer functionality, such as the laser functionality 3 shown as part of the distance meter 15'" shown as part of the arrangement 10*b* in FIG. 1*b*. An example of the angle meter 55*c* (shown in FIG. 7) with laser pointer functionalities is shown as an angle meter 55*p* shown in FIG. 13. An 'A' meter functionality 71*a*' (based on the 'A' meter functionality 71*a*) comprises a laser pointer functionality 3*a*, that comprises a laser diode 25*aa* emitting a visible laser light that is collimated by lens 4*a*, and emitted as a narrow and focused visible laser beam 16*ca*. Preferably, the visible laser beam 16*ca* is parallel and close as practical to the measurement line 51*a* (that corresponds, for example, to the propagation path of the wave emitted by the emitter 11*a*), so that the point to which the distance is measured using the 'A' meter functionality 71*a*' is illuminated and visualized to a human user. Similarly, a 'B' meter functionality 71*b*' (based on the 'B' meter functionality 71*b*) comprises a laser pointer functionality 3*b*, that comprises a laser diode 25*ab* emitting a visible laser light that is collimated by lens 4*b*, and emitted as a narrow and focused visible laser beam 16_cb_. Preferably, the visible laser beam 16_cb_ is parallel and close as practical to the measurement line 51_b_ (that corresponds, for example, to the propagation path of the wave emitted by the emitter 11_b_), so that the point to which the distance is measured using the 'B' meter functionality 71_b_' is illuminated and visualized to the human user.

Preferably, the visible laser beam 16_ca_ may deviate from the ideal parallel to the measurement line 51_a_ (or from the center of the wave propagation line of the waves emitted by the emitter 11_a_) by less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°. Further, the visible laser beam 16_cb_ may preferably deviate from the ideal parallel to the measurement line 51_b_ (or from the center of the wave propagation line of the waves emitted by the emitter 11_b_) by less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°. Further, the laser beam 16_ca_ preferably illuminates a location having a distance to the distance-measured point of 'A' meter functionality 71_a_' of less than 0.001%, 0.002%, 0.005%, 0.008%, 0.01%, 0.02%, 0.05%, 0.08%, 0.1%, 0.2%, 0.5%, 0.8%, 1%, 2%, 5%, 8%, 10%, 15%, of the measured distance. Similarly, the laser beam 16_cb_ preferably illuminates a location having a distance to the distance-measured point of 'B' meter functionality 71_b_' of less than 0.001%, 0.002%, 0.005%, 0.008%, 0.01%, 0.02%, 0.05%, 0.08%, 0.1%, 0.2%, 0.5%, 0.8%, 1%, 2%, 5%, 8%, 10%, 15%, of the measured distance.

Figure 13:
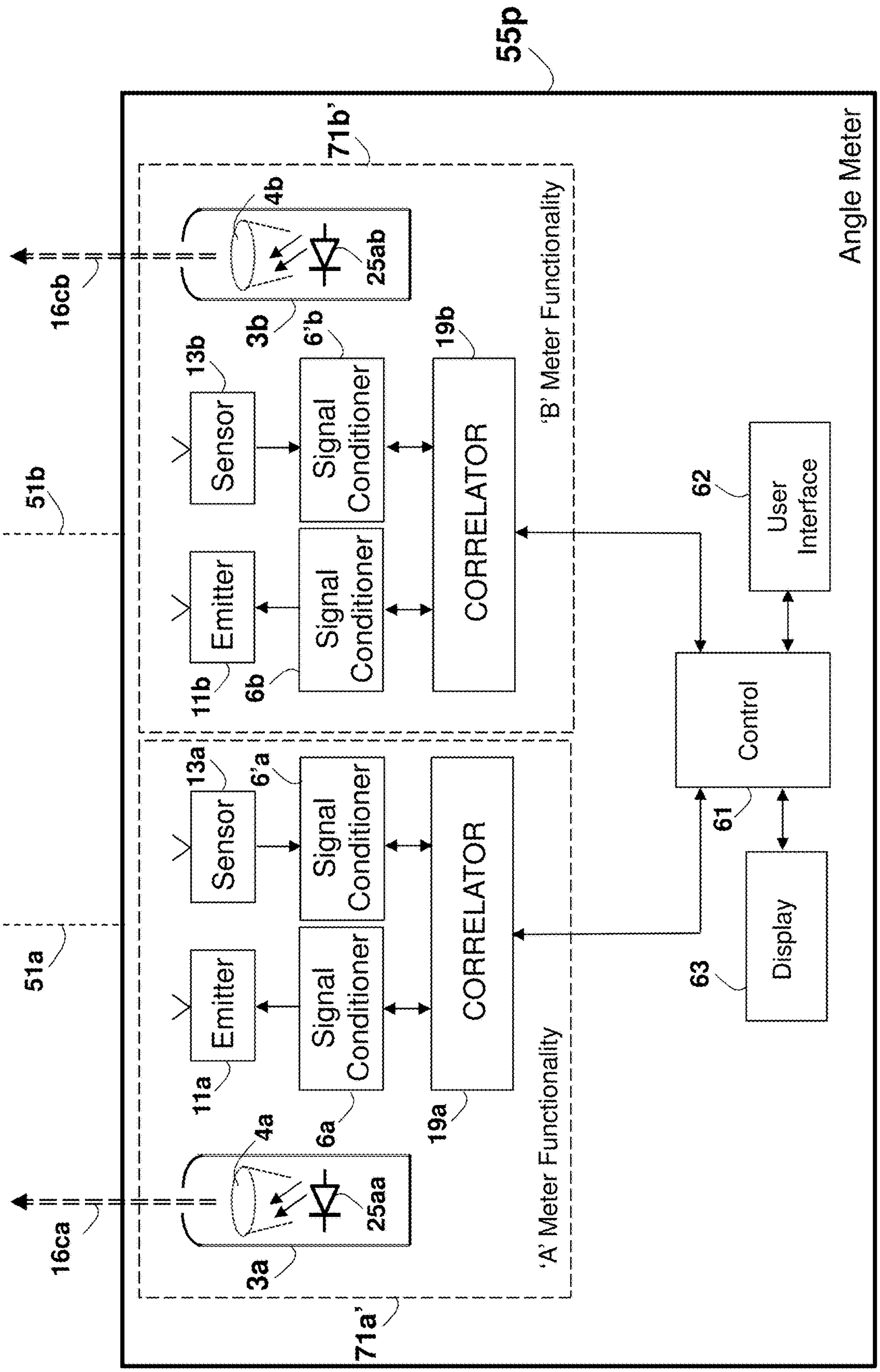
FIG. 13 illustrates a simplified schematic block diagram of an angle meter using two distinct distance meters functionalities each including a laser pointer functionality.

Alternatively or in addition, a single laser pointer may be used, as exampled in an angle meter 55_q_ shown in FIG. 13_a_. A single laser pointer functionality 3_a_ is used, preferably centered between the measurement lines 51_a_ and 51_b_, hence as close as practical to the average point 9 shown in the arrangement 50. The visible laser beam 16_ca_ is ideally originated from the point 7, which is the center point between the measurement points used by the two meter functionalities. In the case the distance between these points is c, as shown in the arrangement 50, the visible laser beam 16_ca_ may be originated at a location that is c/2 length from each measurement point. For example, such center location may be used to illuminate the point 9 along the average measurement line dav 51_e_, as depicted in the arrangement 50 in FIG. 5. Preferably, the deviation from the center point 7 may be less than 0.001%, 0.002%, 0.005%, 0.008%, 0.01%, 0.02%, 0.05%, 0.08%, 0.1%, 0.2%, 0.5%, 0.8%, 1%, 2%, 5%, 8%, 10%, 15%, 20%, or 25% of the total length c. Further, the visible laser beam 16_ca_ may preferably deviate from the ideal parallel to the measurement line 51_a_, or from the ideal parallel to the measurement line 51_b_ (or from the center of the wave propagation line of the waves emitted by the emitter 11_b_ or 11_a_) by less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°. Further, the laser beam 16_ca_ preferably illuminates a location having a distance to the measured point 9 of less than 0.001%, 0.002%, 0.005%, 0.008%, 0.01%, 0.02%, 0.05%, 0.08%, 0.1%, 0.2%, 0.5%, 0.8%, 1%, 2%, 5%, 8%, 10%, 15%, of the measured distance. In one example, the emitter 11_a_ consists of the emitting laser diode 25_aa_, thus a single laser diode may be used for both the distance measuring functionality of the 'A' Meter Functionality 71_a_' and the laser pointer 3_a_. Alternatively or in addition, the emitter 11_b_ consists of the emitting laser diode 25_ab_, thus a single laser diode may be used for both the distance measuring functionality of the 'B' Meter Functionality 71_b_' and the laser pointer 3_b_.

In one example, the embedded laser pointer functionality may be mounted or fixed in position, and may be mechanically attached to the angle meter enclosure. For example, the laser pointers 3_a_ and 3_b_ of the angle meter 55_p_ shown in FIG. 13, or the laser pointer 3_a_ as part of the angle meter 55_q_, shown in FIG. 13_a_, may be fixed in position relative to other components of the angle meter 55_q_ or 55_p_, and may be non-movably and mechanically attached to the angle meter enclosure. Alternatively or in addition, the laser pointer functionality 3_a_ may be movable or rotatable relative to any one or more components (such as the enclosure) of the angle meter, by using a motion actuator, such as a rotary or linear actuator. In one example, the laser pointer functionality 3_a_ is movable or rotatable using a motion actuator that may be controlled by the control 61.

An example of a rotatable laser pointer 3_a_ is shown as part of an angle meter 55_t_ shown in FIG. 13_b_. The visible laser pointer functionality 3_a_ is mechanically attached by a mechanical coupling 133, which may be an axis or a gear train, to a rotary actuator, such as a motor 132. The motor 132 may be an electrical motor that my provide a continuous rotation, or may be a motor that is capable of moving the laser pointer 3_a_ to a fixed angular position, such as a servomotor or a stepper motor. The stepper motor may comprise a permanent magnet stepper, a variable reluctance stepper, or a hybrid synchronous stepper, and may be a bipolar or unipolar stepper type. The motor 132 may be controlled to an angular position by a driver 131. In case of a stepper motor, the driver 131 may be a stepper motor driver and may use L/R driver or chopper drive circuits. Alternatively or in addition, the motor 132 may comprise a servomotor, and in such a scheme, the driver 131 comprises suitable servomotor control drivers. The driver 131 is coupled to be controlled by the control block 61. In one example, the control block 61 determines or calculates the required angular position, and provides the required position to the driver 131, which in turn controls the motor 132 to position the laser pointer 3_a_ in the required angle.

At a reference position (e.g., 0°), the emitted visible laser beam 16_ca_ may be similar or identical to the direction described above for the angle meter 55_q_ shown in FIG. 13_a_. The visible beam 16_ca_ may be rotated or moved in a rotation or movement plane, associated with the movement of the laser pointer 3_a_ caused by the motor 132 under the control of the driver 131. The rotation or movement plane of the visible laser beam 16_ca_ may preferably deviate from the ideal parallel to the measurement line 51_a_, or from the ideal parallel to the measurement line 51_b_, or from a plane formed by the two measurement lines 51_a_ and 51_b_ (or from the center of the wave propagation line of the waves emitted by the emitter 11_b_ or 11_a_), by less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°. In one example, the rotation plane is identical or parallel to the plane formed by the two parallel measurement lines 51_a_ and 51_b_, and the visible beam 16_ca_ may be rotated to determined angular positions, as shown in FIG. 13_c_. The reference angular position is shown as emitting line 16_ca_2. In one example, the laser pointer 3_a_ may be rotated 'left' where the emitted bean is directed in a direction 16_ca_1 that is at an angle Φ1 134_a_ from the reference angle. In another example, the laser pointer 3_a_ may be rotated 'right' where the emitted bean is directed in a direction 16_ca_3 that is at an angle Φ2 134_b_ from the reference angle 0° (direction 16_ca_2). In one example, the rotation angle may be based on, or may be equal to, the estimated angle α 56_a_ (or any function thereof). For example, the angle Φ1 134_a_ may be equal to the calculated or estimated angle α 56_a_, thus illuminating or pointing to the closest point 8 along the actual measurement line dact 51*f*, as depicted in the arrangement 50 in FIG. 5.

Figure 14:
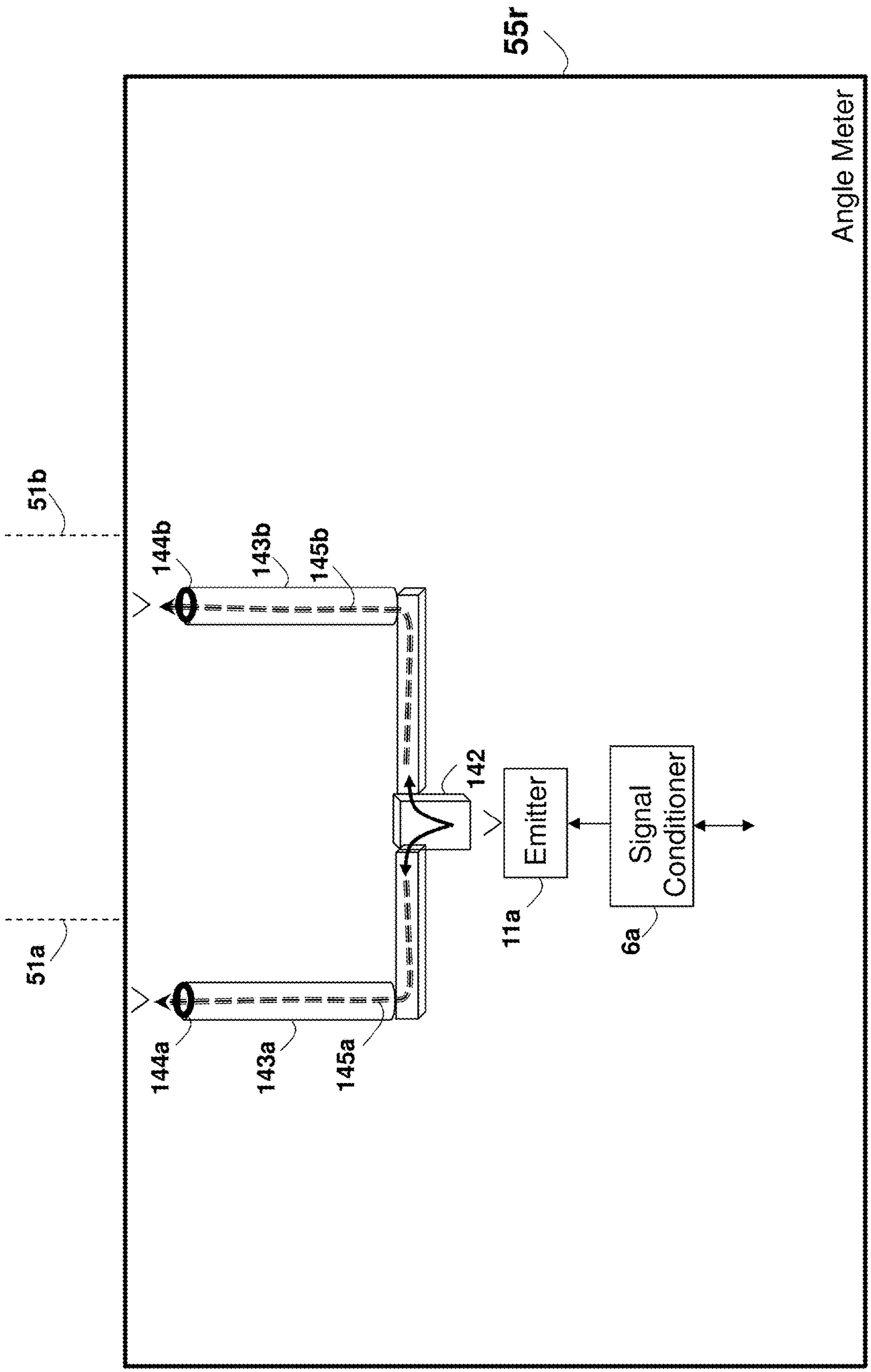
FIG. 14 illustrates part of a simplified schematic block diagram of an angle meter using two distinct distance meters functionalities sharing a single emitter using a splitter and waveguides.

Some of the angle meters exampled above used two distinct emitters, such as the angle meter 55*c* shown in FIG. 7 that uses the emitter 11*a* as part of the 'A' Meter Functionality 71*a* and the emitter 11*b* as part of the 'B' Meter Functionality 71*b*. In one example, the two functionalities 71*a* and 71*a* share a single emitter 11*a* as shown in a part of an angle meter 55*r* in FIG. 14. The structure shown by the portion of an angle meter 55*r* may be used in any angle meter described herein, where two or more emitters are replaced with a single emitter and applicable waves distribution scheme. The emitter 11*a* emits the wave signal into a splitter or divider 142, which split the received signal into two parts, directed to two different (may be opposite) directions. In the example of the angle meter part 55*r*, one part of the wave signal is transmitted and guided (along a dashed line 145*a*) via a waveguide 143*a* and is output at a waveguide opening 144*a*, position to direct the wave along the measurement line 51*a*, as if the emitter 11*a* was position in its location as part of the angle meter 55*c*, for example. Similarly, another part of the wave signal is transmitted and guided (along a dashed line 145*b*) via a waveguide 143*b* and is output at a waveguide opening 144*b*, position to direct the wave along the measurement line 51*b*, as if the emitter 11*a* was position in the location of the emitter 11*b* as part of the angle meter 55*c*, for example. Preferably, the wave signal emitted by the emitter 11*a* is equally split between the two waveguides 143*a* and 143*b*, and emitted using equal intensity through the respective openings 144*a* and 144*b*. Alternatively or in addition, the difference between the two wave signal amplitudes at the splitter or divider 142 outputs may be higher than 20%, 18%, 15%, 13%, 10%, 8%, 5%, 2%, 1%, 0.5%, or 0.2% of the energy, intensity, or amplitude of the wave signal at the emitter 11*a* output. Alternatively or in addition, the difference between the two wave signal amplitudes at the splitter or divider 142 outputs may be higher than 20%, 18%, 15%, 13%, 10%, 8%, 5%, 2%, 1%, 0.5%, or 0.2% of the energy, intensity, or amplitude of the wave signal at the emitter 11*a* output. For example, the energy, intensity, or amplitude of the wave signal output from the opening 144*a* may be higher than 30%, 35%, 40%, 45%, 47%, or 48% of the energy, intensity, or amplitude of the wave signal at the emitter 11*a* output. Similarly, the energy, intensity, or amplitude of the wave signal output from the opening 144*b* may be higher than 30%, 35%, 40%, 45%, 47%, or 48% of the energy, intensity, or amplitude of the wave signal at the emitter 11*a* output.

Figure 14A:
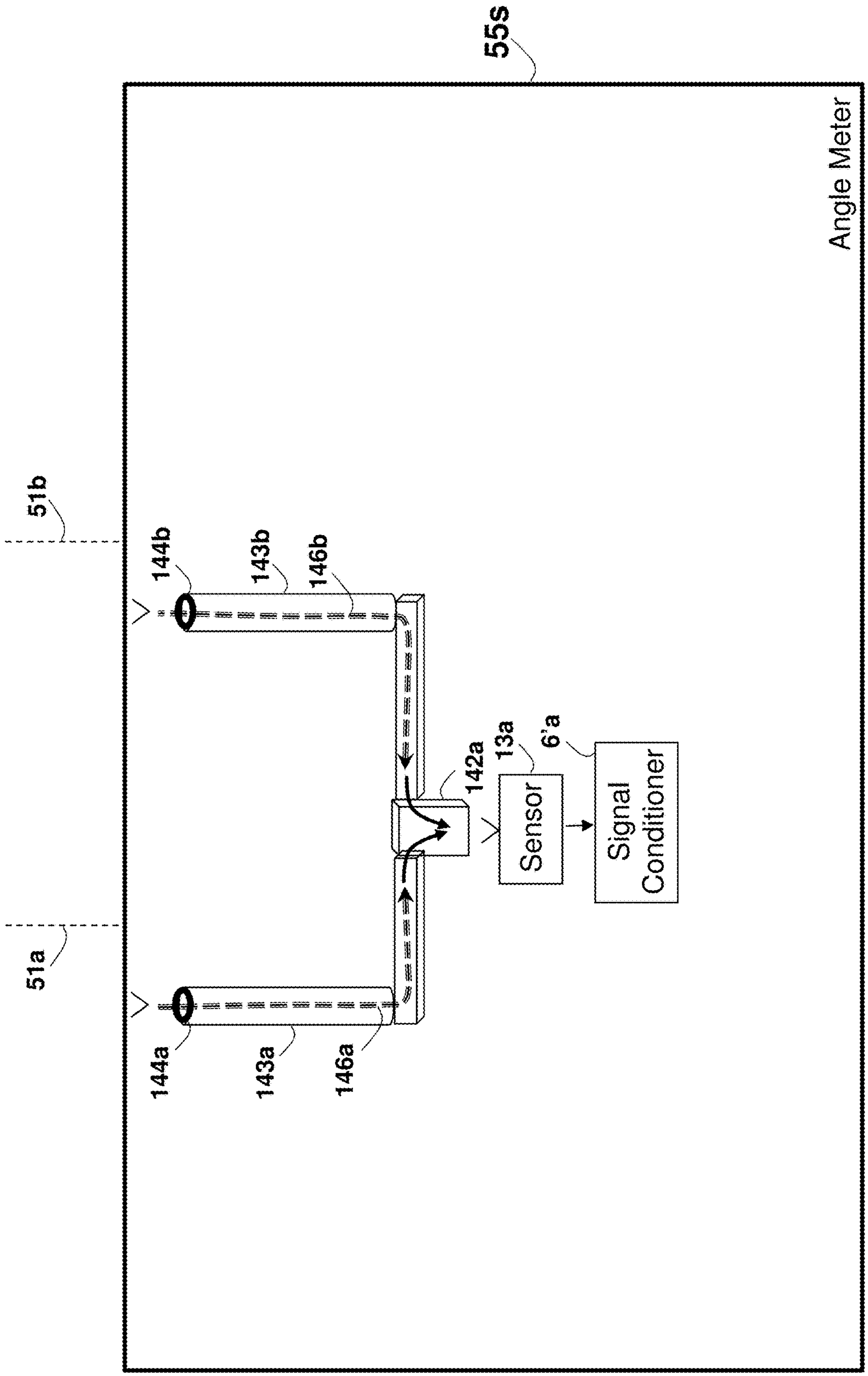
FIG. 14*a* illustrates part of a simplified schematic block diagram of an angle meter using two distinct distance meters functionalities sharing a single sensor using a splitter and waveguides.

Some of the angle meters exampled above used two distinct sensors, such as the angle meter 55*c* shown in FIG. 7 that uses the sensor 13*a* as part of the 'A' Meter Functionality 71*a* and the sensor 13*b* as part of the 'B' Meter Functionality 71*b*. In one example, the two functionalities 71*a* and 71*a* share a single sensor 13*a* as shown in a part of an angle meter 55*s* in FIG. 14*a*. The structure shown by the portion of an angle meter 55*s* may be used in any angle meter described herein, where two or more sensors are replaced with a single sensor and applicable waves distribution scheme. The sensor 13*a* receives and senses the wave signal from a combiner 142*a*, that may be same as, or distinct from, the splitter or divider 142, which combines and forms a received signal from received two distinct parts, coming from two different (may be opposite) directions. In the example of the angle meter part 55*s*, one part of the wave signal is received along the measurement line 51*a* at a waveguide opening 144*a*, and then transmitted and guided (along a dashed line 146*a*) via a waveguide 143*a* and is output to the sensor 13*a* via the output of the combiner 142*a*, as if the sensor 13*a* was position in its location as part of the angle meter 55*c*, for example. Similarly, another part of the wave signal is received along the measurement line 51*b* at a waveguide opening 144*b*, and then transmitted and guided (along a dashed line 146*b*) via a waveguide 143*a* and is output to the sensor 13*a* via the output of the combiner 142*a*, as if the sensor 13*b* was position in its location as part of the angle meter 55*c*, for example.

Preferably, the wave signal attenuation is equal in the two paths from the respective openings 144*a* and 144*b* through the respective two waveguides 143*a* and 143*b*, and the combiner 142*a* to the sensor 13*a*. Alternatively or in addition, the difference between the attenuation of the two paths may be higher than 20%, 18%, 15%, 13%, 10%, 8%, 5%, 2%, 1%, 0.5%, or 0.2% of the energy, intensity, or amplitude of the wave signal received by the sensor 13*a*. Alternatively or in addition, the difference between the attenuation of the two paths may be lower than 20%, 18%, 15%, 13%, 10%, 8%, 5%, 2%, 1%, 0.5%, or 0.2% of the energy, intensity, or amplitude of the wave signal received by the sensor 13*a*.

In the case of using light wave, the splitter 142 may consist of, comprise, or be based on, an optical beam splitter. Such an optical beam splitter may consist of, comprise, or be based on, two triangular glass prisms which are glued together at their base, a half-silvered mirror using a sheet of glass or plastic with a transparently thin coating of metal, a diffractive beam splitter, or a dichroic mirrored prism assembly which uses dichroic optical coatings. A polarizing beam splitter may consist of, comprise, or be based on Wollaston prism that use birefringent materials for splitting light into beams of differing polarization.

In the case of using electromagnetic (e.g., radar) wave, the splitter 142 may consist of, comprise, or be based on, a power divider or a directional coupler, that may be passive or active. A directional coupler may consist of, comprise, use, or be based on, a pair of coupled transmission lines, a branch-line coupler that consist of two parallel transmission lines physically coupled together with two or more branch lines between them, or a Lange coupler that is similar to the interdigital filter with paralleled lines interleaved to achieve the coupling. A power divider may consist of, comprise, use, or be based on, a T-junction or a Wilkinson power divider that consists of two parallel uncoupled $\lambda/4$ transmission lines. A coupled line directional coupler where the coupling is designed to be 3 dB is referred to as hybrid coupler. A hybrid ring coupler, also called the rat-race coupler, is a four-port 3 dB directional coupler consisting of a $3\lambda/2$ ring of transmission line with four lines at the intervals. A directional coupler may be consist of, comprise, use, or be based on, a waveguide directional coupler such as branch-line coupler, Bethe-hole directional coupler, a Riblet short-slot coupler that is two waveguides side-by-side with the side-wall in common instead of the long side as in the Bethe-hole coupler, or a Moreno crossed-guide coupler that has two waveguides stacked one on top of the other like the Bethe-hole coupler but at right angles to each other instead of parallel. A waveguide power divider may consist of, comprise, use, or be based on, a hybrid ring or a Magic tee.

In the case where the wave signal used is sound, each of the waveguides 143*a* and 143*b* may consist of, comprise, use, or be based on, an acoustic waveguide.

In the case where the wave signal used is light, each of the waveguides 143*a* and 143*b* may consist of, comprise, use, or be based on, an optical waveguide, that may be planar, strip, or fiber waveguide structure, may be associated with step or gradient index as refractive index distribution, and may be made of glass, polymer, semiconductor. The optical waveguide may consist of, comprise, use, or be based on, two-dimensional waveguide, such as a strip waveguide that is basically a strip of the layer confined between cladding layers, a rib waveguide that is a waveguide in which the guiding layer basically consists of the slab with a strip (or several strips) superimposed onto it, a Laser-inscribed waveguide, a photonic crystal waveguide, a segmented waveguide, or an optical fiber.

In the case where the wave signal used is electromagnetic wave (e.g., RF or radar), each of the waveguides 143*a* and 143*b* may consist of, comprise, use, or be based on, an electromagnetic waveguide, that may consist of, comprise, use, or be based on, a transmission line, a dielectric waveguide, or a hollow metallic waveguide. A dielectric waveguide typically employs a solid dielectric rod rather than a hollow pipe. A transmission lines may consist of, comprise, use, or be based on, a microstrip, a coplanar waveguide, a stripline or a coaxial cable. A hollow metallic waveguide may be circular or rectangular shaped, and may consist of, comprise, use, or be based on, a slotted waveguide, or a closed waveguide that is an electromagnetic waveguide (α) that is tubular, usually with a circular or rectangular cross section, (b) that has electrically conducting walls, (c) that may be hollow or filled with a dielectric material, (d) that can support a large number of discrete propagating modes, (e) in which each discrete mode defines the propagation constant for that mode, (f) in which the field at any point is describable in terms of the supported modes, (g) in which there is no radiation field, and (h) in which discontinuities and bends cause mode conversion but not radiation.

Figure 15:
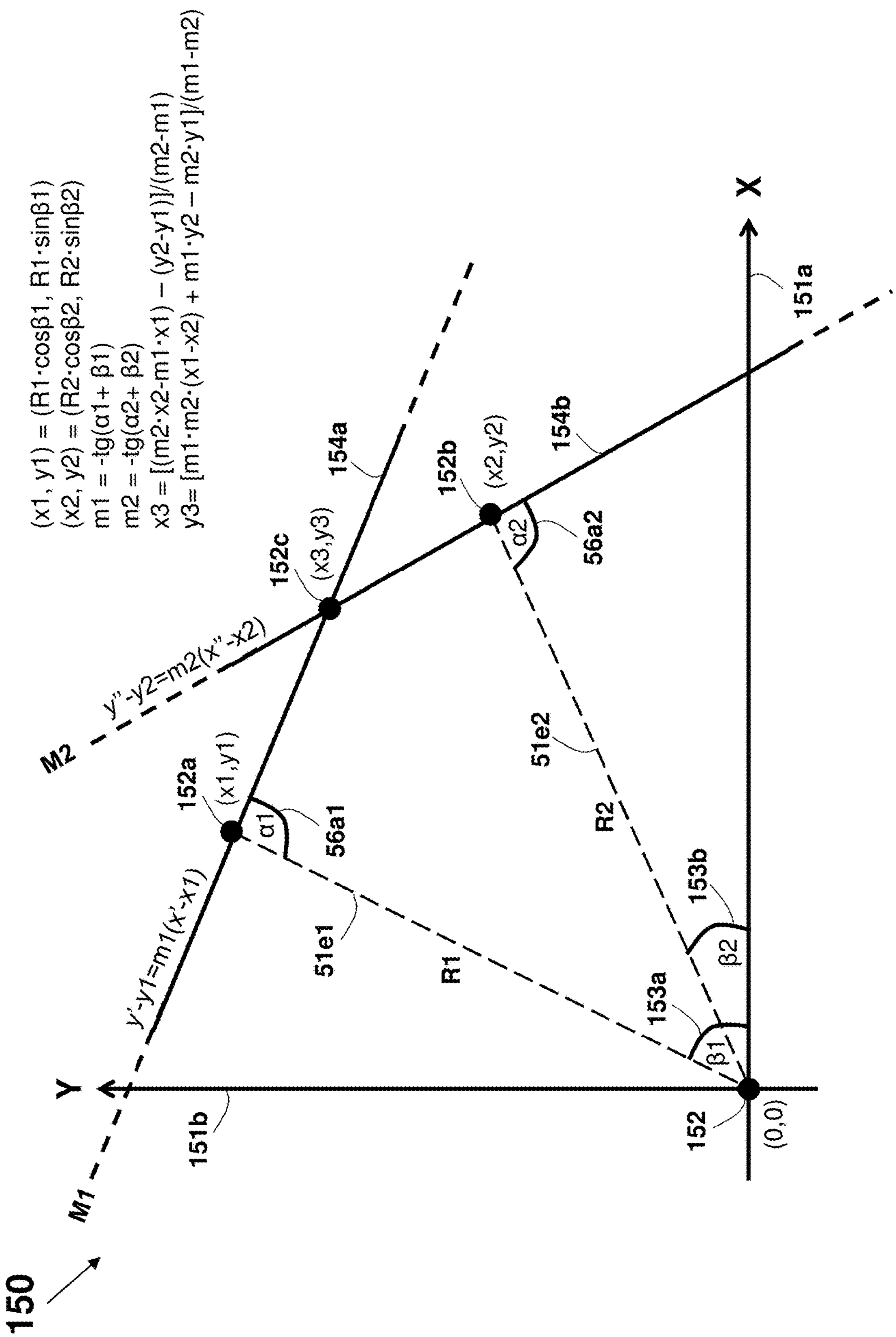
FIG. 15 illustrates an angle meter operative for measuring distance and angle to two points that are part of two distinct lines or surfaces.

A Cartesian coordinate system is shown as part of an arrangement 150 shown in FIG. 15. The coordinate system uses the 'X' axis 151*a* and the 'Y' axis 151*b*, and an origin point (0, 0) 152. A first line M1 154*a* is shown along the points (x', y') defined by the equation $y'-y1=m1*(x'-x1)$, where ml is the line slope and a point (x1, y1) 152*a* is located in the line M1 154*a*. Similarly, a second line M2 154*b* is shown along the points (x", y") defined by the equation $y''-y2=m2*(x''-x2)$, where m2 is the line slope and a point (x2, y2) 152*b* is located in the line M2 154*b*. The lines M1 154*a* and M2 154*b* intersect at an intersection point (x3, y3) 152*c*, where $x3=[(m2*x2-m1*x1)-(y2-y1)]/(m2-m1)$, and $y3=[m1*m2*(x1-x2)+m1*y2-m2*y1]/(m1-m2)$.

In one example, an angle meter is located for measuring distances and angles relating to the origin point (0, 0) 152. The angle meter is oriented to measure distance and angle to the point (x1, y1) 152*a*, angularly deviating from the 'X' axis 151*a* by a first deviation angle β1 153*a*. In this position, the angle meter measures a distance R1 to the point (x1, y1) 152*a* along a first measurement line 51*e*1, which may correspond to the measurement dav 51*e* in the arrangement 50 shown in FIG. 5. Further, at this position the angle meter may estimate or calculate an angle α1 56*a*1, which may correspond to the angle α 56*a* in the arrangement 50 shown in FIG. 5. Since $x1=R1*\cos(\beta1)$ and $y1=R1*\sin(\beta1)$, the point (x1, y1) 152*a* may also be defined using the measured and calculated or estimated parameters as: $(x1, y1)=(R1*\cos(\beta1), R1*\sin(\beta1))$. Similarly, the slope ml of the line M1 154*a* may be calculated or estimated as $m1=-tg(\alpha1+\beta1)$.

The angle meter may further be rotated to a second position oriented to measure distance and angle to the point (x2, y2) 152*b*, angularly deviating from the 'X' axis 151*a* by a first deviation angle β2 153*b*. In this position, the angle meter measures a distance R2 to the point (x2, y2) 152*b* along a second measurement line 51*e*2, which may correspond to the measurement dav 51*e* in the arrangement 50 shown in FIG. 5. Further, at this position the angle meter may estimate or calculate an angle α2 56*a*2, which may correspond to the angle α 56*a* in the arrangement 50 shown in FIG. 5. Since $x2=R2*\cos(\beta2)$ and $y2=R2*\sin(\beta2)$, the point (x2, y2) 152*b* may also be defined using the measured and calculated or estimated parameters as: $(x2, y2)=(R2*\cos(\beta2), R2*\sin(\beta2))$. Similarly, the slope m2 of the line M2 154*b* may be calculated or estimated as $m2=-tg(\alpha2+$(32).

Based on the two measurements by the angle meter, the two lines M1 154*a* and M2 154*b* parameters may be calculated or estimated, and these parameters may be used to estimate the intersection point (x3, y3) 152*c*, according to $x3=[(m2*x2-m1*x1)-(y2-y1)]/(m2-m1)$ and $y3=[m1*m2*(x1-x2)+m1*y2-m2*y1]/(m1-m2)$, where $m1=-tg(\alpha1+\beta1)$, $m2=-tg(\alpha2+\beta2)$, $x1=R1*\cos(\beta1)$, $y1=R1*\sin(\beta1)$, $x2=R2*\cos(\beta2)$, and $y2=R2*\sin(\beta2)$. The angle meter located at the origin point (0, 0) 152 may then interpolate and estimate the contour between and points (x1, y1) 152*a* and (x2, y2) 152*b*, to include a first straight line segment between the points (x1, y1) 152*a* and (x3, y3) 152*c* (as part of the line M1 154*a*) and a second straight line segment between the points (x3, y3) 152*c* and (x2, y2) 152*b* (as part of the line M2 154*b*). For example, the angle meter may measure as part of a horizontal plane and the lines M1 154*a* and M2 154*b* that represent vertical boundaries or walls. For example, lines M1 154*a* and M2 154*b* may represent walls in a room, allowing an angle meter located in the room to estimate the walls contour and location.

Figure 15A:
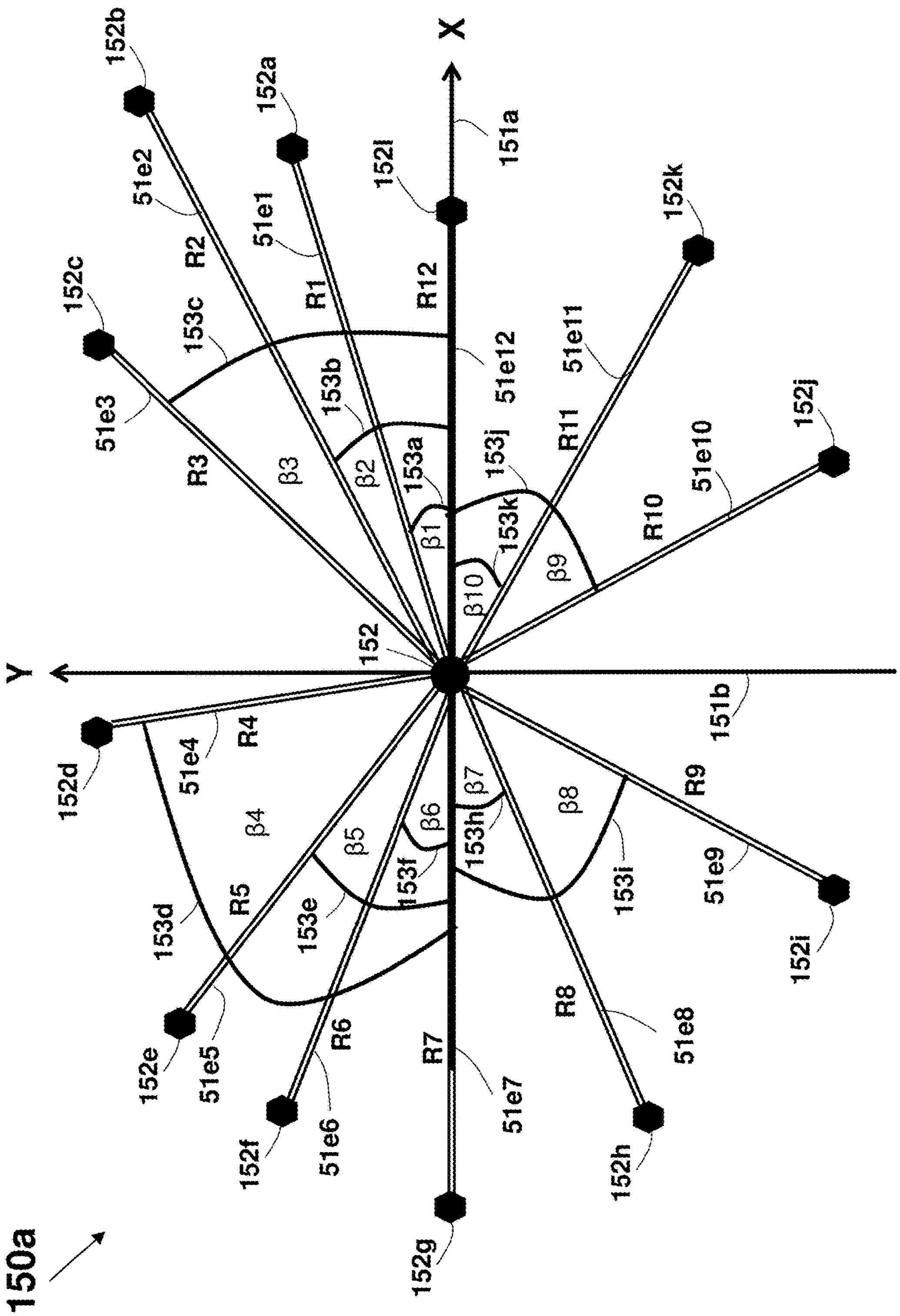
FIG. 15*a* illustrates an angle meter rotated for measuring distance and angle to multiple points.

While the arrangement 150 in FIG. 15 describes two measurements by an angle meter located at the origin point (0, 0) 152, wherein there is an angular deviation between the angle meter orientation, three or more measurements may be equally used. Further, multiple measurements may provide more information and may allow for better interpolation or extrapolation for estimating the surface, lines, or boundaries of an area, such as a room. For example, more than, or equal to, 3, 4, 5, 6, 7, 8, 10, 12, 15, 20, 30, 50, or 100 measurements may be performed, each in a different location or different angular deviation. In an examplary arrangement 150*a* shown in FIG. 15*a*, 12 distinct measurements are performed. The first measurement is along a measurement line 51*e*1, having an angular deviation of the angle β1 153*a* (relative to the 'X' axis 151*a*), where the distance R1 is measured to the point 152*a*, the second measurement is along the measurement line 51*e*2, having the angular deviation of the angle β2 153*b* (relative to the 'X' axis 151*a*), where the distance R2 is measured to the point 152*b*, and a third measurement is along a measurement line 51*e*3, having an angular deviation of an angle β3 153*c* (relative to the 'X' axis 151*a*), where a distance R3 is measured to a point 152*c*. Similarly, a fourth measurement is along a measurement line 51*e*4, having an angular deviation of an angle β4 153*d* (relative to negative side direction of the 'X' axis 151*a*), where a distance R4 is measured to a point 152*d*, a fifth measurement is along a measurement line 51*e*5, having an angular deviation of an angle β5 153*e* (relative to negative side direction of the 'X' axis 151*a*), where a distance R5 is measured to a point 152*e*, a sixth measurement is along a measurement line 51*e*6, having an angular deviation of an angle β6 153*f* (relative to negative side direction of the 'X' axis 151*a*), where a distance R6 is measured to a point 152*f*, and a seventh measurement is along a measurement line 51*e*7, having an angular deviation of 0° (relative to negative side direction of the 'X' axis 151*a*), where a distance R7 is measured to a point 152*g*. Further, an eighth measurement is along a measurement line 51*e*8, having an angular deviation of an angle β7 153*h* (a negative angle relative to negative side direction of the 'X' axis 151*a*), where a distance R8 is measured to a point 152*h*, and a ninth measurement is along a measurement line 51*e*9, having an angular deviation of an angle β8 153*i* (a negative angle relative to negative side direction of the 'X' axis 151*a*), where a distance R9 is measured to a point 152*i*. Similarly, a tenth measurement is performed along a measurement line 51*e*10, having an angular deviation of an angle β9 153*j* (a negative angle relative to positive side direction of the 'X' axis 151*a*), where a distance R10 is measured to a point 152*j*, an eleventh measurement is performed along a measurement line 51*e*11, having an angular deviation of an angle β10 153*k* (a negative angle relative to positive side direction of the 'X' axis 151*a*), where a distance R11 is measured to a point 152*k*, and a twelfth measurement is performed along a measurement line 51*e*11, having an angular deviation of 0° (relative to positive side direction of the 'X' axis 151*a*), where a distance R12 is measured to a point 152*l*.

Preferably, few of, or all of, the measured points 152*a* to 152*l* are part of, or are parallel to, a single plane, such as an horizontal or a vertical plane. Alternatively or in addition, part of, or all of, the measurement lines 51*e*1 to 51*e*12 are part of, or are parallel to, a single plane, such as an horizontal or a vertical plane. Practically, each one or more of the measurement lines 51*e*1 to 51*e*12 may angularly deviate from the single plane by less than, or above than, 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°. Similarly, the line from the origin point 152 to each one or more of the measured points 152*a* to 152*l* may angularly deviate from the single plane by less than, or above than, 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°. Further, the single plane may angularly deviate from being ideally horizontal or ideally vertical by less than, or above than, 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°.

Figure 15B:
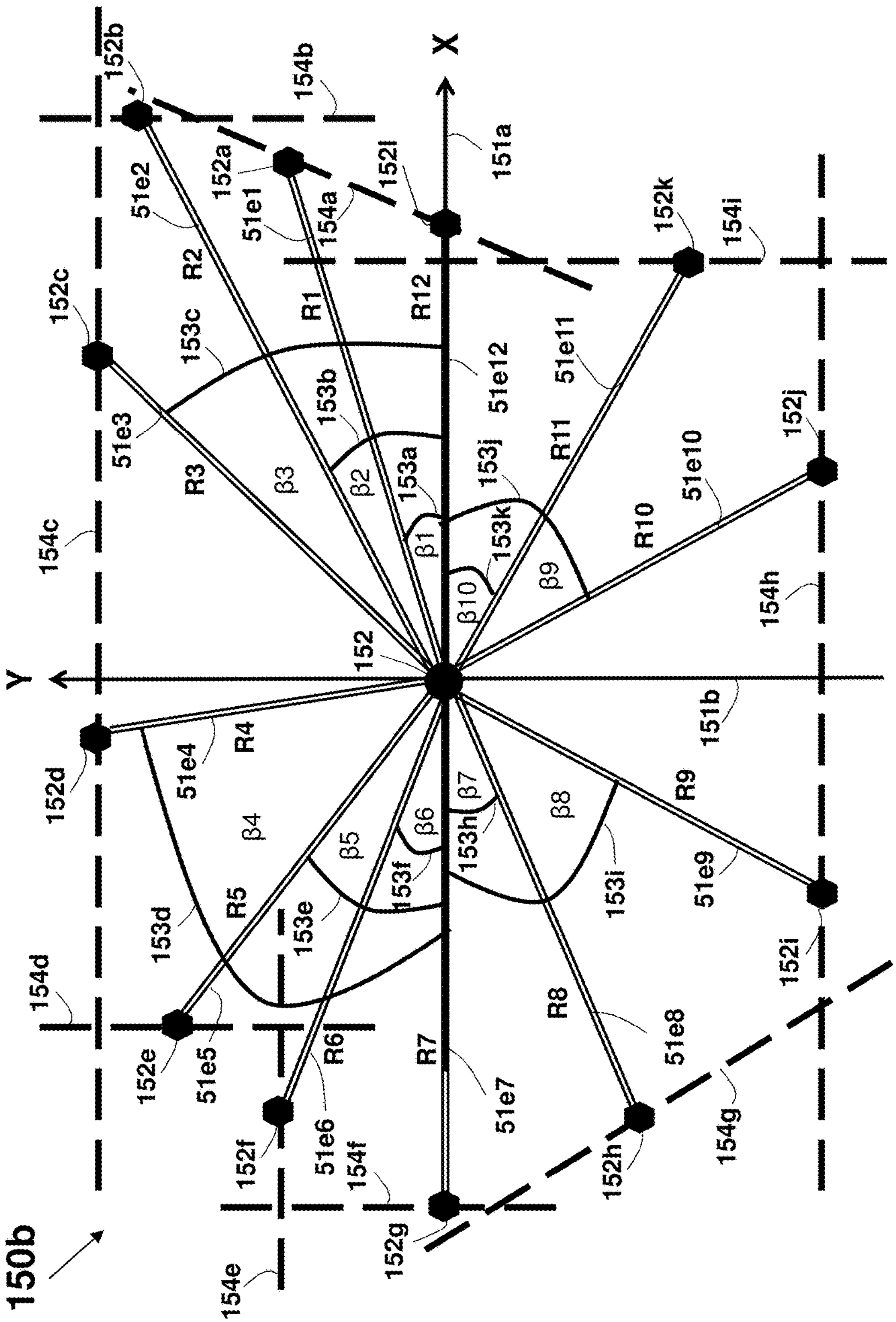
FIG. 15*b* illustrates an angle meter operative for estimating or calculating multiple lines based on measuring distance and angle to multiple points.

Each measured point may be associated with a corresponding line, such as the line M1 154*a* derived from the measured point 152*a* as exampled in the arrangement 150 shown in FIG. 15. The estimated or calculated lines are shown as part of an arrangement 150*b* shown in FIG. 15*b*. For example, a line 154*a* may be estimated or calculated based or, or derived from, the measurements associated with the points 152*l* and 152*a*, Similarly, a line 154*b* may be estimated or calculated based or, or derived from, the measurements associated with the point 152*b*, a line 154*c* may be estimated or calculated based or, or derived from, the measurements associated with the points 152*c* and 152*d*, a line 154*d* may be estimated or calculated based or, or derived from, the measurements associated with the point 152*e*, a line 154*e* may be estimated or calculated based or, or derived from, the measurements associated with the point 152*f*, a line 154*f* may be estimated or calculated based or, or derived from, the measurements associated with the point 152*g*, a line 154*g* may be estimated or calculated based or, or derived from, the measurements associated with the point 152*h*, a line 154*h* may be estimated or calculated based or, or derived from, the measurements associated with the points 152*i* and 154*j*, and a line 154*i* may be estimated or calculated based or, or derived from, the measurements associated with the point 152*k*.

Figure 15C:
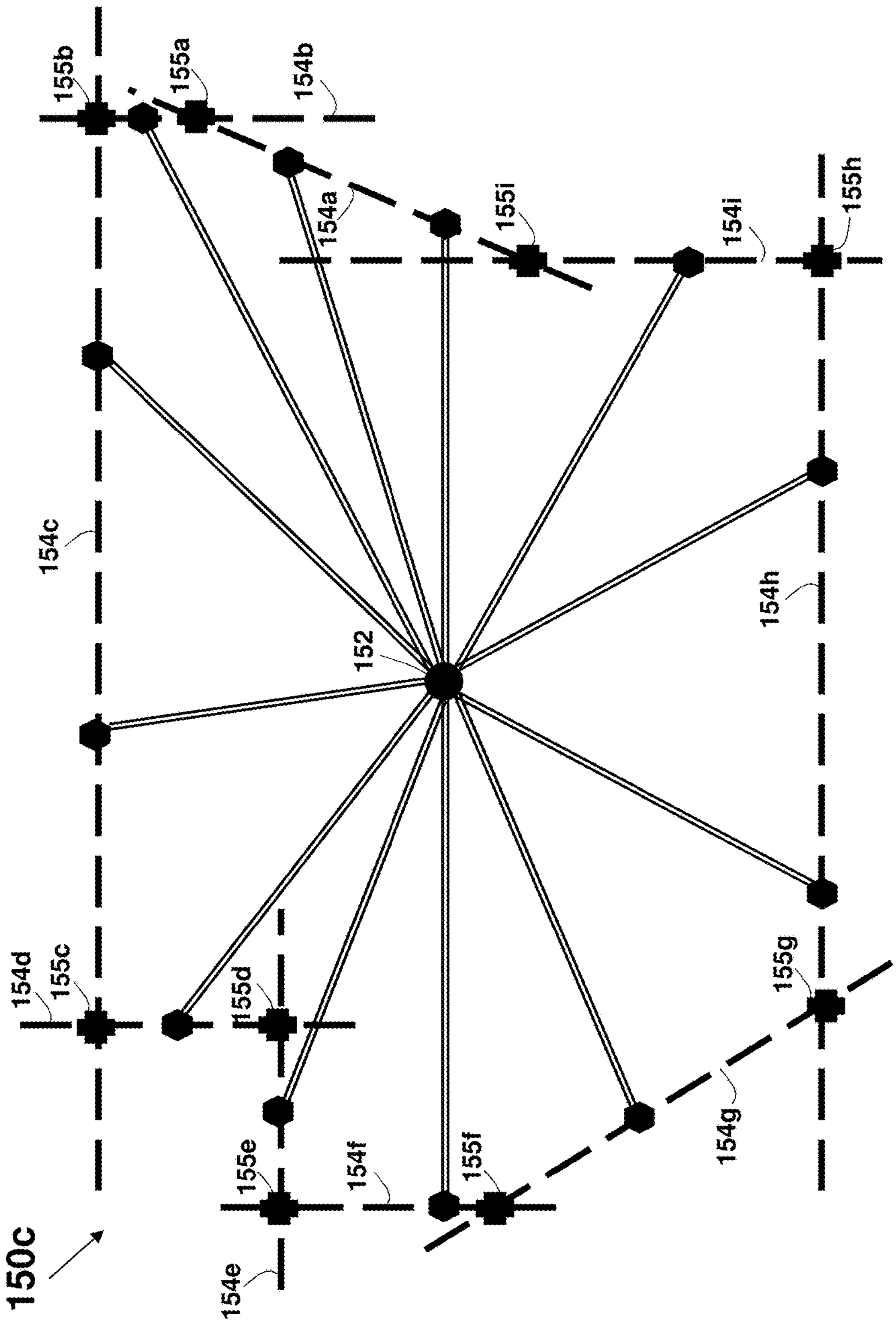
FIG. 15*c* illustrates an angle meter operative for estimating or calculating multiple intersection points of multiple lines that are based on measuring distance and angle to multiple points.
Figure 15D:
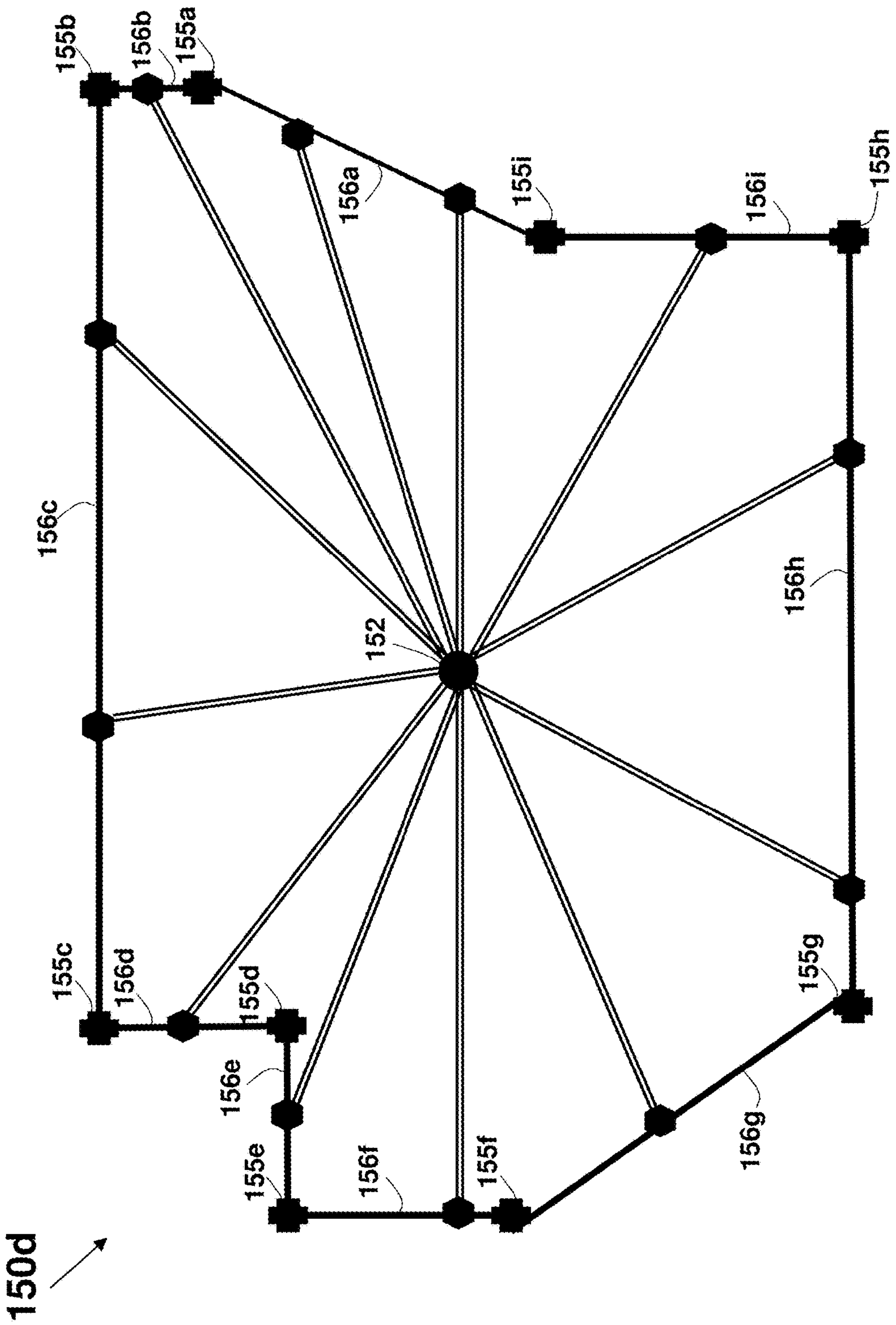
FIG. 15*d* illustrates an angle meter operative for estimating or calculating multiple line segments between intersection points of multiple lines that are based on measuring distance and angle to multiple points.

The intersection point of each two neighboring estimated or calculated derived lines may be calculated, such as the intersection point (x3, y3) 152*c* that was derived from the lines M1 154*a* and M2 154*b* as exampled in the arrangement 150 shown in FIG. 15. The derived or calculated intersection points are shown as part of an arrangement 150*c* shown in FIG. 15*c*. A first derived point 155*a* is estimated or calculated as formed at the intersection point of adjacent lines 154*a* and 154*b*, a second derived point 155*b* is estimated or calculated as formed at the intersection point of adjacent lines 154*b* and 154*c*, a third derived point 155*c* is estimated or calculated as formed at the intersection point of adjacent lines 154*c* and 154*d*, a fourth derived point 155*d* is estimated or calculated as formed at the intersection point of adjacent lines 154*d* and 154*e*, a fifth derived point 155*e* is estimated or calculated as formed at the intersection point of adjacent lines 154*e* and 154*f*, a sixth derived point 155*f* is estimated or calculated as formed at the intersection point of adjacent lines 154*f* and 154*g*, a seventh derived point 155*g* is estimated or calculated as formed at the intersection point of adjacent lines 154*g* and 154*h*, an eighth derived point 155*h* is estimated or calculated as formed at the intersection point of adjacent lines 154*h* and 154*i*, and a ninth derived point 155*i* is estimated or calculated as formed at the intersection point of adjacent lines 154*i* and 154*a*. Next, using interpolation as illustrated in an arrangement 150*d* shown in FIG. 15*d*, the derived points are determined as end-points to the estimated line segments. For example, the points 155*i* and 155*a* may serve as the end-points for the line segment 156*a*. Similarly, the derived points 155*a* and 155*b* may serve as the end-points for the line segment 156*b*, the derived points 155*b* and 155*c* may serve as the end-points for the line segment 156*c*, the derived points 155*c* and 155*d* may serve as the end-points for the line segment 156*d*, and so forth.

Figure 15E:
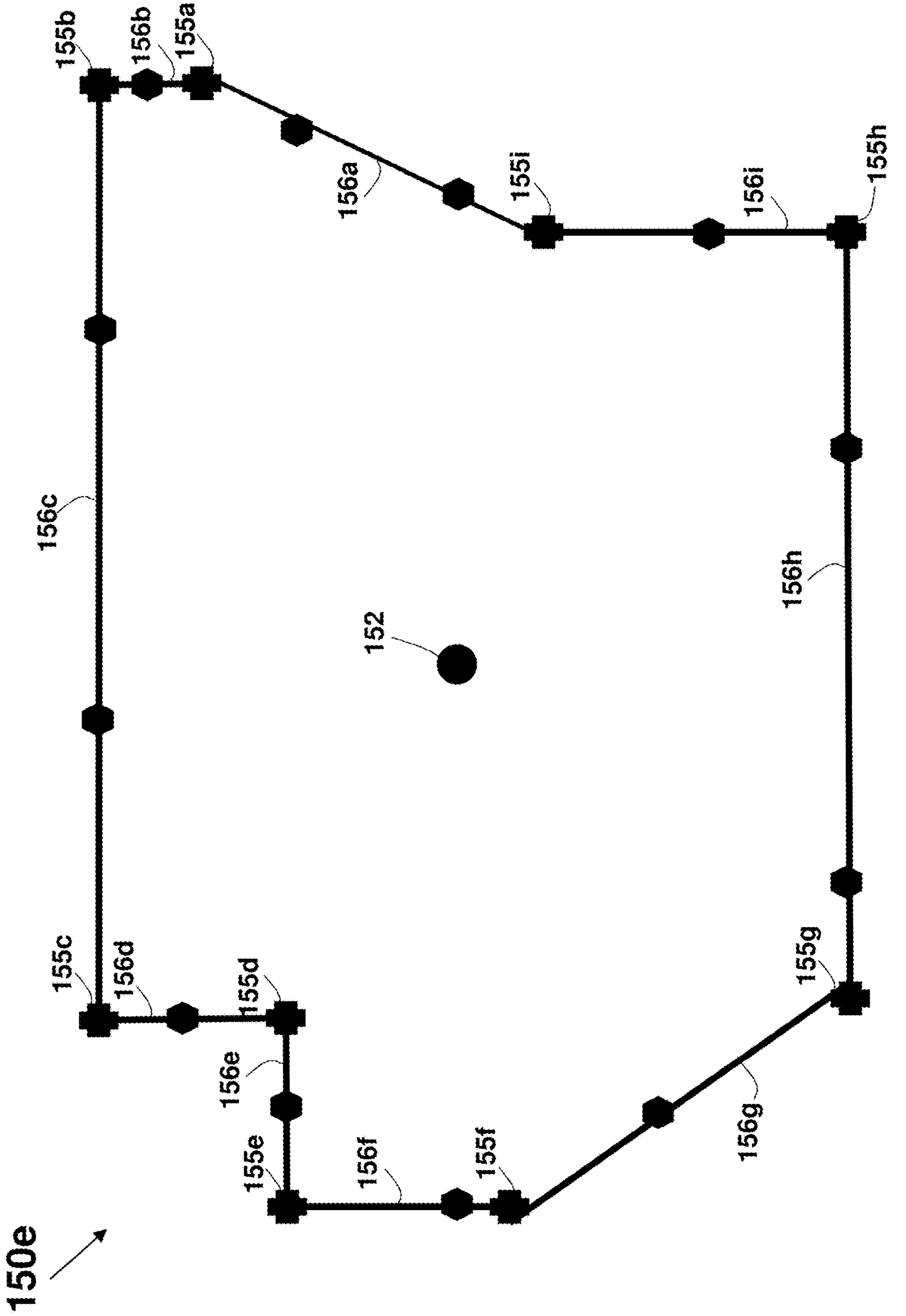
FIG. 15*e* illustrates an angle meter operative for estimating or calculating the contour of a perimeter using multiple line segments between intersection points of multiple lines that are based on measuring distance and angle to multiple points.

As illustrated in an arrangement 150*e* shown in FIG. 15*e*, the derived intersection points (155*a* to 155*i*), the estimated or calculated line segments connecting pairs or adjacently measured points (line segments 156*a* to 156*i*), or any combination thereof, may be used for estimating or evaluating the contour of the perimeter, or the surface or line shaping, surrounding the origin point 152. For example, the contour of walls of a room may be estimated by making the measurement from a single point inside the room.

The angular deviation between adjacent measurement pairs may be arbitrary, similar, or equal. For example, as shown in the arrangement 150*a* shown in FIG. 15*a*, the angular deviation between the measurement line 51*e*12 (to the point 152*l*) and the measurement line 51*e*1 (to the point 152*a*) is the angle β1 153*a*, which may be different, similar, or equal to the angle between the measurement line 51*e*2 (to the point 152*b*) and the measurement line 51*e*1 (to the point 152*a*) is the difference between angles β2 153*b* and the angle β1 153*a* (β2−β1). In one example, the angular differences between adjacent measurement line pairs are equal (or substantially equal). For example, in case of using 2 measurement lines, the angle between any adjacent measurement line pairs may be 120° (360°/3). Similarly, in case of using 4 measurement lines, the angle between any adjacent measurement line pairs may be 90° (360°/4), and in case of using 5 measurement lines, the angle between any adjacent measurement line pairs may be 72° (360°/5). In the general case, where N measurement lines, the angle between any adjacent measurement line pairs may be 360°/N. While exampled for 360°, less than 360° may be required to be covered or explored, such as 270°, 180°, or 90°. Practically, the actual angle between adjacent measurement line pair may deviate from the ideal 360°/N angle by less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°, or alternatively by less than 20%, 18%, 15%, 13%, 10%, 8%, 5%, 2%, 1%, 0.5%, or 0.2% of the ideal 360°/N angle.

Figure 16:
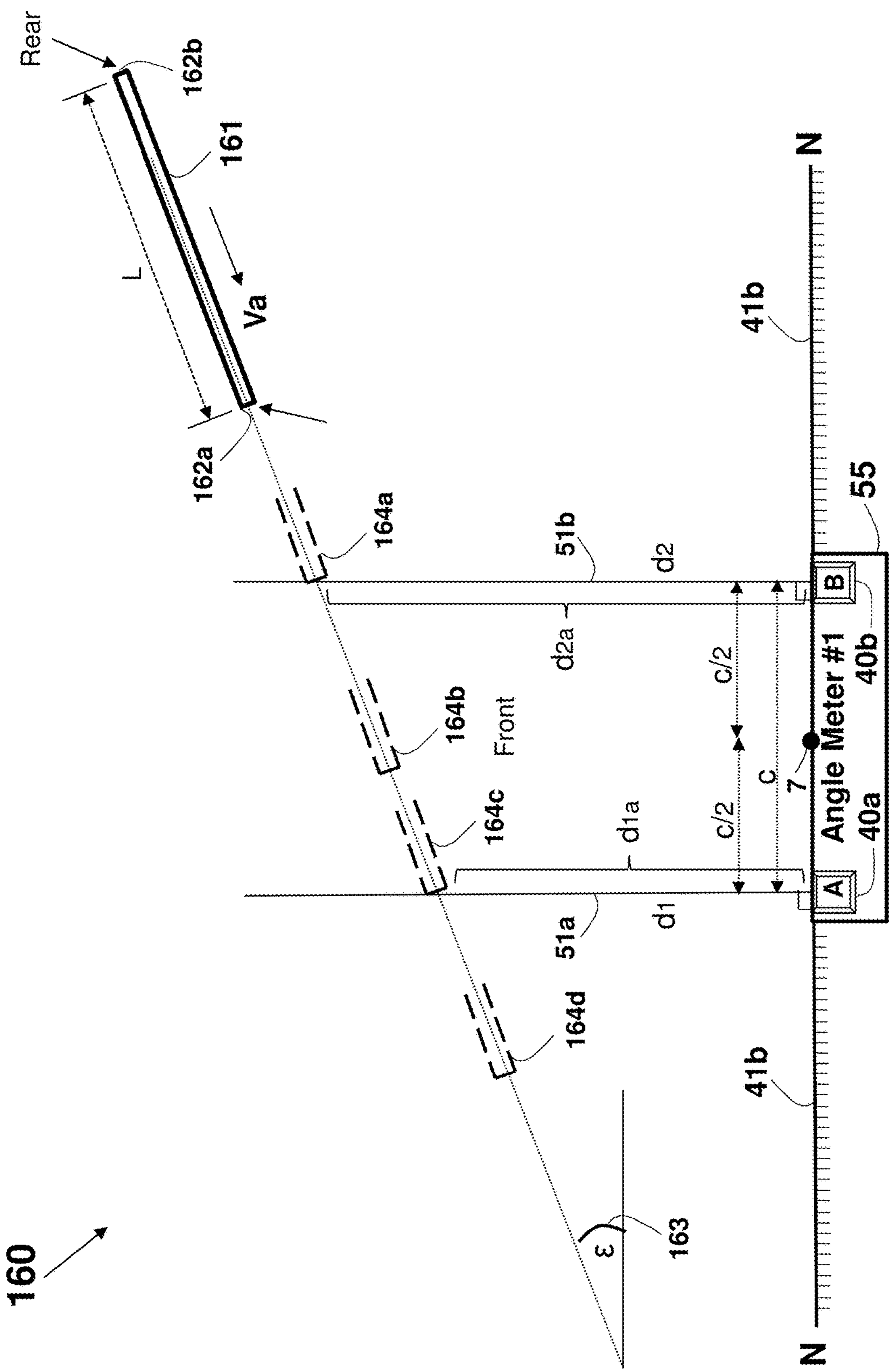
FIG. 16 depicts schematically measuring an angle to, and speed of, an elongated object by using an angle meter using two distinct distance meters functionalities.

Alternatively or in addition for measuring or estimating parameters, positions or other characteristics associated with stationary objects, such as points, lines, surfaces or planes, moving objects may be equally detected or measured. An arrangement 160 shown in FIG. 16 schematically illustrates the angle meter #1 55 that comprises the distance meter A 40*a* for measuring distance d1 along the line-of-sight 51*a* and the distance meter B 40*b* for measuring distance d2 along the line-of-sight 51*a*. The measurement lines 51*a* and 51*b* are perpendicular (normal) to, and are used for measuring distance from, the line reference N 41*b* (or plane). The distance lines 51*a* and 51*b* define a measurement plane, in which an object 161 is moving at a constant velocity Va in a direction that is tilted by an angle ε 163 from the measurement reference line (baseline) 41*b*. The object 161 is having, in the measurement plane cut, an elongated body along the movement direction having a length 'L' defining a front edge point (or surface) 162*a* and a rear edge point (or surface) 162*b*.

Before starting the measurement session, the object 161 is assumed to be located (in the measurement plane) outside the measuring lines 51*a* and 51*b*, and thus not sensed by the angle meter #1 55. At time point t1 169*a*, the front edge 162*a* of the object 161 is intercepting the distance meter B 40*b* measurement line 51*b* as shown by the dashed-line location 164*a*, and thus the distance d2a 168*b* is measured as the distance to the object 161. As the object 161 continues to move, it arrives to a location 164*b* and then to a location 164*c* at a time point t2 169*b*, in which it reaches the measurement line 51*a* and thus is sensed by the distance meter A 40*a*, resulting a measured distance of d1a 168*a*. The continued motion of the object 161 causes it to arrive later to a location 164*d* along the motion direction. At a time point t3 169*c* the rear edge 162*b* reaches the measurement line 51*b*, and at a time point t4 169*d* the rear edge 162*b* reaches the measurement line 51*a*, after which the object 161 is no longer sensed by the angle meter #1 55.

Figure 16A:
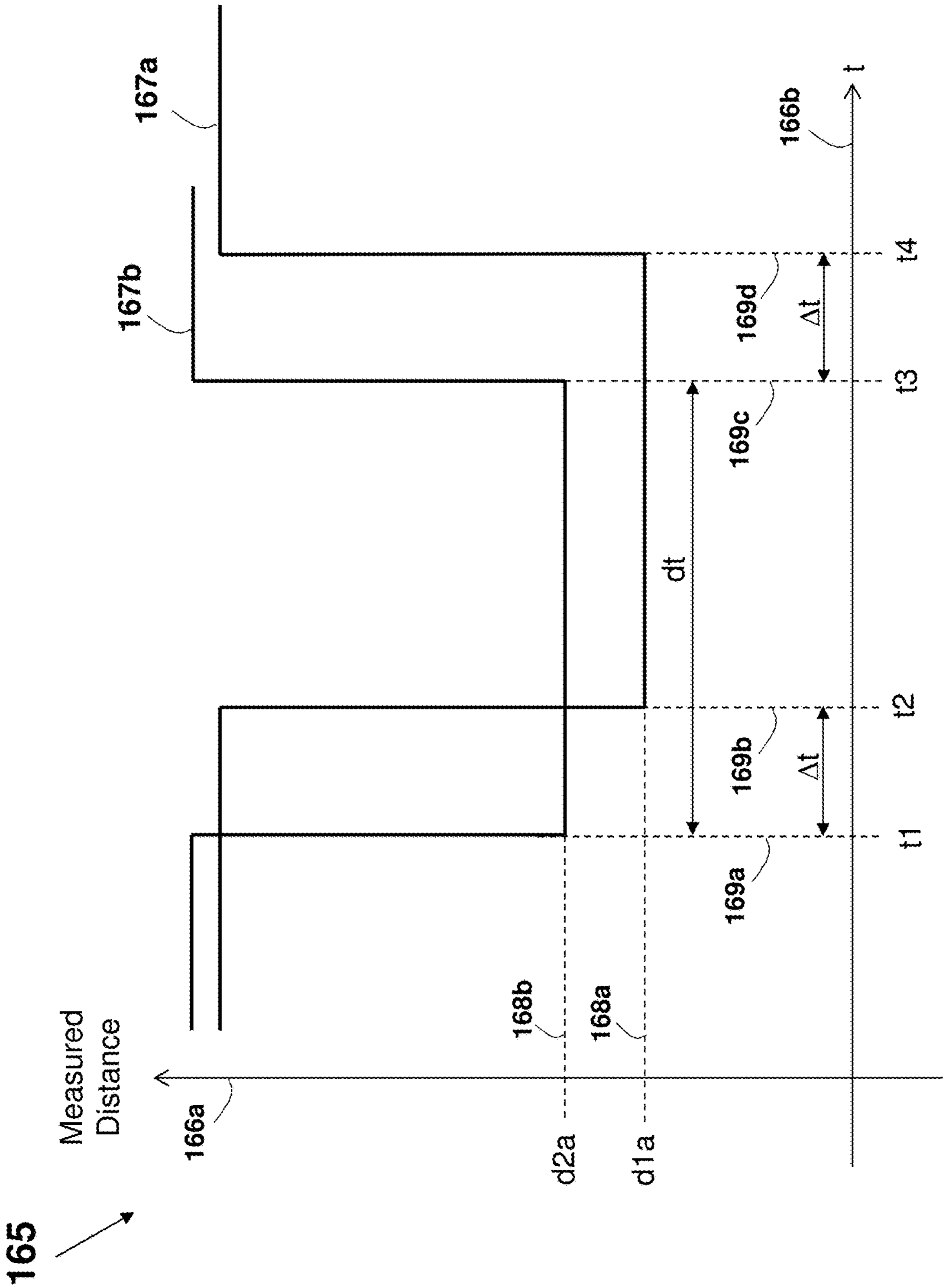
FIG. 16*a* depicts schematically a timing chart of the distance meters outputs of a moving elongated object by using an angle meter having two distinct distance meters functionalities.

A chart 165 shown in FIG. 16*a* illustrates the distances in a vertical axis 166*a* measured by the distance meters A 40*a* and B 40*b* along the time (t) horizontal axis 166*b*. The meters are operated continuously during the object 161 sensing, and the distance measured by the distance meter A 40*a* is shown in a graph 167*a*, while the distance measured by the distance meter B 40*b* is shown in a graph 167*b*. Before the time point t1 169*a* the object 161 is not sensed by the angle meter #1 55, and the distance measured is either a background object or the maximum possible measured length by the distance meters A 40*a* and B 40*b*. At the time point t1 169*a* the distance d2a 168*b* to the front end 162*a* is measured by the distance meter B 40*b*, and at the time point t2 169*b* the distance d1a 168*a* to the front end 162*a* is measured by the distance meter A 40*a*. Similarly, at the time point t3 169*c* the distance d2a 168*b* to the rear end 162*b* is measured by the distance meter B 40*b*, and at the time point t4 169*d* the distance d1a 168*a* to the rear end 162*b* is measured by the distance meter A 40*a*.

As described above, the angle ε 163 may be calculated as c=arctan((d2a−d1a)/c). The time difference Δt=t2−t1 may be used to calculate the length (dist) of the travel of the object between the time point t1 169*a* and the time point t2 169*b* according to dist=c/cos(c)=c/(cos(arctan((d2a−d1a)/c))). The average velocity of the object 161 (during the time period from t1 169*a* to *t*2 169*b*) may be calculated as Va=dist/Δt=c/[cos(arctan((d2a−d1a)/c))*(t2−t1)]. The length (L) of the object 161 may be calculated using the time the object is sensed by one of the distance meters, such as by the distance meter B 40*b*, where the sensing time is dt=t3−t1, and the length may be calculated as L=Va*dt/cos(c)=c*dt/(Δt*$\cos^2$(ε)). Similarly, the distance until the object 161 front end 162*a* reaches the reference line (or plane) N 41*b* may be calculated as d1a/cos(ε), and the time until such reaching may be calculated as d1a/(Va*cos(ε)).

The angle meter #1 55 usage illustrated in the arrangement 160 may be used with for traffic management, for example, where the object 161 is a land vehicle, and the arrangement allows for estimating the vehicle direction of moving, the vehicle location or distance, and the vehicle velocity in the direction of movement. For example, the angle meter 55 may be located so that the measuring plane is horizontal or substantially horizontal near a road or highway in order to accurately estimate the vehicles speed or direction. Such an arrangement may allow for easy and optimal traffic flow control, in particular in the case of specific situations such as hot pursuits and bad weather. The traffic management may be in the form of variable speed limits, adaptable traffic lights, traffic intersection control, and accommodating emergency vehicles such as ambulances, fire trucks and police cars. The arrangement may further be used to assist the drivers, such as helping with parking a vehicle, cruise control, lane keeping, and road sign recognition. Similarly, better policing and enforcement may be obtained by using the system for surveillance, speed limit warning, restricted entries, and pull-over commands. Further, the scheme may further be used for navigation and route optimization, as well as providing travel-related information such as maps, business location, gas stations, and car service locations.

Figure 17:
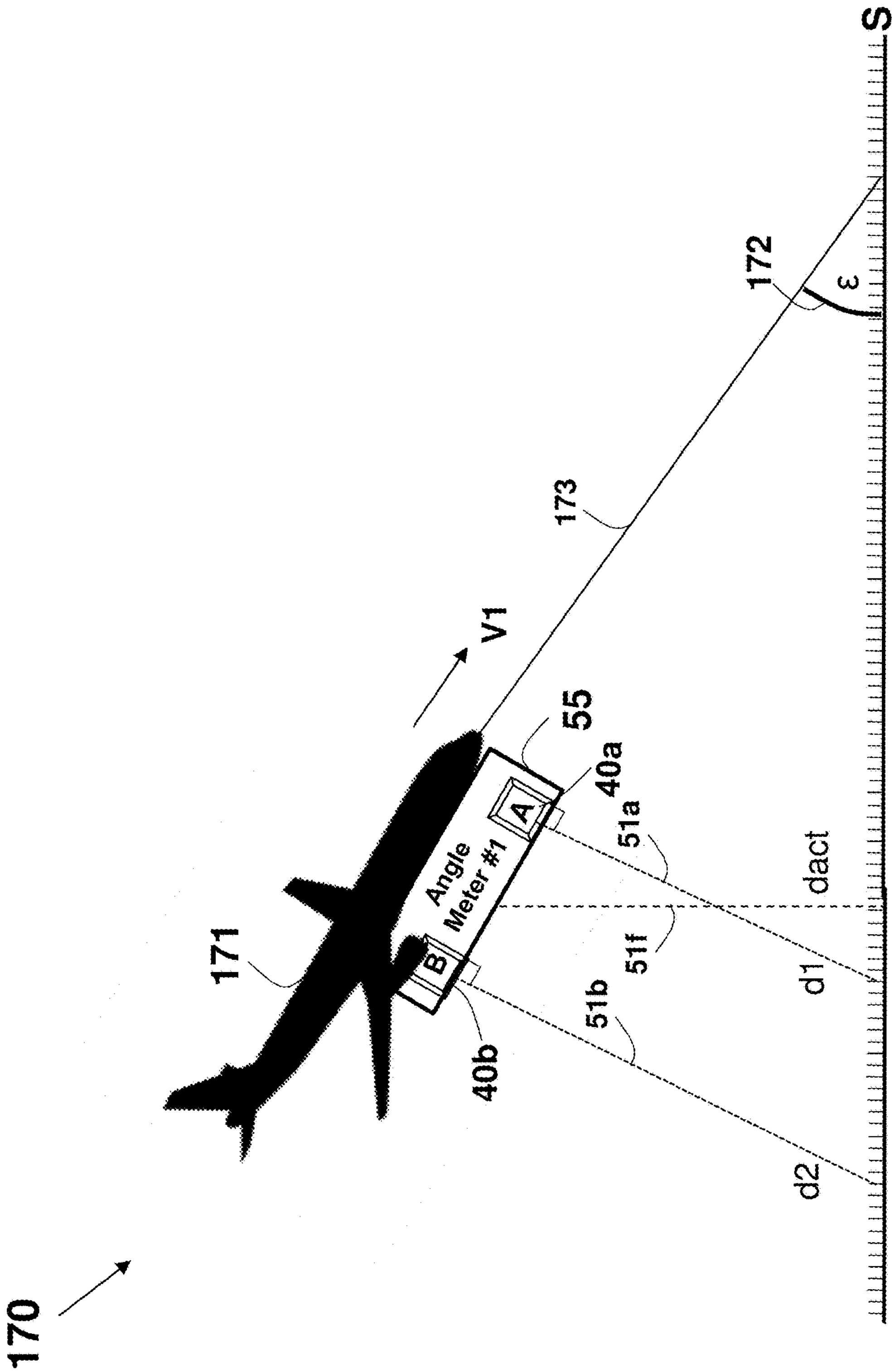
FIG. 17 depicts schematically measuring a pitch angle of an aircraft by using an angle meter using two distinct distance meters functionalities.

Alternatively or in addition, the angle meter #1 55 may be used vertically, such as an alternative to an inclinometer. An exemplary arrangement 170 shown in FIG. 17 illustrates an airplane having the angle meter #1 55 mounted therein so that the measuring lines 51*a* and 51*b* are perpendicular to the aircraft 171 direction at the formed measurement plane by the angle meter #1 55. The aircraft 171 is moving at a speed V1 in the direction 173 having a pitch angle ε 172. The actual height can be calculated as dact 51*f* where dact=d1*cos(ε) (or dav*cos(ε)), and the pitch angle ε 172 may be calculated according to ε=arctan((d2−d1)/c). Similarly, the angle meter 55 may be mounted such that the two measuring beams 51*a* and 51*b* are forming a measurement plane that is perpendicular to the aircraft 171 movement, such as locating the distance meters each under one of the wings of the aircraft 171, thus allowing for measuring the roll (in additional to the altitude) of the aircraft 171.

Figure 18:
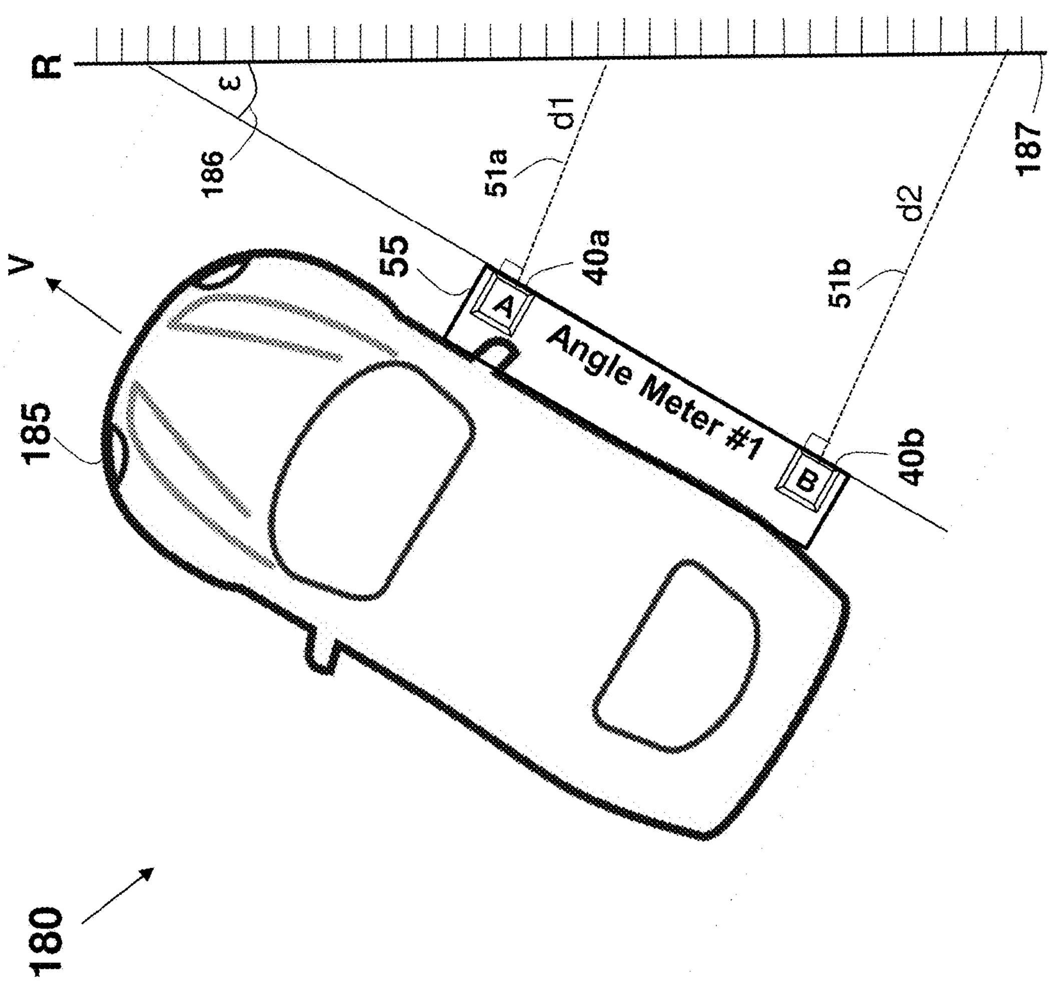
FIG. 18 depicts schematically measuring an angle to a vertical surface of a land vehicle by using an angle meter using two distinct distance meters functionalities.

Similarly, the angle meter #1 55 may be mounted or installed in a land vehicle, such as the automobile 185 shown in an arrangement 180 in FIG. 18, for sensing the angle and distance to a side surface, such as a wall or any vertical surface. The angle meter 55 is installed or mounted in the land vehicle 185 so that the measurement plane is horizontal (or substantially horizontal), and the measuring lines 51*a* and 51*b* are perpendicular to the vehicle 185 normal forward progress direction at a speed V. The vehicle 185 motion direction creates an angle ε 186 with a line R (or a surface, such as a wall) 187 in the measurement plane. Similar to above example, the angle ε 186 may be calculated according to ε=arctan((d2−d1)/c), the distance to the line R 187 may be calculated according to dact=d1*cos(ε), and the time to collision (assuming the vehicle 185 maintains the same speed and direction) may be calculated according to d1/(V*cos(ε)).

Figure 18A:
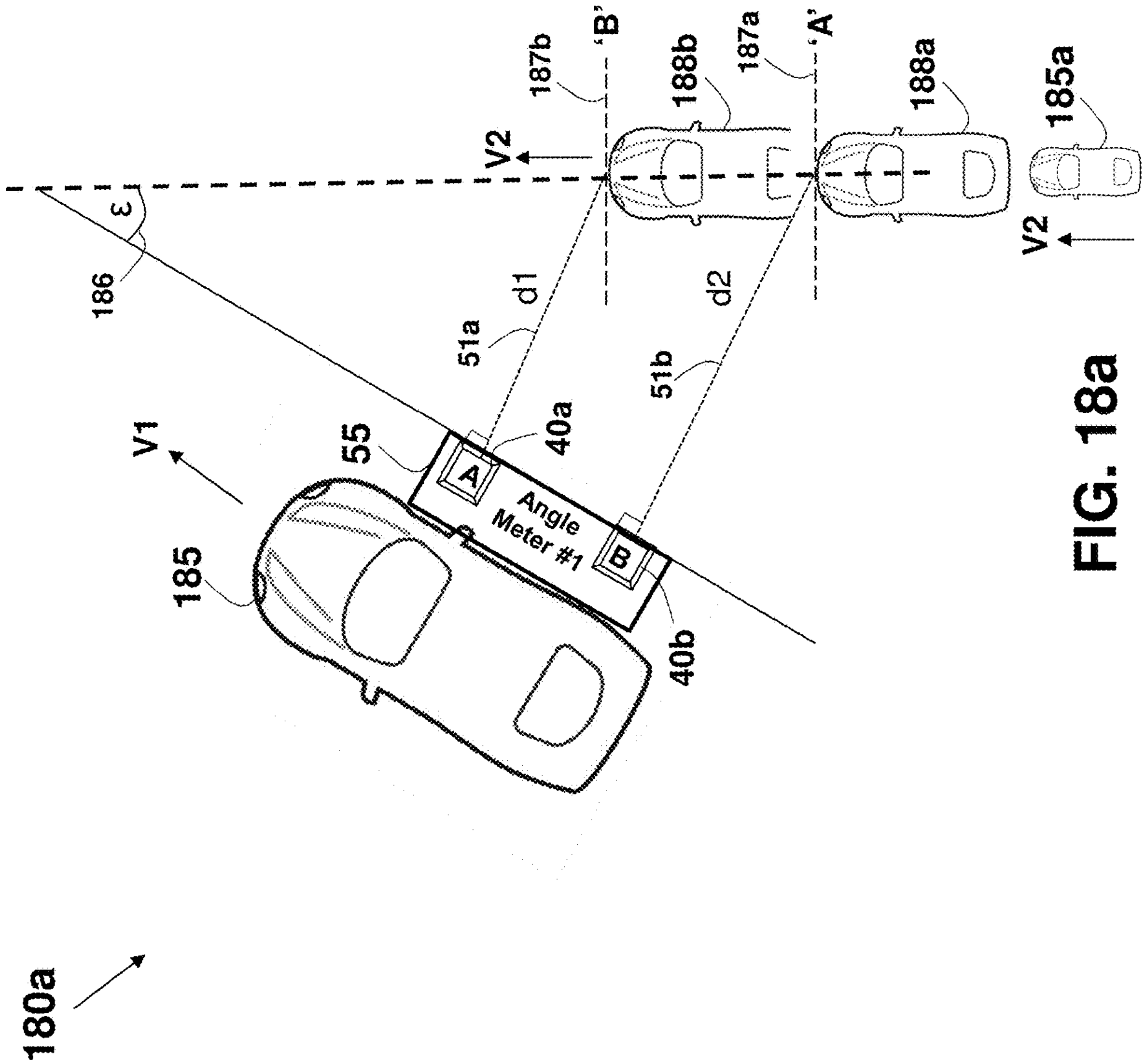
FIG. 18*a* depicts schematically measuring by a land vehicle of an angle to, and a speed of, another land vehicle by using an angle meter using two distinct distance meters functionalities.

While the arrangement 160-180 above described measuring an angle between a moving object and a stationary object, the method and apparatus described herein may be equally used for measuring angles between two moving objects. Such an example is shown in an arrangement 180*a* in FIG. 18*a*, illustrating a vehicle 185 moving forward (in straight line) in a known speed V1 and including the angle meter #1 55, where the measuring lines 51*a* and 51*b* are perpendicular to the vehicle 185 moving direction and define a horizontal plane. Another vehicle 185*a* is moving in straight line at a speed of V2 (which may be unknown) at a direction that form an angle ε 186 with the vehicle 185 direction of motion. At time point t1 the vehicle 185 is at a location 188*a* where the vehicle 185 front end is at a point 'A' 187*a* and intercepts with the measurement line 51*b* at distance d2, and later at a time point t2 the vehicle 185*a* is at a location 188*b* where the vehicle 185*a* front end is at a point 'B' 187*a* and intercepts with the measurement line 51*a* at distance d1. During the time difference Δt=t2−t1 the vehicle 185 has traveled a distance of V1*Δt, and the spatial distance between the two measurement lines 51*a* and 51*b*, taking into account the vehicle 185 moving, is c+V1*Δt. Hence, the angle ε 186 may be calculated according to tan(ε)=(d2−d1)/(c+V1*Δt). During the time difference Δt=t2−t1 the second vehicle 185*a* has traveled a distance of V2*Δt, thus the second vehicle speed may be calculated according to: V2=(d2−d1)/(Δt*sin(ε)) or according to V2=(c+V1*Δt)/(Δt*cos(ε)).

In the arrangement 180*a* shown in FIG. 18*a*, the velocity of the vehicle 185*a* was estimated using the time period between the vehicle 185*a* being detected by the distance meter 'B' 40*b* (at the location 188*a*) and being detected by the distance meter 'A' 40*a* (at the location 188*b*). Alternatively or in addition, the Doppler-effect may be used to estimate or calculate a speed of an object such as the speed of the vehicle 185*a*. The Doppler-effect causes the frequency of the reflected waves 16*b* detected by the sensor 13 to be shifted from the frequency of the transmitted waves 16*a* emitted by the emitter 11. This frequency change (Doppler-shift) may be used for estimating or calculating the reflecting object speed at the direction of the propagating waves 16*a* and 16*b*.

Figure 19:
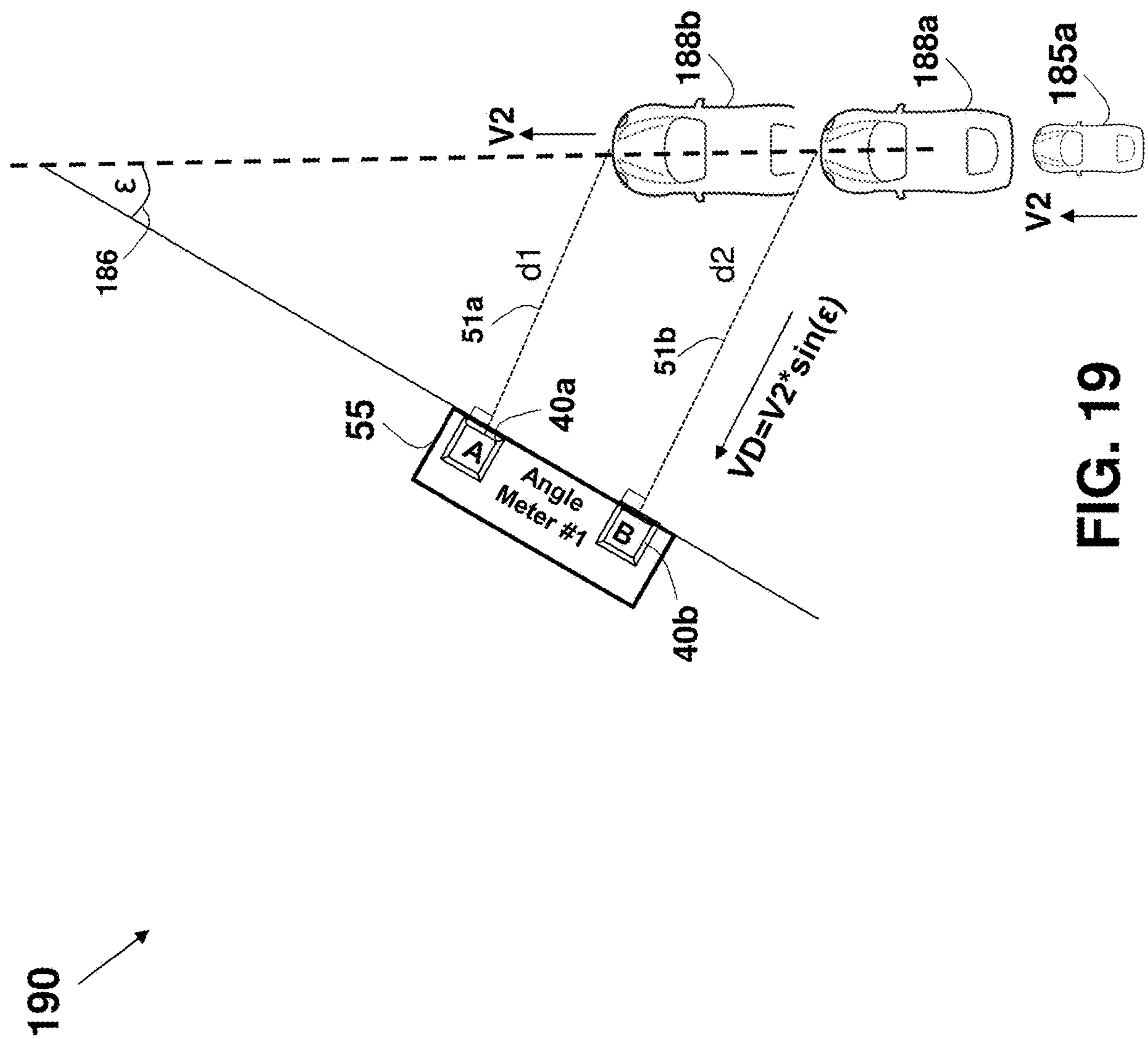
FIG. 19 depicts schematically measuring of an angle to, and a speed of, a land vehicle by using an angle meter using two distinct distance meters functionalities.

In an arrangement 190 shown in FIG. 19, the angle meter #1 55 is stationary and detects the vehicle 185 as an object having a speed of V2. The distance meter 'B' 40*b* (as well as the distance meter 'A' 40*a*) may measure the respective speed component VD of the vehicle 185*a* along the measurement line 51*b*, which is VD=V2*sin(ε). The angle ε 186 may be measured as described above to be ε=arctan((d2−d1)/c), and hence the vehicle 185*a* speed V2 may be calculated as V2=VD/sin(ε)=VD/sin(arctan((d2−d1)/c)).

The velocity of an object may be calculated based on the distance measurement to the object (such as to an object surface). For example, the change in the distance to the object may be used to calculate or estimate the object speed. Alternatively or in addition, as described in the arrangement 160 and the corresponding time chart 165, as well as in the arrangement 180*a*, a detection of the object by the distance meters 'A' 40*a* and 'B' 40*b* may be used to estimate or calculate the object speed or a component thereof. In the above examples, the length of the time interval between the detections of the object (such as the elongated object 161 or the land vehicle 185*a*) may be used for estimating or calculating the object velocity.

Figure 19A:
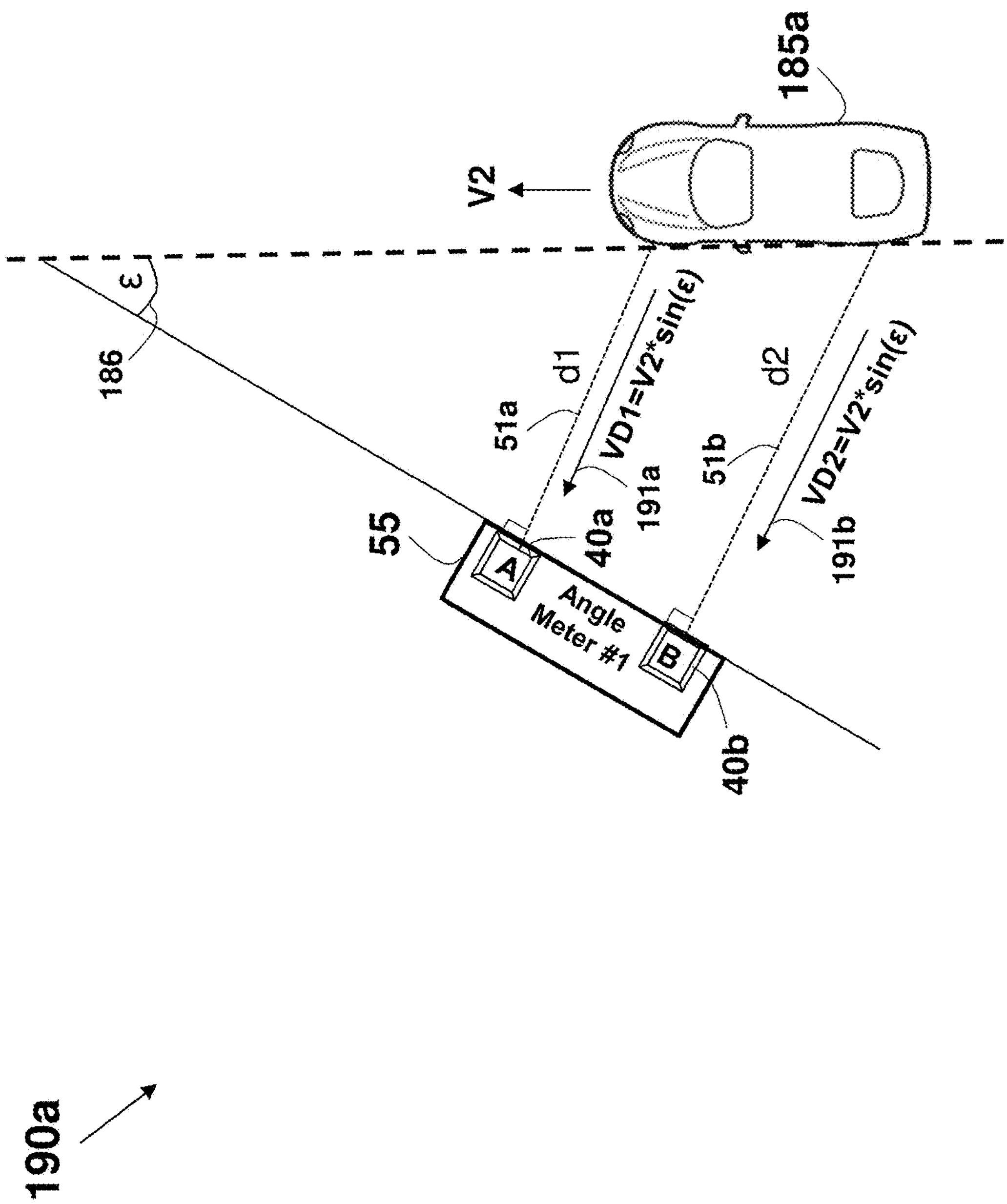
FIG. 19*a* depicts schematically measuring of an angle to, and a speed of, a land vehicle by using an angle meter using two distinct distance meters functionalities and based on measuring the Doppler effect.

Alternatively or in addition, the Doppler-effect may be used to estimate or calculate an object speed, as illustrated in an arrangement 190*a* shown in FIG. 19*a*. In addition to the distance metering functionality of the distance meter 'B' 40*b*, a frequency shift functionality is added (either integrated with the distance meter 'B' 40*b* functionality or as a separated functionality connected or coupled to the distance meter 'B' 40*b* functionality), for measuring the difference between the transmitted (carrier or center) frequency of the emitted wave 16*a* by the emitter 11 of the distance meter 'B' 40*b* and the (carrier or center) frequency of the reflected wave 16*b* received by the sensor 13 of the distance meter 'B' 40*b*. For example, the angle meter 55 shown in the arrangement 190*a* may consist of, or may comprise, the angle meter 55*k* shown in FIG. 9, the angle meter 55*l* shown in FIG. 9*a*, the angle meter 55*m* shown in FIG. 9*b*, or the angle meter 55*n* shown in FIG. 9*c*. A frequency shift (Doppler shift) may be used for calculating the component of the velocity of the reflecting object along the distance measuring line 51*b*, designated as VD2 191*b*, where VD2=V2*sin(ε). The angle ε 186 may be estimated or calculated as described herein, and thus the actual velocity V2 of the vehicle 185*a* may be estimated or calculated as V2=VD2/sin(ε). Alternatively or in addition, the frequency shift may be integrated with, or may use the functionality of the distance meter 'A' 40*a*, and a frequency shift (Doppler shift) may be used for calculating the component of the velocity of the reflecting object along the distance measuring line 51*a*, designated as VD1 191*a*, where VD21=V2*sin(ε). In such a scheme, the actual velocity V2 of the vehicle 185*a* may be estimated or calculated as V2=VD1/sin(ε). In order to improve the measurement accuracy, the Doppler frequency shift may be measured along both measurement lines 51*a* and 51*b*, using two distinct frequency shift metering functionalities (or a single functionality serving both measurements), and using the average for better estimating the velocity component VD by VD=(VD1+VD2)/2, and estimating or calculating the actual velocity V2 of the vehicle 185*a* as V2=VD/sin(ε)=(VD1+VD2)/(2*sin(ε)). Alternatively or in addition, the estimated velocity may be based on averaging the estimating velocity based on using the Doppler-shift together with the above described method based on measuring the time different between distance-measuring based object detecting by the two distance meters 'A' 40*a* and 'B' 40*b*. While using the Doppler-effect was explained regarding measuring the speed of the land vehicle 185*a* as part of the arrangement 190*a*, the Doppler-effect may be equally used, individually or with the described scheme, to measure the elongated element 161 speed Va shown as part of the arrangement 160 in FIG. 16, the aircraft 171 speed V1 shown as part of the arrangement 170 in FIG. 17, the land vehicle 185 speed V shown as part of the arrangement 180 in FIG. 18, or the land vehicle 185 speed V1 and the other land vehicle 185*a* speed V2 shown as part of the arrangement 180*a* in FIG. 18*a*.

Figure 19B:
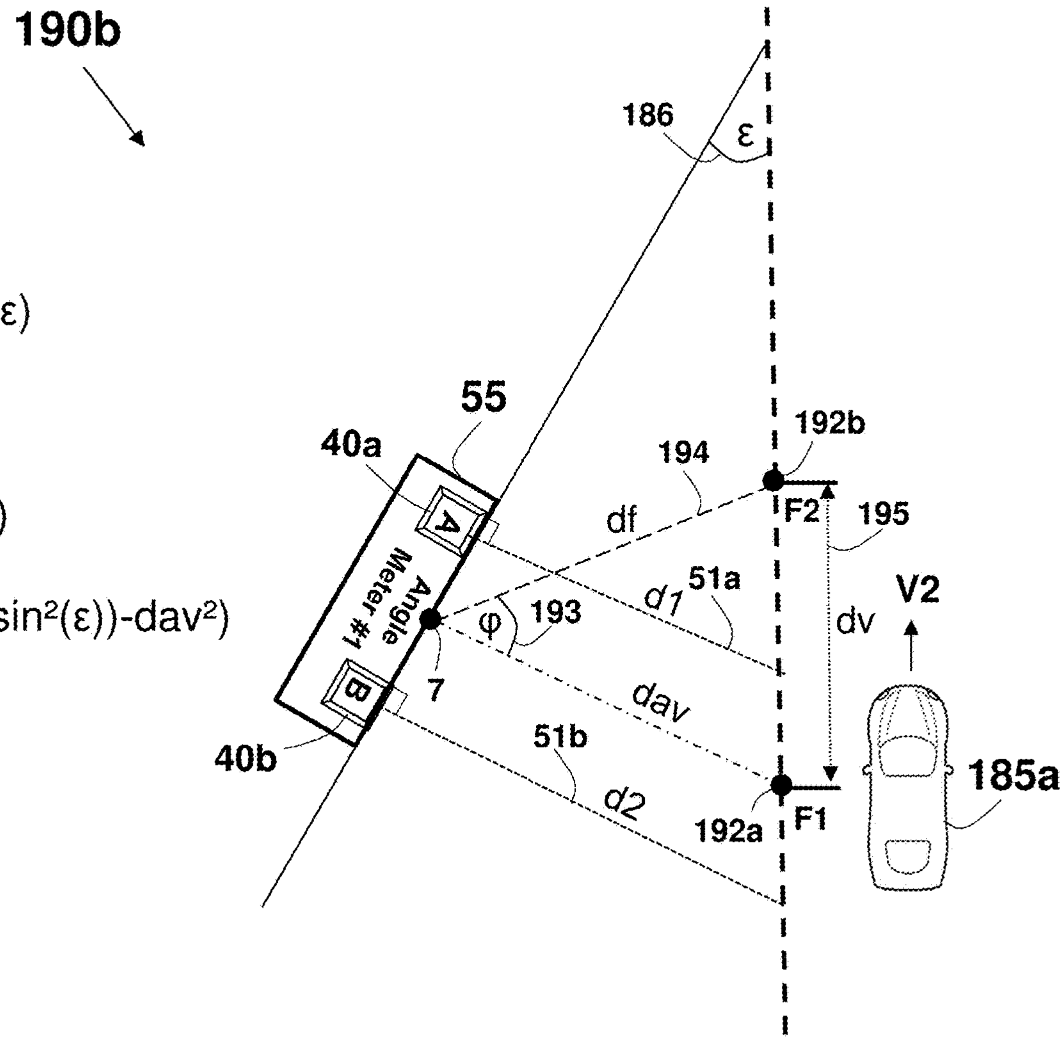
FIG. 19*b* depicts schematically measuring of an angle to, and a speed of, a future point of a moving land vehicle by using an angle meter.

By estimating or calculating the distance, the angle, and the speed of an object, and assuming an object continues in the same direction and in a constant speed, a future point of the object may be estimated or calculated. In an arrangement 190*b* shown in FIG. 19*b*, corresponding to the arrangement 190*a* shown in FIG. 19*a*, the land vehicle 185*a* that was detected when it was in a point F1 192*a*, continues for a time period Δt in the same direction and speed and thus reaching a point F2 192*b*. The distance traveled by the vehicle 185*a* during this time Δt is designated as distance dv 195, where dv=v2*Δt. The new location point F2 192*b* is at a distance of df 194 from the angle meter 55 center point 7, and a formed angle at the angle meter 55 from the measured point F1 192*a* to the arriving location F2 192*b* is an angle φ 193. By analyzing the triangle formed by the points F1 192*a*, F2 192*b*, and the center point 7, the formed distance df 194 and the formed angle φ 193 may be calculated using the extracted parameters of the vehicle 185*a* measured when the vehicle 185*a* was in the point F1 192*a*, such as the vehicle

185*a* speed V2 at the direction defined by the angle ε 186, and the distance dav measured by the angle meter 55 between the center point 7 and the point F1 192*a*.

By using the cosine formula, the distance df 194 may be calculated based on $df^2=dv^2+dav^2-2*dv*dav*\sin(\varepsilon)$, where $dav=1/2*(d1+d2)$, and hence $df=\text{sqrt}(dv^2+dav^2-2*df*dav*\sin(\varepsilon))$. By using the sine formula, the angle φ 193 may be calculated according to, or based on, $\sin(\varphi)=dv*\cos(\varepsilon)/df$, hence $\varphi=\arcsin(dv*\cos(\varepsilon)/df)$. It is noted that the vehicle 185*a* is at the closest point to the angle meter 55 when df=dact, and in this point φ=ε. In one example, it may be required to estimate the time Δt when the vehicle 185*a* reaches the point F2 192*b* as defined by the distance df 194 or by the angle φ 193. The distance dv 195 may be calculated or estimated according to $dv=2*df^2*\sin^2(\varepsilon)+\text{sqrt}(df^2*(1+\sin^2(\varepsilon))-dav^2)$, and since $dv=\Delta t*V2$, then $\Delta t=[2*df^2*\sin^2(\varepsilon)+\text{sqrt}(df^2*(1+\sin^2(\varepsilon))-dav^2)]/V2$. Further, by using the sine formula it can be shown that $dv=dav*\sin(\varphi)/\cos(\varphi-\varepsilon)$, and since $dv=\Delta t*V2$, then $\Delta t=dav*\sin(\varphi)/(V2*\cos(\varphi-\varepsilon))$.

Figure 19C:
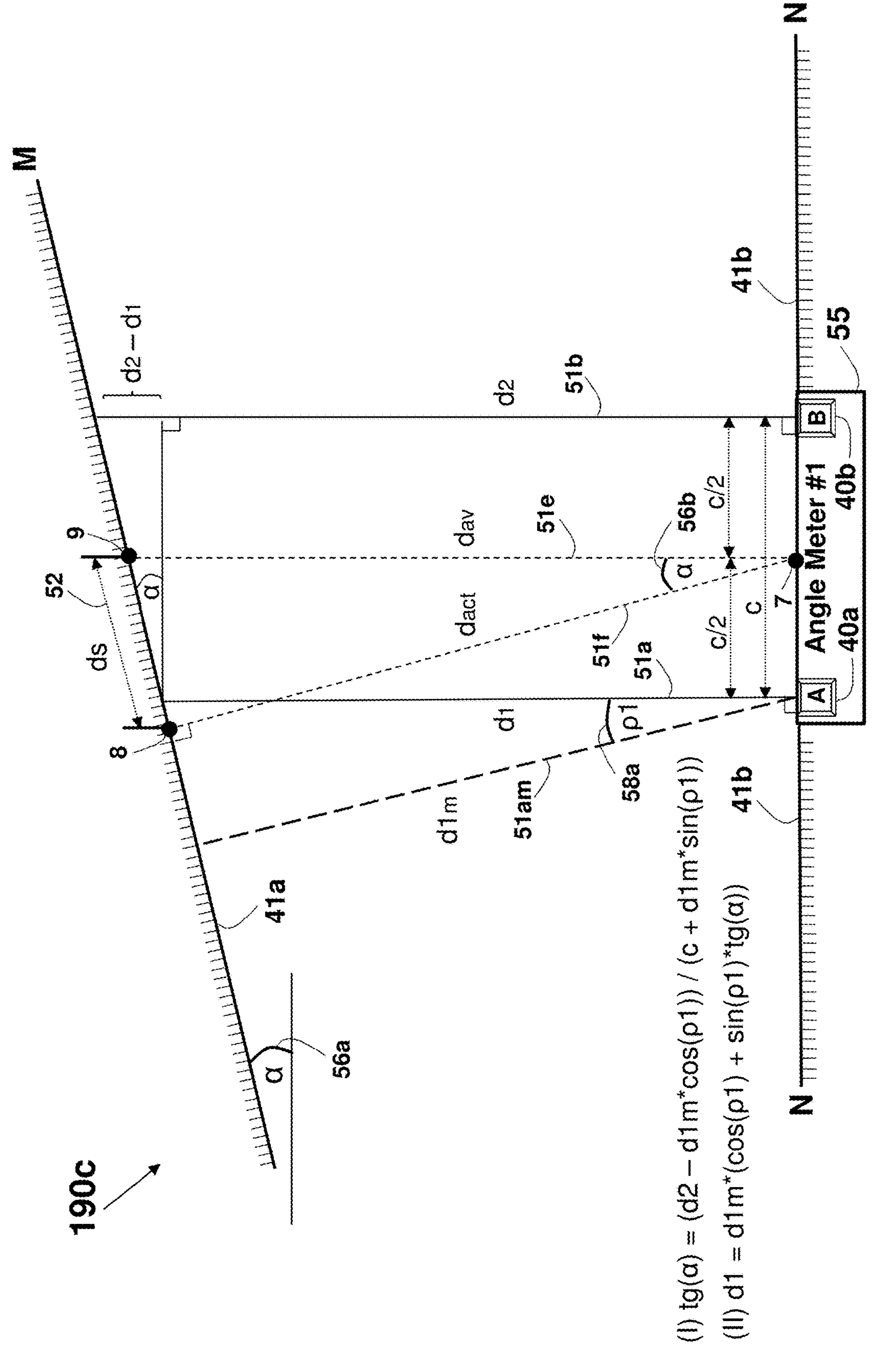
FIG. 19*c* depicts schematically measuring of an angle by an angle meter using two distance meters using two measuring lines that are not in parallel.
Figure 19D:
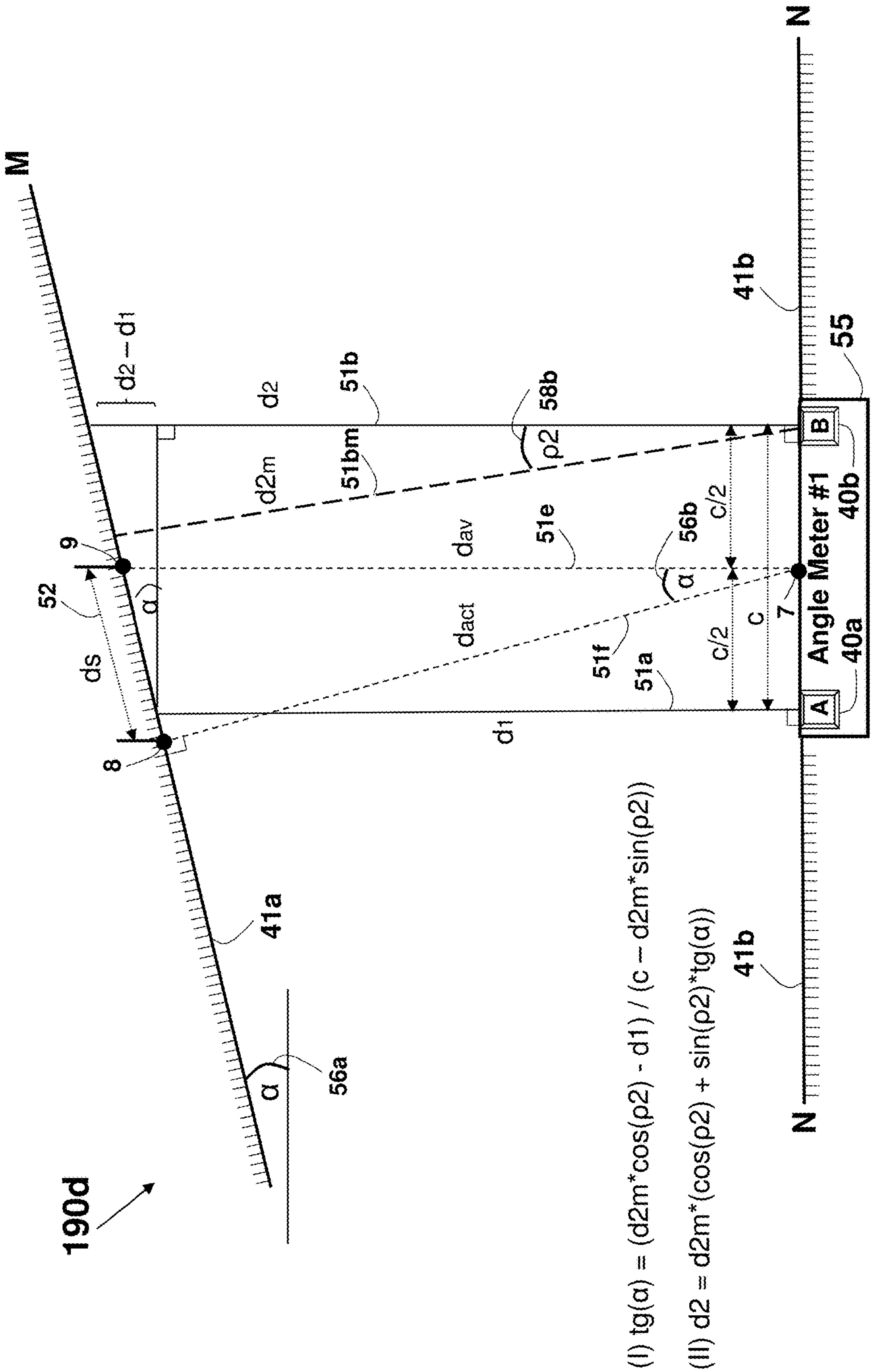
FIG. 19*d* depicts schematically another measuring of an angle by an angle meter using two distance meters using two measuring lines that are not in parallel.

The analysis above regarding the arrangement 50 shown in FIG. 5 assumed that the measurement lines 51*a* (for the measuring distance d1) and 51*b* (for measuring distance d2) are in parallel (or substantially in parallel), and are both perpendicular (or substantially perpendicular) to the reference line or plane 41*b*, that the deviation from the ideal parallel of the measurement lines 51*a* and 51*b* is negligible, or that the deviation from the ideal perpendicular from the reference line or plane 41*b* of any of the measurement lines 51*a* and 51*b* is negligible. However, due to practical limitations such as production or design tolerances, a deviation from being ideally parallel or ideally perpendicular may occur. An arrangement 190*c* shown in FIG. 19*c* is based on the arrangement 50 shown in FIG. 5, however the distance meter 'A' 40*a* is measuring a distance d1m along a measurement line 51*am* that is tilted (in the measurement plane) at an angle ρ1 58*a* from the ideal perpendicular measurement line 51*a*, that is also parallel to the measurement line 51*b*.

In such a scheme, the angle α 56*a* may be estimated or calculated taking into account the deviation angle ρ1 58*a* according to: $tg(\alpha)=(d2-d1m*\cos(\rho1))/(c+d1m*\sin(\rho1)$. Further, the ideal distance d1 according to the imaginary ideal measurement line 51*a* may be estimated or calculated according to $d1=d1m*(\cos(\rho1)+\sin(\rho1)*tg(\alpha))$. The various calculations herein may use the measured distance d1m along the measurement line 51*am*, or preferably may use the calculated ideal d1 along the ideal measurement line 51*a* instead of the actually measured one.

Figure 19E:
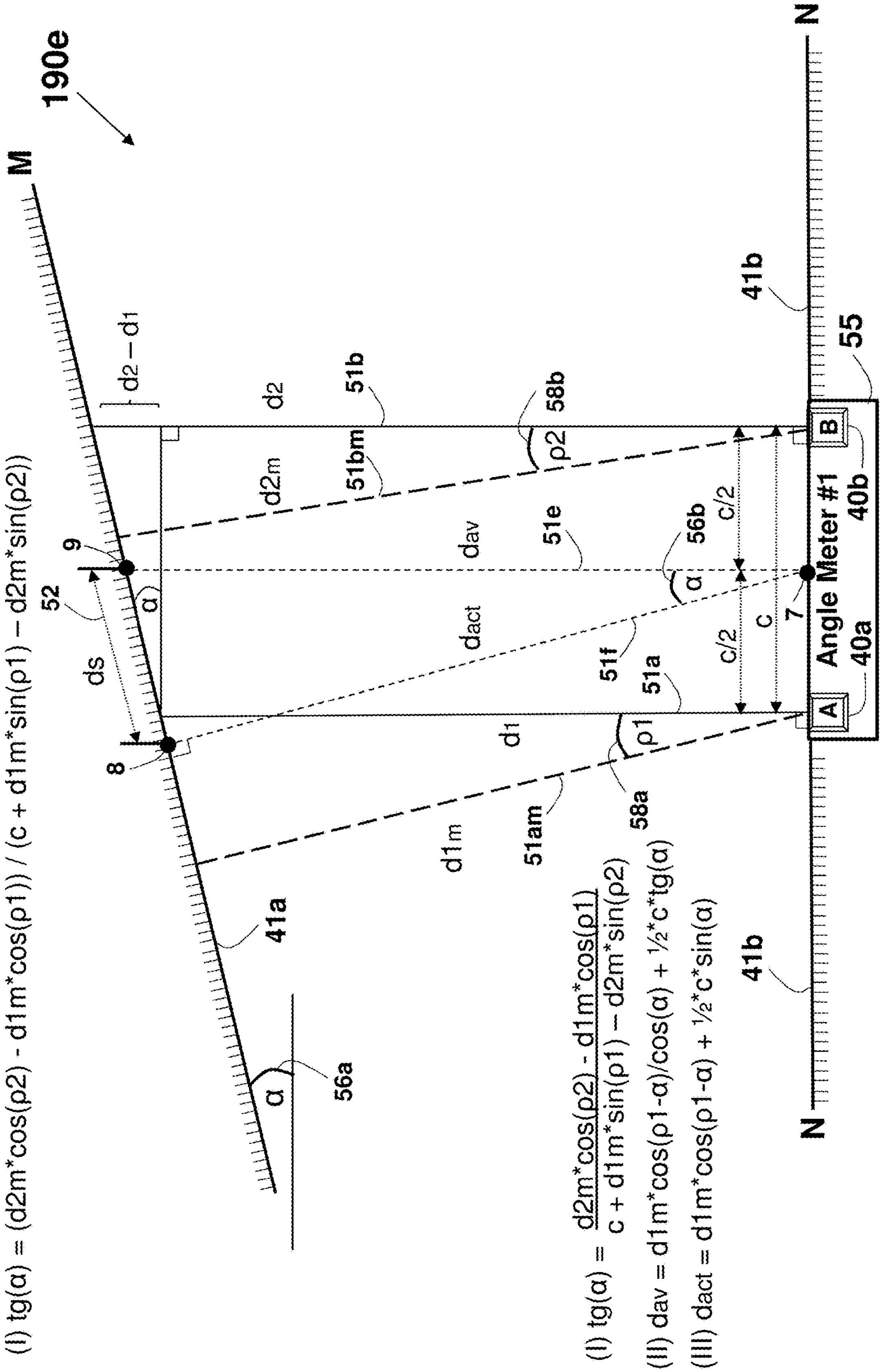
FIG. 19*e* depicts schematically another measuring of an angle by an angle meter using two distance meters using two measuring lines that are not in parallel and are not perpendicular to the reference line or plane.

Similarly, an arrangement 190*d* shown in FIG. 19*e* is based on the arrangement 50 shown in FIG. 5, however the distance meter 'B' 40*b* is measuring a distance d2m along a measurement line 51*bm* that is tilted (in the measurement plane) at an angle ρ2 58*b* from the ideal perpendicular measurement line 51*b*, that is also parallel to the measurement line 51*a*. In such a scheme, the angle α 56*a* may be estimated or calculated taking into account the deviation angle ρ2 58*b* according to: $tg(\alpha)=(d2m*\cos(\rho2)-d1)/(c-d2m*\sin(\rho2)$. Further, the ideal distance d2 according to the imaginary ideal measurement line 51*b* may be estimated or calculated according to $d2=d2m*(\cos(\rho2)+\sin(\rho2)*tg(\alpha))$. The various calculations herein may use the measured distance d2m along the measurement line 51*bm*, or preferably may use the calculated ideal d2 along the ideal measurement line 51*b* instead of the actually measured one.

Similarly, an arrangement 190*e* shown in FIG. 19*e* is based on the arrangement 50 shown in FIG. 5, however the distance meter 'B' 40*b* is measuring a distance d2m along a measurement line 51*bm* that is tilted (in the measurement plane) at an angle ρ2 58*b* from the ideal perpendicular measurement line 51*b*, that is also parallel to the measurement line 51*a*. Further, as shown in the arrangement 190*c* in FIG. 19*c*, the distance meter 'A' 40*a* is measuring a distance d1m along a measurement line 51*am* that is tilted (in the measurement plane) at an angle ρ1 58*a* from the ideal perpendicular measurement line 51*a*, that is also parallel to the measurement line 51*b*. In such a scheme, the angle α 56*a* may be estimated or calculated taking into account both the deviation angle ρ2 58*b* and the deviation angle ρ1 58*a* according to: $tg(\alpha)=(d2m*\cos(\rho2)-d1m*\cos(\rho1))/(c+d1m*\sin(\rho1)-d2m*\sin(\rho2))$. The distance dav 51*e* may be calculated according to $dav=d1m*\cos(\delta1-\alpha)/\cos(\alpha)+1/2*c*tg(\alpha)$, while the distance dact from the angle meter #1 55 central point 7 to the line or plane M 41*a* may be calculated according to $dact=dav*\cos(\alpha)=d1m*\cos(\delta1-\alpha)+1/2*c*\sin(\alpha)$.

Figure 20:
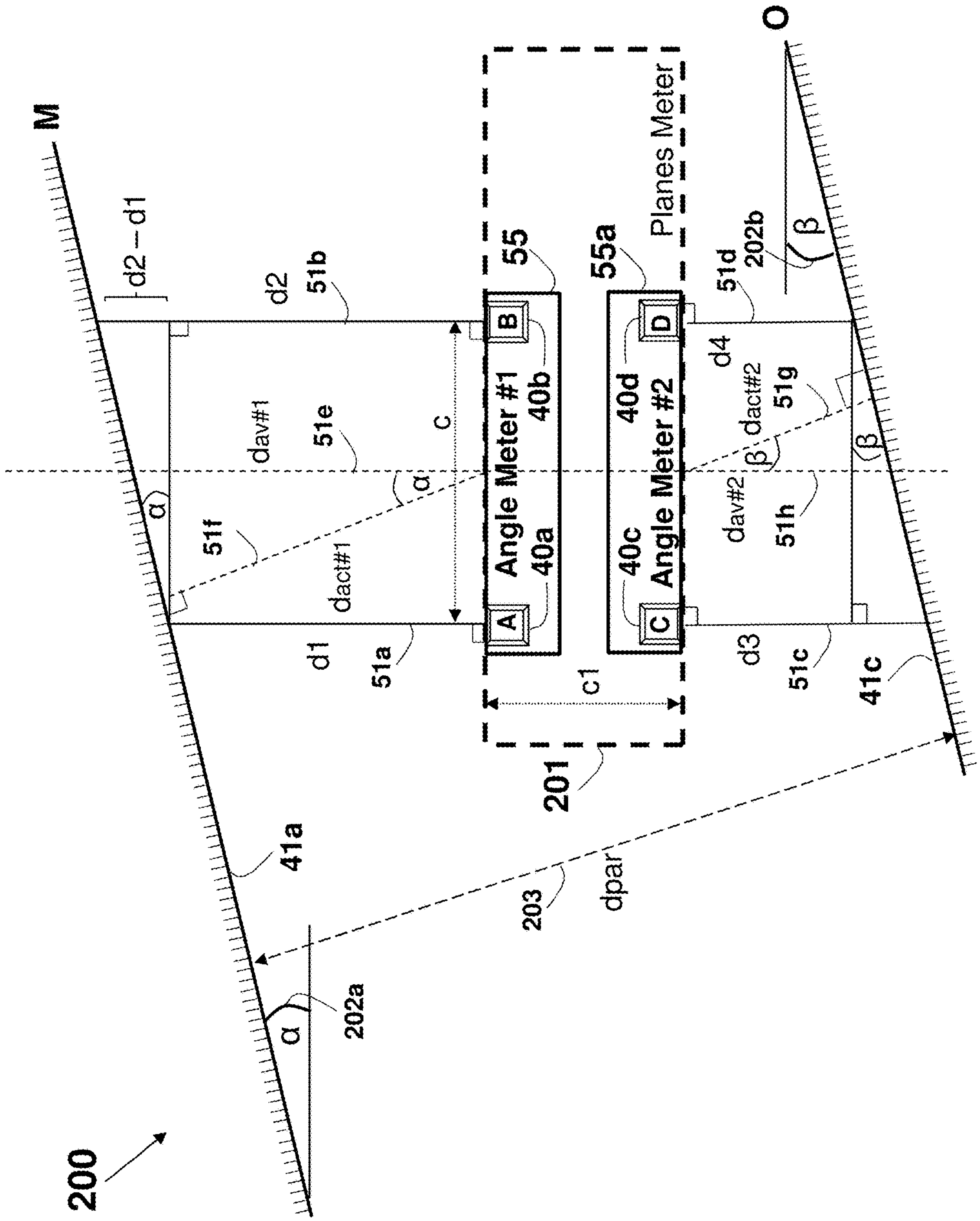
FIG. 20 depicts schematically measuring an angle between two substantially parallel lines or surfaces by using two angle meters each using two distinct distance meters functionalities.

An arrangement 200 for measuring an angle between a line or plane M 41*a* and a line or plane O 41*c* using a planes meter 201 is shown in FIG. 20. The planes meter 201 comprises a the angle meter #1 55, having two distance meters 'A' 40*a* and 'B' 40*b* (or related functionalities) for measuring along the measurement lines 51*a* and 51*b* the respective lengths d1 and d2 that are used, with the distance 'c' between the measurement lines, to estimate or calculate the angle α 202*a* (corresponding to the angle α 56*a* in the arrangement 50 shown in FIG. 5) and the actual distance dact #1 51*f*. The planes meter 201 further comprises a the angle meter #2 55*a*, having two distance meters 'C' 40*c* and 'D' 40*d* (or related functionalities) for measuring along the measurement lines 51*c* and 51*d* the respective lengths d3 and d4 that are used, with the same distance 'c' between the measurement lines, to estimate or calculate an angle θ 202*b* (corresponding to the angle α 56*a* in the arrangement 50 shown in FIG. 5) and the actual distance dact #2 51*g*.

Figure 9B:
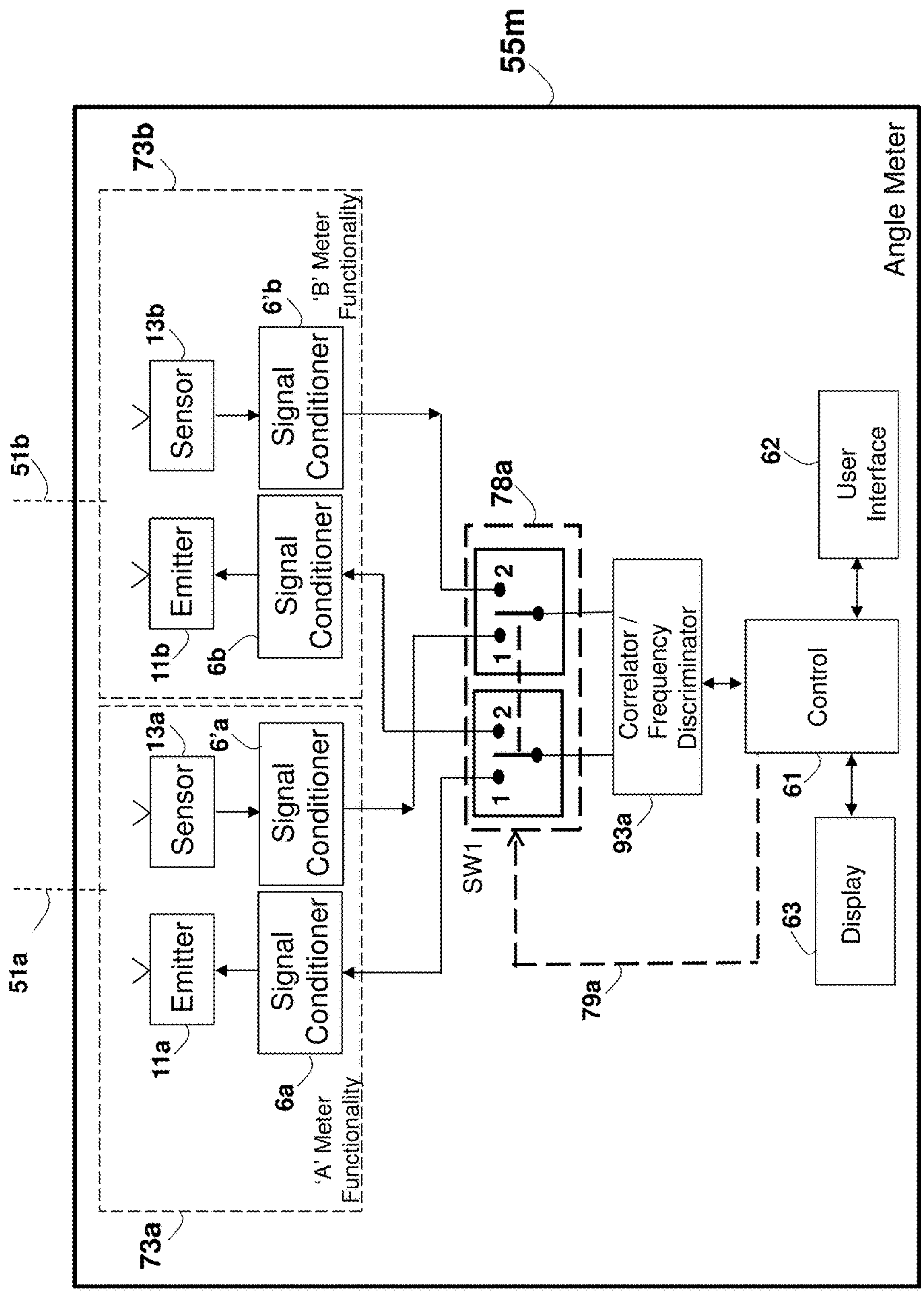
FIG. 9*b* illustrates a simplified schematic block diagram of an angle meter using an integrated correlator/frequency discriminator shared by both distance meter functionalities.
Figure 9C:
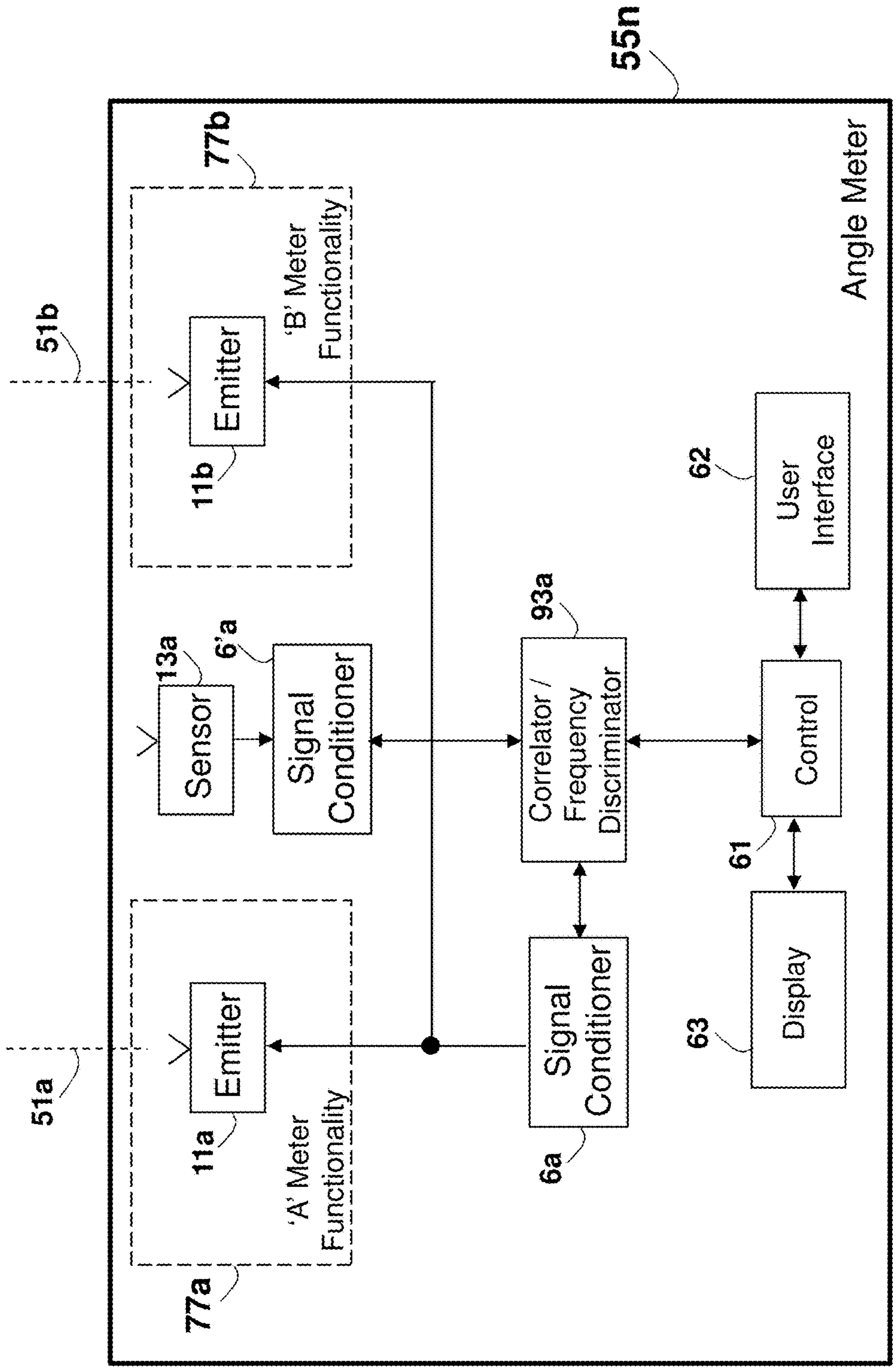
FIG. 9*c* illustrates a simplified schematic block diagram of an angle meter using an integrated correlator/frequency discriminator and a single sensor shared by both distance meter functionalities.
Figure 11:
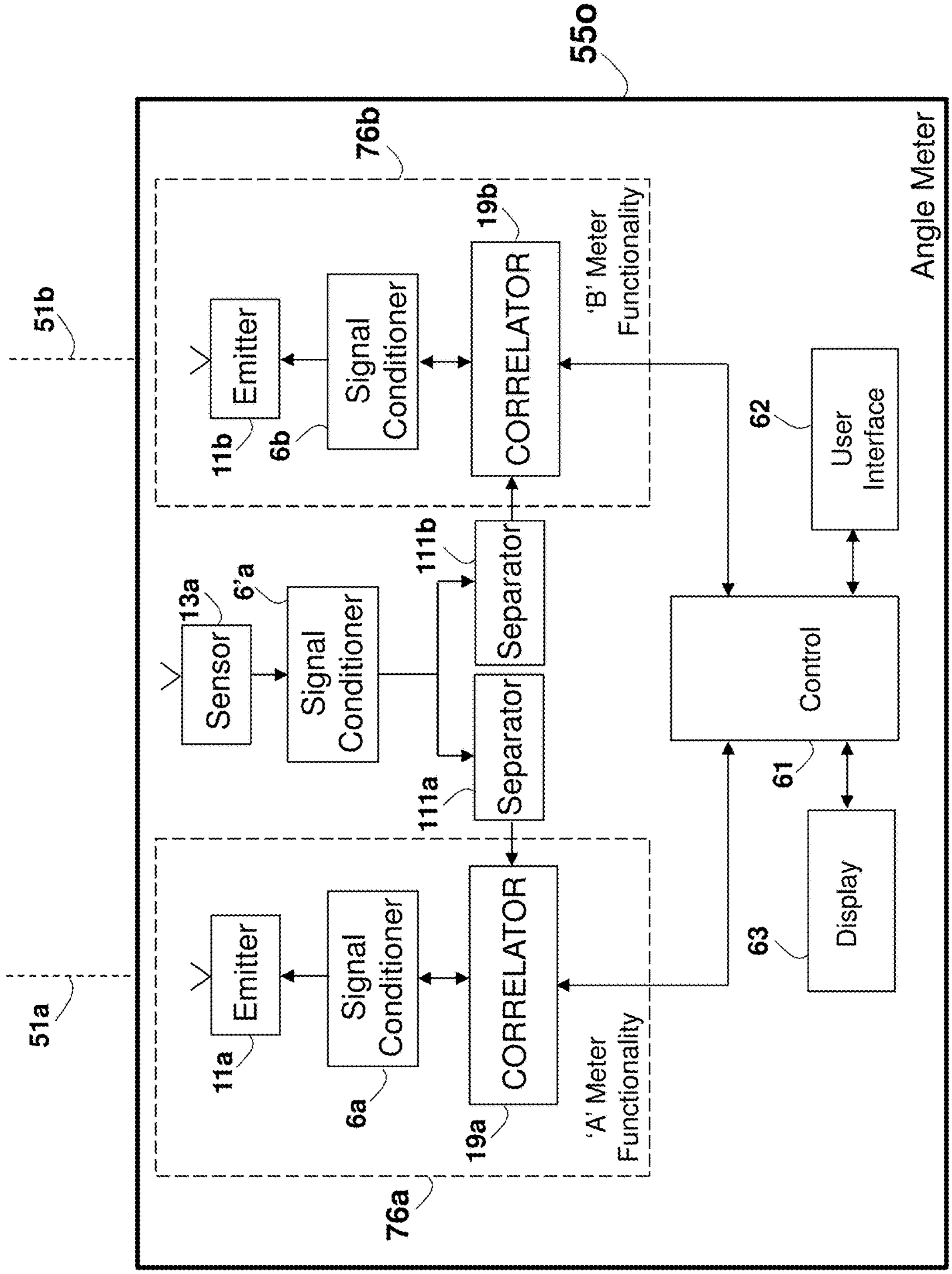
FIG. 11 illustrates a simplified schematic block diagram of an angle meter using two distance meters sharing a sensor using separators.
Figure 11A:
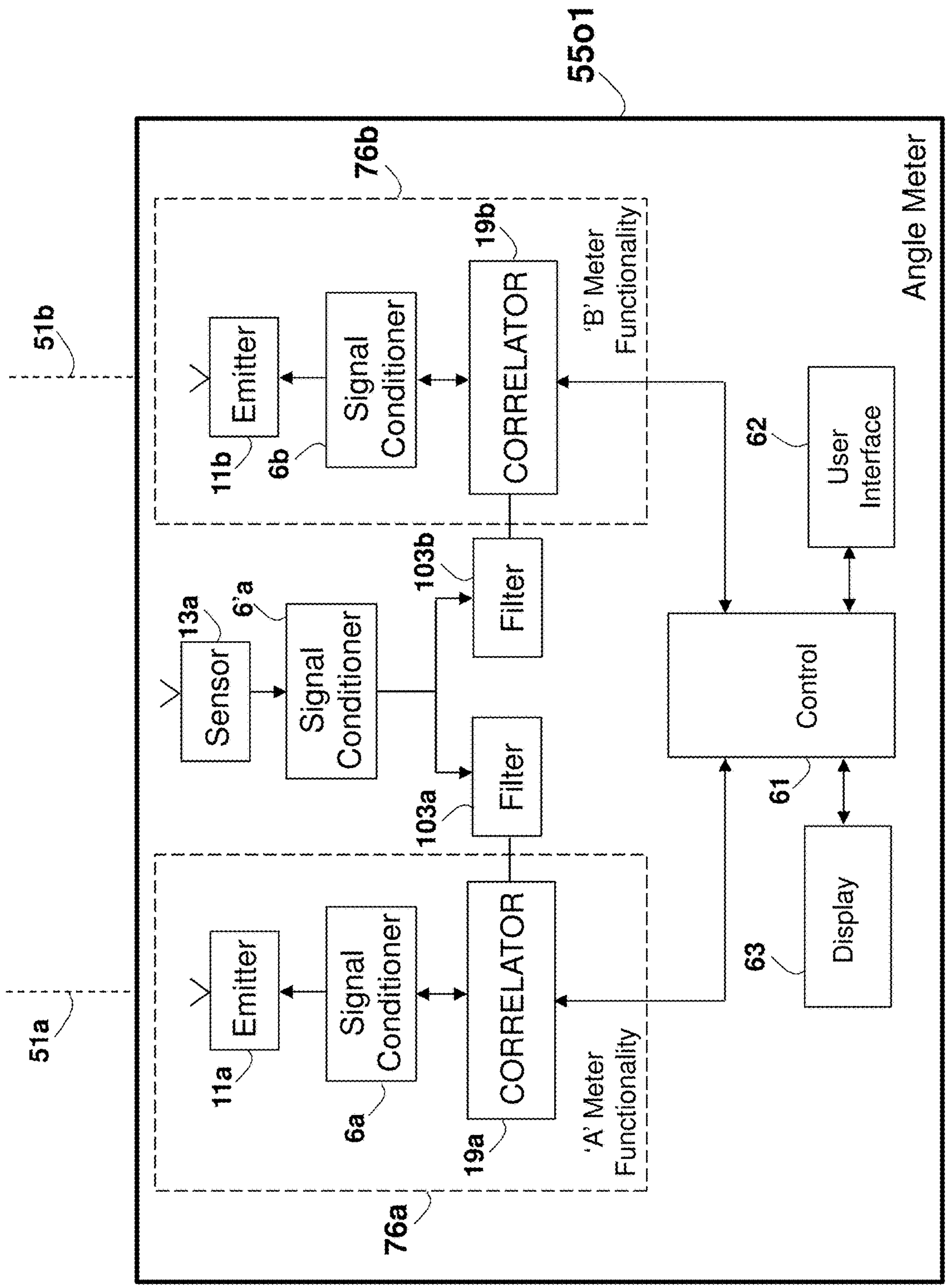
FIG. 11*a* illustrates a simplified schematic block diagram of an angle meter using two distance meters sharing a sensor using filters.
Figure 13A:
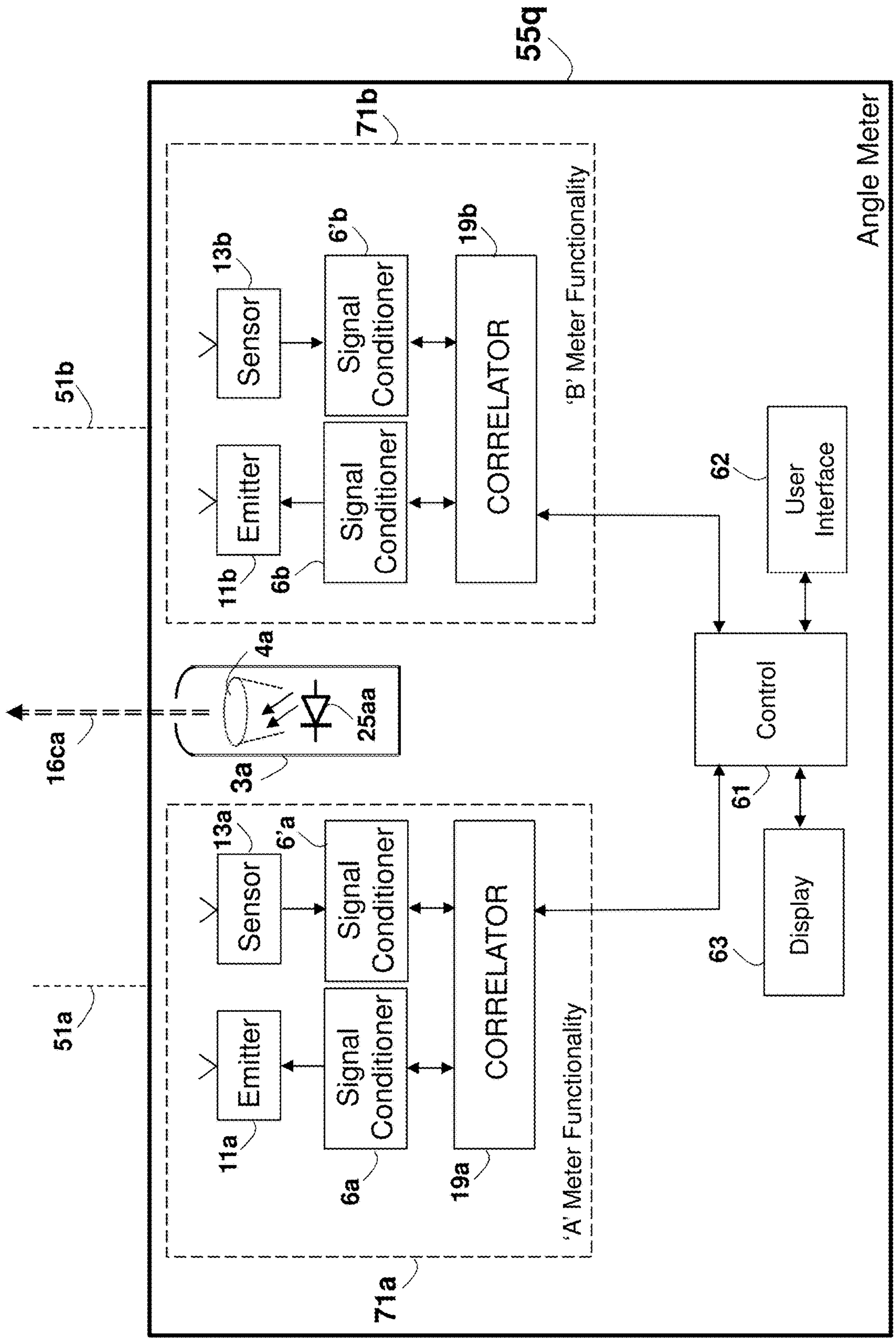
FIG. 13*a* illustrates a simplified schematic block diagram of an angle meter using two distinct distance meters functionalities and a shared laser pointer functionality.
Figure 13B:
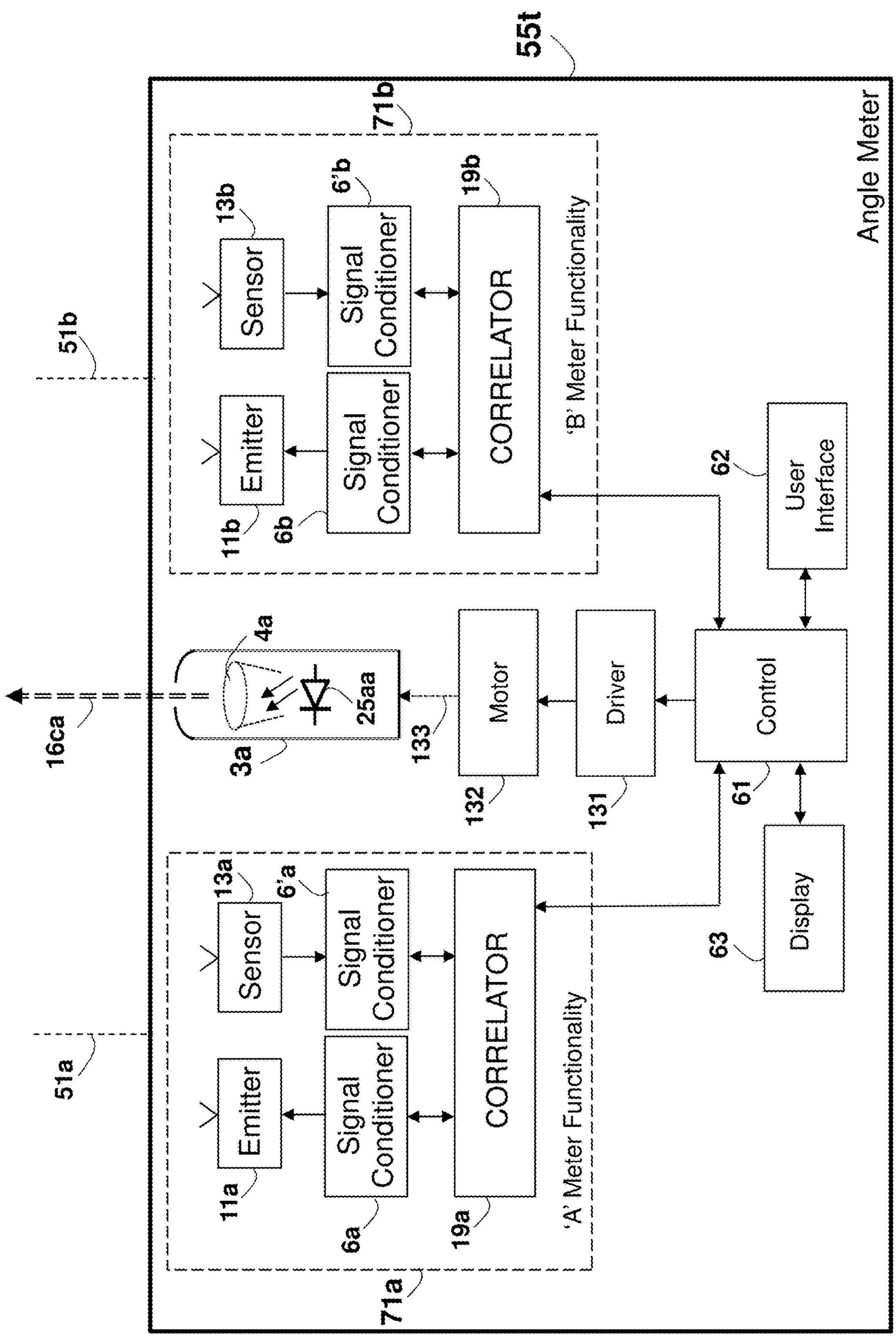
FIG. 13*b* illustrates a simplified schematic block diagram of an angle meter using two distinct distance meters functionalities and a rotatable shared laser pointer functionality.
Figure 13C:
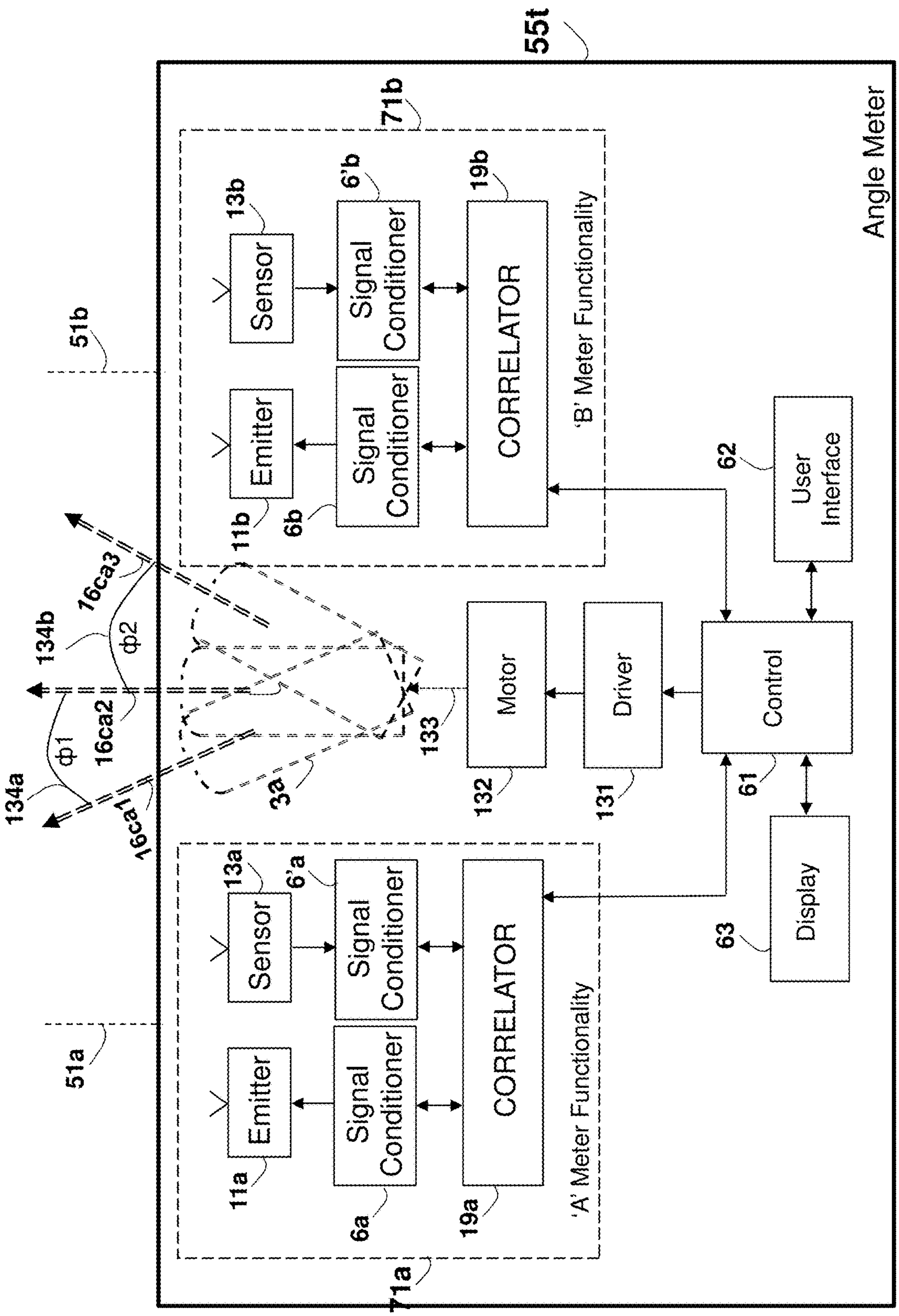
FIG. 13*c* illustrates a simplified schematic block diagram of an angle meter using two distinct distance meters functionalities and a rotatable shared laser pointer functionality in few rotations angles.

The angle meter #1 55 that is part of the planes meter 201 may consist of, may comprise part or whole of, or may be based on, any of the angle meters described herein, such as the angle meter 55 shown in FIG. 6, the angle meter 60 shown as part of the arrangement 55*a* in FIG. 6*a*, the angle meter 55*b* shown as part of the arrangement 55*b* in FIG. 6*b*, the angle meter 55*c* shown as part of the arrangement 55*c* in FIG. 6*c*, the angle meter 55*d* shown as part of the arrangement 55*d* in FIG. 6*d*, the angle meter 60*d* shown as part of the arrangement 55*e* in FIG. 6*e*, the angle meter 55*c* shown in FIG. 7, the angle meter 55*d* shown in FIG. 7*a*, the angle meter 55*e* shown in FIG. 7*b*, the angle meter 55*f* shown in FIG. 7*c*, the angle meter 55*g* shown in FIG. 7*d*, the angle meter 55*h* shown in FIG. 7*e*, the angle meter 55*i* shown in FIG. 7*f*, the angle meter 55*j* shown in FIG. 7*g*, the angle meter 55*k* shown in FIG. 9, the angle meter 55*l* shown in FIG. 9*a*, the angle meter 55*m* shown in FIG. 9*b*, the angle meter 55*n* shown in FIG. 9*c*, the angle meter 55*c* shown as part of the arrangement 100*a* in FIG. 10*a*, the angle meter 55*c*1 shown as part of the arrangement 100*b* in FIG. 10*b*, the angle meter 55*c*2 shown as part of the arrangement 100*c* in FIG. 10*c*, the angle meter 55*o* shown in FIG. 11, the angle meter 55*o*1 shown in FIG. 11*a*, the angle meter 55*p* shown in FIG. 13, the angle meter 55*q* shown in FIG. 13*a*, or any combination thereof. Similarly, the angle meter #2 55*a* that is part of the planes meter 201 may consist of, may comprise part or whole of, or may be based on, any of the angle meters described herein, such as the angle meter 55 shown in FIG. 6, the angle meter 60 shown as part of the arrangement 55*a* in FIG. 6*a*, the angle meter 55*b* shown as part of the arrangement 55*b* in FIG. 6*b*, the angle meter 55*c* shown as part of the arrangement 55*c* in FIG. 6*c*, the angle meter 55*d* shown as part of the arrangement 55*d* in FIG. 6*d*, the angle meter 60*d* shown as part of the arrangement 55*e* in FIG. 6*e*, the angle meter 55*c* shown in FIG. 7, the angle meter 55*d* shown in FIG. 7*a*, the angle meter 55*e* shown in FIG. 7*b*, the angle meter 55*f* shown in FIG. 7*c*, the angle meter 55*g* shown in FIG. 7*d*, the angle meter 55*h* shown in FIG. 7*e*, the angle meter 55*i* shown in FIG. 7*f*, the angle meter 55*j* shown in FIG. 7*g*, the angle meter 55*k* shown in FIG. 9, the angle meter 55*l* shown in FIG. 9*a*, the angle meter 55*m* shown in FIG. 9*b*, the angle meter 55*n* shown in FIG. 9*c*, the angle meter 55*c* shown as part of the arrangement 100*a* in FIG. 10*a*, the angle meter 55*c*1 shown as part of the arrangement 100*b* in FIG. 10*b*, the angle meter 55*c*2 shown as part of the arrangement 100*c* in FIG. 10*c*, the angle meter 55*o* shown in FIG. 11, the angle meter 55*o*1 shown in FIG. 11*a*, the angle meter 55*p* shown in FIG. 13, the angle meter 55*q* shown in FIG. 13*a*, or any combination thereof.

The angle α 202*a* is measured versus the angle meter #1 55 reference line or plane (designated as reference line N 41*b* in the arrangement 50) connecting the measurement points of the distance meters 'A' 40*a* and 'B' 40*b* at the measurement plane defined by respectively the two measurement lines 51*a* and 51*b*. Similarly, the angle θ 202*b* is measured versus the angle meter #2 55*a* reference line or plane (designated as N 41*b* in the arrangement 50) connecting the measurement points of the distance meters 'C' 40*c* and 'ID' 40*d* at the measurement plane defined by respectively the two measurement lines 51*c* and 51*d*. Preferably, the reference lines or planes versus which the planes are measured are parallel (or substantially parallel), separated by a distance c1. Practically, these reference lines may deviate from being ideally parallel by less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°.

Preferably, the measurement plane defined by the measurement lines 51*a* and 51*b* is the same measurement plane defined by the 51*c* and 51*d*. Alternatively, the measurement plane defined by the measurement lines 51*a* and 51*b* is parallel, or substantially parallel, to the measurement plane defined by the 51*c* and 51*d*. In one example, the measurement planes are tilted from each other by less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°.

Preferably, the measurement line 51*a* is unified with the measurement line 51*c*, so that the measurement directions of these measurement lines, or the emitted waves or beams from the emitter 11 in the distance meter 'A' 40*a* and the emitter 11 in the distance meter 'C' 40*c* are opposite to each other and form an angle of 180°. However, the angle formed between these beams (or waves) may deviate from 180° by less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°. Preferably, the measurement line 51*b* is unified with the measurement line 51*d*, so that the measurement directions of these measurement lines, or the emitted waves or beams from the emitter 11 in the distance meter 'B' 40*b* and the emitter 11 in the distance meter 'D' 40*d* are opposite to each other and form an angle of 180°. However, the angle formed between these beams (or waves) may deviate from 180° by less than 20°, 18°, 15°, 13°, 10°, 8°, 5°, 3°, 2°, 1°, 0.8°, 0.5°, 0.3°, 0.2°, 0.1°, 0.08°, 0.05°, 0.03°, 0.02°, or 0.01°.

The difference between the angles α 202*a* and β 202*b* is the angle between the lines or planes M 41*a* and O 41*c*. Hence, by calculating the value (α−β) (or |α−β|) this angle may be estimated. For example, the value of 0° when α=β indicates parallel lines of planes, and any non-zero value indicates the deviation from ideal parallelism of the lines or planes M 41*a* and O 41*c*. In the case the reference line of the two angle meters #1 55 and #2 55*a* is known to be δ, then it may be taken into account and the tilting angle between the lines or planes M 41*a* and O 41*c* may be calculated or estimated according to the value (α−β±δ) (or |α−β±δ|), where the sign of the error angle δ is determined by the tilting direction relative to the calculated or measured angles α 202*a* and β 202*b*.

In the case wherein the planes or lines M 41*a* and O 41*c* are ideally in parallel (α=β, δ=0°), the distance between them noted as dpar and shown as a dashed line 203 in the arrangement 200, may be estimated or calculated by adding the two actual calculated or estimated distances dact #1 51*f* and dact #2 51*h* and the planes meter width c1, according to dpar=dact #1+dact #2+c1. In the case wherein the planes are not in parallel, this length may still be estimated by dpar=dact #1+dact #2+c1. Alternatively or in addition, the tilting angles may be taken into consideration, for example according to dpar=dact #1+dact #2+c1/cos(α), according to dpar=dact #1+dact #2+c1/cos(β), or preferably according to dpar=dact #1+dact #2+c1/cos((α−β)/2).

One advantage of using the planes meter 200 is that the angle between the planes or lines M 41*a* and O 41*c* and the distance between them is not sensitive to the relative position of the planes meter 201 versus the measured planes. Assuming that planes M 41*a* and O 41*c* are vertical and the planes meter 201 is activated horizontally, so that the measurement plane is horizontal, the same results may be obtained regarding the angular position of the planes meter 201 relative to the measured planes.

Figure 20A:
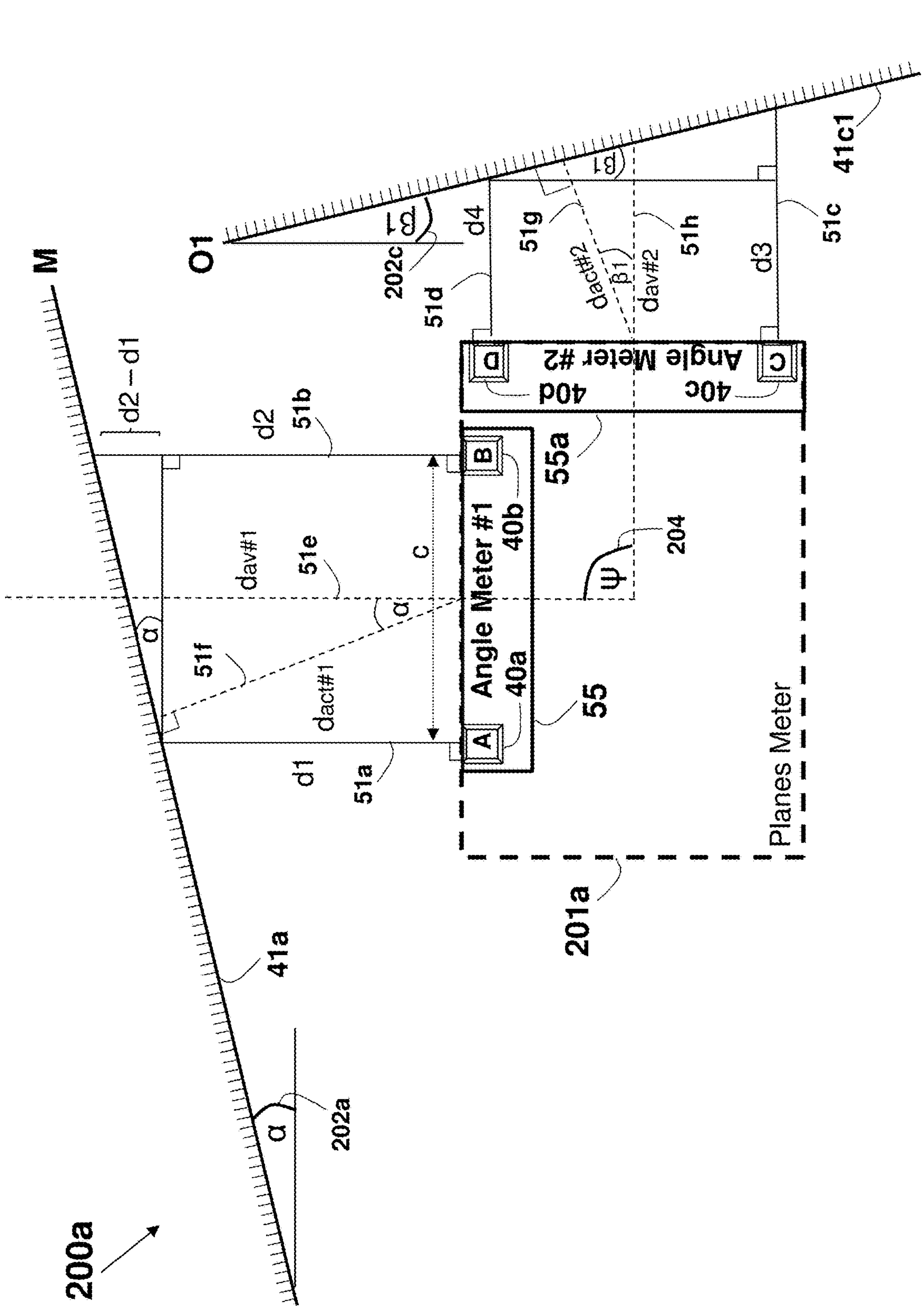
FIG. 20*a* depicts schematically measuring an angle between two tilted (or perpendicular) lines or surfaces by using two angle meters each using two distinct distance meters functionalities.

While the planes meter 201 is suited to measure the parallelism of planes, the scheme may be used for measuring deviation from any angle. A planes meter 201*a* is shown as part of an arrangement 200*a* in FIG. 20*a*, optimized to measure a deviation from an angle ψ204. The angle meters are mounted so that the reference line of the angle meter #1 55 is at the angle ψ 204, shown as the angle ψ 204 formed between the extensions of the center line dav #1 51*e* of the angle meter #1 55 and the center line dav #2 51*h* of the angle meter #2 55*a*. The angle meter #2 55*a* in this case is measuring the angle β1 202*c* to the plane or line O1 41*c*1. In this case, the titling angle between the planes or lines M 41*a* and O1 41*c*1 may be estimated or calculated according to |α−β|+ψ. For example, in the case wherein the planes meters 201*a* involves a perpendicular reference lines (ψ=90°), then the value of |α−β| (or α−β) indicates the deviation of the angle formed between the measured line (or planes) from being ideally perpendicular. For example, the scenario in the arrangement 200 shown in FIG. 20 may be considered as a private case where ψ=180°. The angle ψ 204 may be fixed, or may be adjustable by the user. In such a scheme, the angle meters (or the respective functionalities) may be arranged as mutually pivotable relative to a base or relative to each other. For example, when measuring the distance between two opposite walls in a room, the planes meter 201*a* may be adjusted so that ψ=180°, and while measuring adjacent walls the planes meter 201*a* may be adjusted so that ψ=90°.

Figure 20B:
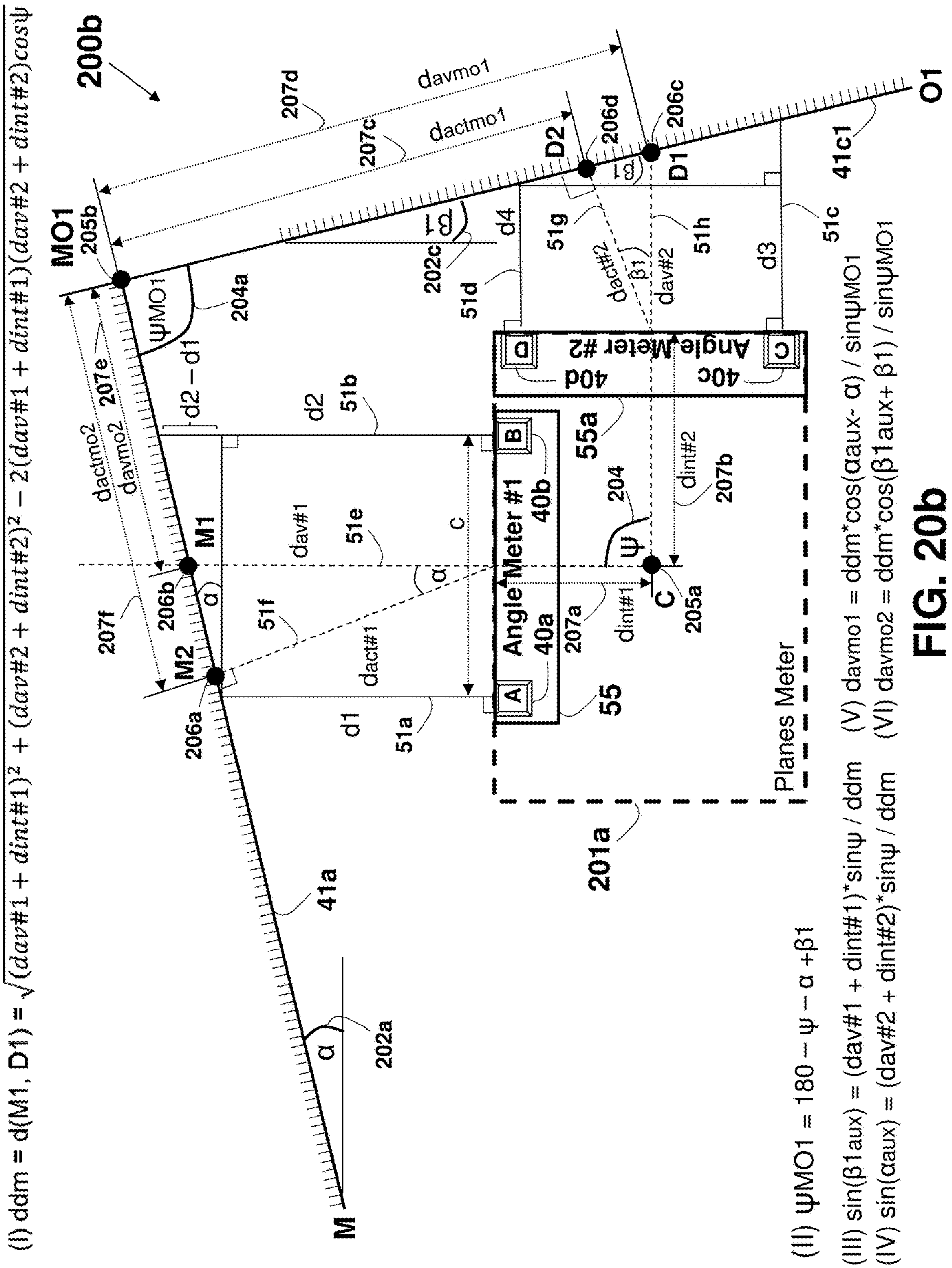
FIG. 20*b* depicts schematically measuring distances based on measurements by two angle meters each using two distinct distance meters functionalities.

Referring to FIG. 20*b* an imaginary center point C 205*a* in the planes meter 201*a* is shown as part of an arrangement 200*b*, formed at the intersection of an extension of the imaginary measurement line 51*e* defining distance dav #1 to the line or plane M 41*a*, and an extension of the imaginary measurement line 51*h* defining distance dav #2 to the line or plane O1 41*c*1. The center point C 205*a* is located at a distance dint #1 207*a* from the reference line of the angle meter #1 55, and at a distance dint #2 207*b* from the reference line of the angle meter #2 55*a*. The imaginary average or center line 51*e* intersects (or 'hits') the line or plane M 41*a* at a point M1 206*b*, and the closest point to the center point of the angle meter #1 55 is M2 206*a*, formed at the intersection of the imaginary measurement line 51*f* defining distance dact #1 to the line or plane M 41*a*. Similarly, the imaginary average or center line 51*h* intersects (or 'hits') the line or plane O1 41*c*1 at a point D1 206*c*, and the closest point to the center point of the angle meter #2 55*a* is D2 206*d*, formed at the intersection of the imaginary measurement line 51*g* defining distance dact #2 to the line or plane O1 41*c*1. The two lines or planes M 41*a* and O1 41*c*1 intersect (if not ideally parallel) in an imaginary or actual point MO1 205*b*. The line or plane M 41*a* and the line or plane O1 41*c*1 are tilted at the measurement plane at an angle ψMO1 204*a*.

A distance dactmo1 207*a* is defined between the point D2 206*d* and the point MO1 205*b*, and a distance davmo1 207*d* is defined between the point D1 206*c* and the point MO1 205*b*. Similarly, a distance dactmo2 207*f* is defined between the point M2 206*a* and the point MO1 205*b*, and a distance davmo2 207*e* is defined between the point M1 206*b* and the point MO1 205*b*. Further, a distance dcmo1 may be defined as the distance between the imaginary inner central point C 205*a* and the intersection point MO1 205*b*. Each of the various distances such as the dcmo1, dactmo1 207*a*, davmo1 207*d*, davmo2 207*e*, dactmo2 207*f*, may be estimated or calculated based on the measured distances d1 51*a*, d2 51*b*, d3 51*c*, and d4 51*d*, as well as the planes meter 201*a* characteristic lengths c, dint #1 207*a*, and dint #2 207*b*. In case where an object is at the point M1 206*b* and moving at speed V1 (either known, or as detected according to measured Doppler shift or being consecutively detected as described above) along the line M 41*a*, and assuming a constant speed and direction, the object is expected to reach the intersection point MO1 205*b* after the time davmo2/V1. Similarly, in case where an object is at the point D1 206*c* and moving at speed V2 (either known, or as detected according to measured Doppler shift or being consecutively detected as described above) along the line O1 41*c*1, and assuming a constant speed and direction, the object is expected to reach the intersection point MO1 205*b* after the time davmo1/V2.

The angle ψMO1 204*a* between the line or plane M 41*a* and the line or plane O1 41*c*1 may be calculated based on the quadrilateral having the vertices C-M2-MO1-D1 according to ψMO1=180−ψ−α−β1. The distance ddm=d(D1,M2) between points D1 206*c* and M2 206*a* (designated as ddm) may be calculated using the cosine formula to be ddm=d(D1,M2)=sqrt[(dav #2+dint #2)$^2$+(dav #1+dint #1)$^2$−2*(dav #2+dint #2)*(dav #1+dint #1)*cos(ψ). An auxiliary angle $\alpha_{aux}$ may be defined as <C−D1−M1 and may be calculated according to sin($\alpha_{aux}$)=(dav #2+dint #2)*sin(ψ)/ddm. An auxiliary angle $\beta1_{aux}$ may be defined as <C−M1−D1 and may be calculated according to sin($\beta1_{aux}$)=(dav #1+dint #1)*sin(ψ)/ddm. Using the above auxiliary angles, the distance davmo1 207*d* may be calculated according to davmo1=ddm*cos($\alpha_{aux}$−α)/sin(ψMO1), the distance davmo2 207*e* may be calculated according to davmo2=ddm*cos($\beta1_{aux}$−β1)/sin(ψMO1).

Figure 20C:
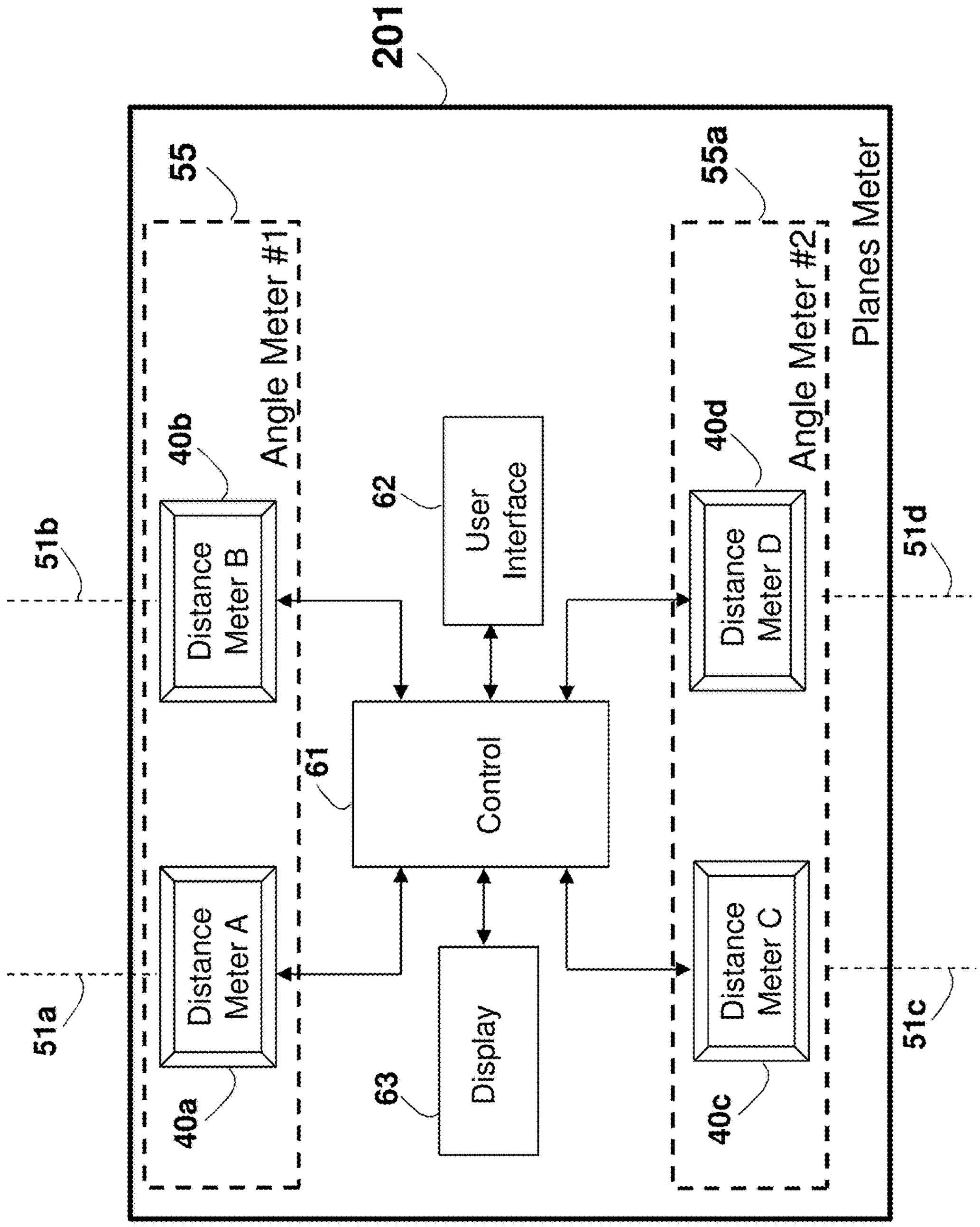
FIG. 20*c* illustrates a simplified schematic block diagram of an arrangement using two angle meters each using two distance meters.

A schematic block diagram of the general planes meter 201 is shown in FIG. 20*c*. Two angle meters 55 and 55*a* respectively estimate or calculate angles α 202*a* and β 202*b*, based on respectively measuring distances along the respective lines pair of sight 51*a* and 51*b* and the lines pair 51*c* and 51*d*, and are controlled by the control block 61. The control block 61 may include a processor, and control the activation of the two angle meters 55 and 55*a*. The measured or calculated distances are provided to the control block 61, which calculates the tilting angles α 202*a* and β 202*b*, and the actual distances dact #1 51*f* and dact #2 51*g*, and provides the estimated results for displaying to a user by a display 63, serving as the output functionality (or circuit) 17. The planes meter 201 may be controlled by a user via the user interface block 62 that may comprise various user interface components.

In one example, the planes meter 201 may comprise three distinct modules: The angle meter #1 module A 55, the angle meter #2 module 55*a*, and a Base Unit module. Each of the modules may be self-contained, housed in a separate enclosure, and power fed from a distinct power source. For example, each of the angle meters #1 55 and #2 55*a* may be self-contained, may be housed in a separate enclosure, and may be power fed from a distinct power source. Electrical connections (or communication links) connects the modules allowing for cooperative operation. One connection may connect the angle meter #1 55 to the base unit, and another connection may connect the angle meter #2 55*a* to the base unit. In the base unit, one communication interface (such as the interface 64*a* above) may handle the connection with the angle meter #1 55 over the first connection, and a second communication interface (such as the interface 64*b* above) may handle the connection with the angle meter #2 55*a* over the other connection. The angle meter #1 55 may comprise a mating communication interface to the corresponding communication interface, and the angle meter #2 55*a* may comprise a mating communication interface to the other communication interface. Preferably the connections are digital and bi-directional, employing either half-duplex or full-duplex communication scheme. A communication to the angle meter #1 55 may comprise an activation command, instructing the angle meter #1 55 to start a distance measurement operation cycle, and upon determining a distance value, the value is transmitted to the base unit over the corresponding connection. Similarly, a communication to the angle meter #2 55*a* may comprise an activation command, instructing the angle meter #2 55*a* to start a distance measurement operation cycle, and upon determining a distance value, the value is transmitted to the base unit over the proper connection.

The angle meters #1 55 and #2 55*a* may be identical, similar, or different from each other. For example, the mechanical enclosure, the structure, the power source, and the functionalities (or circuits) of the angle meters #1 55 and #2 55*a* may be identical, similar, or different from each other. The type of propagated waves used for measuring the distance by the angle meters #1 55 and #2 55*a* may be identical, similar, or different from each other. For example, the same technology may be used, such that both angle meters #1 55 and #2 55*a* use light waves, acoustic waves, or radar waves for distance measuring. Alternatively or in addition, the angle meter #1 55 may use light waves while the angle meter #2 55*a* may use acoustic or radar waves. Similarly, the angle meter #1 55 may use acoustic waves while the angle meter #2 55*a* may use light or radar waves. Further, the type of correlation schemes used for measuring the distance by the angle meters #1 55 and #2 55*a* may be identical, similar, or different from each other. For example, the same technology may be used, such that both angle meters #1 55 and #2 55*a* use TOF, Heterodyne-based phase detection, or Homodyne-based phase detection. Alternatively or in addition, the angle meter #1 55 may use TOF while the angle meter #2 55*a* may use Heterodyne or Homodyne-based phase detection. Similarly, the angle meter #1 55 may use Heterodyne-based phase detection while the angle meter #2 55*a* may use TOF or Homodyne-based phase detection. Similarly, the emitters 11 in the angle meters #1 55 and #2 55*a* may be identical, similar, or different from each other, the sensors 13 in the angle meters #1 55 and #2 55*a* may be identical, similar, or different from each other, the signal conditioners 6 in the angle meters #1 55 and #2 55*a* may be identical, similar, or different from each other, the signal conditioners 6' in the angle meters #1 55 and #2 55*a* may be identical, similar, or different from each other, and the correlators 19 in the angle meters #1 55 and #2 55*a* may be identical, similar, or different from each other. Similarly, the connections respectively connecting the angle meters #1 55 and #2 55*a* to the base unit, may be identical, similar, or different from each other.

In one example, the same measuring technology is used by both angle meters #1 55 and #2 55*a*, such as optics using visible or non-visible light beams, acoustics using audible or non-audible sound waves, or electromagnetic using radar waves. The parameters of characteristics of the emitted waves, such as the frequency or the spectrum, or the modulation scheme may be identical, similar, or different from each other. In one example, different frequency (or non-overlapping spectrum), or different modulation schemes are used, in order to avoid or minimize interference between the two angle meters #1 55 and #2 55*a* operation. For example, the emitter 11 of the angle meter #1 55 may emit a wave propagating in one carrier (or center) frequency and the emitter 11 of the angle meter #2 55*a* may emit a wave propagating in a second carrier (or center) frequency different from the first one, where the mating sensor 13 of the angle meter #1 55 is adapted to optimally sense the first carrier frequency and to ignore the second frequency, while the mating sensor 13 of the angle meter #2 55*a* is adapted to optimally sense the second carrier frequency and to ignore the first frequency. Hence, even if each of the two emitters 11 transmits simultaneously and the two sensors 13 are positioned to receive both propagating waves from the two emitters 11, there will be no interference between the two angle meters #1 55 and #2 55*a* operation.

An angle measurement by an angle meter (such as the angle meter #1 55) or by an angle meter functionality (such as a set comprising the 'A' distance meter functionality 71*a*, 72*a*, or 73*a* and the 'B' distance meter functionality 71*b*, 72*b*, or 73*b*) involves activation of an angle measurement cycle (or measurement interval or period) initiating in the starting of emitting an energy by the first emitter 11 to emit, and ending after the end of the last distance measurement cycle of the last distance meter (or functionality) to operate. Preferably, the angle measurement cycle time interval is set so that the received reflection (echo) from an object or surface of a wave or beam emitted by the last emitter 11 to emit by a sensor 13 is not detectable, such as when the returned energy in the signal versus the noise (S/N) is too low to be reliably detected or distinguished. Based on the velocity of the propagation of the waves over the medium, the set time interval inherently defines a maximum detectable range.

In one example, a single angle measurement cycle is performed each time an angle measurement is activated, such as executing the flow chart 80 shown in FIG. 8 in response to a user request via the user interface 62, or otherwise under the control of the control block 61. Alternatively or in addition, multiple angle measurement cycles are consecutively performed in response to a single angle measurement activation or request. The various range results of the multiple angle measurement cycles may be manipulated to provide a single angle measurement output, such as averaging the results to provide output that is more accurate. In one example, the number of consecutive angle measurement cycles performed in response to the angle measurement request may be higher than 2, 3, 5, 8, 10, 12, 13, 15, 18, 20, 30, 50, 80, 100, 200, 300, 500, 800, 1000 measurement cycles. The average rate of the multiple angle measurement cycles may be higher than 2, 3, 5, 8, 10, 12, 13, 15, 18, 20, 30, 50, 80, 100, 200, 300, 500, 800, 1000 cycles per seconds. The angle measurement cycles may be sequential so that the next cycle starts immediately (or soon after) the completion of a previous one. Alternatively or in addition, the time period between the start of a cycle and the start of the next one may be lower than 1 μs (micro-second), 2 μs, 3 μs, 5 μs, 8 μs, 10 μs, 20 μs, 30 μs, 50 μs, 80 μs, 100 μs, 200 μs, 300 μs, 500 μs, 800 μs, 1 ms (milli-second), 2 ms, 3 ms, 5 ms, 8 ms, 10 ms, 20 ms, 30 ms, 50 ms, 80 ms, 100 ma, 200 ma, 300 ms, 500 ma, 800 ma, 1 s (second), 2 s, 3 s, 5 s, 8s, or 10 s. Alternatively or in addition, the time period between the start of a cycle and the start of the next one may be higher than 1 μs (micro-second), 2 μs, 3 μs, 5 μs, 8 μs, 10 μs, 20 μs, 30 μs, 50 μs, 80 μs, 100 μs, 200 μs, 300 μs, 500 μs, 800 μs, 1 ms (milli-second), 2 ms, 3 ms, 5 ms, 8 ms, 10 ms, 20 ms, 30 ms, 50 ms, 80 ms, 100 ms, 200 ms, 300 ms, 500 ms, 800 ms, 1 s (second), 2 s, 3 s, 5 s, 8s, or 10 s.

A planes meter 201 uses two angle meters (such as the angle meters #1 55 and B 55*a*) or two angle meter functionalities, where each includes both the 'A' meter functionality (71*a*, 72*a*, or 73*a*) and the respective 'B' meter functionality (71*b*, 72*b*, or 73*b*). In one example, only one angle measurement cycle of one of the angle meters or one of the angle meter functionalities is operational at a time. By avoiding activating simultaneously both measurement cycles of the two angle meters (or angle meter functionalities), lower instantaneous power consumption is obtained, potential interference between the two meters or functionalities is minimized, and lower crosstalk between the distinct respective electrical circuits is provided. In one example, a single angle measurement cycle by one of the angle meters (or angle meter functionalities) is followed, immediately or after a set delay, by a single angle measurement cycle of the other meter (or angle meter functionality). In the case where multiple measurement cycles are used, such as N cycles per single angle measurement request, the angle measurements may be performed sequentially, where one of the meters (or functionalities) such as the angle meter #1 55 (or the angle meter functionality) is executing N measurement cycles to obtain a first manipulated single angle result (such as the angle α 202*a*), followed immediately (or after a set delay) by the other one of the angle meters (or functionalities) such as the angle meter #2 55*a* (or the angle meter functionality) is executing N measurement cycles to obtain a second manipulated single range result (such as the angle β1 202*c*). Alternatively or in addition, the two angle meters #1 55 and #2 55*a* (or the respective angle meter functionalities) are used alternately, using a 'super-cycle' including for example a measurement cycle by the angle meter #1 55 (or one of the meter functionalities) followed by a measurement cycle by the angle meter #2 55*a* (or the other one of the angle meter functionalities). The 'super-cycle' is repeated N times, hence resulting total of 2*N cycles.

Alternatively or in addition, the two angle meters #1 55 and #2 55*a* (or the respective angle meter functionalities) are concurrently activated, for example as part of parallel executing the "Measure Angle #1" step 80*a* and the "Measure Angle #2" step 80*b*, so that there is a time overlap between the angle measurement cycles of the two angle meters or angle meter functionalities. Such approach allows for faster measuring, which offers a more accurate results in a changing environment, such as when the planes meter 201 or the reflecting object or surface are moving. In one example, the angle measurement cycles may be independent from each other, and the overlapping is random and there is not any mechanism to synchronize them. Alternatively or in addition, a synchronization is applied in order to synchronize or otherwise correspond the two measurement cycles. In one example, the same activating control signal is sent to both angle meters (or functionalities), so that the two measurement cycles start at the same time, or substantially together. For example, the energy emitting start may be designed to concurrently occur. For example, the modulated signals emitted by the emitter 11, such as a pulse in a TOF scheme, may be emitted together at the same time or at negligible delay. Two measurement cycles may be considered as overlapping if the non=overlapping time period is less than 20%, 18%, 15%, 13%, 10%, 8%, 5%, 2%, 1%, 0.5%, or 0.2% of the total measurement cycle time interval.

Alternatively or in addition, there may be a fixed delay between the angle measurement cycles. Assuming the angle measurement cycles both having the time interval of T (such as 100 milliseconds), there may be a delay of ½*T (50 milliseconds in the example) between the measurement cycles starting times (phase difference of) 180°. Alternatively or in addition, a delay of ¼*T, ¼*T, or any other time period may be equally used. Such a phase difference between the various angle measurement cycles may be useful to reduce interference or crosstalk between the two angle measurements and the two circuits. Further, since there is a large power-consumption during the energy emitting part of the measurement cycle, such delay may cause the transmitting periods to be non-overlapping, thus reducing the peak power consumption of the planes meter 201.

Figure 21:
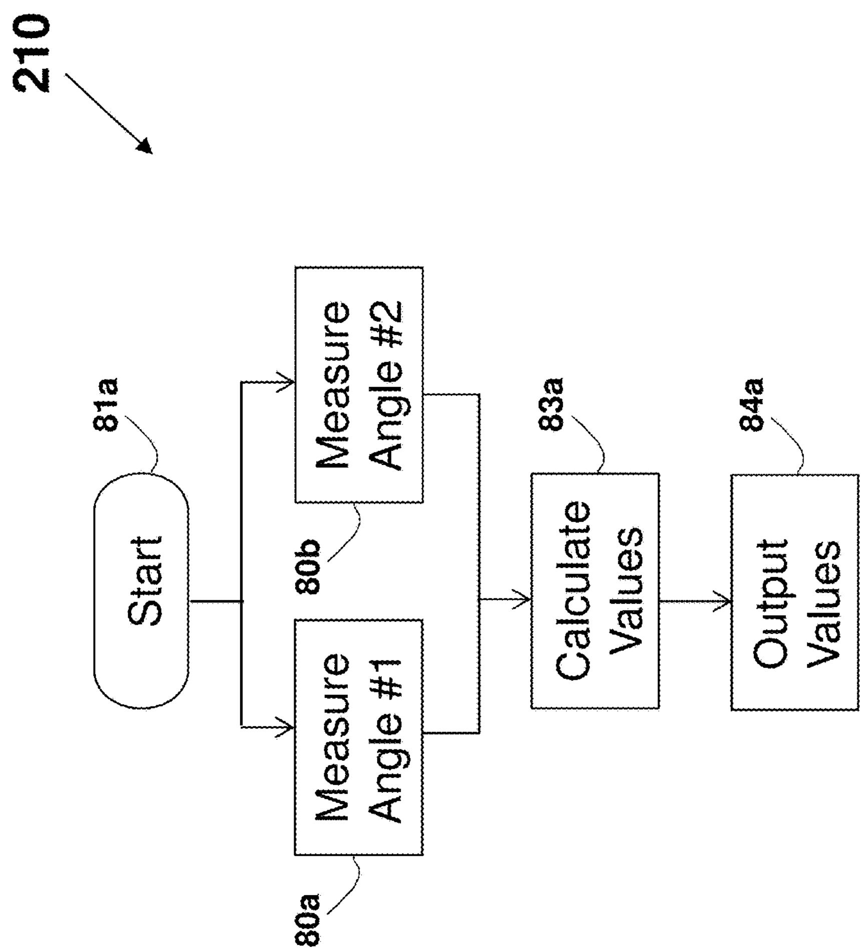
FIG. 21 illustrates schematically a simplified flowchart of a method for measuring an angle using two angle meters each using two distance meters.

The operation of the planes meter 201 may follow a flow chart 210 shown in FIG. 21. The operation starts in a "Start" step 81*a*, which may indicate a user activation, a remote activation from another device, or periodical activation. As part of a "Measure Angle #1" step 80*a* the Angle Meter #1 55 is controlled or activated to perform an angle measurement according to, or based on, the flow chart 80 shown in FIG. 8, and as part of a "Measure Angle #2" step 80*b* the Angle Meter #2 55*a* is controlled or activated to perform an angle measurement according to, or based on, the flow chart 80 shown in FIG. 8. The two angle meters activations or commands may be sequential, such as activating the Angle Meter #1 55 and after a while activating the Angle Meter #2 55*a*, or preferably the two angle meters are concurrently activated. A sequential activation may be used, for example, to avoid momentarily excessive power consumption by the simultaneous operation of both angle meters. The measured angles (α 202*a*, β 202*b*) from the two angle meters are then used as part of a "Calculate Values" step 83*a* for calculating various parameters such as the angle difference (α−β), for example according to the equations herein, and for calculation of the various distances as described herein. The calculated values may be output to a user or to another device as part of an "Output Values" step 84*a*.

Alternatively or in addition, the operation of the planes meter 201 may involve individually activating and operating each of the four distance meters 'A' 40*a*, 'B' 40*b*, 'C' 40*c*, and 'D' 40*d*, as described in a flow chart 210*a* shown in FIG. 21. The reference to operation of the angle meters as part of the "Measure Angle #1" step 80*a* and the "Measure Angle #2" step 80*b* is replaced by referring to the operation of the individual distance meters, where the distance meter 'A' 40*a* is operated as part of a "measure Distance A" step 82*a*, the distance meter 'B' 40*b* is operated as part of a "measure Distance B" step 82*b*, the distance meter 'C' 40*c* is operated as part of a "measure Distance C" step 82*c*, and the distance meter 'D' 40*d* is operated as part of a "measure Distance D" step 82*d*.

The distance meters may be independently operated, may be synchronized with each other, or any combination thereof. In one example, a single distance measurement cycle is performed each time a distance measurement is activated, such as part of the "Measure Distance A" step 82*a*, as part of the "Measure Distance B" step 82*b*, as part of the "Measure Distance C" step 82*c*, as part of the "Measure Distance D" step 82*d*, or any combination thereof, in response to a user request via the user interface 62, or otherwise under the control of the control block 61. Alternatively or in addition, multiple distance measurement cycles are consecutively performed in response to a single distance measurement activation or request. The various range results of the multiple distance measurement cycles may be manipulated to provide a single distance measurement output, such as averaging the results to provide output that is more accurate. In one example, the number of consecutive measurement cycles performed in response to the measurement request may be above than 2, 3, 5, 8, 10, 12, 13, 15, 18, 20, 30, 50, 80, 100, 200, 300, 500, 800, 1000 measurement cycles. The average rate of the multiple measurement cycles may be higher than 2, 3, 5, 8, 10, 12, 13, 15, 18, 20, 30, 50, 80, 100, 200, 300, 500, 800, 1000 cycles per seconds. The distance measurement cycles may be sequential so that the next cycle starts immediately (or soon after) the completion of a previous one. Alternatively or in addition, the time period between the start of a cycle and the start of the next one may be lower than 1 μs (micro-second), 2 μs, 3 μs, 5 μs, 8 μs, 10 μs, 20 μs, 30 μs, 50 μs, 80 μs, 100 μs, 200 μs, 300 μs, 500 μs, 800 μs, 1 ms (milli-second), 2 ms, 3 ms, 5 ms, 8 ms, 10 ms, 20 ms, 30 ms, 50 ms, 80 ms, 100 ma, 200 ma, 300 ms, 500 ma, 800 ma, 1 s (second), 2 s, 3 s, 5 s, 8s, or 10 s. Alternatively or in addition, the time period between the start of a cycle and the start of the next one may be higher than 1 μs (micro-second), 2 μs, 3 μs, 5 μs, 8 μs, 10 μs, 20 μs, 30 μs, 50 μs, 80 μs, 100 μs, 200 μs, 300 μs, 500 μs, 800 μs, 1 ms (milli-second), 2 ms, 3 ms, 5 ms, 8 ms, 10 ms, 20 ms, 30 ms, 50 ms, 80 ms, 100 ms, 200 ms, 300 ms, 500 ms, 800 ms, 1 s (second), 2 s, 3 s, 5 s, 8s, or 10 s.

A planes meter 201 uses four distance meters (such as the distance meters A 40*a*, B 40*b*, C 40*c*, and D 40*d*)) or two distance meter functionalities such as the 'A' meter functionality (71*a*, 72*a*, or 73*a*), the respective 'B' meter functionality (71*b*, 72*b*, or 73*b*), the respective 'C' meter functionality (71*c*, 72*c*, or 73*c*), or the respective 'D' meter functionality (71*d*, 72*d*, or 73*d*). In one example, only one distance measurement cycle of one of the distance meters or one of meter functionalities is operational at a time. By avoiding activating simultaneously both measurement cycles of the two distance meters (or meter functionalities), lower instantaneous power consumption is obtained, potential interference between the two meters or functionalities is minimized, and lower crosstalk between the distinct respective electrical circuits is guaranteed. In one example, a single measurement cycle by one of the meters (or functionalities) is followed, immediately or after a set delay, by a single distance measurement cycle of the other meter (or functionality). In the case where multiple measurement cycles are used, such as N cycles per single measurement request, the measurements may be performed sequentially, where one of the meters (or functionalities) such as the distance meter 'A'

40*a* (or the 'A' meter functionality 71*a*) is executing N distance measurement cycles to obtain a first manipulated single range result (such as the distance d1 51*a*), followed immediately (or after a set delay) by the other one of the meters (or functionalities) such as the distance meter 'B' 40*b* (or the 'B' meter functionality 71*b*) is executing N measurement cycles to obtain a second manipulated single range result (such as the distance d2 51*b*), followed immediately (or after a set delay) by another one of the meters (or functionalities) such as the distance meter 'C' 40*c* (or the 'C' meter functionality 71*c*) is executing N measurement cycles to obtain a second manipulated single range result (such as the distance d3 51*c*), followed immediately (or after a set delay) by another one of the meters (or functionalities) such as the distance meter 'D' 40*d* (or the 'D' meter functionality 71*d*) is executing N measurement cycles to obtain a second manipulated single range result (such as the distance d4 51*d*).

Alternatively or in addition, the two distance meters 'A' 40*a* and 'B' 40*b* (or the respective meter functionalities 'A' 71*a* and 'B' 71*b*) are used alternately, using a 'super-cycle' including for example a distance measurement cycle by the distance meter 'A' 40*a* (or the 'A' meter functionality 71*a*) followed by a distance measurement cycle by the distance meter 'B' 40*b* (or the 'B' meter functionality 71*b*). The 'super-cycle' is repeated N times, hence resulting total of 2*N cycles. These measurements are ij parallel to, or followed by, the two distance meters 'C' 40*c* and 'D' 40*d* (or the respective meter functionalities 'C' 71*c* and 'D' 71*d*) are used alternately, using a 'super-cycle' including for example, a distance measurement cycle by the distance meter 'C' 40*c* (or the 'C' meter functionality 71*c*) followed by a distance measurement cycle by the distance meter 'D' 40*d* (or the 'D' meter functionality 71*d*). The 'super-cycle' is repeated N times, hence resulting 2*N cycles. In case of sequential operation, 4*n cycles are performed.

Alternatively or in addition, the two distance meters 'A' 40*a* and 'C' 40*c* (or the respective meter functionalities 'A' 71*a* and 'C' 71*c*) are used alternately, using a 'super-cycle' including for example, a distance measurement cycle by the distance meter 'A' 40*a* (or the 'A' meter functionality 71*a*) followed by a distance measurement cycle by the distance meter 'C' 40*c* (or the 'C' meter functionality 71*c*). The 'super-cycle' is repeated N times, hence resulting total of 2*N cycles. These measurements are ij parallel to, or followed by, the two distance meters 'B' 40*b* and 'D' 40*d* (or the respective meter functionalities 'B' 71*b* and 'D' 71*d*) are used alternately, using a 'super-cycle' including for example, a distance measurement cycle by the distance meter 'B' 40*b* (or the 'B' meter functionality 71*b*) followed by a distance measurement cycle by the distance meter 'D' 40*d* (or the 'D' meter functionality 71*d*). The 'super-cycle' is repeated N times, hence resulting 2*N cycles. In case of sequential operation, 4*n cycles are performed.

Alternatively or in addition, the four distance meters are concurrently activated, for example as part of parallel executing the "Measure Distance A" step 82*a*, the "Measure Distance B" step 82*b*, the "Measure Distance C" step 82*c* and the "Measure Distance D" step 82*d*, so that there is a time overlap between the distance measurement cycles of the two meters or meter functionalities. Such approach allows for faster measuring, which offers a more accurate results in a changing environment, such as when the planes meter 201 or one of the reflecting objects or surfaces (or both) are moving. In one example, the distance measurement cycles may be independent from each other, and the overlapping is random and there is not any mechanism to synchronize them. Alternatively or in addition, a synchronization is applied in order to synchronize or otherwise correspond the two distance measurement cycles. In one example, the same activating control signal is sent to both meters (or functionalities), so that the two measurement cycles start at the same time, or substantially together. For example, the energy emitting start may be designed to concurrently occur. For example, the modulated signals emitted by the emitter 11, such as a pulse in a TOF scheme, may be emitted together at the same time or at negligible delay. Two distance measurement cycles may be considered as overlapping if the non-overlapping time period is less than 20%, 18%, 15%, 13%, 10%, 8%, 5%, 2%, 1%, 0.5%, or 0.2% of the total measurement cycle time interval.

Alternatively or in addition, there may be a fixed delay between the distance measurement cycles. Assuming the distance measurement cycles both having the time interval of T (such as 100 milliseconds), there may be a delay of ½*T (50 milliseconds in the example) between the distance measurement cycles starting times (phase difference of 180°). Alternatively or in addition, a delay of ¼*T, ¼*T, or any other time period may be equally used. Such a phase difference between the various distance measurement cycles may be useful to reduce interference or crosstalk between the two measurements and the two circuits. Further, since there is a large power-consumption during the energy emitting part of the measurement cycle, such delay may cause the transmitting periods to be non-overlapping, thus reducing the peak power consumption of the planes meter 201.

Figure 22:
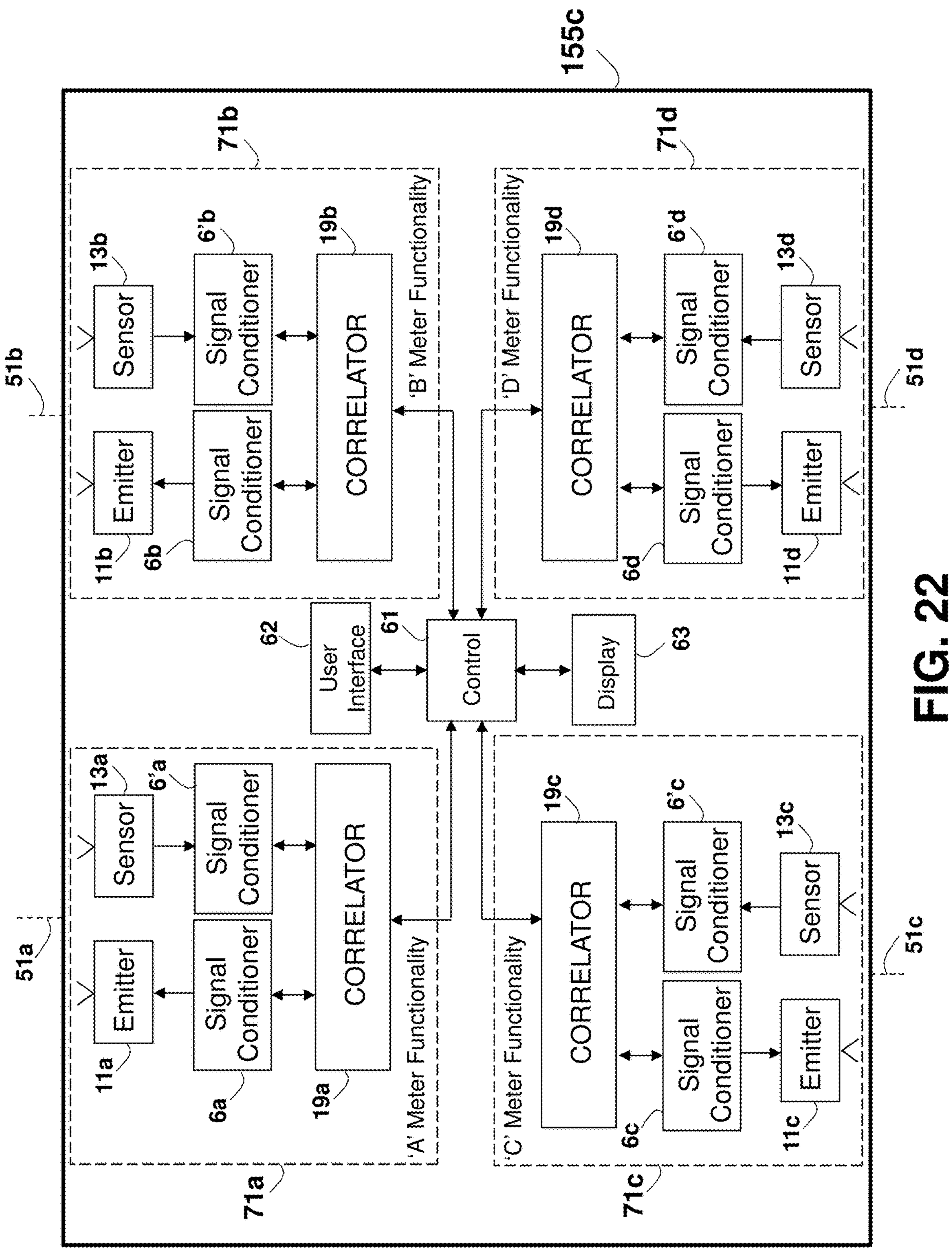
FIG. 22 illustrates a simplified schematic block diagram of a planes meter using two distinct angle meters functionalities.

Preferably, a single enclosure may house all the functionalities (such as circuits) of the planes meter 201, as exampled regarding a planes meter 155*c* shown in FIG. 22. The planes meter 155*c* provides shared structures and functionalities for the four distance meters A 40*a*, B 40*b*, C 40*c*, and D 40*d*, such as a shared mechanical enclosure, a shared power source or a shared power supply, or a shared control. The module or circuit 'A' meter functionality 71*a* comprises the structure and functionalities that are not shared and are part of the distance measuring along line 51*a*, namely the emitter 11*a* driven by the signal conditioner 6*a*, the sensor 13*a* which output is manipulated by the signal conditioner 6'*a*, and the correlator 19*a* for correlating between the signal fed to the emitter 11*a* and the signal received from the sensor 13*a* Similarly, the module or circuit 'B' meter functionality 71*b* comprises the structure and functionalities that are not shared and are part of the distance measuring along line 51*b*, namely the emitter 11*b* driven by the signal conditioner 6*b*, the sensor 13*b* which output is manipulated by the signal conditioner 6'*b*, and the correlator 19*b* for correlating between the signal fed to the emitter 11*b* and the signal received from the sensor 13*b*. Similarly, the module or circuit 'C' meter functionality 71*c* comprises the structure and functionalities that are not shared and are part of the distance measuring along line 51*c*, namely the emitter 11*c* driven by the signal conditioner 6*c*, the sensor 13*c* which output is manipulated by the signal conditioner 6'*c*, and the correlator 19*c* for correlating between the signal fed to the emitter 11*c* and the signal received from the sensor 13*c*. Similarly, the module or circuit 'D' meter functionality 71*d* comprises the structure and functionalities that are not shared and are part of the distance measuring along line 51*d*, namely the emitter 11*d* driven by the signal conditioner 6*d*, the sensor 13*d* which output is manipulated by the signal conditioner 6'*d*, and the correlator 19*d* for correlating between the signal fed to the emitter 11*d* and the signal received from the sensor 13*d*.

The shared components may comprise the control block 61, connected to activate and control the 'A' module 71*a*, the 'B' module 71*b*, the 'C' module 71*c*, and the 'D' module 71*d*, and to receive the measured distance therefrom, the display 63, the user interface block 62, a power source, and an enclosure.

Each two of, or all of, the distance meter modules A 71*a*, B 71*b*, C 71*c*, and D 71*d*, may be identical, similar, or different from each other. For example, the mechanical arrangement, the structure, the power source, and the functionalities of any two of the distance meter functionalities, such as the distance meter modules B 71*b* and C 71*c* may be identical, similar, or different from each other. The type of propagated waves used for measuring the distance by any two of the distance meter modules, such as by A 71*a* and D 71*d* may be identical, similar, or different from each other. For example, the same technology may be used, such that both distance meter modules A 71*a* and D 71*d* use light waves, acoustic waves, or radar waves for distance measuring. Alternatively or in addition, the distance meter module A 71*a* may use light waves while the distance meter module D 71*d* may use acoustic or radar waves. Similarly, the distance meter module A 71*a* may use acoustic waves while the distance meter module D 71*d* may use light or radar waves. Further, the type of correlation schemes used for measuring the distance by any two of the distance meter modules, such as modules A 71*a* and C 71*c* may be identical, similar, or different from each other. For example, the same technology may be used, such that both distance meter modules A 71*a* and C 71*c* use TOF, Heterodyne-based phase detection, or Homodyne-based phase detection. Alternatively or in addition, the distance meter module A 71*a* may use TOF while the distance meter module C 71*c* may use Heterodyne or Homodyne-based phase detection. Similarly, the distance meter module A 71*a* may use Heterodyne-based phase detection while the distance meter module C 71*c* may use TOF or Homodyne-based phase detection. Similarly, the emitters of any two of the distance meter modules may be identical, similar, or different from each other. For example, the emitters 11*c* and 11*b* in the respective distance meter modules C 71*c* and B 71*b* may be identical, similar, or different from each other. Similarly, the sensors of any two of the distance meter modules may be identical, similar, or different from each other. For example, the sensors 13*a* and 13*d* in the respective distance meter modules A 71*a* and D 71*d* may be identical, similar, or different from each other. Further, the signal conditioner of any two of the distance meter modules may be identical, similar, or different from each other. For example, the signal conditioners 6*a* and 6*d* in the respective distance meter modules A 71*a* and D 71*d* may be identical, similar, or different from each other, the signal conditioners 6'*a* and 6'*d* in the respective distance meter modules A 71*a* and D 71*d* may be identical, similar, or different from each other, and the correlators 19*a* and 19*d* in the respective distance meter modules A 71*a* and D 71*d* may be identical, similar, or different from each other.

Figure 22A:
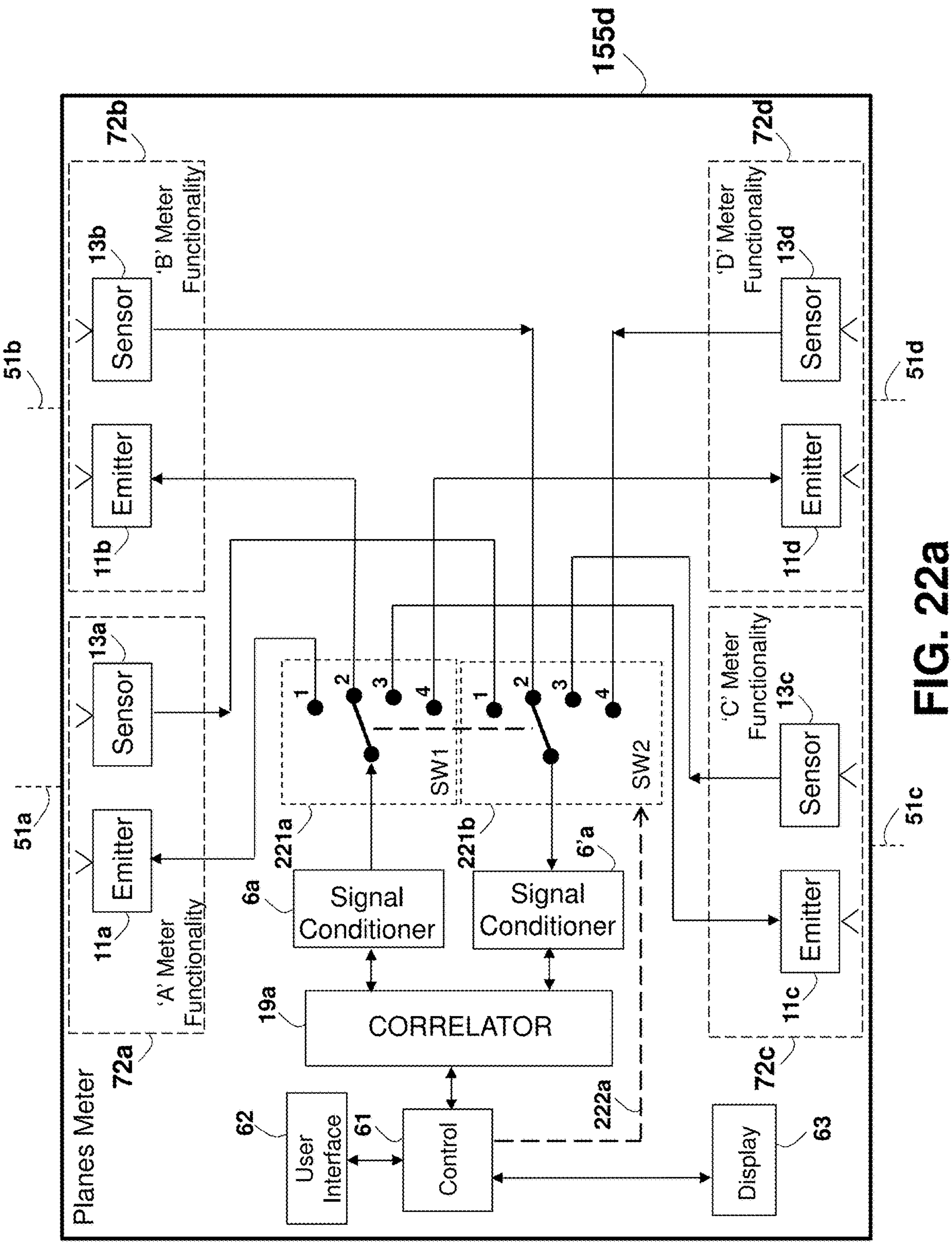
FIG. 22*a* illustrates a simplified schematic block diagram of a planes meter using four distance meters sharing a correlator.

Similar to the angle meters 55*d* to 55*j* respectively shown in FIGS. 7*a* to 7*f*, various functions and components may be shared between the distance meters. For example, similar to, and based on, the angle meter 55*d* shown in FIG. 7*a*, each of the distance meter functionalities may comprise only an emitter and a sensor, while sharing signal conditioners and a correlator. The planes meter 155*d* shown in FIG. 22*a* comprises the 'A' meter functionality 72*a* that comprises the emitter 11*a* and the sensor 13*a*, the 'B' meter functionality 72*b* that comprises the emitter 11*b* and the sensor 13*b*, a 'C' meter functionality 72*c* that comprises the emitter 11*c* and the sensor 13*c*, and a 'D' meter functionality 72*d* that comprises the emitter 11*d* and the sensor 13*d*. A single pole four throes switch SW1 221*a* switch is used to connect the signal conditioner 6*a* to the various emitters one at a time, and a single pole four throes switch SW2 221*b* switch is used to connect the signal conditioner 6'*a* to the sensors emitters one at a time. A single two-pole four throws switch may be used consisting of both switches. The switches SW1 221*a* and SW2 221*b* are controlled by the control 61 via a control line (or connection) 222*a*. Similarly, other sharing schemes may be used, using other functionalities arrangements.

Figure 22B:
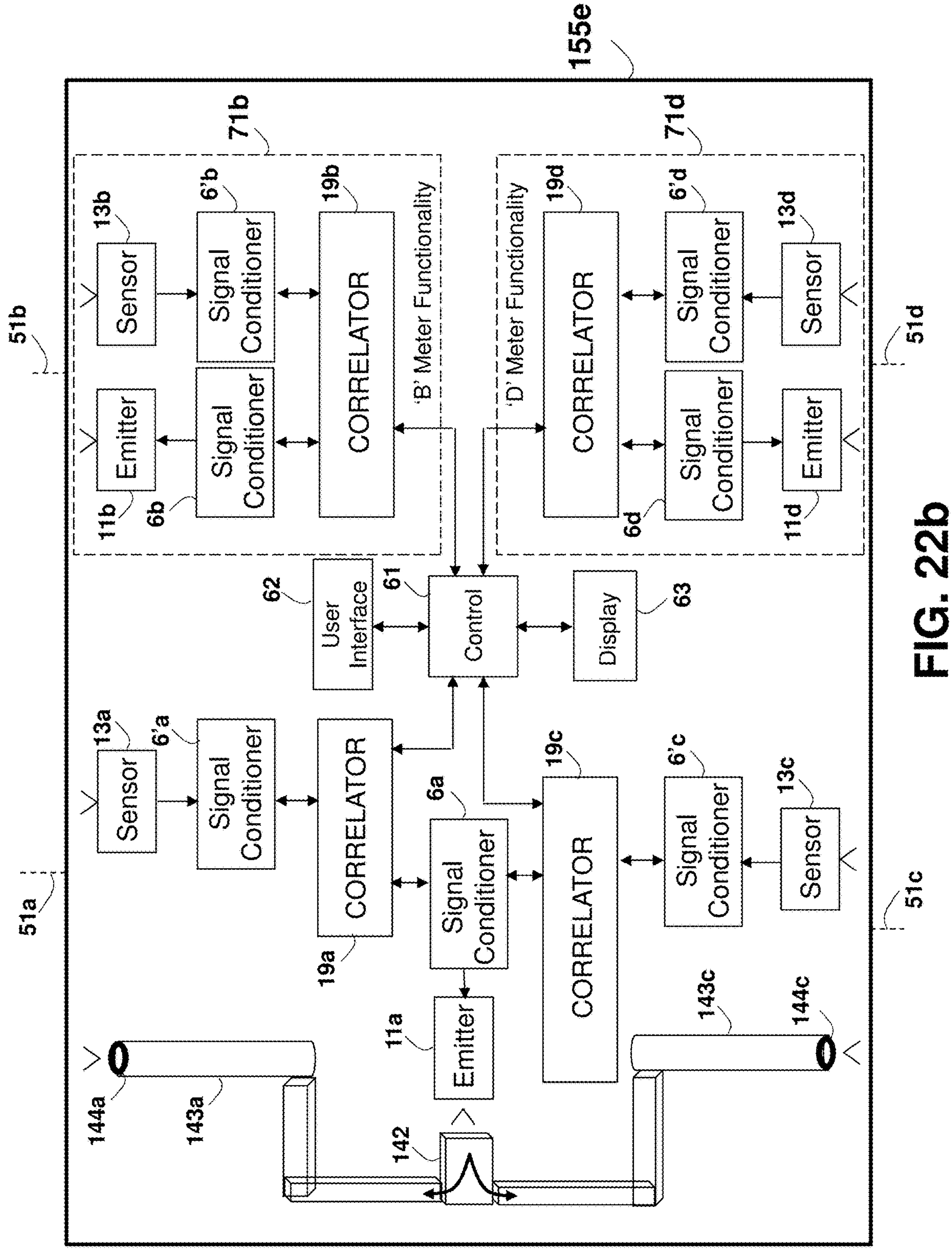
FIG. 22*b* illustrates a simplified schematic block diagram of a planes meter using four distance meter functionalities, where a single emitter is shared by two functionalities.

The planes meter 155*c* shown in FIG. 22 comprises four distinct emitters 11*a*, 11*b*, 11*c*, and 11*d* respectively coupled to the four signal conditioners 6*a*, 6*b*, 6*c*, and 6*d*, and are part of the respective meter functionalities 71*a*, 71*b*, 71*c*, and 71*d*. Similar to the part of the angle meter 55*r* shown in FIG. 14, a single emitter may be shared by two or more meter functionalities, as described regarding a planes meter 155*e* shown in FIG. 22*b*. A single emitter 11*a*, coupled to a single signal conditioner 6*a*, is used by both the 'A' Meter Functionality 71*a* and the 'C' Meter Functionality 71*c*. A splitter or power divider 142 received the waves emitted by the emitter 11*a* and split into two parts, one part is guided via the waveguide 143*a* and emitter via the opening 144*a* as a substitute to the emitter 11*a* in the 'A' Meter Functionality 71*a* of the planes meter 155*c*, and the other part is guided via the waveguide 143*c* and emitted via the opening 144*c* as a substitute to the emitter 11*c* in the 'C' Meter Functionality 71*c* of the planes meter 155*c*. While exampled regarding a single emitter 11*a* shared by two functionalities, a single emitter 11*a* may be shared by three or more functionalities. In one example, a single emitter may be used by the planes meter 155*c* serving the four meter functionalities 71*a*, 71*b*, 71*c*, and 71*d*. In such a scheme, the splitter 142 is substituted with a four-way splitter or divider feeding four waveguides to route each of the four generated waves to the respective opening or position, substituting the four emitters 11*a*, 11*b*, 11*c*, and 11*d*.

Figure 22C:
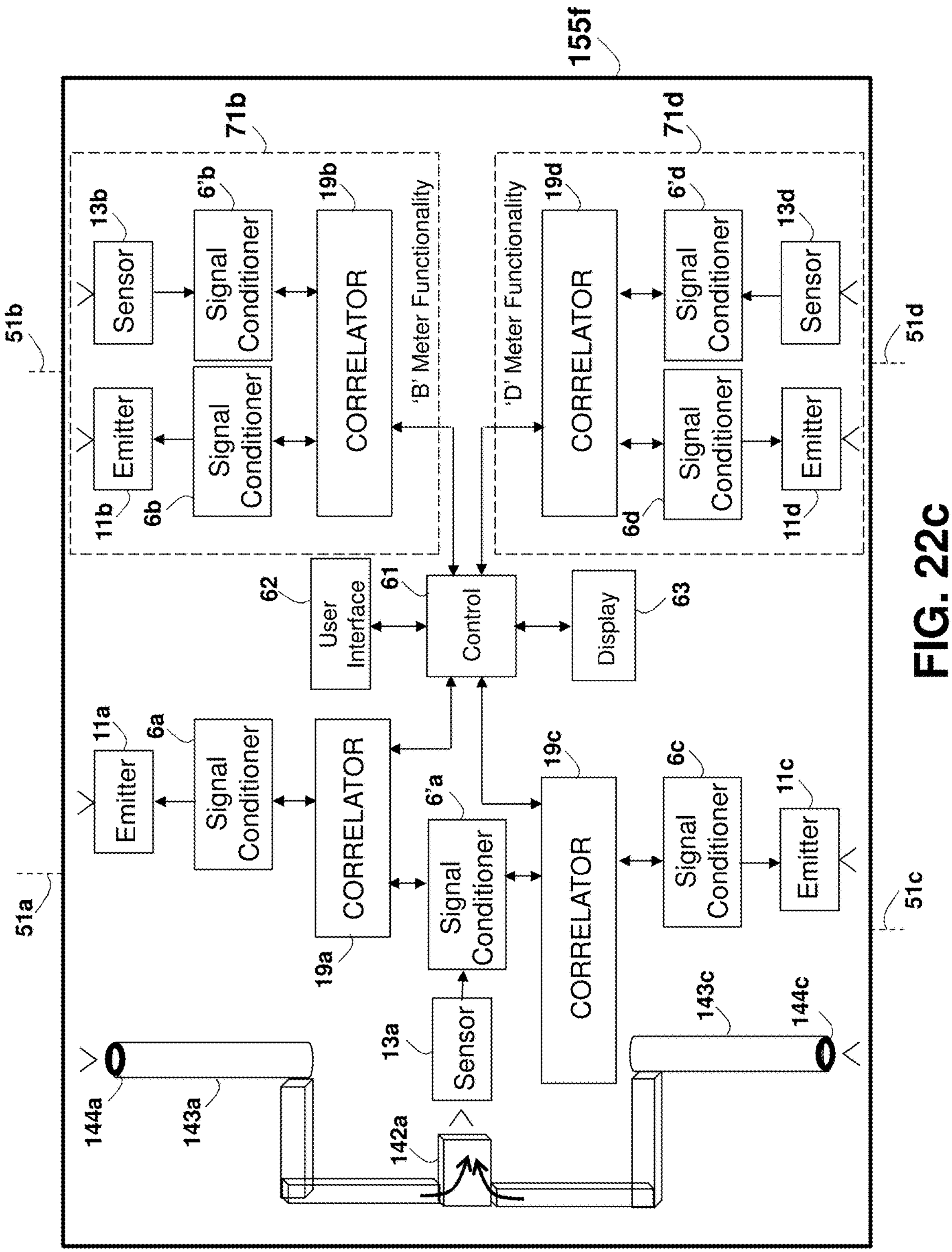
FIG. 22*c* illustrates a simplified schematic block diagram of a planes meter using four distance meter functionalities, where a single sensor is shared by two functionalities.

The planes meter 155*c* shown in FIG. 22 comprises four distinct sensors 13*a*, 13*b*, 13*c*, and 13*d* respectively coupled to the four signal conditioners 6'*a*, 6'*b*, 6'*c*, and 6'*d*, and are part of the respective meter functionalities 71*a*, 71*b*, 71*c*, and 71*d*. Similar to the part of the angle meter 55*s* shown in FIG. 14*a*, a single sensor may be shared by two or more meter functionalities, as described regarding a planes meter 155*f* shown in FIG. 22*c*. A single sensor 13*a*, coupled to a single signal conditioner 6'*a*, is used by both the 'A' Meter Functionality 71*a* and the 'C' Meter Functionality 71*c*. Waves signal received via the opening 144*a* is guided via the waveguide 143*a* and emitted via the combiner (or splitter serving as a combiner) 142*a* to the sensor 13*a*, serving as a substitute to the sensor 13*a* in the 'A' Meter Functionality 71*a* of the planes meter 155*c*. Waves signal received via the opening 144*c* is guided via the waveguide 143*c* and emitted via the combiner (or splitter serving as a combiner) 142*a* to the sensor 13*a*, serving as a substitute to the sensor 13*c* in the 'C' Meter Functionality 71*c* of the planes meter 155*c*. The splitter or power divider 142*a* (acting as combiner) received the waves from the various waveguides and direct them to the sensor 13*a*. While exampled regarding a single sensor 13*a* shared by two functionalities, a single sensor 13*a* may be shared by three or more functionalities. In one example, a single sensor may be used by the planes meter 155*c* serving the four meter functionalities 71*a*, 71*b*, 71*c*, and 71*d*. In such a scheme, the combiner 142*a* is substituted with a four-way combiner that may be fed from four waveguides to route each of the four received waves from the respective opening or position to the single sensor 13*a*, substituting the four sensors 13*a*, 13*b*, 13*c*, and 13*d*.

Figure 23:
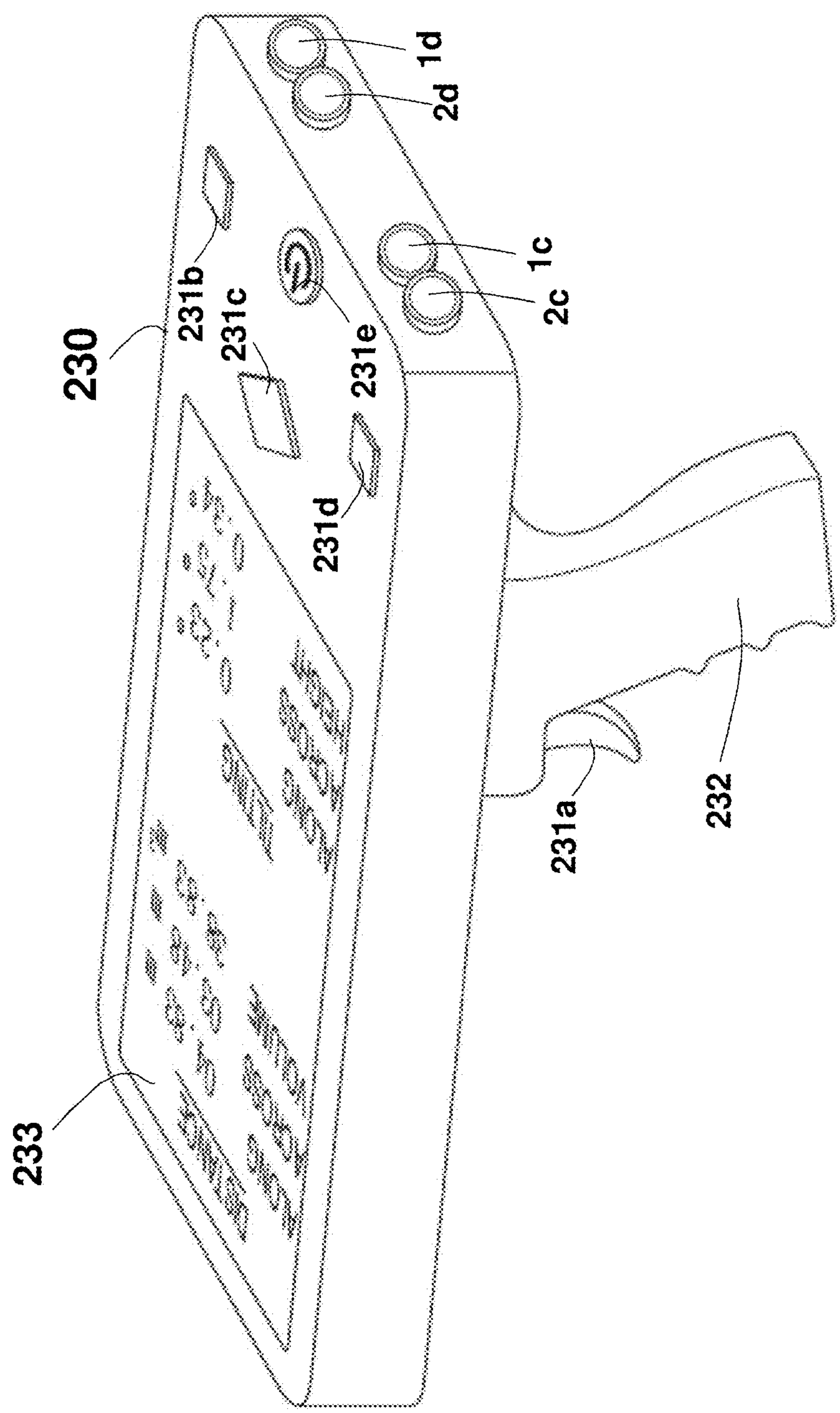
FIG. 23 depicts pictorially a perspective view of a planes meter measuring along the longitudinal axis of the enclosure.
Figure 23A:
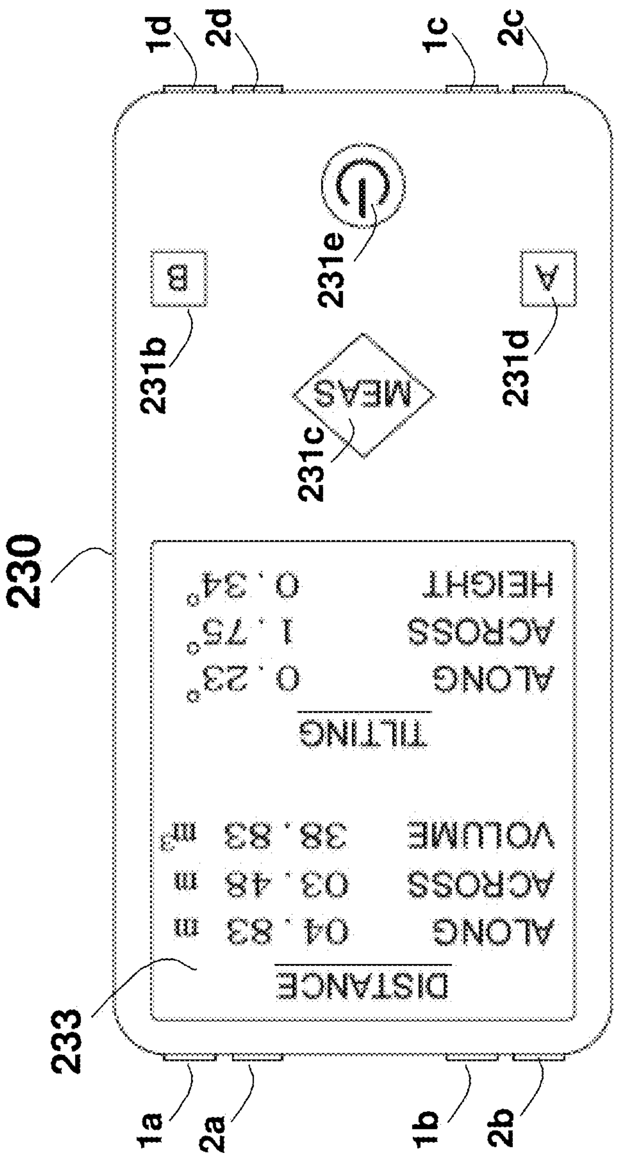
FIG. 23*a* depicts pictorially a top view of a planes meter measuring along the longitudinal axis of the enclosure.
Figure 23B:
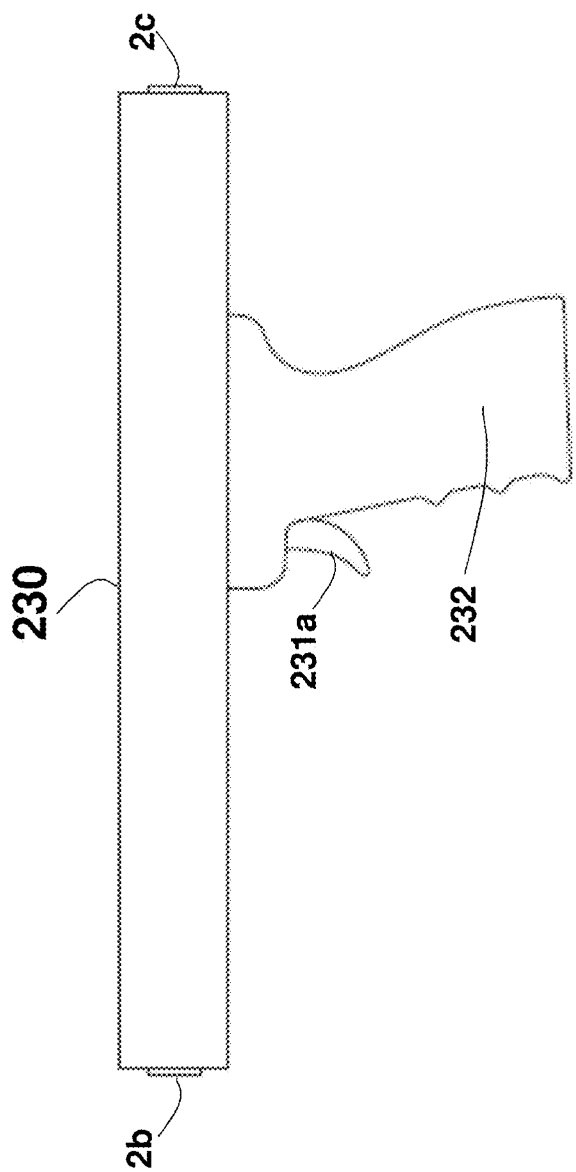
FIG. 23*b* depicts pictorially a side view of a planes meter measuring along the longitudinal axis of the enclosure.
Figure 23C:
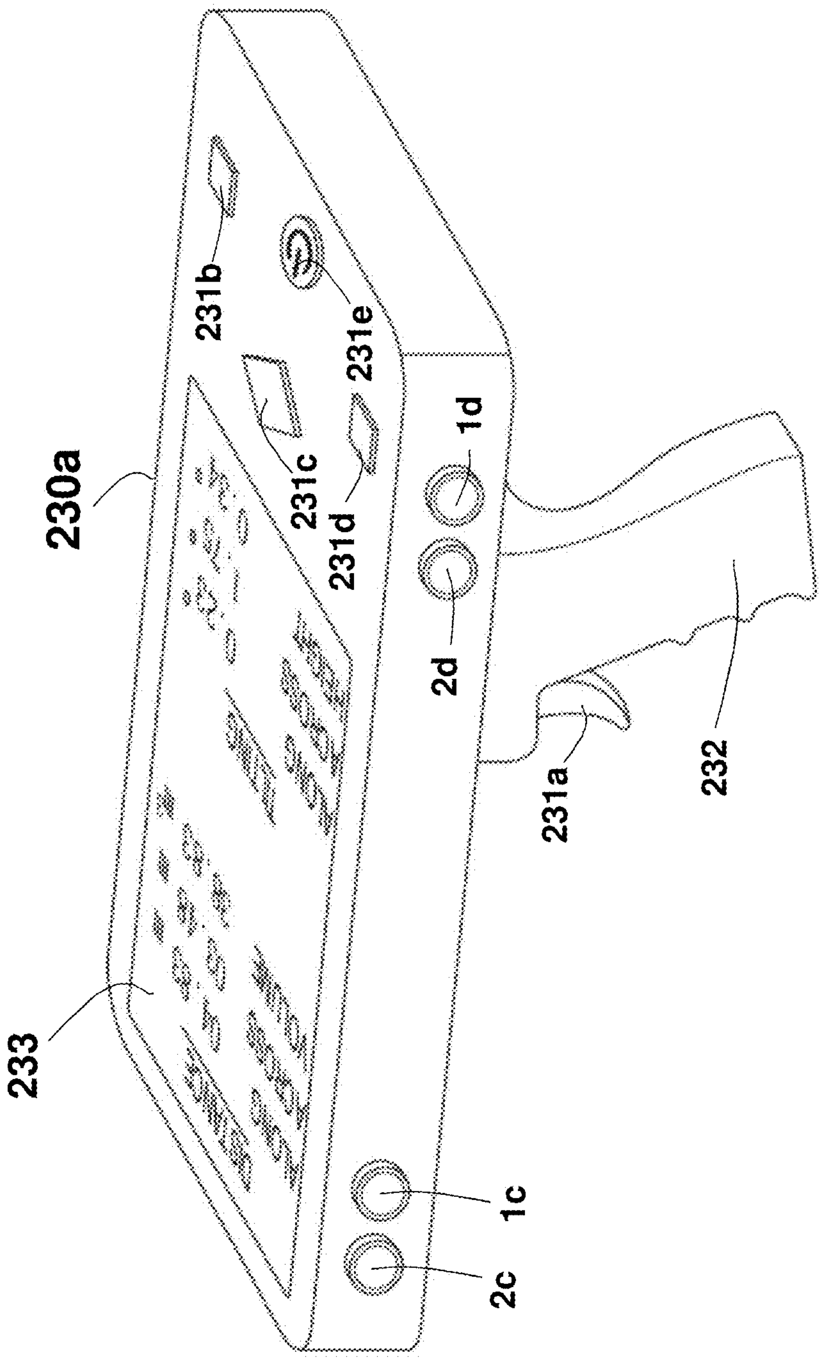
FIG. 23*c* depicts pictorially a perspective view of a planes meter measuring laterally to the longitudinal axis side of the enclosure.
Figure 23D:
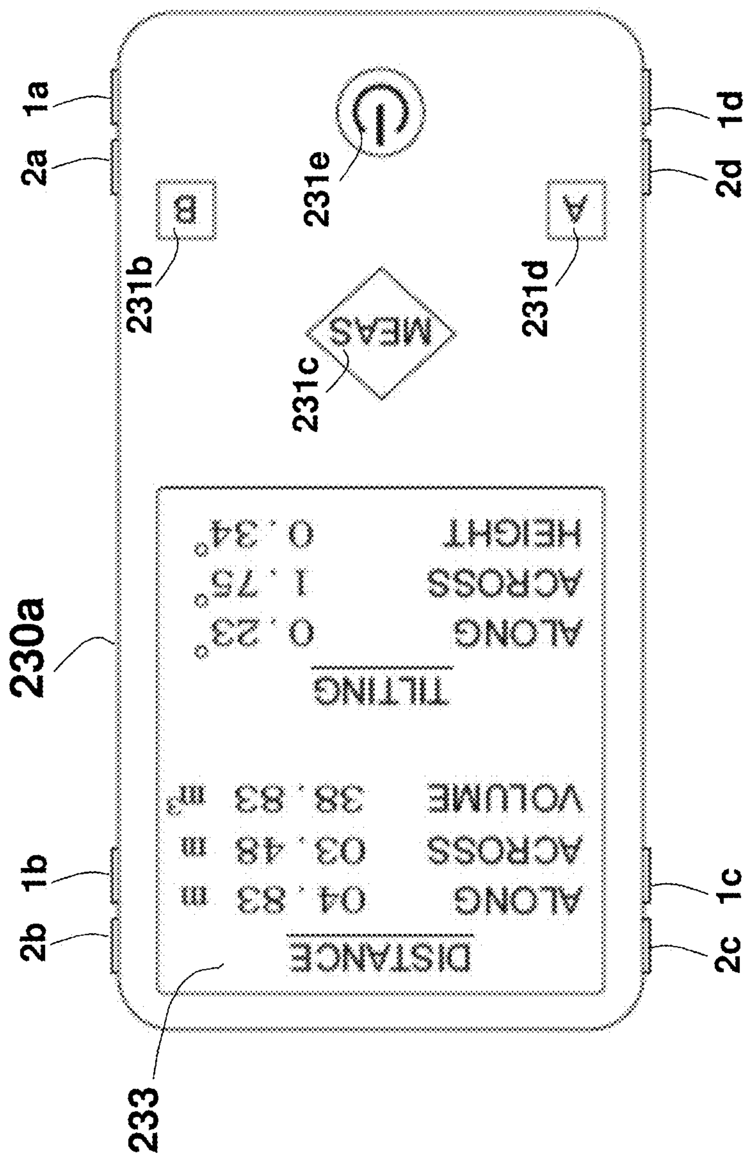
FIG. 23*d* depicts pictorially a top view of a planes meter measuring laterally to the longitudinal axis side of the enclosure.
Figure 23E:
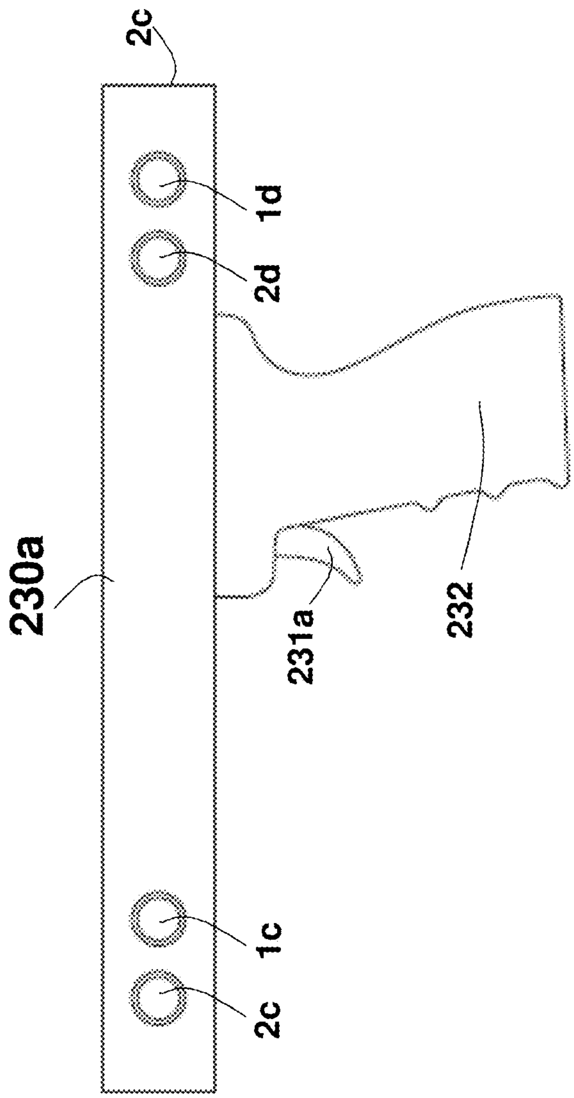
FIG. 23*e* depicts pictorially a side view of a planes meter measuring laterally to the longitudinal axis side of the enclosure.

An example of a planes meter is pictorially shown in FIGS. 23-23*e*. The shown devices may correspond to any angle or planes meter disclosed herein, such as the planes meter 155*c* shown in FIG. 22. A perspective side view of a planes meter 230, which may correspond to any angle or planes meter disclosed herein, such as the planes meter 155*c* shown in FIG. 22, is pictorially shown in FIG. 23, a top view is shown in FIG. 23*a*, and a side view is shown in FIG. 23*b*. The enclosure is shaped as a hand-held 'pistol'-like shape, having a handle 232 to be hand grabbed by a user. The user may control, activate, or trigger the planes meter 230 using various switches and buttons, which may correspond to the user interface functionality 62. The planes meter 230 activation may use a trigger switch 231*a*, and further comprises a button 231*e* (that may be an on/off switch), a button 231*b*, a button 231*c*, and button 231*d*, which may be mounted or accessed on the top side of the enclosure when held using the handle 232. The planes meter 230 further comprises on the top side a display 233 that may correspond to the display 63, for displaying measured or calculated values.

An emitting aperture 1*c* and a sensing aperture 2*c*, as well as an emitting aperture 1*d* and a sensing aperture 2*d* are shown on the rear side of the planes meter 230 (when held by the handle 232), For example, the emitting aperture 1*c* and the sensing aperture 2*c* may respectively correspond to the emitting path and the sensing path of the distance meter 'C' 71*c* that is part of the planes meter 155*c*, and the emitting aperture 1*d* and the sensing aperture 2*d* may respectively correspond to the emitting path and the sensing path of the distance meter 'D' 71*d* that is part of the planes meter 155*c*. An emitting aperture 1*a* and a sensing aperture 2*a*, as well as an emitting aperture 1*b* and a sensing aperture 2*b* are shown on the front side of the planes meter 230 (when held by the handle 232), For example, the emitting aperture 1*a* and the sensing aperture 2*a* may respectively correspond to the emitting path and the sensing path of the distance meter 'A' 71*a* that is part of the planes meter 155*c*, and the emitting aperture 1*b* and the sensing aperture 2*b* may respectively correspond to the emitting path and the sensing path of the distance meter 'B' 71*b* that is part of the planes meter 155*c*.

While the planes meter 230 is exampled where the measurement lines are along the longitudinal axis of the enclosure, a planes meter may be designed so that the measurement lines may be directed to any direction, such as a planes meter 230*a* shown in FIGS. 23*c*-23*e*, where the measurement lines are perpendicular to the longitudinal axis of the enclosure. A perspective side view of a planes meter 230*a*, which may correspond to any angle or planes meter disclosed herein, such as the planes meter 155*c* shown in FIG. 22, is pictorially shown in FIG. 23*c*, a top view is shown in FIG. 23*d*, and a side view is shown in FIG. 23*e*.

The apparatuses (such as devices, systems, modules, or any other arrangement) described herein may be used in a residential environment, such as in a residential building. Alternatively or in addition, the devices, systems, modules, or any apparatuses described herein may be used in a vehicle or in a vehicular environment, and may be part of, integrated with, or connect to, automotive electronics in the vehicle. A vehicle is typically a mobile unit designed or used to transport passengers or cargo between locations, such as bicycles, cars, motorcycles, trains, ships, aircrafts, boats, and spacecrafts. The vehicle may be travelling on land, over or in liquid such as water, or may be airborne. The devices, systems, modules, or any apparatuses described herein may be used to measure, detect, or sense distance, angle, area, volume, speeds, or any functions or combinations thereof, of objects or surfaces in the vehicle, external to the vehicle, or in the surroundings around the vehicle.

The vehicle may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The apparatuses described herein may be used to control, monitor or otherwise be part of, or communicate with, the vehicle motion system. Similarly, any apparatus described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically, automobiles have four wheels, and are constructed to principally transport people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

The apparatuses (such as devices, systems, modules, or any other arrangement) described herein may consist of, be integrated with, be connected to, or be communicating with, an ECU, which may be an Electronic/engine Control Module (ECM) or Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed control unit (SCU), Telematic Control Unit (TCU), Transmission Control Unit (TCU), Brake Control Module (BCM; ABS or ESC), Battery management system, control unit, or control module.

Any ECU herein may comprise a software, such as an operating system or middleware that may use, may comprise, or may be according to, a part or whole of the OSEK/VDX, ISO 17356-1, ISO 17356-2, ISO 17356-3, ISO 17356-4, ISO 17356-5, or AUTOSAR standards, or any combination thereof.

Any one of the apparatuses described herein, such as a meter, device, module, or system, may be part of, integrated or communicating with, or connected or coupled to, an ADAS system or functionality. In one example, the apparatus may be used for measuring, sensing, or detecting distance, angle, speed, timing, or any other function or combination thereof, of an object, that may be another vehicle, a road, a curb, an obstacle, or a person (such as a pedestrian). For example, any one of the apparatuses described herein, such as a meter, device, module, or system, may be part of, integrated or communicating with, or connected or coupled to, the ADAS system, application, or functionality that may be Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system (such as Pre-crash system), Collision Imminent Braking (CM), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), or Wrong-way driving warning. Alternatively or in addition, the output (or any manipulation of function thereof) of any one of the apparatuses described herein, such as a meter, device, module, or system, may be notified to a person that may be a vehicle driver or operator (such as a car driver, an airplane pilot, or a remote controller or operator of an unmanned vehicle), such as by displaying a value or a warning, such as by using the display 63, or otherwise as part of the 'Output Values' step 84. In one example, the person is notified by activating or operating an actuator that provides visual, audible, or haptic indication or notification. For example, a driver may be alerted to pay an extra attention when the vehicle is getting too close to another vehicle or an obstacle, or when a close proximity is predicted in a near future, such as by 'beeping' or flashing light.

Figure 24:
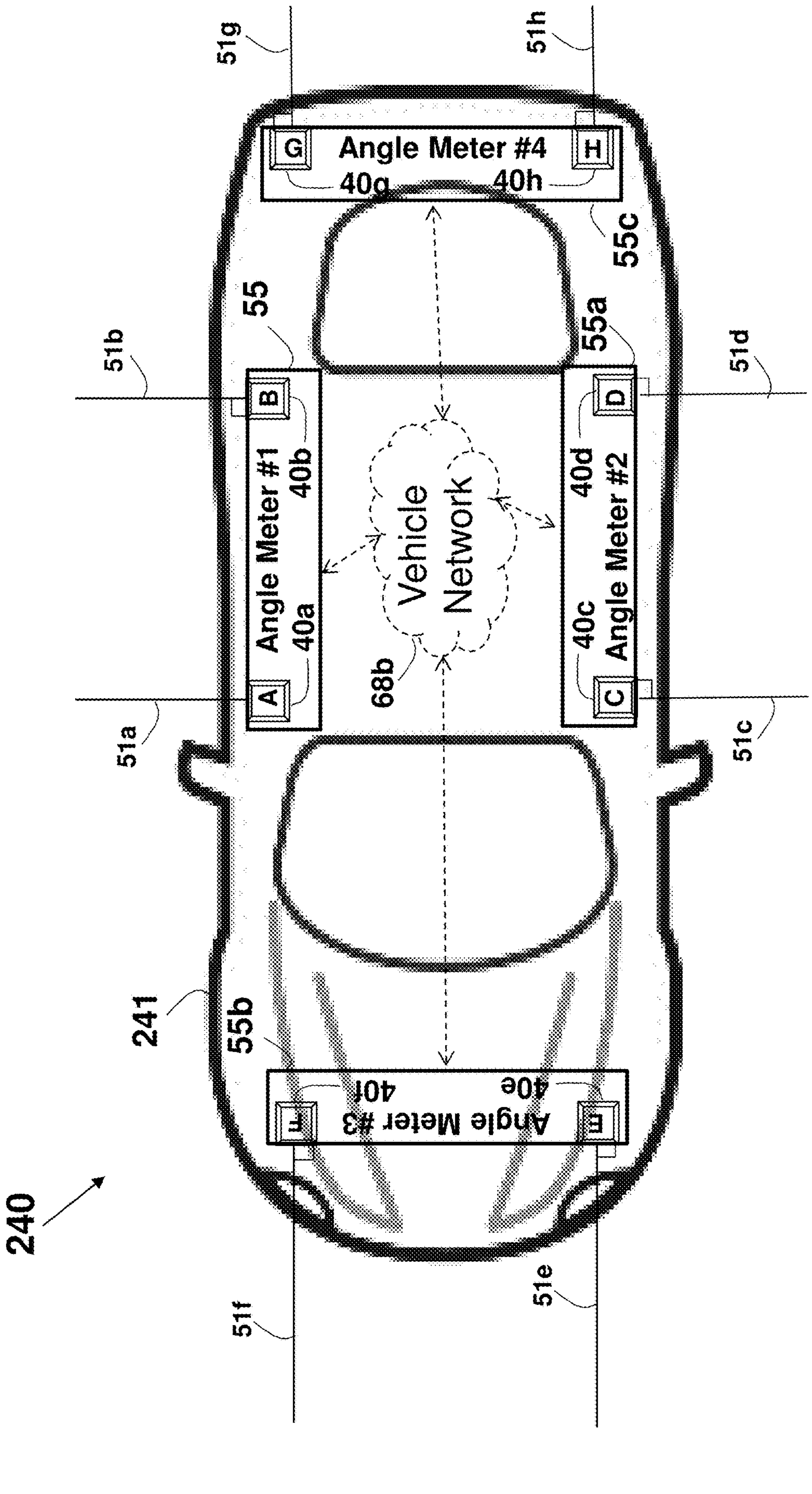
FIG. 24 depicts schematically a top view of a passenger car employing multiple angle meters connected to a vehicle network.

An example of a vehicle may be a passenger car 241 that is shown as part of an arrangement 240 in FIG. 24. The car 241 includes the angle meter #3 55*b* that comprises the distance meter 'E' 40*e* and the distance meter 'F' 40*f*, respectively measuring the distances along the measurement lines 51*e* and 51*f*, directed to the front of the car 241, and as such may detect and measure objects along the normal movement direction of the car 241. Similarly, the car 241 includes the angle meter #4 55*c* that comprises the distance meter 'H' 40*h* and the distance meter 'G' 40*g*, respectively measuring the distances along the measurement lines 51*h* and 51*g*, directed to the rear of the car 241, and as such may detect and measure objects approaching to the car 241. Similarly, the car 241 includes the angle meter #1 55 that comprises the distance meter 'A' 40*a* and the distance meter 'B' 40*b*, respectively measuring the distances along the measurement lines 51*a* and 51*b*, directed to the right side of the car 241, and as such may detect and measure objects approaching to the car 241 from its right side. Similarly, the car 241 includes the angle meter #2 55*a* that comprises the distance meter 'C' 40*c* and the distance meter 'D' 40*d*, respectively measuring the distances along the measurement lines 51*c* and 51*d*, directed to the left side of the car 241, and as such may detect and measure objects approaching to the car 241 from its left side. The angle meters shown in the arrangement 240 in the car 241 may communicate with each other and with other ECUs in the car 241 over a vehicle network 68*b*, that may be a vehicle bus. While four angle meters 55, 55*a*, 55*b*, and 55*c* are described as part of the arrangement 240, any number of angle meters may be equally used. For example, a single angle meter, such as using only the angle meter #3 55*b* for sensing object in front of the car 241, or using only the angle meter #4 55*c* for sensing object in rear of the car 241. Further, two angle meters may be used, such as those along the longitudinal axis of the car, such as using the front angle meter #3 55*b* and the rear angle meter #4 55*c*. Alternatively or in addition, a single angle meter, such as using only the right angle meter #1 55 for sensing object to the right side of the car 241, or using only the left angle meter #2 55*a* for sensing object to the left side of the car 241. Further, two angle meters may be used, such as those along the widthwise axis of the car, such as using the right angle meter #1 55 and the left angle meter #2 55*a*.

The network 68*b* may be a vehicle bus or any other in-vehicle network. A connected element comprises a transceiver for transmitting to, and receiving from, the network. The physical connection typically involves a connector coupled to the transceiver. The vehicle bus 68*b* may consist of, may comprise, may be compatible with, may be based on, or may use a Controller Area Network (CAN) protocol, specification, network, or system. The bus medium may consist of, or comprise, a single wire, or a two-wire such as an UTP or a STP. The vehicle bus may employ, may use, may be compatible with, or may be based on, a multi-master, serial protocol using acknowledgement, arbitration, and error-detection schemes, and may further use synchronous, frame-based protocol.

The network data link and physical layer signaling may be according to, compatible with, based on, or use, ISO 11898-1:2015. The medium access may be according to, compatible with, based on, or use, ISO 11898-2:2003. The vehicle bus communication may further be according to, compatible with, based on, or use, any one of, or all of, ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, or SAE J2411_200002 standards. The CAN bus may consist of, may be according to, compatible with, may be based on, compatible with, or may use a CAN with Flexible Data-Rate (CAN FD) protocol, specification, network, or system.

Alternatively or in addition, the vehicle bus 68*b* may consist of, may comprise, may be based on, may be compatible with, or may use a Local Interconnect Network (LIN) protocol, network, or system, and may be according to, may be compatible with, may be based on, or may use any one of, or all of, ISO 9141-2:1994, ISO 9141:1989, ISO 17987-1, ISO 17987-2, ISO 17987-3, ISO 17987-4, ISO 17987-5, ISO 17987-6, or ISO 17987-7 standards. The battery power-lines or a single wire may serve as the network medium, and may use a serial protocol where a single master controls the network, while all other connected elements serve as slaves.

Alternatively or in addition, the vehicle bus 68*b* may consist of, may comprise, may be compatible with, may be based on, or may use a FlexRay protocol, specification, network or system, and may be according to, may be compatible with, may be based on, or may use any one of, or all of, ISO 17458-1:2013, ISO 17458-2:2013, ISO 17458-3:2013, ISO 17458-4:2013, or ISO 17458-5:2013 standards. The vehicle bus may support a nominal data rate of 10 Mb/s, and may support two independent redundant data channels, as well as independent clock for each connected element.

Alternatively or in addition, the vehicle bus 68*b* may consist of, may comprise, may be based on, may be compatible with, or may use a Media Oriented Systems Transport (MOST) protocol, network or system, and may be according to, may be compatible with, may be based on, or may use any one of, or all of, MOST25, MOST50, or MOST150. The vehicle bus may employ a ring topology, where one connected element is the timing master that continuously transmit frames where each comprises a preamble used for synchronization of the other connected elements. The vehicle bus may support both synchronous streaming data as well as asynchronous data transfer. The network medium may be wires (such as UTP or STP), or may be an optical medium such as Plastic Optical Fibers (POF) connected via an optical connector.

Figure 24A:
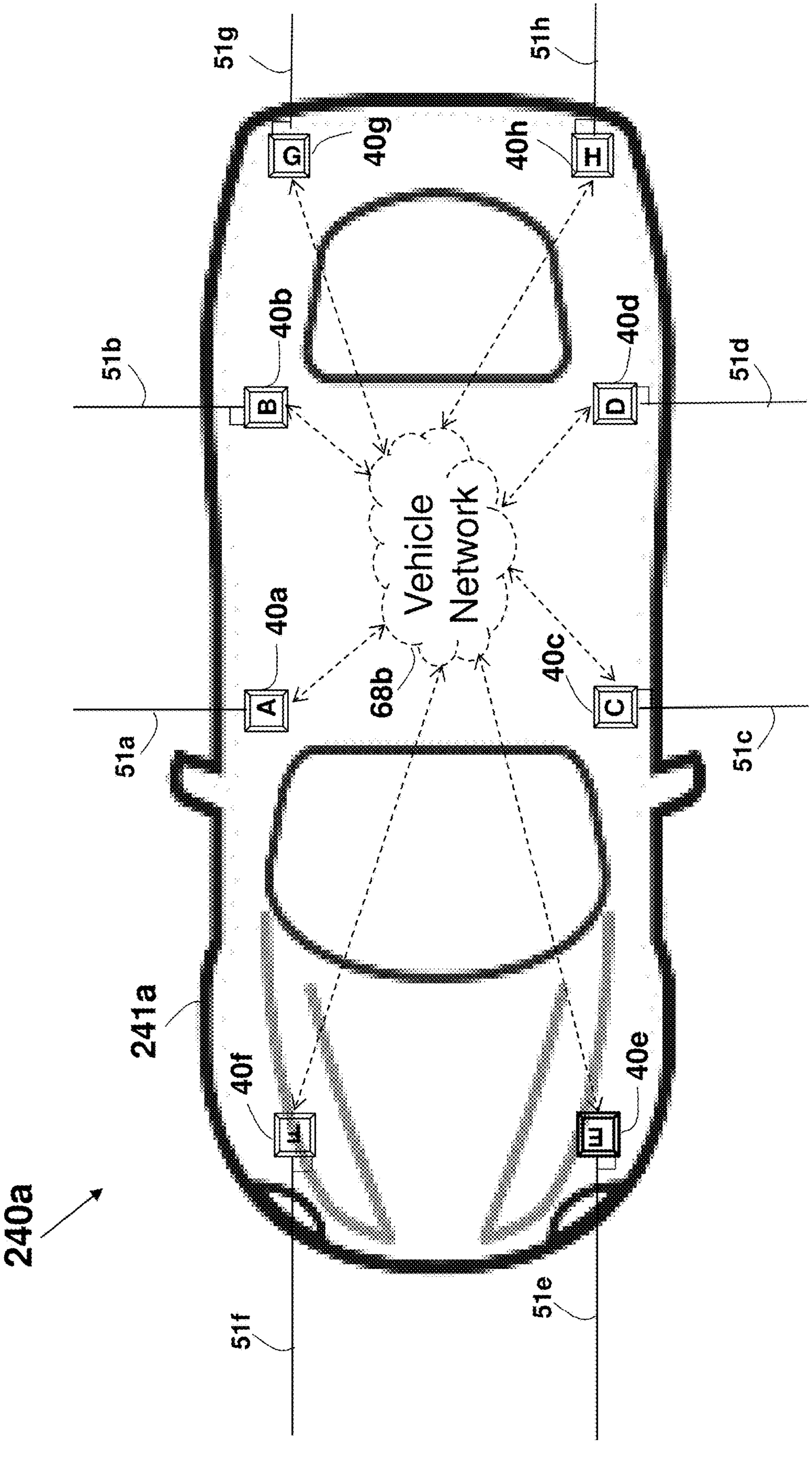
FIG. 24*a* depicts schematically a top view of a passenger car employing multiple distance meters connected to a vehicle network.

Similar to the arrangement 55*c* shown in FIG. 6*c* above, the angle meters functionalities in a vehicle may be implemented using independently operated or enclosed distance meters interconnected over a network. Such an arrangement 240*a* is shown in FIG. 24*a*, illustrating a passenger car 241*a* having capabilities that are the same or similar to the car 240 shown as part of the arrangement 240, where the distance meters are coupled or connected to the in-vehicle network 68*b*, such as for receiving commands to initiate distance (and/or Doppler shifts) measurements, or any function or manipulation thereof, and for transmitting the measured distances (and/or Doppler shifts), or any function or manipulation thereof, to a processor or a central unit for using the measured values to calculate other characteristics or values such as angles. In such a scheme 240*a*, the measurements may be received by a single central processor that may be part of an ECU.

Figure 24B:
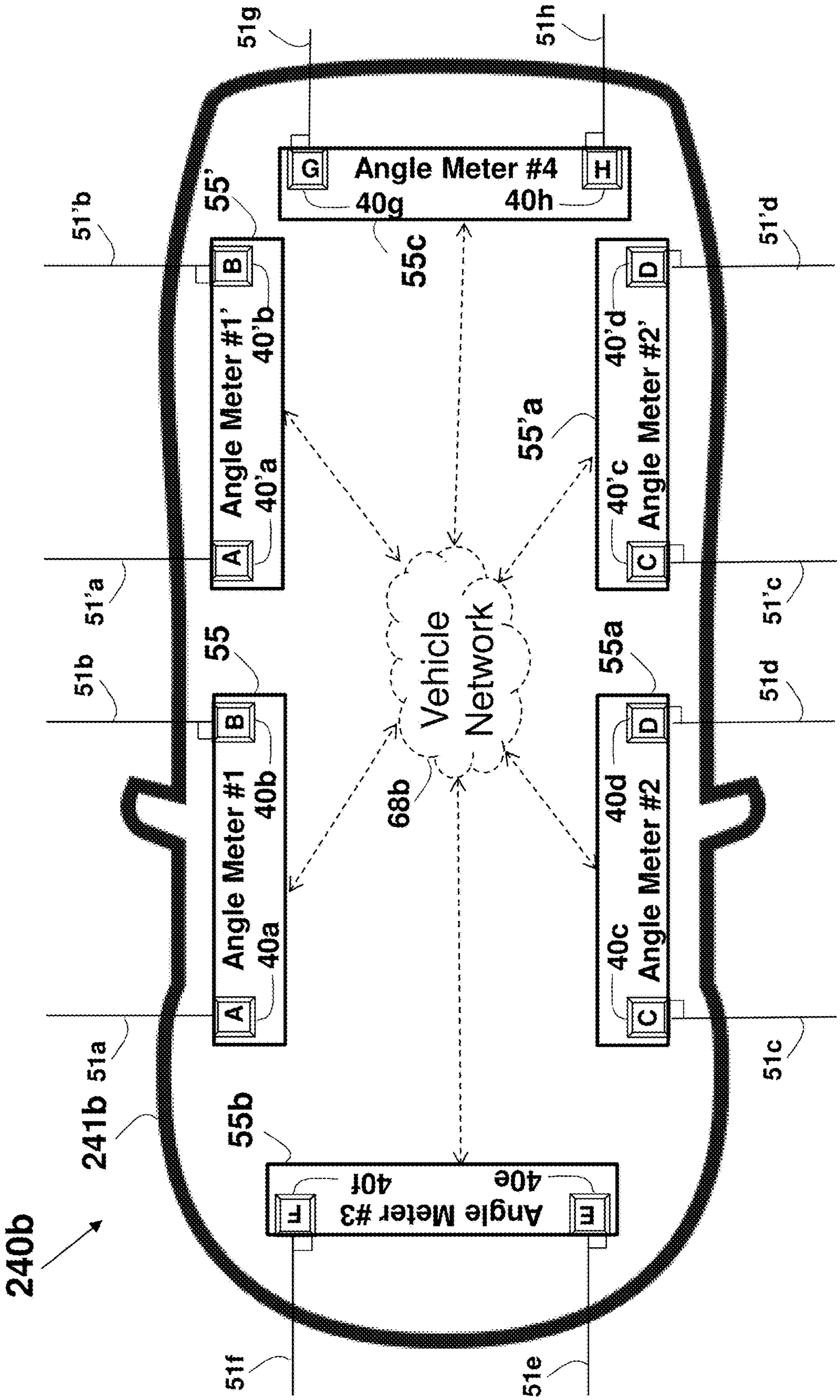
FIG. 24*b* depicts schematically a top view of a passenger car employing multiple angle meters pointing at the same direction connected to a vehicle network.

While in the arrangements 240 and 240*a* in the respective FIGS. 24 and 24*a*, a single angle meter is illustrated for each direction, such as only the angle meter #3 55*b* directed to the front, only the angle meter #4 55*c* directed to the rear, only the angle meter #1 55 directed to the right, and only the angle meter #2 55*a* directed to the left, two or more angle meters may be equally used in any single direction, and similarly three or more distance meters may be used for any direction. Such an example is shown as part of an arrangement 240*b* shown in FIG. 24*b*, illustrating a car 241*b* where two angle meters are used for each side of the car 241*b*. An angle meter #1' 55' (including a distance meter 'A' 40'*a* and a distance meter 'B' 40'*b*) is added for measuring along measurement lines 51'*a* and 51'*b* towards the right side of the car 241*b*, forming a total of two angle meters towards the right side of the car 241*b*. Similarly, an angle meter #2' 55'*a* (including a distance meter 'C' 40'*c* and a distance meter 'D' 40'*d*) is added for measuring along measurement lines 51'*c* and 51'*d* towards the left side of the car 241*b*, forming a total of two angle meters towards the left side of the car 241*b*. Similarly, more angle meters may be added directed towards the front or rear of the car 241*b*.

Figure 24C:
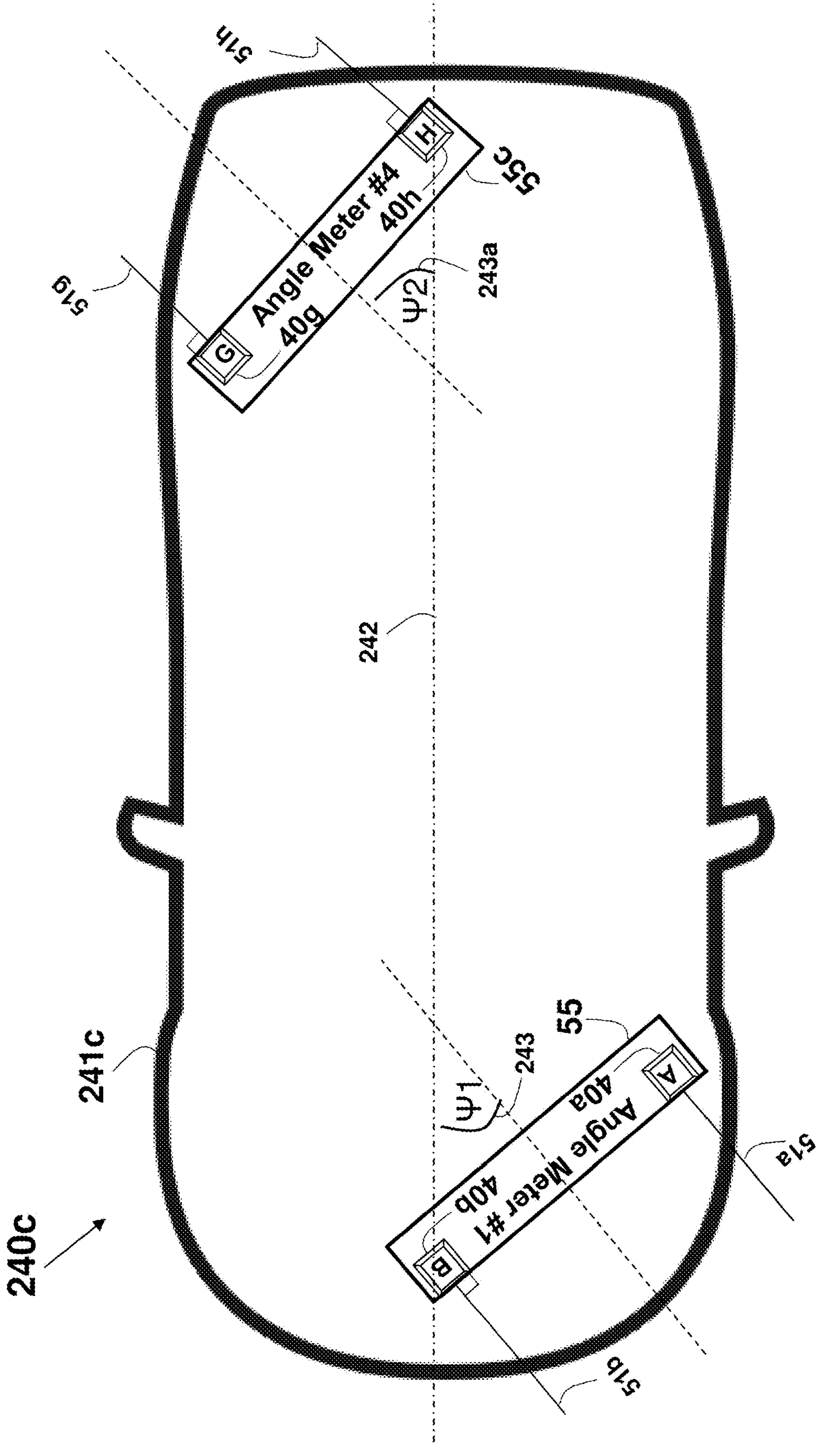
FIG. 24*c* depicts schematically a top view of a passenger car employing multiple angle meters pointing at directions deviating from the main axes of the passenger car.

While in the arrangement 240*b* in the FIG. 24*b*, the angle meters were mounted in the car 241*b* so that the distances are measured along the main longitudinal and widthwise axes of the car, any mounting allowing any measurement lines direction may be equally used. In an example shown as part of an arrangement 240*c* shown in FIG. 24*c*, illustrating a car 241*c* is illustrated having a longitudinal axis 242. In this scheme, the angle meter #1 55 is mounted directed towards the front-left side of the car 241*c* deviated by an angle ψ1 243 from the main axis 242. Similarly, the angle meter #4 55*c* is mounted directed towards the rear-right side of the car 241*c* deviated by an angle ψ2 243*a* from the main axis 242. The arrangement 240*b* may be considered as a private case where the deviation angles (such as the angles ψ1 and ψ2) are 0° (or 180°) or 90° or 270°).

Angle meters may be used to sense, detect, or measure object in the surroundings of a vehicle, such as objects located in front of, or in rear of, the vehicle. In one example, an angle meter such as the angle meter #3 55*b* shown as part of the arrangement 240*b* in FIG. 24*b*, is installed or mounted in front of the vehicle 241*b* so that the measurement lines 51*e* and 51*f* are directed extending from the front of the vehicle 240*b*, in parallel (or substantially parallel) to the vehicle longitudinal axis 242. In such a case, the angle meter #3 55*b* may detect, sense, or measure characteristics of an object in front of the vehicle 241*b*. The angle meter #3 55*b*, the measurement line 51*f*, or the measurement line 51*e*, may be parallel to the longitudinal axis 242, or may deviate from the longitudinal axis 242 by an angle that is less than 20°, 18°, 15°, 13°, 10°, 8°, 5°, 3°, 2°, 1°, 0.8°, 0.5°, 0.3°, 0.2°, or 0.1°. Similarly, the angle ψ1 243 may be less than 20°, 18°, 15°, 13°, 10°, 8°, 5°, 3°, 2°, 1°, 0.8°, 0.5°, 0.3°, 0.2°, or 0.1°. Similarly, an angle meter such as the angle meter #4 55*c* shown as part of the arrangement 240*b* in FIG. 24*b*, is installed or mounted in the rear part of the vehicle 241*b* so that the measurement lines 51*g* and 51*h* are directed extending from the rear of the vehicle 240*b*, in parallel (or substantially parallel) to the vehicle longitudinal axis 242. In such a case, the angle meter #4 55*c* may detect, sense, or measure characteristics of an object in located at the rear of the vehicle 241*b*. The angle meter #4 55*c*, the measurement line 51*g*, or the measurement line 51*h*, may be parallel to the longitudinal axis 242, or may deviate from the longitudinal axis 242 by an angle that is less than 20°, 18°, 15°, 13°, 10°, 8°, 5°, 3°, 2°, 1°, 0.8°, 0.5°, 0.3°, 0.2°, or 0.1°. Similarly, the angle ψ2 243*a* may be less than 20°, 18°, 15°, 13°, 10°, 8°, 5°, 3°, 2°, 1°, 0.8°, 0.5°, 0.3°, 0.2°, or 0.1°.

Alternatively or in addition, angle meters may be used to sense, detect, or measure object in the surroundings of a vehicle, such as objects located at the sides of the vehicle, such as to the right of, or to the left of, the vehicle. In one example, an angle meter such as the angle meter #1 55 shown as part of the arrangement 240*b* in FIG. 24*b*, is installed or mounted at the right side of the vehicle 241*b* so that the measurement lines 51*a* and 51*b* are directed extending laterally from the vehicle 240*b*, being perpendicular (or substantially perpendicular) to the vehicle longitudinal axis 242. In such a case, the angle meter #1 55 may detect, sense, or measure characteristics of an object located at the right side of the vehicle 241*b*. The angle meter #1 55, the measurement line 51*a*, or the measurement line 51*b*, may be lateral to the longitudinal axis 242, or may deviate from being 90° to the longitudinal axis 242 by an angle that is less than 20°, 18°, 15°, 13°, 10°, 8°, 5°, 3°, 2°, 1°, 0.8°, 0.5°, 0.3°, 0.2°, or 0.1°. Similarly, the angle ψ1 243 or the angle ψ2 243*a* may be less than 20°, 18°, 15°, 13°, 10°, 8°, 5°, 3°, 2°, 1°, 0.8°, 0.5°, 0.3°, 0.2°, or 0.1° deviated from the 90° or −90° value. Similarly, an angle meter such as the angle meter #2 55*a* shown as part of the arrangement 240*b* in FIG. 24*b*, is installed or mounted at the left side of the vehicle 241*b* so that the measurement lines 51*c* and 51*d* are directed extending laterally from the vehicle 240*b*, being perpendicular (or substantially perpendicular) to the vehicle longitudinal axis

242. In such a case, the angle meter #2 55*a* may detect, sense, or measure characteristics of an object located at the left side of the vehicle 241*b*. The angle meter #2 55*a*, the measurement line 51*c*, or the measurement line 51*d*, may be lateral to the longitudinal axis 242, or may deviate from being 90° to the longitudinal axis 242 by an angle that is less than 20°, 18°, 15°, 13°, 10°, 8°, 5°, 3°, 2°, 1°, 0.8°, 0.5°, 0.3°, 0.2°, or 0.1°. Similarly, the angle ψ1 243 or the angle ψ2 243*a* may be less than 20°, 18°, 15°, 13°, 10°, 8°, 5°, 3°, 2°, 1°, 0.8°, 0.5°, 0.3°, 0.2°, or 0.1° deviated from the 90° or −90° value.

Any one of the angle meters, distance meters, emitters or sensors in the distance meters, or any part thereof, may be attached to, mounted onto, be part of, or integrated with any part of the vehicle, such as a rear or front view camera, chassis, lighting system, headlamp, door, car glass, windscreen, side or rear window, glass panel roof, hood, bumper, cowling, dashboard, fender, quarter panel, rocker, or spoiler. For example, the angle meter #3 55*b*, the distance meter 'F' 40*f*, the distance meter 'E' 40*e*, the emitter or sensor in the distance meter 'F' 40*f*, or the emitter or sensor in the distance meter 'E' 40*e*, may be attached to, or mounted on, the front bumper. Alternatively or in addition, the angle meter #3 55*b*, the distance meter 'F' 40*f*, the distance meter 'E' 40*e*, the emitter or sensor in the distance meter 'F' 40*f*, or the emitter or sensor in the distance meter 'E' 40*e*, may be attached to, or mounted on, the front headlights or their housings. Similarly, the angle meter #4 55*c*, the distance meter 'G' 40*g*, the distance meter 'H' 40*h*, the emitter or sensor in the distance meter 'G' 40*g*, or the emitter or sensor in the distance meter 'H' 40*h*, may be attached to, or mounted on, the rear lights or their housings. In addition, the angle meter #4 55*c*, the distance meter 'G' 40*g*, the distance meter 'H' 40*h*, the emitter or sensor in the distance meter 'G' 40*g*, or the emitter or sensor in the distance meter 'H' 40*h*, may be attached to, or mounted on, the rear bumper.

Figure 25:
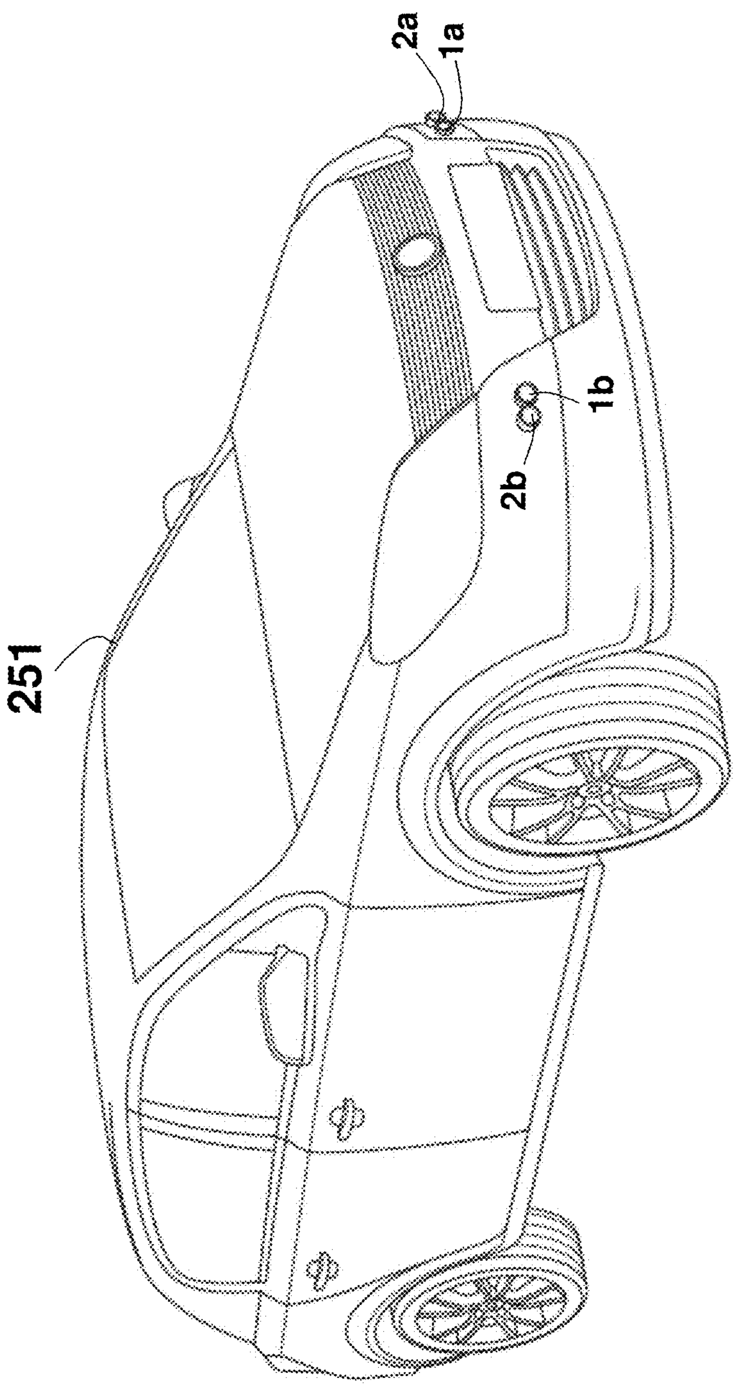
FIG. 25 depicts schematically a perspective front view of a passenger car employing multiple angle meters.
Figure 25A:
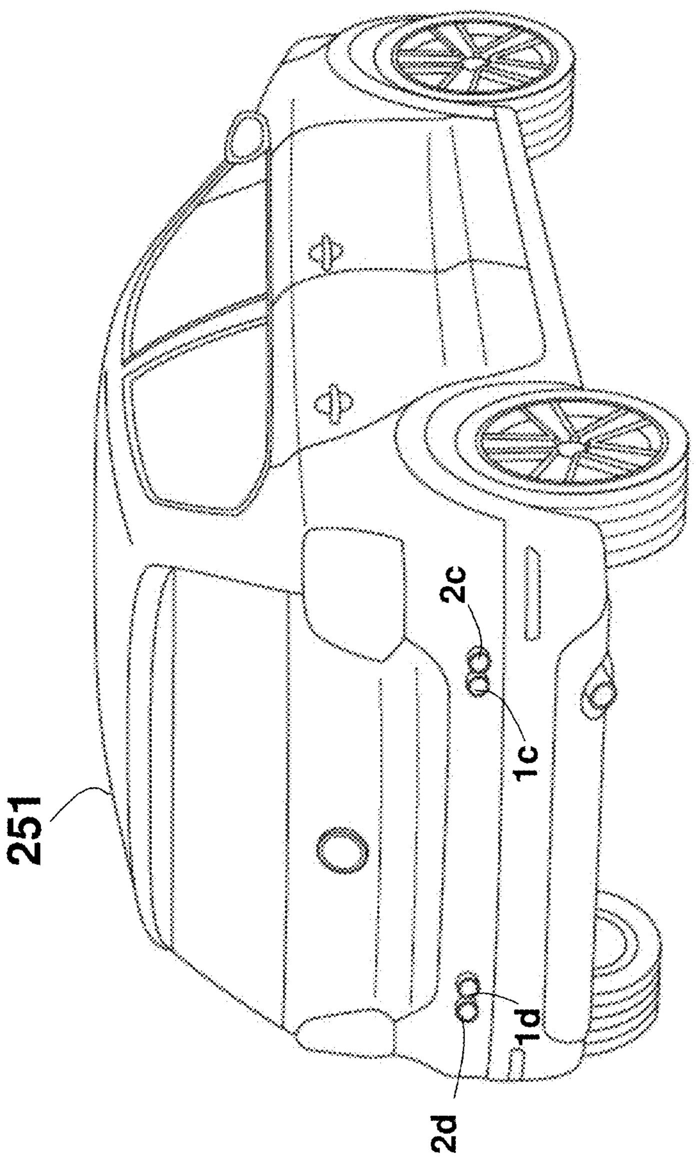
FIG. 25*a* depicts schematically a perspective rear view of a passenger car employing multiple angle meters.

A pictorial perspective front view of a passenger car 251 employing angle meters, which may correspond to the vehicle 240*b* shown in FIG. 24*b*, is shown in FIG. 25. An emitting aperture 1*a* and a sensing aperture 2*a* are shown on the left side of the car 251, and an emitting aperture 1*b* and a sensing aperture 2*b* are shown on the right side of the car 251. For example, the emitting aperture 1*a* and the sensing aperture 2*a* may respectively correspond to the emitting path and the sensing path of the distance meter 'E' 40*e* that is part of the angle meter #3 55*b*, and the emitting aperture 1*b* and the sensing aperture 2*b* may respectively correspond to the emitting path and the sensing path of the distance meter 'F' 40*f* that is part of the angle meter #3 55*b*. Similarly, a pictorial perspective rear view of the passenger car 251 employing angle meters, which may correspond to the vehicle 240*b* shown in FIG. 24*b*, is shown in FIG. 25*a*. An emitting aperture 1*d* and a sensing aperture 2*d* are shown on the left side of the car 251, and an emitting aperture 1*c* and a sensing aperture 2*c* are shown on the right side of the car 251. For example, the emitting aperture 1*c* and the sensing aperture 2*c* may respectively correspond to the emitting path and the sensing path of the distance meter 'G' 40*g* that is part of the angle meter #4 55*c*, and the emitting aperture 1*d* and the sensing aperture 2*d* may respectively correspond to the emitting path and the sensing path of the distance meter 'H' 40*h* that is part of the angle meter #3 55*b*.

Figure 25B:
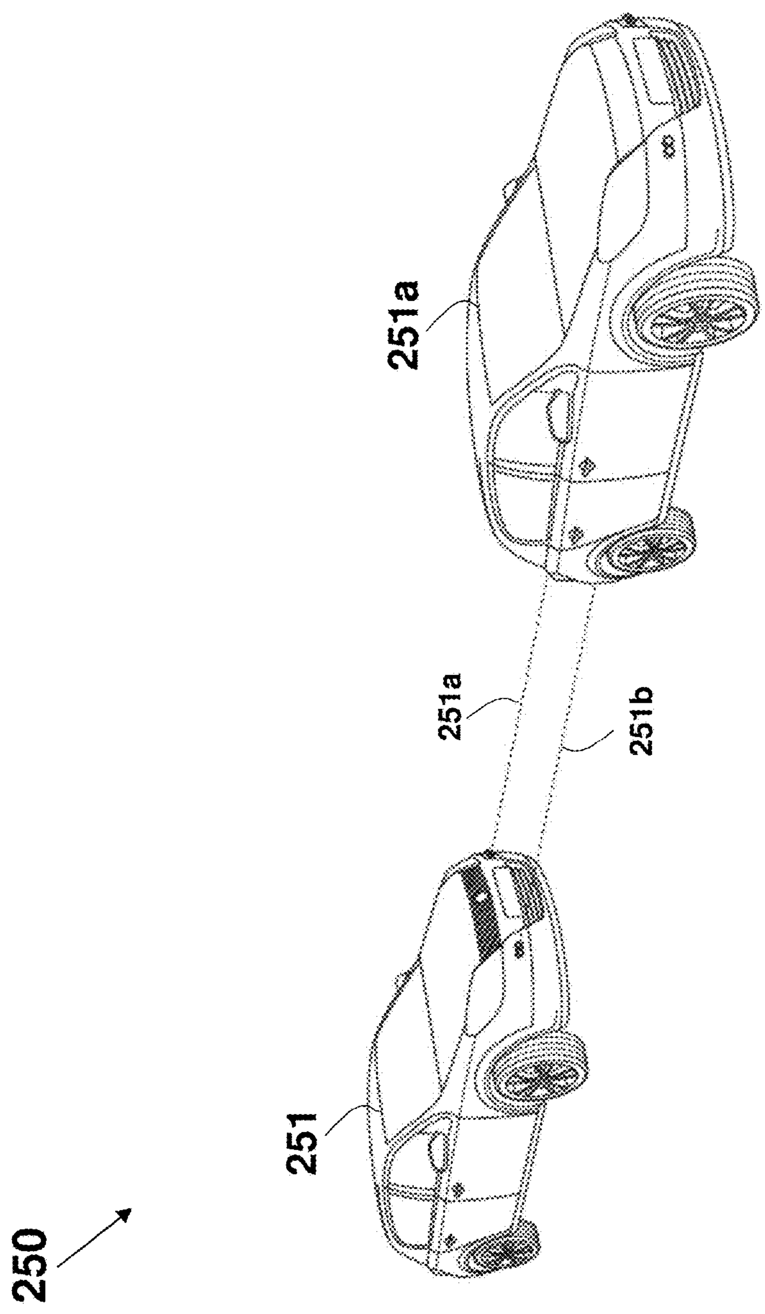
FIG. 25*b* depicts schematically a perspective front view of two passenger cars employing multiple angle meters.

The angle meters may be used to sense another vehicle such as another passenger car. For example, the passenger car 241 may sense, detect, and measure distance, angle, or other parameters to another similar passenger car 251*a*, as pictorially illustrated in an arrangement 250 shown in FIG. 25*b*. A front angle meter, such as the angle meter #3 55*b* associated with the corresponding vehicle 241*b* may sense, detect, and measure distance, angle, or other parameters to the other passenger car 251*a*, using two measurement lines 251*a* and 251*b* (that may be emitted from the respective corresponding emitting apertures 1*a* and 1*b*) that may respectively correspond to the measurements lines 51*e* and 51*f* associated with the angle meter #3 55*b* shown in FIG. 24*b*.

Any apparatus herein, which may be any of the systems, devices, modules, or functionalities described herein, may be integrated with a digital camera (still or video). The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the digital camera. In one example, a measured or calculated value by any of the systems, devices, modules, or functionalities described herein, is output to the digital camera device or functionality to be used therein. Alternatively or in addition, any of the systems, devices, modules, or functionalities described herein is used as a sensor for the digital camera device or functionality. In one example, any of the systems, devices, modules, or functionalities described herein is used as a sensor to the auto-focus system or functionality of the camera, and thus used for controlling or affecting a motor that shifts or moves the lens for optimal focus location.

Figure 26:
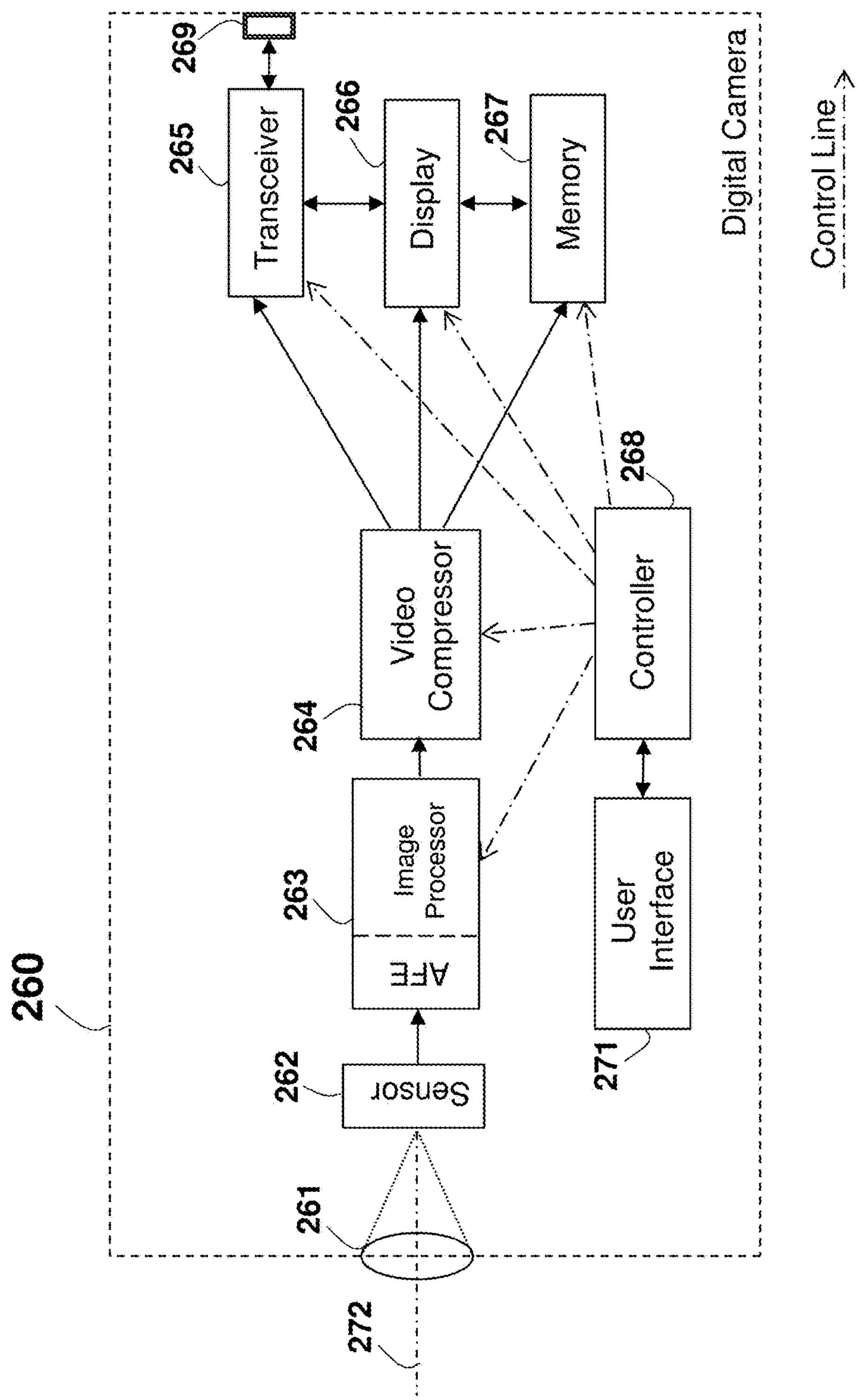
FIG. 26 illustrates a simplified schematic block diagram of a prior-art digital camera.
Figure 27:
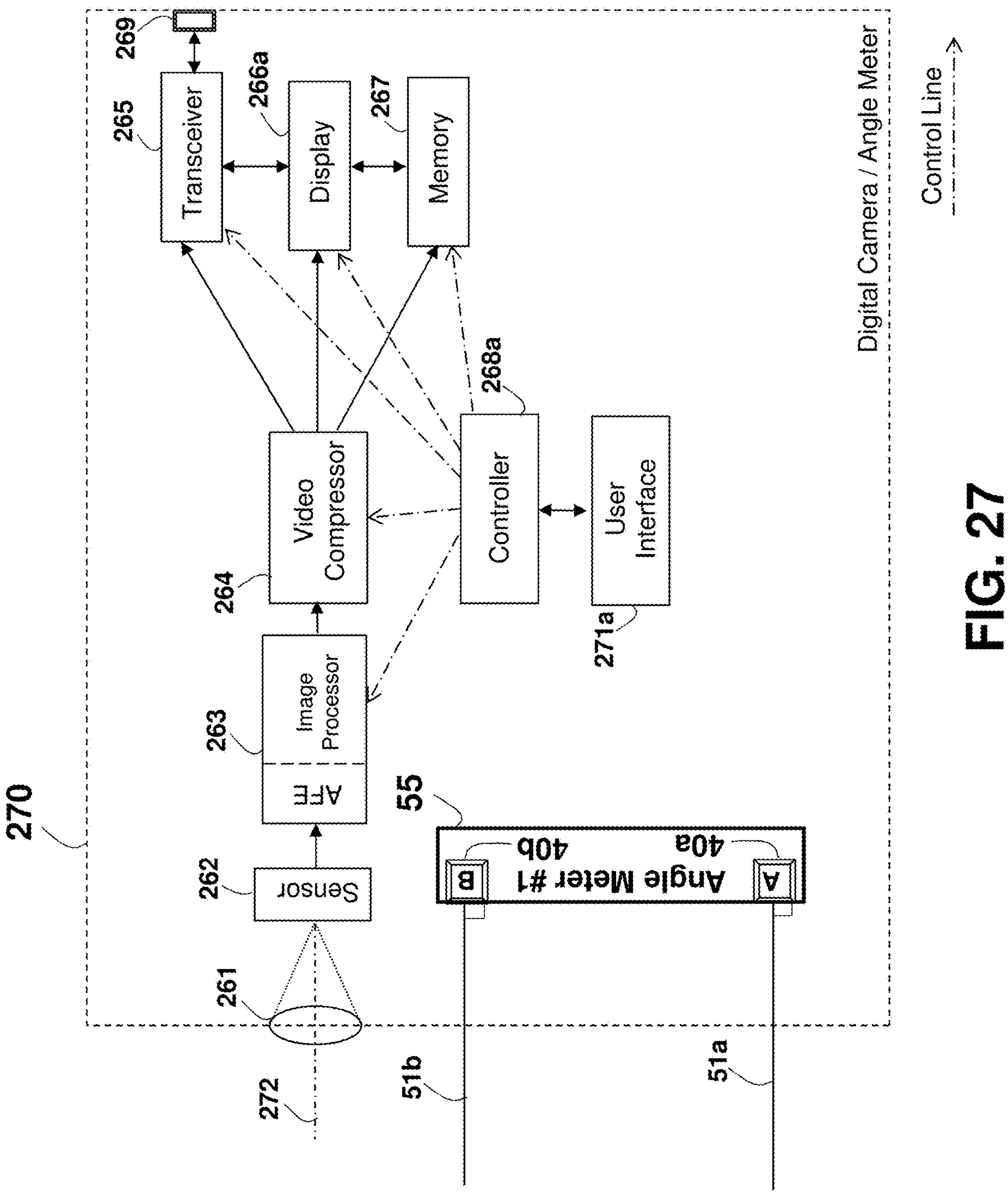
FIG. 27 illustrates a simplified schematic block diagram of a device comprising a digital camera and an angle meter.

An integrated digital camera and angle meter functionality or device 270 is exampled in FIG. 27. The digital camera 260 shown in FIG. 26 is integrated with the angle meter #1 55, such as by using the same enclosure, power source, processor or processing power, a user interface 271, or a display 266. For example, a user interface 271*a* may be integrated or be used by both the digital camera 260 and the angle meter #1 55, and thus may serve or integrate both the user interface 62 used by the angle meter #1 55 and the user interface 271 used by the digital camera 260. Similarly, a display 266*a* may be integrated or be used by both the digital camera 260 and the angle meter #1 55, and thus may serve or integrate both the display 63 used by the angle meter #1 55 and the display 266 used by the digital camera 260. Further, the controller 268*a* may be integrated or be used by both the digital camera 260 and the angle meter #1 55, and thus may serve or integrate both the control block 61 used by the angle meter #1 55 and the controller 268 used by the digital camera 260.

Figure 27A:
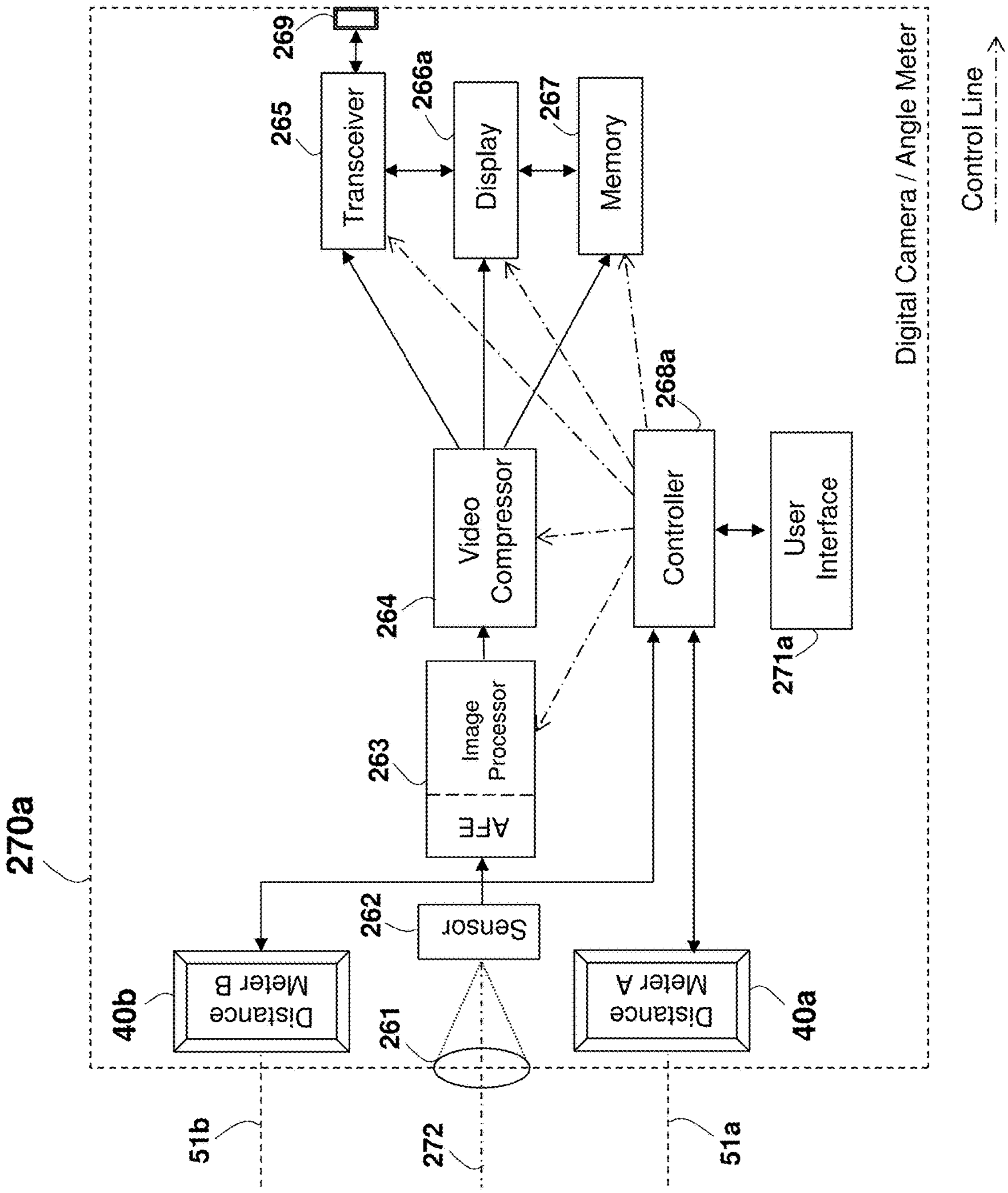
FIG. 27*a* illustrates a simplified schematic block diagram of an integrated digital camera and an angle meter.

An example of an integrated digital camera and angle meter device 270*a* is shown in FIG. 27*a*. The integrated digital camera and angle meter device 270*a* may be housed in a single enclosure that may be portable or hand-held. The distance meter 'A' 40*a* and the distance meter 'B' 40*b* are connected or coupled to the controller 268*a*, which serves as both the digital camera 260 controller 268 and control block 61. The controller 268*a* serve as both the control block 61 used by the angle meter #1 55 and the controller 268 used by the digital camera 260, and the display 266*a* serve as both the display 63 used by the angle meter #1 55 and the display 266 used by the digital camera 260. Preferably, the measurement lines 51*a* and 51*b* are aligned with and parallel to the digital camera 260 optical axis 272, and may further be in close proximity thereto, so that the object (or surface) sensed by the angle meter #1 55 is the same object whose image is captured by the digital camera 260. However, each of the measurement lines 51*a* or 51*b* may deviate from the optical axis 272 by an angle that is less than 20°, 18°, 15°, 13°, 10°, 8°, 5°, 3°, 2°, 1°, 0.8°, 0.5°, 0.3°, 0.2°, or 0.1°. Preferably, the optical axis is centered between the measurement lines 51*a* and 51*b*. However, the optical axis may deviate from the exact center point between the measurement lines 51*a* and 51*b* by less than 20%, 18%, 15%, 13%, 10%, 8%, 5%, 2%, 1%, 0.5%, or 0.2% of the distance between the measurement lines 51*a* and 51*b*.

Figure 26A:
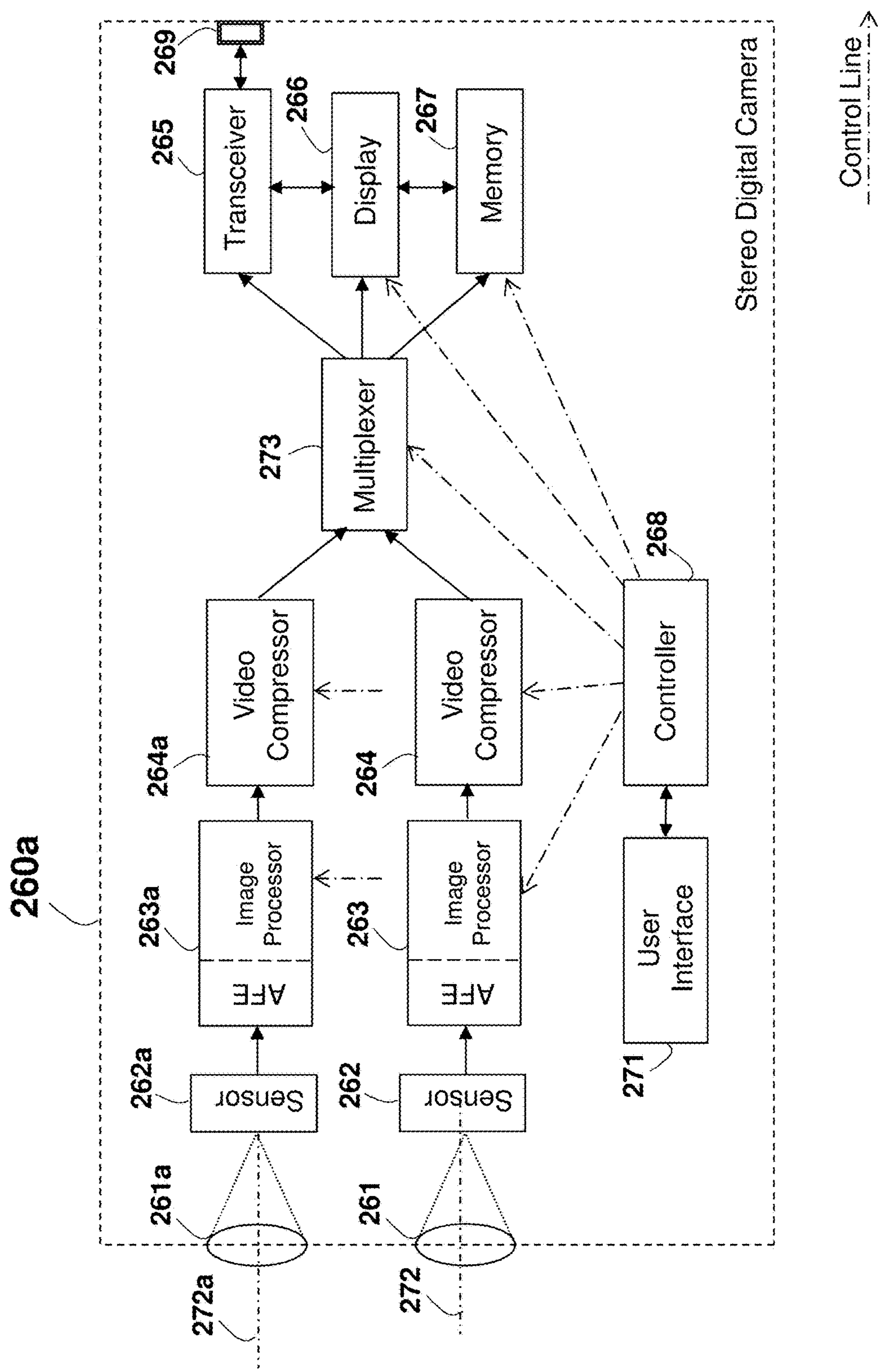
FIG. 26*a* illustrates a simplified schematic block diagram of a prior-art stereo digital camera.
Figure 27B:
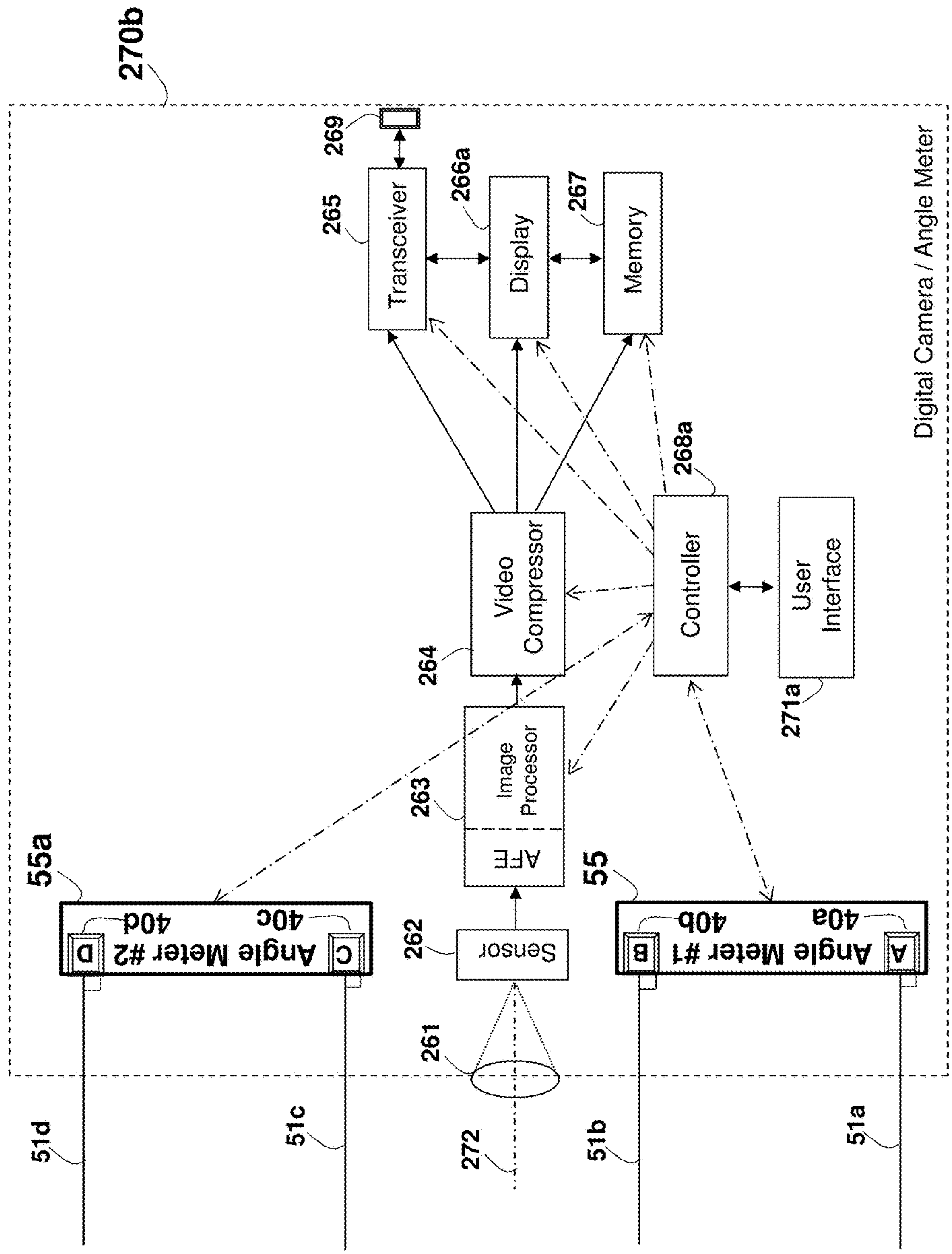
FIG. 27*b* illustrates a simplified schematic block diagram of a device comprising a digital camera and two angle meters.

While the integrated devices 270 and 270*a* in the respective FIGS. 27 and 27*a* were exampled using integration of a single angle meter, two or more angle meters may equally be used. An example of an integrated digital camera and two angle meters device 270*b* is shown in FIG. 27*b*, including the additional angle meter #2 55*a*. In one example, the measurement plane formed by the measurement lines 51*a* and 51*b* of the angle meter #1 55 is perpendicular to the measurement plane formed by the measurement lines 51*c* and 51*d* of the angle meter #2 55*a*, allowing the integrated device 270*b* to measure angles in both measurement planes. For example, the angle meter #1 55 may be used to measure angles (or any other parameters) regarding objects or surfaces in a horizontal measurement plane, while the angle meter #2 55*a* may be used to measure angles (or any other parameters) regarding the same (or different) objects or surfaces in a vertical measurement plane. The measurement planes formed by the two angle meters 55 and 55*a* may be ideally perpendicular to each other, or may deviate from being perfectly perpendicular by an angle that is less than 20°, 18°, 15°, 13°, 10°, 8°, 5°, 3°, 2°, 1°, 0.8°, 0.5°, 0.3°, 0.2°, or 0.1°. While exampled regarding integration with the single optical path digital camera 260, the integration may equally be with the stereo digital camera 260*a* shown in FIG. 26*a*.

In one example, any one of the measured or calculated values herein may be used by the digital camera functionality or device. For example, an actuator may be activated or controlled in response to a measured or calculated parameter, affecting the digital camera operation. For example, the digital camera may comprise an auto-focus mechanism, that may include an electric motor for shifting the lenses to an optimal position, and the motor may be actuated or controlled based on a measured or calculated parameter provided from the integrated angle meter.

Figure 28:
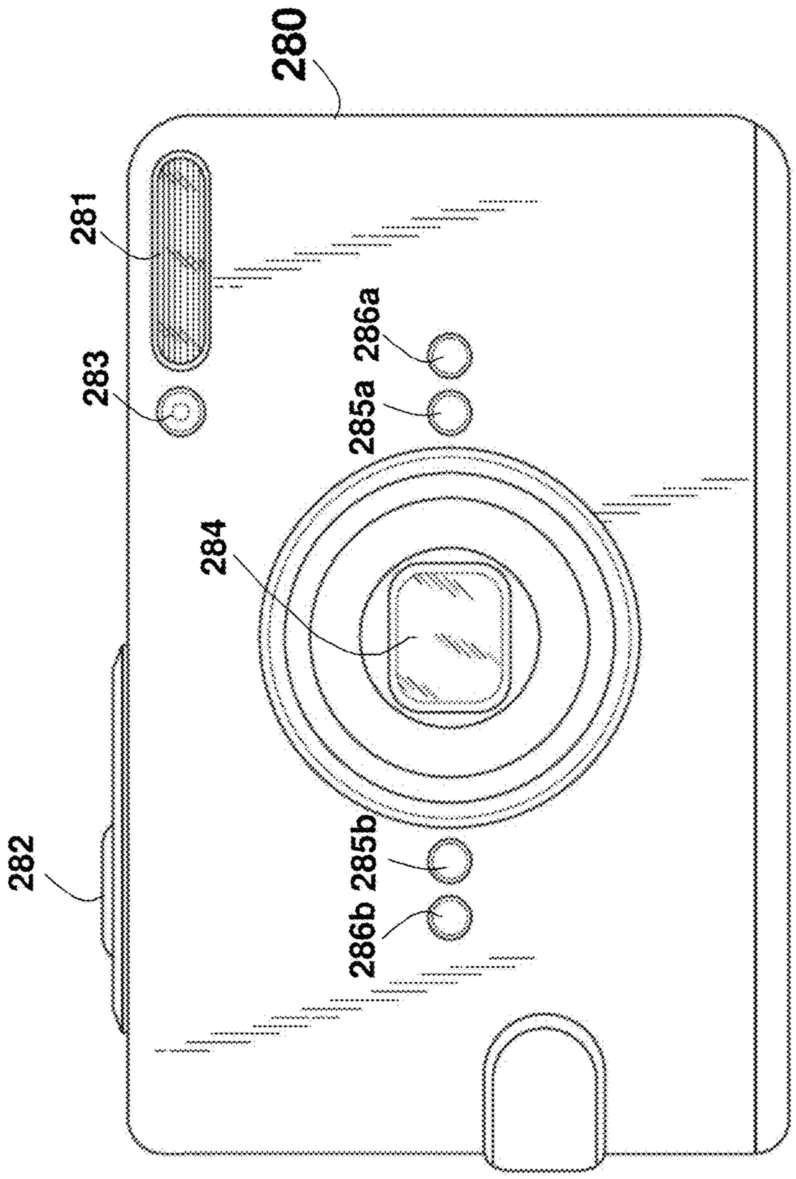
FIG. 28 depicts pictorially a front view of an integrated angle meter/digital camera including a horizontal measuring angle meter.
Figure 28A:
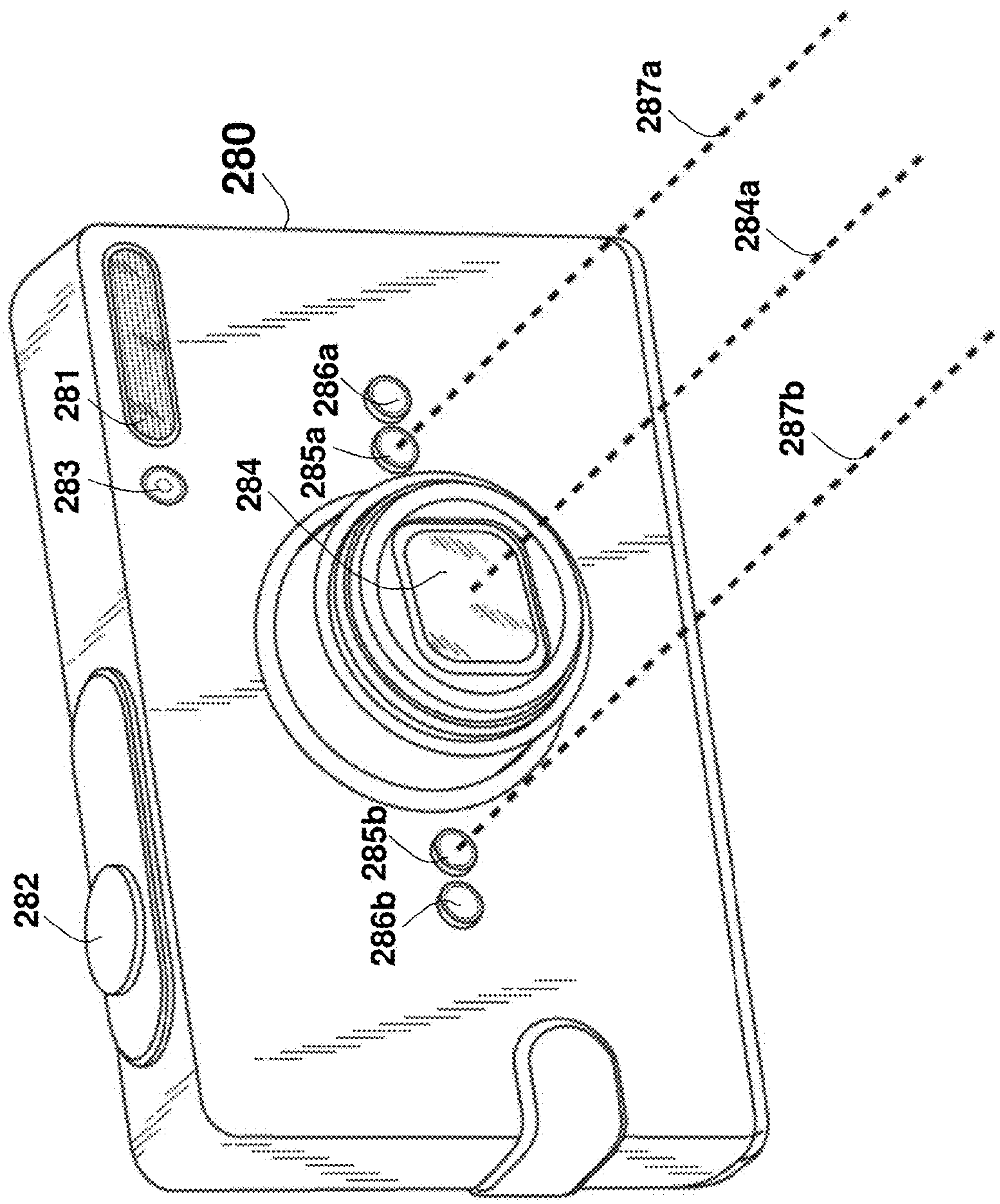
FIG. 28*a* depicts schematically a perspective front view of an integrated angle meter/digital camera including a horizontal measuring angle meter.
Figure 28B:
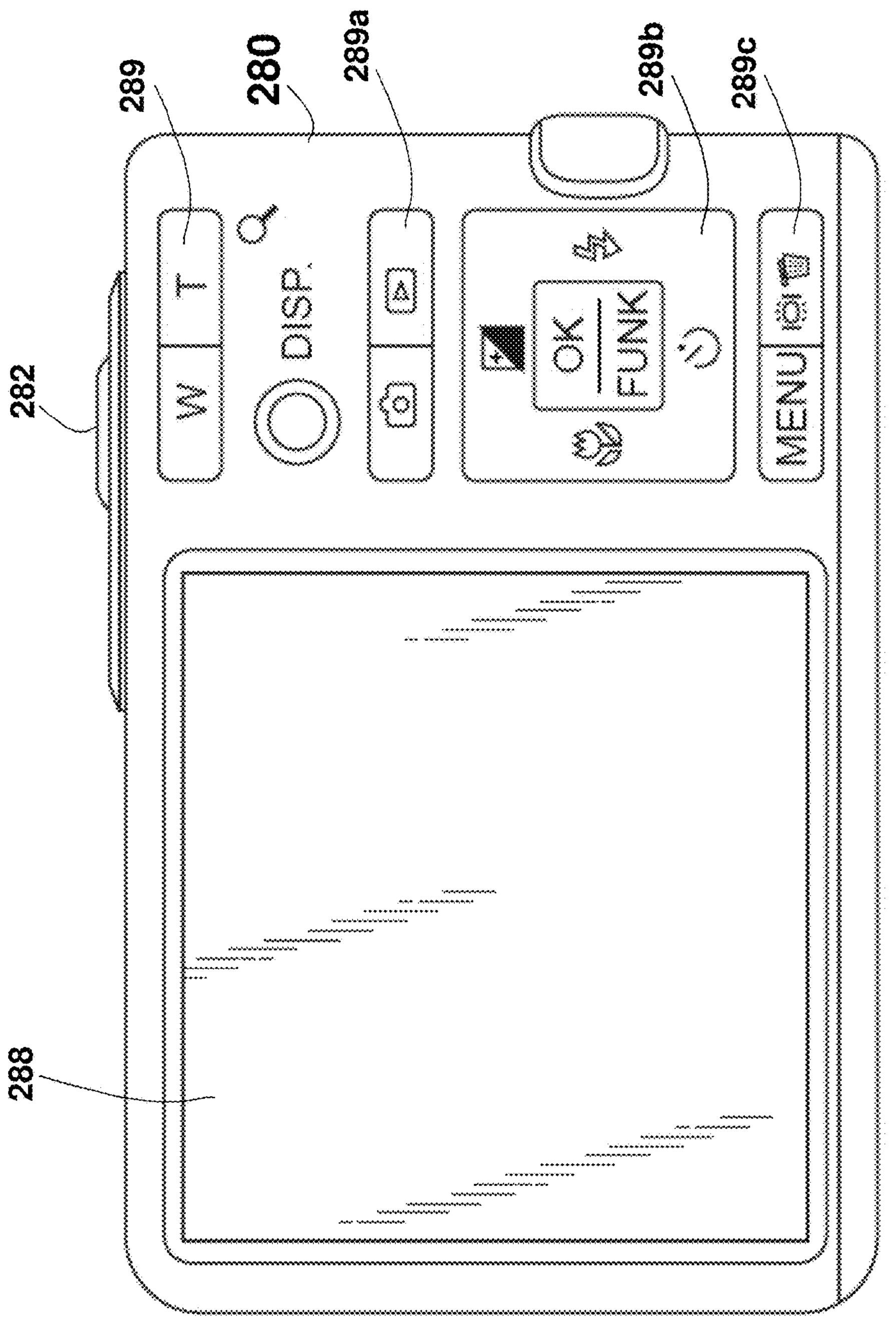
FIG. 28*b* depicts pictorially a rear view of an integrated angle meter/digital camera including a horizontal measuring angle meter.
Figure 28C:
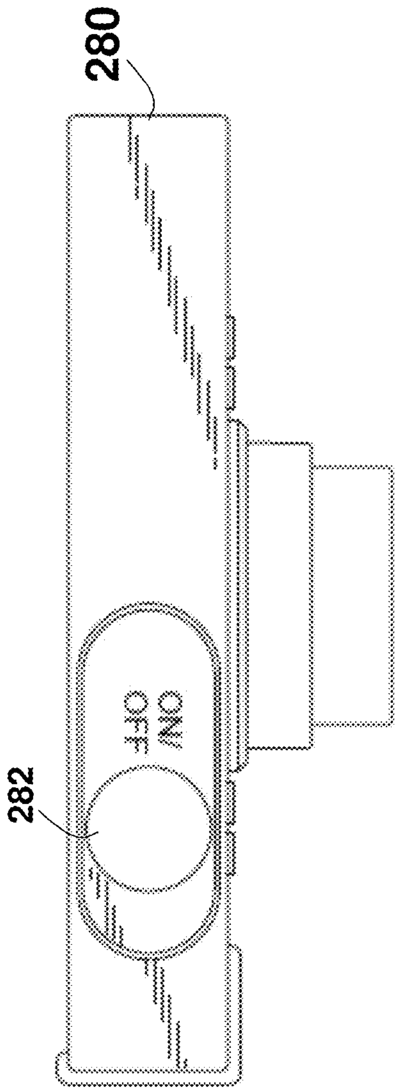
FIG. 28*c* depicts pictorially a top view of an integrated angle meter/digital camera including a horizontal measuring angle meter.
Figure 28D:
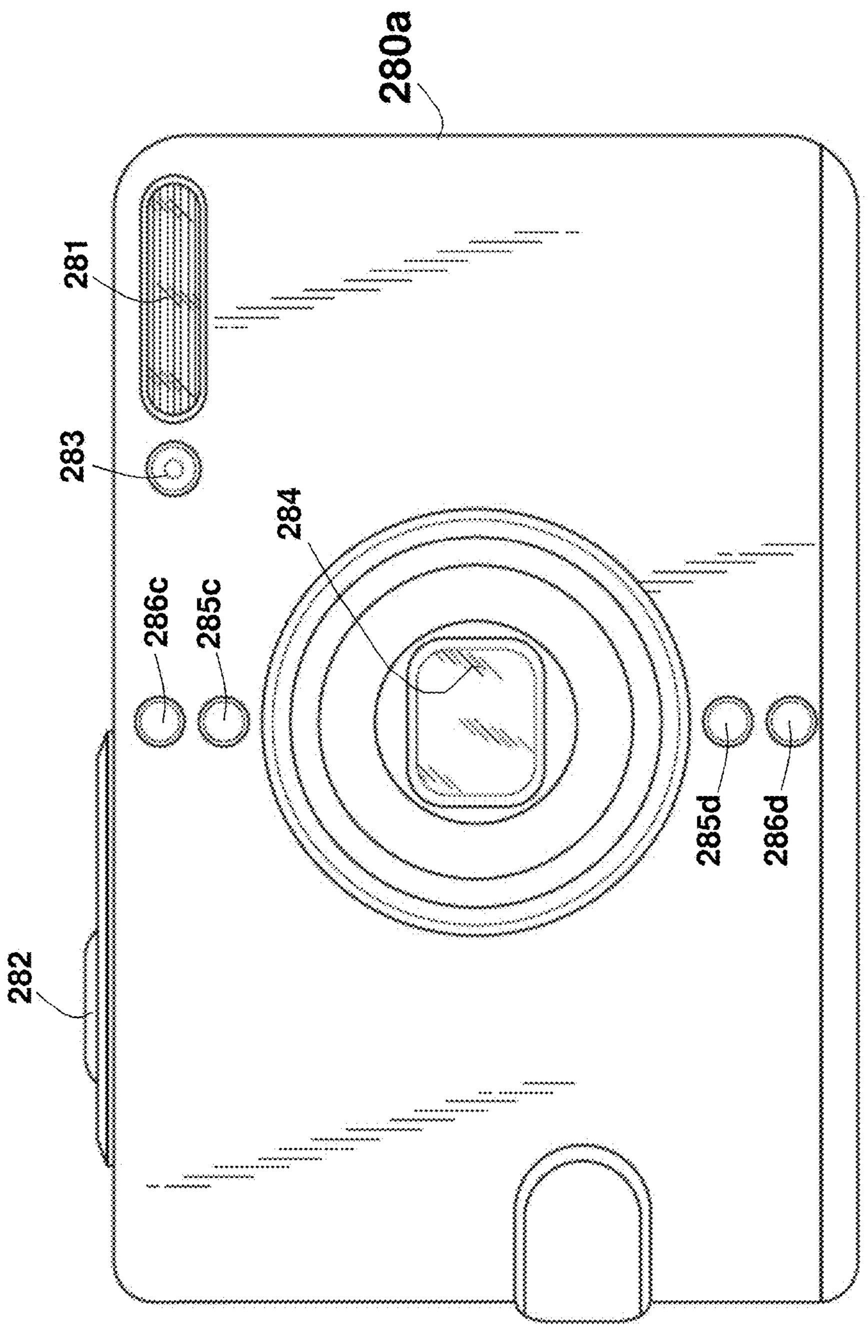
FIG. 28*d* depicts pictorially a front view of an integrated angle meter/digital camera including a vertical measuring angle meter.
Figure 28E:
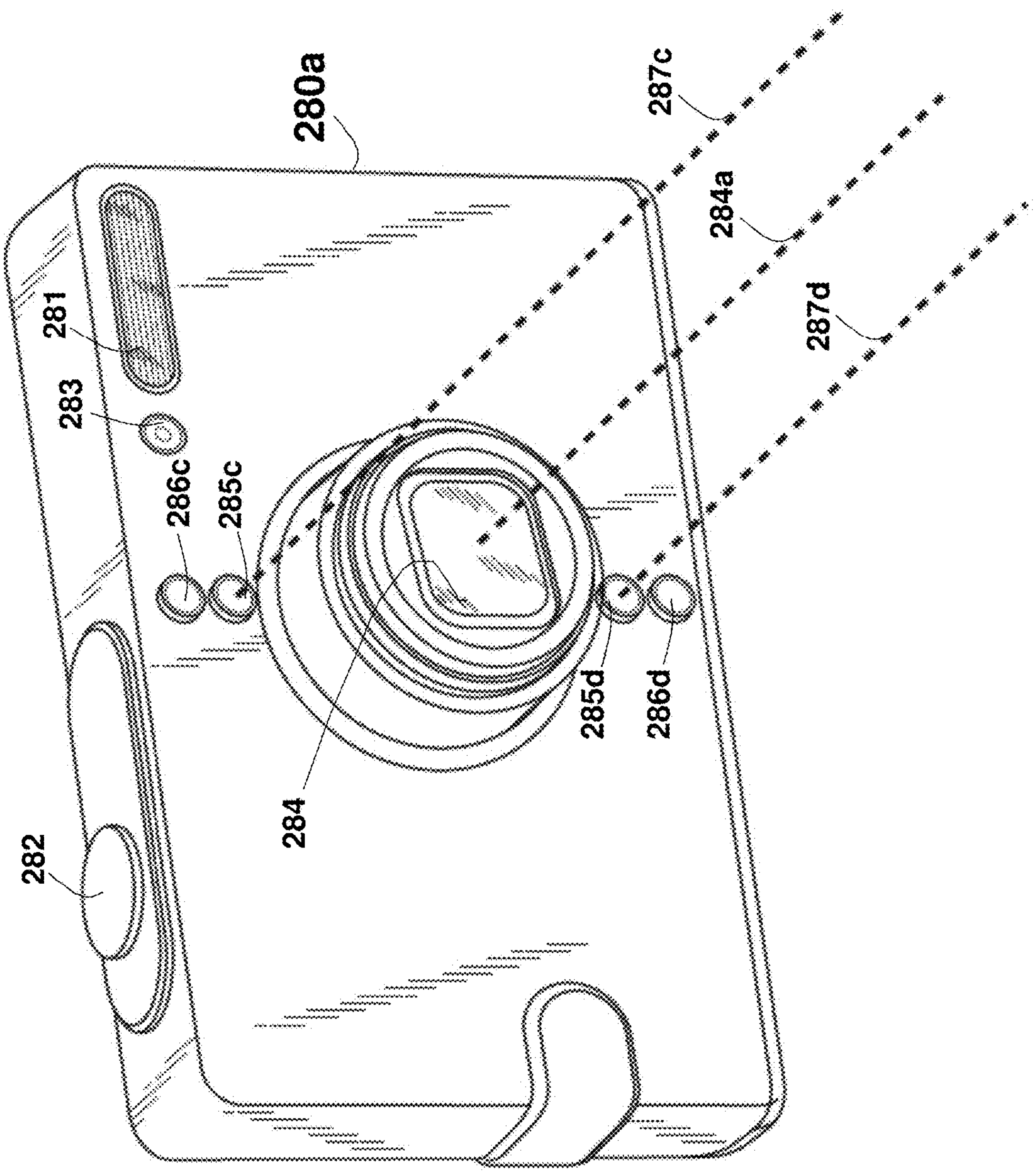
FIG. 28*e* depicts pictorially a perspective front view of an integrated angle meter/digital camera including a vertical measuring angle meter.

A pictorial view of an integrated digital camera and angle meter 280 is shown in FIGS. 28-28*e*, that may correspond to the integrated digital camera and angle meter 270 shown in FIG. 27 or 270*a* shown in FIG. 27*a*. A pictorial front view of the digital camera 280 is shown in FIG. 28, illustrating a shutter and/or on-off button 282, a flash mechanism cover or opening 281, and a cover or opening 283 for light sensing, such as for operating the flash light mechanism via opening 281. The digital camera 280 further comprises a lens 284 in a lens housing (that may correspond to the lens 261 in the digital camera 270), and emitting apertures 285*a* and 285*b*, each located at similar distances on difference sides of the lens. The digital camera 280 further comprises sensing apertures 286*a* and 286*b*, each located at similar distances on different sides of the lens. In one example, the emitting aperture 285*a* and the sensing aperture 286*a* are part of, or used by, the distance meter 'B' 40*b*, and the emitting aperture 285*b* and the sensing aperture 286*b* are part of, or used by, the distance meter 'A' 40*a*, both part of the angle meter #1 55 shown as part of the integrated digital camera 270 in FIG. 27.

The digital camera 280 captures images along the optical axis 284*a* shown in FIG. 28*a*, that may correspond to the optical axis 272 of the integrated digital camera 270 shown in FIG. 27. A measurement line 287*a* is shown in FIG. 28*a* extending from the emitting aperture 285*a*, and may correspond to the measurement line 51*a* associated with the distance meter 'A' 40*a* that is part of the angle meter #1 55. Similarly, A measurement line 287*b* is shown in FIG. 28*a* extending from the emitting aperture 285*b*, and may correspond to the measurement line 51*b* associated with the distance meter 'B' 40*b* that is part of the angle meter #1 55 in the integrated digital camera 270 shown in FIG. 27. As shown in the FIG. 28*a*, the measurement lines 287*a* and 287*b* are parallel (or substantially parallel) to the digital camera 280 optical axis 284*a*.

A top view of the integrated digital camera 280 is shown in FIG. 28*c*, and a rear view of the integrated digital camera 280 is shown in FIG. 28*b*. Most of the rear side is employed by a display 288, typically an LCD display that corresponds to the display 266*a* shown as part of the digital camera 270 in FIG. 27, and serves as a view finder and for displaying the angle meter outputs (or any functions thereof), and may be part of a user interface functionality (corresponding for example to the user interface 271*a* shown as part of the digital camera 270 in FIG. 27. The rear side of the digital camera 280 further comprises various user operated buttons for controlling the digital camera and the angle meter operation, such as the zoom control 289, the camera mode (such as still or video) button 289*a*, a menu control 289*c*, and optimizing the camera to a specific scene via control switches 289*b*, all may be part of the corresponding user interface functionality 271*a* shown in FIG. 27.

While the integrated digital camera and angle meter 280 is described with the measurement plane formed by the measurement lines 287*a* and 287*a* is horizontal when image are captured by using the digital camera functionality, the angle meter may be mounted in the enclosure to form a vertical measurement plane. For example, the angle meter 55*a* shown as part of the integrated digital camera 270*b* may be mounted to form a vertical measurement plane. Such an integrated digital camera and angle meter device 280*a*, having a vertically measuring positioned single angle meter 55*a*, is shown in FIGS. 28*d* and 28*e*.

A pictorial front view of the digital camera 280*a* is shown in FIG. 28*d*, illustrating a shutter and/or on-off button 282, a flash mechanism cover or opening 281, and a cover or opening 283 for light sensing, such as for operating the flash light mechanism via opening 281. The digital camera 280*a* further comprises a lens 284 in a lens housing (that may correspond to the lens 261 in the digital camera 270), and emitting apertures 285*c* and 285*d*, each located at similar distances on difference sides of the lens. The digital camera 280*a* further comprises sensing apertures 286*c* and 286*d*, each located at similar distances on difference sides (top and bottom) of the lens 284. In one example, the emitting aperture 285*c* and the sensing aperture 286*c* are part of, or used by, the distance meter 'C' 40*c*, and the emitting aperture 285*d* and the sensing aperture 286*d* are part of, or used by, the distance meter TY 40*d*, both part of the angle meter #2 55*a* shown as part of the integrated digital camera 270*b* in FIG. 27*b*.

The digital camera 280*a* captures images along the optical axis 284*a* shown in FIG. 28*e*, that may correspond to the optical axis 272 of the integrated digital camera 270*b* shown in FIG. 27*b*. A measurement line 287*c* is shown in FIG. 28*c* extending from the emitting aperture 285*c*, and may correspond to the measurement line 51*c* associated with the distance meter 'C' 40*c* that is part of the angle meter #a 55*a*. Similarly, A measurement line 287*d* is shown in FIG. 28*e* extending from the emitting aperture 285*d*, and may correspond to the measurement line 51*d* associated with the distance meter TY 40*d* that is part of the angle meter #2 55*a* in the integrated digital camera 270*b* shown in FIG. 27*b*. As shown in the FIG. 28*e*, the measurement lines 287*c* and 287*d* are parallel, or substantially parallel, to the digital camera 280*a* optical axis 284*a*.

Figure 28F:
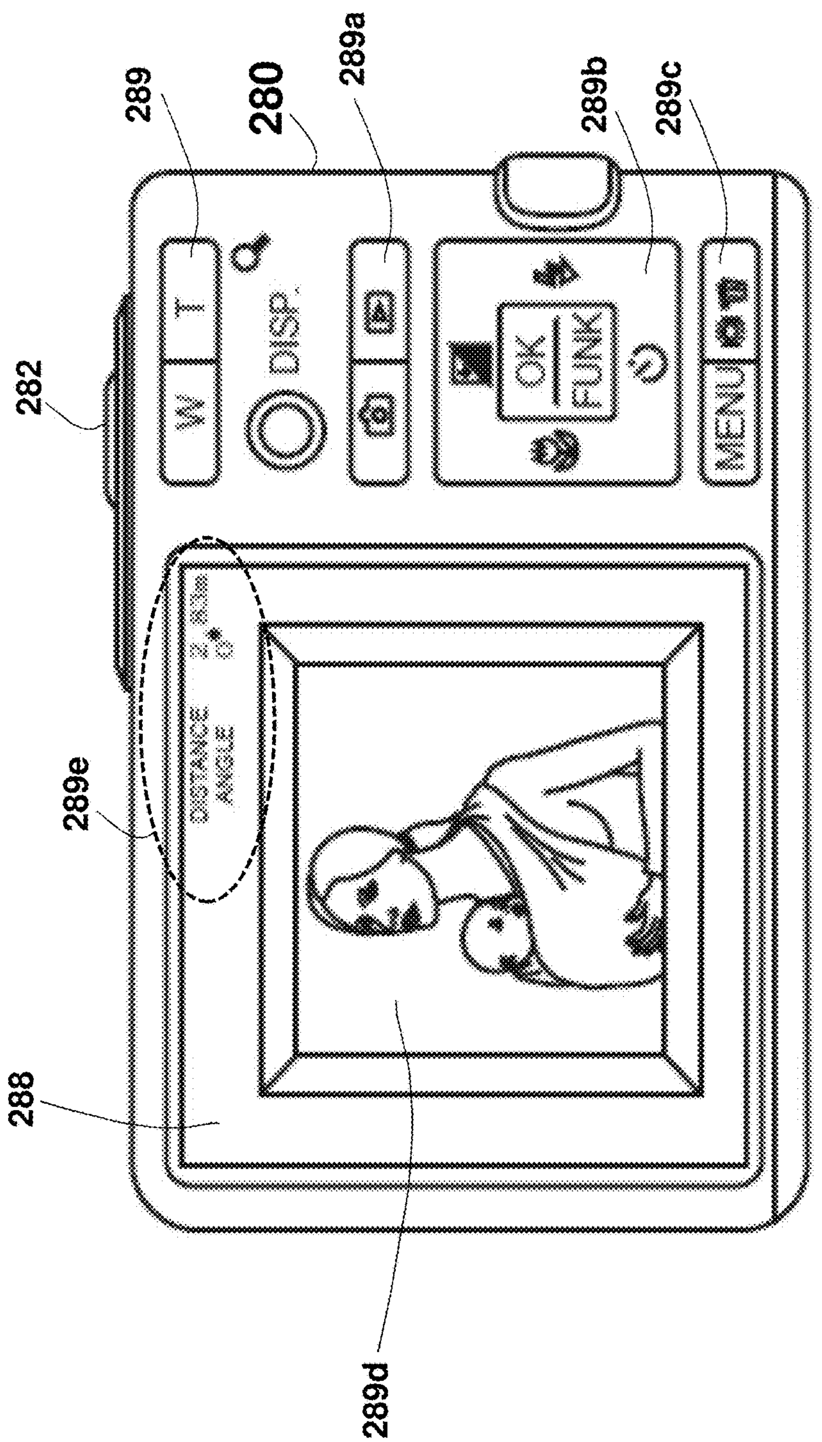
FIG. 28*f* depicts pictorially a rear view of an integrated angle meter/digital camera including a measuring angle meter displaying captured image and angle meter output.

An example of displaying a captured image in the display 288 is shown in FIG. 28*f*. In addition to displaying a captured image 289*d*, the display 288 may also display the angle meter output such as any measured or calculated distance or angle described herein, such as a distance and an angle shown on the display 288 and marked as 289*e*.

Figure 28G:
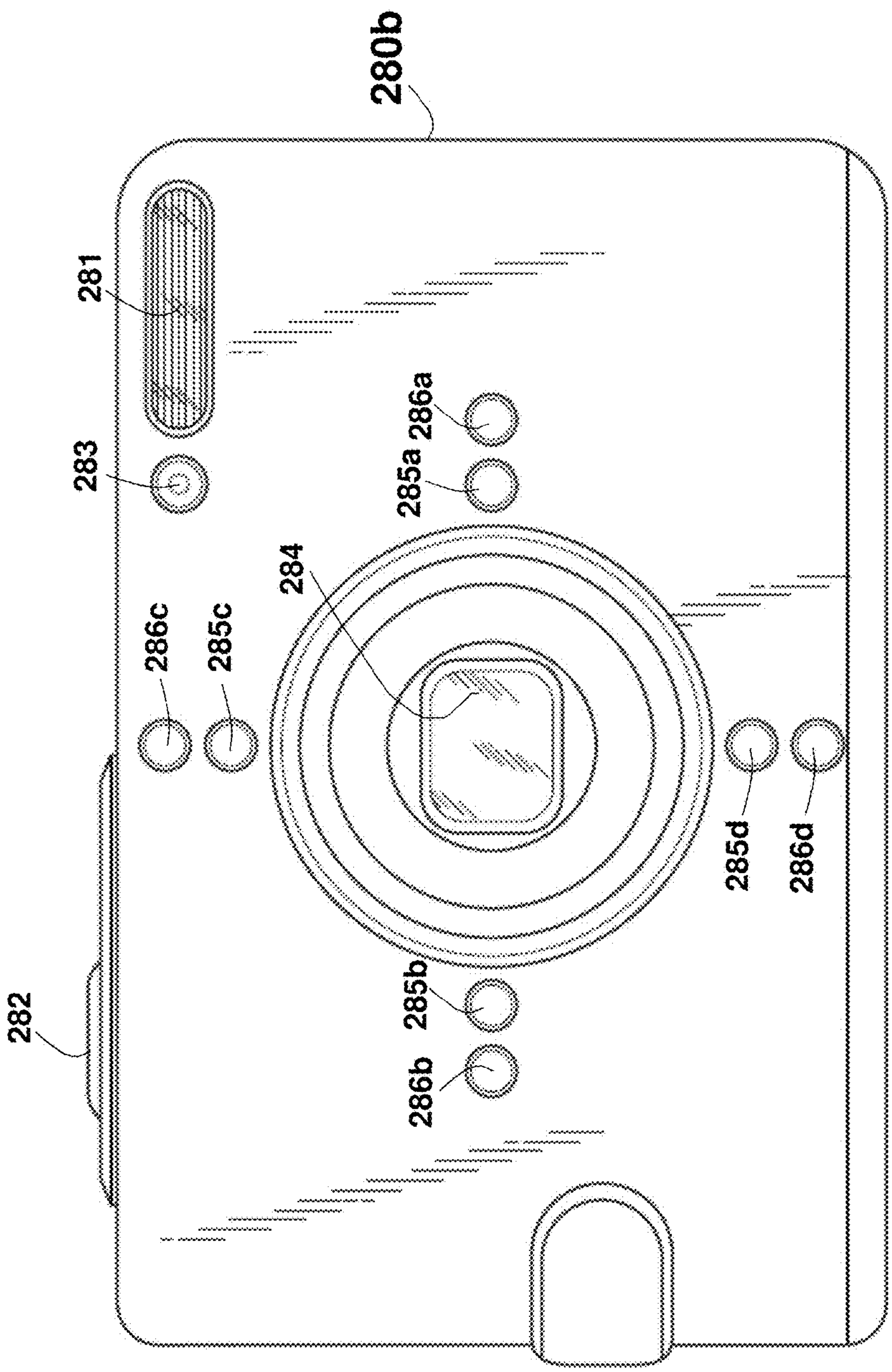
FIG. 28*g* depicts pictorially a front view of an integrated angle meter/digital camera including horizontal and vertical measuring angle meters.

Alternatively or in addition, an integrated digital camera may include two angle meters, allowing for measurement in two distinct measurement planes, and may correspond to the integrated digital camera 270*b* shown in FIG. 27*b*; comprising the angle meter #1 55 and the angle meter #2 55*a*. A pictorial front view of such a digital camera 280*b* is shown in FIG. 28*g*, combining both angle meters functionalities of the digital cameras 280 and 280*a* described above.

In one example, the angle meter in the integrated digital camera is used to control the image capturing activation of the digital camera functionality. For example, the operation of a shutter button in a still camera or the starting or the stopping of operation of a digital video camera may be controlled by an output from the angle meter, such as measured or calculated distance, angle, speed, or timing. In one example, a threshold mechanism may be used, and the measured or calculated value is compared to the set threshold, that may be a maximum or minimum threshold). In the case of a still camera, only when the measured or calculated value is above the minimum threshold, or alternatively or in addition below the maximum threshold, the image capturing is enabled, so when a user presses the shutter button an image is captured, while when the measured or calculated value is below the minimum threshold, or alternatively or in addition above the maximum threshold, the shutter operation may not be enabled even upon user shutter operation. Alternatively or in addition, the angle meter value may be used for automatic operation (for example for remote or unmanned digital camera), wherein an image is automatically captured when the measured or calculated value is cross the minimum or maximum threshold. Alternatively or in addition, both minimum and maximum thresholds are defined, and image capturing is activated or enabled only when the value is between the minimum and maximum thresholds.

Similarly in digital video camera scheme, only when the measured or calculated value is above the minimum threshold, or alternatively or in addition below the maximum threshold, the image capturing is enabled, so when a user presses the shutter button or another switch to start capturing the video data when the measured or calculated value is below the minimum threshold, or alternatively or in addition above the maximum threshold, the shutter operation may not be enabled even upon user shutter operation, and video capturing may not initiate. Alternatively or in addition, the angle meter value may be used for automatic video recording or capturing (for example for remote or unmanned digital camera), wherein the video data is recorded or captured upon only when the measured or calculated value is above a minimum threshold, or as long as the value is below a maximum threshold.

In one example, the measured distances (or any function or manipulation thereof) may be used to control the image capturing. Hence, image capturing by a digital camera is enabled or activated only when the distance value is proper (above minimum threshold, below maximum threshold, or both). For example, the measured distance d1 along the measurement line 51*a*, the measured distance d2 along the measurement line 51*b*, the average distance dav along the measurement line 51*e*, the actual distance dact along the measurement line 51*f*, or any combination or function thereof, may be used, for example to enable image capturing or to start or stop image capturing based on minimum or maximum distance threshold, for ensuring taking images only of objects that are closer than a defined range, of objects that are distant than a defined range, or objects that are between a minimum and maximum defined distance.

Alternatively or in addition, the calculated angles (or any function or manipulation thereof) may be used to control the image capturing. Hence, image capturing by a digital camera is enabled or activated only when the angle value is proper (above minimum threshold, below maximum threshold, or both). For example, the angle α 56*a*, or any combination or function thereof, may be used, for example to enable image capturing or to start or stop image capturing based on minimum or maximum angle threshold, for ensuring taking images only of objects that are tilted or parallel. For example, when capturing an image of a surface such as a wall, the image capturing may be enabled or activated when the angle α 56*a* is less than a defined threshold, for ensuring optimal capturing of the surface.

The measured or calculated values or characteristics by any one of the apparatuses herein, which may be any of the systems, devices, modules, or functionalities described herein, may be used in order to improve the integrated digital camera operation, functionality, or may be used in order to improve or process the captured image. In one example, the measured or calculated values (or any manipulation or combination thereof) may be used to improve the perspective distortion of a captured image.

Figure 30:
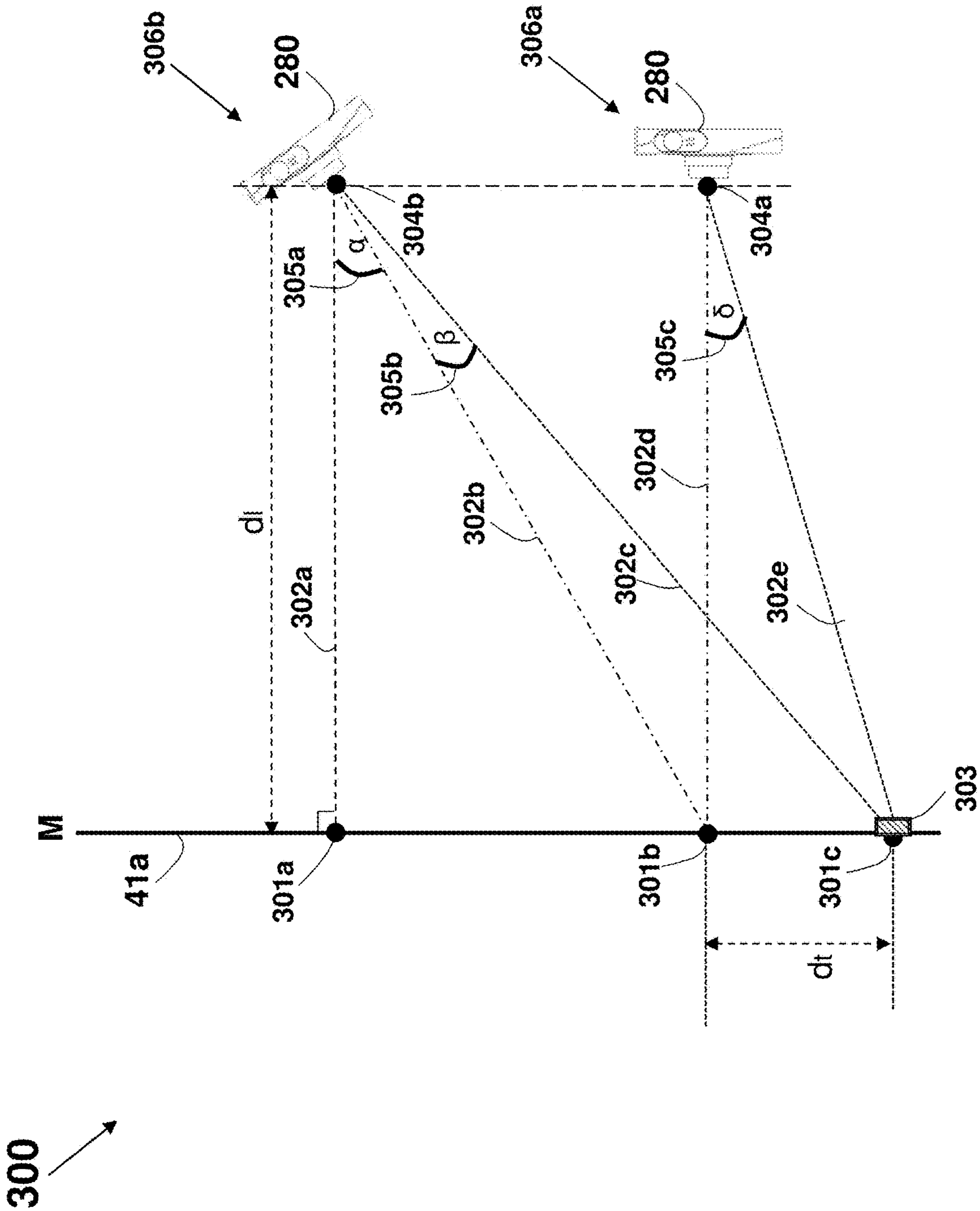
FIG. 30 depicts schematically a top view of an integrated angle meter/digital camera that captures an element image in two distinct locations and orientations.

A perspective distortion is exampled in an arrangement 300 shown in FIG. 30, pictorially illustrating a top view of a vertical surface (or line or plane) 41*a*, such as a vertical wall, and an element 303 that is part of, or attached to, the surface 41*a* at a point 301*c*. In one example, the integrated digital camera/angler meter 280 is located and oriented (shown designated as a location 306*a* in FIG. 30) in parallel to the surface 41*a* and at a distance d1 in parallel to a line 302*a*, so that its optical axis is perpendicular to the plane or surface 41*a* (in the measurement plane defined by the angle meter that is part of the integrated digital camera/angle meter 280) and extends from a point 304*a* (such as the edge point in the digital camera 280 lens or at the center of the image sensor surface) to a point 301*b* on the surface 41*a*. The element 303 is located at a distance of dt from the center viewing point 301*b* that is along a line of sight 302*e* that is deviated from, and forms an angle δ 305*c* with, the optical axis 302*d*. In another example, the element 303 image may be captured by the digital camera 280 located and oriented as shown in an arrangement 306*b* in FIG. 30. In this scheme, the digital camera 280 is located at the same distance d1 from a capturing point 304*b* to a nearest point 301*a* on the surface 41*a*, shown along the perpendicular line 302*a* from the vertical surface 41*a*. Similar to the arrangement 306*a* the digital camera 280 optical axis is pointing at the same point 301*b* on the surface (or line) 41*a* in this scenario is along a line 302*b*, and forms an angle α 305*a* with the surface 41*a* perpendicular line 302*a*. The element 303 is located along a line of sight 302*c* that is deviated from digital camera 280 optical axis 302*b* by an angle β 305*b*.

The geometry of the arrangement 300 shown in FIG. 30 provides that $tg(\delta)=tg(\beta)/\cos(\alpha)$. Since the angle α 305*a* may be provided by the angle meter as described herein, the relationship between the angle δ 305*c* and the angle β 305*b* is known, and may be used to convert or transfer an image captured by the digital camera 280 between the schemes 306*a* and 306*b*. For example, the perspective distortion caused by the location of the digital camera 280 at the scenario 306*a* may be corrected to provide the image as if it was captured in the scenario 306*a*.

Figure 30A:
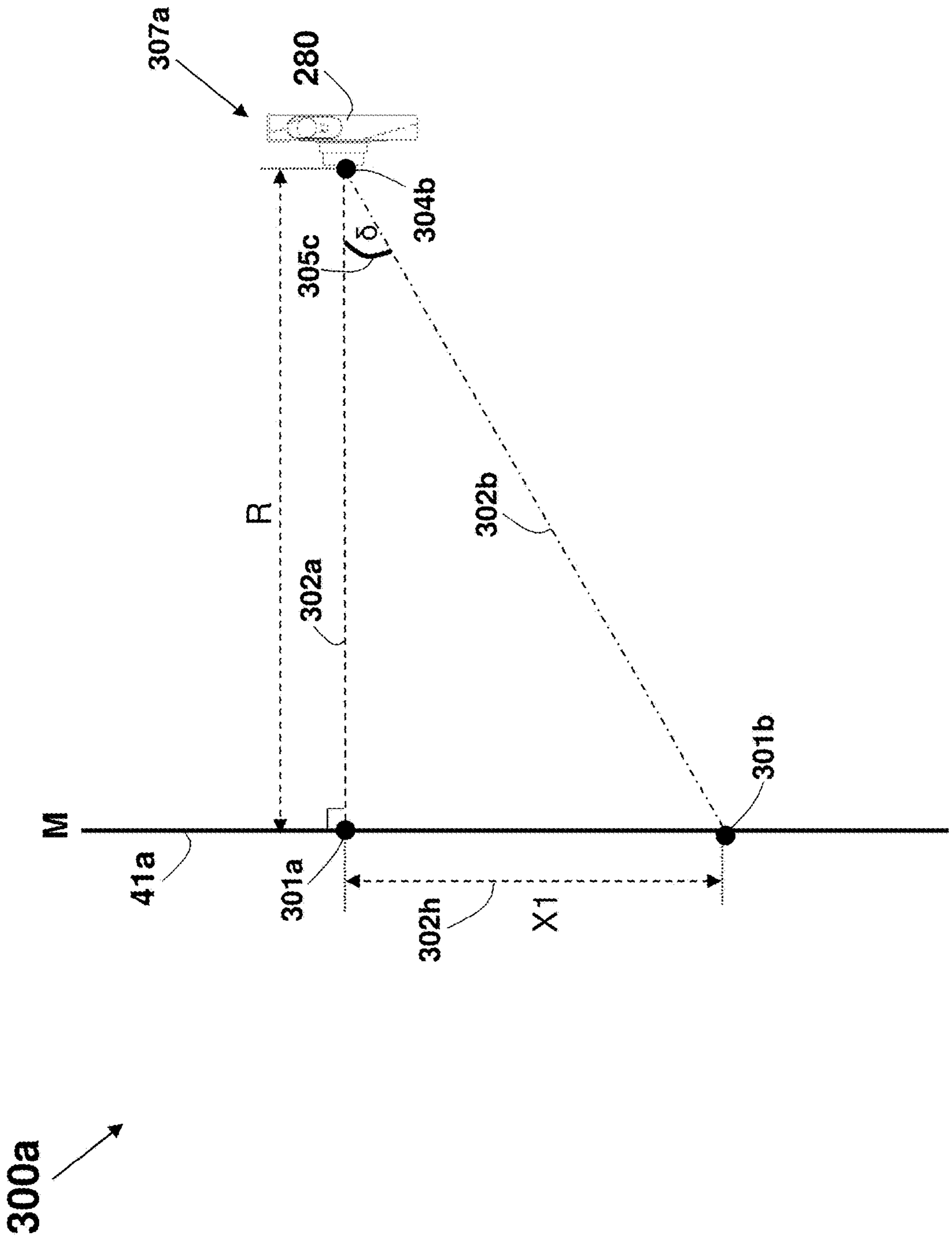
FIG. 30*a* depicts schematically a top view of an integrated angle meter/digital camera positioned to capture images in parallel to a plane.

Referring now to FIG. 30*a*, depicting an arrangement 300*a* that is similar to the arrangement 300 shown in FIG. 30. The arrangement 300*a* illustrates a top view of the integrated digital camera/angle meter 280, where the horizontal plane shown may be defined by the distance measuring lines of the distance meters of the digital camera 280. The digital camera 280 is located at a reference location 307*a* and positioned so that the optical axis 302*a* is perpendicular to the plane (or surface) 41*a*, and the digital camera 280 focal point 304*b* is located at a distance R from the closest point 301*a* (on the line or surface 41*a*), which serves as a reference point along the line defined by surface or plane 41*a*. A reference point 301*b* is located at a distance X1 302*h* from the reference 'zero' point 301*a*, and is viewed by the digital camera 280 along the line of sight 302*b*, that forms an angle δ 305*c* with the optical axis 302*a*. The reference point 301*a* is considered as a 'zero' reference point, from which distances along the line (or surface) 41*a* are measured, where 'down' direction in the figure, representing a 'left' side of the digital camera 280, are defined as positive values.

Figure 30B:
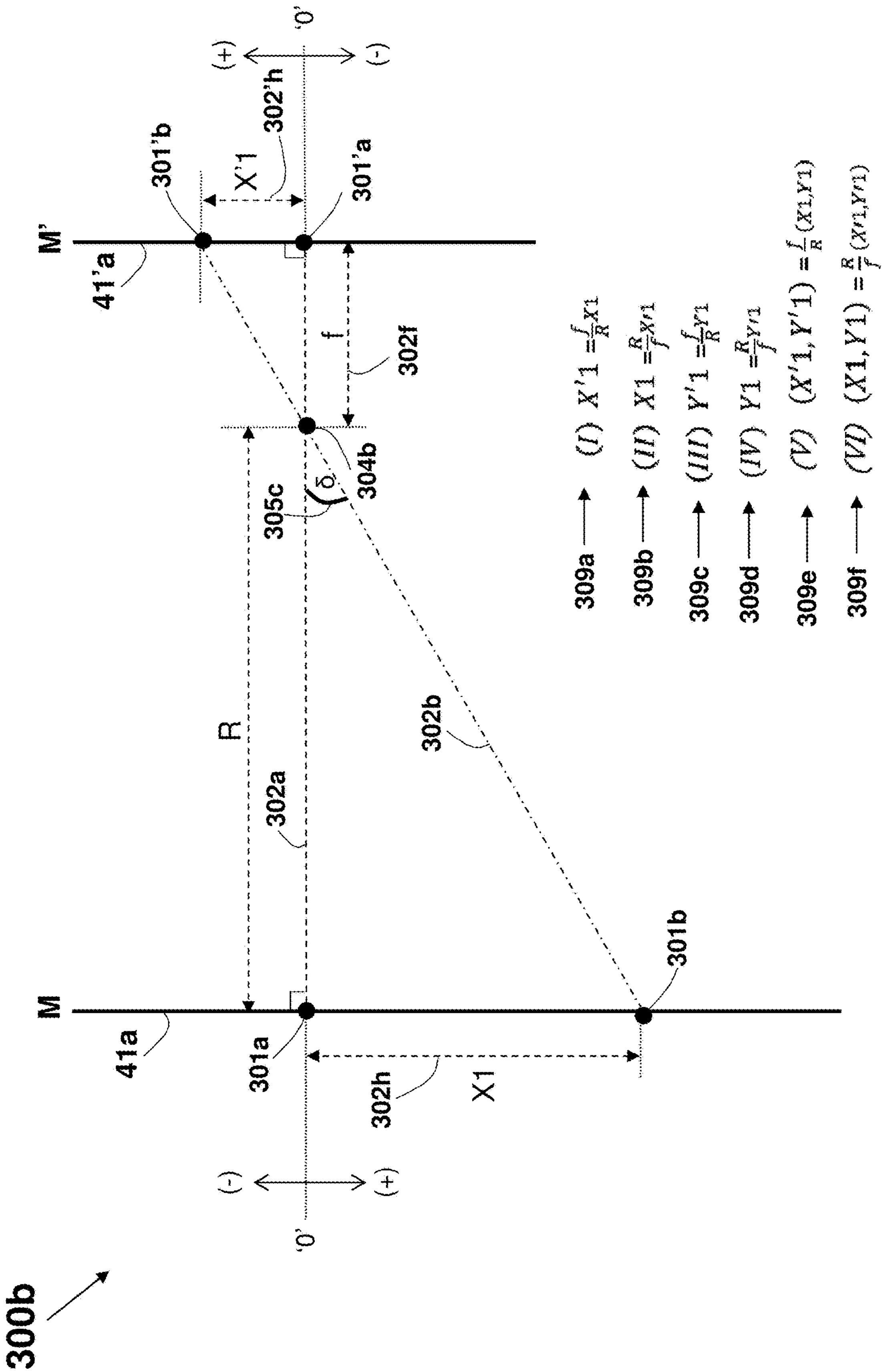
FIG. 30*b* depicts schematically a top view of an integrated angle meter/digital camera positioned to capture images in parallel to a plane on the digital camera capturing plane.

Regarding the digital camera 280, a pinhole camera model is assumed, where the image is captured by projection onto an image plane of an ideal pinhole camera, where the digital camera 280 aperture is described as a point at location 304*b* and no lenses are used to focus light. The captured image is captured by the digital camera 280 on an image plane M' 41'*a*, as shown in an arrangement 300*b* in FIG. 30*b*, illustrating the image capturing by the digital camera 280 in the arrangement 300*a* positioning. It is assumed that the image plane M' 41'*a* is parallel to the captured plane or line M 41*a*, and that the digital camera 280 focal length is f 302*f*. Hence, a point 301'*a* is the projection of the actual point 301*a* on the line M 41*a* onto the image plane M' 41'*a*, serving as the image center (or principal point). The image plane center point 301'*a* is considered as a 'zero' reference point, from which distances along the line 41'*a* in the image plane are measured, where 'up' direction in the figure, representing a 'right' side of the digital camera 280, are defined as positive values. The point 301*b* at a distance of X1 302*h* from the zero reference point 301*a* along the line 41*a* is projected to a point 301'*b* that is located at a distance of X'1 302'*h* from the zero or the image center 301'*a* point.

The geometry involved in the arrangement 300*b* provides that $X'1=f*X1/R$ 309*a*, or conversely that $X1=R*X'1/f$ 309*b*. While exampled in the arrangements 300*a* and 300*b* regarding horizontal plane, the calculation equally applies to a vertical plane (or to any other plane), where displacement is designated as Y1 in the captured plane and Y'1 in the image plane, thus resulting that $Y'1=f*Y1/R$ 309*c*, or conversely that $Y1=R*Y'1/f$ 309*d*. In general 2D representation both X1 and Y1 may be calculated as $(X'1, Y'1)=P(X1, Y1)/R$ 309*e* and conversely $(X1, Y1)=R*(X'1, Y'1)/f$ 309*f*. These set of equation allows for 2D conversion of locations between a captured plane and an image plane.

Figure 30C:
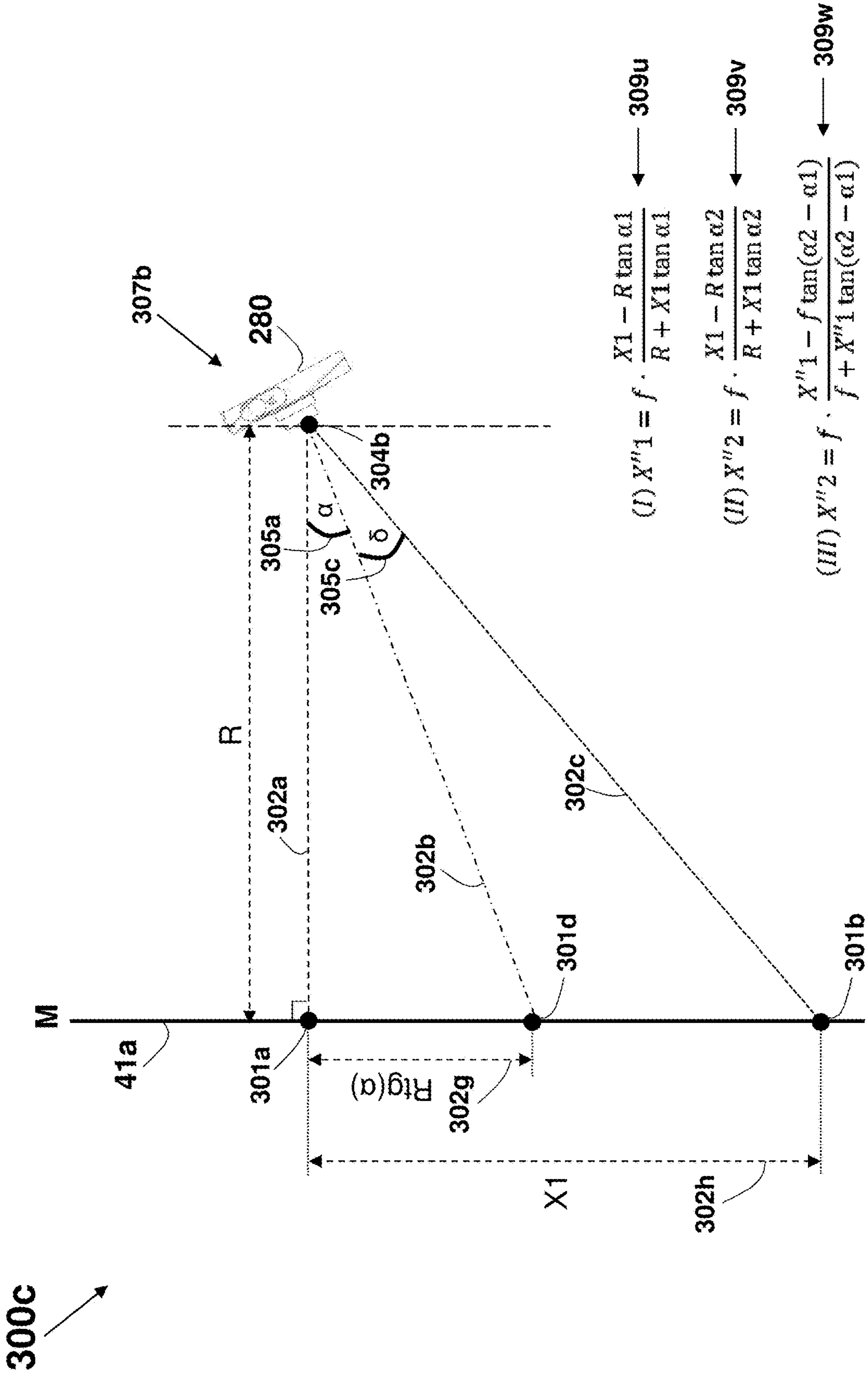
FIG. 30*c* depicts schematically a top view of an integrated angle meter/digital camera positioned to capture images while tilted from a plane.

In an arrangement 300*c* shown in FIG. 30*c*, the focal point 304*b* is in the same location as in the arrangement 300*a*. However, the digital camera 280 in in an position 307*b* so that it is tilted by the angle α 305*a*, so that the angle α 305*a* is formed between the deviated optical axis 302*b* and the line 302*a* that is perpendicular to the plane 41*a* at the point 301*a*. As such, a new center captured point 301*d* is formed, located at a distance of $R*tg(\alpha)$ 302*g* from the zero reference point 301*a*. The line of sight 302*c* to the point 301*b* that is located at a distance X1 302*h* from the reference zero point 301*a*, forms an angle δ 305*c* to the optical axis 302*b*. The angle α 305*a* may be determined by any method, and in particular by any of the methods described herein, such as based on the readings or measurements by two distance meters.

Figure 30D:
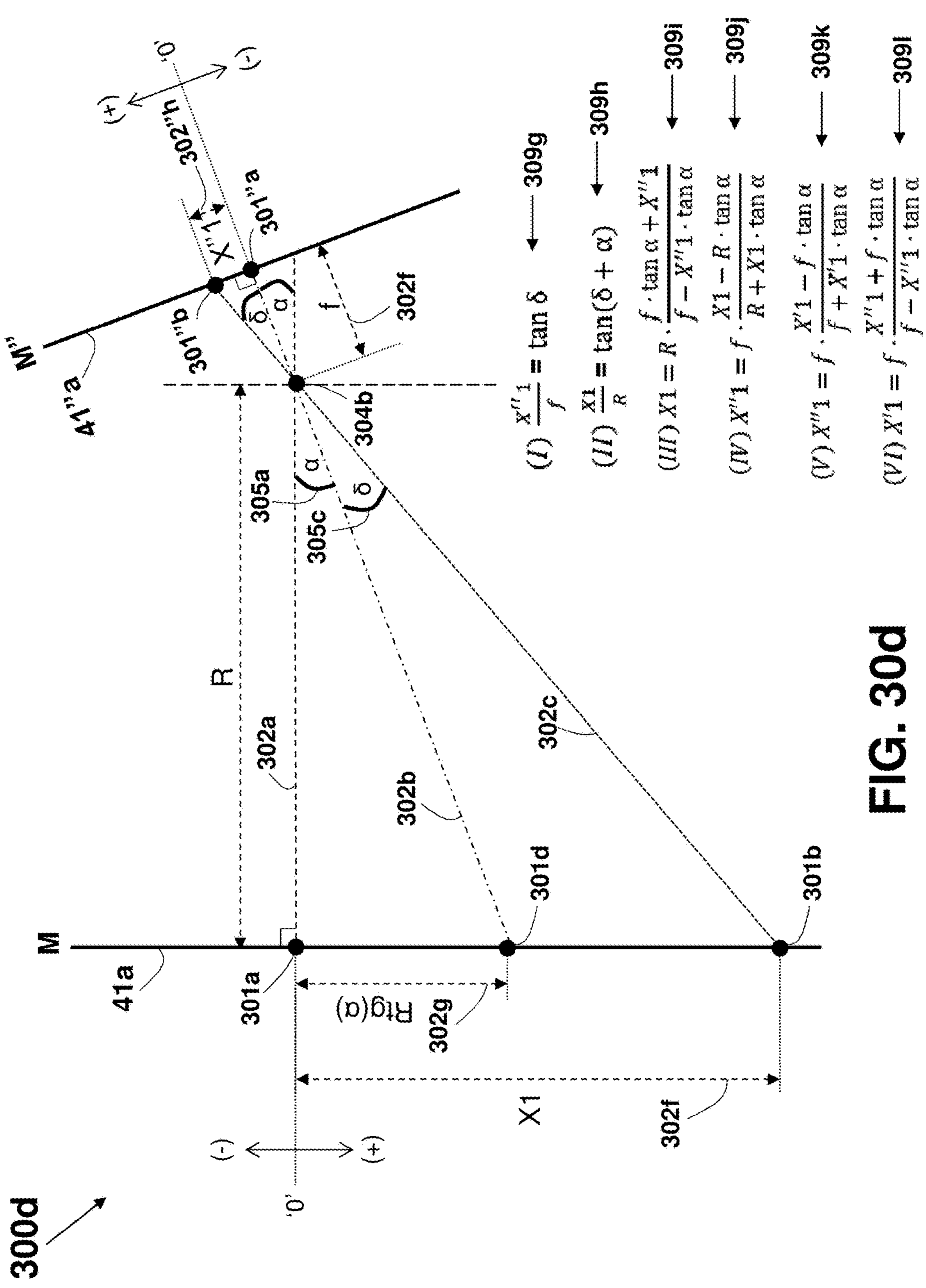
FIG. 30*d* depicts schematically a top view of an integrated angle meter/digital camera positioned to capture images while tilted from a plane on the digital camera capturing plane.

The tilting of the digital camera 280 versus the positioning shown in the arrangement 300*a* results in tilting of the image plane M" 41"*a* by the angle α 305*a* versus the plane or line M 41*a*, as shown in an arrangement 300*d* in FIG. 30*d*. The point 301*b* is projected onto the image plane M" 41"*a* to a point 301"*b*, which is located at a distance X"1 302"*h* from the new image center point 301"*a*. The geometry involved provides that $X''1/f=tg(\delta)$ 309*g* and that $X1/R=tg(\delta+\alpha)$ 309*h*. It is assumed that the angle α 305*a* is known, allowing for conversion between distances on the captured plane M 41*a* and the image plane M" 41"*a*, according to $X1=R*(f*tg(\alpha)+X''1)/(f-X''1*tg(\alpha))$ 309*i*, and conversely to $X''1=f*(X1-R*tg(\alpha))/(R+X1*tg(\alpha))$ 309*j*. It is assumed that the same plane M 41*a* and the same displaced point 301*b* are captured in both the arrangement 300*a* and 300*c*. Hence, a conversion between the image plane M1 41'*a* of the arrangement 300*b* and the image plane M" 41"*a* of the arrangement 300*d* may be calculated as $X''1=f*(X'1-f*tg(\alpha))/(f+X'1*tg(\alpha))$ 309*k*, and conversely $X'1=f*(X''1+f*tg(\alpha))/(f-X''1*tg(\alpha))$ 3091. Affectively, the arrangement 300*c* is a private case of the arrangement 300*d*, where $\alpha=0$.

Figure 29:
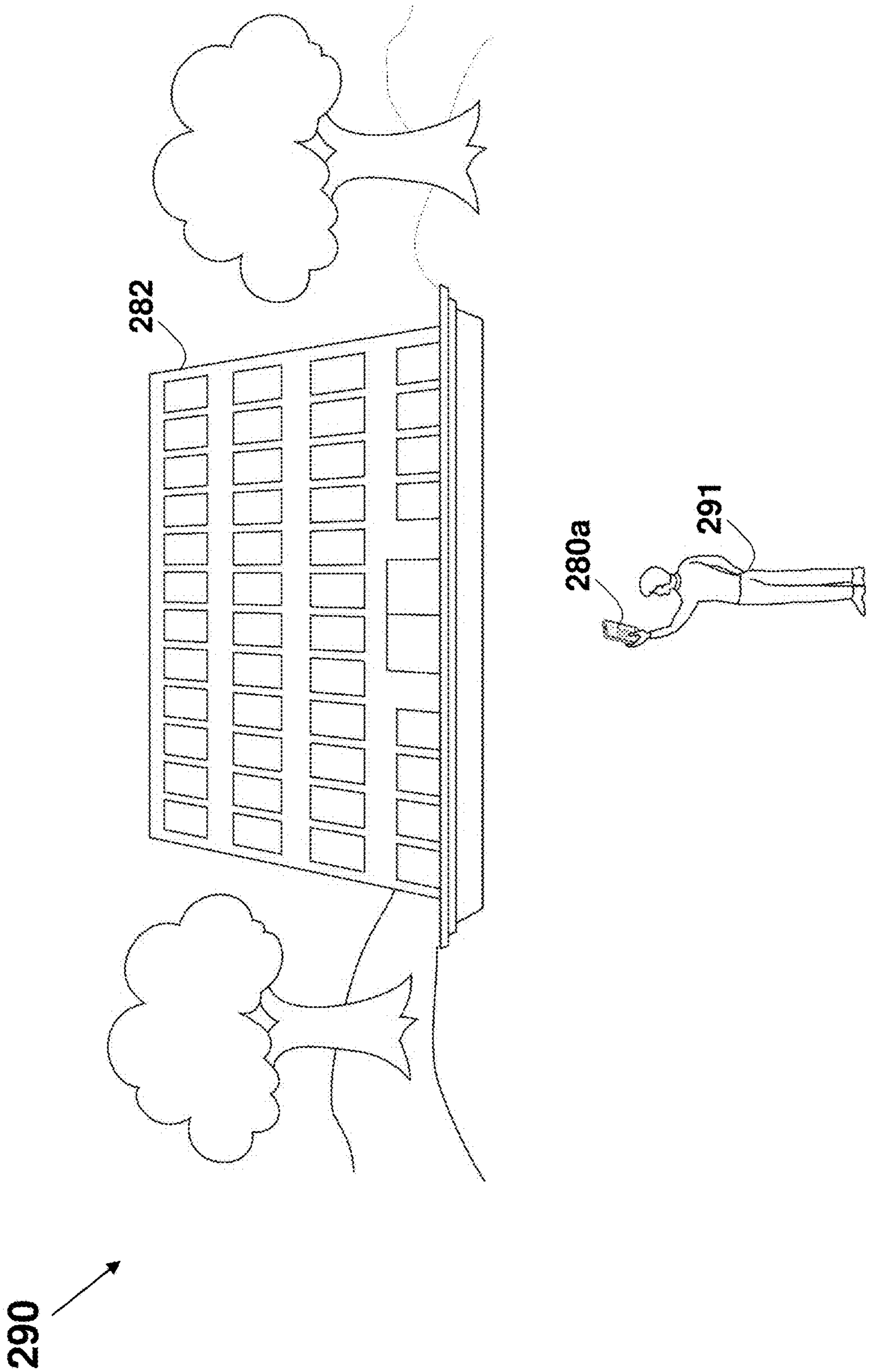
FIG. 29 depicts pictorially taking a picture of a building using a camera.
Figure 29A:
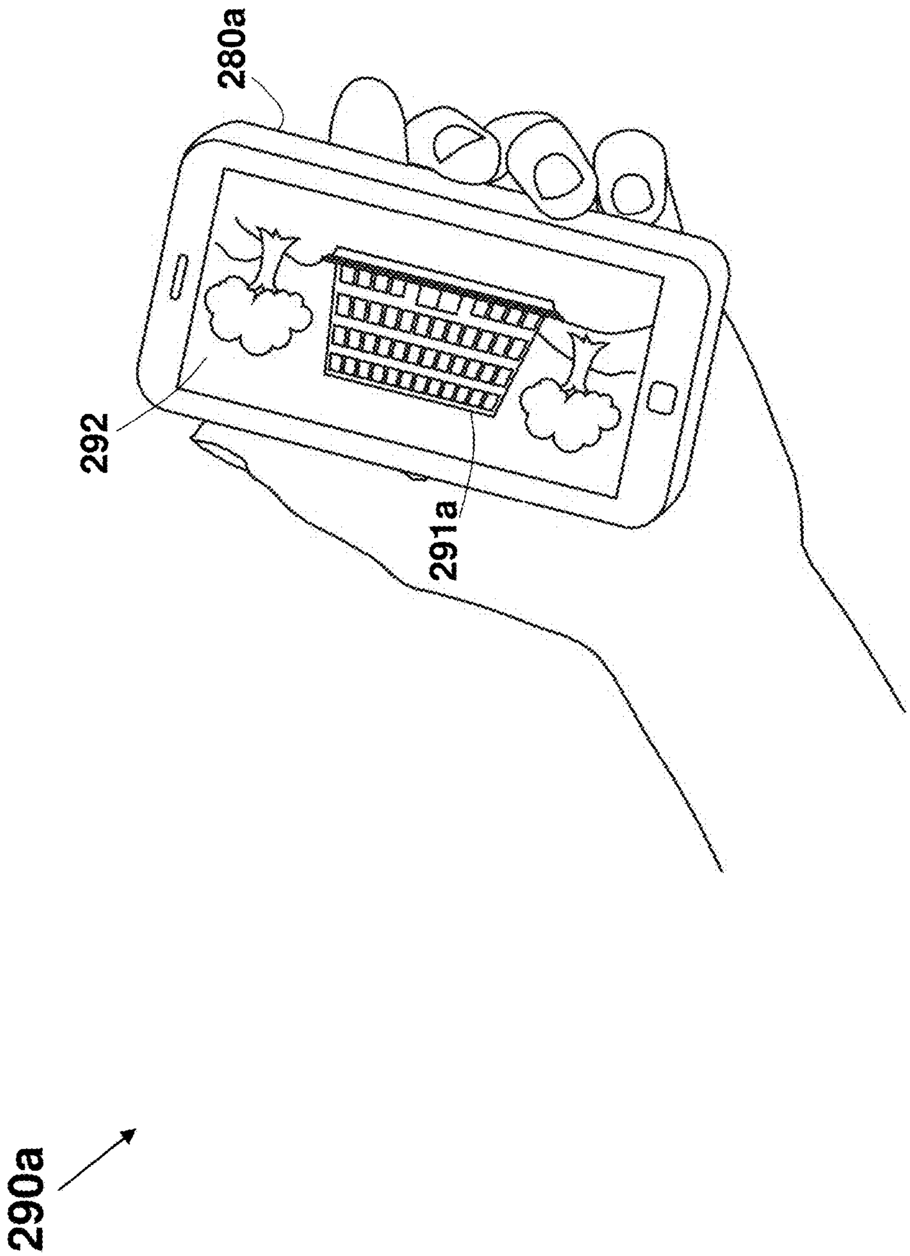
FIG. 29*a* depicts pictorially a picture taken of a building having a perspective distortion.
Figure 29B:
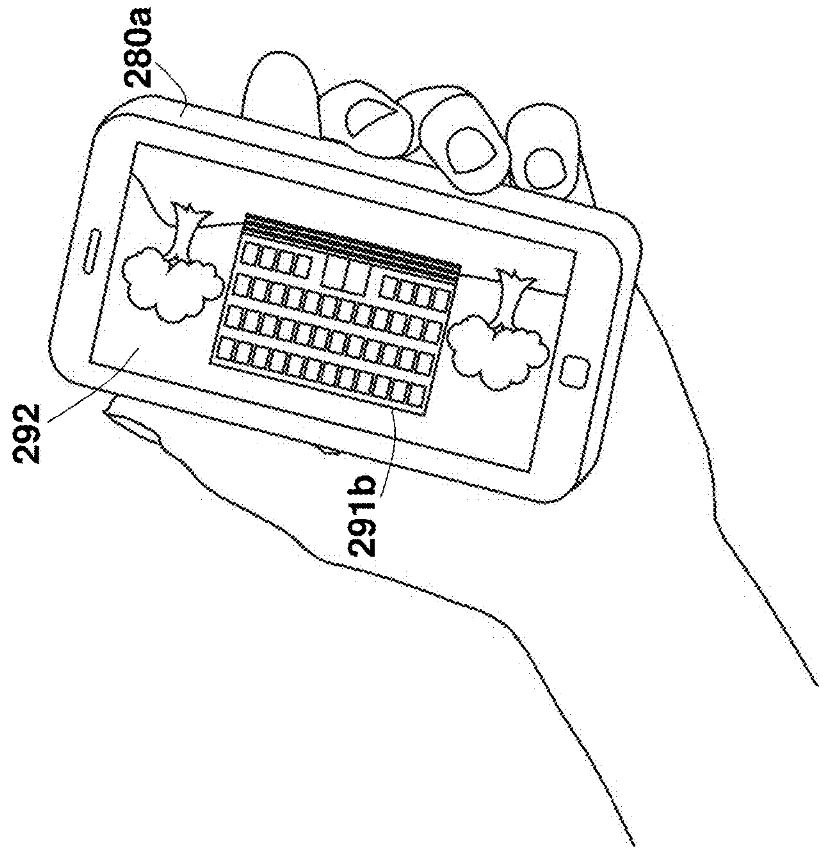
FIG. 29*b* depicts pictorially a picture taken of a building having a corrected perspective distortion.
Figure 29C:
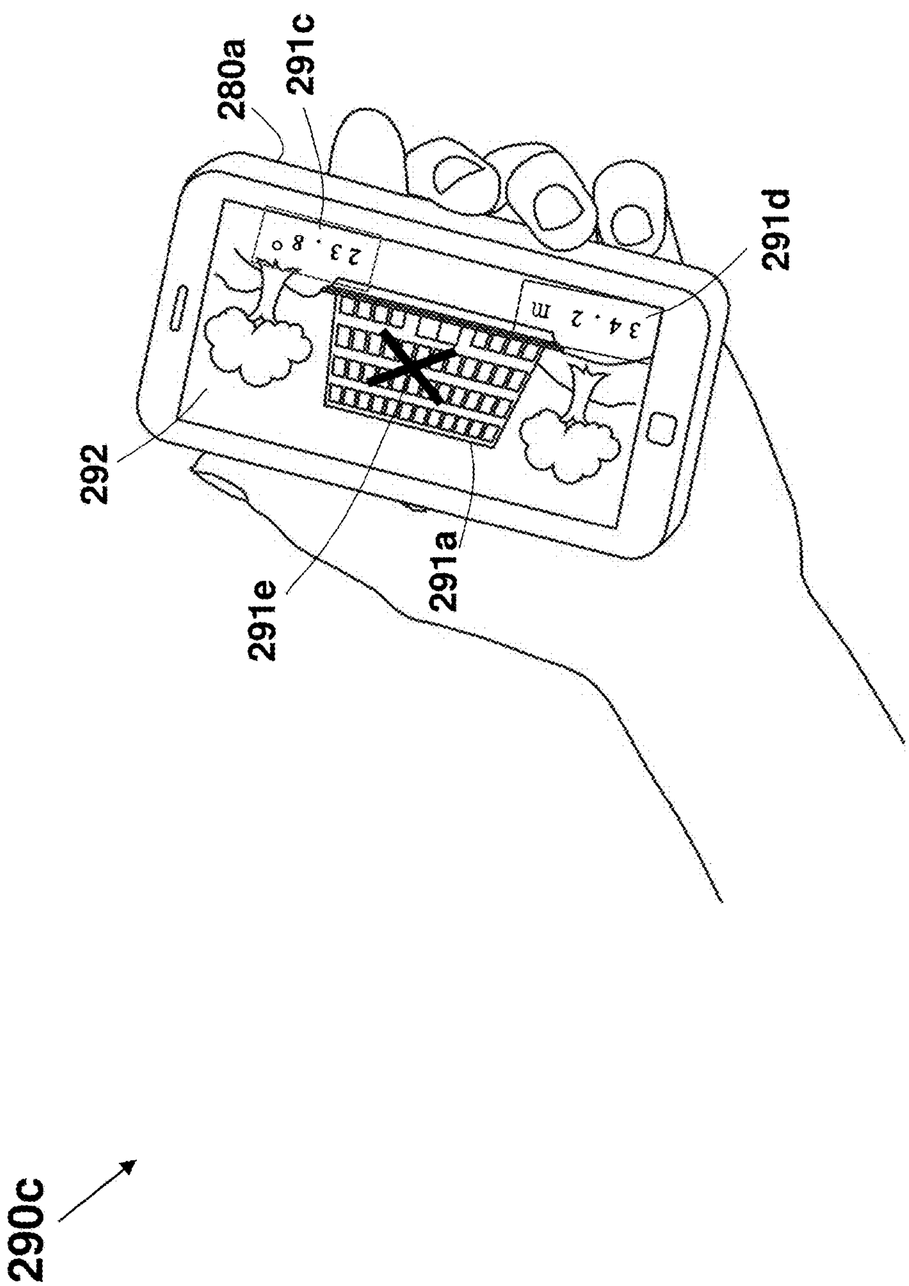
FIG. 29*c* depicts pictorially a picture taken of a building having a perspective distortion showing measured angle and distance.

Hence, an image captured by a digital camera 280 that is positioned 307*b* tilted from a reference position 307*a*, may be corrected by applying the above equation and updating the locations of the captured points. In one example, such correction may be used for correcting a perspective distortion, as depicted in a view 290 shown in FIG. 29. A person 291 is using a combined digital camera/angle meter 280*a* (that may comprise any of the devices described herein) for capturing an image of a building 282. Since the person is located at the ground level of the building 282, a perspective distortion image of the building 282 is captured, as shown by a building image 291*a* in a view 290*a* in FIG. 29*a*, visually presented on a display 292 of the combined digital camera/angle meter 280*a*. Since the angle to the building front may be measured as the angle α 305*a* in the former arrangements, the image captured on the image plane of the digital camera 280*a* may be used for converting to a non-tilted scenario (where $\alpha=0$), as depicted by an image 291*b* shown as part of a view 290*b* in FIG. 29*b*. The measured or estimated values, such as the angle α 305*a* or the angle δ 305*c* (or both) to a respective point 301*d* or 301*b*, as well as the distance 302*b* or R 302*a* (or both), may be stored with the captured image, such as part of the captured image file metadata or embedded in the image. An example of the view 290*a* shown in FIG. 29*a* modified with image-embedded values is shown in a view 290*c* in FIG. 29*c*. A cursor 291*e* is embedded into the captured image or to the displayed captured image, and may correspond to denoting the point 301*d* or the point 301*b*. An angle field 291*c* illustrating a value 23.8° may correspond to any measured or calculated angle, such as the angle α 305*a* or the angle δ 305*c* (or both). Similarly, a distance field 291*d* illustrating a value 34.2 meters (34.2 m) may correspond to any measured or calculated distance, such as the distance 302*b* or R 302*a* (or both).

While the arrangement 300*c* exampled an angular deviation 307*b* of the digital camera 280 around the focal point

Figure 30E:
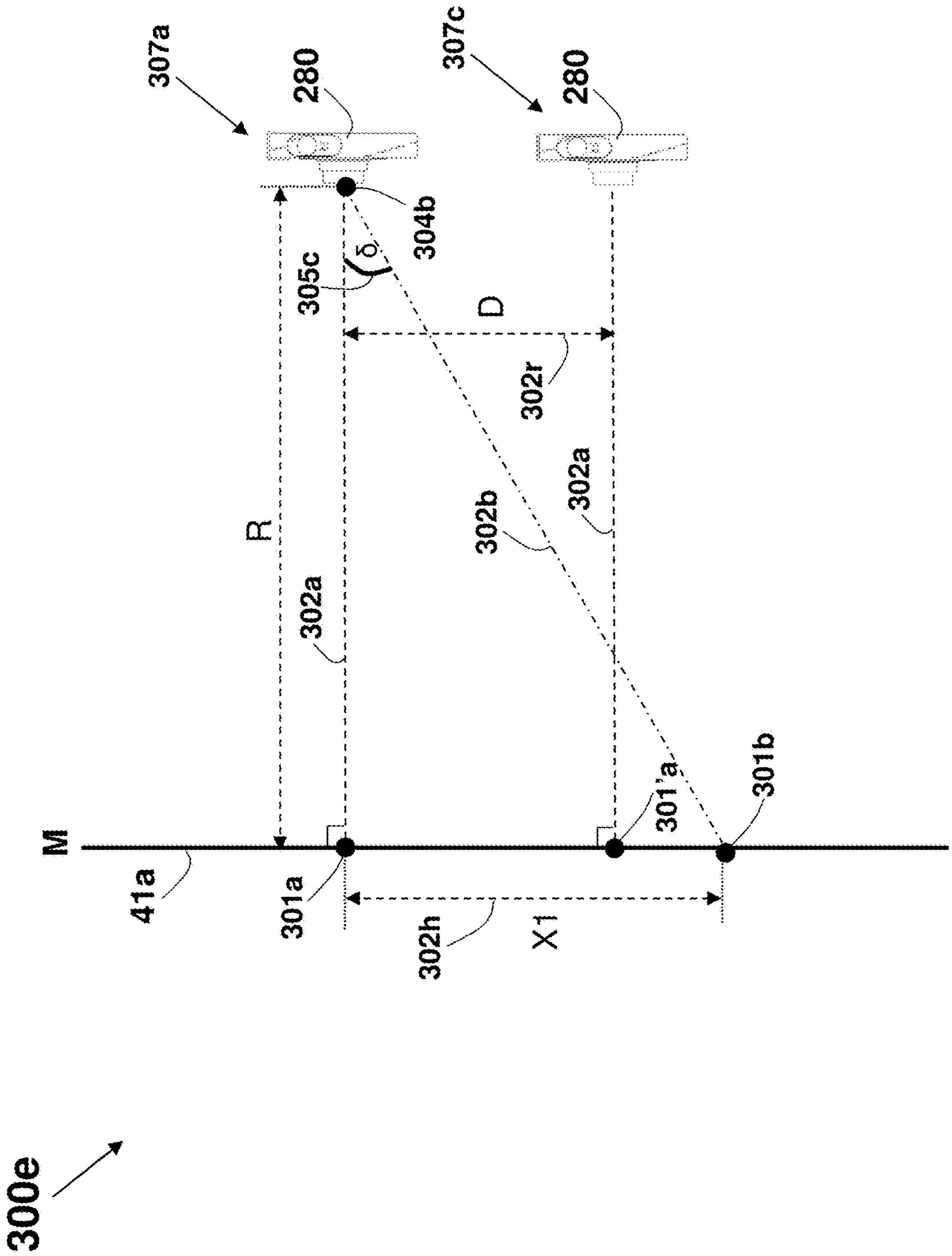
FIG. 30*e* depicts schematically a top view of an integrated angle meter/digital camera positioned to capture images shifted in distance but in parallel to a plane.

304*b*, a distal deviation may be equally applied, as described in an arrangement 300*e* shown in FIG. 30*e*. The digital camera 280 is relocated to a new position 307*c* without any angular deviation, located at a distance D 302*r* from the reference point 304*b*, and keeping the distance R 302*a* from the captured plane M 41*a*. The digital camera 280 optical axis 302*a* is centered at a new point 301'*a* along the line M 41*a*, located at a distance of D 302*r* from the former center point 301*a*.

Figure 30F:
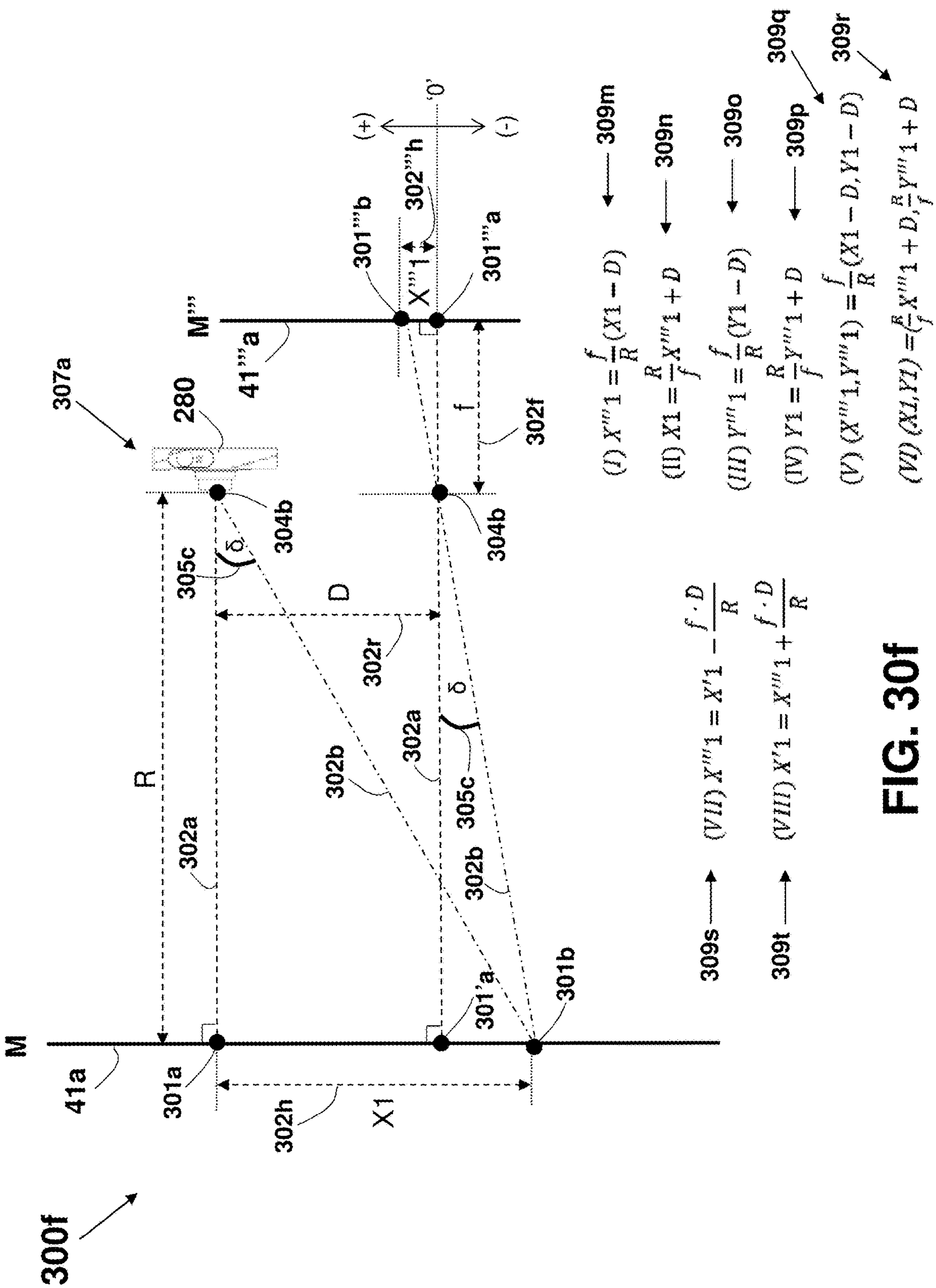
FIG. 30*f* depicts schematically a top view of an integrated angle meter/digital camera positioned to capture images shifted in distance but in parallel to a plane on the digital camera capturing plane.
Figure 31:
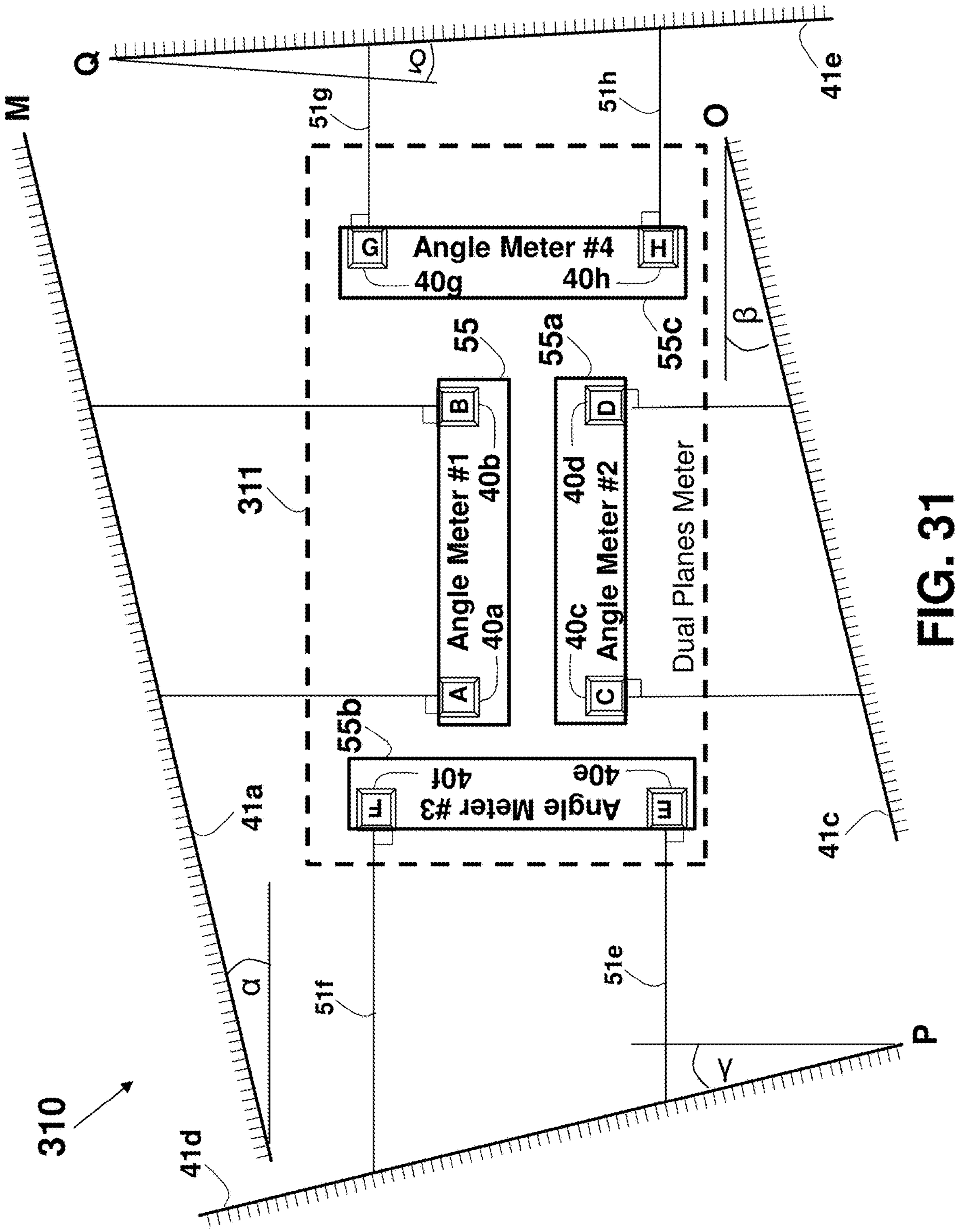
FIG. 31 depicts schematically measuring two angles by using four angle meters each using two distinct distance meters functionalities.
Figure 32:
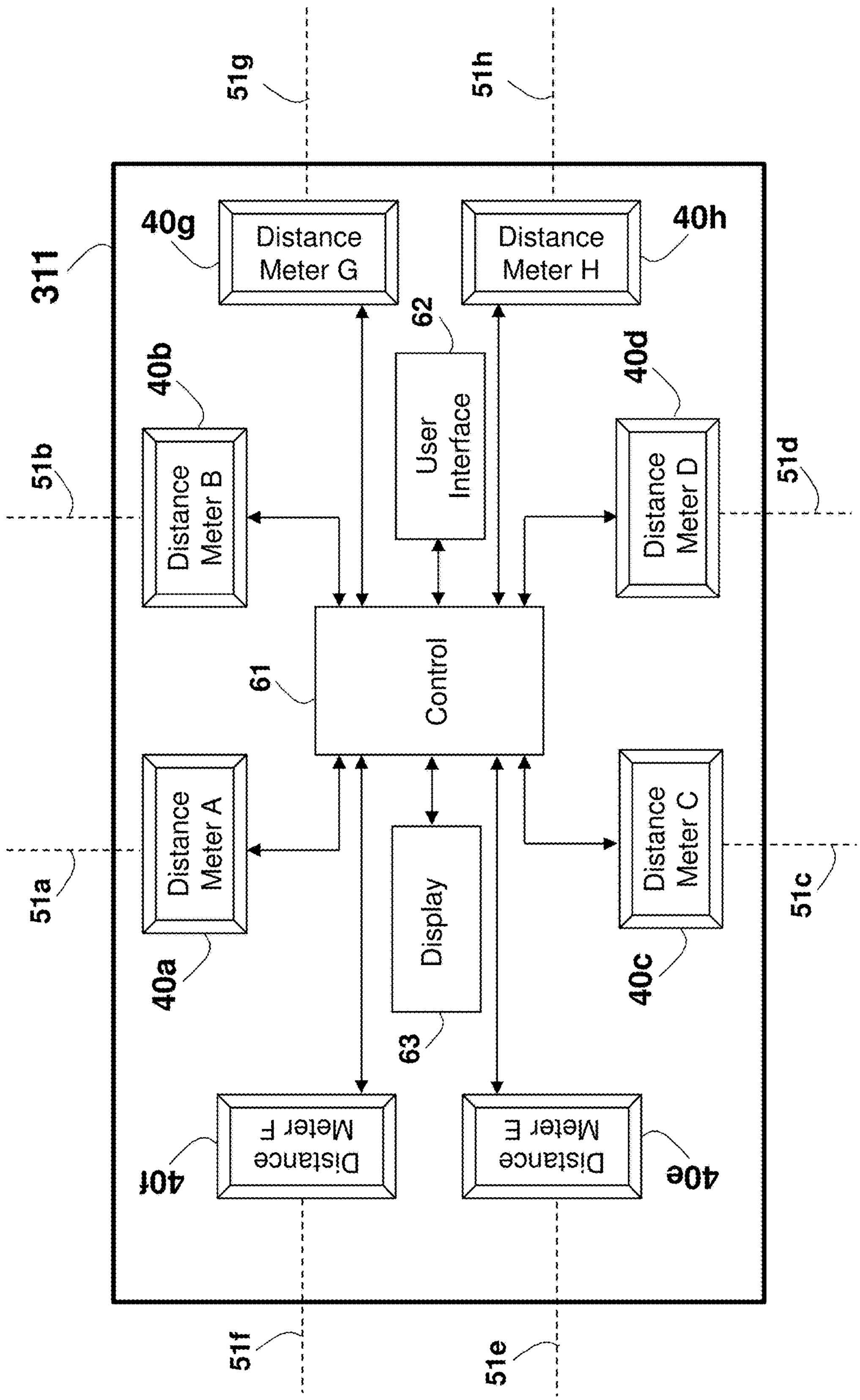
FIG. 32 illustrates a simplified schematic block diagram of an arrangement using four angle meters each using two distance meters.

The image plane M''' 41'''*a* is similarly displaced by the distance D 302*r* as shown in an arrangement 300*f* in FIG. 30*f*. The projection of the point 301*b* representing the distance X1 302*h* from the zero point 301*a* shifts to a new point 301'''*b*, that is at a distance X'''1 302'''*h* from a new center image point 301'''a. The geometry involved in the arrangement 300*f* provides that $X'''1=f*(X1-D)/R$ 309*m*, or conversely that $X1=R*X'''1/f+D$ 309*n*. While exampled in the arrangements 300*a* and 300*b* regarding horizontal plane, the calculation equally applies to a vertical plane (or to any other plane), where displacement is designated as Y1 in the captured plane and Y'''1 in the image plane, thus resulting that $Y'''1=f*(Y1-D)/R$ 309*o*, or conversely that $Y1=R*Y'''1/f+D$ 309*p*. In general 2D representation both X1 and Y1 may be calculated as $(X'''1, Y'''1)=f*(X1-D, Y1-D)/R$ 309*q* and conversely $(X1, Y1)=(R*X''1/f+D, R*Y'''1/f+D)$ 309*r*. These set of equation allows for 2D conversion of locations between a captured plane and an image plane. Further, a conversion between the image plane M1 41'*a* of the arrangement 300*b* and the image plane M''' 41'''*a* of the arrangement 300*f* may be calculated as $X'''1=X1-f*D/R$ 309*s*, and conversely $X'1=X'''1+f*D/R$ 309*t*.

While the perspective distortion was described for tilted digital camera 280 shown in the arrangement 300*c* relative to the reference arrangement 300*a* shown in FIG. 30*a*, where the image plane M' 41'*a* is parallel to the captured plane M 41*a*, the described method and scheme may be equally used for converting from any tilting angle to any other tilting angle. Assuming a general tilting angle α1 then according to equation 309*j* described above, the point 301*b* at a distance X1 302*f* is projected to $X''1=f*(X1-R*tg(\alpha1))/(R+X1*tg(\alpha1))$ 309*u*. Similarly, assuming a different general tilting angle α2 then according to equation 309*j* described above, the point 301*b* at a distance X1 302*f* is projected to $X''2=f*(X1-R*tg(\alpha2))/(R+X1*tg(\alpha2))$ 309*v*. Thus, converting between the distances X''2 and X''1 may be calculated to be $X''2=f*(X''1-f*tg(\alpha2-\alpha1))/(f+X''1*tg(\alpha2-\alpha1))$ 309*w*. The scenario of the arrangement 300*d* is thus a private case where α1=0, which means the arrangement 300*b* shown in FIG. 30*b*.

In one example, immediately or as part of capturing an image by the integrated angle meter/digital camera 280, the distance meters (such as the distance meters 40*a* and 40*b* shown as part of the angle meter 55 in FIG. 5) are activated and the distances d1 51*a* and d2 51*b* are measured. In one example, the measured distances d1 51*a* and d2 51*b* are stored with the captured image, allowing for future processing based on the distance (such as the distance dav 51*e*) and/or the angle (such as the angle α 56*b*) to the captured object (such as the plane M 41*a*). Alternatively or in addition, the distance (such as the distance dav 51*e*) and/or the angle (such as the angle α 56*b*) are calculated and stored with the captured image. In one example, the measurements or the resulting calculations (or both) are stored as a metadata with the captured image. In one example, four distance meters are used for providing data regarding both horizontal and vertical distance and tilting of the digital camera 280, allowing for 2D correction of the perspective distortion.

Any apparatus herein, which may be any of the systems, devices, modules, or functionalities described here, may include a wireless communication capability. For example, any of the meters herein, such as any of the distance meters, the angle meters, or the planes meters may be capable of sending and receiving information over a wireless ad-hoc or infrastructure-based network.

Figure 21A:
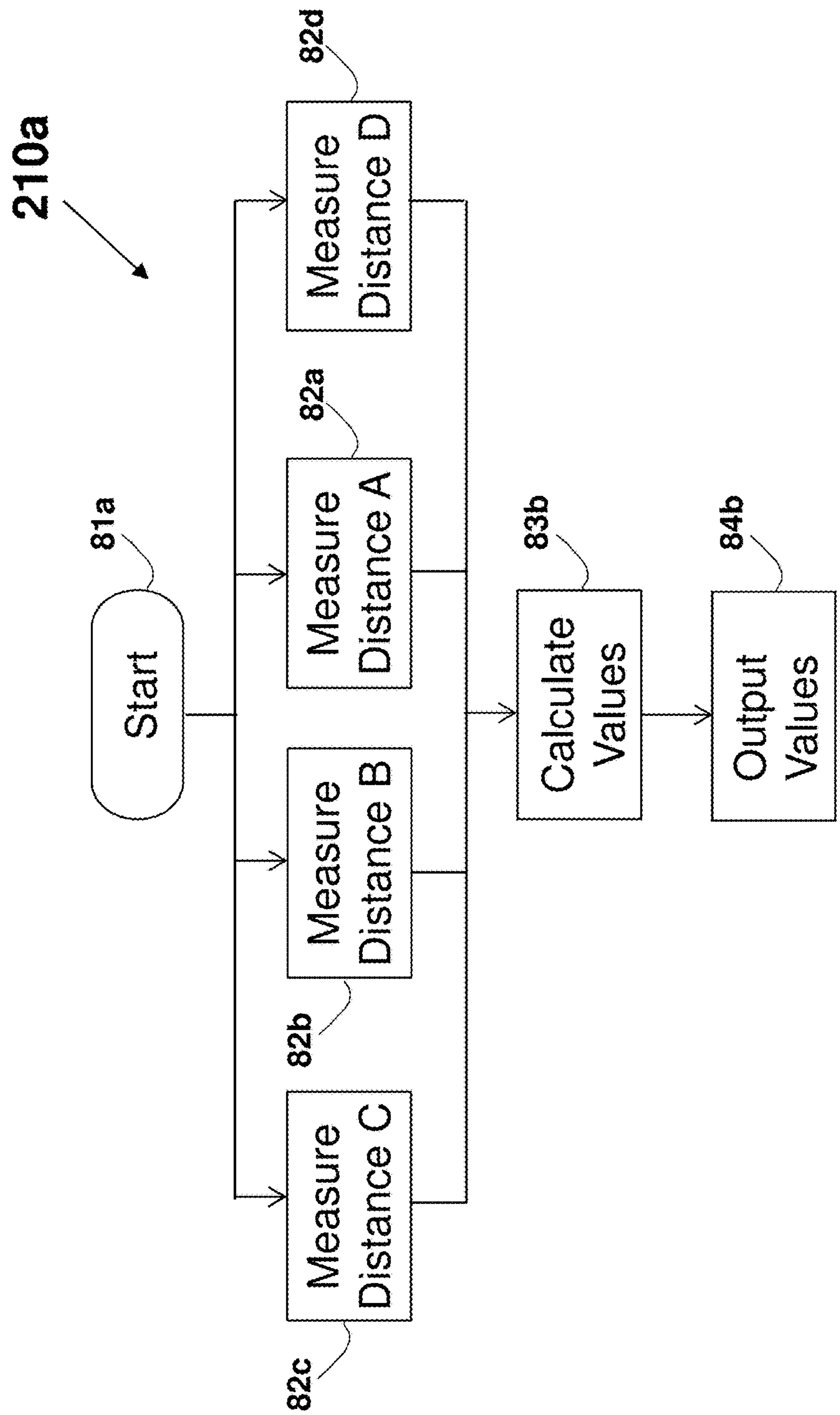
FIG. 21*a* illustrates schematically a simplified flowchart of a method for measuring an angle using four distance meters.
Figure 33:
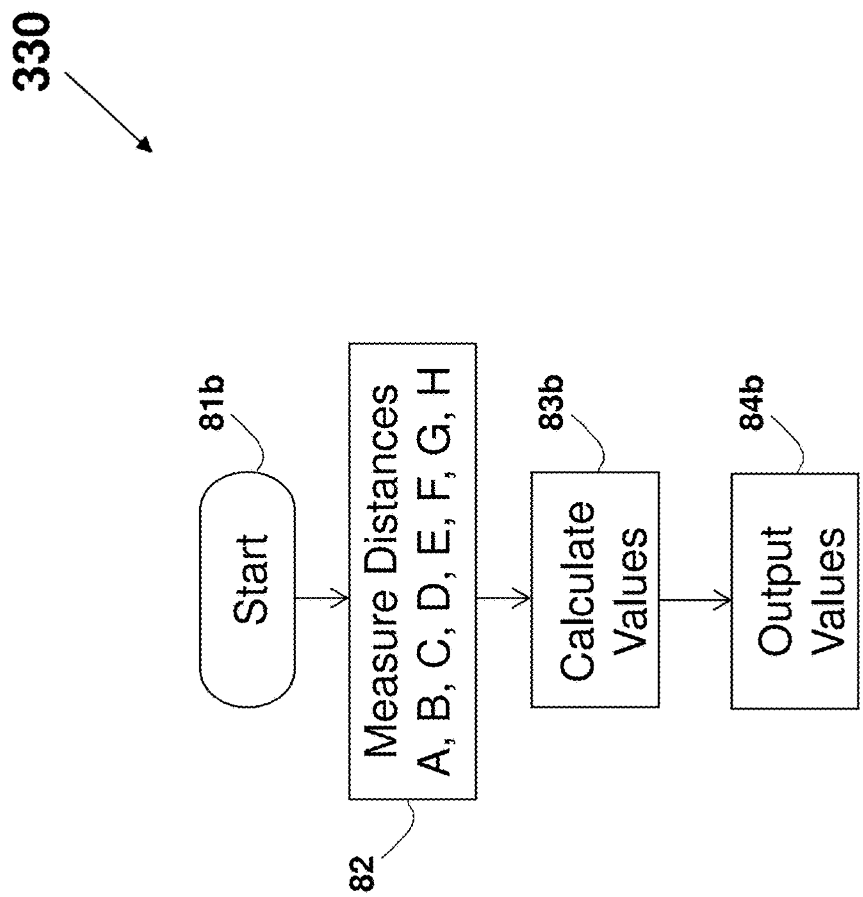
FIG. 33 illustrates schematically a simplified flowchart of a method for measuring two angles using four angle meters each using two distance meters.

In one example, the apparatus may be remotely commanded over the wireless network. For example, a meter (such as a distance, angle, or planes meter) may be commanded over the wireless network to be activated or to start any measurement. For example, an angle meter may start the flow chart 80 shown in FIG. 8 as part of the 'Start' step 81 in response to a start command received wirelessly. Similarly, a planes meter may start the flow chart 210 shown in FIG. 21 (or the flow chart 210*a* shown in FIG. 21*a*) as part of the 'Start' step 81*a* in response to a start command received wirelessly. Further, a meter may start the flow chart 330 shown in FIG. 33 as part of the 'Start' step 81*b* in response to a start command received wirelessly. Such initiation command may be used as an alternative or in addition to a local starting command, for example, by the user pressing a button that is part of the User Interface block 62. Further, an apparatus settings or parameters may be set via the wireless network, as an alternative or in addition to local settings or command, such as by the user pressing a button that is part of the User Interface block 62.

In addition to receiving data such as commands or settings, the wireless network connectivity may be used to send any of the measured, estimated, or calculated parameters, such as calculated or estimated distances, angles, speeds, or time periods. These measured, estimated, or calculated parameters may be wirelessly sent over the wireless network to another apparatus, such as for notifying a remote user, as an alternative or in addition to notifying a local user such as by displaying the information on the display 63.

An example of a wirelessly controlled distance meter 401, which is based on the generic distance meter 15 shown in FIG. 1, is shown in FIG. 40, and comprises a wireless transceiver 403, which is typically a wireless modem, connected to an antenna 402. The antenna 402 is used for transmitting and receiving over-the-air Radio-Frequency (RF) based communication signals. Commands received over the air are received by the antenna 402, processed by the wireless transceiver 403, and transmitted to the meter processor or controller. Based on the wirelessly received commands, the wireless functionality distance meter 401 allows a user to be remotely located from the system, and to send the commands wirelessly. For example, the user may use a wireless hand-held device such as a smartphone 406*a* to remotely command the distance meter 401. In one example, the system state is controlled by both the manually user activated switch that is part of the user interface block 62 and the wirelessly received commands obtained via the antenna 402 and the wireless transceiver 403.

An example of a wirelessly capable angle meter 404, which is based on the generic angle meter 55 shown in FIG. 6, is shown in FIG. 41, and comprises the wireless transceiver 403, which is typically a wireless modem, connected to the antenna 402. Similarly, an example of a wirelessly capable angle meter 404*a*, which is based on the generic angle meter 55*c* shown in FIG. 7, is shown in FIG. 41*a*, and comprises the wireless transceiver 403, which is typically a wireless modem, connected to the antenna 402.

An example of a wirelessly capable planes meter 405, which is based on the generic planes meter 201 shown in FIG. 20*c*, is shown in FIG. 42, and comprises the wireless transceiver 403, which is typically a wireless modem, connected to the antenna 402. Similarly, an example of a wirelessly capable planes meter 405*a*, which is based on the generic planes meter 155*c* shown in FIG. 22, is shown in FIG. 42*a*, and comprises the wireless transceiver 403, which is typically a wireless modem, connected to the antenna 402. Typically, the wireless transceiver 403 is connected to be controlled to the processor in the control block 61. Further, the data received from the wireless network by the wireless transceiver 403 via the antenna 402 is typically transferred, handled, analyzed, and manipulated by the processor in the control block 61. Similarly, data to be transmitted to wireless network by the antenna 402 via the wireless transceiver 403 is typically generated by the processor in the control block 61.

A wireless ad-hoc network, also known as Independent Basic Service Set (IBSS), is a computer network in which the communication links are wireless. The network is ad-hoc because each node is willing to forward data for other nodes, and so the determination of which nodes forward data is made dynamically based on the network connectivity. In one configuration, the wireless communication by an apparatus, such as a meter herein, is based on ad-hoc (decentralized) networking, where messages are directly communicated between the wireless transceiver and a mating wireless transceiver in another unit, without using or relying on any pre-existing infrastructure such as a router or an access-point. Such an ad-hoc networking scheme is exampled for an angle meter 404*b* shown in an arrangement 430 in FIG. 43, illustrating a wireless link (as a dashed line 407) serving as a direct communication between the angle meter 404*b* and a unit 406 that includes a wireless transceiver 403*a* connected to an antenna 402*a*. For example, the unit 406 may be a smartphone or any other wireless-capable device.

Alternatively or in addition, the wireless communication may use an infrastructure supporting centralized management or routing, where a router, access-point, switch, hub, or firewall performs the task of central management, and the routing or forwarding of the data. Such an arrangement 430*a* is shown in FIG. 43*a*, employing a Wireless Access Point (WAP) 408 that communicates with an angle meter 404*c* over a wireless link 407*a*, with another unit 406 over a wireless link 407*b*, and with a smartphone 406*a* over a wireless link 407*c*. All messages or packets are generally received at the WAP 408, which in turn transmits the messages or packets to the intended recipient. For example, a command from the smartphone 406*a* is sent over the wireless link 407*c* to the WAP 408, which in turn routes and sends the command to the angle meter 404*c* over the wireless link 407*a*, forming the virtual messaging link. The networking or the communication with the wireless-capable meter (such as the distance meter 401 shown in FIG. 40, the angle meter 404 shown in FIG. 41, the angle meter 404*a* shown in FIG. 41*a*, the planes meter 405 shown in FIG. 42, or the planes meter 405*a* shown in FIG. 42*a*) may be using, may be according to, may be compatible with, or may be based on, a Body Area Network (BAN) that may be according to, may be compatible with, or based on, IEEE 802.15.6 standard, and the wireless transceivers 403 may be a BAN modem, and the respective antenna 402 may be a BAN antenna. Alternatively or in addition, the networking or the communication with the wireless-capable meter may be using, may be according to, may be compatible with, or may be based on, Near Field Communication (NFC) using passive or active communication mode, and may use the 13.56 MHz frequency band, and data rate may be 106Kb/s, 212Kb/s, or 424 Kb/s, and the modulation may be Amplitude-Shift-Keying (ASK), and may be according to, may be compatible with, or based on, ISO/IEC 18092, ECMA-340, ISO/IEC 21481, or ECMA-352. In such a case, the wireless transceiver 403 may be an NFC transceiver and the respective antenna 402 may be an NFC antenna.

Alternatively or in addition, the networking or the communication with the wireless-capable meter may be using, may be according to, may be compatible with, or may be based on, a Personal Area Network (PAN) that may be according to, may be compatible with, or based on, Bluetooth™ or IEEE 802.15.1-2005 standards, and the wireless transceiver 403 may be a PAN modem, and the respective antenna 402 may be a PAN antenna. Alternatively or in addition, the networking or the communication with the wireless-capable meter may be using, may be according to, may be compatible with, or may be based on, a Wireless Personal Area Network (WPAN) that may be according to, may be compatible with, or based on, Bluetooth™ or IEEE 802.15.1-2005 standards, and the wireless transceiver 403 may be a WPAN modem, and the respective antenna 402 may be a WPAN antenna. The WPAN may be a wireless control network according to, may be compatible with, or based on, ZigBee™ or Z-Wave™ standards, such as IEEE 802.15.4-2003.

Alternatively or in addition, the networking or the communication with the wireless-capable meter may be using, may be according to, may be compatible with, or may be based on, a Wireless Local Area Network (WLAN) that may be according to, may be compatible with, or based on, IEEE 802.11a, IEEE 802.11b, IEEE 802.11g, IEEE 802.11n, or IEEE 802.11ac standards, and the wireless transceiver 403 may be a WLAN modem, and the respective antenna 402 may be a WLAN antenna. Alternatively or in addition, the networking or the communication with the wireless-capable meter may be using, may be according to, may be compatible with, or may be based on, a wireless broadband network or a Wireless Wide Area Network (WWAN), the wireless transceiver 403 may be a WWAN modem, and the respective antenna 402 may be a WWAN antenna. The WWAN may be a WiMAX network such as according to, may be compatible with, or based on, IEEE 802.16-2009, the wireless transceiver 403 may be a WiMAX modem, and the respective antenna 402 may be a WiMAX antenna. Alternatively or in addition, the WWAN may be a cellular telephone network and the wireless transceiver 403 may be a cellular modem, and the respective antenna 402 may be a cellular antenna. The WWAN may be a Third Generation (3G) network and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use HSPA+, Mobile WiMAX, LTE, LTE-Advanced, MBWA, or may be based on, or may be compatible with, IEEE 802.20-2008. Alternatively or in addition, the WWAN may be a satellite network, the wireless transceiver 403 may be a satellite modem, and the respective antenna 402 may be a satellite antenna.

Alternatively or in addition, the networking or the communication with the wireless-capable meter may be using licensed or an unlicensed radio frequency band, such as the Industrial, Scientific and Medical (ISM) radio band. For example, an unlicensed radio frequency band may be used that may be about 60 GHz, may be based on beamforming, and may support a data rate of above 7 Gb/s, such as according to, may be compatible with, or based on, WiGig™, IEEE 802.11ad, WirelessHD™ or IEEE 802.15.3c-2009, and may be operative to carry uncompressed video data, and may be according to, may be compatible with, or based on, WHDI™. Alternatively or in addition, the wireless network may use a white space spectrum that may be an analog television channel consisting of a 6 MHz, 7 MHz or 8 MHz frequency band, and allocated in the 54-806 MHz band. The wireless network may be operative for channel bonding, may use two or more analog television channels, and may be based on Wireless Regional Area Network (WRAN) standard using OFDMA modulation. Further, the wireless communication may be based on geographically based cognitive radio, and may be according to, may be compatible with, or based on, IEEE 802.22 or IEEE 802.11af standards.

The wireless functionality was exampled in the FIGS. 40-43*a* for commanding and controlling the system, and in particular for affecting the load 12 state. Alternatively or in addition, the wireless functionality may be used for sending notification over a wireless network to a user, such as to the smartphone 406*a* that is operated or used by the user. For example, the wireless transceiver 403 in the wireless-capable meter may be used by the control block 61 to send notification to the user over the air via the antenna 402. The notification may be used to provide notice to the user about an event or occurrence, such as acknowledgement notifying the proper receipt of a state command, the commanded state, or a notification based on the sensing a phenomenon by a sensor, or based on a measurement result or a manipulation thereof. The notification may be used to provide notice to the user about an event or occurrence, such as acknowledgement, notifying the proper receipt of a state command, the actual sensed, measured, or commanded meter state, or a notification based on a measurement of the meter. For example, a measurement or any function thereof may be notified on a periodic basis or upon sensing a change in a measured or estimated parameter, such as when the output exceeds a pre-set maximum threshold, or is below a pre-set minimum threshold.

The notification to the user device may be text based, such as an electronic mail (e-mail), website content, fax, or a Short Message Service (SMS). Alternatively or in addition, the notification or alert to the user device may be voice based, such as a voicemail, a voice message to a telephone device. Alternatively or in addition, the notification or the alert to the user device may activate a vibrator, causing vibrations that are felt by human body touching, may be based on, or may be compatible with a Multimedia Message Service (MMS) or Instant Messaging (IM). The messaging, alerting, and notifications may be based on, include part of, or may be according to U.S. Patent Application No. 2009/0024759 to McKibben et al. entitled: "System and Method for Providing Alerting Services", U.S. Pat. No. 7,653,573 to Hayes, Jr. et al. entitled: "Customer Messaging Service", U.S. Pat. No. 6,694,316 to Langseth. et al. entitled: "System and Method for a Subject-Based Channel Distribution of Automatic, Real-Time Delivery of Personalized Informational and Transactional Data", U.S. Pat. No. 7,334,001 to Eichstaedt et al. entitled: "Method and System for Data Collection for Alert Delivery", U.S. Pat. No. 7,136,482 to Wille entitled: "Progressive Alert Indications in a Communication Device", U.S. Patent Application No. 2007/0214095 to Adams et al. entitled: "Monitoring and Notification System and Method", U.S. Patent Application No. 2008/0258913 to Busey entitled: "Electronic Personal Alert System", or U.S. Pat. No. 7,557,689 to Seddigh et al. entitled: "Customer Messaging Service", which are all incorporated in their entirety for all purposes as if fully set forth herein.

The wireless network may be a control network (such as ZigBee or Z-Wave), a home network, a WPAN (Wireless Personal Area Network), a WLAN (wireless Local Area Network), a WWAN (Wireless Wide Area Network), or a cellular network. An example of a Bluetooth-based wireless controller that may be included in the wireless transceiver 403 is SPBT2632C1A Bluetooth module available from STMicroelectronics NV and described in the data sheet Doc1D022930 Rev. 6 dated April 2015 entitled: "*SPBT2632C1A—Bluetooth® technology class-*1 *module*", which is incorporated in its entirety for all purposes as if fully set forth herein. Similarly, other network may be used to cover another geographical scale or coverage, such as NFC, PAN, LAN, MAN, or WAN type. The network may use any type of modulation, such as Amplitude Modulation (AM), a Frequency Modulation (FM), or a Phase Modulation (PM).

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on, or may be compatible with, wireless technologies that are described in Chapter 20*: "Wireless Technologies*" of the publication number 1-587005-001-3 by Cisco Systems, Inc. (7/99) entitled: "*Internetworking Technologies Handbook*", which is incorporated in its entirety for all purposes as if fully set forth herein.

Any device, component, or apparatus herein, may be structured as, may be shaped or configured to serve as, or may be integrated with, a wearable device. Any system, device, component, or apparatus herein may further be operative to estimate or calculate the person body orientation, such as the person head pose.

Any apparatus or device herein may be wearable on an organ such as on the person head, and the organ may be eye, ear, face, cheek, nose, mouth, lip, forehead, or chin. Alternatively or in addition, any apparatus or device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a headband, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any enclosure herein may be permanently or releaseably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top.

In one example, any device or apparatus herein, such as any angle meter or planes meter herein, may serve as a sensor for a wearable device. Alternatively or in addition, any estimated or calculated value herein may be used as an input to a wearable device.

A pictorial view of an integrated wearable eyepiece device and angle meter 440 is shown in FIGS. 44-44*b*, that may correspond to any angle meter herein. Alternatively or in addition, the eyewear device 440 is an angle meter shaped, structured, or configured as an eyepiece. A pictorial perspective view of the angle meter 440 is shown in FIG. 44, and comprises emitting apertures 285*a* and 285*b*, each located at difference sides of the structure, and sensing apertures 286*a* and 286*b*, similarly located at difference sides of the structure. In one example, the emitting aperture 285*a* and the sensing aperture 286*a* are part of, or used by, the distance meter 'B' 40*b*, and the emitting aperture 285*b* and the sensing aperture 286*b* are part of, or used by, the distance meter 'A' 40*a*, both part of the angle meter #1 55 shown as part of the integrated digital camera 270 in FIG. 27. Similarly, an angle meter 440*a* is shown in FIG. 44*a*, further comprising two antennas 441*a* and 441*b*, each may correspond to the antenna 402 of the angle meter 404 shown in FIG. 41. The angle meter 440*a* is shown worn on a person head 444 as part of a view 445 in FIG. 44*b*.

A pictorial view of an integrated headphones and angle meter 450 is shown in FIGS. 45-45*a*, that may correspond to any angle meter herein. Alternatively or in addition, the headphones shaped device 450 is an angle meter shaped, structured, or configured as headphones. A pictorial perspective view of the angle meter 450 is shown in FIG. 45, and comprises emitting apertures 285*a* and 285*b*, each located at difference sides of the structure, and sensing apertures 286*a* and 286*b*, similarly located at difference sides of the structure. In one example, the emitting aperture 285*a* and the sensing aperture 286*a* are part of, or used by, the distance meter 'B' 40*b*, and the emitting aperture 285*b* and the sensing aperture 286*b* are part of, or used by, the distance meter 'A' 40*a*, both part of the angle meter #1 55 shown as part of the integrated digital camera 270 in FIG. 27. Similarly, an angle meter 450*a* is shown in FIG. 45*a*, further comprising two antennas 441*a* and 441*b*, each may correspond to the antenna 402 of the angle meter 404 shown in FIG. 41.

Similarly, a pictorial view of an integrated VR head-work device (such as HMD) and angle meter 460 is shown in FIGS. 46-46*c*, that may correspond to any angle meter herein. Alternatively or in addition, the HMD shaped device 460 is an angle meter shaped, structured, or configured as HMD. A pictorial perspective view of the angle meter 460 is shown in FIG. 46, and comprises emitting apertures 285*a* and 285*b*, each located at difference sides of the structure, and sensing apertures 286*a* and 286*b*, similarly located at difference sides of the structure. In one example, the emitting aperture 285*a* and the sensing aperture 286*a* are part of, or used by, the distance meter 'B' 40*b*, and the emitting aperture 285*b* and the sensing aperture 286*b* are part of, or used by, the distance meter 'A' 40*a*, both part of the angle meter #1 55 shown as part of the integrated digital camera 270 in FIG. 27. Similarly, an angle meter 460*a* that is shown in FIG. 46*a* further comprises two antennas 441*a* and 441*b*, where each may correspond to the antenna 402 of the angle meter 404 shown in FIG. 41. The angle meter 460*a* is shown worn on a person head 444 as part of a view 465 in FIG. 46*b*.

While the wearable devices 440, 450, and 460 were shown as structured to measure an angle in a substantially horizontal plane, measuring a vertical angle may equally be applied. Such an HMD shaped angle meter 460*b* in shown in FIG. 46*c*, where the emitting aperture 285*a* and the sensing aperture 286*a* are located in parallel and above the emitting aperture 285*b* and the sensing aperture 286*b*, hence allowing for vertical angle measurement. Similarly, both vertical and horizontal planes may be measured, similar to the integrated digital camera 280*b* shown in FIG. 28*g*.

An angle meter housed in, or integrated with, head-wearable enclosures, such as the eyewear 440, the headset 450, or the HMD 460, may be used for estimating or measuring the head gaze (or eyes gaze) to an object, a surface, or a plane.

The measured, estimated, or calculated values or characteristics, such as distance, angle, speed, or timing, by any one of the apparatuses herein, which may be any of the systems, devices, modules, or functionalities described herein, may be used to affect an actuator operation. For example, the 'Output Values' step 84 that is part of the flow chart 80 shown in FIG. 8, may comprise a 'Display Values' step 511 and a 'Control Actuator' step 512, as shown in a partial flow chart 510 shown in FIG. 39. In the 'Display Values' step 511, any measured parameter or value, or any calculated, estimated, or otherwise obtained value or values, such as the values calculated or obtained as part of the preceding 'Calculate Values' step 83, are displayed on the display 63. As part of the 'Control Actuator' step 512, the actuator is activated, controlled, or otherwise operated or affected in response to one or more of the measured, calculated, or estimated values, or any function or manipulation thereof. Similarly, each of the 'Output Values' step 84*a* that is part of the flow chart 210 shown in FIG. 21, the 'Output Values' step 84*b* that is part of the flow chart 210*a* shown in FIG. 21*a*, and the 'Output Values' step 84*c* that is part of the flow chart 350*a* shown in FIG. 35*a*, may comprise the 'Display Values' step 511 and the 'Control Actuator' step 512. Typically, the 'Control Actuator' step 512 involves preparing a sending to the actuator, by a processor in the control block 61, commands for activating, controlling, or otherwise affecting the actuator operation.

An arrangement 500 for operating an actuator 501 is shown in FIG. 36. The actuator 501 is coupled to the control block 61 (typically including a processor) via an actuator interface block or functionality 502, which is used to adapt between the two functionalities or components. The scheme 500 may be part of, or integrated with, any of the systems, devices, modules, or functionalities described herein. For example, the arrangement 500 may be part of, or integrated with, the distance meter 15 shown as part of the arrangement 10 shown in FIG. 1, may be part of, or integrated with, any of the angle meters 55 shown in FIGS. 6-7*g*, may be part of, or integrated with, any of the planes meters 201 or 155 shown in FIGS. 20-25*b*, and may be part of, or integrated with, the area meter 350 shown in FIG. 35. The adding of the arrangement 500 may involve adding the actuator 501, and coupling the actuator interface 502 between the actuator 501 and the processor in the control block 61.

The actuator interface 505 of its functionality may be integrated, in part or in whole, with the actuator 501, with the control block 61, or any combination thereof. Preferably, the actuator 501, the actuator interface 502, or both, may be fully integrated with any of the systems, devices, modules, or functionalities described herein. For example, the same enclosure, the same power source, other functionalities or circuits, or any combination thereof, may be used by both the actuator 501, the actuator interface 502, and the control block 61. However, alternatively or in addition, each of the actuator 501, the actuator interface 502, and the control block 61, may use its own enclosure, its own power source, or its own circuits.

In one example, the actuator interface 502 consists of, comprises, or uses a signal conditioner 502*a*, shown as part of an arrangement 500*a* in FIG. 36*a*. The actuator command signal (typically digital signal such as digital output, a digital bus, or a digital interface) from the control block 61 may be conditioned by the signal conditioning circuit 502*a*. The signal conditioner may involve time, frequency, or magnitude related manipulations. The signal conditioner may be linear or non-linear, and may include an amplifier, a voltage or current limiter, an attenuator, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog actuator, a digital to analog (D/A) converter may be used to convert the digital command data to analog signals for controlling the actuators. The signal conditioner 502*a* may include a processor for controlling and managing the functionality operation, processing the actuators commands, and handling the signal conditioner 502*a* communication. The signal conditioner 502*a* may include a modem or transceiver coupled to a communication port (such as a connector or antenna), for interfacing and communicating over a network with the control block 502*a*, with the actuator 501, or any combination thereof.

Any device, component, or element designed for, or capable of, directly or indirectly affecting, changing, producing, or creating a physical phenomenon under an electric signal control may be used as the actuator 501. An appropriate actuator may be adapted for a specific physical phenomenon, such as an actuator affecting temperature, humidity, pressure, audio, vibration, light, motion, sound, proximity, flow rate, electrical voltage, and electrical current. An actuator unit 501 may include one or more actuators, each affecting or generating a physical phenomenon in response to an electrical command, which can be an electrical signal (such as voltage or current), or by changing a characteristic (such as resistance or impedance) of an element. The actuators may be identical, similar or different from each other, and may affect or generate the same or different phenomena. Two or more actuators may be connected in series or in parallel.

The actuator 501 may be an analog actuator having an analog signal input such as analog voltage or current, or may have continuously variable impedance. Alternatively on in addition, the actuator 501 may have a digital signal input. The actuator 501 may affect time-dependent or space-dependent parameters of a phenomenon. Alternatively on in addition, the actuator 501 may affect time-dependencies or a phenomenon such as the rate of change, time-integrated or time-average, duty-cycle, frequency or time period between events. The actuator 501 may be semiconductor-based, and may be based on MEMS technology.

The actuator 501 may affect the amount of a property or of a physical quantity or the magnitude relating to a physical phenomenon, body or substance. Alternatively or in addition, the actuator 501 may be used to affect the time derivative thereof, such as the rate of change of the amount, the quantity or the magnitude. In the case of space related quantity or magnitude, an actuator may affect the linear density, surface density, or volume density, relating to the amount of property per volume. Alternatively or in addition, the actuator 501 may affect the flux (or flow) of a property through a cross-section or surface boundary, the flux density, or the current. In the case of a scalar field, an actuator may affect the quantity gradient. Alternatively on in addition, the actuator 501 may affect the amount of property per unit mass or per mole of substance. A single actuator 501 may be used to affect two or more phenomena.

In one example, the actuator 501 may be operative in a single operating state, and may be activated to be in the single state by powering it. In such a scheme, the actuator interface 502 (or the signal conditioner 502*a*) may consist of, may comprise, or may use a controlled switch SW1 503 as shown in an arrangement 500*b* in FIG. 37. The switch 503 may be controlled to be in an 'opened' or 'closed' state, respectively disconnecting or connecting electrical power to the actuator 501, in response to, or based on, any one (or more) measured, estimated, or calculated values. In one example, a threshold mechanism is used, so that when a value (that may represent measured, calculated, or estimated) that may relate to any distance, angle, speed, or timing herein is above a set threshold, or below the set threshold, the actuator 501 is activated, controlled, or otherwise affected, such as by switching power to the actuator 501 via the switch 503.

The controlled switch SW1 503 may have a control port 505 (that may be a digital level or digital interface) that is controlled by a control or command signal received via a connection 504 to the control block 61. In an actuator 501 'off' state, a command from the control block 61 is sent over the control connection 504, and the controlled switches SW1 503 is controlled by the respective control signal to be in an 'open' state, thus no current is flowing from a power source 506 to the actuator 501. The actuator 501 may be switched to the 'on' state by the control signals controlling the switch SW1 503 control port 505 to be in a 'close' state, allowing an electrical power to flow from the power source 506 to the actuator 501. For example, the actuator 501 may be a lamp that may be in a not-illuminated state when no power is flowing there-through, or may illuminate as a response to a current flow. Similarly, the actuator 501 may be an electric motor that rotates upon being powered when the switch SW1 503 is closed, or may be static when no current is flowing when the switch SW1 503 is controlled to be in the 'open' state.

The power source 506 may be a power source (or a connection to a power source) that is dedicated for powering the actuator. Alternatively or in addition, the power source 506 may be the same power source that powers the control block 61, or the all of, or part of, electrical circuits that are part of any one of the systems, devices, modules, or functionalities described herein.

In one example, the power source 506 is housed in the apparatus or device enclosure, and may be a battery. The battery may be a primary battery or cell, in which an irreversible chemical reaction generates the electricity, and thus the cell is disposable and cannot be recharged, and need to be replaced after the battery is drained. Such battery replacement may be expensive and cumbersome. Alternatively or in addition, a rechargeable (secondary) battery may be used, such as a nickel-cadmium based battery. In such a case, a battery charger is employed for charging the battery while it is in use or not in use. Various types of such battery chargers are known in the art, such as trickle chargers, pulse chargers and the like. The battery charger may be integrated with the field unit or be external to it. The battery may be a primary or a rechargeable (secondary) type, may include a single or few batteries, and may use various chemicals for the electro-chemical cells, such as lithium, alkaline and nickel-cadmium. Common batteries are manufactured in pre-defined standard output voltages (1.5, 3, 4.5, 9 Volts, for example), as well as defined standard mechanical enclosures (usually defined by letters such as "A", "AA", "B", "C" sizes), and 'coin' type. In one embodiment, the battery (or batteries) is held in a battery holder or compartment, and thus can be easily replaced.

Alternatively or in addition, the electrical power for powering the actuator 501 (and/or the control block 61) may be provided from a power source external to the apparatus or device enclosure. In one example, the AC power (mains) grid commonly used in a building, such as in a domestic, commercial, or industrial environment, may be used. The AC power grid typically provides Alternating-Current (AC, a.k.a. Line power, AC power, grid power, and household electricity) that is 120 VAC/60 Hz in North America (or 115 VAC) and 230 VAC/50 Hz (or 220 VAC) in most of Europe. The AC power typically consists of a sine wave (or sinusoid) waveform, where the voltage relates to an RMS amplitude value (120 or 230), and having a frequency measured in Hertz, relating to the number of cycles (or oscillations) per second. Commonly single-phase infrastructure exists, and a wiring in the building commonly uses three wires, known as a line wire (also known as phase, hot, or active) that carry the alternating current, a neutral wire (also known as zero or return) which completes the electrical circuit by providing a return current path, and an earth or ground wire, typically connected to the chassis of any AC-powered equipment that serves as a safety means against electric shocks.

An example of an AC-powered arrangement 500*c* is shown in FIG. 38. The connection to the AC power typically uses an AC plug 508 connected via an AC cord 507. In one example, a power supply 506*a*, that may be an AC/DC power supply, is used in order to adapt the AC power to the voltage level and type that can be used by the actuator 501.

AC/DC Power Supply. A power supply is an electronic device that supplies electric energy to an electrical load, where the primary function of a power supply is to convert one form of electrical energy to another and, as a result, power supplies are sometimes referred to as electric power converters. Some power supplies are discrete, stand-alone devices, whereas others are built into larger devices along with their loads. Examples of the latter include power supplies found in desktop computers and consumer electronics devices. Every power supply must obtain the energy it supplies to its load, as well as any energy it consumes while performing that task, from an energy source. Depending on its design, a power supply may obtain energy from various types of energy sources, including electrical energy transmission systems, energy storage devices such as a batteries and fuel cells, electromechanical systems such as generators and alternators, solar power converters, or another power supply. All power supplies have a power input, which receives energy from the energy source, and a power output that delivers energy to the load. In most power supplies, the power input and the power output consist of electrical connectors or hardwired circuit connections, though some power supplies employ wireless energy transfer in lieu of galvanic connections for the power input or output.

Some power supplies have other types of inputs and outputs as well, for functions such as external monitoring and control. Power supplies are categorized in various ways, including by functional features. For example, a regulated power supply is one that maintains constant output voltage or current despite variations in load current or input voltage. Conversely, the output of an unregulated power supply can change significantly when its input voltage or load current changes. Adjustable power supplies allow the output voltage or current to be programmed by mechanical controls (e.g., knobs on the power supply front panel), or by means of a control input, or both. An adjustable regulated power supply is one that is both adjustable and regulated. An isolated power supply has a power output that is electrically independent of its power input; this is in contrast to other power supplies that share a common connection between power input and output.

AC-to-DC (AC/DC) power supply uses AC mains electricity as an energy source, and typically employs a transformer to convert the input voltage to a higher, or commonly lower AC voltage. A rectifier is used to convert the transformer output voltage to a varying DC voltage, which in turn is passed through an electronic filter to convert it to an unregulated DC voltage. The filter removes most, but not all of the AC voltage variations; the remaining voltage variations are known as a ripple. The electric load tolerance of ripple dictates the minimum amount of filtering that must be provided by a power supply. In some applications, high ripple is tolerated and therefore no filtering is required. For example, in some battery charging applications, it is possible to implement a mains-powered DC power supply with nothing more than a transformer and a single rectifier diode, with a resistor in series with the output to limit charging current.

The function of a linear voltage regulator is to convert a varying AC or DC voltage to a constant, often specific, lower DC voltage. In addition, they often provide a current limiting function to protect the power supply and load from overcurrent (excessive, potentially destructive current). A constant output voltage is required in many power supply applications, but the voltage provided by many energy sources will vary with changes in load impedance. Furthermore, when an unregulated DC power supply is the energy source, its output voltage will also vary with changing input voltage. To circumvent this, some power supplies use a linear voltage regulator to maintain the output voltage at a steady value, independent of fluctuations in input voltage and load impedance. Linear regulators can also reduce the magnitude of ripple and noise present appearing on the output voltage.

In a Switched-Mode Power Supply (SMPS), the AC mains input is directly rectified and then filtered to obtain a DC voltage, which is then switched "on" and "off" at a high frequency by electronic switching circuitry, thus producing an AC current that will pass through a high-frequency transformer or inductor. Switching occurs at a very high frequency (typically 10 kHz-1 MHz), thereby enabling the use of transformers and filter capacitors that are much smaller, lighter, and less expensive than those found in linear power supplies operating at mains frequency. After the inductor or transformer secondary, the high frequency AC is rectified and filtered to produce the DC output voltage. If the SMPS uses an adequately insulated high-frequency transformer, the output will be electrically isolated from the mains; this feature is often essential for safety. Switched-mode power supplies are usually regulated, and to keep the output voltage constant, the power supply employs a feedback controller that monitors current drawn by the load. SMPSs often include safety features such as current limiting or a crowbar circuit to help protect the device and the user from harm. In the event that an abnormally high-current power draw is detected, the switched-mode supply can assume this is a direct short and will shut itself down before damage is done. PC power supplies often provide a power good signal to the motherboard; the absence of this signal prevents operation when abnormal supply voltages are present.

Power supplies are described in Agilent Technologies Application Note 90B dated Oct. 1, 2000 (5925-4020) entitled: "*DC Power Supply Handbook*" and in Application Note 1554 dated Feb. 4, 2005 (5989-2291EN) entitled: "*Understanding Linear Power Supply Operation*", and in On Semiconductor® Reference Manual Rev. 4 dated April 2014 (SMPSRM/D) entitled: "*Switch-Mode Power Supply*", which are all incorporated in their entirety for all purposes as if fully set forth herein.

Alternatively or in addition, an AC-powered actuator 501*a* is used, which is adapted to be directly powered by the AC power from the AC power grid, and thus the need for the power supply 506*a* may be obviated, as shown in an arrangement 500*d* in FIG. 38*a*. In such a scheme, the switch SW1 503*a* is an AC power switch that is capable of switching the AC power received from the AC power grid via the AC plug 508 and the AC power cord 507 to the AC-powered actuator 501*a*.

The actuator 501*a*, or any appliance or device herein, may be integrated, in part or in whole, in an appliance such as a home appliance. In such a case, the actuator of the appliance, may serve as the actuator 501*a*, and handled as described herein. Home appliances are electrical and mechanical devices using technology for household use, such as food handling, cleaning, clothes handling, or environmental control. Appliances are commonly used in household, institutional, commercial or industrial setting, for accomplishing routine housekeeping tasks, and are typically electrically powered. The appliance may be a major appliance, also known as "White Goods", which is commonly large, difficult to move, and generally to some extent, fixed in place (usually on the floor or mounted on a wall or ceiling), and is electrically powered from the AC power (mains) grid. Non-limiting examples of major appliances are washing machines, clothes dryers, dehumidifiers, conventional ovens, stoves, refrigerators, freezers, air-conditioners, trash compactors, furnaces, dishwasher, water heaters, microwave ovens and induction cookers. The appliance may be a small appliance, also known as "Brown Goods", which is commonly a small home appliance that is portable or semi-portable, and is typically a tabletop or a countertop type. Examples of small appliances are television sets, CD and DVD players, HiFi and home cinema systems, telephone sets and answering machines, and beverage making devices such as coffee-makers and iced-tea makers.

Some appliances' main function is food storage, commonly refrigeration related appliances such as refrigerators and freezers. Other appliances' main function is food preparation, such as conventional ovens (stoves) or microwave ovens, electric mixers, food processors, and electric food blenders, as well as beverage makers such as coffee-makers and iced-tea makers. Clothes cleaning appliances examples are washing/laundry machines and clothes dryers. A vacuum cleaner is an appliance used to suck up dust and dirt, usually from floors and other surfaces. Some appliances' main function relates to temperature control, such as heating and cooling. Air conditioners and heaters, as well as HVAC (Heating, Ventilation and Air Conditioning) systems, are commonly used for climate control, usually for thermal comfort for occupants of buildings or other enclosures. Similarly, water heaters are used for heating water.

Any component that is designed to open (breaking, interrupting), close (making), or change one or more electrical circuits may serve as, or replace, the controlled switch SW1 503*a*. In one example, the switch is an electromechanical device with one or more sets of electrical contacts having two or more states. The switch may be a 'normally open' type, requiring actuation for closing the contacts, may be 'normally closed' type, where actuation affects breaking the circuit, or may be a changeover switch, having both types of contacts arrangements. A changeover switch may be either a 'make-before-break' or a 'break-before-make' type. The switch contacts may have one or more poles and one or more throws. Common switch contacts arrangements include Single-Pole-Single-Throw (SPST), Single-Pole-Double-Throw (SPDT), Double-Pole-Double-Throw (DPDT), Double-Pole-Single-Throw (DPST), and Single-Pole-Changeover (SPCO). A switch may be electrically or mechanically actuated.

A relay is a non-limiting example of an electrically operated switch. A relay may be a latching relay, that has two relaxed states (bi-stable), and when the current is switched off, the relay remains in its last state. This is achieved with a solenoid operating a ratchet and cam mechanism, or by having two opposing coils with an over-center spring or permanent magnet to hold the armature and contacts in position while the coil is relaxed, or with a permanent core. A relay may be an electromagnetic relay, that typically consists of a coil of wire wrapped around a soft iron core, an iron yoke which provides a low reluctance path for magnetic flux, a movable iron armature, and one or more sets of contacts. The armature is hinged to the yoke and mechanically linked to one or more sets of moving contacts. It is held in place by a spring so that when the relay is de-energized there is an air gap in the magnetic circuit. In this condition, one of the two sets of contacts in the relay pictured is closed, and the other set is open. A reed relay is a reed switch enclosed in a solenoid, and the switch has a set of contacts inside an evacuated or inert gas-filled glass tube, which protects the contacts against atmospheric corrosion.

Alternatively or in addition, a relay may be a Solid State Relay (SSR), where a solid-state based component functioning as a relay, without having any moving parts. In one example, the SSR may be controlled by an optocoupler, such as a CPC1965Y AC Solid State Relay, available from IXYS Integrated Circuits Division (Headquartered in Milpitas, California, U.S.A.) which is an AC Solid State Relay (SSR) using waveguide coupling with dual power SCR outputs to produce an alternative to optocoupler and Triac circuits. The switches are robust enough to provide a blocking voltage of up to 600VP, and are tightly controlled zero-cross circuitry ensures switching of AC loads without the generation of transients. The input and output circuits are optically coupled to provide 3750Vrms of isolation and noise immunity between control and load circuits. The CPC1965Y AC Solid State Relay is described in an IXYS Integrated Circuits Division specification DS-CPC1965Y-R07 entitled: "*CPC1965Y AC Solid State Relay*", which is incorporated in its entirety for all purposes as if fully set forth herein.

Alternatively or in addition, a switch may be implemented using an electrical circuit or component. For example, an open collector (or open drain) based circuit may be used. Further, an opto-isolator (a.k.a. optocoupler, photocoupler, or optical isolator) may be used to provide isolated power transfer. Further, a thyristor such as a Triode for Alternating Current (TRIAC) may be used for triggering the power. In one example, a switch such as the switch 503 or 503*a* may be based on, or consists of, a TRIAC Part Number BTA06 available from SGS-Thomson Microelectronics is used, described in the data sheet "*BTA*06 *T/D/S/A BTB*06 *T/D/S/A—Sensitive Gate Triacs*" published by SGS-Thomson Microelectronics march 1995, which is incorporated in its entirety for all purposes as if fully set forth herein.

In addition, the switch 503*a* may be based on a transistor. The transistor may be a Metal-Oxide-Semiconductor Field-Effect Transistor (MOSFET, MOS-PET, or MOS FET), commonly used for amplifying or switching electronic signals. The MOSFET transistor is a four-terminal component with source (S), gate (G), drain (D), and body (B) terminals, where the body (or substrate) of the MOSFET is often connected to the source terminal, making it a three-terminal component like other field-effect transistors. In an enhancement mode MOSFETs, a voltage drop across the oxide induces a conducting channel between the source and drain contacts via the field effect. The term "enhancement mode" refers to the increase of conductivity with an increase in oxide field that adds carriers to the channel, also referred to as the inversion layer. The channel can contain electrons (called an nMOSFET or nMOS), or holes (called a pMOSFET or pMOS), opposite in type to the substrate, so nMOS is made with a p-type substrate, and pMOS with an n-type substrate. In one example, a switch may be based on an N-channel enhancement mode standard level field-effect transistor that features very low on-state resistance. Such a transistor may be based on, or consists of, TrenchMOS transistor Part Number BUK7524-55 from Philips Semiconductors, described in the Product Specifications from Philips Semiconductors "*TrenchMOS™ transistor Standard level FET BUK*7524-55" Rev 1.000 dated January 1997, which is incorporated in its entirety for all purposes as if fully set forth herein.

The actuator 501 may affect, create, or change a phenomenon associated with an object, and the object may be gas, air, liquid, or solid. The actuator 501 may be controlled by a digital input, and may be electrical actuator powered by an electrical energy. A signal conditioning circuit 502*a* may be coupled to the actuator 501 input, the signal conditioning circuit 502*a* may comprise an amplifier, a voltage or current limiter, an attenuator, a delay line or circuit, a level translator, a galvanic isolator, an impedance transformer, a linearization circuit, a calibrator, a passive filter, an active filter, an adaptive filter, an integrator, a deviator, an equalizer, a spectrum analyzer, a compressor or a de-compressor, a coder, a decoder, a modulator, a demodulator, a pattern recognizer, a smoother, a noise remover, an average circuit, or an RMS circuit. The actuator 501 may be operative to affect time-dependent characteristic such as a time-integrated, an average, an RMS (Root Mean Square) value, a frequency, a period, a duty-cycle, a time-integrated, or a time-derivative, of the affected or produced phenomenon. The actuator 501 may be operative to affect or change space-dependent characteristic of the phenomenon, such as a pattern, a linear density, a surface density, a volume density, a flux density, a current, a direction, a rate of change in a direction, or a flow, of the sensed phenomenon.

The actuator 501 may be a light source used to emit light by converting electrical energy into light, and where the luminous intensity may be fixed or may be controlled, commonly for illumination or indication purposes. The actuator 501 may be used to activate or control the light emitted by a light source, being based on converting electrical energy or another energy to a light. The light emitted may be a visible light, or invisible light such as infrared, ultraviolet, X-ray or gamma rays. A shade, reflector, enclosing globe, housing, lens, and other accessories may be used, typically as part of a light fixture, in order to control the illumination intensity, shape or direction. Electrical sources of illumination commonly use a gas, a plasma (such as in arc and fluorescent lamps), an electrical filament, or Solid-State Lighting (SSL), where semiconductors are used. An SSL may be a Light-Emitting Diode (LED), an Organic LED (OLED), Polymer LED (PLED), or a laser diode.

A light source may consist of, or may comprise, a lamp which may be an arc lamp, a fluorescent lamp, a gas-discharge lamp (such as a fluorescent lamp), or an incandescent light (such as a halogen lamp). An arc lamp is the general term for a class of lamps that produce light by an electric arc voltaic arc. Such a lamp consists of two electrodes, first made from carbon but typically made today of tungsten, which are separated by a noble gas.

The actuator 501 may comprise, or may consist of, a motion actuator that may be a rotary actuator that produces a rotary motion or torque, commonly to a shaft or axle. The motion produced by a rotary motion actuator may be either continuous rotation, such as in common electric motors, or movement to a fixed angular position as for servos and stepper motors. A motion actuator may be a linear actuator that creates motion in a straight line. A linear actuator may be based on an intrinsically rotary actuator, by converting from a rotary motion created by a rotary actuator, using a screw, a wheel and axle, or a cam. A screw actuator may be a leadscrew, a screw jack, a ball screw or roller screw. A wheel-and-axle actuator operates on the principle of the wheel and axle, and may be hoist, winch, rack and pinion, chain drive, belt drive, rigid chain, or rigid belt actuator. Similarly, a rotary actuator may be based on an intrinsically linear actuator, by converting from a linear motion to a rotary motion, using the above or other mechanisms. Motion actuators may include a wide variety of mechanical elements and/or prime movers to change the nature of the motion such as provided by the actuating/transducing elements, such as levers, ramps, screws, cams, crankshafts, gears, pulleys, constant-velocity joints, or ratchets. A motion actuator may be part of a servomotor system.

A motion actuator may be a pneumatic actuator that converts compressed air into rotary or linear motion, and may comprises a piston, a cylinder, valves, or ports. Motion actuators are commonly controlled by an input pressure to a control valve, and may be based on moving a piston in a cylinder. A motion actuator may be a hydraulic actuator using a pressure of the liquid in a hydraulic cylinder to provide force or motion. A hydraulic actuator may be a hydraulic pump, such as a vane pump, a gear pump, or a piston pump. A motion actuator may be an electric actuator where electrical energy may be converted into motion, such as an electric motor. A motion actuator may be a vacuum actuator producing a motion based on vacuum pressure.

An electric motor may be a DC motor, which may be a brushed, brushless, or uncommutated type. An electric motor may be a stepper motor, and may be a Permanent Magnet (PM) motor, a Variable reluctance (VR) motor, or a hybrid synchronous stepper. An electric motor may be an AC motor, which may be an induction motor, a synchronous motor, or an eddy current motors. An AC motor may be a two-phase AC servo motor, a three-phase AC synchronous motor, or a single-phase AC induction motor, such as a split-phase motor, a capacitor start motor, or a Permanent-Split Capacitor (PSC) motor. Alternatively or in addition, an electric motor may be an electrostatic motor, and may be MEMS based.

A rotary actuator may be a fluid power actuator, and a linear actuator may be a linear hydraulic actuator or a pneumatic actuator. A linear actuator may be a piezoelectric actuator, based on the piezoelectric effect, may be a wax motor, or may be a linear electrical motor, which may be a DC brush, a DC brushless, a stepper, or an induction motor type. A linear actuator may be a telescoping linear actuator. A linear actuator may be a linear electric motor, such as a linear induction motor (LIM), or a Linear Synchronous Motor (LSM).

A motion actuator may be a linear or rotary piezoelectric motor based on acoustic or ultrasonic vibrations. A piezoelectric motor may use piezoelectric ceramics such as Inchworm or PiezoWalk motors, may use Surface Acoustic Waves (SAW) to generate the linear or the rotary motion, or may be a Squiggle motor. Alternatively or in addition, an electric motor may be an ultrasonic motor. A linear actuator may be a micro- or nanometer comb-drive capacitive actuator. Alternatively or in addition, a motion actuator may be a Dielectric or Ionic based Electroactive Polymers (EAPs) actuator. A motion actuator may also be a solenoid, thermal bimorph, or a piezoelectric unimorph actuator.

An actuator may be a pump, typically used to move (or compress) fluids or liquids, gasses, or slurries, commonly by pressure or suction actions, and the activating mechanism is often reciprocating or rotary. A pump may be a direct lift, impulse, displacement, valveless, velocity, centrifugal, vacuum pump, or gravity pump. A pump may be a positive displacement pump, such as a rotary-type positive displacement type such as internal gear, screw, shuttle block, flexible vane or sliding vane, circumferential piston, helical twisted roots or liquid ring vacuum pumps, a reciprocating-type positive displacement type, such as piston or diaphragm pumps, and a linear-type positive displacement type, such as rope pumps and chain pumps, a rotary lobe pump, a progressive cavity pump, a rotary gear pump, a piston pump, a diaphragm pump, a screw pump, a gear pump, a hydraulic pump, and a vane pump. A rotary positive displacement pumps may be a gear pump, a screw pump, or a rotary vane pumps. Reciprocating positive displacement pumps may be plunger pumps type, diaphragm pumps type, diaphragm valves type, or radial piston pumps type.

A pump may be an impulse pump such as hydraulic ram pumps type, pulser pumps type, or airlift pumps type. A pump may be a rotodynamic pump such as a velocity pump or a centrifugal pump. A centrifugal pump may be a radial flow pump type, an axial flow pump type, or a mixed flow pump.

The actuator 501 may be an electrochemical or chemical actuator, used to produce, change, or otherwise affect a matter structure, properties, composition, process, or reactions, such as oxidation/reduction or an electrolysis process.

The actuator 501 may be a sounder, which converts electrical energy to sound waves transmitted through the air, an elastic solid material, or a liquid, usually by means of a vibrating or moving ribbon or diaphragm. The sound may be audible or inaudible (or both), and may be omnidirectional, unidirectional, bidirectional, or provide other directionality or polar patterns. A sounder may be an electromagnetic loudspeaker, a piezoelectric speaker, an electrostatic loudspeaker (ESL), a ribbon or planar magnetic loudspeaker, or a bending wave loudspeaker.

A sounder may be an electromechanical type, such as an electric bell, a buzzer (or beeper), a chime, a whistle or a ringer and may be either electromechanical or ceramic-based piezoelectric sounders. The sounder may emit a single or multiple tones, and can be in continuous or intermittent operation.

The sounder may be used to play digital audio content, either stored in, or received by, the sounder, the actuator unit, the router, the control server, or any combination thereof. The audio content stored may be either pre-recorded or using a synthesizer. Few digital audio files may be stored, selected by a control logic. Alternatively or in addition, the source of the digital audio may be a microphone serving as a sensor. In another example, the system uses the sounder for simulating the voice of a human being or generates music. The music produced, can emulate the sounds of a conventional acoustical music instrument, such as a piano, tuba, harp, violin, flute, guitar and so forth. A talking human voice may be played by the sounder, either pre-recorded or using human voice synthesizer, and the sound may be a syllable, a word, a phrase, a sentence, a short story or a long story, and can be based on speech synthesis or pre-recorded, using male or female voice.

A human speech may be produced using a hardware, software (or both) speech synthesizer, which may be Text-To-Speech (TTS) based. The speech synthesizer may be a concatenative type, using unit selection, diphone synthesis, or domain-specific synthesis. Alternatively or in addition, the speech synthesizer may be a formant type, and may be based on articulatory synthesis or hidden Markov models (HMM) based.

The actuator 501 may be used to generate an electric or magnetic field, and may be an electromagnetic coil or an electromagnet.

The actuator 501, or the display 63, may be a display for presentation of visual data or information, commonly on a screen, and may consist of an array (e.g., matrix) of light emitters or light reflectors, and may present text, graphics, image or video. A display may be a monochrome, gray-scale, or color type, and may be a video display. The display may be a projector (commonly by using multiple reflectors), or alternatively (or in addition) have the screen integrated. A projector may be based on an Eidophor, Liquid Crystal on Silicon (LCoS or LCOS), or LCD, or may use Digital Light Processing (DLP™) technology, and may be MEMS based or be a virtual retinal display. A video display may support Standard-Definition (SD) or High-Definition (HD) standards, and may support 3D. The display may present the information as scrolling, static, bold or flashing. The display may be an analog display, such as having NTSC, PAL or SECAM formats. Similarly, analog RGB, VGA (Video Graphics Array), SVGA (Super Video Graphics Array), SCART or S-video interface, or may be a digital display, such as having IEEE1394 interface (a.k.a. FireWire™), may be used. Other digital interfaces that can be used are USB, SDI (Serial Digital Interface), HDMI (High-Definition Multimedia Interface), DVI (Digital Visual Interface), UDI (Unified Display Interface), DisplayPort, Digital Component Video or DVB (Digital Video Broadcast) interface. Various user controls may include an on/off switch, a reset button and others. Other exemplary controls involve display associated settings such as contrast, brightness and zoom.

A display may be a Cathode-Ray Tube (CRT) display, or a Liquid Crystal Display (LCD) display. The LCD display may be passive (such as CSTN or DSTN based) or active matrix, and may be Thin Film Transistor (TFT) or LED-backlit LCD display. A display may be a Field Emission Display (FED), Electroluminescent Display (ELD), Vacuum Fluorescent Display (VFD), or may be an Organic Light- Emitting Diode (OLED) display, based on passive-matrix (PMOLED) or active-matrix OLEDs (AMOLED).

A display may be based on an Electronic Paper Display (EPD), and be based on Gyricon technology, Electro-Wetting Display (EWD), or Electrofluidic display technology. A display may be a laser video display or a laser video projector, and may be based on a Vertical-External-Cavity Surface-Emitting-Laser (VECSEL) or a Vertical-Cavity Surface-Emitting Laser (VCSEL).

A display may be a segment display, such as a numerical or an alphanumerical display that can show only digits or alphanumeric characters, words, characters, arrows, symbols, ASCII and non-ASCII characters. Examples are Seven-segment display (digits only), Fourteen-segment display, and Sixteen-segment display, and a dot matrix display.

The actuator 501 may be a thermoelectric actuator such as a cooler or a heater for changing the temperature of a solid, liquid or gas object, and may use conduction, convection, thermal radiation, or by the transfer of energy by phase changes. A heater may be a radiator using radiative heating, a convector using convection, or a forced convection heater. A thermoelectric actuator may be a heating or cooling heat pump, and may be electrically powered, compression-based cooler using an electric motor to drive a refrigeration cycle. A thermoelectric actuator may be an electric heater, converting electrical energy into heat, using resistance, or a dielectric heater. A thermoelectric actuator may be a solid-state active heat pump device based on the Peltier effect. A thermoelectric actuator may be an air cooler, using a compressor-based refrigeration cycle of a heat pump. An electric heater may be an induction heater.

The actuator 501 may include a signal generator serving as an actuator for providing an electrical signal (such as a voltage or current), or may be coupled between the processor and the actuator for controlling the actuator. A signal generator may be an analog or digital signal generator, and may be based on software (or firmware) or may be a separated circuit or component. A signal may generate repeating or non-repeating electronic signals, and may include a digital to analog converter (DAC) to produce an analog output. Common waveforms are a sine wave, a saw-tooth, a step (pulse), a square, and a triangular waveforms. The generator may include some sort of modulation functionality such as Amplitude Modulation (AM), Frequency Modulation (FM), or Phase Modulation (PM). A signal generator may be an Arbitrary Waveform Generators (AWGs) or a logic signal generator.

The actuator 501 may be a light source that emits visible or non-visible light (infrared, ultraviolet, X-rays, or gamma rays) such as for illumination or indication. The actuator may comprise a shade, a reflector, an enclosing globe, or a lens, for manipulating the emitted light. The light source may be an electric light source for converting electrical energy into light, and may consist of, or comprise, a lamp, such as an incandescent, a fluorescent, or a gas discharge lamp. The electric light source may be based on Solid-State Lighting (SSL) such as a Light Emitting Diode (LED), which may be Organic LED (OLED), a polymer LED (PLED), or a laser diode. The actuator may be a chemical or electrochemical actuator, and may be operative for producing, changing, or affecting a matter structure, properties, composition, process, or reactions, such as producing, changing, or affecting an oxidation/reduction or an electrolysis reaction.

The actuator 501 may be a motion actuator and may cause linear or rotary motion or may comprise a conversion mechanism (may be based on a screw, a wheel and axle, or a cam) for converting to rotary or linear motion. The conversion mechanism may be based on a screw, and the system may include a leadscrew, a screw jack, a ball screw or a roller screw, or may be based on a wheel and axle, and the system may include a hoist, a winch, a rack and pinion, a chain drive, a belt drive, a rigid chain, or a rigid belt. The motion actuator may comprise a lever, a ramp, a screw, a cam, a crankshaft, a gear, a pulley, a constant-velocity joint, or a ratchet, for affecting the produced motion. The motion actuator may be a pneumatic actuator, a hydraulic actuator, or an electrical actuator. The motion actuator may be an electrical motor such as brushed, a brushless, or an uncommutated DC motor, or a Permanent Magnet (PM) motor, a Variable reluctance (VR) motor, or a hybrid synchronous stepper DC motor.

The electrical motor may be an induction motor, a synchronous motor, or an eddy current AC motor. The AC motor may be a single-phase AC induction motor, a two-phase AC servo motor, or a three-phase AC synchronous motor, and may be a split-phase motor, a capacitor-start motor, or a Permanent-Split Capacitor (PSC) motor. The electrical motor may be an electrostatic motor, a piezoelectric actuator, or a MEMS-based motor.

The motion actuator may be a linear hydraulic actuator, a linear pneumatic actuator, or a linear electric motor such as linear induction motor (LIM) or a Linear Synchronous Motor (LSM). The motion actuator may be a piezoelectric motor, a Surface Acoustic Wave (SAW) motor, a Squiggle motor, an ultrasonic motor, or a micro- or nanometer comb-drive capacitive actuator, a Dielectric or Ionic based Electroactive Polymers (EAPs) actuator, a solenoid, a thermal bimorph, or a piezoelectric unimorph actuator.

The actuator 501 may be operative to move, force, or compress a liquid, a gas or a slurry, and may be a compressor or a pump. The pump may be a direct lift, an impulse, a displacement, a valveless, a velocity, a centrifugal, a vacuum, or a gravity pump. The pump may be a positive displacement pump such as a rotary lobe, a progressive cavity, a rotary gear, a piston, a diaphragm, a screw, a gear, a hydraulic, or a vane pump. The positive displacement pump may be a rotary-type positive displacement pump such as an internal gear, a screw, a shuttle block, a flexible vane, a sliding vane, a rotary vane, a circumferential piston, a helical twisted roots, or a liquid ring vacuum pump. The positive displacement pump may be a reciprocating-type positive displacement type such as a piston, a diaphragm, a plunger, a diaphragm valve, or a radial piston pump. The positive displacement pump may be a linear-type positive displacement type such as rope-and-chain pump. The pump may be an impulse pump such as a hydraulic ram, a pulser, or an airlift pump. The pump may be a rotodynamic pump, such as a velocity pump or a centrifugal pump, that may be a radial flow, an axial flow, or a mixed flow pump.

The actuator 501 may be a sounder for converting an electrical energy to emitted audible or inaudible sound waves, emitted as omnidirectional, unidirectional, or bidirectional pattern. The sound may be audible, and the sounder may be an electromagnetic loudspeaker, a piezoelectric speaker, an electrostatic loudspeaker (ESL), a ribbon or planar magnetic loudspeaker, or a bending wave loudspeaker. The sounder may be electromechanical or ceramic based, and may be operative to emit a single or multiple tones, and may be operative to continuous or intermittent operation. The sounder may be an electric bell, a buzzer (or beeper), a chime, a whistle or a ringer. The sounder may be a loudspeaker, and the system may be operative to play one or more digital audio content files (which may include a pre-recorded audio) stored entirely or in part in the second device, the router, or the control server. The system may comprise a synthesizer for producing the digital audio content. The sensor may be a microphone for capturing the digital audio content to play by the sounder. The control logic or the system may be operative to select one of the digital audio content files, and may be operative for playing the selected file by the sounder. The digital audio content may be music, and may include the sound of an acoustical musical instrument such as a piano, a tuba, a harp, a violin, a flute, or a guitar. The digital audio content may be a male or female human voice saying a syllable, a word, a phrase, a sentence, a short story or a long story. The system may comprise a speech synthesizer (such as a Text-To-Speech (TTS) based) for producing a human speech, being part of the second device, the router, the control server, or any combination thereof. The speech synthesizer may be a concatenative type, and may use unit selection, diphone synthesis, or domain-specific synthesis. Alternatively or in addition, the speech synthesizer may be a formant type, articulatory synthesis based, or hidden Markov models (HMM) based.

The actuator 501 may be a monochrome, grayscale or color display for visually presenting information, and may consist of an array of light emitters or light reflectors. Alternatively or in addition, the display may be a visual retinal display or a projector based on an Eidophor, Liquid Crystal on Silicon (LCoS or LCOS), LCD, MEMS or Digital Light Processing (DLP™) technology. The display may be a video display that may support Standard-Definition (SD) or High-Definition (HD) standards, and may be 3D video display. The display may be capable of scrolling, static, bold or flashing the presented information. The display may be an analog display having an analog input interface such as NTSC, PAL or SECAM formats, or analog input interface such as RGB, VGA (Video Graphics Array), SVGA (Super Video Graphics Array), SCART or S-video interface. Alternatively or in addition, the display may be a digital display having a digital input interface such as IEEE1394, FireWire™, USB, SDI (Serial Digital Interface), HDMI (High-Definition Multimedia Interface), DVI (Digital Visual Interface), UDI (Unified Display Interface), DisplayPort, Digital Component Video, or DVB (Digital Video Broadcast) interface. The display may be a Liquid Crystal Display (LCD) display, a Thin Film Transistor (TFT), or an LED-backlit LCD display, and may be based on a passive or an active matrix. The display may be a Cathode-Ray Tube (CRT), a Field Emission Display (FED), Electronic Paper Display (EPD) display (based on Gyricon technology, Electro-Wetting Display (EWD), or Electrofluidic display technology), a laser video display (based on a Vertical-External-Cavity Surface-Emitting-Laser (VECSEL) or a Vertical-Cavity Surface-Emitting Laser (VCSEL)), an Electroluminescent Display (ELD), a Vacuum Fluorescent Display (VFD), or a passive-matrix (PMOLED) or active-matrix OLEDs (AMOLED) Organic Light-Emitting Diode (OLED) display. The display may be a segment display (such as Seven-segment display, a fourteen-segment display, a sixteen-segment display, or a dot matrix display), and may be operative to only display digits, alphanumeric characters, words, characters, arrows, symbols, ASCII, non-ASCII characters, or any combination thereof.

The actuator 501 may be a thermoelectric actuator (such as an electric thermoelectric actuator) and may be a heater or a cooler, and may be operative for affecting or changing the temperature of a solid, a liquid, or a gas object. The thermoelectric actuator may be coupled to the object by conduction, convection, force convention, thermal radiation, or by the transfer of energy by phase changes. The thermoelectric actuator may include a heat pump, or may be a cooler based on an electric motor based compressor for driving a refrigeration cycle. The thermoelectric actuator may be an induction heater, may be an electric heater such as a resistance heater or a dielectric heater, or may be solid-state based such as an active heat pump device based on the Peltier effect. The actuator may be an electromagnetic coil or an electromagnet and may be operative for generating a magnetic or electric field.

The apparatus may produce actuator commands in response to the sensor data according to control logic, and may deliver the actuator commands to the actuator over the internal network. The control logic may affect a control loop for controlling the condition, and the control loop may be a closed linear control loop where the sensor data serve as a feedback to command the actuator based on the loop deviation from a setpoint or a reference value that may be fixed, set by a user, or may be time dependent. The closed control loop may be a proportional-based, an integral-based, a derivative-based, or a Proportional, Integral, and Derivative (PID) based control loop, and the control loop may use feed-forward, Bistable, Bang-Bang, Hysteretic, or fuzzy logic based control. The control loop may be based on, or associated with, randomness based on random numbers; and the apparatus may comprise a random number generator for generating random numbers that may be hardware-based using thermal noise, shot noise, nuclear decaying radiation, photoelectric effect, or quantum phenomena. Alternatively or in addition, the random number generator may be software-based and may execute an algorithm for generating pseudo-random numbers. The apparatus may couple to, or comprise in the single enclosure, an additional sensor responsive to a third condition distinct from the first or second conditions, and the setpoint may be dependent upon the output of the additional sensor.

The actuator 501 may be any mechanism, system, or device that creates, produces, changes, stimulates, or affects a phenomenon, in response to an electrical signal or an electrical power. The actuator 501 may affect a physical, chemical, biological or any other phenomenon, serving as a stimulus to the sensor. Alternatively or in addition, the actuator may affect the magnitude of the phenomenon, or any parameter or quantity thereof. For example, the actuator may be used to affect or change pressure, flow, force or other mechanical quantities. The actuator may be an electrical actuator, where electrical energy is supplied to affect the phenomenon, or may be controlled by an electrical signal (e.g., voltage or current). A signal conditioning may be used in order to adapt the actuator operation, or in order to improve the handling of the actuator input or adapting it to the former stage or manipulating, such as attenuation, delay, current or voltage limiting, level translation, galvanic isolation, impedance transformation, linearization, calibration, filtering, amplifying, digitizing, integration, derivation, and any other signal manipulation. Further, in the case of conditioning, the conditioning circuit may involve time related manipulation, such as filter or equalizer for frequency related manipulation such as filtering, spectrum analysis or noise removal, smoothing or de-blurring in case of image enhancement, a compressor (or de-compressor) or coder (or decoder) in the case of a compression or a coding/decoding schemes, modulator or demodulator in case of modulation, and extractor for extracting or detecting a feature or parameter such as pattern recognition or correlation analysis. In case of filtering, passive, active or adaptive (such as Wiener or Kalman) filters may be used. The conditioning circuits may apply linear or non-linear manipulations. Further, the manipulation may be time-related such as using analog or digital delay-lines or integrators, or any rate-based manipulation. The actuator 501 may have an analog input, requiring a D/A to be connected thereto, or may have a digital input.

The actuator 501 may directly or indirectly create, change or otherwise affect the rate of change of the physical quantity (gradient) versus the direction around a particular location, or between different locations. For example, a temperature gradient may describe the differences in the temperature between different locations. Further, an actuator may affect time-dependent or time-manipulated values of the phenomenon, such as time-integrated, average or Root Mean Square (RMS or rms), relating to the square root of the mean of the squares of a series of discrete values (or the equivalent square root of the integral in a continuously varying value). Further, a parameter relating to the time dependency of a repeating phenomenon may be affected, such as the duty-cycle, the frequency (commonly measured in Hertz—Hz) or the period. An actuator may be based on the Micro Electro-Mechanical Systems—MEMS (a.k.a. Micro-mechanical electrical systems) technology. An actuator may affect environmental conditions such as temperature, humidity, noise, vibration, fumes, odors, toxic conditions, dust, and ventilation.

The actuator 501 may change, increase, reduce, or otherwise affect the amount of a property or of a physical quantity or the magnitude relating to a physical phenomenon, body or substance. Alternatively or in addition, the actuator 501 may be used to affect the time derivative thereof, such as the rate of change of the amount, the quantity or the magnitude. In the case of space related quantity or magnitude, an actuator may affect the linear density, relating to the amount of property per length, an actuator may affect the surface density, relating to the amount of property per area, or an actuator may affect the volume density, relating to the amount of property per volume. In the case of a scalar field, an actuator may further affect the quantity gradient, relating to the rate of change of property with respect to position. Alternatively or in addition, an actuator may affect the flux (or flow) of a property through a cross-section or surface boundary. Alternatively or in addition, an actuator may affect the flux density, relating to the flow of property through a cross-section per unit of the cross-section, or through a surface boundary per unit of the surface area. Alternatively or in addition, an actuator may affect the current, relating to the rate of flow of property through a cross-section or a surface boundary, or the current density, relating to the rate of flow of property per unit through a cross-section or a surface boundary. An actuator may include or consists of a transducer, defined herein as a device for converting energy from one form to another for the purpose of measurement of a physical quantity or for information transfer. Further, a single actuator may be used to affect two or more phenomena. For example, two characteristics of the same element may be affected, each characteristic corresponding to a different phenomenon. An actuator may have multiple states, where the actuator state is depending upon the control signal input. An actuator may have a two state operation such as 'on' (active) and 'off' (non active), based on a binary input such as '0' or '1', or 'true' and 'false'. In such a case, it can be activated by controlling an electrical power supplied or switched to it, such as by an electric switch.

The actuator 501 may be a light source used to emit light by converting electrical energy into light, and where the luminous intensity is fixed or may be controlled, commonly for illumination or indicating purposes. Further, an actuator may be used to activate or control the light emitted by a light source, being based on converting electrical energy or other energy to a light. The light emitted may be a visible light, or invisible light such as infrared, ultraviolet, X-ray or gamma rays. A shade, reflector, enclosing globe, housing, lens, and other accessories may be used, typically as part of a light fixture, in order to control the illumination intensity, shape or direction. The illumination (or the indication) may be steady, blinking or flashing. Further, the illumination can be directed for lighting a surface, such as a surface including an image or a picture. Further, a single-state visual indicator may be used to provide multiple indications, for example by using different colors (of the same visual indicator), different intensity levels, variable duty-cycle and so forth.

Electrical sources of illumination commonly use a gas, a plasma (such as in an arc and fluorescent lamps), an electrical filament, or Solid-State Lighting (SSL), where semiconductors are used. An SSL may be a Light-Emitting Diode (LED), an Organic LED (OLED), or Polymer LED (PLED). Further, an SSL may be a laser diode, which is a laser whose active medium is a semiconductor, commonly based on a diode formed from a p-n junction and powered by the injected electric current.

A light source may consist of, or comprise, a lamp, which is typically replaceable and is commonly radiating a visible light. A lamp, sometimes referred to as 'bulb', may be an arc lamp, a Fluorescent lamp, a gas-discharge lamp, or an incandescent light. An arc lamp (a.k.a. arc light) is the general term for a class of lamps that produce light by an electric arc (also called a voltaic arc). Such a lamp consists of two electrodes, first made from carbon but typically made today of tungsten, which are separated by a gas. The type of lamp is often named by the gas contained in the bulb; including Neon, Argon, Xenon, Krypton, Sodium, metal Halide, and Mercury, or by the type of electrode as in carbon-arc lamps. The common fluorescent lamp may be regarded as a low-pressure mercury arc lamp.

Gas-discharge lamps are a family of artificial light sources that generate light by sending an electrical discharge through an ionized gas (plasma). Typically, such lamps use a noble gas (argon, neon, krypton and xenon) or a mixture of these gases and most lamps are filled with additional materials, like mercury, sodium, and metal halides. In operation the gas is ionized, and free electrons, accelerated by the electrical field in the tube, collide with gas and metal atoms. Some electrons in the atomic orbitals of these atoms are excited by these collisions to a higher energy state. When the excited atom falls back to a lower energy state, it emits a photon of a characteristic energy, resulting in infrared, visible light, or ultraviolet radiation. Some lamps convert the ultraviolet radiation to visible light with a fluorescent coating on the inside of the lamp's glass surface. The fluorescent lamp is perhaps the best known gas-discharge lamp.

A fluorescent lamp (a.k.a. fluorescent tube) is a gas-discharge lamp that uses electricity to excite mercury vapor, and is commonly constructed as a tube coated with phosphor containing low pressure mercury vapor that produces white light. The excited mercury atoms produce short-wave ultraviolet light that then causes a phosphor to fluoresce, producing visible light. A fluorescent lamp converts electrical power into useful light more efficiently than an incandescent lamp. Lower energy cost typically offsets the higher initial cost of the lamp. A neon lamp (a.k.a. Neon glow lamp) is a gas discharge lamp that typically contains neon gas at a low pressure in a glass capsule. Only a thin region adjacent to the electrodes glows in these lamps, which distinguishes them from the much longer and brighter neon tubes used for public signage.

An incandescent light bulb (a.k.a. incandescent lamp or incandescent light globe) produces light by heating a filament wire to a high temperature until it glows. The hot filament is protected from oxidation in the air commonly with a glass enclosure that is filled with inert gas or evacuated. In a halogen lamp, filament evaporation is prevented by a chemical process that redeposits metal vapor onto the filament, extending its life. The light bulb is supplied with electrical current by feed-through terminals or wires embedded in the glass. Most bulbs are used in a socket, which provides mechanical support and electrical connections. A halogen lamp (a.k.a. Tungsten halogen lamp or quartz iodine lamp) is an incandescent lamp that has a small amount of a halogen such as iodine or bromine added. The combination of the halogen gas and the tungsten filament produces a halogen cycle chemical reaction, which redeposits evaporated tungsten back to the filament, increasing its life and maintaining the clarity of the envelope. Because of this, a halogen lamp can be operated at a higher temperature than a standard gas-filled lamp of similar power and operating life, producing light of a higher luminous efficacy and color temperature. The small size of halogen lamps permits their use in compact optical systems for projectors and illumination.

A Light-Emitting Diode (LED) is a semiconductor light source, based on the principle that when a diode is forward-biased (switched on), electrons are able to recombine with electron holes within the device, releasing energy in the form of photons. This effect is called electroluminescence and the color of the light (corresponding to the energy of the photon) is determined by the energy gap of the semiconductor. Conventional LEDs are made from a variety of inorganic semiconductor materials, such as Aluminum gallium arsenide (AlGaAs), Gallium arsenide phosphide (GaAsP) Aluminium gallium indium phosphide (AlGaInP), Gallium (III) phosphide (GaP), Zinc selenide (ZnSe), Iridium gallium nitride (InGaN), and Silicon carbide (SiC) as substrate.

In an Organic Light-Emitting Diodes (OLEDs) the electroluminescent material comprising the emissive layer of the diode, is an organic compound. The organic material is electrically conductive due to the delocalization of pi electrons caused by conjugation over all or part of the molecule, and the material therefore functions as an organic semiconductor. The organic materials can be small organic molecules in a crystalline phase, or polymers.

High-power LEDs (HPLED) can be driven at currents from hundreds of mAs to more than an ampere, compared with the tens of mAs for other LEDs. Some can emit over a thousand Lumens. Since overheating is destructive, the HPLEDs are commonly mounted on a heat sink to allow for heat dissipation.

LEDs are efficient, and emit more light per watt than incandescent light bulbs. They can emit light of an intended color without using any color filters as traditional lighting methods need. LEDs can be very small (smaller than 2 $mm^2$) and are easily populated onto printed circuit boards. LEDs light up very quickly. A typical red indicator LED will achieve full brightness in under a microsecond. LEDs are ideal for uses subject to frequent on-off cycling, unlike fluorescent lamps that fail faster when cycled often, or HID lamps that require a long time before restarting and can very easily be dimmed either by pulse-width modulation or lowering the forward current. Further, in contrast to most light sources, LEDs radiate very little heat in the form of IR that can cause damage to sensitive objects or fabrics, and typically have a relatively long useful life.

The actuator 501 may be a thermoelectric actuator such as a cooler or a heater for changing the temperature of an object, that may be solid, liquid or gas (such as the air temperature), using conduction, convection, thermal radiation, or by the transfer of energy by phase changes. Radiative heaters contain a heating element that reaches a high temperature. The element is usually packaged inside a glass envelope resembling a light bulb and with a reflector to direct the energy output away from the body of the heater. The element emits infrared radiation that travels through air or space until it hits an absorbing surface, where it is partially converted to heat and partially reflected. In a convection heater, the heating element heats the air next to it by convection. Hot air is less dense than cool air, so it rises due to buoyancy, allowing more cool air to flow in to take its place. This sets up a constant current of hot air that leaves the appliance through vent holes and heats up the surrounding space. These are generally filled with oil, in an oil heater, due to oil functioning as an effective heat reservoir. They are ideally suited for heating a closed space. They operate silently and have a lower risk of ignition hazard in the event that they make unintended contact with furnishings compared to radiant electric heaters. This is a good choice for long periods of time, or if left unattended. A fan heater, also called a forced convection heater, is a variety of convection heater that includes an electric fan to speed up the airflow. This reduces the thermal resistance between the heating element and the surroundings faster than passive convection, allowing heat to be transferred more quickly.

A thermoelectric actuator may be a heat pump, which is a machine or device that transfers thermal energy from one location, called the "source," which is at a lower temperature, to another location called the "sink" or "heat sink", which is at a higher temperature. Heat pumps may be used for cooling or for heating. Thus, heat pumps move thermal energy opposite to the direction that it normally flows, and may be electrically driven such as compressor-driven air conditioners and freezers. A heat pump may use an electric motor to drive a refrigeration cycle, drawing energy from a source such as the ground or outside air and directing it into the space to be warmed. Some systems can be reversed so that the interior space is cooled and the warm air is discharged outside or into the ground.

A thermoelectric actuator may be an electric heater, converting electrical energy into heat, such as for space heating, cooking, water heating, and industrial processes. Commonly, the heating element inside every electric heater is simply an electrical resistor, and works on the principle of Joule heating: an electric current through a resistor converts electrical energy into heat energy. In a dielectric heater, high-frequency alternating electric field, or radio wave or microwave electromagnetic radiation heats a dielectric material, and is based on heating caused by molecular dipole rotation within the dielectric. Microwave heaters, as distinct from RF heating, is a sub-category of dielectric heating at frequencies above 100 MHz, where an electromagnetic wave can be launched from a small dimension emitter and conveyed through space to the target. Modern microwave ovens make use of electromagnetic waves (microwaves) with electric fields of much higher frequency and shorter wavelength than RF heaters. Typical domestic microwave ovens operate at 2.45 GHz, but 0.915 GHz ovens also exist, thus the wavelengths employed in microwave heating are 12 or 33 cm, providing for highly efficient, but less penetrative, dielectric heating.

A thermoelectric actuator may be a thermoelectric cooler or a heater (or a heat pump) based on the Peltier effect, where heat flux in the junction of two different types of materials is created. When direct current is supplied to this solid-state active heat pump device (a.k.a. Peltier device, Peltier heat pump, solid state refrigerator, or ThermoElectric Cooler—TEC), heat is moved from one side to the other, building up a difference in temperature between the two sides, and hence can be used for either heating or cooling. A Peltier cooler can also be used as a thermoelectric generator, such that when one side of the device is heated to a temperature greater than the other side, a difference in voltage will build up between the two sides.

A thermoelectric actuator may be an air cooler, sometimes referred to as an air conditioner. Common air coolers, such as in refrigerators, are based on a refrigeration cycle of a heat pump. This cycle takes advantage of the way phase changes work, where latent heat is released at a constant temperature during a liquid/gas phase change, and where varying the pressure of a pure substance also varies its condensation/boiling point. The most common refrigeration cycle uses an electric motor to drive a compressor.

An electric heater may be an induction heater, producing the process of heating an electrically conducting object (usually a metal) by electromagnetic induction, where eddy currents (also called Foucault currents) are generated within the metal and resistance leads to Joule heating of the metal. An induction heater (for any process) consists of an electromagnet, through which a high-frequency Alternating Current (AC) is passed. Heat may also be generated by magnetic hysteresis losses in materials that have significant relative permeability.

The actuator 501 may use pneumatics, involving the application of pressurized gas to affect mechanical motion. A motion actuator may be a pneumatic actuator that converts energy (typically in the form of compressed air) into rotary or linear motion. In some arrangements, a motion actuator may be used to provide force or torque. Similarly, force or torque actuators may be used as motion actuators. A pneumatic actuator mainly consists of a piston, a cylinder, and valves or ports. The piston is covered by a diaphragm, or seal, which keeps the air in the upper portion of the cylinder, allowing air pressure to force the diaphragm downward, moving the piston underneath, which in turn moves the valve stem, which is linked to the internal parts of the actuator. Pneumatic actuators may only have one spot for a signal input, top or bottom, depending on the action required. Valves input pressure is the "control signal", where each different pressure is a different set point for a valve. Valves typically require little pressure to operate and usually double or triple the input force. The larger the size of the piston, the larger the output pressure can be. Having a larger piston can also be good if air supply is low, allowing the same forces with less input.

The actuator 501 may use hydraulics, involving the application of a fluid to affect mechanical motion. Common hydraulics systems are based on Pascal's famous theory, which states that the pressure of the liquid produced in an enclosed structure has the capacity of releasing a force up to ten times the pressure that was produced earlier. A hydraulic actuator may be a hydraulic cylinder, where pressure is applied to the fluids (oil), to get the desired force. The force acquired is used to power the hydraulic machine. These cylinders typically include the pistons of different sizes, used to push down the fluids in the other cylinder, which in turn exerts the pressure and pushes it back again. A hydraulic actuator may be a hydraulic pump, is responsible for supplying the fluids to the other essential parts of the hydraulic system. The power generated by a hydraulic pump is about ten times more than the capacity of an electrical motor. There are different types of hydraulic pumps such as the vane pumps, gear pumps, piston pumps, etc. Among them, the piston pumps are relatively more costly, but they have a guaranteed long life and are even able to pump thick, difficult fluids. Further, a hydraulic actuator may be a hydraulic motor, where the power is achieved with the help of exerting pressure on the hydraulic fluids, which is normally oil. The benefit of using hydraulic motors is that when the power source is mechanical, the motor develops a tendency to rotate in the opposite direction, thus acting like a hydraulic pump.

A motion actuator may further be a vacuum actuator, producing a motion based on vacuum pressure, commonly controlled by a Vacuum Switching Valve (VSV), which controls the vacuum supply to the actuator. A motion actuator may be a rotary actuator that produces a rotary motion or torque, commonly to a shaft or axle. The simplest rotary actuator is a purely mechanical linear actuator, where linear motion in one direction is converted to a rotation. A rotary actuator may be electrically powered, or may be powered by pneumatic or hydraulic power, or may use energy stored internally by springs. The motion produced by a rotary motion actuator may be either continuous rotation, such as in common electric motors, or movement to a fixed angular position as for servos and stepper motors. A further form, the torque motor, does not necessarily produce any rotation but merely generates a precise torque, which then either cause rotation, or is balanced by some opposing torque. Some motion actuators may be intrinsically linear, such as those using linear motors. Motion actuators may include, or coupled with, a wide variety of mechanical elements to change the nature of the motion such as provided by the actuating/transducing elements, such as levers, ramps, limit switches, screws, cams, crankshafts, gears, pulleys, wheels, constant-velocity joints, shock absorbers or dampers, or ratchets.

A stepper motor (a.k.a. step motor) is a brushless DC electric motor that divides a full rotation into a number of equal steps, commonly of a fixed size. The motor position can then be commanded to move and hold on one of these steps without any feedback sensor (an open-loop controller), or may be combined with either a position encoder or at least a single datum sensor at the zero position. The stepper motor may be a switched reluctance motor, which is a very large stepping motor with a reduced pole count, and generally is closed-loop commutated. A stepper motor may be a permanent magnet stepper type, using a Permanent Magnet (PM) in the rotor and operate on the attraction or repulsion between the rotor PM and the stator electromagnets. Further, a stepper motor may be a variable reluctance stepper using a Variable Reluctance (VR) motor that has a plain iron rotor and operate based on the principle that minimum reluctance occurs with minimum gap, hence the rotor points are attracted toward the stator magnet poles. Further, a stepper motor may be a hybrid synchronous stepper, where a combination of the PM and VR techniques are used to achieve maximum power in a small package size. Furthermore, a stepper motor may be a Lavet type stepping motor using a single-phase stepping motor, where the rotor is a permanent magnet and the motor is built with a strong magnet and large stator to deliver high torque.

A rotary actuator may be a servomotor (a.k.a. servo), which is a packaged combination of a motor (usually electric, although fluid power motors may also be used), a gear train to reduce the many rotations of the motor to a higher torque rotation, and a position encoder that identifies the position of the output shaft and an inbuilt control system. The input control signal to the servo indicates the desired output position. Any difference between the position commanded and the position of the encoder gives rise to an error signal that causes the motor and geartrain to rotate until the encoder reflects a position matching that commanded. Further, a rotary actuator may be a memory wire type, which uses applying current such that the wire is heated above its transition temperature and so changes shape, applying a torque to the output shaft. When power is removed, the wire cools and returns to its earlier shape.

A rotary actuator may be a fluid power actuator, where hydraulic or pneumatic power may be used to drive a shaft or an axle. Such fluid power actuators may be based on driving a linear piston, to where a cylinder mechanism is geared to produce rotation, or may be based on a rotating asymmetrical vane that swings through a cylinder of two different radii. The differential pressure between the two sides of the vane gives rise to an unbalanced force and thus a torque on the output shaft. Such vane actuators require a number of sliding seals and the joins between these seals have tended to cause more problems with leakage than for the piston and cylinder type.

Alternatively or in addition, a motion actuator may be a linear actuator that creates motion in a straight line. Such linear actuator may use hydraulic or pneumatic cylinders, which inherently produce linear motion, or may provide a linear motion by converting from a rotary motion created by a rotary actuator, such as electric motors. Rotary-based linear actuators may be a screw, a wheel and axle, or a cam type. A screw actuator operates on the screw machine principle, whereby rotating the actuator nut, the screw shaft moves in a line, such as a lead-screw, a screw jack, a ball screw or roller screw. A wheel-and-axle actuator operates on the principle of the wheel and axle, where a rotating wheel moves a cable, rack, chain or belt to produce linear motion. Examples are hoist, winch, rack and pinion, chain drive, belt drive, rigid chain, and rigid belt actuators. Cam actuator includes a wheel-like cam, which upon rotation, provides thrust at the base of a shaft due to its eccentric shape. Mechanical linear actuators may only pull, such as hoists, chain drive and belt drives, while others only push (such as a cam actuator). Some pneumatic and hydraulic cylinder based actuators may provide force in both directions.

A linear hydraulic actuator (a.k.a. hydraulic cylinder) commonly involves a hollow cylinder having a piston inserted in it. An unbalanced pressure applied to the piston provides a force that can move an external object, and since liquids are nearly incompressible, a hydraulic cylinder can provide controlled precise linear displacement of the piston. The displacement is only along the axis of the piston. Pneumatic actuators, or pneumatic cylinders, are similar to hydraulic actuators except they use compressed gas to provide pressure instead of a liquid. A linear pneumatic actuator (a.k.a. pneumatic cylinder) is similar to hydraulic actuator, except that it uses compressed gas to provide pressure instead of a liquid.

A linear actuator may be a piezoelectric actuator, based on the piezoelectric effect in which application of a voltage to the piezoelectric material causes it to expand. Very high voltages correspond to only tiny expansions. As a result, piezoelectric actuators can achieve extremely fine positioning resolution, but also have a very short range of motion.

A linear actuator may be a linear electrical motor. Such a motor may be based on a conventional rotary electrical motor, connected to rotate a lead screw, that has a continuous helical thread machined on its circumference running along the length (similar to the thread on a bolt). Threaded onto the lead screw is a lead nut or ball nut with corresponding helical threads, used for preventing from rotating with the lead screw (typically, the nut interlocks with a non-rotating part of the actuator body). The electrical motor may be a DC brush, a DC brushless, a stepper, or an induction motor type.

Telescoping linear actuators are specialized linear actuators used where space restrictions or other requirements require, where their range of motion is many times greater than the unextended length of the actuating member. A common form is made of concentric tubes of approximately equal length that extend and retract like sleeves, one inside the other, such as the telescopic cylinder. Other more specialized telescoping actuators use actuating members that act as rigid linear shafts when extended, but break that line by folding, separating into pieces and/or uncoiling when retracted. Examples of telescoping linear actuators include a helical band actuator, a rigid belt actuator, a rigid chain actuator, and a segmented spindle.

A linear actuator may be a linear electric motor, that has had its stator and rotor "unrolled" so that instead of producing a torque (rotation) it produces a linear force along its length. The most common mode of operation is as a Lorentz-type actuator, in which the applied force is linearly proportional to the current and the magnetic field. A linear electric motor may be a Linear Induction Motor (LIM), which is an AC (commonly 3-phase) asynchronous linear motor that works with the same general principles as other induction motors but which has been designed to directly produce motion in a straight line. In such motor type, the force is produced by a moving linear magnetic field acting on conductors in the field, such that any conductor, be it a loop, a coil or simply a piece of plate metal, that is placed in this field, will have eddy currents induced in it thus creating an opposing magnetic field, in accordance with Lenz's law. The two opposing fields will repel each other, thus creating motion as the magnetic field sweeps through the metal. The primary of a linear electric motor typically consists of a flat magnetic core (generally laminated) with transverse slots which are often straight cut with coils laid into the slots, while the secondary is frequently a sheet of aluminum, often with an iron backing plate. Some LIMs are double sided, with one primary either side of the secondary, and in this case, no iron backing is needed. A LIM may be based on a synchronous motor, where the rate of movement of the magnetic field is controlled, usually electronically, to track the motion of the rotor. A linear electric motor may be a Linear Synchronous Motor (LSM), in which the rate of movement of the magnetic field is controlled, usually electronically, to track the motion of the rotor. Synchronous linear motors may use commutators, or preferably, the rotor may contain permanent magnets, or soft iron.

A motion actuator may be a piezoelectric motor (a.k.a. piezo motor), which is based upon the change in shape of a piezoelectric material when an electric field is applied. Piezoelectric motors make use of the converse piezoelectric effect whereby the material produces acoustic or ultrasonic vibrations in order to produce a linear or rotary motion. In one mechanism, the elongation in a single plane is used to make a series stretches and position holds, similar to the way a caterpillar moves. Piezoelectric motors may be made in both linear and rotary types.

One drive technique is to use piezoelectric ceramics to push a stator. Commonly known as Inchworm or PiezoWalk motors, these piezoelectric motors use three groups of crystals: two of which are Locking and one Motive, permanently connected to either the motor's casing or stator (not both) and sandwiched between the other two, which provides the motion. These piezoelectric motors are fundamentally stepping motors, with each step comprising either two or three actions, based on the locking type. Another mechanism employs the use of Surface Acoustic Waves (SAW) to generate linear or rotary motion. An alternative drive technique is known as Squiggle motor, in which piezoelectric elements are bonded orthogonally to a nut and their ultrasonic vibrations rotate and translate a central lead screw, providing a direct drive mechanism. The piezoelectric motor may be according to, or based on, the motor described in U.S. Pat. No. 3,184,842 to Maropis, entitled: "Method and Apparatus for Delivering Vibratory Energy", in U.S. Pat. No. 4,019,073 to Vishnevsky et al., entitled: "Piezoelectric Motor Structures", or in U.S. Pat. No. 4,210,837 to Vasiliev et al., entitled: "Piezoelectrically Driven Torsional Vibration Motor", which are all incorporated in their entirety for all purposes as if fully set forth herein.

A linear actuator may be a comb-drive capacitive actuator utilizing electrostatic forces that act between two electrically conductive combs. The attractive electrostatic forces are created when a voltage is applied between the static and moving combs causing them to be drawn together. The force developed by the actuator is proportional to the change in capacitance between the two combs, increasing with driving voltage, the number of comb teeth, and the gap between the teeth. The combs are arranged so that they never touch (because then there would be no voltage difference). Typically, the teeth are arranged so that they can slide past one another until each tooth occupies the slot in the opposite comb. Comb drive actuators typically operate at the micro- or nanometer scale and are generally manufactured by bulk micromachining or surface micromachining a silicon wafer substrate.

An electric motor may be an ultrasonic motor, which is powered by the ultrasonic vibration of a component, the stator, placed against another component, the rotor or slider depending on the scheme of operation (rotation or linear translation). Ultrasonic motors and piezoelectric actuators typically use some form of piezoelectric material, most often lead zirconate titanate and occasionally lithium niobate or other single-crystal materials. In ultrasonic motors, resonance is commonly used in order to amplify the vibration of the stator in contact with the rotor.

A motion actuator may consist of, or based on, Electroactive Polymers (EAPs), which are polymers that exhibit a change in size or shape when stimulated by an electric field, and may use as actuators and sensors. A typical characteristic property of an EAP is that they will undergo a large amount of deformation while sustaining large forces. EAPs are generally divided into two principal classes: Dielectric and Ionic. Dielectric EAPs, are materials in which actuation is caused by electrostatic forces between two electrodes which squeeze the polymer. Dielectric elastomers are capable of very high strains and are fundamentally a capacitor that changes its capacitance when a voltage is applied, by allowing the polymer to compress in thickness and expand in the area due to the electric field. This type of EAP typically requires a large actuation voltage to produce high electric fields (hundreds to thousands of volts), but very low electrical power consumption. Dielectric EAPs require no power to keep the actuator at a given position. Examples are electrostrictive polymers and dielectric elastomers. In Ionic EAPs, actuation is caused by the displacement of ions inside the polymer. Only a few volts are needed for actuation, but the ionic flow implies a higher electrical power needed for actuation, and energy is needed to keep the actuator at a given position. Examples of ionic EAPS are conductive polymers, ionic polymer-metal composites (IPMCs), and responsive gels.

A linear motion actuator may be a wax motor, typically providing smooth and gentle motion. Such a motor comprises a heater that when energized, heats a block of wax causing it to expand and to drive a plunger outwards. When the electric current is removed, the wax block cools and contracts, causing the plunger to withdraw, usually by spring force applied externally or by a spring incorporated directly into the wax motor.

A motion actuator may be a thermal bimorph, which is a cantilever that consists of two active layers: piezoelectric and metal. These layers produce a displacement via thermal activation where a temperature change causes one layer to expand more than the other does. A piezoelectric unimorph is a cantilever that consists of one active layer and one inactive layer. In the case where active layer is piezoelectric, deformation in that layer may be induced by the application of an electric field. This deformation induces a bending displacement in the cantilever. The inactive layer may be fabricated from a non-piezoelectric material.

An electric motor may be an electrostatic motor (a.k.a. capacitor motor) which is based on the attraction and repulsion of electric charge. Often, electrostatic motors are the dual of conventional coil-based motors. They typically require a high voltage power supply, although very small motors employ lower voltages. The electrostatic motor may be used in micro-mechanical (MEMS) systems where their drive voltages are below 100 volts, and where moving charged plates are far easier to fabricate than coils and iron cores. An alternative type of electrostatic motor is the spacecraft electrostatic ion drive thruster where forces and motion are created by electrostatically accelerating ions. The electrostatic motor may be according to, or based on, the motor described in U.S. Pat. No. 3,433,981 to Bollee, entitled: "Electrostatic Motor", in U.S. Pat. No. 3,436,630 to Bollee, entitled: "Electrostatic Motor", in U.S. Pat. No. 5,965,968 to Robert et al. entitled: "Electrostatic Motor", or in U.S. Pat. No. 5,552,654 to Konno et al., entitled: "Electrostatic actuator", which are all incorporated in their entirety for all purposes as if fully set forth herein.

An electric motor may be an AC motor, which is driven by an Alternating Current (AC). Such a motor commonly consists of two basic parts, an outside stationary stator having coils supplied with alternating current to produce a rotating magnetic field, and an inside rotor attached to the output shaft that is given a torque by the rotating field. An AC motor may be an induction motor, which runs slightly slower than the supply frequency, where the magnetic field on the rotor of this motor is created by an induced current. Alternatively, an AC motor may be a synchronous motor, which does not rely on induction and as a result, can rotate exactly at the supply frequency or a sub-multiple of the supply frequency. The magnetic field on the rotor is either generated by current delivered through slip rings or by a permanent magnet. Other types of AC motors include eddy current motors and AC/DC mechanically commutated machines, in which speed is dependent on voltage and winding connection.

An AC motor may be a two-phase AC servo motor, typically having a squirrel cage rotor and a field consisting of two windings: a constant-voltage (AC) main winding and a control-voltage (AC) winding in quadrature (i.e., 90 degrees phase shifted) with the main winding, to produce a rotating magnetic field. Reversing phase makes the motor reverse. The control winding is commonly controlled and fed from an AC servo amplifier and a linear power amplifier.

An AC motor may be a single-phase AC induction motor; where the rotating magnetic field must be produced using other means, such as shaded-pole motor, commonly including a small single-turn copper "shading coil" creates the moving magnetic field. Part of each pole is encircled by a copper coil or strap; the induced current in the strap opposes the change of flux through the coil. Another type is a split-phase motor, having a startup winding separate from the main winding. When the motor is started, the startup winding is connected to the power source via a centrifugal switch, which is closed at low speed. Another type is a capacitor start motor, including a split-phase induction motor with a starting capacitor inserted in series with the startup winding, creating an LC circuit, which is capable of a much greater phase shift (and so, a much greater starting torque). The capacitor naturally adds expense to such motors. Similarly, a resistance-start motor is a split-phase induction motor with a starter inserted in series with the startup winding, creating a reactance. This added starter provides assistance in the starting and the initial direction of rotation. Another variation is the Permanent-Split Capacitor (PSC) motor (also known as a capacitor start and run motor), which operates similarly to the capacitor-start motor described above, but there is no centrifugal starting switch, and what correspond to the start windings (second windings) are permanently connected to the power source (through a capacitor), along with the run windings. PSC motors are frequently used in air handlers, blowers, and fans (including ceiling fans) and other cases where a variable speed is desired.

An AC motor may be a three-phase AC synchronous motor, where the connections to the rotor coils of a three-phase motor are taken out on slip-rings and fed a separate field current to create a continuous magnetic field (or if the rotor consists of a permanent magnet), the result is called a synchronous motor because the rotor will rotate synchronously with the rotating magnetic field produced by the polyphase electrical supply.

An electric motor may be a DC motor, which is driven by a Direct Current (DC), and is, similarly based on a torque that is produced by the principle of Lorentz force. Such a motor may be a brushed, a brushless, or an uncommutated type. A brushed DC electric motor generates torque directly from DC power supplied to the motor by using internal commutation, stationary magnets (permanent or electromagnets), and rotating electrical magnets. Brushless DC motors use a rotating permanent magnet or soft magnetic core in the rotor, and stationary electrical magnets on the motor housing, and use a motor controller that converts DC to AC. Other types of DC motors require no commutation, such as a homopolar motor that has a magnetic field along the axis of rotation and an electric current that at some point is not parallel to the magnetic field, and a ball bearing motor that consists of two ball bearing-type bearings, with the inner races mounted on a common conductive shaft, and the outer races connected to a high current, low voltage power supply. An alternative construction fits the outer races inside a metal tube, while the inner races are mounted on a shaft with a non-conductive section (e.g., two sleeves on an insulating rod). This method has the advantage that the tube will act as a flywheel. The direction of rotation is determined by the initial spin, which is usually required to get it going.

An actuator may be a pump, typically used to move (or compress) fluids or liquids, gasses, or slurries, commonly by pressure or suction actions. Pumps commonly consume energy to perform mechanical work by moving the fluid or the gas, where the activating mechanism is often reciprocating or rotary. Pumps may be operated in many ways, including manual operation, electricity, a combustion engine of some type, and wind action. An air pump moves air either into, or out of, something, and a sump pump used for the removal of liquid from a sump or sump pit. A fuel pump is commonly used to move transport the fuel through a pipe, and a vacuum pump is a device that removes gas molecules from a sealed volume in order to leave behind a partial vacuum. A gas compressor is a mechanical device that increases the pressure of a gas by reducing its volume. A pump may be a valveless pump, where no valves are present to regulate the flow direction, and are commonly used in biomedical and engineering systems. Pumps can be classified into many major groups, for example according to their energy source or according to the method they use to move the fluid, such as direct lift, impulse, displacement, velocity, centrifugal, and gravity pumps.

A positive displacement pump causes a fluid to move by trapping a fixed amount of it and then forcing (displacing) that trapped volume into the discharge pipe. Some positive displacement pumps work using an expanding cavity on the suction side and a decreasing cavity on the discharge side. The liquid flows into the pump as the cavity on the suction side expands, and the liquid flows out of the discharge as the cavity collapses. The volume is constant given each cycle of operation. A positive displacement pump can be further classified according to the mechanism used to move the fluid: A rotary-type positive displacement type such as internal gear, screw, shuttle block, flexible vane or sliding vane, circumferential piston, helical twisted roots (e.g., Wendelkolben pump) or liquid ring vacuum pumps, a reciprocating-type positive displacement type, such as a piston or diaphragm pumps, and a linear-type positive displacement type, such as rope pumps and chain pumps. The positive displacement principle applies also to a rotary lobe pump, a progressive cavity pump, a rotary gear pump, a piston pump, a diaphragm pump, a screw pump, a gear pump, a hydraulic pump, and a vane pump.

A rotary positive displacement pumps can be grouped into three main types: Gear pumps where the liquid is pushed between two gears, Screw pumps where the shape of the pump internals usually two screws turning against each other pump the liquid, and Rotary vane pumps, which are similar to scroll compressors, and are consisting of a cylindrical rotor enclosed in a similarly shaped housing. As the rotor turns, the vanes trap fluid between the rotor and the casing, drawing the fluid through the pump.

Reciprocating positive displacement pumps cause the fluid to move using one or more oscillating pistons, plungers or membranes (diaphragms). Typical reciprocating pumps include plunger pumps type, which are based on a reciprocating plunger that pushes the fluid through one or two open valves, closed by suction on the way back, diaphragm pumps type which are similar to plunger pumps, where the plunger pressurizes hydraulic oil which is used to flex a diaphragm in the pumping cylinder, diaphragm valves type that are used to pump hazardous and toxic fluids, piston displacement pumps type that are usually simple devices for pumping small amounts of liquid or gel manually, and radial piston pumps type.

A pump may be an impulse pump, which uses pressure created by gas (usually air). In some impulse pumps the gas trapped in the liquid (usually water), is released and accumulated somewhere in the pump, creating a pressure which can push part of the liquid upwards. Impulse pump types include: a hydraulic ram pump type, which use a pressure built up internally from a released gas in a liquid flow; a pulser pump type which runs with natural resources by kinetic energy only; and an airlift pump type which runs on air inserted into a pipe, pushing up the water, when bubbles move upward, or on a pressure inside the pipe pushing the water up.

A velocity pump may be a rotodynamic pump (a.k.a. dynamic pump), which is a type of velocity pump in which kinetic energy is added to the fluid by increasing the flow velocity. This increase in energy is converted to a gain in potential energy (pressure) when the velocity is reduced prior to or as the flow exits the pump into the discharge pipe. This conversion of kinetic energy to pressure is based on the First law of thermodynamics or more specifically by Bernoulli's principle.

A pump may be a centrifugal pump, which is a rotodynamic pump that uses a rotating impeller to increase the pressure and flow rate of a fluid. Centrifugal pumps are the most common type of pump used to move liquids through a piping system. The fluid enters the pump impeller along or near to the rotating axis and is accelerated by the impeller, flowing radially outward or axially into a diffuser or volute chamber, from where it exits into the downstream piping system. A centrifugal pump may be a radial flow pump type, where the fluid exits at right angles to the shaft, an axial flow pump type where the fluid enters and exits along the same direction parallel to the rotating shaft, or may be a mixed flow pump, where the fluid experiences both radial acceleration and lift and exits the impeller somewhere between 0-90 degrees from the axial direction.

The actuator 501 may be an electrochemical or chemical actuator, used to produce, change, or otherwise affect a matter structure, properties, composition, process, or reactions. An electrochemical actuator may affect or generate a chemical reaction or an oxidation/reduction (redox) reaction, such as an electrolysis process.

An actuator may be an electroacoustic actuator, such as a sounder, which converts electrical energy to sound waves transmitted through the air, an elastic solid material, or a liquid, usually by means of a vibrating or moving ribbon or diaphragm. The sound may be audio or audible, having frequencies in the approximate range of 20 to 20,000 hertz, capable of being detected by human organs of hearing. Alternatively or in addition, the sounder may be used to emit inaudible frequencies, such as ultrasonic (a.k.a. ultrasound) acoustic frequencies that are above the range audible to the human ear, or above approximately 20,000 Hz. A sounder may be omnidirectional, unidirectional, bidirectional, or provide other directionality or polar patterns.

A loudspeaker (a.k.a. speaker) is a sounder that produces sound in response to an electrical audio signal input, typically audible sound. The most common form of loudspeaker is the electromagnetic (or dynamic) type, uses a paper cone supporting a moving voice coil electromagnet acting on a permanent magnet. Where accurate reproduction of sound is required, multiple loudspeakers may be used, each reproducing a part of the audible frequency range. A loudspeaker is commonly optimized for middle frequencies; tweeters for high frequencies; and sometimes supertweeter is used which is optimized for the highest audible frequencies.

A loudspeaker may be a piezo (or piezoelectric) speaker contains a piezoelectric crystal coupled to a mechanical diaphragm and is based on the piezoelectric effect. An audio signal is applied to the crystal, which responds by flexing in proportion to the voltage applied across the crystal surfaces, thus converting electrical energy into mechanical. Piezoelectric speakers are frequently used as beepers in watches and other electronic devices, and are sometimes used as tweeters in less-expensive speaker systems, such as computer speakers and portable radios. A loudspeaker may be a magnetostrictive transducers, based on magnetostriction, have been predominantly used as sonar ultrasonic sound wave radiators, but their usage has spread also to audio speaker systems.

A loudspeaker may be an electrostatic loudspeaker (ESL), in which sound is generated by the force exerted on a membrane suspended in an electrostatic field. Such speakers use a thin flat diaphragm usually consisting of a plastic sheet coated with a conductive material such as graphite sandwiched between two electrically conductive grids, with a small air gap between the diaphragm and grids. The diaphragm is usually made from a polyester film (thickness 2-20 μm) with exceptional mechanical properties, such as PET film. By means of the conductive coating and an external high voltage supply, the diaphragm is held at a DC potential of several kilovolts with respect to the grids. The grids are driven by the audio signal; and the front and rear grids are driven in antiphase. As a result, a uniform electrostatic field proportional to the audio signal is produced between both grids. This causes a force to be exerted on the charged diaphragm, and its resulting movement drives the air on either side of it.

A loudspeaker may be a magnetic loudspeaker, and may be a ribbon or planar type, is based on a magnetic field. A ribbon speaker consists of a thin metal-film ribbon suspended in a magnetic field. The electrical signal is applied to the ribbon, which moves with it to create the sound. Planar magnetic speakers are speakers with roughly rectangular flat surfaces that radiate in a bipolar (i.e., front and back) manner, and may be having printed or embedded conductors on a flat diaphragm. Planar magnetic speakers consist of a flexible membrane with a voice coil printed or mounted on it. The current flowing through the coil interacts with the magnetic field of carefully placed magnets on either side of the diaphragm, causing the membrane to vibrate more uniformly and without much bending or wrinkling. A loudspeaker may be a bending wave loudspeaker, which uses a diaphragm that is intentionally flexible.

A sounder may be an electromechanical type, such as an electric bell, which may be based on an electromagnet, causing a metal ball to clap on cup or half-sphere bell. A sounder may be a buzzer (or beeper), a chime, a whistle or a ringer. Buzzers may be either electromechanical or ceramic-based piezoelectric sounders, which make a high-pitch noise, and may be used for alerting. The sounder may emit a single or multiple tones, and can be in continuous or intermittent operation.

In one example, the sounder is used to play a stored digital audio. The digital audio content can be stored in the sounder. Further, few files may be stored (e.g., representing different announcements or songs), selected by the control logic. Alternatively or in addition, the digital audio data may be received by the sounder from external sources via any of the above networks. Furthermore, the source of the digital audio may be a microphone serving as a sensor, after either processing, storing, delaying, or any other manipulation, or as originally received resulting ‘doorphone’ or ‘intercom’ functionality between a microphone and a sounder in the building.

In another example, the sounder simulates the voice of a human being or generates music, typically by using an electronic circuit having a memory for storing the sounds (e.g., music, song, voice message, etc.), a digital to analog converter 62 to reconstruct the electrical representation of the sound, and a driver for driving a loudspeaker, which is an electro-acoustic transducer that converts an electrical signal to sound. An example of a greeting card providing music and mechanical movement is disclosed in U.S. Patent Application No. 2007/0256337 to Segan entitled: “User Interactive Greeting Card”, which is incorporated in its entirety for all purposes as if fully set forth herein.

In one example, the system is used for sound or music generation. For example, the sound produced can emulate the sounds of a conventional acoustical music instrument, such as a piano, tuba, harp, violin, flute, guitar and so forth. In one example, the sounder is an audible signaling device, emitting audible sounds that can be heard (having frequency components in the 20-20,000 Hz band). In one example the sound generated is music or song. The elements of the music such as pitch (which governs melody and harmony), rhythm (and its associated concepts tempo, meter, and articulation), dynamics, and the sonic qualities of timbre and texture, may be associated with the shape theme. For example, if a musical instrument shown in the picture, the music generated by that instrument will be played, e.g., drumming sound of drums and playing of a flute or guitar. In one example, a talking human voice is played by the sounder. The sound may be a syllable, a word, a phrase, a sentence, a short story or a long story, and can be based on speech synthesis or pre-recorded. Male or female voice can be used, further being young or old.

Some examples of toys that include generation of an audio signal such as music are disclosed in U.S. Pat. No. 4,496,149 to Schwartzberg entitled: “Game Apparatus Utilizing Controllable Audio Signals”, in U.S. Pat. No. 4,516,260 to Breedlove et al. entitled: “Electronic Learning Aid or Game having Synthesized Speech”, in U.S. Pat. No. 7,414,186 to Scarpa et al. entitled: “System and Method for Teaching Musical Notes”, in U.S. Pat. No. 4,968,255 to Lee et al., entitled: “Electronic Instructional Apparatus”, in U.S. Pat. No. 4,248,123 to Bunger et al., entitled: “Electronic Piano” and in U.S. Pat. No. 4,796,891 to Milner entitled: “Musical Puzzle Using Sliding Tiles”, and toys with means for synthesizing human voice are disclosed in U.S. Pat. No. 6,527,611 to Cummings entitled: “Place and Find Toy”, and in U.S. Pat. No. 4,840,602 to Rose entitled: “Talking Doll Responsive to External Signal”, which are all incorporated in their entirety for all purposes as if fully set forth herein. A music toy kit combining music toy instrument with a set of construction toy blocks is disclosed in U.S. Pat. No. 6,132,281 to Klitsner et al. entitled: “Music Toy Kit” and in U.S. Pat. No. 5,349,129 to Wisniewski et al. entitled: “Electronic Sound Generating Toy”, which are incorporated in their entirety for all purposes as if fully set forth herein.

A speech synthesizer used to produce natural and intelligible artificial human speech may be implemented in hardware, in software, or combination thereof. A speech synthesizer may be Text-To-Speech (TTS) based, that converts normal language text to speech, or alternatively (or in addition) may be based on rendering symbolic linguistic representation like phonetic transcription. A TTS typically involves two steps, the front-end where the raw input text is pre-processed to fully write-out words replacing numbers and abbreviations, followed by assigning phonetic transcriptions to each word (text-to-phoneme), and the back-end (or synthesizer) where the symbolic linguistic representation is converted to output sound.

The generating of synthetic speech waveform typically uses a concatenative or formant synthesis. The concatenative synthesis commonly produces the most natural-sounding synthesized speech, and is based on the concatenation (or stringing together) of segments of recorded speech. There are three main types of concatenative synthesis: Unit selection, diphone synthesis, and domain-specific synthesis. Unit selection synthesis is based on large databases of recorded speech including individual phones, diphones, half-phones, syllables, morphemes, words, phrases, and sentences, indexed based on the segmentation and acoustic parameters like the fundamental frequency (pitch), duration, position in the syllable, and neighboring phones. At run time, the desired target utterance is created by determining (typically using a specially weighted decision tree) the best chain of candidate units from the database (unit selection). Diphone synthesis uses a minimal speech database containing all the diphones (sound-to-sound transitions) occurring in a language, and at runtime, the target prosody of a sentence is superimposed on these minimal units by means of digital signal processing techniques such as linear predictive coding. Domain-specific synthesis is used where the output is limited to a particular domain, using concatenated prerecorded words and phrases to create complete utterances. In formant synthesis the synthesized speech output is created using additive synthesis and an acoustic model (physical modeling synthesis), rather than on using human speech samples. Parameters such as fundamental frequency, voicing, and noise levels are varied over time to create a waveform of artificial speech. The synthesis may further be based on articulatory synthesis where computational techniques for synthesizing speech are based on models of the human vocal tract and the articulation processes occurring there, or may be HMM-based synthesis which is based on hidden Markov models, where the frequency spectrum (vocal tract), fundamental frequency (vocal source), and duration (prosody) of speech are modeled simultaneously by HMMs and generated based on the maximum likelihood criterion. The speech synthesizer may further be based on the book entitled: “Development in Speech Synthesis”, by Mark Tatham and Katherine Morton, published 2005 by John Wiley & Sons Ltd., ISBN: 0-470-85538-X, and on the book entitled: “*Speech Synthesis and Recognition*” by John Holmes and Wendy Holmes, $2^{nd}$ Edition, published 2001 ISBN: 0-7484-0856-8, which are both incorporated in their entirety for all purposes as if fully set forth herein.

A speech synthesizer may be software based such as Apple VoiceOver utility, which uses speech synthesis for accessibility, and is part of the Apple iOS operating system used on the iPhone, iPad and iPod Touch. Similarly, Microsoft uses SAPI 4.0 and SAPI 5.0 as part of Windows operating system. Similarly, hardware may be used, and may be based on an IC. A tone, voice, melody, or song hardware-based sounder typically contains a memory storing a digital representation of the pre-recorder or synthesized voice or music, a Digital to Analog (D/A) converter for creating an analog signal, a speaker and a driver for feeding the speaker. A sounder may be based on Holtek HT3834 CMOS VLSI Integrated Circuit (IC) named ‘36 Melody Music Generator’ available from Holtek Semiconductor Inc., headquartered in Hsinchu, Taiwan, and described with application circuits in a data sheet Rev. 1.00 dated Nov. 2, 2006, on EPSON 7910 series 'Multi-Melody IC' available from Seiko-Epson Corporation, Electronic Devices Marketing Division located in Tokyo, Japan, and described with application circuits in a data sheet PF226-04 dated 1998, on Magnevation SpeakJet chip available from Magnevation LLC and described in 'Natural Speech & Complex Sound Synthesizer', described in User's Manual Revision 1.0 Jul. 27, 2004, on Sensory Inc. NLP-5x described in the Data sheet "Natural Language Processor with Motor, Sensor and Display Control", P/N 80-0317-K, published 2010 by Sensory, Inc. of Santa-Clara, California, U.S.A., or on OPTi 82C931 'Plug and Play Integrated Audio Controller' described in Data Book 912-3000-035 Revision: 2.1 published on Aug. 1, 1997, which are all incorporated herein in their entirety for all purposes as if fully set forth herein. Similarly, a music synthesizer may be based on YMF721 OPL4-ML2 FM+Wavetable Synthesizer LSI available from Yamaha Corporation described in YMF721 Catalog No. LSI-4MF721A20, which is incorporated in its entirety for all purposes as if fully set forth herein.

The actuator 501 may be used to generate an electric or magnetic field. An electromagnetic coil (sometimes referred to simply as a "coil") is formed when a conductor (usually an insulated solid copper wire) is wound around a core or form, to create an inductor or electromagnet. One loop of wire is usually referred to as a turn, and a coil consists of one or more turns. Coils are often coated with varnish or wrapped with insulating tape to provide additional insulation and secure them in place. A completed coil assembly with taps is often called a winding. An electromagnet is a type of magnet in which the magnetic field is produced by the flow of electric current, and disappears when the current is turned off. A simple electromagnet consisting of a coil of insulated wire wrapped around an iron core. The strength of the magnetic field generated is proportional to the amount of current.

An actuator may be a display for presentation of visual data or information, commonly on a screen. A display is typically consists of an array of light emitters (typically in a matrix form), and commonly provides a visual depiction of a single, integrated, or organized set of information, such as text, graphics, image or video. A display may be a monochrome (a.k.a. black-and-white) type, which typically displays two colors, one for the background and one for the foreground. Old computer monitor displays commonly use black and white, green and black, or amber and black. A display may be a gray-scale type, which is capable of displaying different shades of gray, or may be a color type, capable of displaying multiple colors, anywhere from 16 to over many millions different colors, and may be based on Red, Green, and Blue (RGB) separate signals. A video display is designed for presenting video content. The screen is the actual location where the information is actually optically visualized by humans. The screen may be an integral part of the display. Alternatively or in addition, the display may be an image or video projector, that projects an image (or a video consisting of moving images) onto a screen surface, which is a separate component and is not mechanically enclosed with the display housing. Most projectors create an image by shining a light through a small transparent image, but some newer types of projectors can project the image directly, by using lasers. A projector may be based on an Eidophor, Liquid Crystal on Silicon (LCoS or LCOS), or LCD, or may use Digital Light Processing (DLP™) technology, and may further be MEMS based. A virtual retinal display, or retinal projector, is a projector that projects an image directly on the retina instead of using an external projection screen. Common display resolutions used today include SVGA (800×600 pixels), XGA (1024×768 pixels), 720p (1280×720 pixels), and 1080p (1920×1080 pixels). Standard-Definition (SD) standards, such as used in SD Television (SDTV), are referred to as 576i, derived from the European-developed PAL and SECAM systems with 576 interlaced lines of resolution; and 480i, based on the American National Television System Committee (ANTSC) NTSC system. High-Definition (HD) video refers to any video system of higher resolution than standard-definition (SD) video, and most commonly involves display resolutions of 1,280×720 pixels (720p) or 1,920×1,080 pixels (1080i/1080p). A display may be a 3D (3-Dimensions) display, which is the display device capable of conveying a stereoscopic perception of 3-D depth to the viewer. The basic technique is to present offset images that are displayed separately to the left and right eye. Both of these 2-D offset images are then combined in the brain to give the perception of 3-D depth. The display may present the information as scrolling, static, bold or flashing.

The display may be an analog display having an analog signal input. Analog displays are commonly using interfaces such as composite video such as NTSC, PAL or SECAM formats. Similarly, analog RGB, VGA (Video Graphics Array), SVGA (Super Video Graphics Array), SCART, S-video and other standard analog interfaces can be used. Alternatively or in addition, a display may be a digital display, having a digital input interface. Standard digital interfaces such as an IEEE1394 interface (a.k.a. FireWire™), may be used. Other digital interfaces that can be used are USB, SDI (Serial Digital Interface), HDMI (High-Definition Multimedia Interface), DVI (Digital Visual Interface), UDI (Unified Display Interface), DisplayPort, Digital Component Video and DVB (Digital Video Broadcast). In some cases, an adaptor is required in order to connect an analog display to the digital data. For example, the adaptor may convert between composite video (PAL, NTSC) or S-Video and DVI or HDTV signal. Various user controls can be available to allow the user to control and effect the display operations, such as an on/off switch, a reset button and others. Other exemplary controls involve display-associated settings such as contrast, brightness and zoom.

A display may be a Cathode-Ray Tube (CRT) display, which is based on moving an electron beam back and forth across the back of the screen. Such a display commonly comprises a vacuum tube containing an electron gun (a source of electrons), and a fluorescent screen used to view images. It further has a means to accelerate and deflect the electron beam onto the fluorescent screen to create the images. Each time the beam makes a pass across the screen, it lights up phosphor dots on the inside of the glass tube, thereby illuminating the active portions of the screen. By drawing many such lines from the top to the bottom of the screen, it creates an entire image. A CRT display may be a shadow mask or an aperture grille type.

A display may be a Liquid Crystal Display (LCD) display, which utilize two sheets of polarizing material with a liquid crystal solution between them. An electric current passed through the liquid causes the crystals to align so that light cannot pass through them. Each crystal, therefore, is like a shutter, either allowing a backlit light to pass through or blocking the light. In monochrome LCD, images usually appear as blue or dark gray images on top of a grayish-white background. Color LCD displays commonly use passive matrix and Thin Film Transistor (TFT) (or active-matrix) for producing color. Recent passive-matrix displays are using new CSTN and DSTN technologies to produce sharp colors rivaling active-matrix displays.

Some LCD displays use Cold-Cathode Fluorescent Lamps (CCFLs) for backlight illumination. An LED-backlit LCD is a flat panel display that uses LED backlighting instead of the cold cathode fluorescent (CCFL) backlighting, allowing for a thinner panel, lower power consumption, better heat dissipation, a brighter display, and better contrast levels. Three forms of LED may be used: White edge-LEDs around the rim of the screen, using a special diffusion panel to spread the light evenly behind the screen (the most usual form currently), an array of LEDs arranged behind the screen whose brightness are not controlled individually, and a dynamic "local dimming" array of LEDs that are controlled individually or in clusters to achieve a modulated backlight light pattern. A Blue Phase Mode LCD is an LCD technology that uses highly twisted cholesteric phases in a blue phase, in order to improve the temporal response of liquid crystal displays (LCDs).

A Field Emission Display (FED) is a display technology that uses large-area field electron emission sources to provide the electrons that strike colored phosphor, to produce a color image as an electronic visual display. In a general sense, a FED consists of a matrix of cathode ray tubes, each tube producing a single sub-pixel, grouped in threes to form red-green-blue (RGB) pixels. FEDs combine the advantages of CRTs, namely their high contrast levels and very fast response times, with the packaging advantages of LCD and other flat panel technologies. They also offer the possibility of requiring less power, about half that of an LCD system. FED display operates like a conventional cathode ray tube (CRT) with an electron gun that uses high voltage (10 kV) to accelerate electrons, which in turn excite the phosphors, but instead of a single electron gun, a FED display contains a grid of individual nanoscopic electron guns. A FED screen is constructed by laying down a series of metal stripes onto a glass plate to form a series of cathode lines.

A display may be an Organic Light-Emitting Diode (OLED) display, a display device that sandwiches carbon-based films between two charged electrodes, one a metallic cathode and one a transparent anode, usually being glass. The organic films consist of a hole-injection layer, a hole-transport layer, an emissive layer and an electron-transport layer. When voltage is applied to the OLED cell, the injected positive and negative charges recombine in the emissive layer and create electro luminescent light. Unlike LCDs, which require backlighting, OLED displays are emissive devices—they emit light rather than modulate transmitted or reflected light. There are two main families of OLEDs: those based on small molecules and those employing polymers. Adding mobile ions to an OLED creates a light-emitting electrochemical cell or LEC, which has a slightly different mode of operation. OLED displays can use either Passive-Matrix (PMOLED) or active-matrix addressing schemes. Active-Matrix OLEDs (AMOLED) require a thin-film transistor backplane to switch each individual pixel on or off, but allow for higher resolution and larger display sizes.

A display may be an Electroluminescent Displays (ELDs) type, which is a flat panel display created by sandwiching a layer of electroluminescent material such as GaAs between two layers of conductors. When current flows, the layer of material emits radiation in the form of visible light. Electroluminescence (EL) is an optical and electrical phenomenon where a material emits light in response to an electric current passed through it, or to a strong electric field.

A display may be based on an Electronic Paper Display (EPD) (a.k.a. e-paper and electronic ink) display technology which is designed to mimic the appearance of ordinary ink on paper. Unlike conventional backlit flat panel displays that emit light, electronic paper displays reflect light like ordinary paper. Many of the technologies can hold static text and images indefinitely without using electricity, while allowing images to be changed later. Flexible electronic paper uses plastic substrates and plastic electronics for the display backplane.

An EPD may be based on Gyricon technology, using polyethylene spheres between 75 and 106 micrometers across. Each sphere is a janus particle composed of negatively charged black plastic on one side and positively charged white plastic on the other (each bead is thus a dipole). The spheres are embedded in a transparent silicone sheet, with each sphere suspended in a bubble of oil so that they can rotate freely. The polarity of the voltage applied to each pair of electrodes then determines whether the white or black side is face-up, thus giving the pixel a white or black appearance. Alternatively or in addition, an EPD may be based on an electrophoretic display, where titanium dioxide (Titania) particles approximately one micrometer in diameter are dispersed in hydrocarbon oil. A dark-colored dye is also added to the oil, along with surfactants and charging agents that cause the particles to take on an electric charge. This mixture is placed between two parallel, conductive plates separated by a gap of 10 to 100 micrometers. When a voltage is applied across the two plates, the particles will migrate electrophoretically to the plate bearing the opposite charge from that on the particles.

Further, an EPD may be based on Electro-Wetting Display (EWD), which is based on controlling the shape of a confined water/oil interface by an applied voltage. With no voltage applied, the (colored) oil forms a flat film between the water and a hydrophobic (water-repellent) insulating coating of an electrode, resulting in a colored pixel. When a voltage is applied between the electrode and the water, it changes the interfacial tension between the water and the coating. As a result, the stacked state is no longer stable, causing the water to move the oil aside. Electrofluidic displays are a variation of an electrowetting display, involving the placing of aqueous pigment dispersion inside a tiny reservoir. Voltage is used to electromechanically pull the pigment out of the reservoir and spread it as a film directly behind the viewing substrate. As a result, the display takes on color and brightness similar to that of conventional pigments printed on paper. When voltage is removed, liquid surface tension causes the pigment dispersion to rapidly recoil into the reservoir.

A display may be a Vacuum Fluorescent Display (VFD) that emits a very bright light with high contrast and can support display elements of various colors. VFDs can display seven-segment numerals, multi-segment alphanumeric characters or can be made in a dot-matrix to display different alphanumeric characters and symbols.

A display may be a laser video display or a laser video projector. A Laser display requires lasers in three distinct wavelengths—red, green, and blue. Frequency doubling can be used to provide the green wavelengths, and a small semiconductor laser such as Vertical-External-Cavity Surface-Emitting-Laser (VECSEL) or a Vertical-Cavity Surface-Emitting Laser (VCSEL) may be used. Several types of lasers can be used as the frequency doubled sources: fiber lasers, inter cavity doubled lasers, external cavity doubled lasers, eVCSELs, and OPSLs (Optically Pumped Semiconductor Lasers). Among the inter-cavity doubled lasers, VCSELs have shown much promise and potential to be the basis for a mass produced frequency doubled laser. A VECSEL is a vertical cavity, and is composed of two mirrors. On top of one of them is a diode as the active medium. These lasers combine high overall efficiency with good beam quality. The light from the high power IR-laser diodes is converted into visible light by means of extra-cavity waveguided second harmonic generation. Laser-pulses with about 10 KHz repetition rate and various lengths are sent to a Digital Micromirror Device where each mirror directs the pulse either onto the screen or into the dump.

A display may be a segment display, such as a numerical or an alphanumerical display that can show only digits or alphanumeric characters, commonly composed of several segments that switch on and off to give the appearance of desired glyph, The segments are usually single LEDs or liquid crystals, and may further display visual display material beyond words and characters, such as arrows, symbols, ASCII and non-ASCII characters. Non-limiting examples are Seven-segment display (digits only), Fourteen-segment display, and Sixteen-segment display. A display may be a dot matrix display, used to display information on machines, clocks, railway departure indicators and many other devices requiring a simple display device of limited resolution. The display consists of a matrix of lights or mechanical indicators arranged in a rectangular configuration (other shapes are also possible, although not common) such that by switching on or off selected lights, text or graphics can be displayed. A dot matrix controller converts instructions from a processor into signals which turns on or off the lights in the matrix so that the required display is produced.

In one non-limiting example, the display is a video display used to play a stored digital video, or an image display used to present stored digital images, such as photos. The digital video (or image) content can be stored in the display, the actuator unit, the router, the control server, or any combination thereof. Further, few video (or still image) files may be stored (e.g., representing different announcements or songs), selected by the control logic. Alternatively or in addition, the digital video data may be received by the display, the actuator unit, the router, the control server, or any combination thereof, from external sources via any one of the networks. Furthermore, the source of the digital video or image may be an image sensor (or video camera) serving as a sensor, either after processing, storing, delaying, or any other manipulation, or as originally received, resulting Closed-Circuit Television (CCTV) functionality between an image sensor or camera and a display in the building, which may be used for surveillance in areas that may need monitoring such as banks, casinos, airports, military installations, and convenience stores.

In one non-limiting example, an actuator unit further includes a signal generator coupled between the processor and the actuator. The signal generator may be used to control the actuator, for example, by providing an electrical signal affecting the actuator operation, such as changing the magnitude of the actuator affect or operation. Such a signal generator may be a digital signal generator, or may be an analog signal generator, having an analog electrical signal output. Analog signal generator may be a digital signal generator, which digital output is converted to analog signal using a digital to analog converter, as shown in actuator unit 60 shown in FIG. 6, where two D/A converters 62*a* and 62*b* are connected to the computer 63 outputs, and where the analog outputs are coupled to respectively control the actuators 61*a* and 61*b*. The signal generator may be based on software (or firmware) stored in the unit and executed by the computer 63, or may be a separated circuit or component connected between the computer 63 and the D/A converters 62*a* and 62*b*. In such an arrangement, the computer may be used to activate the signal generator, or to select a waveform or signal to be generated. In one non-limiting example, the signal generator serves as the actuator, for generating an electrical signal, such as voltage and current.

A signal generator (a.k.a. frequency generator) is an electronic device or circuit devices that can generate repeating or non-repeating electronic signals (typically voltage or current), having an analog output (analog signal generator) or a digital output (digital signal generator). The output signal may be based on an electrical circuit, or may be based on a generated or stored digital data. A function generator is typically a signal generator, which produces simple repetitive waveforms. Such devices contain an electronic oscillator, a circuit that is capable of creating a repetitive waveform, or may use digital signal processing to synthesize waveforms, followed by a digital to analog converter, or DAC, to produce an analog output. Common waveforms are a sine wave, a saw-tooth, a step (pulse), a square, and a triangular waveforms. The generator may include some sort of modulation functionality such as Amplitude Modulation (AM), Frequency Modulation (FM), or Phase Modulation (PM). An Arbitrary Waveform Generators (AWGs) are sophisticated signal generators which allow the user to generate arbitrary waveforms, within published limits of frequency range, accuracy, and output level. Unlike function generators, which are limited to a simple set of waveforms; an AWG allows the user to specify a source waveform in a variety of different ways. Logic signal generator (a.k.a. data pattern generator and digital pattern generator) is a digital signal generator that produces logic types of signals—that is logic 1's and 0's in the form of conventional voltage levels. The usual voltage standards are LVTTL and LVCMOS.

The actuator 501 may produce a physical, chemical, or biological action, stimulation or phenomenon, such as a changing or generating temperature, humidity, pressure, audio, vibration, light, motion, sound, proximity, flow rate, electrical voltage, and electrical current, in response to the electrical input (current or voltage). For example, an actuator may provide visual or audible signaling, or physical movement. An actuator may include motors, winches, fans, reciprocating elements, extending or retracting, and energy conversion elements, as well as a heater or a cooler The actuator 501 may be or may include a visual or audible signaling device, or any other device that indicates a status to the person. In one example, the device illuminates a visible light, such as a Light-Emitting-Diode (LED). However, any type of visible electric light emitter such as a flashlight, an incandescent lamp and compact fluorescent lamps can be used. Multiple light emitters may be used, and the illumination may be steady, blinking or flashing. Further, the illumination can be directed for lighting a surface, such as a surface including an image or a picture. Further, a single single-state visual indicator may be used to provide multiple indications, for example, by using different colors (of the same visual indicator), different intensity levels, variable duty-cycle and so forth.

In one example, the actuator 501 includes a solenoid, which is typically a coil wound into a packed helix, and used to convert electrical energy into a magnetic field. Commonly, an electromechanical solenoid is used to convert energy into linear motion. Such electromagnetic solenoid commonly consists of an electromagnetically inductive coil, wound around a movable steel or iron slug (the armature), and shaped such that the armature can be moved along the coil center. In one example, the actuator 501 may include a solenoid valve, used to actuate a pneumatic valve, where the air is routed to a pneumatic device, or a hydraulic valve, used to control the flow of a hydraulic fluid. In another example, the electromechanical solenoid is used to operate an electrical switch. Similarly, a rotary solenoid may be used, where the solenoid is used to rotate a ratcheting mechanism when power is applied.

In one example, the actuator 501 is used for effecting or changing magnetic or electrical quantities such as voltage, current, resistance, conductance, reactance, magnetic flux, electrical charge, magnetic field, electric field, electric power, S-matrix, power spectrum, inductance, capacitance, impedance, phase, noise (amplitude or phase), trans-conductance, trans-impedance, and frequency.

Any relay herein may be a Solid State Relay (SSR), where a solid-state based component functioning as a relay, without having any moving parts. In one example, the SSR may be controlled by an optocoupler, such as a CPC1965Y AC Solid State Relay, available from IXYS Integrated Circuits Division (Headquartered in Milpitas, California, U.S.A.) which is an AC Solid State Relay (SSR) using waveguide coupling with dual power SCR outputs to produce an alternative to optocoupler and Triac circuits. The switches are robust enough to provide a blocking voltage of up to 600VP, and are tightly controlled zero-cross circuitry ensures switching of AC loads without the generation of transients. The input and output circuits are optically coupled to provide 3750Vrms of isolation and noise immunity between control and load circuits. The CPC1965Y AC Solid State Relay is described in an IXYS Integrated Circuits Division specification DS-CPC1965Y-R07 entitled: "*CPC*1965*Y AC Solid State Relay*", which is incorporated in its entirety for all purposes as if fully set forth herein.

Any switch herein may be implemented using an electrical circuit or component. For example, an open collector (or open drain) based circuit may be used. Further, an opto-isolator (a.k.a. optocoupler, photocoupler, or optical isolator) may be used to provide isolated power transfer. Further, a thyristor such as a Triode for Alternating Current (TRIAC) may be used for triggering the power. In one example, a switch may be based on, or consists of, a TRIAC Part Number BTA06 available from SGS-Thomson Microelectronics is used, described in the data sheet "*BTA*06 *T/D/S/A BTB*06 *T/D/S/A—Sensitive Gate Triacs*" published by SGS-Thomson Microelectronics march 1995, which is incorporated in its entirety for all purposes as if fully set forth herein.

In addition, any switch unit herein may be based on a transistor. The transistor may be a Metal-Oxide-Semiconductor Field-Effect Transistor (MOSFET, MOS-FET, or MOS FET), commonly used for amplifying or switching electronic signals. The MOSFET transistor is a four-terminal component with source (S), gate (G), drain (D), and body (B) terminals, where the body (or substrate) of the MOSFET is often connected to the source terminal, making it a three-terminal component like other field-effect transistors. In an enhancement mode MOSFETs, a voltage drop across the oxide induces a conducting channel between the source and drain contacts via the field effect. The term "enhancement mode" refers to the increase of conductivity with an increase in oxide field that adds carriers to the channel, also referred to as the inversion layer. The channel can contain electrons (called an nMOSFET or nMOS), or holes (called a pMOSFET or pMOS), opposite in type to the substrate, so nMOS is made with a p-type substrate, and pMOS with an n-type substrate. In one example, a switch may be based on an N-channel enhancement mode standard level field-effect transistor that features very low on-state resistance. Such a transistor may be based on, or consists of, TrenchMOS transistor Part Number BUK7524-55 from Philips Semiconductors, described in the Product Specifications from Philips Semiconductors "*TrenchMOS™ transistor Standard level FET BUK*7524-55" Rev 1.000 dated January 1997, which is incorporated in its entirety for all purposes as if fully set forth herein.

The measurements herein may be quick, accurate, safe, reliable, versatile, and convenient. The devices, systems, and methods described may be used in the construction industry, by contractors, civil engineers, estimators, real-estate brokers, and dwellers. In particular, the devices, systems, and methods described herein may be used for measuring distance, area, volume, angle, or speed indoors, such as in various interior rooms distances, areas, and volumes, or outdoors, such as in sport (e.g., golf), hunting, automotive, or forestry. For example, a planes meter that measures distances in opposite directions may be used in a center of a room for measuring a distance between opposite walls of the room. The devices, systems, and methods described herein may be used in the transportation industry, such as for measuring altitude, pitch, or any other height related characteristics in aircrafts and other vehicles. Similarly, the devices, systems, and methods described may be used in land vehicles, such as for measuring distances, tilting, angles, and speeds of vehicles. For example, such a device may be located in a room interior to simply and conveniently measure the length of a transverse wall, the room area, the room volume, in a matter of seconds so that measurements of numerous interior wall lengths or rooms can be accomplished within a few seconds or minutes. The devices, systems, and methods described herein may allow for easy and accurate measurement of distances, angles, areas, volumes, or speeds, and may be used or operated automatically or by a single person. Further, the measurements may be quick, easy to use, versatile, and may require the use of one hand. Further, the requirement for accurate calibration or manual aiming may be obviated or relaxed. Further, a distance (such as height), an angle, an area, a volume, an angle, or a speed may be measured or estimated remotely or without contact, and where there is no direct line-of-sight to the measured object, being a point, line, surface, plane, or any object shape or structure.

The devices, systems, and methods described herein may be integrated with, or may be part of, surveying apparatuses such as theodolites or tachymeters, or observation apparatuses such as telescopes, monoculars, binoculars, or night vision apparatuses. Further, the devices, systems, and methods described herein may be employed in a vehicle to provide parking assistance, collision detection, auto-parking, or any other kind of obstruction avoidance capabilities.

The modules, devices, and systems described herein may be housed in a portable or hand-held enclosure. Alternatively or in addition, the modules, devices, and systems described herein may be housed in a surface mountable enclosure. Further, the enclosure may comprise, or may be attachable to, a bipod or tripod.

Any actuator herein may include one or more actuators, each affecting or generating a physical phenomenon in response to an electrical command, which can be an electrical signal (such as voltage or current), or by changing a characteristic (such as resistance or impedance) of a device. The actuators may be identical, similar or different from each other, and may affect or generate the same or different phenomena. Two or more actuators may be connected in series or in parallel. The actuator command signal may be conditioned by a signal conditioning circuit. The signal conditioner may involve time, frequency, or magnitude related manipulations. The signal conditioner may be linear or non-linear, and may include an amplifier, a voltage or current limiter, an attenuator, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog actuator, a digital to analog (D/A) converter may be used to convert the digital command data to analog signals for controlling the actuators.

The devices, systems, and methods described herein may be integrated with, or may be part of, a smartphone, or any device having wireless functionality, and such device may consist of, be part of, or include, a Personal Computer (PC), a desktop computer, a mobile computer, a laptop computer, a notebook computer, a tablet computer, a server computer, a handheld computer, a handheld device, a Personal Digital Assistant (PDA) device, or a cellular handset. Alternatively or in addition, such a device may consist of, be part of, or include, a handheld PDA device, an on-board device, an off-board device, a hybrid device, a vehicular device, a non-vehicular device, a mobile device, or a portable device. When integrated with a smartphone or any other wireless device, any part of, or whole of, any of the devices or systems described herein, or any part of, or whole of, any of the circuits of functionalities described herein, may be added to or integrated with the smartphone or the other wireless device, such as sharing the same enclosure, sharing the same power supply or power source (such as a battery), sharing the same user interface (such as a button, a display, or a touch-screen), or sharing the same processor.

AC/DC Power Supply. Any one of the apparatuses described herein, such as a meter, device, module, or system, may further house, such as in the same enclosure, a power supply such as an AC/DC or DC/DC power supply. Further, any one of the apparatuses or electronic circuits described herein, such as a meter, device, module, or system, may be powered from a power supply such as an AC/DC or DC/DC power supply. In one example, the power source 506*a* may comprise, or consists of, an AC/DC power supply. A power supply is an electronic device that supplies electric energy to an electrical load, where the primary function of a power supply is to convert one form of electrical energy to another and, as a result, power supplies are sometimes referred to as electric power converters. Some power supplies are discrete, stand-alone devices, whereas others are built into larger devices along with their loads. Examples of the latter include power supplies found in desktop computers and consumer electronics devices. Every power supply must obtain the energy it supplies to its load, as well as any energy it consumes while performing that task, from an energy source. Depending on its design, a power supply may obtain energy from various types of energy sources, including electrical energy transmission systems, energy storage devices such as a batteries and fuel cells, electromechanical systems such as generators and alternators, solar power converters, or another power supply. All power supplies have a power input, which receives energy from the energy source, and a power output that delivers energy to the load. In most power supplies, the power input and the power output consist of electrical connectors or hardwired circuit connections, though some power supplies employ wireless energy transfer in lieu of galvanic connections for the power input or output.

Some power supplies have other types of inputs and outputs as well, for functions such as external monitoring and control. Power supplies are categorized in various ways, including by functional features. For example, a regulated power supply is one that maintains constant output voltage or current despite variations in load current or input voltage. Conversely, the output of an unregulated power supply can change significantly when its input voltage or load current changes. Adjustable power supplies allow the output voltage or current to be programmed by mechanical controls (e.g., knobs on the power supply front panel), or by means of a control input, or both. An adjustable regulated power supply is one that is both adjustable and regulated. An isolated power supply has a power output that is electrically independent of its power input; this is in contrast to other power supplies that share a common connection between power input and output.

AC-to-DC (AC/DC) power supply uses AC mains electricity as an energy source, and typically employs a transformer to convert the input voltage to a higher, or commonly lower AC voltage. A rectifier is used to convert the transformer output voltage to a varying DC voltage, which in turn is passed through an electronic filter to convert it to an unregulated DC voltage. The filter removes most, but not all of the AC voltage variations; the remaining voltage variations are known as a ripple. The electric load tolerance of ripple dictates the minimum amount of filtering that must be provided by a power supply. In some applications, high ripple is tolerated and therefore no filtering is required. For example, in some battery charging applications, it is possible to implement a mains-powered DC power supply with nothing more than a transformer and a single rectifier diode, with a resistor in series with the output to limit charging current.

The function of a linear voltage regulator is to convert a varying AC or DC voltage to a constant, often specific, lower DC voltage. In addition, they often provide a current limiting function to protect the power supply and load from overcurrent (excessive, potentially destructive current). A constant output voltage is required in many power supply applications, but the voltage provided by many energy sources will vary with changes in load impedance. Furthermore, when an unregulated DC power supply is the energy source, its output voltage will also vary with changing input voltage. To circumvent this, some power supplies use a linear voltage regulator to maintain the output voltage at a steady value, independent of fluctuations in input voltage and load impedance. Linear regulators can also reduce the magnitude of ripple and noise present appearing on the output voltage.

In a Switched-Mode Power Supply (SMPS), the AC mains input is directly rectified and then filtered to obtain a DC voltage, which is then switched "on" and "off" at a high frequency by electronic switching circuitry, thus producing an AC current that will pass through a high-frequency transformer or inductor. Switching occurs at a very high frequency (typically 10 kHz-1 MHz), thereby enabling the use of transformers and filter capacitors that are much smaller, lighter, and less expensive than those found in linear power supplies operating at mains frequency. After the inductor or transformer secondary, the high frequency AC is rectified and filtered to produce the DC output voltage. If the SMPS uses an adequately insulated high-frequency transformer, the output will be electrically isolated from the mains; this feature is often essential for safety. Switched-mode power supplies are usually regulated, and to keep the output voltage constant, the power supply employs a feedback controller that monitors current drawn by the load. SMPSs often include safety features such as current limiting or a crowbar circuit to help protect the device and the user from harm. In the event that an abnormally high-current power draw is detected, the switched-mode supply can assume this is a direct short and will shut itself down before damage is done. PC power supplies often provide a power good signal to the motherboard; the absence of this signal prevents operation when abnormal supply voltages are present.

Power supplies are described in Agilent Technologies Application Note 90B dated Oct. 1, 2000 (5925-4020) entitled: "*DC Power Supply Handbook*" and in Application Note 1554 dated Feb. 4, 2005 (5989-2291EN) entitled: "*Understanding Linear Power Supply Operation*", and in On Semiconductor® Reference Manual Rev. 4 dated April 2014 (SMPSRM/D) entitled: "*Switch-Mode Power Supply*", which are all incorporated in their entirety for all purposes as if fully set forth herein.

Battery. Any one of the apparatuses described herein, such as a meter, device, module, or system, may further house, such as in the same enclosure, a battery. Further, any one of the apparatuses or electronic circuits described herein, such as a meter, device, module, or system, may be powered from a battery. In one example, the power source 506 may comprise, or consists of, a battery. A battery may be a primary battery or cell, in which an irreversible chemical reaction generates the electricity, and thus the cell is disposable and cannot be recharged, and need to be replaced after the battery is drained. Such battery replacement may be expensive and cumbersome. Alternatively or in addition, a rechargeable (secondary) battery may be used, such as a nickel-cadmium based battery. In such a case, a battery charger is employed for charging the battery while it is in use or not in use. Various types of such battery chargers are known in the art, such as trickle chargers, pulse chargers and the like. The battery charger may be integrated with the field unit or be external to it. The battery may be a primary or a rechargeable (secondary) type, may include a single or few batteries, and may use various chemicals for the electro-chemical cells, such as lithium, alkaline and nickel-cadmium. Common batteries are manufactured in pre-defined standard output voltages (1.5, 3, 4.5, 9 Volts, for example), as well as defined standard mechanical enclosures (usually defined by letters such as "A", "AA", "B", "C" sizes), and 'coin' or 'button' type. In one embodiment, the battery (or batteries) is held in a battery holder or compartment, and thus can be easily replaced.

A battery may be a 'watch battery' (a.k.a. 'coin cell' or 'button cell'), which is a small single cell battery shaped as a squat cylinder typically 5 to 25 mm in diameter and 1 to 6 mm high. Button cells are typically used to power small portable electronics devices such as wrist watches, pocket calculators, artificial cardiac pacemakers, implantable cardiac defibrillators, and hearing aids. Most button cells have low self-discharge and hold their charge for a long time if not used. Higher-power devices such as hearing aids may use zinc-air cells that have much higher capacity for a given size, but discharge over a few weeks even if not used. Button cells are single cells, usually disposable primary cells. Common anode materials are zinc or lithium, and common cathode materials are manganese dioxide, silver oxide, carbon monofluoride, cupric oxide or oxygen from the air. A metal can forms the bottom body and positive terminal of the cell, where the insulated top cap is the negative terminal.

An example of a 'coin cell' is designated by the International Electrotechnical Commission (IEC) in the IEC 60086-3 standard (Primary batteries, part 3 Watch batteries) as LR44 type, which is an alkaline 1.5 volt button cell. The letter 'L' indicates the electrochemical system used: a zinc negative electrode, manganese dioxide depolarizer and positive electrode, and an alkaline electrolyte. R44 indicates a round cell 11.4±0.2 mm diameter and 5.2±0.2 mm height as defined by the IEC standard 60086. An example of LR44 type battery is Energizer A76 battery, available from Energizer Holdings, Inc., and described in a product datasheet Form No. EBC—4407cp-Z (downloaded from the Internet 3/2016) entitled: "*Energizer A76 —ZEROMERCURY Miniature Alkaline*", which is incorporated in its entirety for all purposes as if fully set forth herein. Another example of a 'coin cell' is a CR2032 battery, which is a button cell lithium battery rated at 3.0 volts. Nominal diameter is 20 mm (millimeters); nominal height is 3.2 mm. CR2032 indicates a round cell 19.7-20 mm diameter and 2.9-3.2 mm height as defined by the IEC standard 60086. The battery weight typically ranges from 2.8 g to 3.9 g. The BR2032 battery has the same dimensions, a slightly lower nominal voltage and capacity, and an extended temperature range compared with the CR2032. It is rated for a temperature range of −30° C. to 85° C., while the CR2032 is specified over the range −20° C. to 70° C. BR2032 also has a much lower self-discharge rate. An example of CR2032 type battery is Energizer CR2032 Lithium Coin battery, available from Energizer Holdings, Inc., and described in a product datasheet Form No. EBC—4120M (downloaded from the Internet 3/2016) entitled: "*Energizer CR2032 —Lithium Coin*", which is incorporated in its entirety for all purposes as if fully set forth herein.

Timing information may use timers that may be implemented as a monostable circuit, producing a pulse of set length when triggered. In one example, the timers are based on RC based popular timers such as 555 and 556, such as ICM7555 available from Maxim Integrated Products, Inc. of Sunnyvale, California, U.S.A., described in the data sheet "*General Purpose Timers*" publication number 19-0481 Rev.2 11/92, which is incorporated in its entirety for all purposes as if fully set forth herein. Examples of general timing diagrams as well as monostable circuits are described in Application Note AN170 "*NE555 and NE556 Applications*" from Philips semiconductors dated 12/1988, which is incorporated in its entirety for all purposes as if fully set forth herein. Alternatively, a passive or active delay line may be used. Further, a processor based delay line can be used, wherein the delay is set by its firmware.

Any one of the apparatuses described herein, such as a meter, device, module, or system, may be integrated or communicating with, or connected to, the vehicle self-diagnostics and reporting capability, commonly referred to as On-Board Diagnostics (OBD), to a Malfunction Indicator Light (MIL), or to any other vehicle network, sensors, or actuators that may provide the vehicle owner or a repair technician access to health or state information of the various vehicle sub-systems and to the various computers in the vehicle. Common OBD systems, such as the OBD-II and the EOBD (European On-Board Diagnostics), employ a diagnostic connector, allowing for access to a list of vehicle parameters, commonly including Diagnostic Trouble Codes (DTCs) and Parameters IDentification numbers (PIDs). The OBD-II is described in the presentation entitled: "*Introduction to On Board Diagnostics (II)*" downloaded on 11/2012 from: http://groups.engin.umd.umich.edu/vi/w2_workshops/OBD_ganesan_w2.pdf, which is incorporated in its entirety for all purposes as if fully set forth herein. The diagnostic connector commonly includes pins that provide power for the scan tool from the vehicle battery, thus eliminating the need to connect a scan tool to a power source separately. The status and faults of the various sub-systems accessed via the diagnostic connector may include fuel and air metering, ignition system, misfire, auxiliary emission control, vehicle speed and idle control, transmission, and the on-board computer. The diagnostics system may provide access and information about the fuel level, relative throttle position, ambient air temperature, accelerator pedal position, air flow rate, fuel type, oxygen level, fuel rail pressure, engine oil temperature, fuel injection timing, engine torque, engine coolant temperature, intake air temperature, exhaust gas temperature, fuel pressure, injection pressure, turbocharger pressure, boost pressure, exhaust pressure, exhaust gas temperature, engine run time, NOx sensor, manifold surface temperature, and the Vehicle Identification Number (VIN). The OBD-II specifications defines the interface and the physical diagnostic connector to be according to the Society of Automotive Engineers (SAE) J1962 standard, the protocol may use SAE J1850 and may be based on, or may be compatible with, SAE J1939 Surface Vehicle Recommended Practice entitled: "*Recommended Practice for a Serial Control and Communication Vehicle Network*" or SAE J1939-01 Surface Vehicle Standard entitled: "*Recommended Practice for Control and Communication Network for On-Highway Equipment*", and the PIDs are defined in SAE International Surface Vehicle Standard J1979 entitled: "*E/E Diagnostic Test Modes*", which are all incorporated in their entirety for all purposes as if fully set forth herein. Vehicle diagnostics systems are also described in the International Organization for Standardization (ISO) 9141 standard entitled: "*Road vehicles—Diagnostic systems*", and the ISO 15765 standard entitled: "*Road vehicles—Diagnostics on Controller Area Networks* (*CAN*)", which are all incorporated in their entirety for all purposes as if fully set forth herein.

The physical layer of the in-vehicle network may be based on, compatible with, or according to, J1939-11 Surface Vehicle Recommended Practice entitled: "*Physical Layer,* 250*K bits/s, Twisted Shielded Pair*" or J1939-15 Surface Vehicle Recommended Practice entitled: "*Reduced Physical Layer,* 250*K bits/s, Un-Shielded Twisted Pair* (*UTP*)", the data link may be based on, compatible with, or according to, J1939-21 Surface Vehicle Recommended Practice entitled: "*Data Link Layer*", the network layer may be based on, compatible with, or according to, J1939-31 Surface Vehicle Recommended Practice entitled: "*Network Layer*", the network management may be based on, compatible with, or according to, J1939-81 Surface Vehicle Recommended Practice entitled: "*Network Management*", and the application layer may be based on, compatible with, or according to, J1939-71 Surface Vehicle Recommended Practice entitled: "*Vehicle Application Layer* (*through December* 2004)", J1939-73 Surface Vehicle Recommended Practice entitled: "*Application Layer—Diagnostics*", J1939-74 Surface Vehicle Recommended Practice entitled: "*Application—Configurable Messaging*", or J1939-75 Surface Vehicle Recommended Practice entitled: "*Application Layer—Generator Sets and Industrial*", which are all incorporated in their entirety for all purposes as if fully set forth herein.

Any device herein may serve as a client device in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat)), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers may equally function as a server in the meaning of client/server architecture. Any one of the servers herein may be a web server using Hyper Text Transfer Protocol (HTTP) that responds to HTTP requests via the Internet, and any request herein may be an HTTP request.

Examples of web browsers include Microsoft Internet Explorer (available from Microsoft Corporation, headquartered in Redmond, Washington, U.S.A.), Google Chrome that is a freeware web browser (developed by Google, headquartered in Googleplex, Mountain View, California, U.S.A.), Opera™ (developed by Opera Software ASA, headquartered in Oslo, Norway), and Mozilla Firefox® (developed by Mozilla Corporation headquartered in Mountain View, California, U.S.A.). The web-browser may be a mobile browser, such as Safari (developed by Apple Inc. headquartered in Apple Campus, Cupertino, California, U.S.A), Opera Mini™ (developed by Opera Software ASA, headquartered in Oslo, Norway), and Android web browser.

Any one of the apparatuses described herein, such as a meter, device, module, or system, may further house, such as in the same enclosure, an appliance. Alternatively or in addition, any apparatus or functionality herein, such as a meter, device, module, or system, may be integrated with part or an entire appliance. The appliance primary function may be associated with food storage, handling, or preparation, such as microwave oven, an electric mixer, a stove, an oven, or an induction cooker for heating food, or the appliance may be a refrigerator, a freezer, a food processor, a dishwashers, a food blender, a beverage maker, a coffeemaker, or an iced-tea maker. The appliance primary function may be associated with environmental control such as temperature control, and the appliance may consist of, or may be part of, an HVAC system, an air conditioner or a heater. The appliance primary function may be associated with cleaning, such as a washing machine, a clothes dryer for cleaning clothes, or a vacuum cleaner. The appliance primary function may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

Any apparatus herein, which may be any of the systems, devices, modules, or functionalities described herein, may be integrated with a digital camera (still or video). The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the digital camera. In one example, a measured or calculated value by any of the systems, devices, modules, or functionalities described herein, is output to the digital camera device or functionality to be used therein. Alternatively or in addition, any of the systems, devices, modules, or functionalities described herein is used as a sensor for the digital camera device or functionality.

Any apparatus herein, which may be any of the systems, devices, modules, or functionalities described herein, may be integrated with a smartphone. The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the smartphone. In one example, a measured or calculated value by any of the systems, devices, modules, or functionalities described herein, is output to the smartphone device or functionality to be used therein. Alternatively or in addition, any of the systems, devices, modules, or functionalities described herein is used as a sensor for the smartphone device or functionality.

SLR. Satellite Laser Ranging (SLR) a global network of observation stations measures the round trip time of flight of ultrashort pulses of light to satellites equipped with retroreflectors. This provides instantaneous range measurements of millimeter level precision, which can be accumulated to provide accurate measurement of orbits and a host of important scientific data. Satellite laser ranging is a proven geodetic technique with significant potential for important contributions to scientific studies of the earth/atmosphere/ocean system. It is the most accurate technique currently available to determine the geocentric position of an Earth satellite, allowing for the precise calibration of radar altimeters and separation of long-term instrumentation drift from secular changes in ocean topography. Its ability to measure the variations over time in Earth's gravity field and to monitor motion of the station network with respect to the geocenter, together with the capability to monitor vertical motion in an absolute system, makes it unique for modeling and evaluating long-term climate change by providing a reference system for post-glacial rebound, sea level and ice volume change, determining the temporal mass redistribution of the solid earth, ocean, and atmosphere system, and monitoring the response of the atmosphere to seasonal variations in solar heating. SLR may be used for satellite orbit determination or tracking, solid-earth physics studies, polar motion and length of dav determinations, precise geodetic positioning over long ranges and monitoring of crustal motion.

SLR provides a unique capability for verification of the predictions of the theory of general relativity, such as the frame-dragging effect. SLR stations form an important part of the international network of space geodetic observatories, which include VLBI, GPS, DORIS and PRARE systems. On several critical missions, SLR has provided failsafe redundancy when other radiometric tracking systems have failed. SLR data has provided the standard, highly accurate, long wavelength gravity field reference model, which supports all precision orbit determination and provides the basis for studying temporal gravitational variations due to mass redistribution. The height of the geoid has been determined to less than ten centimeters at long wavelengths less than 1500 km. SLR provides mm/year accurate determinations of tectonic drift station motion on a global scale in a geocentric reference frame. Combined with gravity models and decadal changes in Earth rotation, these results contribute to modeling of convection in the Earth's mantle by providing constraints on related Earth interior processes. The velocity of the fiducial station in Hawaii is 70 mm/year and closely matches the rate of the background geophysical model.

Any apparatus herein, which may be any of the systems, devices, modules, or functionalities described herein, may be integrated with SLR apparatus, or used for SLR.

LLR. Lunar Laser Ranging (LLR) experiment measures the distance between Earth and the Moon using laser ranging. Lasers on Earth are aimed at retroreflectors planted on the Moon during the Apollo program (11, 14, and 15) and the two Lunokhod missions. The time for the reflected light to return is measured. In actuality, the round-trip time of about 2.5 seconds is affected by the location of the Moon in the sky, the relative motion of Earth and the Moon, Earth's rotation, lunar libration, weather, polar motion, propagation delay through Earth's atmosphere, the motion of the observing station due to crustal motion and tides, velocity of light in various parts of air and relativistic effects. Nonetheless, the Earth-Moon distance has been measured with increasing accuracy for more than 35 years. The distance continually changes for a number of reasons, but averages 385,000.6 km (239,228.3 mi). LLR may be used for measuring or determination of the moon's shape, structure, and orbit.

Any apparatus herein, which may be any of the systems, devices, modules, or functionalities described herein, may be integrated with LLR apparatus, or used for LLR.

Any apparatus herein, which may be any of the systems, devices, modules, or functionalities described herein, may be integrated with military apparatus, or used for military purposes, and may be binocular-shaped for handheld use, tripod-based or attached to sighting periscopes of vehicles.

Laser Airborne Depth Sounder (LADS) is an aircraft-based hydrographic surveying system used by the Australian Hydrographic Service (AHS). The system uses the difference between the sea surface and the sea floor as calculated from the aircraft's altitude to generate hydrographic data. LADS may be used to measure water depths from 2 to 30 meters for charting purposes on the continental shelf.

Any apparatus herein, which may be any of the systems, devices, modules, or functionalities described herein, may be integrated with, or used for, Laser Airborne Depth Sounder (LADS).

Any apparatus herein, which may be any of the systems, devices, modules, or functionalities described herein, may be integrated with Airborne Laser Terrain Profiler system, or used for Airborne Laser Terrain Profiling. Typical Airborne Laser Terrain Profiler (such as Helicopter-mounted systems) are used for the determination of longitudinal profiles in the design of roads and transmission lines, typically in connection with inertial surveying systems. The system may allow for mapping terrain as well as ground cover heights.

DME. Distance Measuring Equipment (DME) is a transponder-based radio navigation technology that measures slant range distance by timing the propagation delay of VHF or UHF radio signals. DME is similar to secondary radar, except in reverse, and is typically part of a short-range navigation system for aircraft. Aircraft use DME to determine their distance from a land-based transponder by sending and receiving pulse pairs—two pulses of fixed duration and separation. Together with VHF Omni-Range beacons (VOR), it provides bearing and distance (rho-theta) information. The ground stations are typically collocated with VORs. A typical DME ground transponder system for enroute or terminal navigation will have a 1 kW peak pulse output on the assigned UHF channel. A low-power DME can be collocated with an ILS glide slope antenna installation where it provides an accurate distance to touchdown function, similar to that otherwise provided by ILS marker beacons.

A radio signal takes approximately 12.36 microseconds to travel 1 nautical mile (1,852 m) to the target and back—also referred to as a radar-mile. The time difference between interrogation and reply, minus the 50 microsecond ground transponder delay, is measured by the interrogator's timing circuitry and converted to a distance measurement (slant range), in nautical miles, then displayed on the cockpit DME display. The distance formula, distance=rate*time, is used by the DME receiver to calculate its distance from the DME ground station. The rate in the calculation is the velocity of the radio pulse, which is the speed of light (roughly 300,000,000 m/s or 186,000 mi/s). The time in the calculation is (total time—50 μs)/2. A typical DME transponder can provide distance information to 100 to 200 aircraft at a time. Above this limit, the transponder avoids overload by limiting the sensitivity of the receiver. Replies to weaker more distant interrogations are ignored to lower the transponder load.

Any apparatus herein, which may be any of the systems, devices, modules, or functionalities described herein, may be integrated with, or used for, Distance Measuring Equipment (DME).

Any apparatus herein, which may be any of the systems, devices, modules, or functionalities described herein, may be integrated with, or used for, Satellite Radar Altimetry or Airborne Radar Altimetry, for measuring continuously the distance between satellites or aircrafts and the surface of the sea (or the ground). Such altimetry may be used for ocean geoid determinations and for detailed determinations of the sea surface topography.

LORAN. LOng RAnge Navigation for aircraft (LORAN), such as LORAN-C, is a hyperbolic radio navigation system that allows a receiver to determine its position by listening to low frequency radio signals transmitted by fixed land-based radio beacons. Loran-C combines two different techniques to provide a signal that was both long-range and highly accurate, traits that had formerly been at odds. Loran-C became one of the most common and widely used navigation systems for large areas of North America, Europe, Japan and the entire Atlantic and Pacific areas. The navigational method provided by LORAN is based on measuring the time difference between the receipt of signals from a pair of radio transmitters. A given constant time difference between the signals from the two stations can be represented by a hyperbolic Line Of Position (LOP).

If the positions of the two synchronized stations are known, then the position of the receiver can be determined as being somewhere on a particular hyperbolic curve where the time difference between the received signals is constant. In ideal conditions, this is proportionally equivalent to the difference of the distances from the receiver to each of the two stations. So a LORAN receiver that only receives two LORAN stations cannot fully fix its position—it only narrows it down to being somewhere on a curved line. Therefore, the receiver must receive and calculate the time difference between a second pair of stations. This allows to be calculated a second hyperbolic line on which the receiver is located. Where these two lines cross is the location of the receiver. In practice, one of the stations in the second pair also may be—and frequently is—in the first pair. This means signals must be received from at least three LORAN transmitters to pinpoint the receiver's location. By determining the intersection of the two hyperbolic curves identified by this method, a geographic fix can be determined.

In the case of LORAN, one station remains constant in each application of the principle, the primary, being paired up separately with two other secondary stations. Given two secondary stations, the time difference (TD) between the primary and first secondary identifies one curve, and the time difference between the primary and second secondary identifies another curve, the intersections of which will determine a geographic point in relation to the position of the three stations. These curves are referred to as TD lines. In practice, LORAN is implemented in integrated regional arrays, or chains, consisting of one primary station and at least two (but often more) secondary stations, with a uniform Group Repetition Interval (GRI) defined in microseconds. The amount of time before transmitting the next set of pulses is defined by the distance between the start of transmission of primary to the next start of transmission of primary signal. The secondary stations receive this pulse signal from the primary, then wait a preset number of milliseconds, known as the secondary coding delay, to transmit a response signal. In a given chain, each secondary's coding delay is different, allowing for separate identification of each secondary's signal. In practice, however, modern LORAN receivers do not rely on this for secondary identification.

Any apparatus herein, which may be any of the systems, devices, modules, or functionalities described herein, may be integrated with, or used for, LOng RAnge Navigation for aircraft (LORAN) such as LORAN-C.

LIDAR. Light Detection And Ranging—LIDAR—also known as Lidar, LiDAR or LADAR (sometimes Light Imaging, Detection, And Ranging), is a surveying technology that measures distance by illuminating a target with a laser light, and was originally created as a portmanteau of "light" and "radar". Lidar is popularly used as a technology to make high-resolution maps, with applications in geodesy, geomatics, archaeology, geography, geology, geomorphology, seismology, forestry, atmospheric physics, Airborne Laser Swath Mapping (ALSM) and laser altimetry, as well as laser scanning or 3D scanning, with terrestrial, airborne and mobile applications. Lidar typically uses ultraviolet, visible, or near infrared light to image objects. It can target a wide range of materials, including non-metallic objects, rocks, rain, chemical compounds, aerosols, clouds and even single molecules. A narrow laser-beam can map physical features with very high resolutions; for example, an aircraft can map terrain at 30 cm resolution or better. Wavelengths vary to suit the target: from about 10 micrometers to the UV (approximately 250 nm). Typically, light is reflected via backscattering. Different types of scattering are used for different LIDAR applications: most commonly Rayleigh scattering, Mie scattering, Raman scattering, and fluorescence. Based on different kinds of backscattering, the LIDAR can be accordingly called Rayleigh Lidar, Mie Lidar, Raman Lidar, Na/Fe/K Fluorescence Lidar, and so on. Suitable combinations of wavelengths can allow for remote mapping of atmospheric contents by identifying wavelength-dependent changes in the intensity of the returned signal. Lidar has a wide range of applications, which can be divided into airborne and terrestrial types. These different types of applications require scanners with varying specifications based on the data's purpose, the size of the area to be captured, the range of measurement desired, the cost of equipment, and more.

Airborne LIDAR (also airborne laser scanning) is when a laser scanner, while attached to a plane during flight, creates a 3D point cloud model of the landscape. This is currently the most detailed and accurate method of creating digital elevation models, replacing photogrammetry. One major advantage in comparison with photogrammetry is the ability to filter out vegetation from the point cloud model to create a digital surface model where areas covered by vegetation can be visualized, including rivers, paths, cultural heritage sites, etc. Within the category of airborne LIDAR, there is sometimes a distinction made between high-altitude and low-altitude applications, but the main difference is a reduction in both accuracy and point density of data acquired at higher altitudes. Airborne LIDAR may also be used to create bathymetric models in shallow water.

Drones are being used with laser scanners, as well as other remote sensors, as a more economical method to scan smaller areas. The possibility of drone remote sensing also eliminates any danger that crews of a manned aircraft may be subjected to in difficult terrain or remote areas.

Terrestrial applications of LIDAR (also terrestrial laser scanning) happen on the Earth's surface and can be both stationary or mobile. Stationary terrestrial scanning is most common as a survey method, for example in conventional topography, monitoring, cultural heritage documentation and forensics.[17] The 3D point clouds acquired from these types of scanners can be matched with digital images taken of the scanned area from the scanner's location to create realistic looking 3D models in a relatively short time when compared to other technologies. Each point in the point cloud is given the colour of the pixel from the image taken located at the same angle as the laser beam that created the point.

Mobile LIDAR (also mobile laser scanning) is when two or more scanners are attached to a moving vehicle to collect data along a path. These scanners are usually paired with other kinds of equipment, including GNSS receivers and IMUs. One example application is surveying streets, where power lines, exact bridge heights, bordering trees, etc. all need to be taken into account. Instead of collecting each of these measurements individually in the field with a tachymeter, a 3D model from a point cloud can be created where all of the measurements needed can be made, depending on the quality of the data collected. This eliminates the problem of forgetting to take a measurement, so long as the model is available, reliable and has an appropriate level of accuracy.

Autonomous vehicles use LIDAR for obstacle detection and avoidance to navigate safely through environments. Cost map or point cloud outputs from the LIDAR sensor provide the necessary data for robot software to determine where potential obstacles exist in the environment and where the robot is in relation to those potential obstacles. LIDAR sensors are commonly used in robotics or vehicle automation. The very first generations of automotive adaptive cruise control systems used only LIDAR sensors.

LIDAR technology is being used in robotics for the perception of the environment as well as object classification. The ability of LIDAR technology to provide three-dimensional elevation maps of the terrain, high precision distance to the ground, and approach velocity can enable safe landing of robotic and manned vehicles with a high degree of precision.

Airborne LIDAR sensors are used by companies in the remote sensing field. They can be used to create a DTM (Digital Terrain Model) or DEM (Digital Elevation Model); this is quite a common practice for larger areas as a plane can acquire 3-4 km wide swaths in a single flyover. Greater vertical accuracy of below 50 mm may be achieved with a lower flyover, even in forests, where it is able to give the height of the canopy as well as the ground elevation. Typically, a GNSS receiver configured over a georeferenced control point is needed to link the data in with the WGS (World Geodetic System).

LiDAR has been used in the railroad industry to generate asset health reports for asset management and by departments of transportation to assess their road conditions. LIDAR is used in Adaptive Cruise Control (ACC) systems for automobiles. Systems use a LIDAR device mounted on the front of the vehicle, such as the bumper, to monitor the distance between the vehicle and any vehicle in front of it. In the event the vehicle in front slows down or is too close, the ACC applies the brakes to slow the vehicle. When the road ahead is clear, the ACC allows the vehicle to accelerate to a speed preset by the driver.

Any apparatus herein, which may be any of the systems, devices, modules, or functionalities described herein, may be integrated with, or used for, Light Detection And Ranging (LIDAR), such as airborne, terrestrial, automotive, or mobile LIDAR.

A 'nominal' value herein refers to a designed, expected, or target value. In practice, a real or actual value is used, obtained, or exists, which varies within a tolerance from the nominal value, typically without significantly affecting functioning. Common tolerances are 20%, 15%, 10%, 5%, or 1% around the nominal value.

Discussions herein utilizing terms such as, for example, "processing," "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple" and variations of that word such as "coupling", "coupled", and "couplable", refers to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example, for allowing the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or a set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration, or any combination thereof.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

As used herein, the term "portable" herein refers to physically configured to be easily carried or moved by a person of ordinary strength using one or two hands, without the need for any special carriers.

Any mechanical attachment of joining two parts herein refers to attaching the parts with sufficient rigidity to prevent unwanted movement between the attached parts. Any type of fastening means may be used for the attachments, including chemical material such as an adhesive or a glue, or mechanical means such as screw or bolt. An adhesive (used interchangeably with glue, cement, mucilage, or paste) is any substance applied to one surface, or both surfaces, of two separate items that binds them together and resists their separation. Adhesive materials may be reactive and non-reactive adhesives, which refers to whether the adhesive chemically reacts in order to harden, and their raw stock may be of natural or synthetic origin.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

A non-limiting example of a processor may be 80186 or 80188 available from Intel Corporation located at Santa-Clara, California, USA. The 80186 and its detailed memory connections are described in the manual "80186/80188 *High-Integration* 16-*Bit Microprocessors*" by Intel Corporation, which is incorporated in its entirety for all purposes as if fully set forth herein. Other non-limiting example of a processor may be MC68360 available from Motorola Inc. located at Schaumburg, Illinois, USA. The MC68360 and its detailed memory connections are described in the manual "*MC*68360 *Quad Integrated Communications Controller—User's Manual*" by Motorola, Inc., which is incorporated in its entirety for all purposes as if fully set forth herein. While exampled above regarding an address bus having an 8-bit width, other widths of address buses are commonly used, such as the 16-bit, 32-bit and 64-bit. Similarly, while exampled above regarding a data bus having an 8-bit width, other widths of data buses are commonly used, such as 16-bit, 32-bit and 64-bit width. In one example, the processor consists of, comprises, or is part of, Tiva™ TM4C123GH6PM Microcontroller available from Texas Instruments Incorporated (Headquartered in Dallas, Texas, U.S.A.), described in a data sheet published 2015 by Texas Instruments Incorporated [DS-TM4C123GH6PM-15842.2741, SPMS376E, Revision 15842.2741 June 2014], entitled: "*Tiva™ TM*4*C*123*GH*6*PM Microcontroller—Data Sheet*", which is incorporated in its entirety for all purposes as if fully set forth herein, and is part of Texas Instrument's Tiva™ C Series microcontrollers family that provides designers a high-performance ARM® Cortex™-M-based architecture with a broad set of integration capabilities and a strong ecosystem of software and development tools. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions by integrating application-specific peripherals and providing a comprehensive library of software tools that minimize board costs and design-cycle time. Offering quicker time-to-market and cost savings, the Tiva™ C Series microcontrollers are the leading choice in high-performance 32-bit applications. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including, without limitation, applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs.

The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), the semiconductor dies, or other discrete components are packaged onto a unifying substrate, facilitating their use as a single component (as though a larger IC).

The term "computer-readable medium" (or "machine-readable medium") as used herein is an extensible term that refers to any non-transitory computer readable medium or any memory, that participates in providing instructions to a processor, (such as processor 71) for execution, or any mechanism for storing or transmitting information in a form readable by a machine (e.g., a computer). Such a medium may store computer-executable instructions to be executed by a processing element and/or software, and data that is manipulated by a processing element and/or software, and may take many forms, including but not limited to, non-volatile medium, volatile medium, and transmission medium. Transmission media includes coaxial cables, copper wire and fiber optics. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Any process descriptions or blocks in any logic flowchart herein should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Each of the methods or steps herein, may consist of, include, be part of, be integrated with, or be based on, a part of, or the whole of, the steps, functionalities, or structure (such as software) described in the publications that are incorporated in their entirety herein. Further, each of the components, devices, or elements herein may consist of, integrated with, include, be part of, or be based on, a part of, or the whole of, the components, systems, devices or elements described in the publications that are incorporated in their entirety herein.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for software compatibility with variants of Unix and other operating systems, such as POSIX.1-2008 that is simultaneously IEEE STD. 1003.1™—2008 entitled: "*Standard for Information Technology—Portable Operating System Interface* (*POSIX®*) *Description*", and The Open Group Technical Standard Base Specifications, Issue 7, IEEE STD. 1003.1™ 2013 Edition.

The term "computer" is used generically herein to describe any number of computers, including, but not limited to personal computers, embedded processing elements and systems, software, ASICs, chips, workstations, mainframes, etc. Any computer herein may consist of, or be part of, a handheld computer, including any portable computer that is small enough to be held and operated while holding in one hand or fit into a pocket. Such a device, also referred to as a mobile device, typically has a display screen with touch input and/or miniature keyboard. Non-limiting examples of such devices include a Digital Still Camera (DSC), a Digital video Camera (DVC or digital camcorder), a Personal Digital Assistant (PDA), and mobile phones and Smartphones. The mobile devices may combine video, audio and advanced communication capabilities, such as PAN and WLAN. A mobile phone (also known as a cellular phone, cell phone and a hand phone) is a device that can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices that are part of the above networks, one way and/or two-way radio communication systems, cellular radio-telephone communication systems, a cellular telephone, a wireless telephone, a Personal Communication Systems (PCS) device, a PDA device that incorporates a wireless communication device, a mobile or portable Global Positioning System (GPS) device, a device that incorporates a GPS receiver or transceiver or chip, a device that incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps, which perform a function. Such programs are not inherently related to any particular computer or other apparatus, and may be rendered in virtually any programming language or environment, including, for example, C/C++, Fortran, COBOL, PASCAL, Assembly language, markup languages (e.g., HTML, SGML, XML, VoXML), and the like, as well as object-oriented environments, such as the Common Object Request Broker Architecture (CORBA), Java™ (including J2ME, Java Beans, etc.) and the like, as well as in firmware or other implementations. Generally, program modules include routines, subroutines, procedures, definitional statements and macros, programs, objects, components, data structures, etc., that perform particular tasks or implement particular abstract data types. A compiler may be used to create an executable code, or a code may be written using interpreted languages such as PERL, Python, or Ruby.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value: the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

As used in this application, the term "about" or "approximately" refers to a range of values within plus or minus 10% of the specified number. As used in this application, the term "substantially" means that the actual value is within about 10% of the actual desired value, particularly within about 5% of the actual desired value and especially within about 1% of the actual desired value of any variable, element or limit set forth herein.

Any steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A vehicle operative to travel in a direction and operative for estimating a first angle ($\alpha$) between a reference line defined by first and second points and a first surface or a first object, for use with a wireless network, the vehicle comprising:

- a first distance meter for measuring a first distance (d1) along a first line from the first point to the first surface or the first object;
- a second distance meter for measuring a second distance (d2) along a second line from the second point to the first surface or the first object; and software and a processor for executing the software, the processor being coupled to receive representations of the first and second distances, respectively, from the first and second distance meters, wherein the first and second lines are substantially parallel to one another, and the vehicle is operative to calculate, by the processor, the estimated first angle (α) based on the first distance (d1) and the second distance (d2), and to display the estimated first angle (α) or a function thereof by a display, and wherein the meters are mounted so that the first and the second lines are substantially parallel or perpendicular to the travel direction, and wherein the vehicle is operative to send over the wireless network the representations of the first distance (d1) or any function thereof, the second distance (d2) or any function thereof, or the estimated first angle (α) or any function thereof, and wherein the vehicle is operative further operative to calculate, by the processor, a distance (d) and to send the calculated distance (d) or a function thereof to the wireless network by a wireless transceiver via an antenna, where d=(d1+d2)*cos(α)/2, d=(d1+d2) *sin(α)/2, d=(d1+d2) *cos2(α)/(2*sin(α)), or d=(d1+d2)/(2*tg(α)).

2. The vehicle according to claim 1, further comprising:

wherein the antenna is for transmitting and receiving first Radio-Frequency (RF) signals over the air; and wherein the wireless transceiver is coupled to the antenna for wirelessly transmitting and receiving first data over the air using the wireless network, the wireless transceiver being coupled to be controlled by the processor, wherein the vehicle is operative to send to the wireless network by the wireless transceiver via the antenna.

3. The vehicle according to claim 1, wherein the angle between the first and the second lines is less than 20°, 18°, 15°, 13°, 10°, 8°, 5°, 3°, 2°, 1°, 0.8°, 0.5°, 0.3°, 0.2°, or 0.1°.

4. The vehicle according to claim 1, wherein the first line or the second line is at least substantially perpendicular to the reference line.

5. The vehicle according to claim 4, wherein the angle formed between the first line or the second line and the reference line deviates from 90° by less than 20°, 18°, 15°, 13°, 10°, 8°, 5°, 3°, 2°, 1°, 0.8°, 0.5°, 0.3°, 0.2°, or 0.1°.

6. The vehicle according to claim 1, wherein the first and second lines are spaced a third distance (c) apart, and wherein the estimated first angle (α) is calculated, by the processor, using, or based on, α=(arctan(d2−d1)/c).

7. The vehicle according to claim 6, for use with a speed V, further operative to calculate or estimate a distance or an angle using, or based on, the calculated first angle α and the speed V.

8. The vehicle according to claim 7, wherein a time period Δt exists between the detection by the first distance meter and the successive detection by the second distance meter, and the processor is further operative to calculate or estimate the distance or the angle using, or based on, the calculated first angle α, the speed V, and the time period Δt.

9. The vehicle according to claim 8, wherein the processor is further operative to calculate or estimate a distance df based on, or according to, $df=sqrt(dv^2+dav^2-2*dv*dav*sin(\alpha))$, wherein dav=½*(d1+d2) and dv=V*Δt.

10. The vehicle according to claim 9, wherein the processor is further operative to calculate or estimate an angle φ based on, or according to, φ=arcsin(dv*cos(ε)/df).

11. The vehicle according to claim 7, for use with a distance df, further operative to calculate or estimate a time period Δt using, or based on, the calculated first angle α, the speed V, and the distance df.

12. The vehicle according to claim 11, wherein the calculating or estimating of the time period Δt is based on, or is according to, $\Delta t=[2*df^2*sin^2(\alpha)+sqrt(df^2*(1+sin^2(\alpha))-dav^2)]/V$, wherein dav=½*(d1+d2).

13. The vehicle according to claim 7, wherein the processor further operative to calculate or estimate a time period Δt using, or based on, the calculated first angle α, the speed V, and an angle φ, wherein φ=arcsin(dv*cos(ε)/df), $df=sqrt(dv^2+dav^2-2*dv*dav*sin(\alpha))$, wherein dav=½*(d1+d2) and dv=V*Δt, and Δt is a time period that exists between the detection by the first distance meter and the successive detection by the second distance meter.

14. The vehicle according to claim 13, wherein the calculating or estimating of the time period Δt is based on, or is according to, Δt=dav*sin(φ)/(V*cos(φ−α)).

15. The vehicle according to claim 7, wherein the speed V is calculated or estimated according to or based on a detection of the first surface or first object by the first distance meter along the first line using a measured first distance value (d1A) followed by a detection of the first surface or first object by the second distance meter along the second line using a measured second distance value (d1B).

16. The vehicle according to claim 15, wherein the first and second lines are spaced a third distance (c) apart, and wherein the speed (V) is calculated using, or based on, V=c/[cos(arctan((d2A−d1A)/c))*Δt], wherein Δt is the time between the detections by the first and second distance meters.

17. The vehicle according to claim 7, wherein the speed V is estimated or calculated, by the processor, using, or based on, a Doppler frequency shift between a signal transmitted by, and a signal received by, the first or second distance meter.

18. The vehicle according to claim 1, wherein the meters are mounted so that the first and the second lines are substantially parallel to the travel direction, and an angle formed between the first line or the second line and the travel direction is less than 20°, 18°, 15°, 13°, 10°, 8°, 5°, 3°, 2°, 1°, 0.8°, 0.5°, 0.3°, 0.2°, or 0.1°.

19. The vehicle according to claim 1, wherein the vehicle is mounted so that the first and the second lines are substantially perpendicular to the travel direction, and an angle formed between the first line or the second line and a direction that is perpendicular to the travel direction is less than 20°, 18°, 15°, 13°, 10°, 8°, 5°, 3°, 2°, 1°, 0.8°, 0.5°, 0.3°, 0.2°, or 0.1°.

20. The vehicle according to claim 1, wherein the vehicle is a ground vehicle adapted to travel on land.

21. The vehicle according to claim 20, wherein the ground vehicle is selected from the group consisting of a bicycle, a car, a motorcycle, a train, an electric scooter, a subway, a train, a trolleybus, and a tram.

22. The vehicle according to claim 1, wherein the vehicle is a buoyant or submerged watercraft adapted to travel on or in water.

23. The vehicle according to claim 22, wherein the watercraft is selected from the group consisting of a ship, a boat, a hovercraft, a sailboat, a yacht, and a submarine.

24. The vehicle according to claim 1, wherein the vehicle is an aircraft adapted to fly in air.

25. The vehicle according to claim 24, wherein the aircraft is a fixed wing or a rotorcraft aircraft.

26. The vehicle according to claim 24, wherein the aircraft is selected from the group consisting of an airplane, a spacecraft, a glider, a drone, or an Unmanned Aerial Vehicle (UAV).

27. The vehicle according to claim 24, wherein the vehicle is used for measuring or estimating an altitude, a pitch, or a roll of the aircraft.

28. The vehicle according to claim 1, wherein the vehicle is further operative to provide a notification or an indication to a person operating or controlling the vehicle, in response to a representation of the first distance (d1) or any function thereof, the second distance (d2) or any function thereof, or the estimated first angle ($\alpha$) or any function thereof.

29. The vehicle according to claim 1, further configured for measuring or estimating the vehicle speed, positioning, pitch, roll, or yaw.

30. The vehicle according to claim 1, wherein at least one of the meters is mounted onto, is attached to, is part of, or is integrated with a rear or front view camera, chassis, lighting system, headlamp, door, car glass, windscreen, side or rear window, glass panel roof, hood, bumper, cowling, dashboard, fender, quarter panel, rocker, or a spoiler of the vehicle.

31. The vehicle according to claim 1, wherein the vehicle further comprises an Advanced Driver Assistance Systems (ADAS) functionality, system, or scheme.

32. The vehicle according to claim 31, wherein the vehicle is part of, integrated with, communicates with, or coupled to, the ADAS functionality, system, or scheme.

33. The vehicle according to claim 32, wherein the ADAS functionality, system, or scheme is selected from a group consisting of Adaptive Cruise Control (ACC), Adaptive High Beam, Glare-free high beam and pixel light, Adaptive light control such as swiveling curve lights, Automatic parking, Automotive navigation system with typically GPS and TMC for providing up-to-date traffic information, Automotive night vision, Automatic Emergency Braking (AEB), Backup assist, Blind Spot Monitoring (BSM), Blind Spot Warning (BSW), Brake light or traffic signal recognition, Collision avoidance system, Pre-crash system, Collision Imminent Braking (CIB), Cooperative Adaptive Cruise Control (CACC), Crosswind stabilization, Driver drowsiness detection, Driver Monitoring Systems (DMS), Do-Not-Pass Warning (DNPW), Electric vehicle warning sounds used in hybrids and plug-in electric vehicles, Emergency driver assistant, Emergency Electronic Brake Light (EEBL), Forward Collision Warning (FCW), Heads-Up Display (HUD), Intersection assistant, Hill descent control, Intelligent speed adaptation or Intelligent Speed Advice (ISA), Intelligent Speed Adaptation (ISA), Intersection Movement Assist (IMA), Lane Keeping Assist (LKA), Lane Departure Warning (LDW) (a.k.a. Line Change Warning—LCW), Lane change assistance, Left Turn Assist (LTA), Night Vision System (NVS), Parking Assistance (PA), Pedestrian Detection System (PDS), Pedestrian protection system, Pedestrian Detection (PED), Road Sign Recognition (RSR), Surround View Cameras (SVC), Traffic sign recognition, Traffic jam assist, Turning assistant, Vehicular communication systems, Autonomous Emergency Braking (AEB), Adaptive Front Lights (AFL), and Wrong-way driving warning.

* * * * *